US012321882B2

(12) United States Patent
Wayne et al.

(10) Patent No.: US 12,321,882 B2
(45) Date of Patent: Jun. 3, 2025

(54) SYSTEMS AND METHODS FOR EXTENDED HORIZON TIME-SEQUENCES

(71) Applicant: UKG Inc., Weston, FL (US)

(72) Inventors: David Henry Wayne, Arlington, MA (US); Brian Robert Muras, Maple Grove, MN (US); Keith Alan Briggs, Pompano Beach, FL (US); Alexander L Krowitz, Biddeford, ME (US)

(73) Assignee: UKG Inc., Weston, FL (US)

( * ) Notice: Subject to any disclaimer, the term of this patent is extended or adjusted under 35 U.S.C. 154(b) by 187 days.

(21) Appl. No.: 18/158,635

(22) Filed: Jan. 24, 2023

(65) Prior Publication Data

US 2024/0020597 A1 Jan. 18, 2024

Related U.S. Application Data

(60) Provisional application No. 63/389,822, filed on Jul. 15, 2022.

(51) Int. Cl.

| | |
|---|---|
| ***G06Q 10/067*** | (2023.01) |
| ***G06Q 10/0631*** | (2023.01) |
| ***G06Q 10/1057*** | (2023.01) |

(52) U.S. Cl.

CPC ..... *G06Q 10/067* (2013.01); *G06Q 10/06311* (2013.01); *G06Q 10/063118* (2013.01); *G06Q 10/1057* (2013.01)

(58) Field of Classification Search

None

See application file for complete search history.

(56) References Cited

U.S. PATENT DOCUMENTS 8,078,487 B2 12/2011 Li et al.
9,378,476 B1 * 6/2016 Schwartz ....... G06Q 10/063116

(Continued)

FOREIGN PATENT DOCUMENTS

WO WO-2008040563 A1 * 4/2008 ............. G06F 9/505

OTHER PUBLICATIONS

Yun et al "An Effective Cloud Workflow Scheduling Approach Combining PSO and Idle Time Slot-Aware Rules", May 2021, IEEE, vol. 8, No. 5, pp. 1079-1094 (Year: 2021).*

Xiaoning et al "Dynamic Software Project Scheduling through a Proactive-rescheduling Method," Jul. 2016, in IEEE Transactions on Software Engineering, vol. 42, No. 7, pp. 658-686 (Year: 2016).*

(Continued)

*Primary Examiner* — Romain Jeanty

(74) *Attorney, Agent, or Firm* — ArentFox Schiff LLP; Michael Fainberg

(57) ABSTRACT

An apparatus for extended horizon scheduling that includes a time-sequence interpretation circuit, a target interpretation circuit, a horizon target analysis circuit, and a promotive action provisioning circuit. The time-sequence interpretation circuit interprets time-sequence data, the target interpretation circuit interprets target data, and the time-sequence trend analysis circuit extracts a trend from the time-sequence data. The horizon target analysis circuit: determines whether the extracted trend furthers or impedes a target defined, in part, by the target data, and responsive to a determination that the extracted trend impedes the target, generates a promotive action command value structured to trigger an adjustment to the time-sequence data. The adjustment is structured to mitigate the extracted trend from impeding the target. The promotive action provisioning circuit transmits the promotive action command value.

20 Claims, 173 Drawing Sheets

(56) References Cited

U.S. PATENT DOCUMENTS

| | | | | |
|---|---|---|---|---|
| 10,937,004 | B2 | 3/2021 | Comerford et al. | |
| 10,963,273 | B2 | 3/2021 | Peng et al. | |
| 11,790,322 | B1 * | 10/2023 | Rao | H04L 12/1859<br>705/321 |
| 2005/0135595 | A1 * | 6/2005 | Bushey | H04M 3/5191<br>379/265.09 |
| 2013/0246521 | A1 * | 9/2013 | Schacht | G06Q 50/01<br>709/204 |
| 2020/0401985 | A1 * | 12/2020 | Agarwal | G06Q 10/063118 |
| 2021/0165708 | A1 * | 6/2021 | Vijayaraghavan | G06N 3/04 |
| 2022/0078210 | A1 * | 3/2022 | Crabtree | G06F 16/9024 |
| 2022/0101266 | A1 * | 3/2022 | Silveira | G06Q 20/0855 |
| 2022/0188739 | A1 * | 6/2022 | Liu | G06Q 30/04 |
| 2023/0394398 | A1 * | 12/2023 | Lin | G06Q 10/06312 |
| 2024/0193509 | A1 * | 6/2024 | Bowles | G06Q 10/063116 |

OTHER PUBLICATIONS

Chen, Menghui , et al., "An Improved Algorithm for Solving Scheduling Problems by Combining Generative Adversarial Network with Evolutionary Algorithms", CSAE2019, Sanya, China, Oct. 2019, 7 pages.

Goodfellow, Ian J., et al., "Generative Adversarial Nets", Department of Computing and Operational Research, Jun. 10, 2014, 9 pages.

Hao, G. , et al., "A Neural Network Application in Personnel Scheduling", Annals of Operations Research, 2004, 65-90.

Liu, Chen-Feng , et al., "Data-Driven Predictive Scheduling in Ultra-Reliable Low-Latency Industrial IoT: A Generative Adversarial Network Approach", Centre for Wireless Communications, University of Oulu, Finland, May 10, 2020, 5 pages.

Padhi, Inkit , et al., "Tabular Transformers for Modeling Multivariate Time Series", IBM Research, T.J Watson Research Center & MIT-IBM Watson AI Lab, Feb. 11, 2021, 5 pages.

* cited by examiner

200800

210500

| INDEX | CIN | COUT | HIN | WIN | KERNEL | STRIDE | HOUT | WOUT | SCHEME | VOLUME | VOLUME% |
|---|---|---|---|---|---|---|---|---|---|---|---|
| 0 | 3 | 128 | 64 | 64 | (5,5) | (2,2) | 30 | 30 | RADFORD | 115200 | 0.668644 |
| 1 | -1 | 256 | -1 | -1 | (5,5) | (2,2) | 13 | 13 | RADFORD | 43264 | 0.251113 |
| 2 | -1 | 512 | -1 | -1 | (5,5) | (2,2) | 5 | 5 | RADFORD | 12800 | 0.074294 |
| 3 | -1 | 1024 | -1 | -1 | (5,5) | (2,2) | 1 | 1 | RADFORD | 1024 | 0.005944 |
| 4 | -1 | 1 | -1 | -1 | (1,1) | (1,1) | 1 | 1 | RADFORD | 1 | 0.000006 |
| 0 | 1 | 16 | 28 | 28 | (4,4) | (2,2) | 13 | 13 | Toy MNIST | 2704 | 0.771469 |
| 1 | -1 | 32 | -1 | -1 | (4,4) | (2,2) | 5 | 5 | Toy MNIST | 800 | 0.228245 |
| 2 | -1 | 1 | -1 | -1 | (4,4) | (2,2) | 1 | 1 | Toy MNIST | 1 | 0.000285 |
| 0 | 31 | 62 | 7 | 96 | (3,5) | (2,3) | 3 | 31 | 7×96-0 | 5766 | 0.837716 |
| 1 | -1 | 124 | -1 | -1 | (2,5) | (2,3) | 1 | 9 | 7×96-0 | 1116 | 0.162139 |
| 2 | -1 | 1 | -1 | -1 | (1,6) | (2,4) | 1 | 1 | 7×96-0 | 1 | 0.000145 |
| 0 | 31 | 62 | 7 | 96 | (1,2) | (2,2) | 4 | 48 | 7×96-1 | 11904 | 0.842046 |
| 1 | -1 | 124 | -1 | -1 | (2,5) | (2,5) | 2 | 9 | 7×96-1 | 2232 | 0.157884 |
| 2 | -1 | 1 | -1 | -1 | (2,5) | (2,5) | 1 | 1 | 7×96-1 | 1 | 0.000071 |
| 0 | 1 | 30 | 31 | 672 | (3,7) | (3,7) | 10 | 96 | 672-0 | 28800 | 0.759474 |
| 1 | -1 | 96 | -1 | -1 | (2,5) | (2,5) | 5 | 19 | 672-0 | 9120 | 0.240500 |
| 2 | -1 | 1 | -1 | -1 | (5,19) | (5,19) | 1 | 1 | 672-0 | 1 | 0.000026 |

FIG. 173

| INDEX | CIN | COUT | HIN | WIN | KERNEL | STRIDE | HOUT | WOUT | SCHEME | DILATION | VOLUME | VOLUME% |
|---|---|---|---|---|---|---|---|---|---|---|---|---|
| 0 | 100 | 1024 | 1 | 1 | (4,4) | (1,1) | 4 | 4 | RADFORD | NaN | 16384 | 0.043297 |
| 1 | -1 | 512 | -1 | -1 | (2,2) | (2,2) | 8 | 8 | RADFORD | NaN | 32768 | 0.086594 |
| 2 | -1 | 256 | -1 | -1 | (5,5) | (2,2) | 19 | 19 | RADFORD | NaN | 92416 | 0.244221 |
| 3 | -1 | 128 | -1 | -1 | (5,5) | (2,2) | 41 | 41 | RADFORD | NaN | 215168 | 0.568609 |
| 4 | -1 | 3 | -1 | -1 | (5,5) | (2,2) | 85 | 85 | RADFORD | NaN | 21675 | 0.057279 |
| 0 | 64 | 256 | 1 | 1 | (3,3) | (2,2) | 3 | 3 | Toy MNIST | NaN | 2304 | 0.124460 |
| 1 | -1 | 128 | -1 | -1 | (4,4) | (1,1) | 6 | 6 | Toy MNIST | NaN | 4608 | 0.248920 |
| 2 | -1 | 64 | -1 | -1 | (3,3) | (2,2) | 13 | 13 | Toy MNIST | NaN | 10816 | 0.584270 |
| 3 | -1 | 1 | -1 | -1 | (4,4) | (2,2) | 28 | 28 | Toy MNIST | NaN | 784 | 0.042351 |
| 0 | 62 | 124 | 1 | 1 | (1,6) | (2,4) | 1 | 6 | 7×96-0 | NaN | 744 | 0.028571 |
| 1 | -1 | 62 | -1 | -1 | (3,4) | (2,4) | 3 | 24 | 7×96-0 | NaN | 4464 | 0.171429 |
| 2 | -1 | 31 | -1 | -1 | (3,4) | (2,4) | 7 | 96 | 7×96-0 | NaN | 20832 | 0.800000 |
| 0 | 62 | 124 | 1 | 1 | (3,6) | (2,4) | 3 | 6 | REDUCED | NaN | 2232 | 0.096774 |
| 1 | -1 | 31 | -1 | -1 | (3,16) | (2,16) | 7 | 96 | REDUCED | NaN | 20832 | 0.903226 |
| 0 | 31 | 62 | 7 | 96 | (1,2) | (2,2) | 13 | 192 | 7×96-1 | NaN | 154752 | 0.044223 |
| 1 | -1 | 124 | -1 | -1 | (2,5) | (2,5) | 26 | 960 | 7×96-1 | NaN | 3095040 | 0.884451 |
| 2 | -1 | 1 | -1 | -1 | (2,5) | (2,5) | 52 | 4800 | 7×96-1 | NaN | 249600 | 0.071327 |
| 0 | 128 | 256 | 1 | 1 | (3,7) | (3,7) | 3 | 7 | 672-0 | NaN | 5376 | 0.024465 |
| 1 | -1 | 512 | -1 | -1 | (3,6) | (3,6) | 9 | 42 | 672-0 | NaN | 193536 | 0.880734 |
| 2 | -1 | 1 | -1 | -1 | (3,16) | (3,16) | 31 | 672 | 672-0 | (3,1) | 20832 | 0.094801 |

FIG. 174

SYSTEMS AND METHODS FOR EXTENDED HORIZON TIME-SEQUENCES

CROSS-REFERENCE TO RELATED APPLICATIONS

This application claims priority to and the benefit of U.S. Provisional patent application Ser. No. 63/389,822, filed Jul. 15, 2022 and entitled "SYSTEMS AND METHODS FOR AGGLOMERATE NETWORKS".

All of the above patent documents are incorporated herein by reference in their entirety.

BACKGROUND

The present disclosure relates to schedule generation.

SUMMARY

Embodiments of the current disclosure provide for networked, autonomous, agglomerated resource utilization modelers. This disclosure also provides for use cases thereof. Further embodiments of the current disclosure also provide for forecasting of general attributes, e.g., the generation of outputs in the form of a schedule. Yet further embodiments of this disclosure may provide for the generation of general forecasts for absenteeism, the number of employees required, and the like.

An example apparatus includes a scheduling factor interpretation circuit, one or more agglomerate network circuits, one or more connector circuits, a schedule selector circuit, and a schedule provisioning circuit. The scheduling factor interpretation circuit is structured to interpret one or more scheduling factors. The one or more agglomerate network circuits are each structured to generate a corresponding schedule. The one or more connector circuits are each structured to pass at least one of the schedules as inputs to at least one of the one or more agglomerate network circuits. The schedule selector circuit is structured to select at least one of the schedules. The schedule provisioning circuit is structured to transmit the selected schedule.

Embodiments of the current disclosure provide for a method for predicting schedules. The method includes: generating a first schedule via a first agglomerate network; passing one or more portions of the first schedule to a second agglomerate network as input via a connector; and generating a second schedule via the second agglomerate network based at least in part on the one or more portions of the first schedule. The method further includes transmitting the second schedule. In certain aspects, the method further includes weighing at least one of the first or the second agglomerate network to favor an employer over an employee. In certain aspects the method further includes weighing at least one of the first or the second agglomerate network to favor an employee over an employer. In certain aspects, the method further includes mixing at least one of the first schedule or the second schedule with at least one other schedule.

Embodiments of the current disclosure provide for a system for predicting schedules. The system includes a plurality of agglomerate networks, one or more connectors, a schedule selector circuit, and a schedule provisioning circuit. The plurality of agglomerate networks are each structured to generate a corresponding schedule. The one or more connectors are each structured to pass at least one of the schedules as input to at least one of the plurality of agglomerate networks. The schedule selector circuit is structured to select at least one of the schedules. The schedule provisioning circuit is structured to transmit the selected schedule.

Embodiment of the current disclosure provide for an apparatus that includes: a scheduling factor interpretation circuit, one or more agglomerate network circuits, one or more connector circuits, a schedule selector circuit, and a schedule provisioning circuit. The scheduling factor interpretation circuit is structured to interpret one or more scheduling factors. The one or more agglomerate network circuits are each structured to generate a corresponding schedule. The one or more connector circuits each structured to pass at least one of the schedules as inputs to at least one of the one or more agglomerate network circuits. The schedule selector circuit is structured to select at least one of the schedules. The schedule provisioning circuit is structured to transmit the selected schedule.

Embodiments of the current disclosure provide for a method for configuring a scheduling system. The method includes: generating a plurality of schedules for a plurality of targets using different configurations of an agglomerate network; determining a performance score of the plurality of schedules; and identifying configurations of the agglomerate network and targets with schedules above a performance score above a threshold. The method further includes receiving a request for a schedule for a target; configuring the agglomerate network for the target based on the identified configurations; and generating the schedule using the configured agglomerate network. In certain aspects, tracking the performance includes tracking changes made to the schedules. In certain aspects, configuring the agglomerate network includes selecting scheduling models. In certain aspects, configuring the agglomerate network includes selecting forecasting models. In certain aspects, configuring the agglomerate network includes configuring data biases of data sources.

Embodiments of the current disclosure provide for an apparatus that includes a scenario interpretation circuit, a scenario analysis circuit, a data analysis circuit, a data source locator circuit, and a data retrieval circuit. The scenario interpretation circuit is structured to interpret schedule scenario data. The scenario analysis circuit is structured to extract a scenario element from the schedule scenario data. The data analysis circuit is structured to determine, based at least in part on the extracted scenario element, a type of data for inclusion in the generation of schedule data corresponding to the scenario data. The data source locator circuit is structured to identify a source of the type of data for inclusion in the generation of the schedule data. The data retrieval circuit structured to retrieve data from the identified source. The data provisioning circuit structured to transmit the retrieved data.

Embodiments of the current disclosure provide for a method that includes interpreting, via a scenario interpretation circuit, schedule scenario data; and extracting, via a scenario analysis circuit, a scenario element from the schedule scenario data. The method further includes determining, via a data analysis circuit based at least in part on the extracted scenario element, a type of data for inclusion in the generation of schedule data corresponding to the scenario data; and identifying, via a data source locator circuit, a source of the type of data for inclusion in the generation of the schedule data. The method further includes retrieving, via a data retrieval circuit, data from the identified source; and transmitting, via a data provisioning circuit, the retrieved data.

Embodiments of the current disclosure provide for a non-transitory computer-readable medium storing instructions. The stored instructions adapt at least one processor to: interpret schedule scenario data; extract a scenario element from the schedule scenario data; and determine, based at least in part on the extracted scenario element, a type of data for inclusion in the generation of schedule data corresponding to the scenario data. The stored instructions further adapt the at least one processor to: identify a source of the type of data for inclusion in the generation of the schedule data; retrieve data from the identified source; and transmit the retrieved data.

Embodiments of the current disclosure provide for an agglomerate network for generating schedule data. The agglomerate network includes a plurality of agglomerate network circuits, a connector circuit, and a hierarchical feature propagator (HFP). The plurality of agglomerate network circuits is structured to generate schedule data corresponding to schedule scenario data. The connector circuit is structured to adjust at least one of an input of an agglomerate network circuit of the plurality or data outputted by the agglomerate network circuit. The HFP is structured to: interpret the schedule scenario data; extract a scenario element from the schedule scenario data; and determine, based at least in part on the extracted scenario element, a type of data for inclusion in the generation of the schedule data. The HFP is further structured to: identify a source of the type of data for inclusion in the generation of the schedule data; retrieve data from the identified source; and adjust the connector circuit to include the retrieved data in the generation of the schedule data.

Embodiments of the current disclosure may provide for an apparatus for incentive-based scheduling. The apparatus includes a schedule interpretation circuit, a shift analysis circuit, an incentivizer circuit, and an incentive provisioning circuit. The schedule interpretation circuit is structured to interpret schedule data. The shift analysis circuit is structured to analyze the schedule data and identify a shift. The incentivizer circuit is structured to determine incentive data for the shift. The incentive provisioning circuit is structured to transmit the incentive data.

Embodiments of the current disclosure provide for a method for incentive-based scheduling. The method includes interpreting, via a schedule interpretation circuit, schedule data; and analyzing, via a shift analysis circuit, the schedule data. The method further includes identifying, via the shift analysis circuit and based at least in part on the analysis of the schedule data, a shift; and determining, via an incentivizer circuit, incentive data for the shift; and transmitting, via an incentive provisioning circuit, the incentive data.

Embodiments of the current disclosure provide for another apparatus of incentive-based scheduling. The apparatus includes a schedule interpretation circuit, a shift analysis circuit, an incentivizer circuit, and an incentive provisioning circuit. The schedule interpretation circuit is structured to interpret schedule data. The shift analysis circuit is structured to: analyze the schedule data; identify a shift; and assign an employee value to the shift. The incentivizer circuit is structured to determine incentive data for the shift based at least in part on the employee value. The incentive provisioning circuit is structured to transmit the incentive data.

Embodiments of the current disclosure provide for another method for incentive-based scheduling. The method includes: interpreting, via a schedule interpretation circuit, schedule data; analyzing, via a shift analysis circuit, the schedule data; and identifying, via the shift analysis circuit, a shift. The method further includes assigning, via the shift analysis circuit, an employee value to the shift; determining, via an incentivizer circuit, incentive data for the shift based at least in part on the employee value; and transmitting, via an incentive provisioning circuit, the incentive data.

Embodiments of the current disclosure provide for an agglomerate network for incentive-based scheduling. The agglomerate network includes a scheduler circuit, a connector circuit, and an incentivize analysis circuit. The scheduler circuit is structured to output the schedule data. The connector circuit is structured to adjust at least one of an input to the scheduler circuit or the schedule data outputted by the scheduler circuit. The incentivize analysis circuit structured to: receive the schedule data via the connector circuit; identify a shift in the schedule data; assign an employee value to the shift; determine incentive data for the shift based at least in part on the employee value; and transmit the incentive data.

Embodiments of the current disclosure provide for another apparatus for incentive-based scheduling. The apparatus includes a schedule interpretation circuit, a shift analysis circuit, an incentivizer circuit, and an incentive provisioning circuit. The schedule interpretation circuit is structured to interpret schedule data. The shift analysis circuit structured to: analyze the schedule data, identify a portion of the schedule data, and assign an employee value to the portion of the schedule data. The incentivizer circuit is structured to determine incentive data for the portion of the schedule data based at least in part on the employee value. The incentive provisioning circuit is structured to transmit the incentive data.

Embodiments of the current disclosure provide for another method for incentive-based scheduling. The method includes: interpreting, via schedule interpretation circuit, schedule data; analyzing, via a shift analysis circuit, the schedule data; identifying, via the shift analysis circuit, a portion of the schedule data; and assigning, via the shift analysis circuit, an employee value to the portion of the schedule data. The method further includes determining, via an incentivizer circuit, incentive data for the portion of the schedule data based at least in part on the employee value; and transmitting, via an incentive provisioning circuit, the incentive data.

Embodiments of the current disclosure provide for a non-transitory computer-readable medium storing instructions for incentive-based scheduling. The stored instructions adapt at least one processor to: interpret schedule data; analyze the schedule data; and identify, based at least in part on the analysis of the schedule data, a shift. The stored instructions further adapt the at least one processor to determine incentive data for the shift; and transmit the incentive data.

Embodiments of the current disclosure provide for an apparatus for employee sharing/contracting. The apparatus includes a first schedule interpretation circuit, an availability determination circuit, a second schedule interpretation circuit, a sharing circuit, and a shared employee provisioning circuit. The first schedule interpretation circuit is structured to interpret first schedule data for an employee of a first entity. The availability determination circuit is structured to determine availability data for the employee based at least in part on the first schedule data. The second schedule interpretation circuit is structured to interpret second schedule data corresponding to a second entity. The sharing circuit is structured to determine, based at least in part on the availability data and the second schedule data, that the employee is available to work a shift corresponding to the second entity. The shared employee provisioning circuit is structured to transmit an indication that the employee is available to work for the shift.

Embodiments of the current disclosure provide for a method for employee sharing/contracting. The method includes: interpreting, via a first schedule interpretation circuit, first schedule data for an employee of a first entity; determining, via an availability determination circuit, availability data for the employee based at least in part on the first schedule data; and interpreting, via a second schedule interpretation circuit, second schedule data corresponding to a second entity. The method further includes determining, via a sharing circuit and based at least in part on the availability data and the second schedule data, that the employee is available to work a shift corresponding to the second entity; and transmitting, via a shared employee provisioning circuit, an indication that the employee is available to work for the shift.

Embodiments of the current disclosure also provide for a non-transitory computer-readable medium storing instructions for employee sharing/contracting. The stored instructions adapt at least one processor to: interpret first schedule data for an employee of a first entity; determine availability data for the employee based at least in part on the first schedule data; and interpret second schedule data corresponding to a second entity. The stored instructions further adapt the at least one processor to determine, based at least in part on the availability data and the second schedule data, that the employee is available to work a shift corresponding to the second entity; and transmit, an indication that the employee is available to work for the shift.

Embodiments of the current disclosure also provide for an agglomerate network that provides employee sharing/contracting. The agglomerate network includes a scheduler circuit, a connector circuit, and a shared employee contracting circuit. The scheduler circuit is structured to output first schedule data corresponding to a first entity. The connector circuit is structured to adjust at least one of an input to the scheduler circuit or the first schedule data outputted by the scheduler circuit. The shared employee contracting circuit is structured to: interpret the first schedule data; interpret second schedule data corresponding to a second entity; and determine a need of the second entity for a worker based at least in part on the second schedule data. The shared employee contracting circuit is further structured to generate a change command value structured to trigger an adjustment to the connector circuit to effect a change of at least one of the input to the scheduler circuit or the first schedule data outputted by the scheduler circuit such that an employee is made available to fill the need of the second entity for a worker. The shared employee contracting circuit is further structured to transmit the change command value.

Embodiments include examples of networks, methods, and apparatus to enable schedule conformance. Embodiments may provide for scoring a schedule against company norms and altering the schedule to resolve conflicts.

In embodiments, an apparatus with a schedule interpretation circuit may interpret schedule data which is then used by a warden circuit to determine, based at least in part on the schedule data, that a property of the schedule data violates a schedule norm, where the schedule norm may be based at least in part on historical schedule data. A corrective action circuit may generate, responsive to a determination that the property violates the schedule norm, a corrective action command value structured to trigger an adjustment to the schedule data, wherein the adjustment is structured to effect a change of the property such that the property retracts from violating the schedule norm. A corrective action provisioning circuit may then transmit the corrective action command value. The schedule norm may be based at least in part on historical schedule data.

In embodiments, a method may include interpreting, via a schedule interpretation circuit, schedule data, and determining, via a warden circuit and based at least in part on the schedule data, that a property of the schedule data violates a schedule norm. The method may further include generating, via a corrective action circuit responsive to the determination that the property violates the schedule norm, a corrective action command value. The corrective action command value may be structured to trigger an adjustment to the schedule data, wherein the adjustment is structured to effect a change of the property such that the property retracts from violating the schedule norm. The method may further include transmitting, via a corrective action provisioning circuit, the corrective action command value. The schedule norm may be based at least in part on historical schedule data.

In embodiments, an agglomerate network for generating schedule data may include a schedule circuit to output schedule data and a connector circuit to adjust at least one of an input to the scheduler circuit or the schedule data outputted by the scheduler circuit. A schedule warden circuit may be structured to interpret the schedule data and determine, based at least in part on the schedule data, that a property of the schedule data violates a schedule norm. Responsive to the determination that the property violates the schedule norm, the schedule warden circuit may generate a corrective action command value structured to trigger an adjustment to the connector circuit and transmit the correct command value. The adjustment to the connector circuit may include a change of at least one of the input to the scheduler circuit, or the schedule data outputted by the scheduler circuit, such that the property retracts from violating the schedule norm.

In embodiments, a non-transitory computer-readable medium may store instructions that adapt at least one processor to interpret schedule data, and to determine, based at least in part on the schedule data, that a property of the schedule data violates a schedule norm. The processor may be further adapted to generate, responsive to the determination that the property violates the schedule norm, a corrective action command value structured to trigger an adjustment to the schedule data and transmit the corrective action command value. The adjustment is structured to effect a change of the property such that the property retracts from violating the schedule norm. The schedule norm is based at least in part on historical schedule data.

In embodiments, a method may include transmitting, via a local computing device, historical schedule data to a scheduling platform hosted on one or more remote servers. The method may further include accessing, via the local computing device, schedule data generated via the scheduling platform, where the schedule data is based at least in part on a schedule warden circuit structured to conform the generated schedule data to schedule norms determined from the historical schedule data. The method may further include executing a portion of a schedule that is based at least in part on the schedule data.

In embodiments, an apparatus may include a schedule interpretation circuit structured to interpret schedule data and a warden circuit. The warden circuit may be structured to: generate a plurality of scores for the schedule data with respect to a plurality of schedule properties; retrieve a plurality of baseline values each corresponding to one of the schedule properties; and determine, based at least in part on the plurality of baseline values and the plurality of scores, that the schedule data is out of alignment with the baseline value for at least one of the corresponding schedule properties. The apparatus may further include a corrective action circuit structured to generate, responsive to the determination that the schedule data is out of alignment with the baseline value for the at least one of the corresponding schedule properties, a corrective action command value structured to trigger an adjustment to the schedule data, wherein the adjustment is structured to effect a change to the at least one schedule property that the schedule data is out of alignment with. The apparatus may further include a corrective action provisioning circuit structured to transmit the corrective action command value.

Embodiments of the current disclosure provide for methods and systems for proposing and executing scheduling experiments. The experiments may be simulated and/or conducted in the real world with AI learning from the results. The selection of executed experiments, implementation of changes based on the results, and the like, may be automatic and/or manual. Embodiments may provide for dials and/or sliders that provide for the introduction of how much risk (e.g., poor outcome) a user of the system can tolerate. Embodiments may provide for employees to opt-in to an experiment for an incentive, e.g., $1.00 more/hour, such as where the experiment provides a more dynamic schedule, or provide for an employee to opt-out of the experiment, such as to keep a more predictable schedule. Embodiments of schedule experimentation may be a module that receives inputs, e.g., a schedule and/or other data, e.g., biases, as: direct input, i.e., the schedule experimentation module may act as a standalone module; as direct input to an agglomerate network, e.g., without use of connectors; and/or from connectors, e.g., the schedule experimentation module is one of a plurality of modules within an agglomerate network. Schedule experimentation may take the form of a schedule generation module within an agglomerate network that passes its output (e.g., schedules) to other modules in the agglomerate network for evaluation where the other modules generate output(s), e.g., a bias. The other modules may, in turn, feed the output back into the schedule experimentation module to form a feedback loop which tries to reach equilibrium and/or optimization of various biases in the agglomerate network while keeping the generated schedules comparable to ones generated by managers. The connections between the schedule experimentation module and the various other modules of the agglomerate network may be accomplished via connectors.

Embodiments of the current disclosure provide for an apparatus for timekeeping and scheduling. The apparatus includes an employee surveyor circuit, an embedding generator circuit, an artificial intelligence circuit, a scheduling circuit, and a schedule provisioning circuit. The employee surveyor circuit interprets employee data. The embedding generator circuit determines employee embeddings based at least in part on the employee data. Further, the artificial intelligence circuit generates a model based at least in part on the employee embeddings. The scheduling circuit generates schedule data via the model, and the schedule provisioning circuit transmits the schedule data.

Embodiments of the current disclosure provide for a method for timekeeping and scheduling. The method includes interpreting, via an employee surveyor circuit, employee data. Further, the method includes determining employee embeddings based at least in part on the employee data via an embedding generator circuit. The method also includes generating a model based at least in part on the employee embeddings via an artificial intelligence circuit and generating, via a scheduling circuit, schedule data via the model. The method can also include transmitting, via a schedule provisioning circuit, the schedule data.

Embodiments of the current disclosure provide for another method for timekeeping and scheduling. The method includes determining, using an embedding generator circuit, employee embeddings and generating a model using the employee embeddings via an artificial intelligence circuit. Further, the method includes generating, via a scheduling circuit, a timekeeping record using the model and the employee embeddings.

Embodiments of the current disclosure provide for another method for timekeeping and scheduling. The method includes determining, using an embedding generator circuit, employee embeddings and generating a model using the employee embeddings via an artificial intelligence circuit. The method can also include generating, via a scheduling circuit, a list of recommended employees using the model and the employee embeddings.

Embodiments of the current disclosure provide for a non-transitory computer-readable medium storing instructions for timekeeping and scheduling. The stored instructions adapt at least one processor to interpret, via an employee surveyor circuit, employee data and determine, via an embedding generator circuit, employee embeddings. The stored instructions can also generate a model using the employee embeddings via an artificial intelligence circuit. Further, the stored instructions can generate, via a scheduling circuit, a schedule using the model and the employee embeddings.

Embodiments of the current disclosure provide for an apparatus for responsive scheduling. The apparatus includes a schedule interpretation circuit, a feedback interpretation circuit, a feedback influencer circuit, and a feedback influencer provisioning circuit. The schedule interpretation circuit is structured to interpret schedule data. The feedback interpretation circuit is structured to interpret feedback data corresponding to the schedule data. The feedback influencer circuit is structured to generate, based at least in part on the feedback data, a feedback influence command value structured to effect a change of a property of the schedule data. The feedback influencer provisioning circuit is structured to transmit the feedback influence command value.

Embodiments of the current disclosure provide for a method for responsive scheduling. The method includes: interpreting, via a schedule interpretation circuit, schedule data; interpreting, via a feedback interpretation circuit, feedback data corresponding to the schedule data; and generating, via a feedback influencer circuit and based at least in part on the feedback data, a feedback influence command value structured to effect a change of a property of the schedule data. The method further includes transmitting, via a feedback influencer provisioning circuit the feedback influence command value.

Embodiments of the current disclosure provide for an agglomerate network for responsive scheduling. The agglomerate network includes a scheduler circuit, a connector circuit, and a responsive scheduler circuit. The scheduler circuit is structured to output the schedule data. The connector circuit is structured to adjust at least one of an input to the scheduler circuit or the schedule data outputted by the scheduler circuit. The responsive scheduler circuit structured to: interpret the schedule data; and generate, based at least in part on feedback data, a feedback influence command value structured to trigger an adjustment to a connector, wherein the adjustment is structured to effect a change of at least one of the input to the scheduler circuit or the schedule data outputted by the scheduler circuit. The responsive scheduler circuit is further structured to transmit the feedback influence command value.

Embodiments of the current disclosure provide for a non-transitory computer-readable medium storing instructions for responsive scheduling. The stored instructions adapt at least one processor to: interpret schedule data; interpret feedback data corresponding to the schedule data; and generate, based at least in part on the feedback data, a feedback influence command value structured to effect a change of a property of the schedule data. The stored instructions further adapt the at least one processor to transmit, the feedback influence command value.

Embodiments of the current disclosure provide for another method for responsive scheduling. The method includes: transmitting, via a local computing device, feedback data to a scheduling platform hosted on one or more remote servers; accessing, via the local computing device, schedule data generated via the scheduling platform based at least in part on a responsive scheduler circuit; and executing a schedule based at least in part on the schedule data. The method further includes influencing, via the responsive scheduler circuit, the schedule data based at least in part on the feedback data.

Embodiments of the current disclosure provide for an apparatus for schedule mimicking. The apparatus includes a historic schedule interpretation circuit, a mimicking circuit, and a schedule data provisioning circuit. The historic schedule interpretation circuit is structured to interpret historical schedule data corresponding to a schedule designed, in part, by an entity. The mimicking circuit is structured to: extract a schedule trend from the historical schedule data; identify a portion of the historical schedule data corresponding to the extracted schedule trend; and generate schedule data based at least in part on the identified portion. The schedule data provisioning circuit is structured to transmit the schedule data.

Embodiments of the current disclosure provide for a method for schedule mimicking. The method includes: interpreting, via a historic schedule interpretation circuit, historical schedule data corresponding to a schedule designed, in part, by an entity; extracting, via a mimicking circuit, a schedule trend from the historical schedule data; and identifying, via the mimicking circuit, a portion of the historical schedule data corresponding to the extracted schedule trend. The method further includes generating, via the mimicking circuit, schedule data based at least in part on the identified portion; and transmitting, via a schedule data provisioning circuit, the schedule data.

Embodiments of the current disclosure provide for another apparatus for schedule mimicking. The apparatus includes a historic schedule interpretation circuit, a mimicking circuit, and a mimic command provisioning circuit. The historic schedule interpretation circuit is structured to interpret historical schedule data corresponding to a schedule designed, in part, by an entity. The mimicking circuit is structured to: extract a schedule trend from the historical schedule data; identify a portion of the historical schedule data corresponding to the extracted schedule trend; and generate a mimic command value based at least in part on the identified portion, wherein the mimic command value is structured to trigger an adjustment to schedule data generated by a scheduler circuit. The mimic command provisioning circuit structured to transmit the mimic command value.

Embodiments of the current disclosure provide for another method for schedule mimicking. The method includes: interpreting, via a historic schedule interpretation circuit, historical schedule data corresponding to a schedule designed, in part, by an entity; extracting, via a mimicking circuit, a schedule trend from the historical schedule data; and identifying, via the mimicking circuit, a portion of the historical schedule data corresponding to the extracted schedule trend. The method further includes generating, via the mimicking circuit, a mimic command value based at least in part on the identified portion, wherein the mimic command value is structured to trigger an adjustment to schedule data generated by a scheduler circuit; and transmitting, via a mimic command provisioning circuit, the mimic command value.

Embodiments of the current disclosure provide for an agglomerant network that generates schedule data based at least in part on schedule mimicking. The agglomerate network includes a scheduler circuit, a connector circuit, and a schedule mimicker circuit. The scheduler circuit is structured to output the schedule data. The connector circuit is structured to adjust at least one of an input to the scheduler circuit or the schedule data outputted by the scheduler circuit. The schedule mimicker circuit is structured to: interpret historical schedule data; extract a schedule trend from the historical schedule data; and identify a portion of the schedule data corresponding to the extracted schedule trend. The schedule mimicker circuit is further structured to generate a mimic command value based at least in part on the identified portion. The mimic command value is structured to trigger an adjustment to the connector circuit, and the adjustment is structured to effect a change of at least one of the input to the scheduler circuit or the schedule data outputted by the scheduler circuit. The schedule mimicker circuit is further structured to transmit the mimic command value.

Embodiments of the current disclosure provide for a non-transitory computer-readable medium that stored instructions for schedule mimicking. The instructions adapt at least one processor to: interpret historical schedule data corresponding to a schedule designed, in part, by an entity; extract a schedule trend from the historical schedule data; and identify a portion of the historical schedule data corresponding to the extracted schedule trend. The stored instructions further adapt the at least one processor to: generate schedule data based at least in part on the identified portion; and transmit the schedule data.

Embodiments of the current disclosure provide for an apparatus for bootstrap scheduling. The apparatus includes an employee data interpretation circuit, a bootstrap circuit, and a schedule data provisioning circuit. The employee data interpretation circuit is structured to interpret employee data corresponding to a first employee. The bootstrap circuit is structured to: match the first employee to a second employee via querying one or more databases based at least in part on the employee data; retrieve historical schedule data associated with the second employee via querying the one or more databases; extract a schedule trend from the historical schedule data; identify a portion of the historical schedule data corresponding to the extracted schedule trend; and generate, based at least in part on the identified portion, schedule data corresponding to the first employee. The schedule data provisioning circuit is structured to transmit the schedule data.

Embodiments of the current disclosure provide for a method for bootstrap scheduling. The method includes: interpreting employee data corresponding to a first employee; matching the first employee to a second employee via querying one or more databases based at least in part on the employee data; and retrieving historical schedule data associated with the second employee via querying the one or more databases. The method further includes extracting a schedule trend from the historical schedule data; identifying a portion of the historical schedule data corresponding to the extracted schedule trend; and generating, based at least in part on the identified portion, schedule data corresponding to the first employee. The method further includes transmitting the schedule data.

Embodiments of the current disclosure provide for another apparatus for bootstrap scheduling. The apparatus includes a position data interpretation circuit, a bootstrap circuit, and a schedule data provisioning circuit. The position data interpretation circuit is structured to interpret position data corresponding to a first position. The bootstrap circuit is structured to: match the first position to a second position via querying one or more databases based at least in part on the position data; retrieve historical schedule data associated with the second position via querying the one or more databases; extract a schedule trend from the historical schedule data; identify a portion of the historical schedule data corresponding to the extracted schedule trend; and generate, based at least in part on the identified portion, schedule data corresponding to the first position. The schedule data provisioning circuit is structured to transmit the schedule data.

Embodiments of the current disclosure provide for another method for bootstrap scheduling. The method includes: interpreting position data corresponding to a first position; matching the first position to a second position via querying one or more databases based at least in part on the position data; and retrieving historical schedule data associated with the second position via querying the one or more databases. The method further includes: extracting a schedule trend from the historical schedule data; identifying, a portion of the historical schedule data corresponding to the extracted schedule trend; and generating, based at least in part on the identified portion, schedule data corresponding to the first position. The method further includes transmitting the schedule data.

Embodiments of the current disclosure provide for a non-transitory computer-readable medium storing instructions for bootstrap scheduling. The stored instructions adapt at least one processor to: interpret employee data corresponding to a first employee; match the first employee to a second employee via querying one or more databases based at least in part on the employee data; and retrieve historical schedule data associated with the second employee via querying the one or more databases. The stored instructions further adapt the at least one processor to extract a schedule trend from the historical schedule data; identify a portion of the historical schedule data corresponding to the extracted schedule trend; and generate, based at least in part on the identified portion, schedule data corresponding to the first employee. The stored instructions further adapt the at least one processor to transmit the schedule data.

Embodiments of the current disclosure provide for another non-transitory computer-readable medium storing instructions for bootstrap scheduling. The stored instructions adapt at least one processor to: interpret position data corresponding to a first position; match the first position to a second position via querying one or more databases based at least in part on the position data; and retrieve historical schedule data associated with the second position via querying the one or more databases. The stored instructions further adapt the at least one processor to extract a schedule trend from the historical schedule data; identify a portion of the historical schedule data corresponding to the extracted schedule trend; and generate, based at least in part on the identified portion, schedule data corresponding to the first position. The stored instructions further adapt the at least one processor to transmit the schedule data.

Embodiments of the current disclosure provide for another apparatus for bootstrap scheduling. The apparatus includes an employee data interpretation circuit, a bootstrap circuit, and a schedule data provisioning circuit. The employee data interpretation circuit is structured to interpret first employee profile data corresponding to a first employee. The bootstrap circuit is structured to: match the first employee profile data to second employee profile data via querying one or more databases; retrieve historical schedule data associated with the second employee profile data via querying the one or more databases; and generate, based at least in part on the retrieved historical schedule data, schedule data corresponding to the first employee. The schedule data provisioning circuit is structured to transmit the schedule data.

Embodiments of the current disclosure provide for another method for bootstrap scheduling. The method includes: interpreting first employee profile data corresponding to a first employee; matching the first employee profile data to second employee profile data via querying one or more databases; and retrieving historical schedule data associated with the second employee profile data via querying the one or more databases. The method further includes generating based at least in part on the retrieved historical schedule data, schedule data corresponding to the first employee. The method further includes transmitting the schedule data.

Embodiments of the current disclosure provide for another non-transitory computer-readable medium storing instructions for bootstrap scheduling. The stored instructions adapt at least one processor to: interpret first employee profile data corresponding to a first employee; match the first employee profile data to second employee profile data via querying one or more databases; and retrieve historical schedule data associated with the second employee profile data via querying the one or more databases. The stored instructions further adapt the at least one processor to: generate based at least in part on the retrieved historical schedule data, schedule data corresponding to the first employee; and transmit the schedule data.

Embodiments of the current disclosure provide for an apparatus for self-organizing an agglomerate network, the apparatus including a scenario interpretation circuit, a scenario analysis circuit, an architect circuit, and an architecture provisioning circuit. The scenario interpretation circuit interprets schedule scenario data. The scenario analysis circuit extracts one or more scenario elements from the schedule scenario data. The architect circuit: identifies, based at least in part on the one or more scenario elements, one or more agglomerate network circuits and one or more connector circuits; and generates agglomerate network architecture data that defines, in part, a structural relationship between at least one of the one or more agglomerate network circuits and at least one of the one or more connector circuits. The architecture provisioning circuit transmits the agglomerate network architecture data.

Embodiments of the current disclosure provide for a method for self-organizing an agglomerate network is provided. The method includes: interpreting, via a scenario interpretation circuit, schedule scenario data; extracting, via a scenario analysis circuit, one or more scenario elements from the schedule scenario data; and identifying, via an architect circuit and based at least in part on the one or more scenario elements, one or more agglomerate network circuits and one or more connector circuits. The method further includes generating, via the architect circuit, agglomerate network architecture data that defines, in part, a structural relationship between at least one of the one or more agglomerate network circuits and at least one of the one or more connector circuits; and transmitting, via an architecture provisioning circuit, the agglomerate network architecture data.

Embodiments of the current disclosure provide for another apparatus for self-organizing an agglomerate network, the apparatus including a scenario interpretation circuit, a scenario analysis circuit, an architect circuit, and an assembly circuit. The scenario interpretation circuit interprets schedule scenario data. The scenario analysis circuit extracts one or more scenario elements from the schedule scenario data. The architect circuit: identifies, based at least in part on the one or more scenario elements, one or more agglomerate network circuits and one or more connector circuits; and generates agglomerate network architecture data that defines, in part, one or more structural relationships between at least one of the one or more agglomerate network circuits and at least one of the one or more connector circuits. The assembly circuit assembles the one or more agglomerate network circuits and the one or more connector circuits based at least in part on the one or more structural relationships.

Embodiments of the current disclosure provide for another method for self-organizing an agglomerate network is provided. The method includes: interpreting, via a scenario interpretation circuit, schedule scenario data; extracting, via a scenario analysis circuit, one or more scenario elements from the schedule scenario data; and identifying, via an architect circuit and based at least in part on the one or more scenario elements, one or more agglomerate network circuits and one or more connector circuits. The method further includes generating, via the architect circuit, agglomerate network architecture data that defines, in part, one or more structural relationships between at least one of the one or more agglomerate network circuits and at least one of the one or more connector circuits; and assemble, via an assembly circuit, the one or more agglomerate network circuits and the one or more connector circuits based at least in part on the one or more structural relationships.

Embodiments of the current disclosure provide for an apparatus for extended horizon scheduling. The apparatus includes a schedule interpretation circuit, an objective interpretation circuit, a horizon objective analysis circuit, and a promotive action provisioning circuit. The schedule interpretation circuit interprets schedule data, the objective interpretation circuit interprets objective data, and the schedule trend analysis circuit extracts a trend from the schedule data. The horizon objective analysis circuit: determines whether the extracted trend furthers or impedes an objective defined, in part, by the objective data, and responsive to a determination that the extracted trend impedes the objective, generates a promotive action command value structured to trigger an adjustment to the schedule data. The adjustment is structured to mitigate the extracted trend from impeding the objective. The promotive action provisioning circuit transmits the promotive action command value.

Embodiments of the current disclosure provide for a method for extended horizon scheduling that includes: interpreting, via a schedule interpretation circuit, schedule data; interpreting, via an objective interpretation circuit, objective data; extracting, via a schedule trend analysis circuit, a trend from the schedule data; determining, via horizon objective analysis circuit, whether the extracted trend furthers or impedes an objective defined, in part, by the objective data; and responsive to a determination that the extracted trend impedes the objective, generating, via the horizon objective analysis circuit, a promotive action command value structured to trigger an adjustment to the schedule data. The adjustment is structured to mitigate the extracted trend from impeding the objective. The method further includes transmitting, via a promotive action provisioning circuit, the promotive action command value.

Embodiments of the current disclosure provide for an agglomerate network for generating schedule data. The agglomerate network includes: a scheduler circuit, a connector circuit, and an extended horizon evaluation circuit. The scheduler circuit is structured to output schedule data. The connector circuit is structured to adjust at least one of an input to the scheduler circuit or the schedule data outputted by the scheduler circuit. The extended horizon evaluation circuit structured to: interpret the schedule data; interpret objective data; extract a trend from the schedule data; determine whether the extracted trend furthers or impedes an objective defined, in part, by the objective data; responsive to a determination that the extracted trend impedes the objective, generate a promotive action command value structured to trigger an adjustment to the connector circuit to effect a change of at least one of the input to the scheduler circuit or the schedule data outputted by the scheduler circuit such that the extracted trend is mitigated from impeding the objective; and transmit the promotive command value.

Embodiments of the current disclosure provide for a non-transitory computer-readable medium storing instructions. The instructions adapt at least one processor to: interpret schedule data; interpret objective data; extract a trend from the schedule data; and determine whether the extracted trend furthers or impedes an objective defined, in part, by the objective data. The stored instructions further adapt the at least one processor to: responsive to a determination that the extracted trend impedes the objective, generate a promotive action command value structured to trigger an adjustment to the schedule data, wherein the adjustment is structured to mitigate the extracted trend from impeding the objective; and transmit the promotive action command value.

Embodiments of the current disclosure provide for another apparatus for extended horizon scheduling. The apparatus includes a schedule interpretation circuit, an objective interpretation circuit, a schedule trend analysis circuit, a horizon objective analysis circuit, and a promotive action provisioning circuit. The schedule interpretation circuit is structured to interpret schedule data. The objective interpretation circuit is structured to interpret objective data. The schedule trend analysis circuit is structured to extract a trend from the schedule data. The horizon objective analysis circuit structured to: interpret a baseline score of the extracted trend, the baseline score corresponding to an objective defined, in part, by the objective data; score the extracted trend with respect to the objective; compare the score to the baseline score to determine a distance between the score and the baseline score, and generate a promotive action command value structured to trigger an adjustment to the schedule data, wherein the adjustment is structured to adjust the schedule data to change the distance. The promotive action provisioning circuit is structured to transmit the promotive action command value.

Embodiments of the current disclosure may provide for a method for extended horizon scheduling. The method includes: interpreting, via a schedule interpretation circuit, schedule data; interpreting, via an objective interpretation circuit, objective data; extracting, via a schedule trend analysis circuit, a trend from the schedule data; and interpreting, via a horizon objective analysis circuit, a baseline score of the extracted trend, the baseline score corresponding to an objective defined, in part, by the objective data. The method further includes: scoring, via the horizon objective analysis circuit, the extracted trend with respect to the objective; comparing, via the horizon objective analysis circuit, the score to the baseline score to determine a distance between the score and the baseline score; and generating, via the horizon objective analysis circuit, a promotive action command value structured to trigger an adjustment to the schedule data, wherein the adjustment is structured to adjust the schedule data to change the distance. The method further includes transmitting, via a promotive action provisioning circuit, the promotive action command value.

Embodiments of the current disclosure provide for a non-transitory computer-readable medium storing instructions. The stored instructions adapt at least one processor to: interpret schedule data; interpret objective data; extract a trend from the schedule data; and interpret a baseline score of the extracted trend, the baseline score corresponding to an objective defined, in part, by the objective data. The stored instructions further adapt the at least one processor to score the extracted trend with respect to the objective; compare the score to the baseline score to determine a distance between the score and the baseline score; and generate a promotive action command value structured to trigger an adjustment to the schedule data, wherein the adjustment is structured to adjust the schedule data to change the distance. The stored instructions further adapt the at least one processor to transmit the promotive action command value.

The present disclosure also relates to devices and methods for adjusting a schedule responsive to a detected or predicted austere event to eliminate or otherwise mitigate the effect of the austere event on the business operation related to the schedule.

In particular, embodiments of the current disclosure provide for an apparatus for scheduling responsive to an austere event. The apparatus includes a schedule interpretation circuit structured to interpret schedule data. The apparatus further includes a mitigation circuit structured to generate, based at least in part on the schedule data and austere event data, a mitigation action command value structured to trigger an adjustment to the schedule data, wherein the adjustment is structured to effect a change of a property of the schedule data to mitigate an effect of an austere event corresponding to the austere event data on one or more entities associated with the schedule data. The apparatus further includes a mitigation action provisioning circuit structured to transmit the mitigation action command value.

Embodiments of the current disclosure also provide for a method for scheduling responsive to an austere event. The method includes: interpreting, via a schedule interpretation circuit, schedule data; generating, via a mitigation circuit and based at least in part on the schedule data and austere event data, a mitigation action command value structured to trigger an adjustment to the schedule data. The adjustment is structured to effect a change of a property of the schedule data to mitigate an effect of an austere event corresponding to the austere event data on one or more entities associated with the schedule data. The method further includes transmitting, via a mitigation action provisioning circuit, the mitigation action command value.

Embodiments of the current disclosure further provide for an agglomerate network that generates schedule data responsive to an austere event. The agglomerate network includes: a scheduler circuit; a connector circuit; and an austere event circuit. The scheduler circuit is structured to output schedule data. The connector circuit is structured to adjust at least one of an input to the scheduler circuit or the schedule data outputted by the scheduler circuit. The austere event circuit is structured to: interpret the schedule data; and generate, based at least in part on the schedule data and austere event data, a mitigation action command value structured to trigger an adjustment to the connector circuit. The adjustment is structured to effect a change of at least one of the input to the scheduler circuit or the schedule data outputted by the scheduler circuit to mitigate an effect of an austere event corresponding to the austere event data on one or more entities associated with the schedule data. The austere event circuit is structured to transmit the mitigation action command value.

Embodiments of the current disclosure further provide for a non-transitory computer-readable medium that stores instructions for generating a schedule responsive to an austere event. The instructions adapt at least one processor to interpret schedule data; and generate, based at least in part on the schedule data and austere event data, a mitigation action command value structured to trigger an adjustment to the schedule data. The adjustment is structured to effect a change of a property of the schedule data to mitigate an effect of an austere event corresponding to the austere event data on one or more entities associated with the schedule data. The instructions further adapt the at least one processor to transmit the mitigation action command value.

Embodiments of the current disclosure further provide for another method for adjusting a schedule responsive to an austere event. The method includes: transmitting, via a local computing device, austere event data to a scheduling platform hosted on one or more remote servers; and accessing, via the local computing device, schedule data generated via the scheduling platform based at least in part on an austere event circuit. The method further includes executing a schedule based at least in part on the schedule data. The schedule is structured to mitigate an effect of an austere event corresponding to the austere event data on one or more entities associated with the schedule data.

Embodiments of the current disclosure provide for a bidding and/or other market-based process for letting workers compete for shifts and for determining insights from market activity, e.g., most favorite shifts, least favorite shifts, preferred shift patterns, etc. Workers may be allotted a currency to bid on and/or "purchase" shifts, and the insights may be used to adjust one or more modules in an agglomerate network. A worker may be an employee, a contractor, a free-lance employee, a temporary employee (such as a travel nurse), and the like. Embodiments may include a schedule warden to detect unfair trade groups, e.g., a circle of friends who only trade among themselves to the advantage of the group and the detriment of others. Embodiments of the marketplace may be used to determine what is a "good" or a "bad" schedule, i.e., "let the market decide." The "good" or "bad" schedules may be used to determine what is a "fair" schedule? Embodiments may seek to balance the benefits of a worker being made available simultaneously in multiple organizations with appropriate privacy controls. In embodiments, shifts (if reoccurring) may be rated by the workers. In embodiments, workers may have properties (viewable to an AI or a manager), where certain shifts are made available to workers based on their properties. In embodiments, different incentives for the same shift may be offered to different workers. In embodiments, differences in offered incentives may be based on worker properties. For example, a high-level or more senior worker may be offered a better incentive than a lower ranked, newer worker. Embodiments may provide for other manners of limiting shifts to particular groups of workers. In embodiments, an AI or a manager may provide feedback regarding a worker's performance of a task, e.g., timeliness, accuracy, etc., which may, in turn, affect the worker's rating. Embodiments of the current disclosure may also provide for workers to sell and/or trade shifts. In embodiments, shifts may only be sold and/or traded to workers who meet the rating and/or other criteria required by the shift, e.g., a task may only be traded to a worker who has the same or higher rating than the currently assigned employee.

Embodiments of the marketplace may be hosted on a server, internal and/or external to a corporation and accessible via remote computing devices, e.g., phones, tables, workstations, etc. One advantage of computerizing the marketplace is the ability to make such a system practical to use by an organization with a large number of tasks and/or workers, e.g., a highly responsive system that won't take longer to handle the offer/bid/acceptance matching process than the actual shift itself.

An example apparatus includes an agglomerate network circuit structured to interpret input data and transmit output data, and a connector circuit structured to bias at least one of the input data prior to interpretation by the agglomerate network circuit or the output data prior to transmission by the agglomerate network circuit.

An example procedure includes operations for interpreting, via an agglomerate network circuit, input data, operations for transmitting, via the agglomerate network circuit, output data, and operations for biasing, via a connector circuit, at least one of the input data prior to interpretation via the agglomerate network circuit or the output data prior to transmission via the agglomerate network circuit.

An example apparatus includes a plurality of agglomerate network circuits each structured to interpret input data and transmit output data, and a plurality of connector circuits each structured to: interpret the output data of a first corresponding agglomerate network circuit of the plurality, bias the interpreted output data, and transmit the biased interpreted output data as the input data of a second corresponding agglomerate network circuit of the plurality.

An example procedure includes operations of interpreting, via a first agglomerate network circuit, first input data, operations of generating, via the first agglomerate network circuit, first output data based at least in part on the first input data, operations of biasing, via a first connector circuit, the first output data, operations of interpreting, via a second agglomerate network circuit, the biased first output data as second input data, operations of generating, via the second agglomerate network circuit, second output data based at least in part on the second input data, operations of biasing, via a second connector circuit, the second output data, operations of interpreting, via a third agglomerate network circuit, the biased second output data as third input data, operations of generating, via the third agglomerate network circuit, third output data based at least in part on the third input data, and operations of transmitting the third output data.

An example non-transitory computer-readable medium includes stored instructions that adapt at least one processor to: interpret, via a first agglomerate network circuit, first input data, generate, via the first agglomerate network circuit, first output data based at least in part on the first input data, bias, via a first connector circuit, the first output data, interpret, via a second agglomerate network circuit, the biased first output data as second input data, generate, via the second agglomerate network circuit, second output data based at least in part on the second input data, bias, via a second connector circuit, the second output data, interpret, via a third agglomerate network circuit, the biased second output data as third input data, generate, via the third agglomerate network circuit, third output data based at least in part on the third input data, and transmit the third output data.

An example apparatus includes an agglomerate network circuit structured to interpret input data and transmit output data, and a connector circuit structured to: receive biasing parameters for the input data, categorize the input data based on types of biases that can be applied to the input data, map biasing parameters to the categorized input data, and bias the input data based on the mapping.

An example apparatus includes an agglomerate network circuit structured to receive input data, a bias interpretation circuit structured to receive biasing parameters for the input data, a categorizing circuit structured to categorize the input data based on types of biases that can be applied, a mapping circuit structured to map the biasing parameters to the categorized input data, and a biasing circuit structured to bias at least one of the input data based on the mapping, wherein the agglomerate network circuit is further structured to transmit the biased input data.

An example apparatus includes an agglomerate network circuit structured to receive input data, a bias interpretation circuit structured to receive biasing parameters for the input data, a mapping circuit structured to map the biasing parameters to the input data, a biasing methodology circuit structured to determine a biasing method based on the mapping, and a biasing circuit structured to bias, using the determined biasing method, the input data based on the mapping, wherein the agglomerate network circuit is further structured to transmit the biased input data.

An example apparatus includes an agglomerate network circuit structured to receive input data, perform manipulations on the data and generate output data, a bias interpretation circuit structured to receive biasing parameters for the output data, a mapping circuit structured to modify input data and identify correlations between input modifications and changes to the output data, and a biasing circuit structured to iteratively trigger different input data modifications at the mapping circuit and identify input data modifications that result in desired biasing parameters for the output data.

An example procedure includes operations of receiving, via an agglomerate network circuit, input data, receiving biasing parameters for the input data, categorizing the input data based on types of biases that can be applied, mapping biasing parameters to the categorized input data, biasing, at least one of the input data based on the mapping, and transmitting, via the agglomerate network circuit, the biased input data.

An example procedure includes operations of receiving, via an agglomerate network circuit, input data, receiving biasing parameters for the input data, mapping biasing parameters to the input data, determining biasing methods based on the mapping, biasing, using the determined biasing methods, the input data based on the mapping, and transmitting, via the agglomerate network circuit, the biased input data.

An example non-transitory computer-readable medium stores instructions that adapt at least one processor to receive input data, receive biasing parameters for the input data, categorize the input data based on types of biases that can be applied, map the biasing parameters to the categorized input data, bias the input data based on the mapping, and transmit the biased input data.

An example non-transitory computer-readable medium stores instructions that adapt at least one processor to receive input data, receive biasing parameters for the input data, map the biasing parameters to the input data, determine a biasing method based on the mapping, bias, using the determined biasing method, the input data based on the mapping, and transmit the biased input data.

An example agglomerate network for generating schedule data includes a scheduler circuit structured to output a first schedule data, a first module structured to apply a first bias to the first schedule data and generate second schedule data, a second module structured to receive the second schedule data from the first module and structured to manipulate the second schedule data and generate third schedule data, where the manipulation includes applying a second bias to the third schedule data, a bias monitoring module structured to monitor the first bias and the second bias and identify conflicting elements of the first and second biases, and a connector circuit structured to adjust, responsive to identifying conflicting bias parameters of at least one of the scheduler circuit, the first module, or the second module to resolve the conflicting biases.

An example apparatus includes a first module configured to apply a first bias to first data to generate second data, a second module configured to receive the second data and configured to apply a second bias to the second data, a first bias monitoring module configured to calculate a combined bias score based at least in part on the first bias and the second bias, a bias adjustment circuit configured to determine that the combined bias score is above a threshold value and adjust the second bias, and a bias notification circuit structured to transmit an indication that the combined bias score was determined to be above the threshold value.

An example procedure includes operations for propagating data from a first module to a second module, propagating an indication of a first bias applied to the data from the first module to the second module, applying a second bias at the second module, computing a combined bias score based on the first bias and the second bias, determining that the combined bias score is above a bias threshold value, and transmitting an indication to the first module of the bias threshold value.

An example procedure includes operations for propagating data from a first module to a second module, applying a first bias to the data at the first module, applying a second bias to the data at the second module, monitoring a combined bias that is based at least in part on the first bias and the second bias, determining that the combined bias is less than the first bias or the second bias; and adjusting at least one of the first bias or the second bias to reduce a magnitude of the combined bias.

In embodiments, a schedule spreader may be used to make and/or recommend changes to a schedule based on beneficial changes to a schedule of another department within an organization and/or across organizations.

Accordingly, embodiments of the current disclosure provide for an apparatus for schedule spreading. The apparatus includes a schedule interpretation circuit, a schedule adjustment circuit, a spread command circuit, and a spread command provisioning circuit. The schedule interpretation circuit is structured to interpret schedule data. Further, the schedule adjustment circuit is structured to maintain a list of recommended schedule adjustments. Each recommended schedule adjustment corresponds to one of a plurality of schedule parameters. The schedule parameters of the list of recommended schedule adjustments are referred to as the first schedule parameters. It will be understood that the list of recommended schedule adjustments may include one or more schedule parameters. The schedule adjustment circuit analyzes the schedule data and identifies a schedule parameter referred to as a second schedule parameter. Further, the schedule adjustment circuit identifies a recommended schedule adjustment from the list of recommended schedule adjustments. The identification is performed by matching the second schedule parameter to one of the plurality of the first schedule parameters. The one of the plurality of first schedule parameters corresponds to the recommended schedule adjustment. The spread command circuit is structured to generate a spread command value structured to trigger a change in the schedule data. The spread command circuit operates in response to the identified recommended schedule adjustment performed by the schedule adjustment circuit. The change in the schedule data includes adjusting the schedule data according to the recommended schedule adjustment. The spread command provisioning circuit is structured to transmit the spread command value.

Embodiments of the current disclosure also provide for a method for schedule spreading. The method includes interpreting, via a schedule interpretation circuit, schedule data. The method also includes maintaining a list of recommended schedule adjustments via a schedule adjustment circuit. Each recommended schedule adjustment corresponds to one of a plurality of first schedule parameters. Further, the method includes analyzing, via the schedule adjustment circuit, the schedule data to identify a second schedule parameter. The method includes identifying, via the schedule adjustment circuit, a recommended schedule adjustment from the list via matching the second schedule parameter to one of the plurality of first schedule parameters corresponding to the recommended schedule adjustment. The method includes generating, via a spread command circuit, responsive to the identified recommended schedule adjustment, a spread command value structured to trigger a change to the schedule data. The change includes adjusting the schedule data according to the recommended schedule adjustment. The method includes transmitting, via a spread command provisioning circuit, the spread command value.

Another embodiment is an agglomerate network. The agglomerate network for generating schedule data includes a scheduler circuit structured to output the schedule data; a connector circuit structured to adjust at least one of input to the scheduler circuit or the schedule data outputted by the scheduler circuit. The agglomerate network also includes a schedule spreader circuit structured to maintain a list of recommended schedule adjustments. Each recommended schedule adjustment corresponds to one of a plurality of first schedule parameters. Further, the agglomerate network may provide for analyzing the schedule data to identify a second schedule. The agglomerate network may also provide for identifying a recommended schedule adjustment from the list via matching the second schedule parameter to one of the plurality of first schedule parameters corresponding to the recommended schedule adjustment. Responsive to the identified recommended schedule adjustment, the agglomerate network may further provide for generating a spread command value structured to trigger a change to the schedule data. The change to the schedule data includes adjusting the connector circuit according to the recommended schedule adjustment. Further, the agglomerate network may provide for transmitting of the spread command value.

Embodiments of the current disclosure provide for an apparatus that includes a plurality of agglomerate network circuits and a plurality of connector circuits. The plurality of agglomerate network circuits are each structured to interpret input data and transmit output data. The plurality of connector circuits are each structured to: interpret the output data of a corresponding agglomerate network circuit of the plurality, and execute a connector action based at least in part on the interpreted output data. The connector action performed by at least one of the connector circuits of the plurality at least one of: propagates the output data of a first agglomerate network circuit of the plurality as the input data of a second agglomerate network circuit of the plurality, biases the output data of an agglomerate network circuit of the plurality, realigns the output data of an agglomerate network circuit of the plurality, weights the outputs of at least two agglomerate network circuits of the plurality, or propagates a confidence value, corresponding to the output data generated by a first agglomerate network circuit of the plurality, to a second agglomerate network circuit of the plurality with the corresponding output data.

Embodiments of the current disclosure provide for a method that includes generating schedule data via a plurality of agglomerate network circuits each structured to: interpret input data, and generate output data based at least in part in the interpreted input data. The method further includes executing a plurality of connector actions via one or more connector circuits. The plurality of connector actions effect generation of the schedule data and include at least one of: propagating the output data of a first agglomerate network circuit of the plurality as the input data of a second agglomerate network circuits of the plurality, biasing the output data of an agglomerate network circuit of the plurality, realigning the output data of an agglomerate network circuit of the plurality to be within an acceptable range, weighting the outputs of at least two agglomerate network circuits of the plurality, or propagating a confidence value, corresponding to the output data generated by a first agglomerate network circuit of the plurality, to a second agglomerate network circuit of the plurality with the corresponding output data. The method further includes transmitting the schedule data.

Embodiments of the current disclosure provide for a non-transitory computer-readable medium storing instructions. The stored instructions adapt at least one processor to: generate schedule data via a plurality of models each structured to: interpret input data and generate output data based at least in part on the interpreted input data. The stored instructions further adapt the at least one processor to execute a plurality of connector actions via one or more connector circuits. At least one of the connector actions of the plurality at least one of: propagates the output data of a model of the plurality as the input data of a second model of the plurality, biases the output data of a model of the plurality, realigns the output data of a model of the plurality to be within an acceptable range, weights the outputs of at least two models of the plurality, or propagates a confidence value, corresponding to the output data generated by a first model of the plurality, to a second model of the plurality with the corresponding output data. The stored instructions further adapt the at least one processor to transmit the schedule data.

Embodiments of the current disclosure provide for an apparatus that includes a plurality of agglomerate network circuits and a plurality of connector circuits. The plurality of agglomerate network circuits is structured to generate schedule data. The plurality of connector circuits is structured to propagate data between each of the plurality of agglomerate network circuits. The plurality of agglomerate network circuits includes a scheduler. At least one of the plurality of connector circuits is structured to adjust at least one of input data to at least one of the plurality of agglomerate network circuits or output data from the at least one of the plurality of agglomerate network circuits.

Embodiments of the current disclosure provide for apparatuses, methods, and networks for adjusting an architecture of an agglomerate scheduling network by determining when a new connection, structure, data, bias, and the like should be introduced into the network. Embodiments may use historic data, e.g., the inputs for a given scheduling scenario, the configuration of the agglomerate scheduling network used, the precited results, and/or actual results to generate an agglomerate network model. In embodiments, experiments may be run on the model to see if proposed changes to the network might result in improved performance metrics prior to deployment of any changes to the network.

In embodiments, outputs of modules correlated to anomalies in scheduling may be identified, and a determination may be made regarding whether the network would benefit from the introduction of a module. If yes, where the module should be included, another determination may be made as to how the module would affect the biases of other connectors. Example metrics to detect outputs that correlate to anomalies in scheduling may include: a percentage of employee goals achieved under an assigned manager, an amount of sales, an attendance rate, a turnover rate, and the like. Different configurations for a new network may be tested to determine what configuration may improve results.

An embodiment of an apparatus may include a historic data processing circuit to interpret historic schedule performance data including historic schedule data and performance metrics corresponding to the historic schedule data. The example apparatus may further include a network architecture processing circuit to interpret network architecture data that describes properties of an agglomerate network that generates schedule data. A resolution analysis circuit may generate an adjustment command value partially based on the interpreted historic schedule performance data and the interpreted network architecture data. An adjustment provisioning circuit may transmit the adjustment command value, where the adjustment command value to adjust the agglomerate network in order to improve performance metric of the agglomerate network by effecting an adjustment to the agglomerate network.

An embodiment of an agglomerate network for generating schedule data may include a plurality of agglomerate network circuits to generate schedule data and a connector circuit to propagate data between at least two of the plurality of agglomerate network circuits. The agglomerate network may further include a resolution determiner circuit to interpret historical performance data and network architecture data and generate, based at least in part on the historical performance data and the network architecture data, an adjustment command value structured to affect an adjustment to the agglomerate network to improve a performance metric. The resolution determiner circuit may further transmit the adjustment command value.

An embodiment of method for generating schedule data may include interpreting historic schedule performance data, wherein the historic schedule performance data includes historic schedule data and corresponding performance metrics. The method may further include interpreting current network architecture data, wherein the current network architecture data includes a property of an agglomerate network. The method may further include generating, based at least in part on the historic schedule performance data and the network architecture data, an adjustment command value structured to affect an adjustment to the current agglomerate network to improve a performance metric of the current agglomerate network, and transmitting the adjustment command value.

An embodiment of a non-transitory computer-readable medium, as disclosed herein, may store instructions that adapt at least one processor to interpret historic schedule performance data, wherein the historic schedule performance data includes historic schedule data and a historic performance metric corresponding to the historic schedule data, and interpret network architecture data, wherein the network architecture data includes a property of an agglomerate network. The processor may be further adapted to generate, based at least in part on the historic schedule performance data and the network architecture data, an adjustment command value structured to affect an adjustment to the agglomerate network to improve a performance metric of the agglomerate network, and transmit the adjustment command value.

In embodiments, scheduling modules may each generate a plurality of initial schedules. The schedules may then be evaluated and/or propagated in an agglomerate network to determine which is the best schedule or to determine a schedule that meets desired criteria. The number and/or type of schedules generated by each module may be fixed and/or may be dynamically or algorithmically determined. In some embodiments, the modules may be configured to generate schedules that provide a variety of different schedules or a top number of schedules. In embodiments, the scheduling modules may be configured to generate a threshold number of schedules based on previous selections of schedules. The threshold number may be determined by first generating a first number of schedules, for example, ten (10) schedules, and then identifying which of the first number of schedules is selected by the agglomerate network. If the selected schedule were at a first threshold number of the generated schedules, for example, if the selected schedule were the ninth or tenth generated schedule, e.g., out of the ten schedules, the threshold number of schedules may be increased to a second threshold number of generated schedules, for example, fifteen (15) schedules. If the selected schedule were the first of the second threshold number of generated schedules, the threshold number of schedules may be decreased, for example, to five (5) schedules. The process of adjusting the threshold number of generated schedules may be periodically or continuously adjusted to reduce unnecessary computations, while still providing enough schedules to find a suitable schedule.

Certain further aspects of the example apparatus are described herein, any one or more of which may be present in certain embodiments.

BRIEF DESCRIPTION OF THE FIGURES

FIG. 120 is another flowchart of the method of FIG. 119, in accordance with embodiments of the current disclosure;

FIG. 121 is a schematic diagram depicting an austere event scheduling apparatus, in accordance with embodiments of the current disclosure;

FIG. 122 is a block diagram depicting another austere event scheduling apparatus, in accordance with embodiments of the current disclosure;

FIG. 123 is a flowchart depicting a method for adjusting a schedule responsive to an austere event, in accordance with embodiments of the current disclosure;

FIG. 124 is a flowchart depicting another method for adjusting a schedule responsive to an austere event, in accordance with embodiments of the current disclosure;

FIG. 125 is a schematic diagram depicting an agglomerate network for generating schedule data which includes an austere event circuit, in accordance with embodiments of the current disclosure;

FIG. 126 is a schematic diagram depicting further aspects of the agglomerate network of FIG. 125, in accordance with embodiments of the current disclosure;

FIG. 127 is a block diagram of a non-transitory computer-readable medium that stores instructions that adapt at least one processor to interpret and adjust schedule data responsive to an austere event, in accordance with embodiments of the current disclosure;

FIG. 128 is a block diagram depicting further aspects of the non-transitory computer-readable medium of FIG. 127, in accordance with embodiments of the current disclosure;

FIG. 129 is a flowchart depicting yet another method of adjusting a schedule responsive to an austere event, in accordance with embodiments of the current disclosure;

FIG. 130 is a flowchart depicting further aspects of the method of FIG. 129, in accordance with embodiments of the current disclosure;

FIG. 131 depicts an apparatus for enabling workers compete for upcoming shifts, in accordance with embodiments of the current disclosure;

Figure 132:
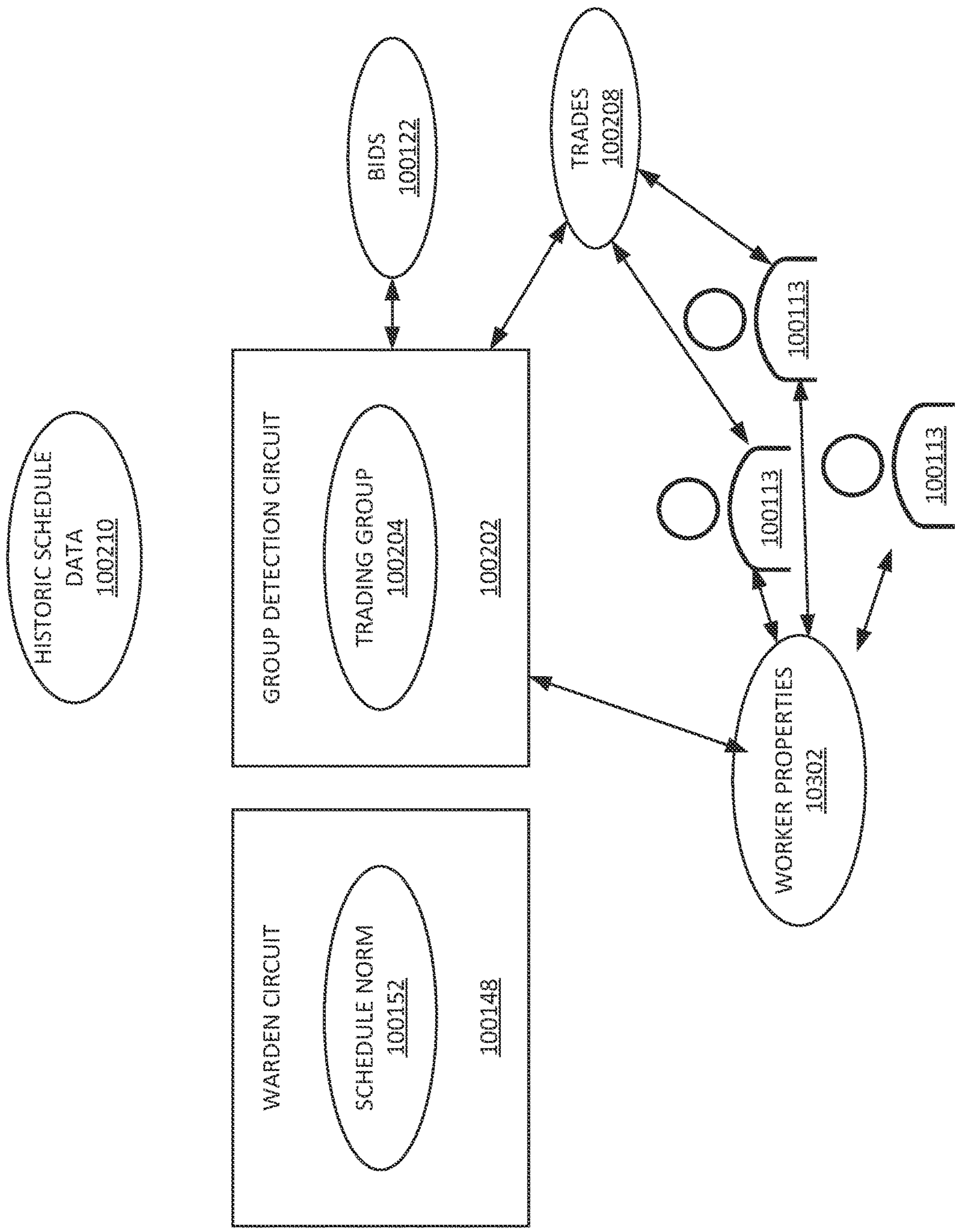
Figure 133:
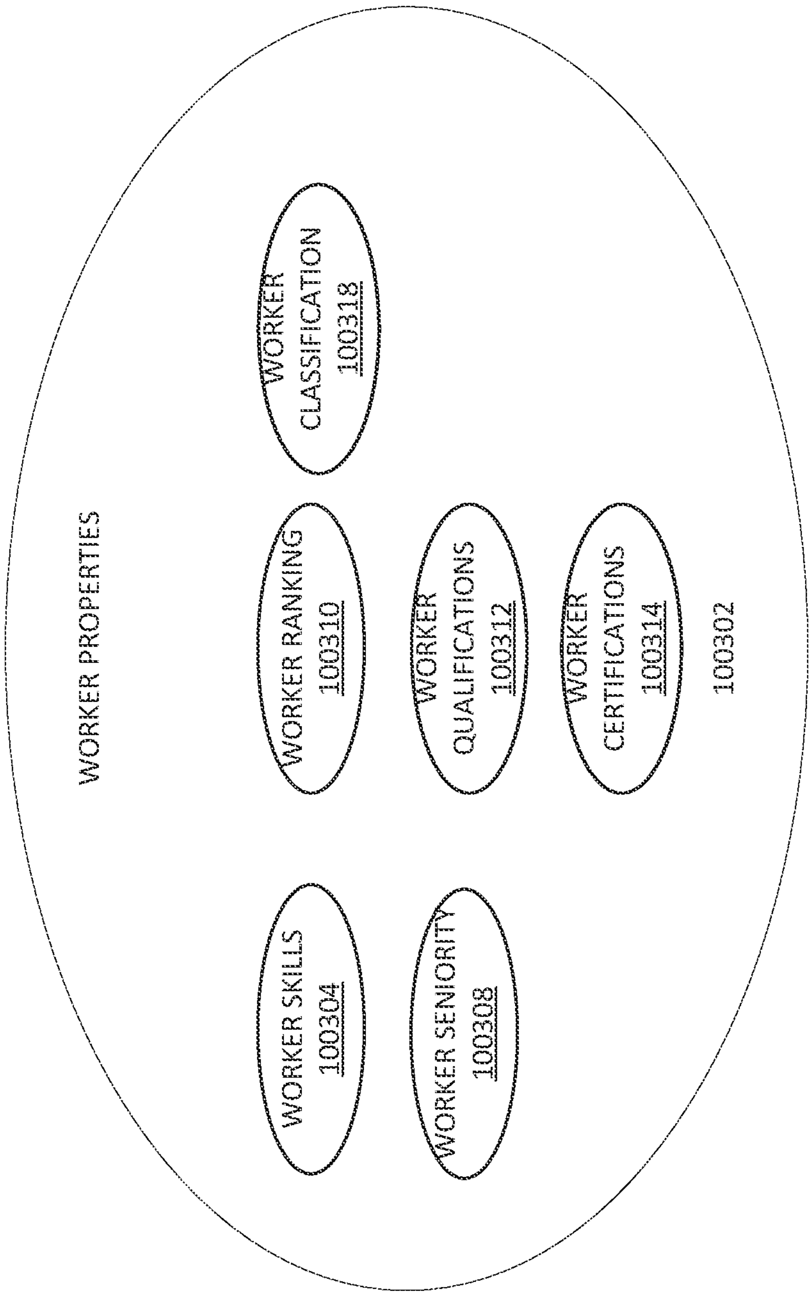
Figure 134:
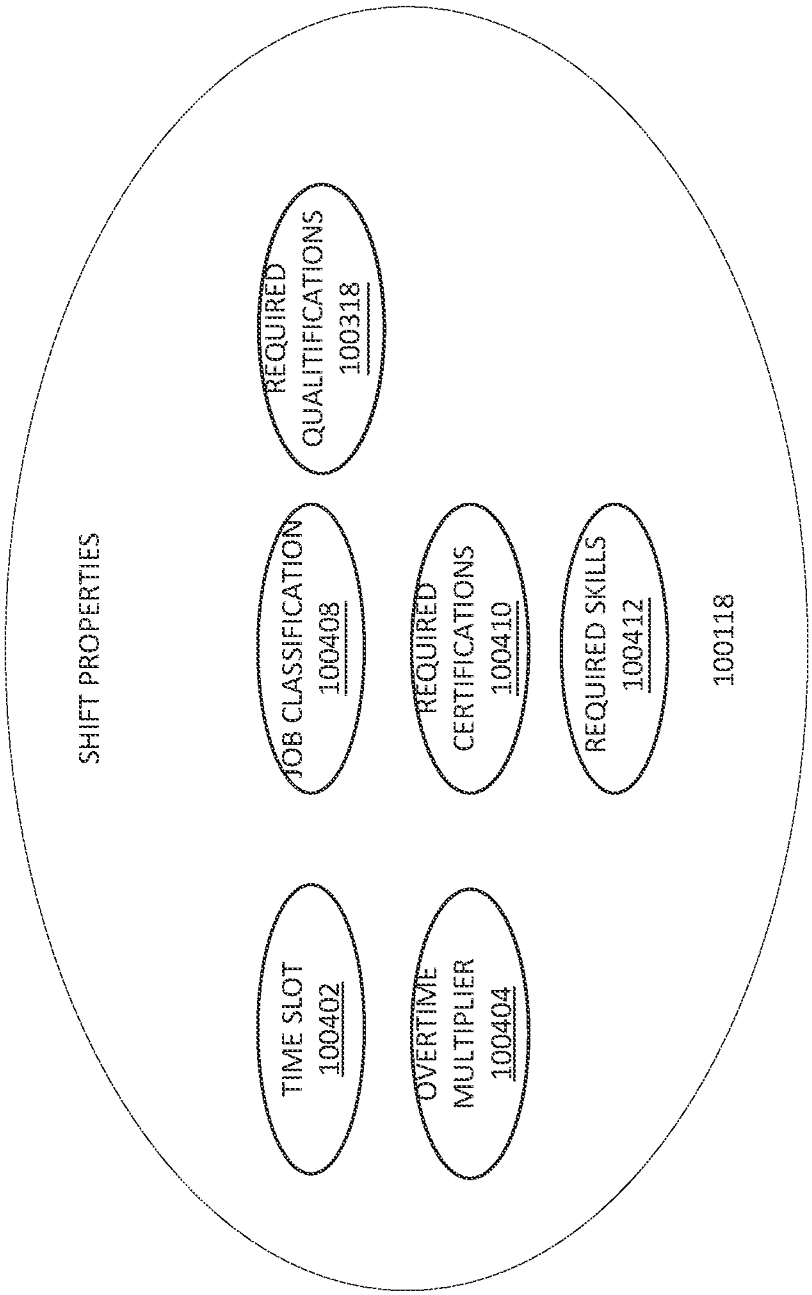
Figure 135:
Figure 136:
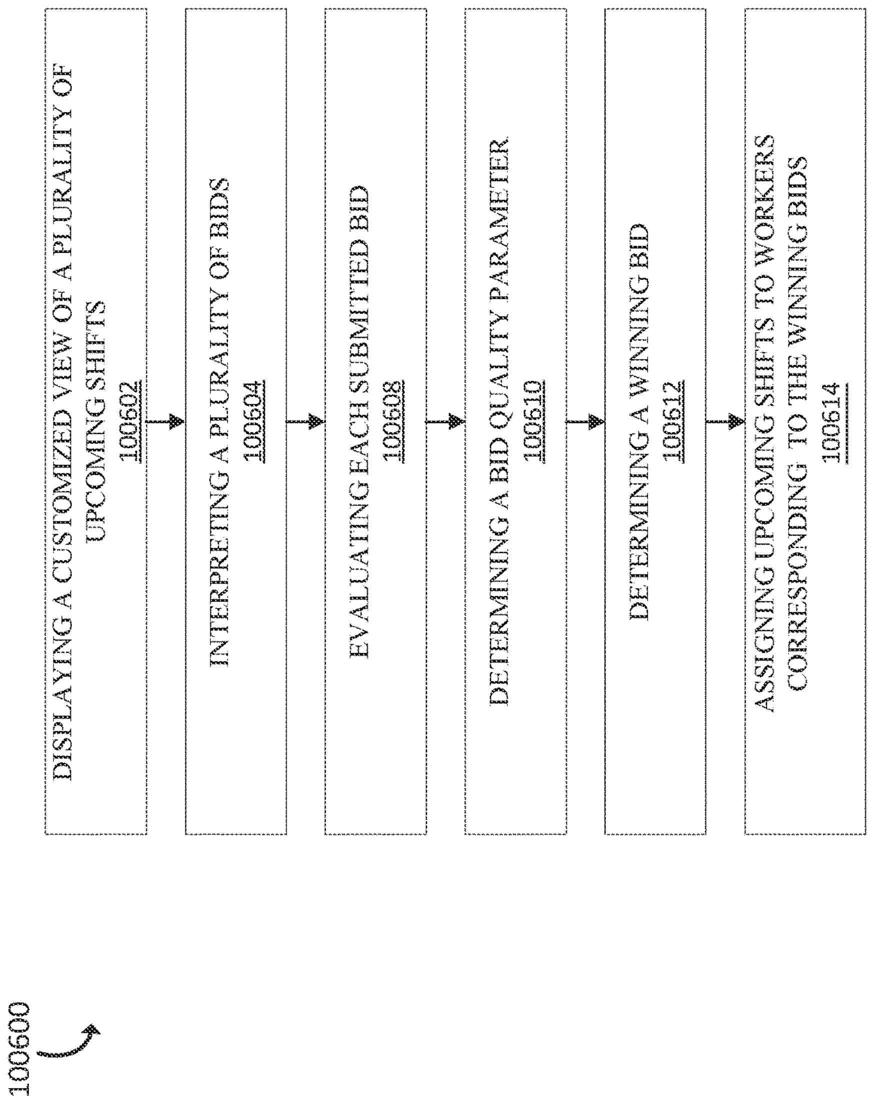
Figure 137:
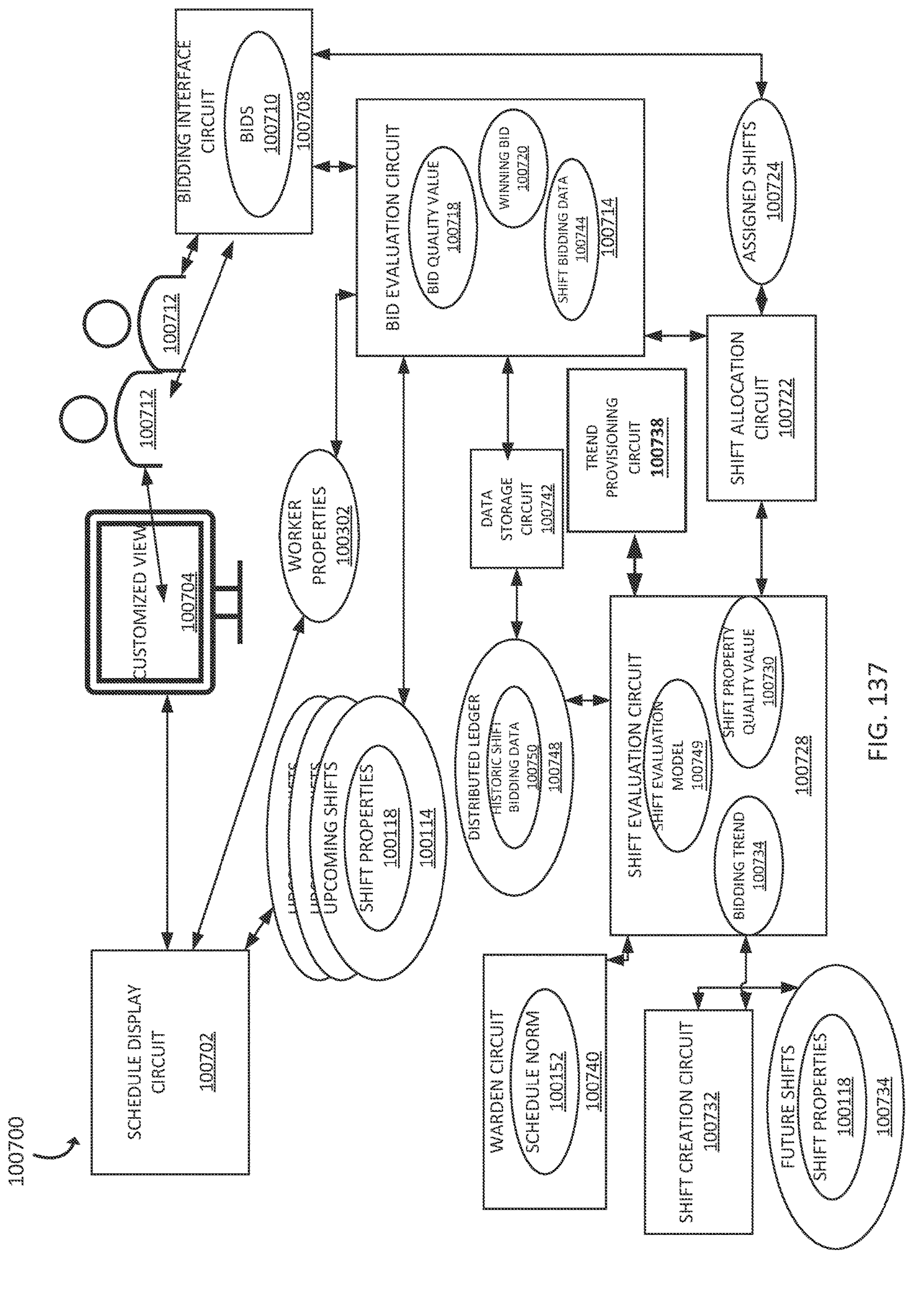
Figure 138:
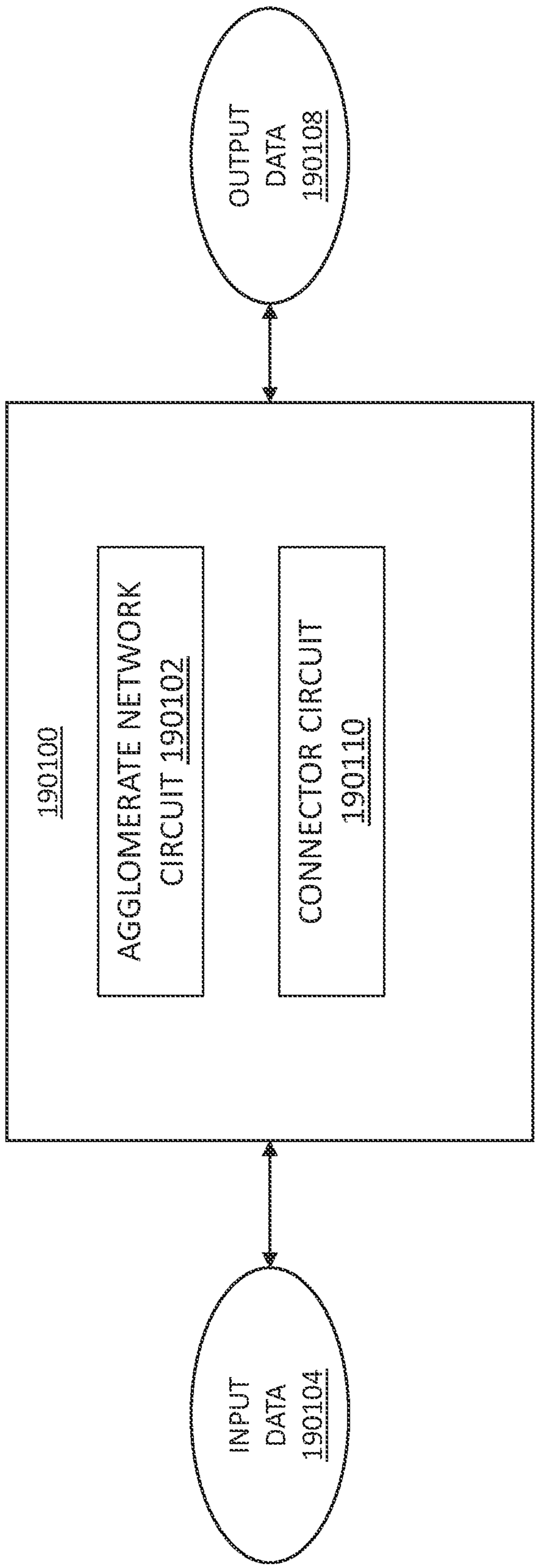
Figure 139:
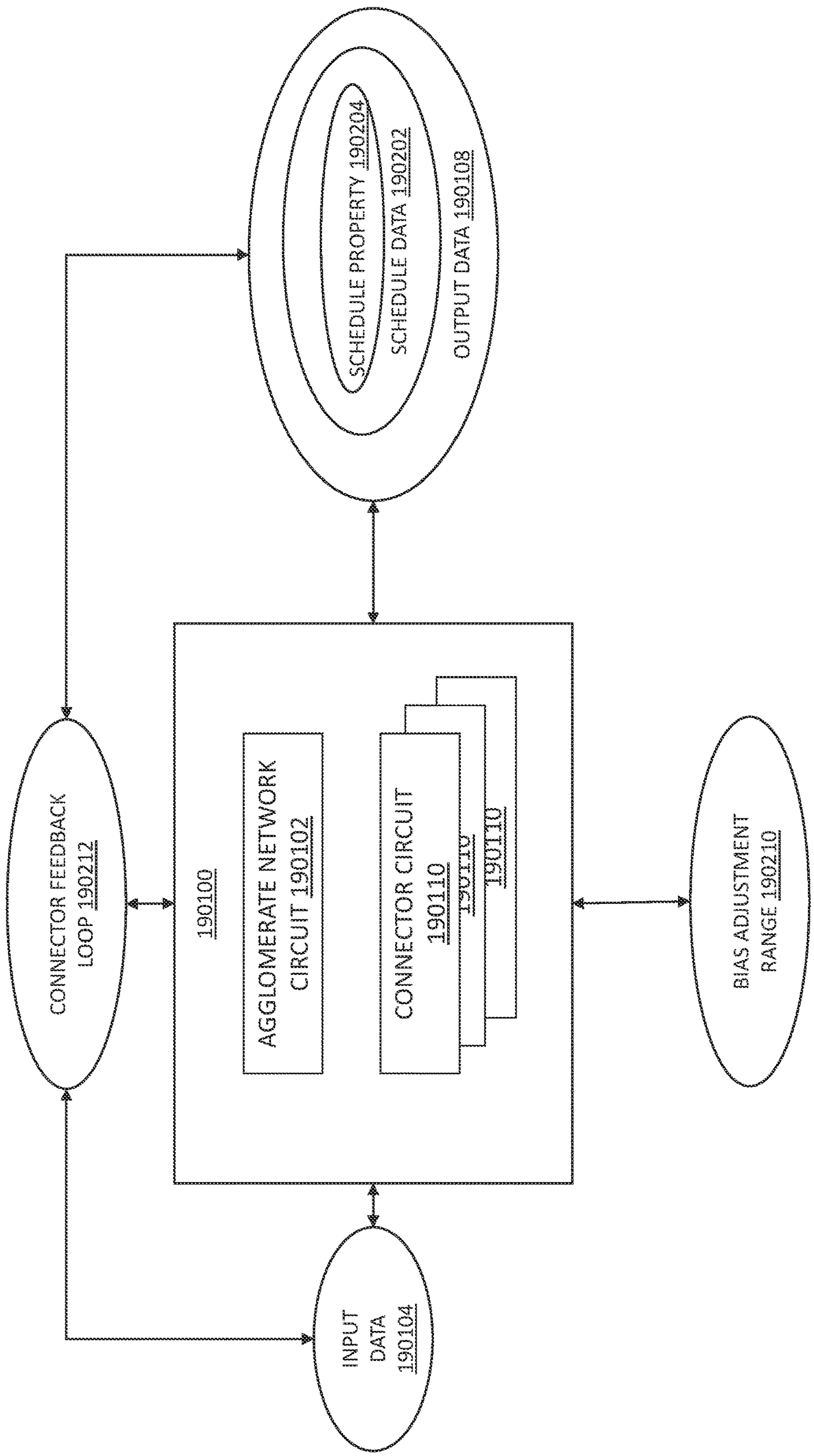
Figure 140:
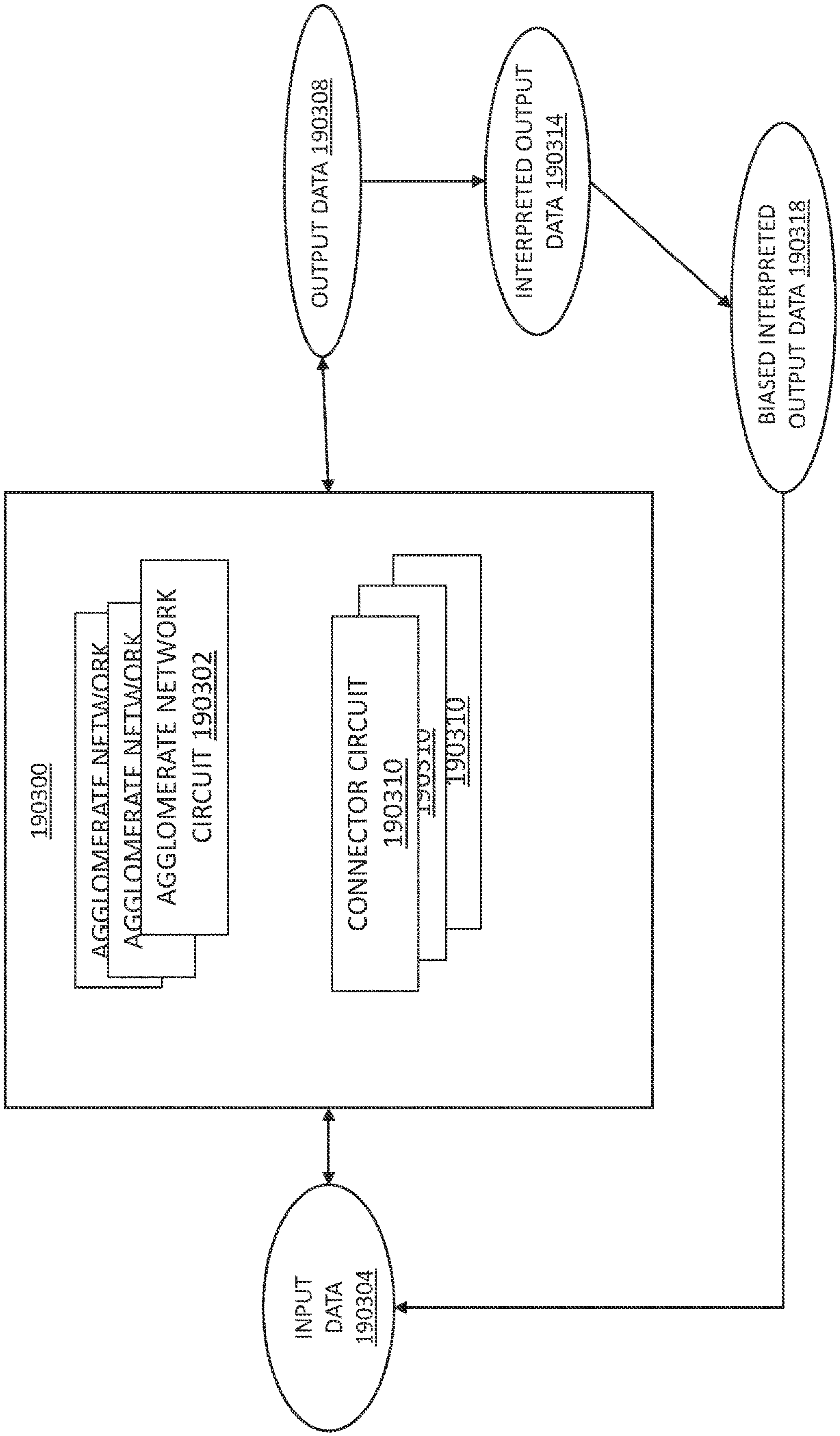
Figure 141:
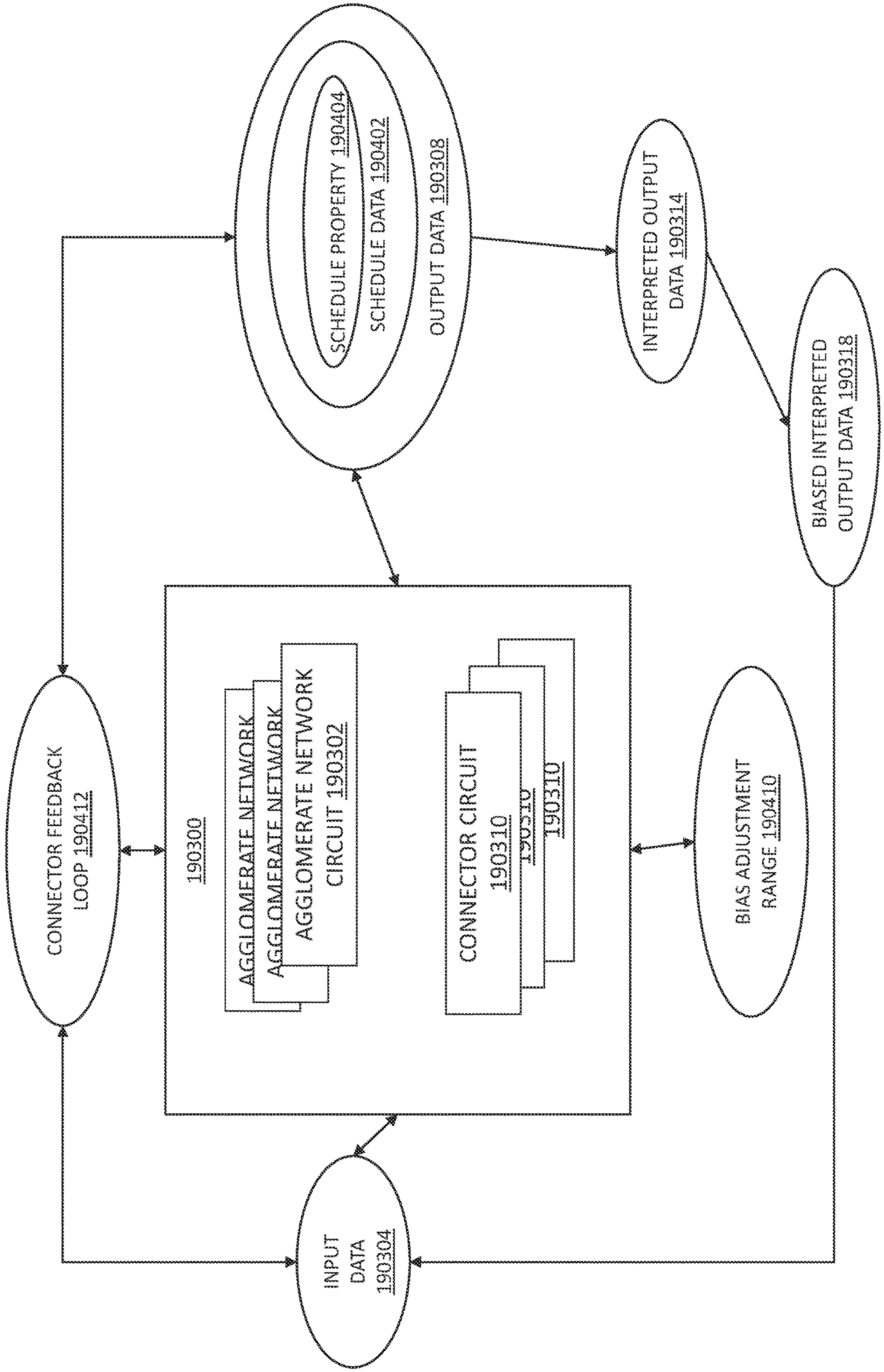
Figure 142:
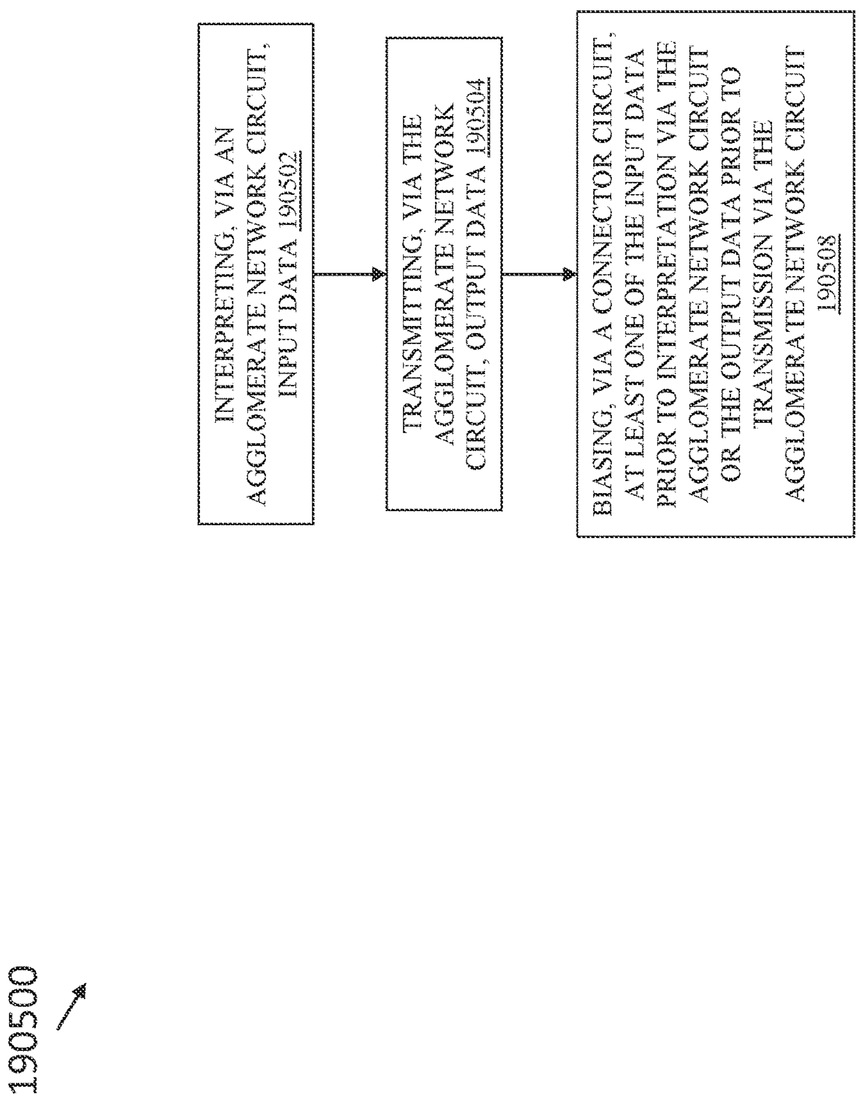
Figure 143:
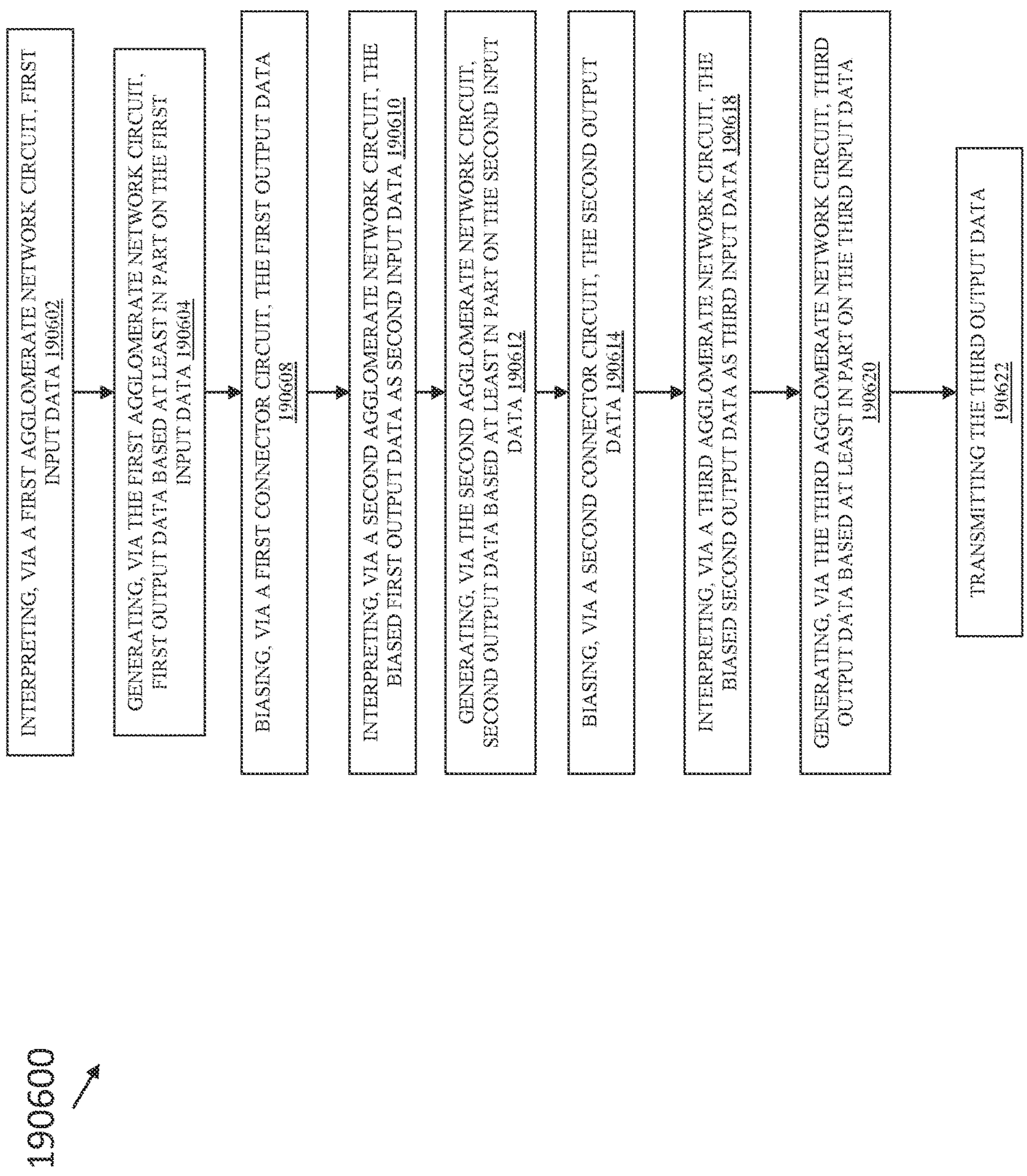
Figure 144:
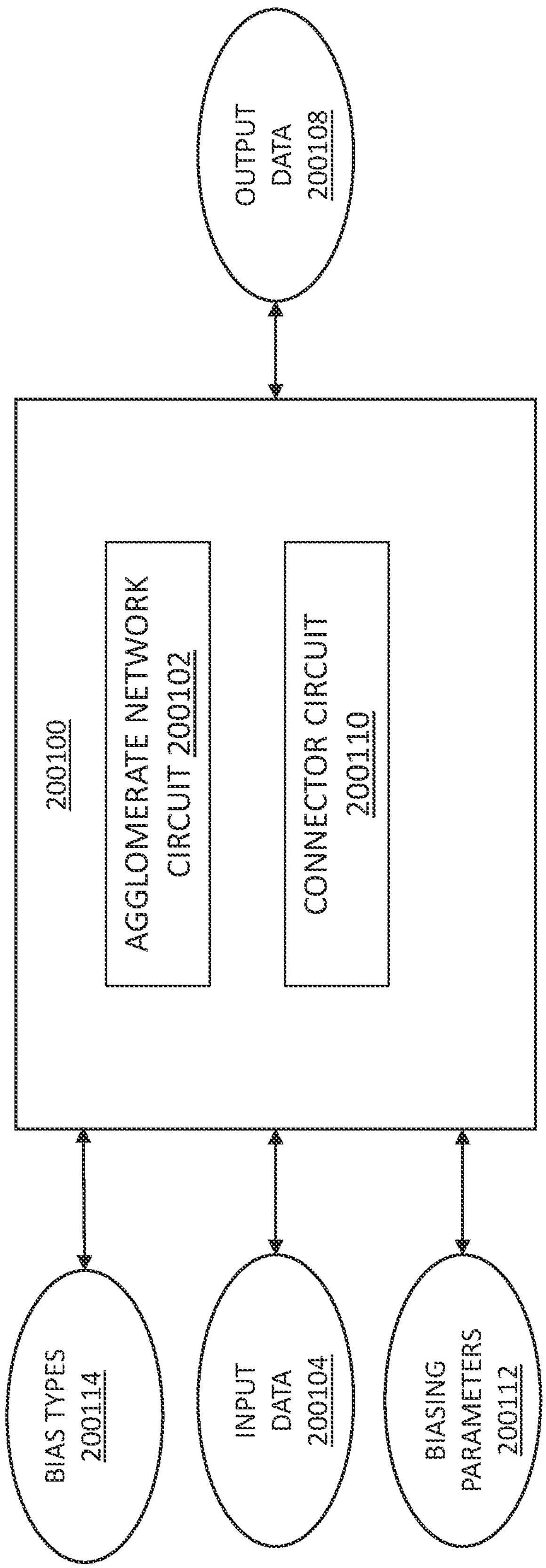
Figure 145:
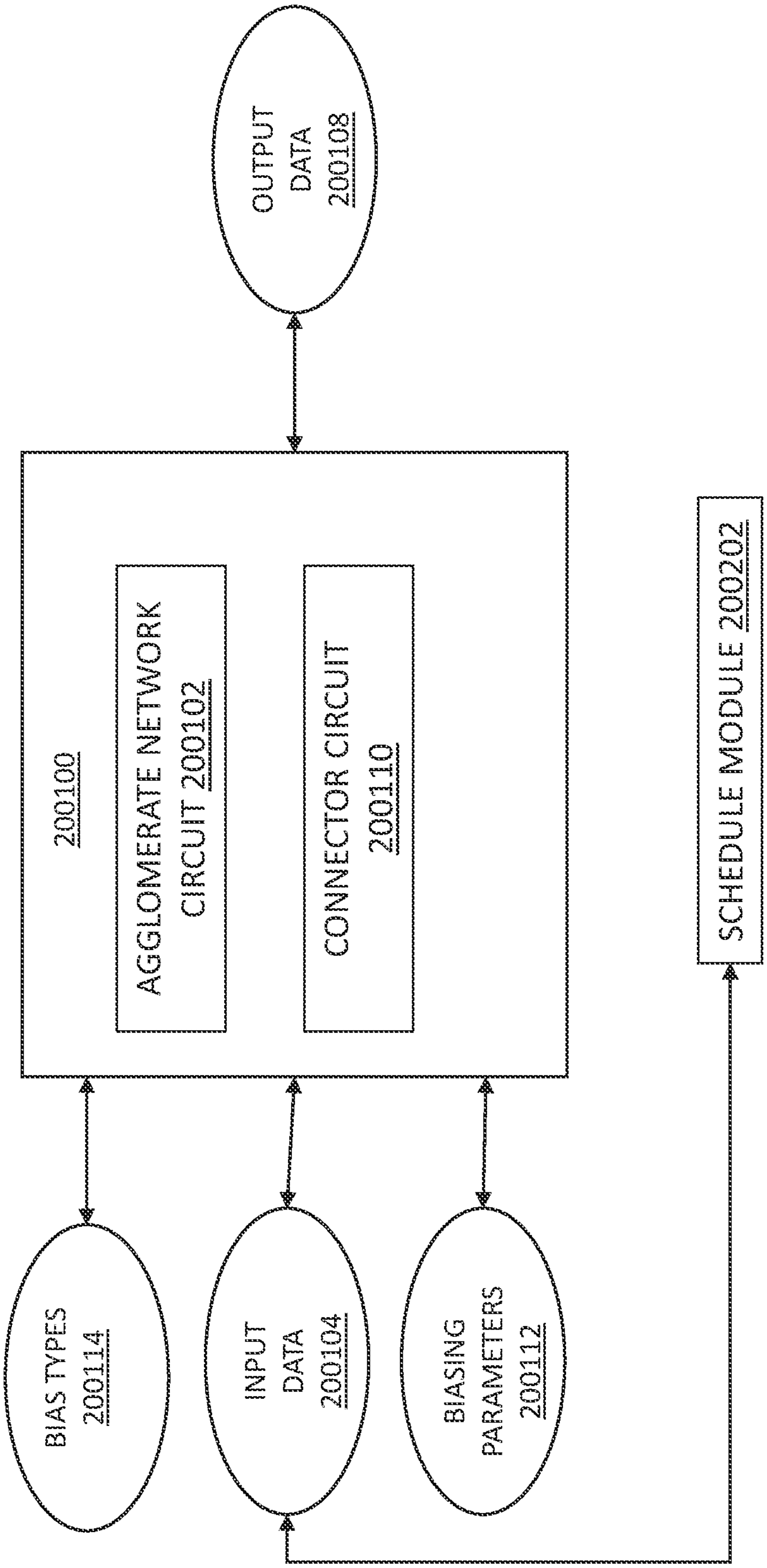
Figure 146:
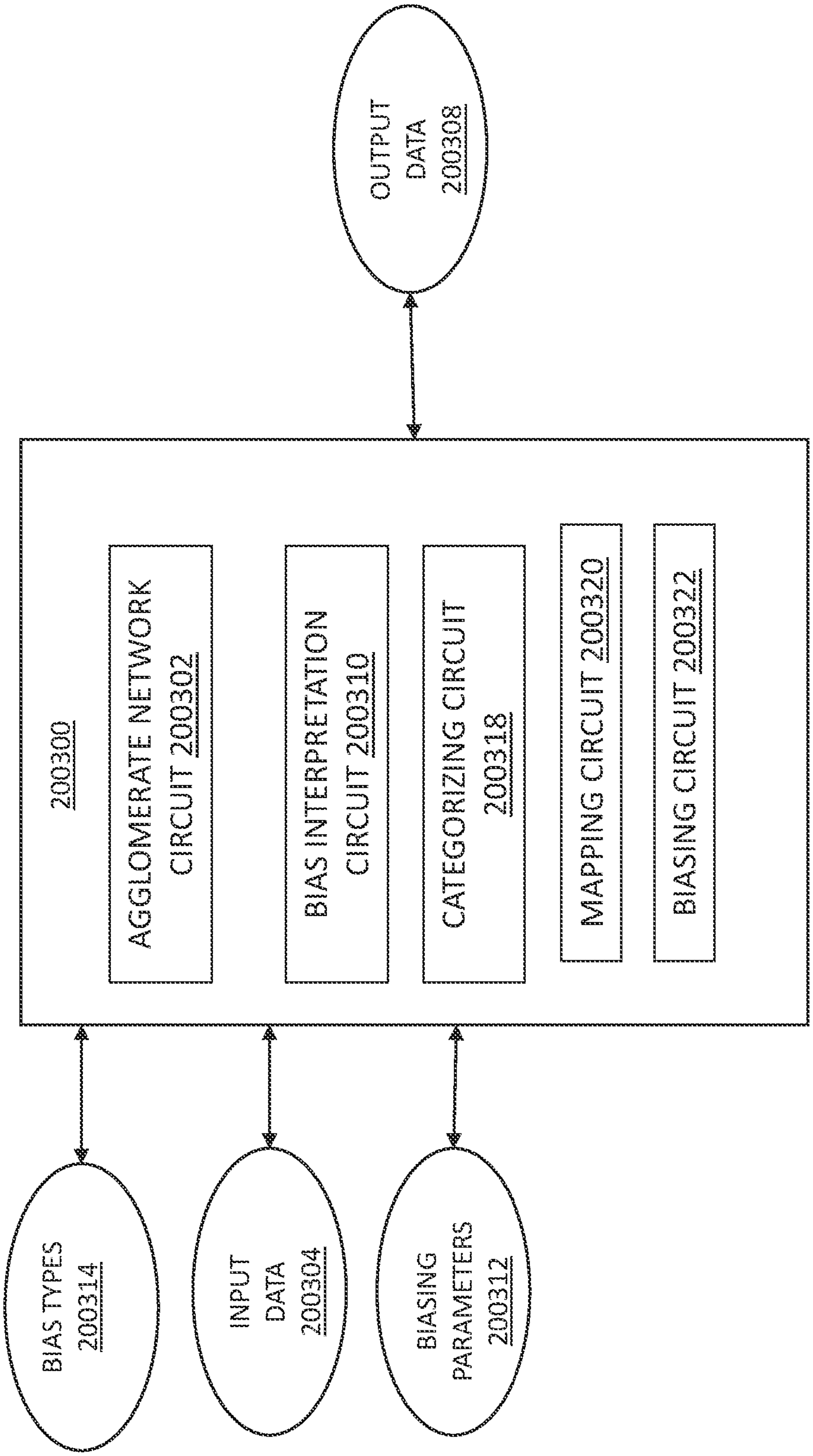
Figure 147:
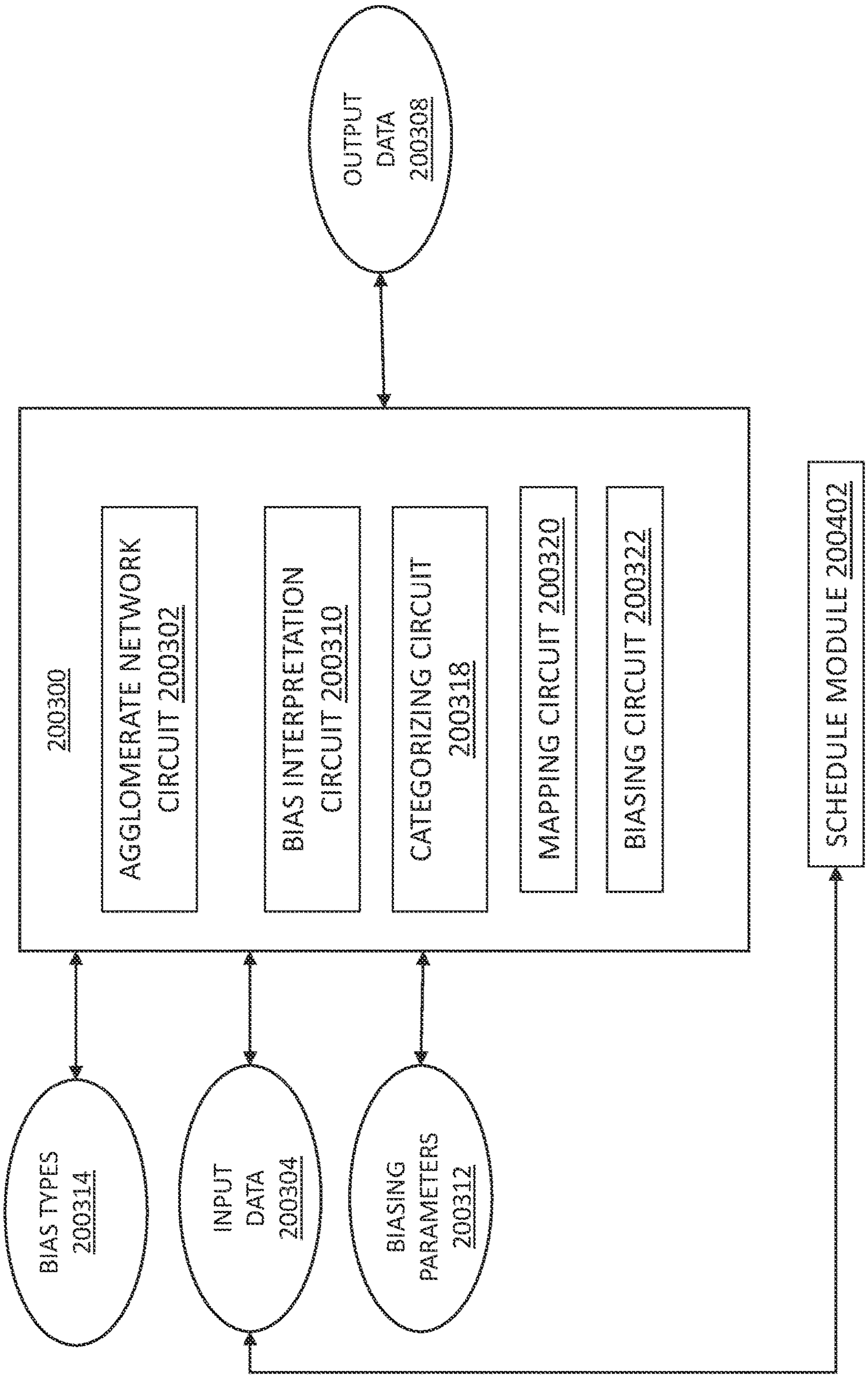
Figure 148:
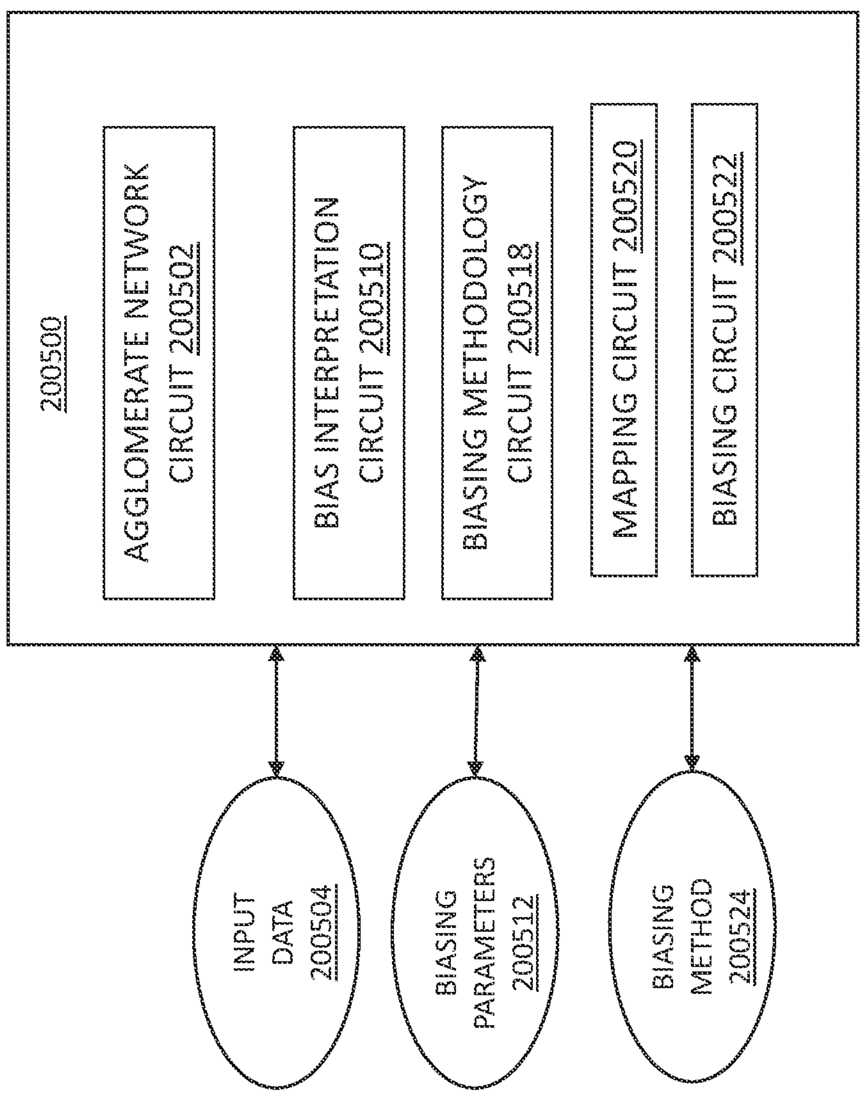
Figure 149:
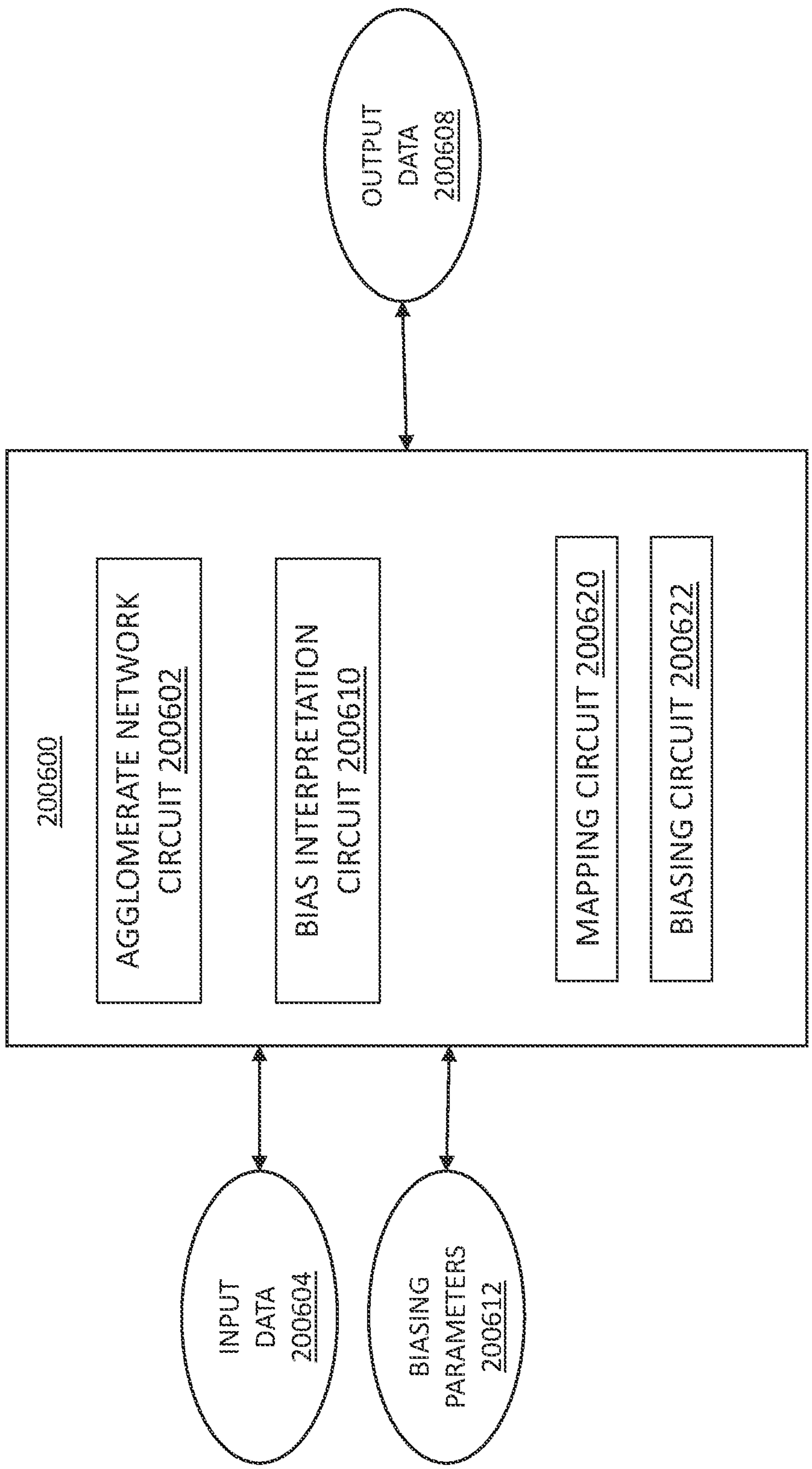
Figure 150:
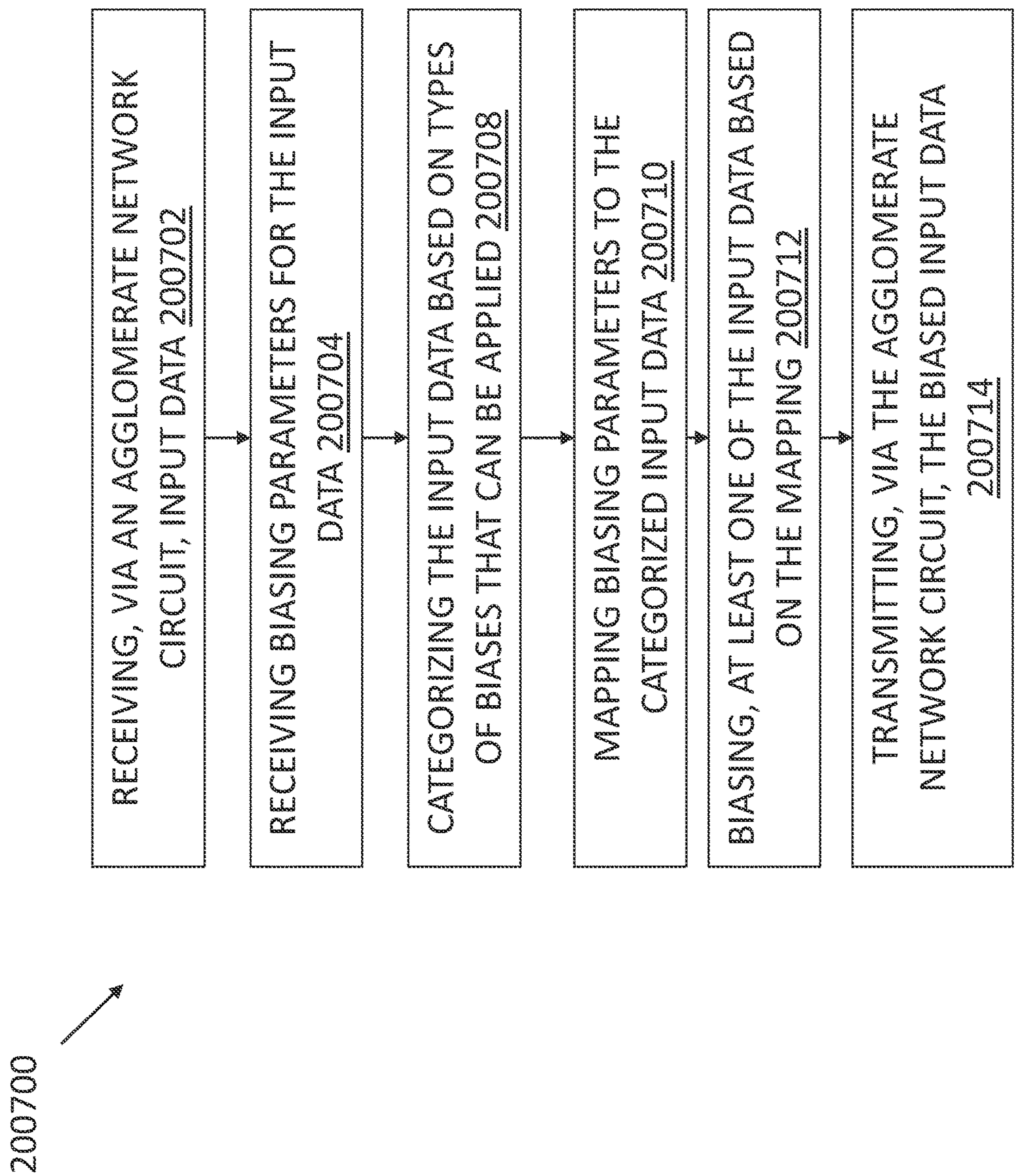
Figure 151:
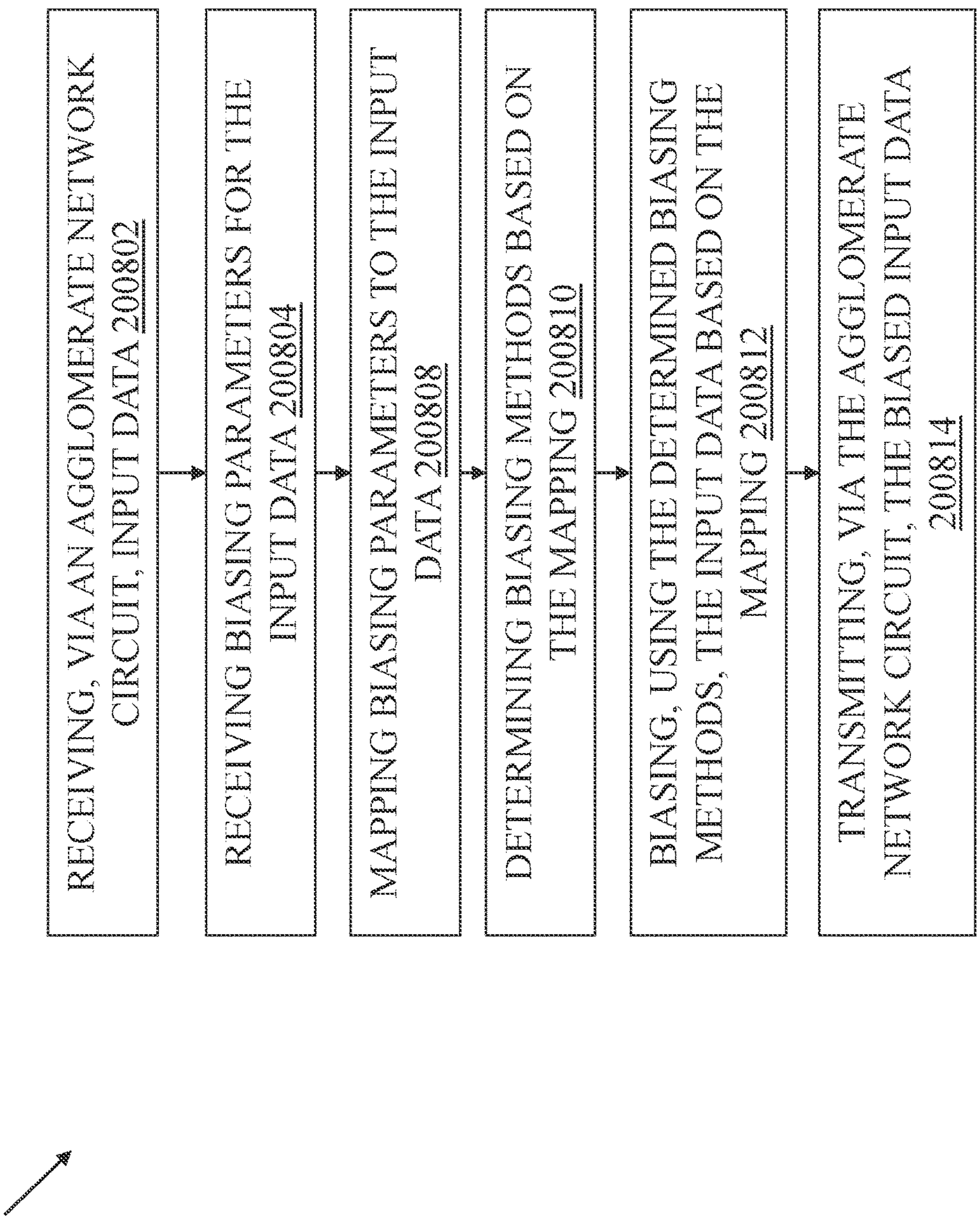
Figure 152:
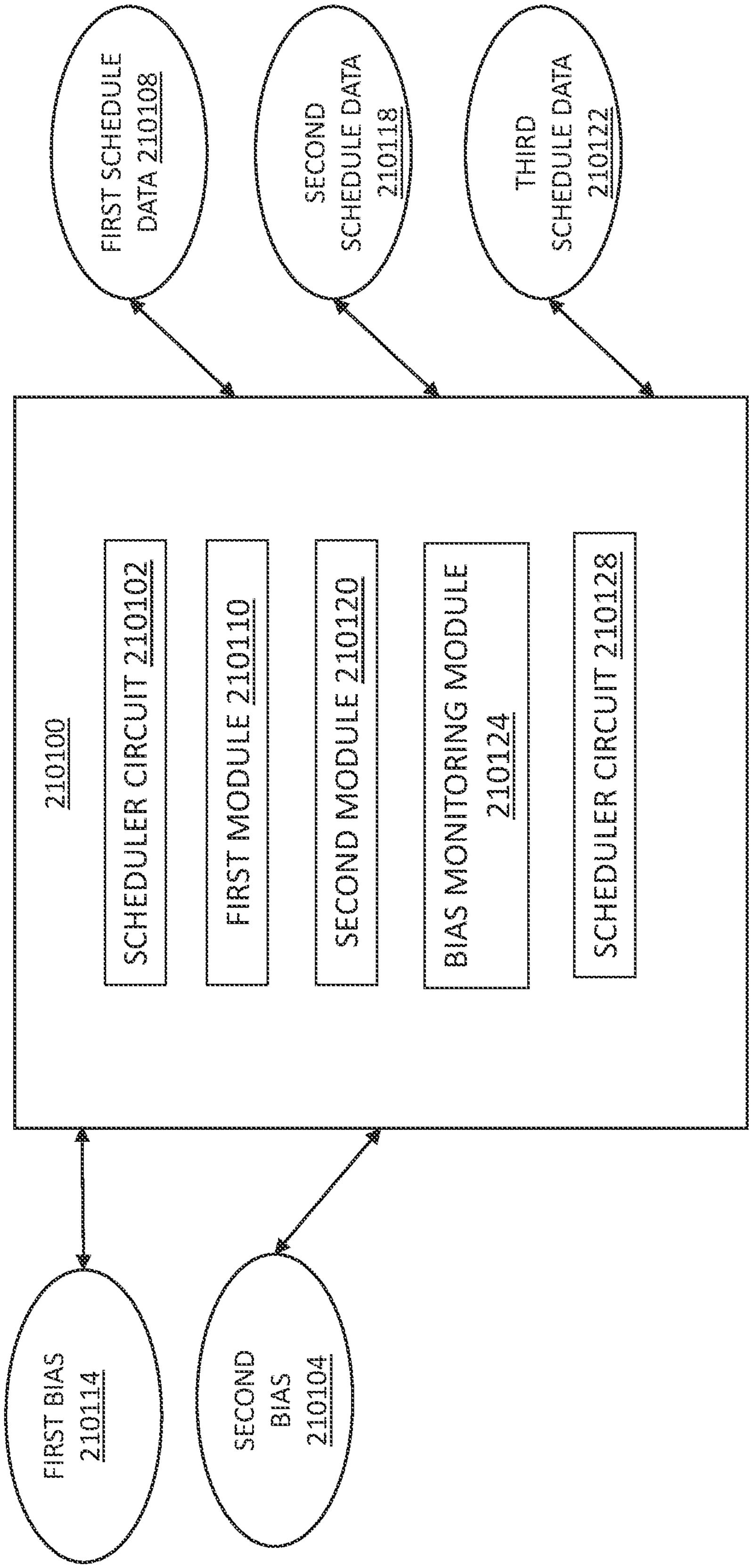
Figure 153:
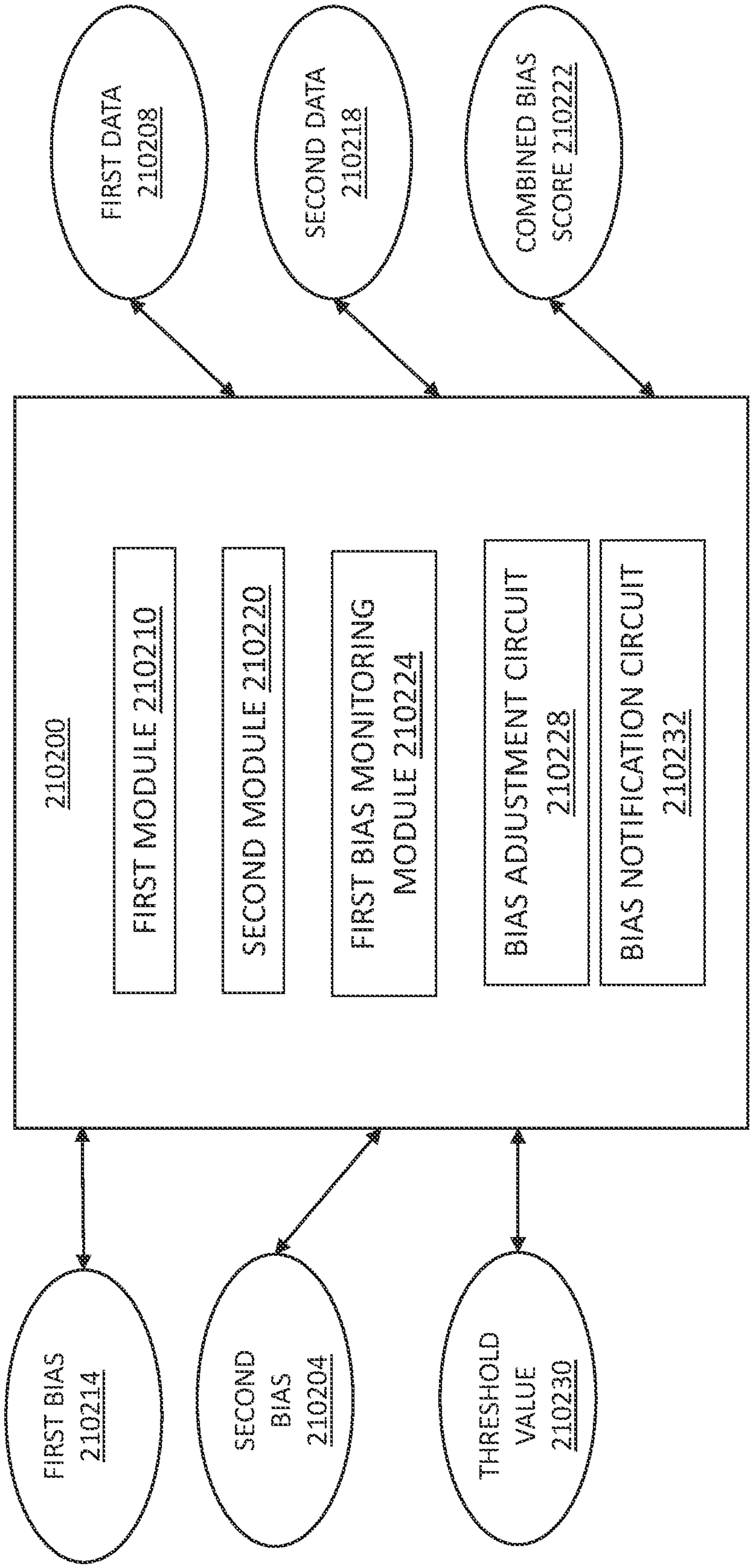
Figure 154:
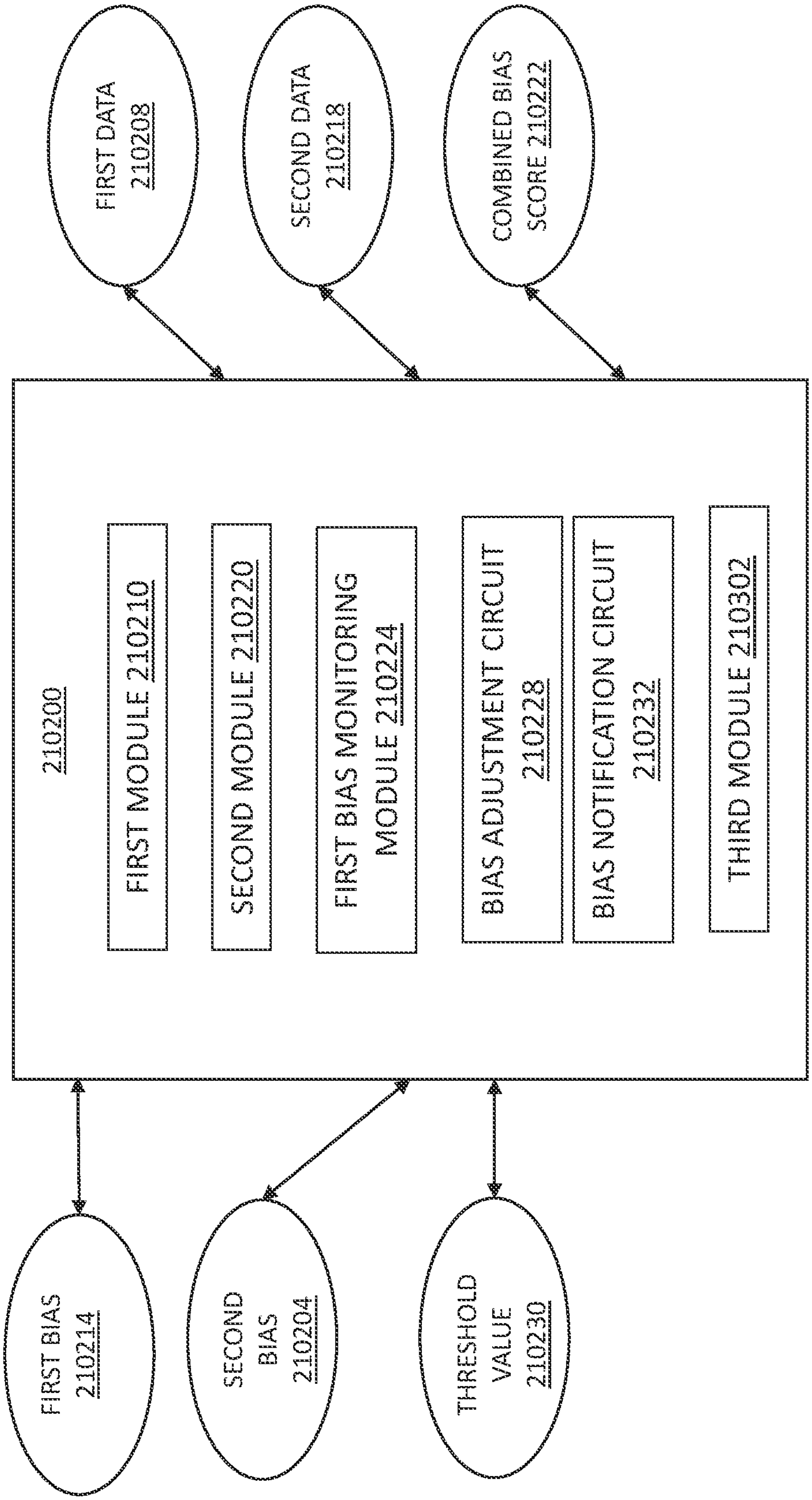
Figure 155:
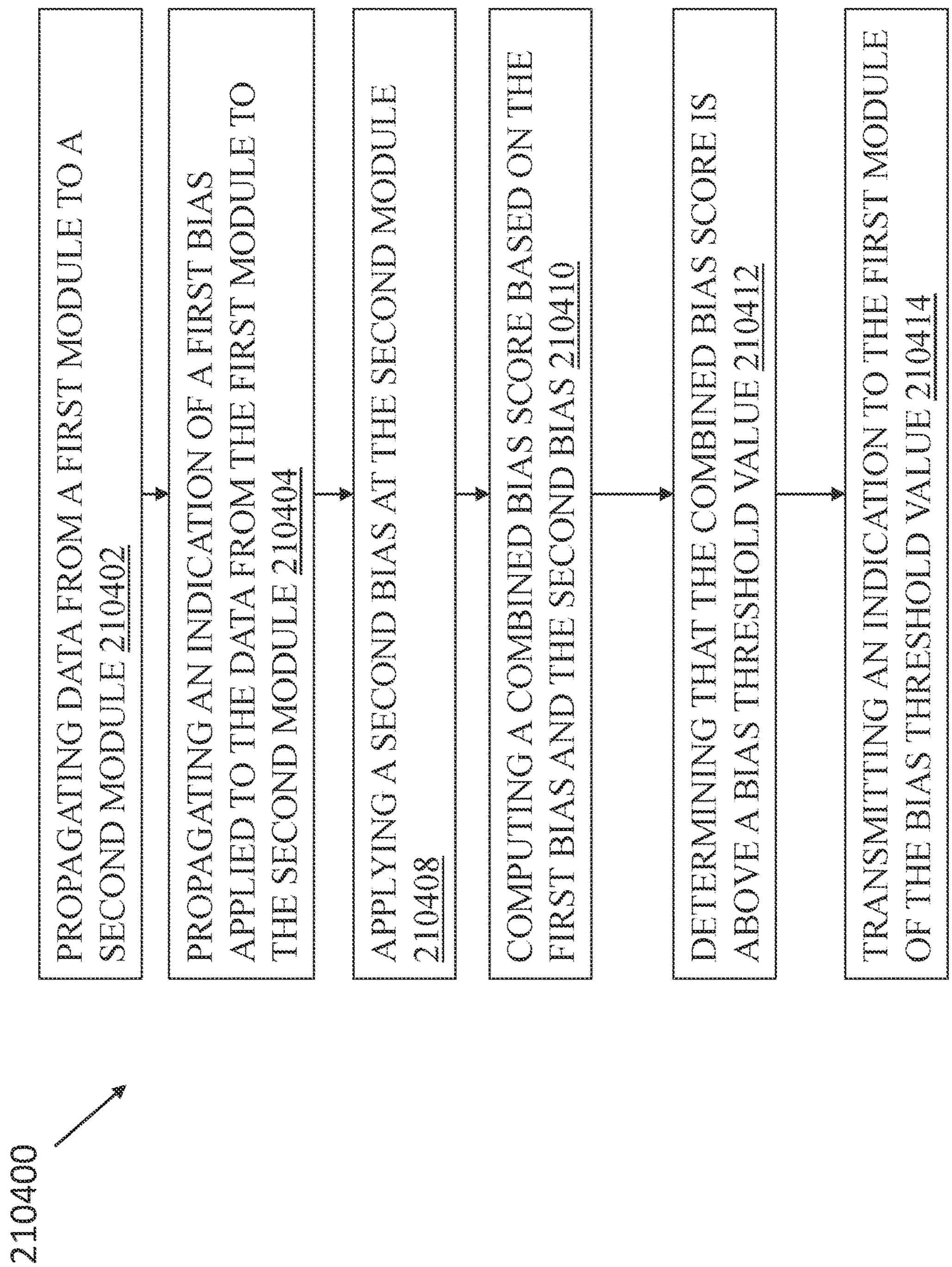
Figure 156:
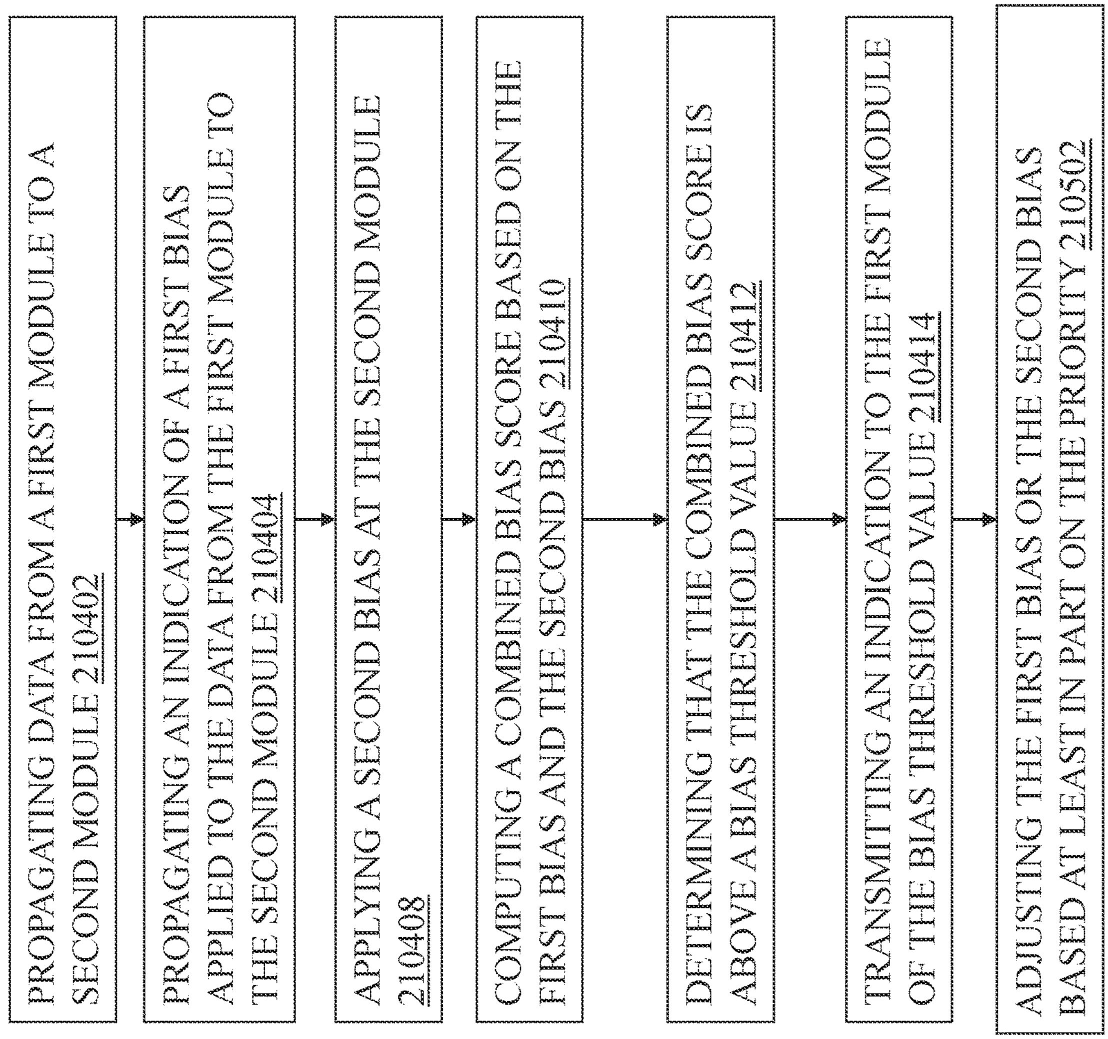
Figure 157:
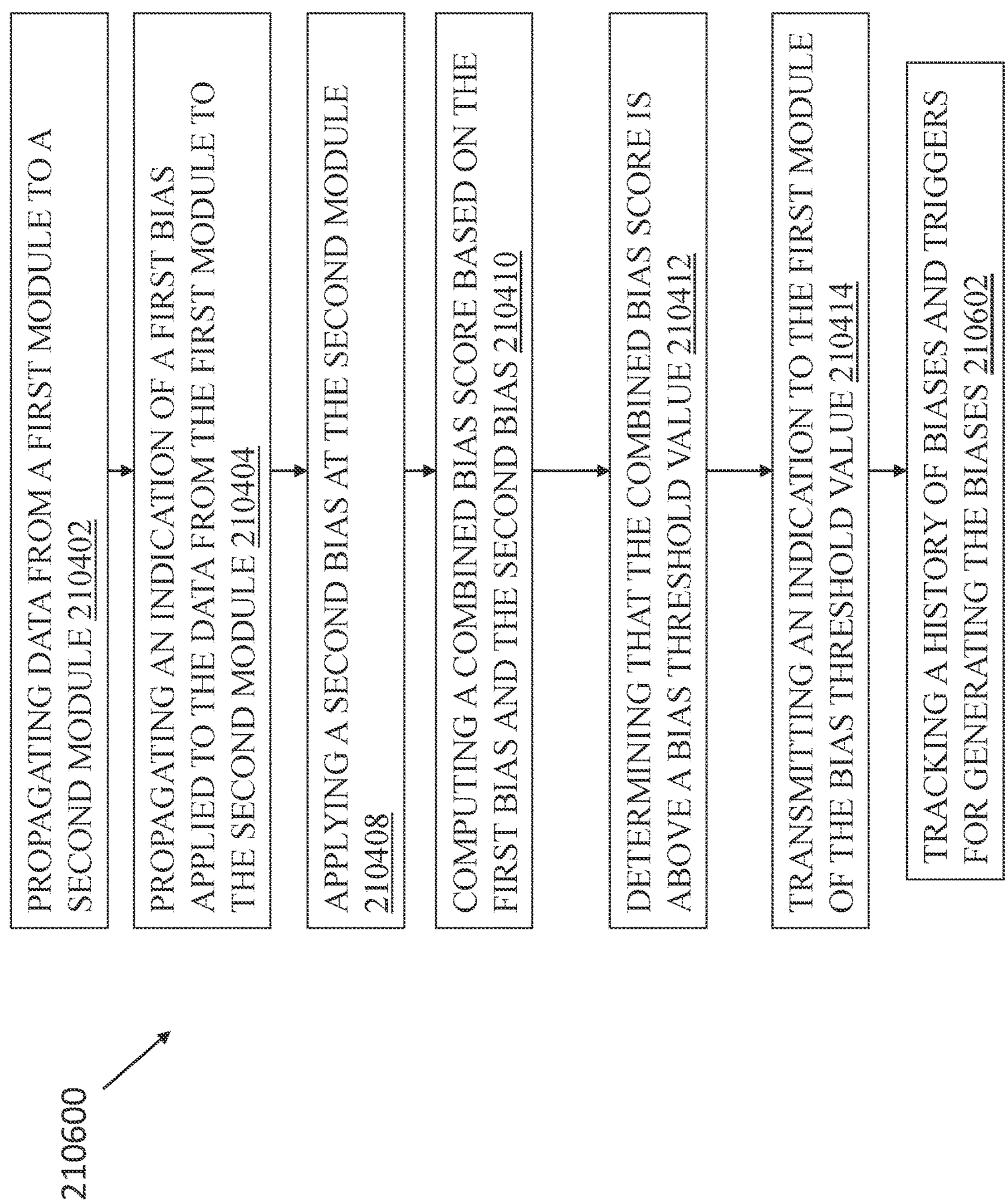
Figure 158:
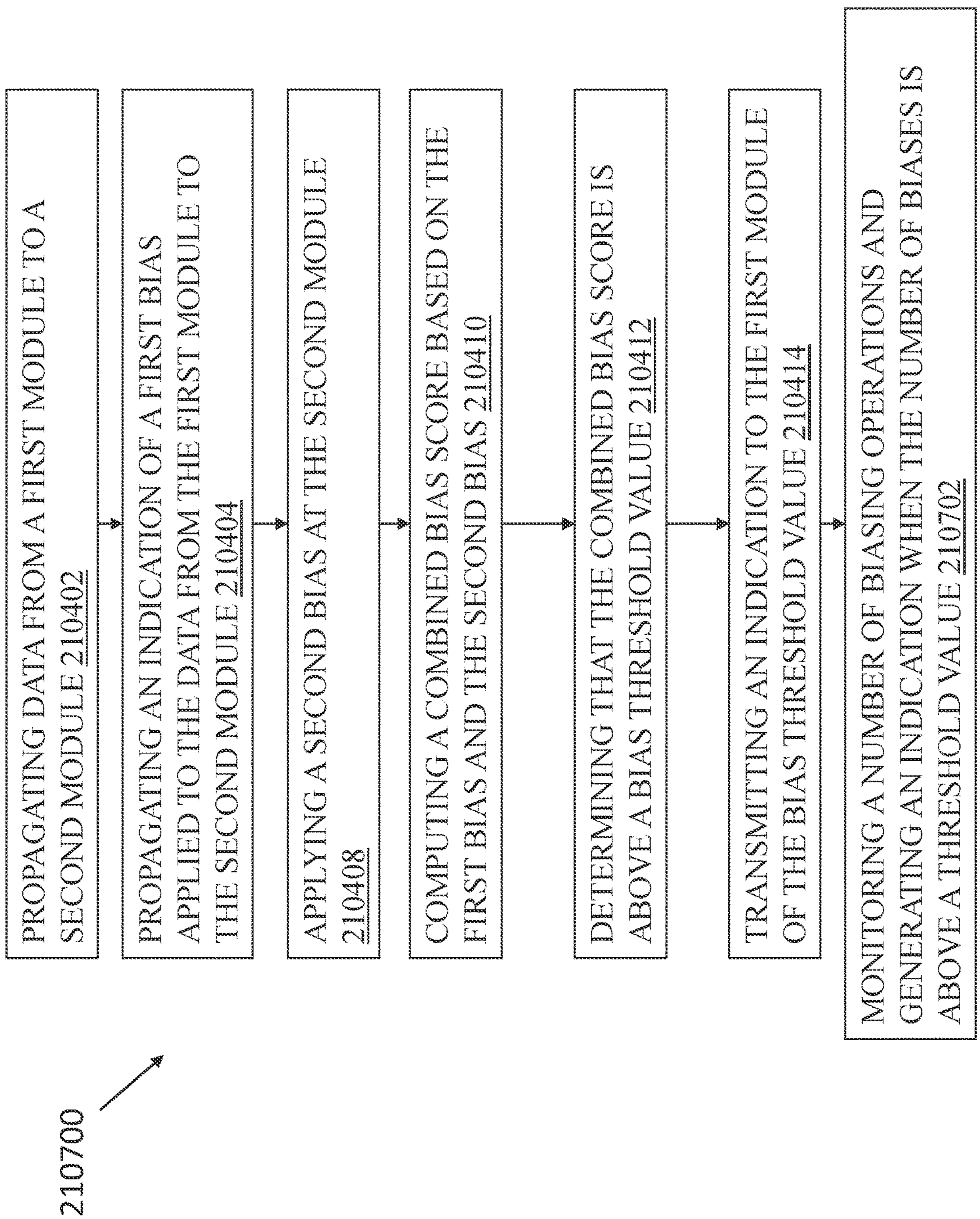
Figure 159:
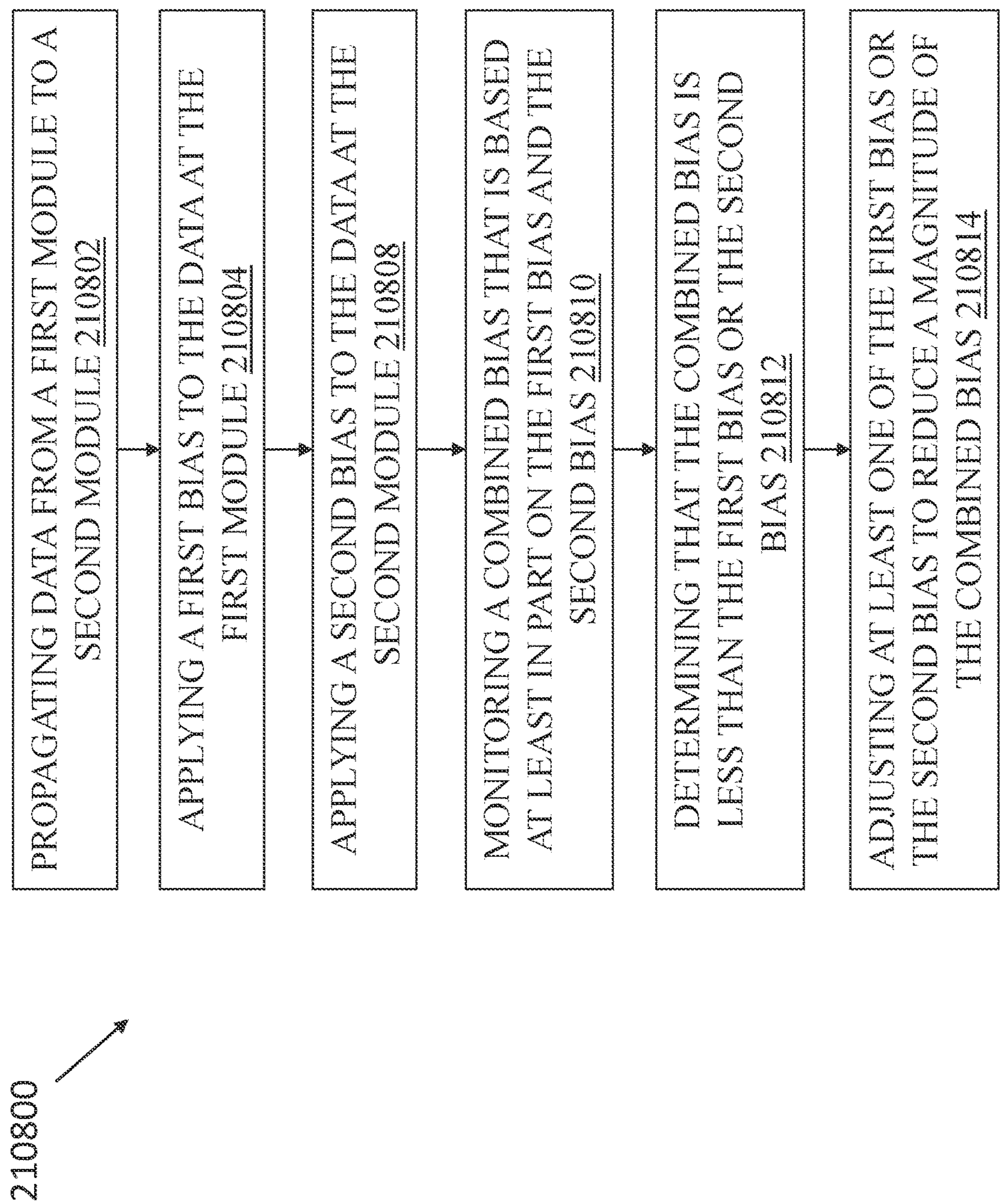
Figure 160:
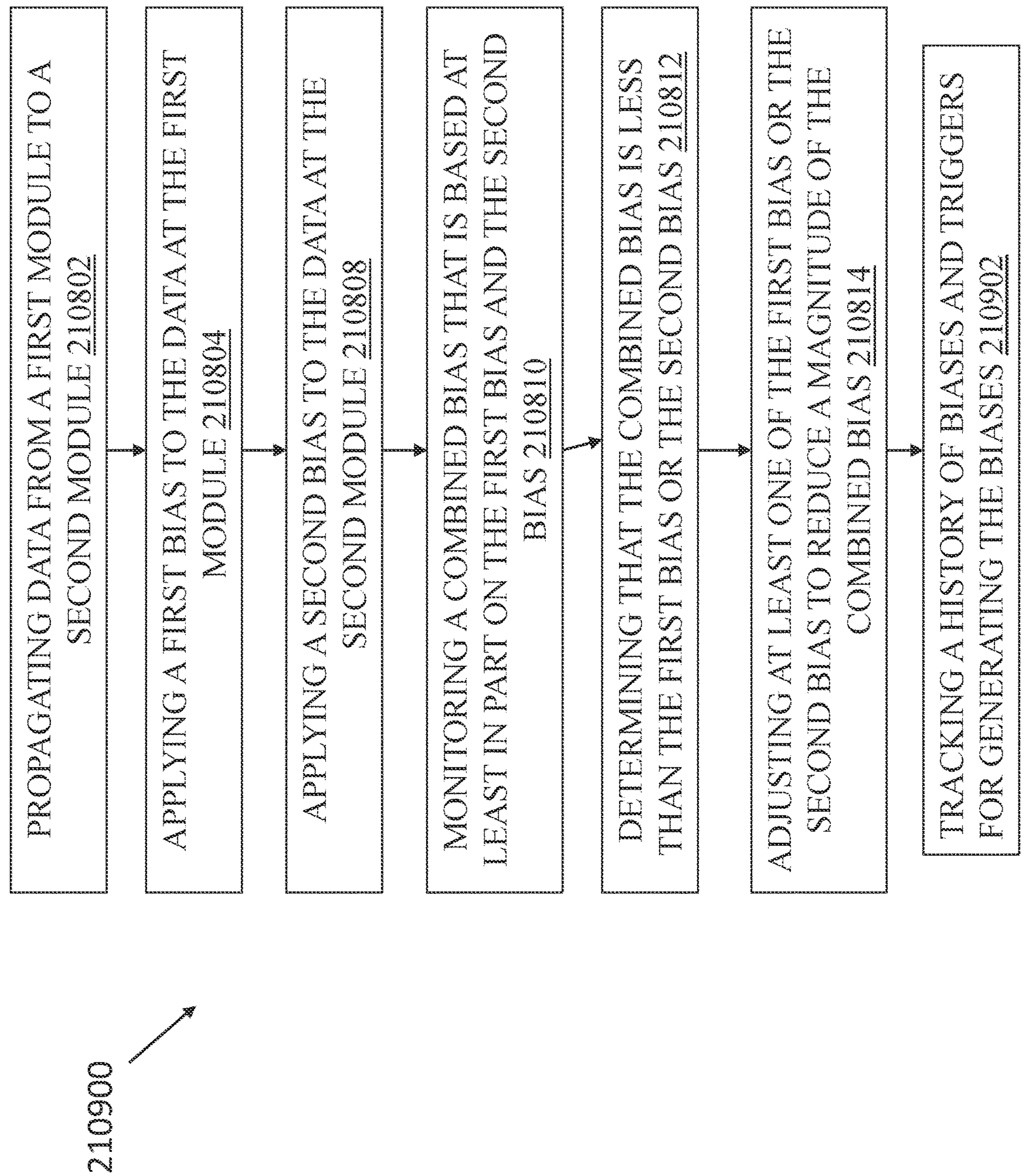
Figure 161:
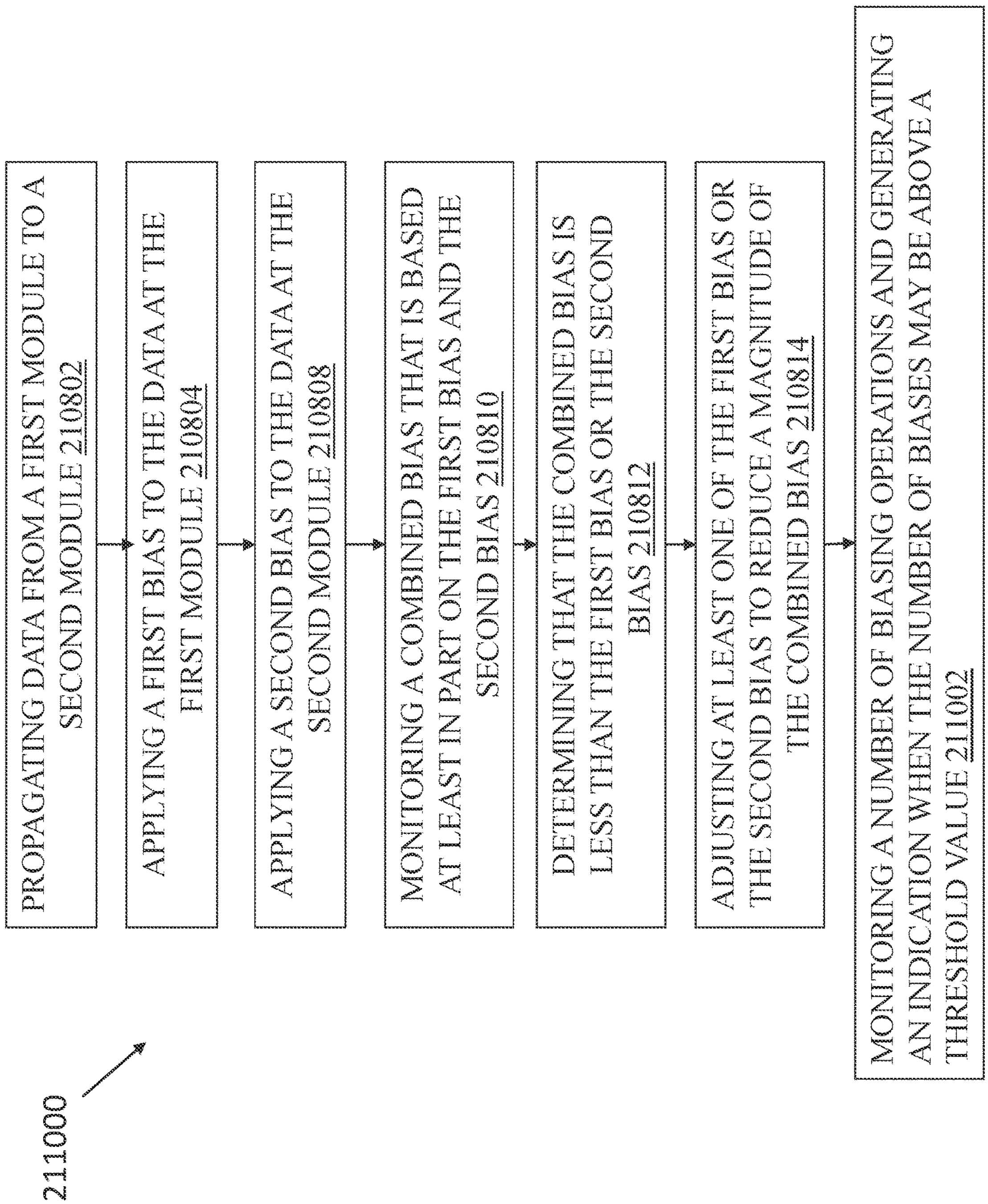
Figure 162:
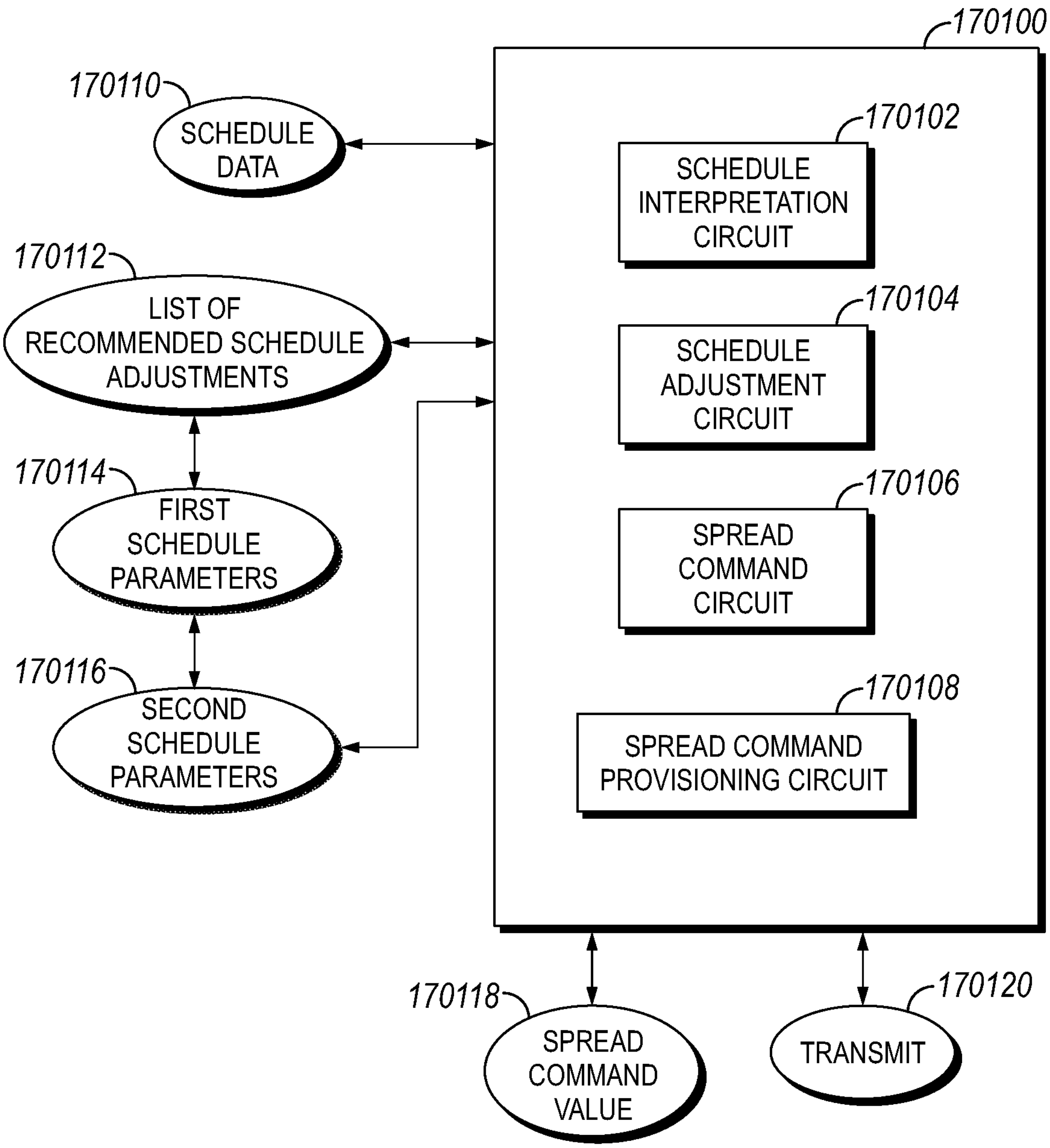
Figure 163:
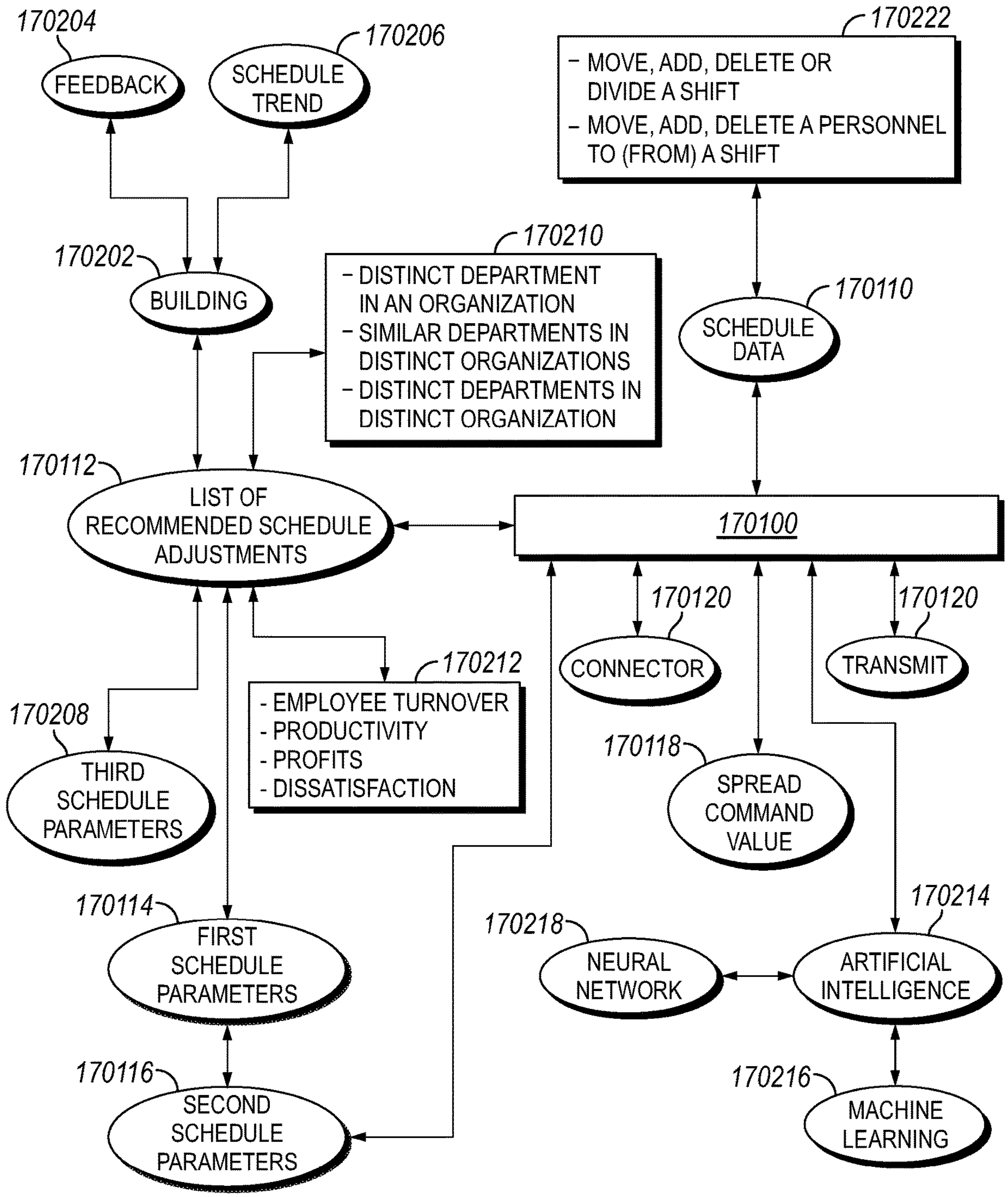
Figure 164:
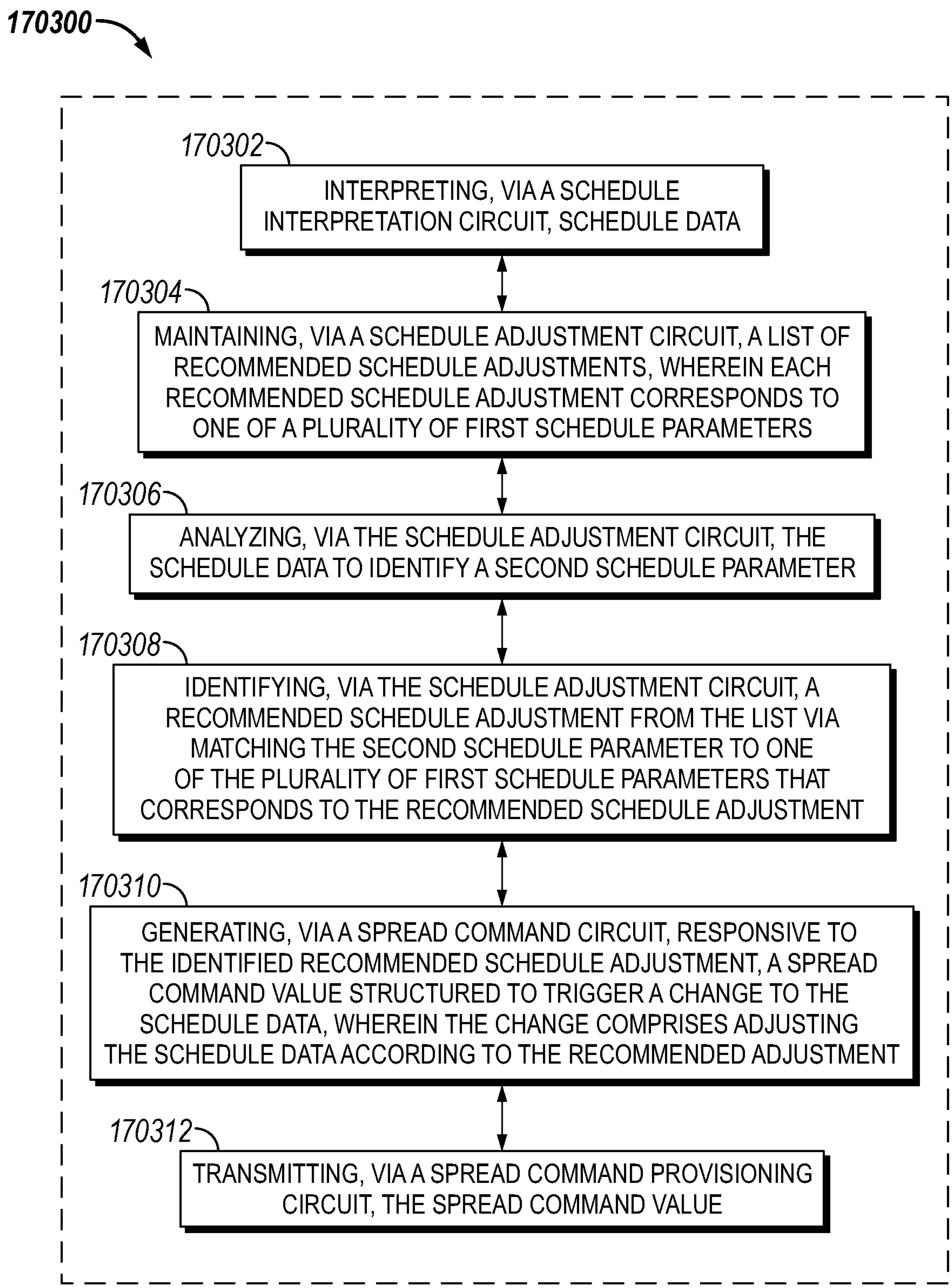
Figure 165:
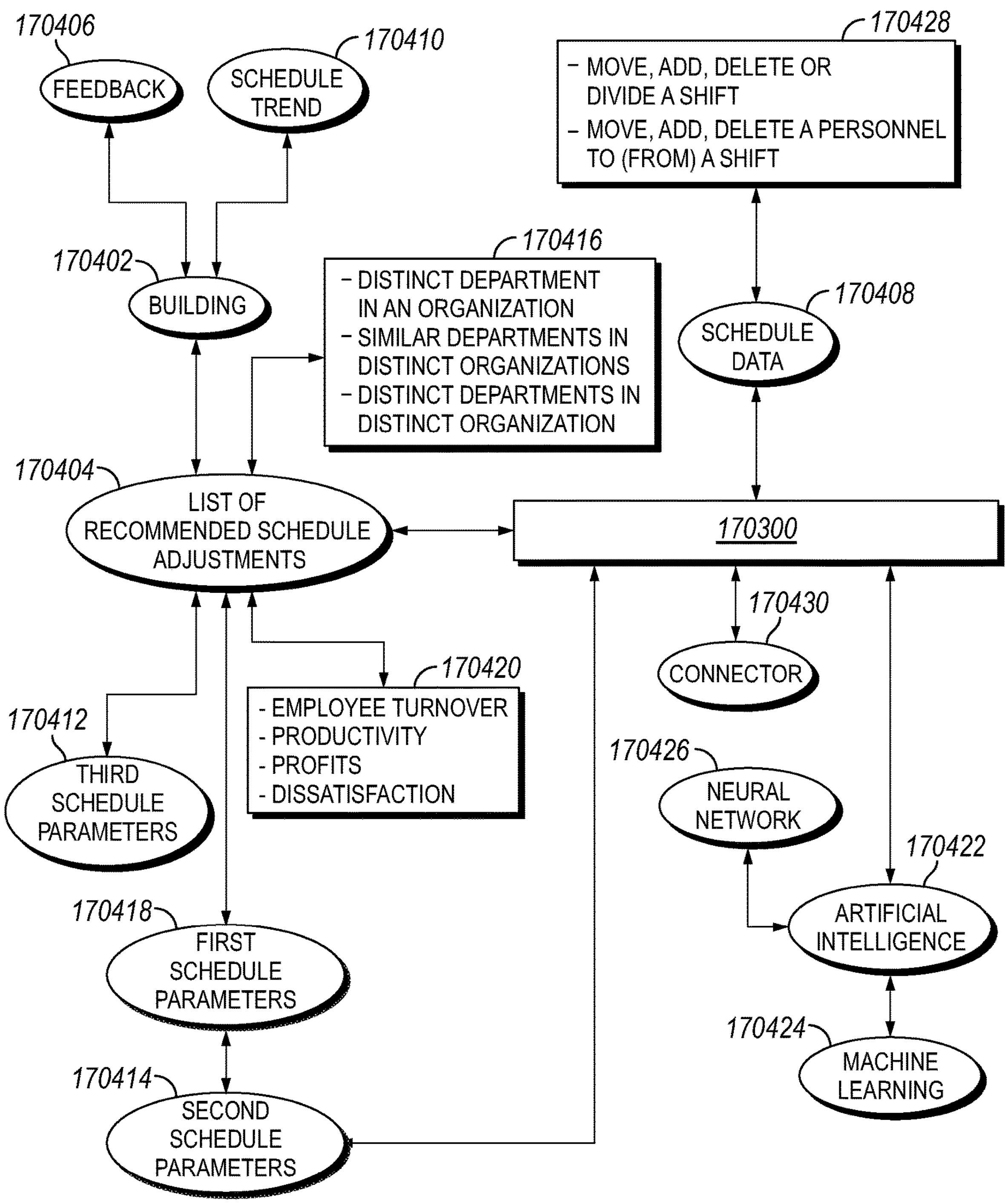
Figure 166:
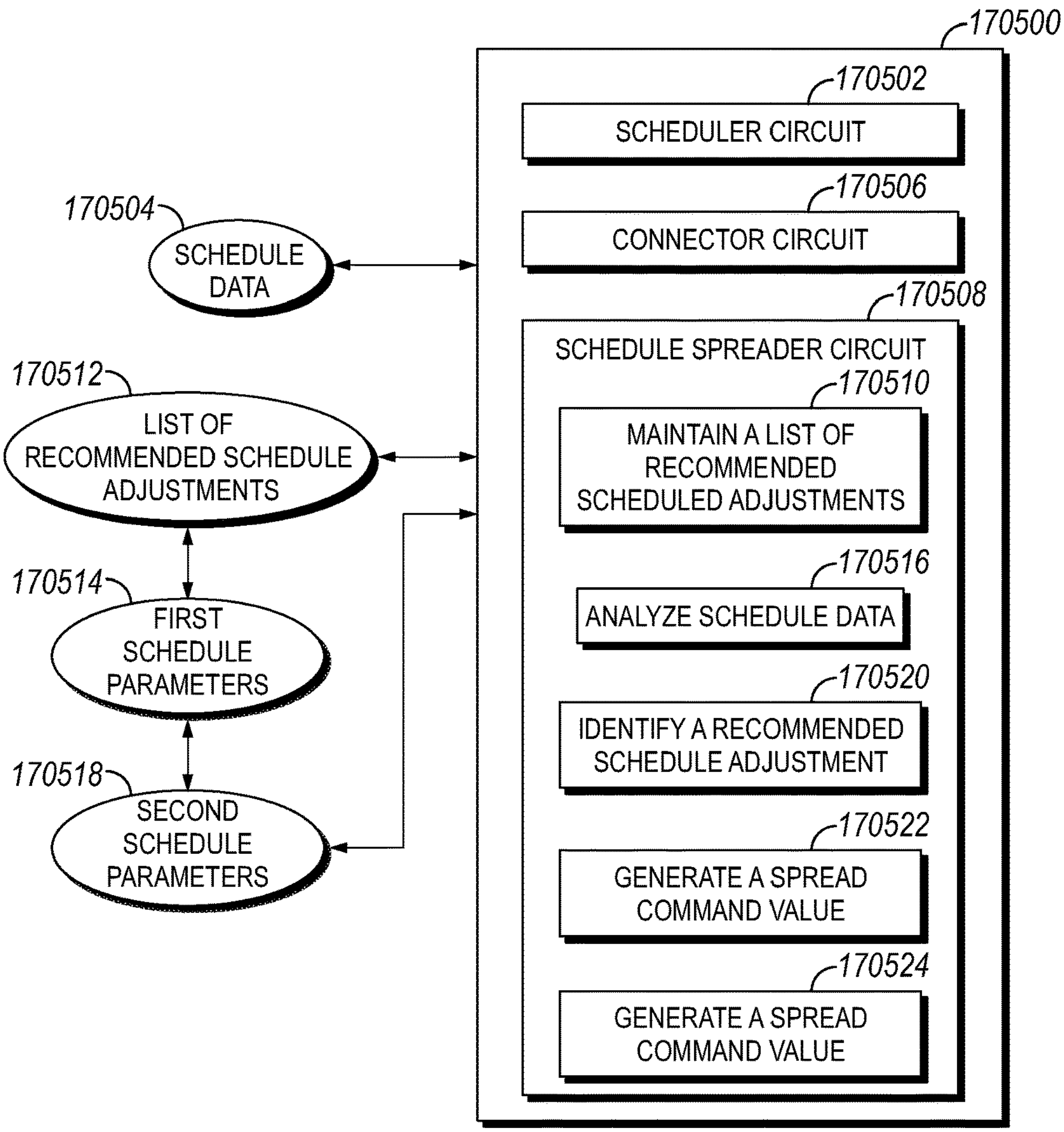
Figure 167:
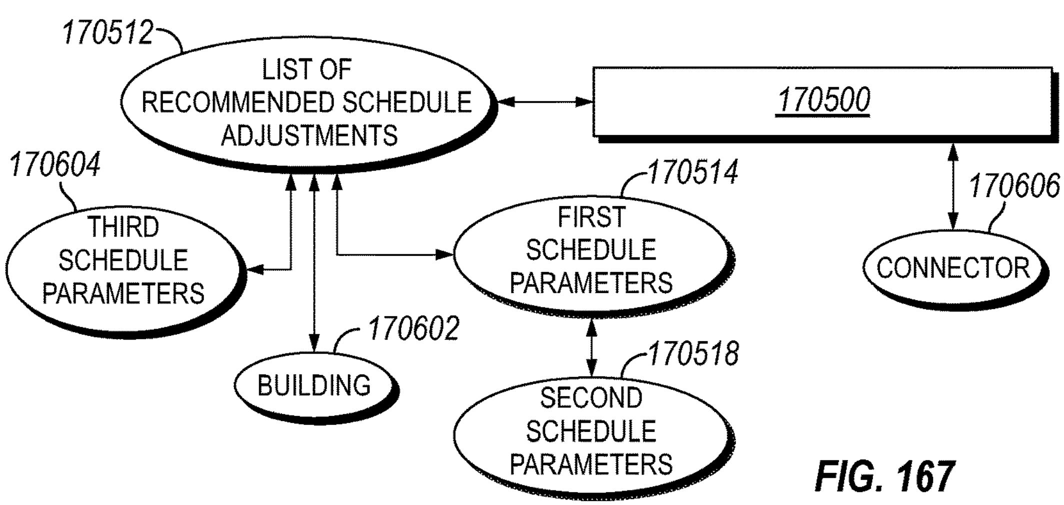
Figure 168:
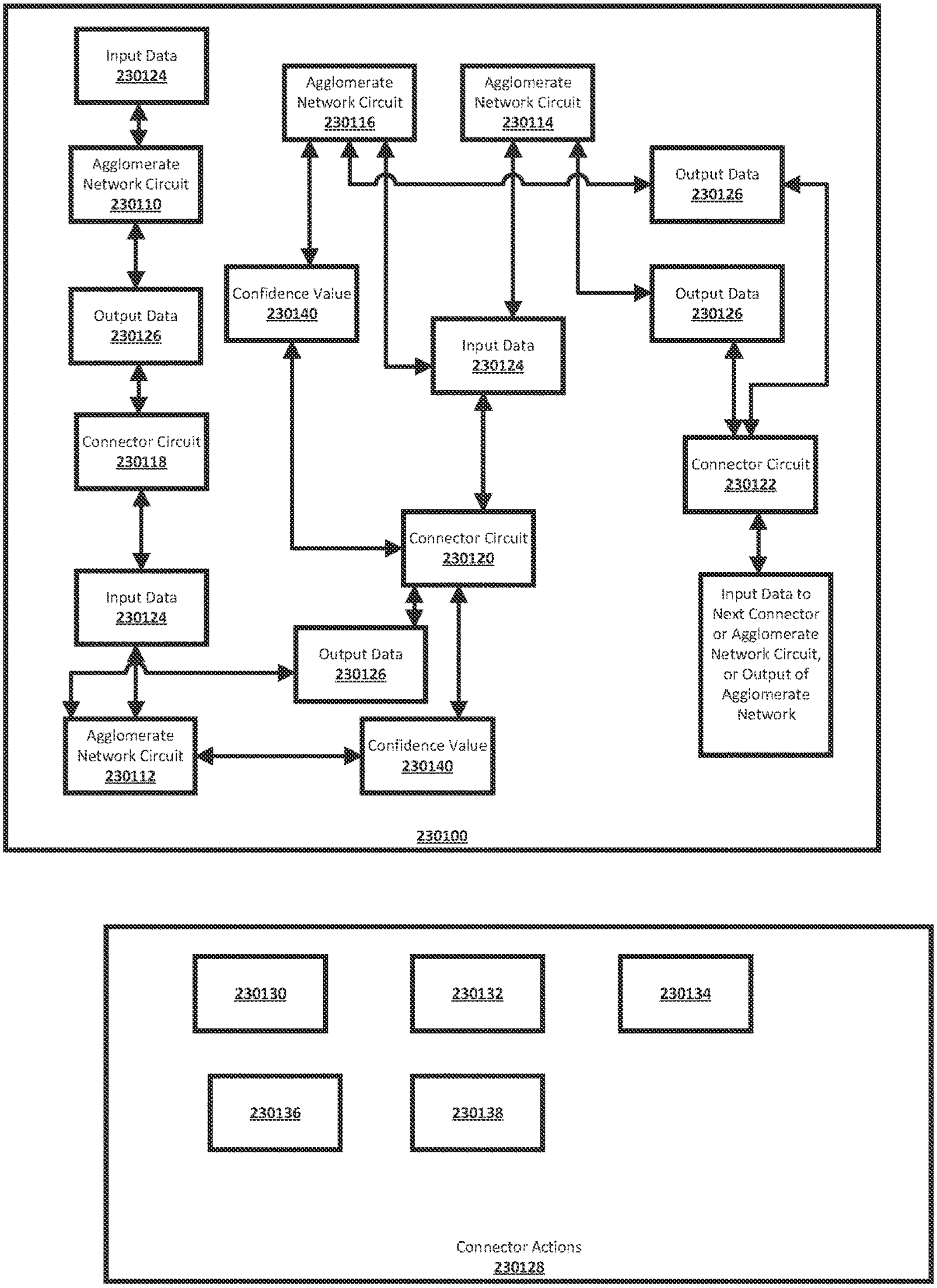
Figure 169:
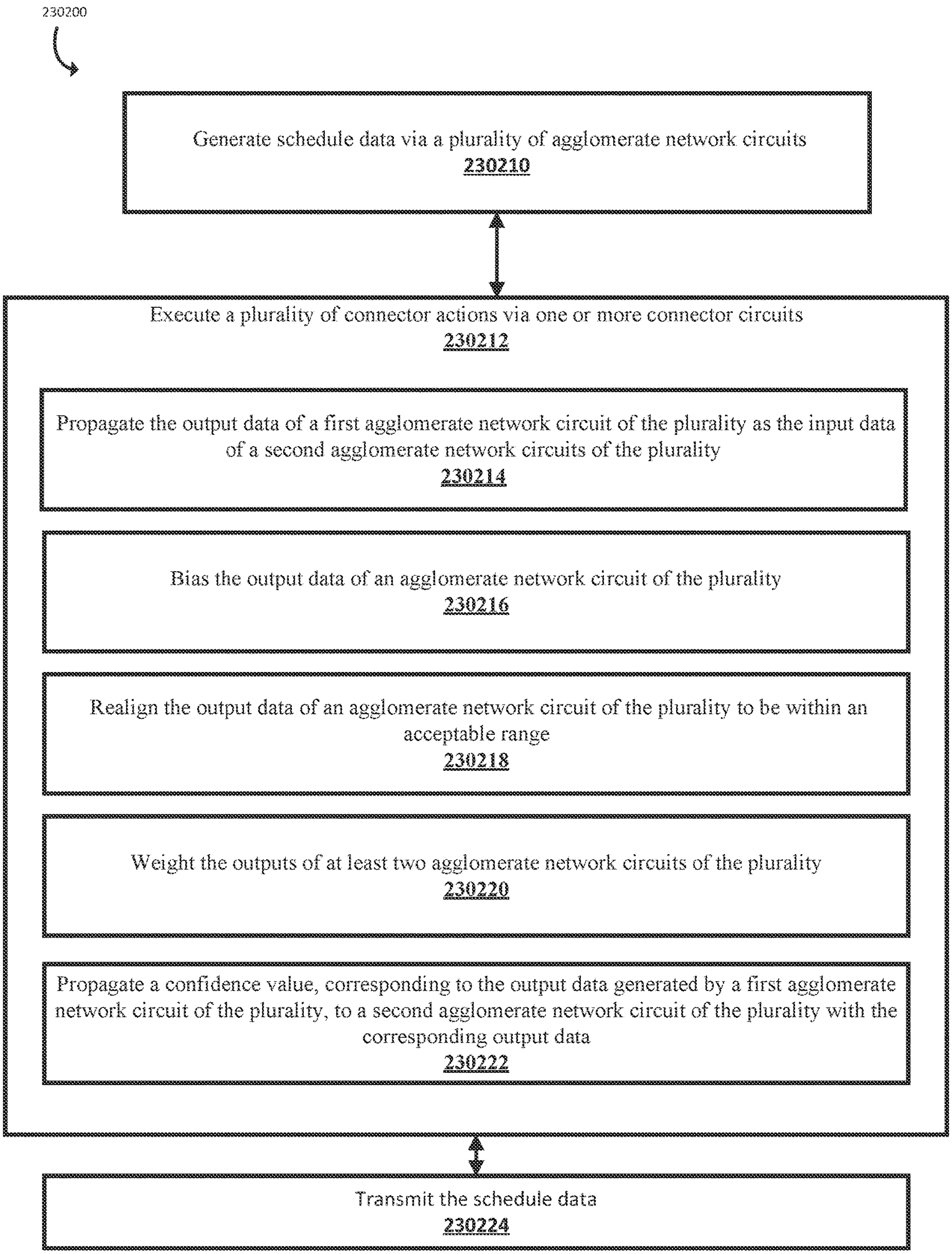
Figure 170:
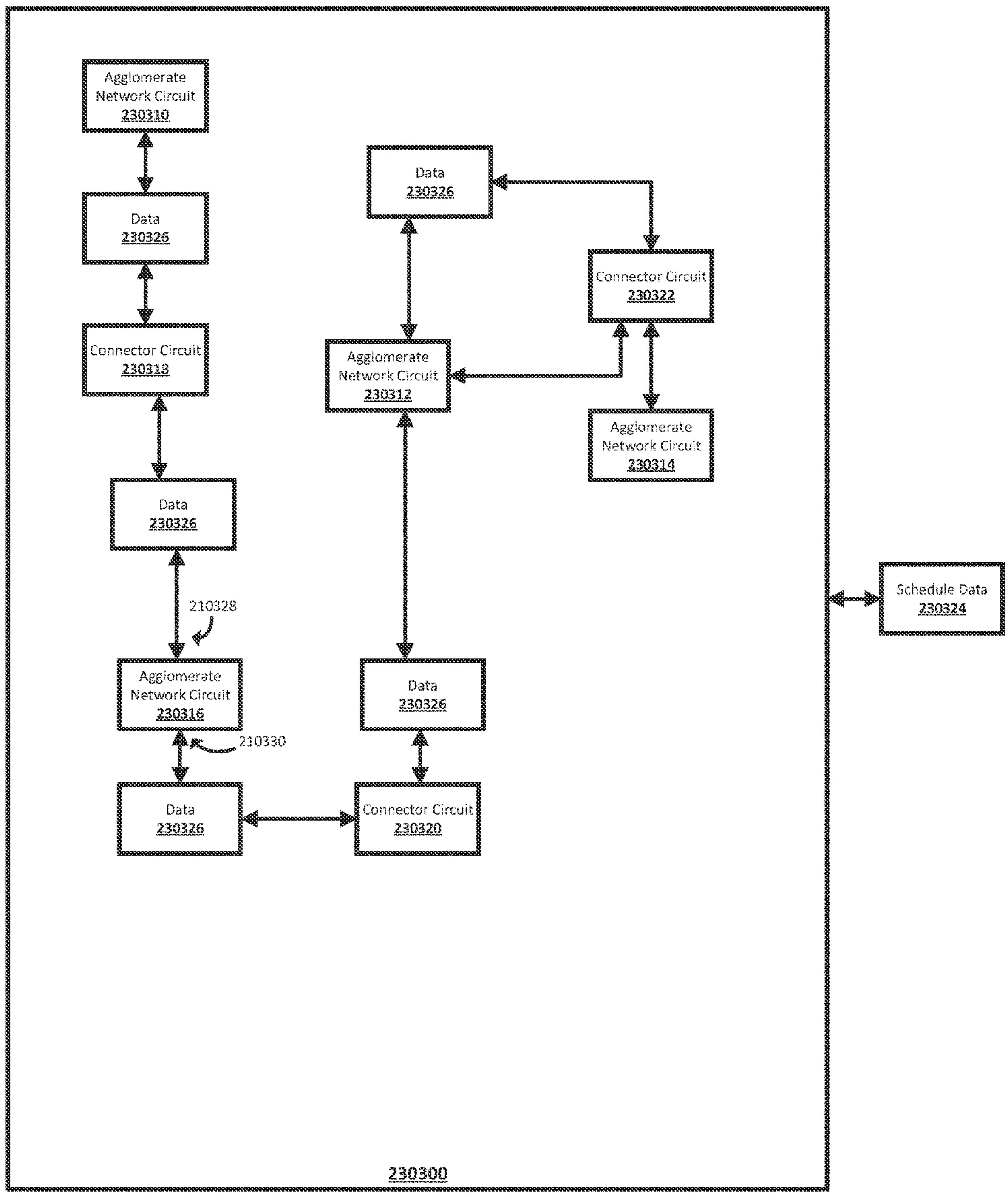
Figure 171:
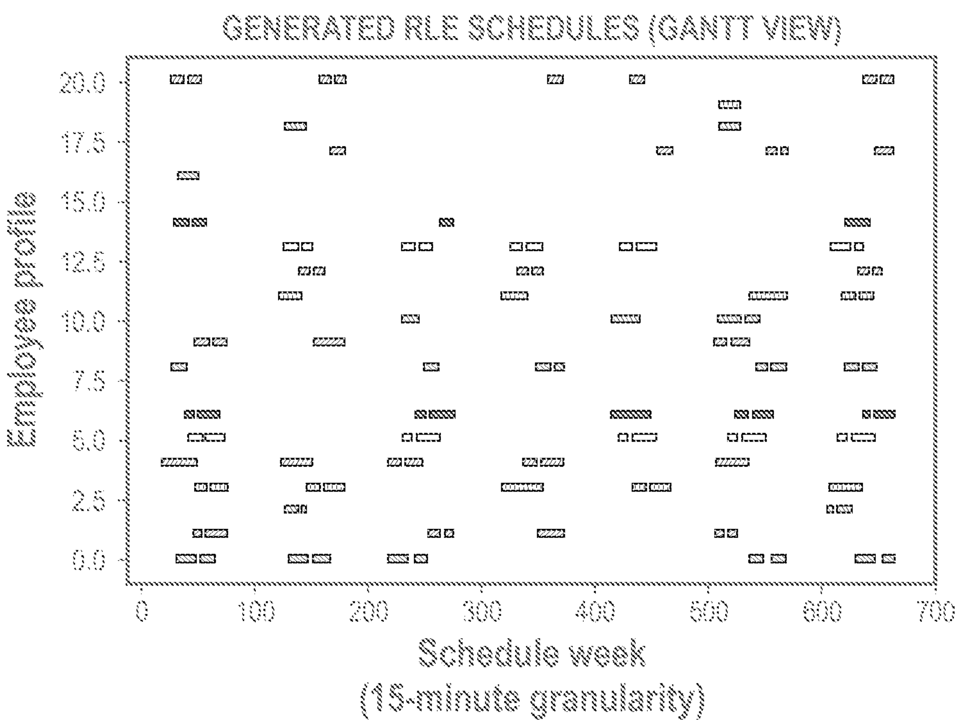
Figure 172:
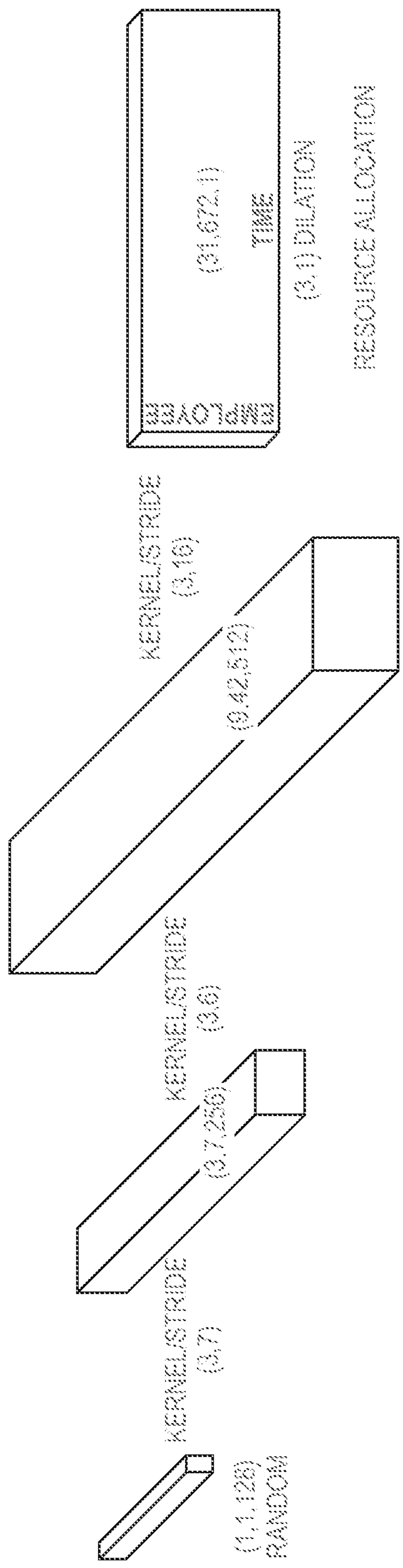
Figure 175:
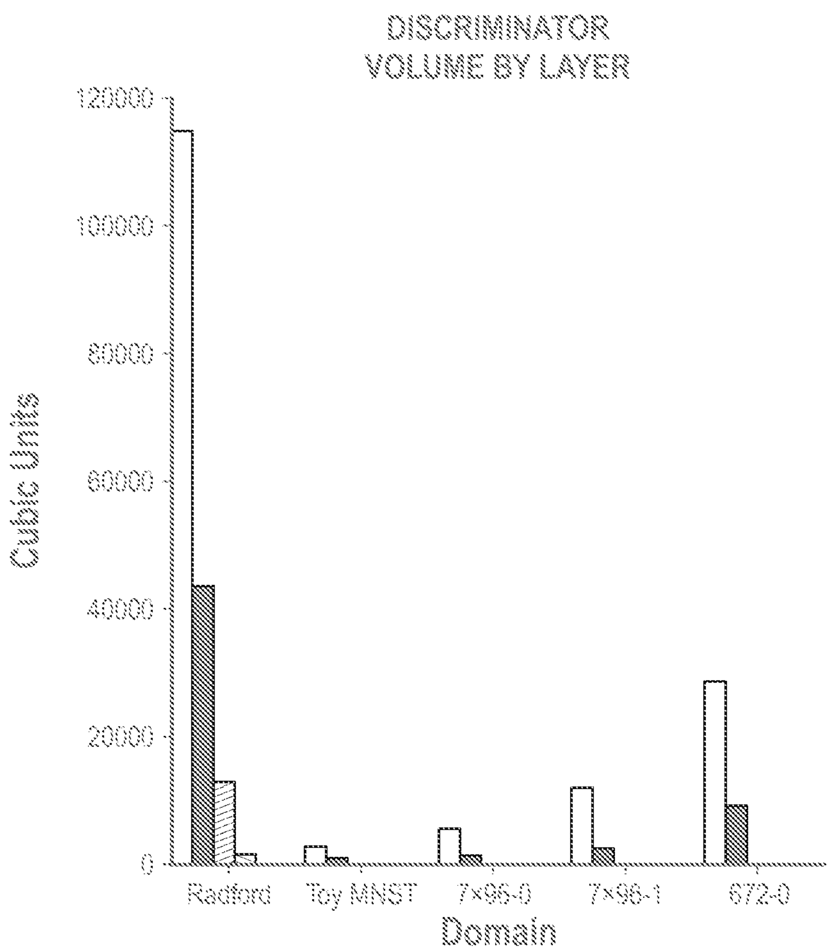
Figure 176:
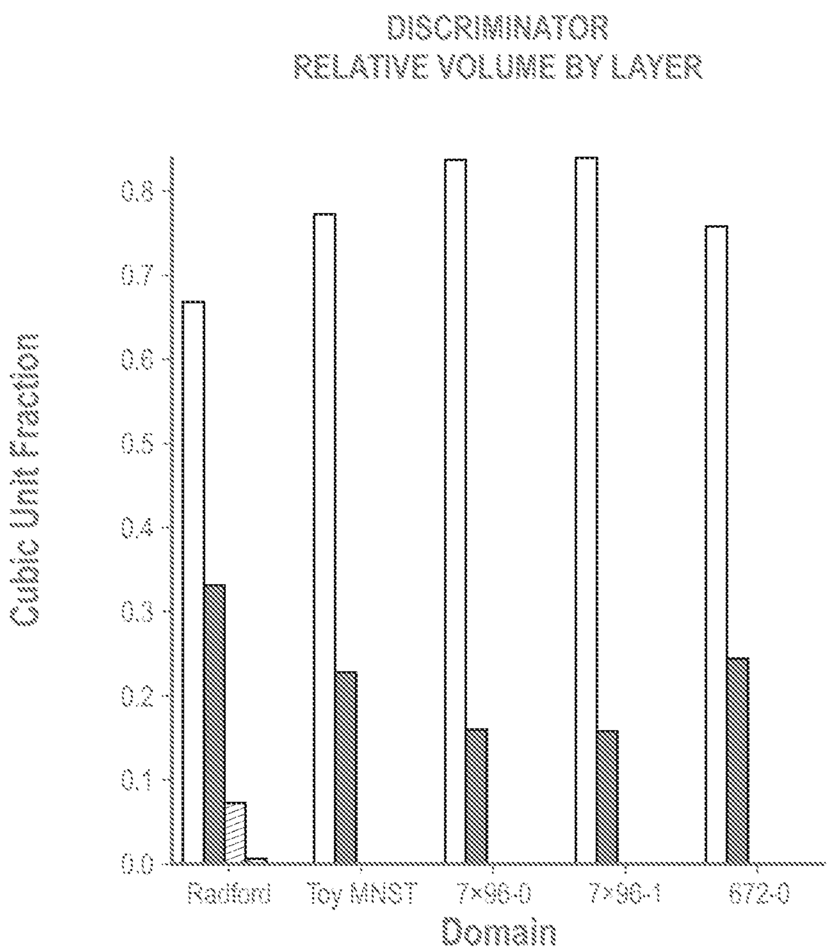
Figure 177:
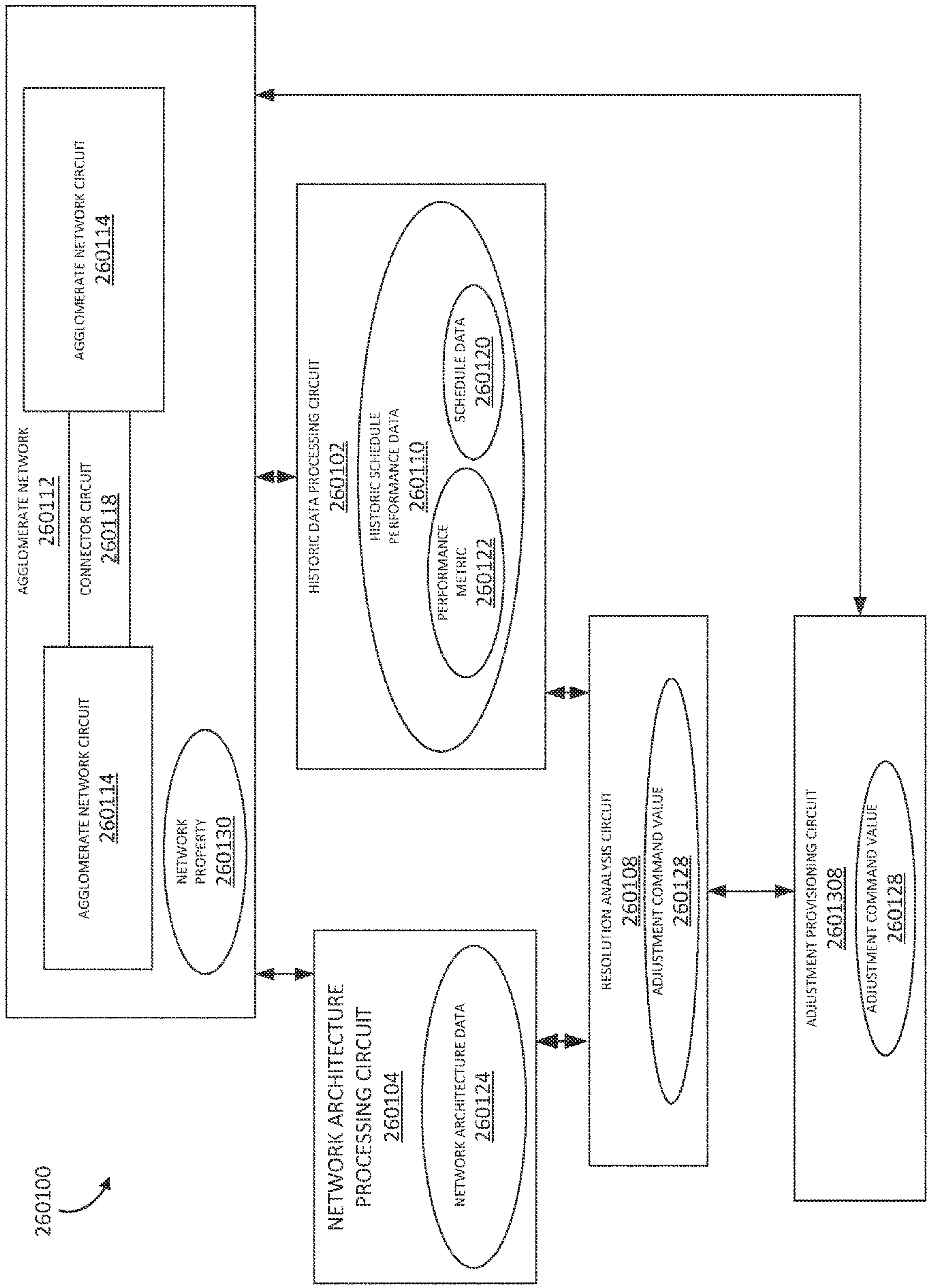
Figure 178:
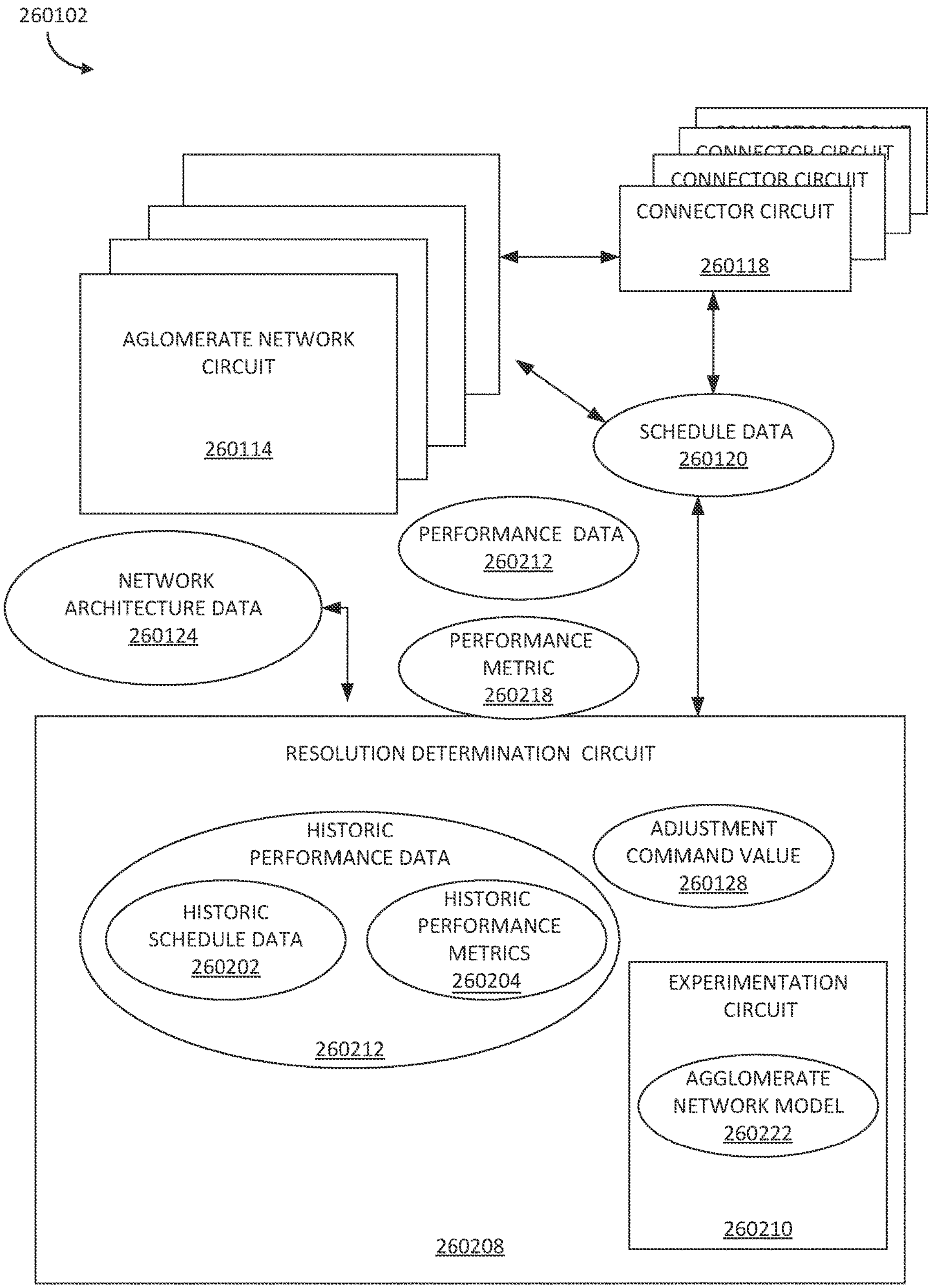
Figure 179:
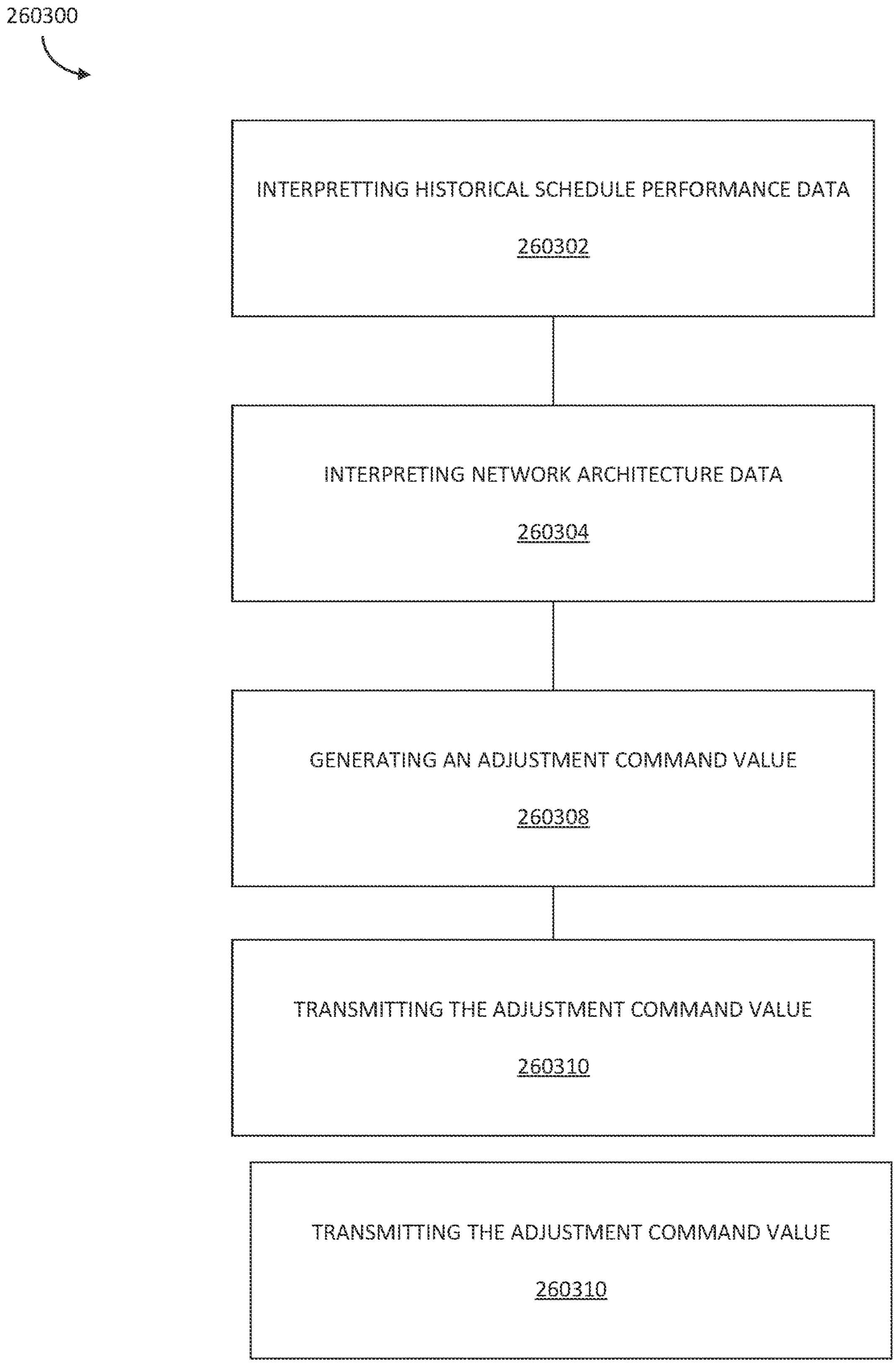
Figure 180:
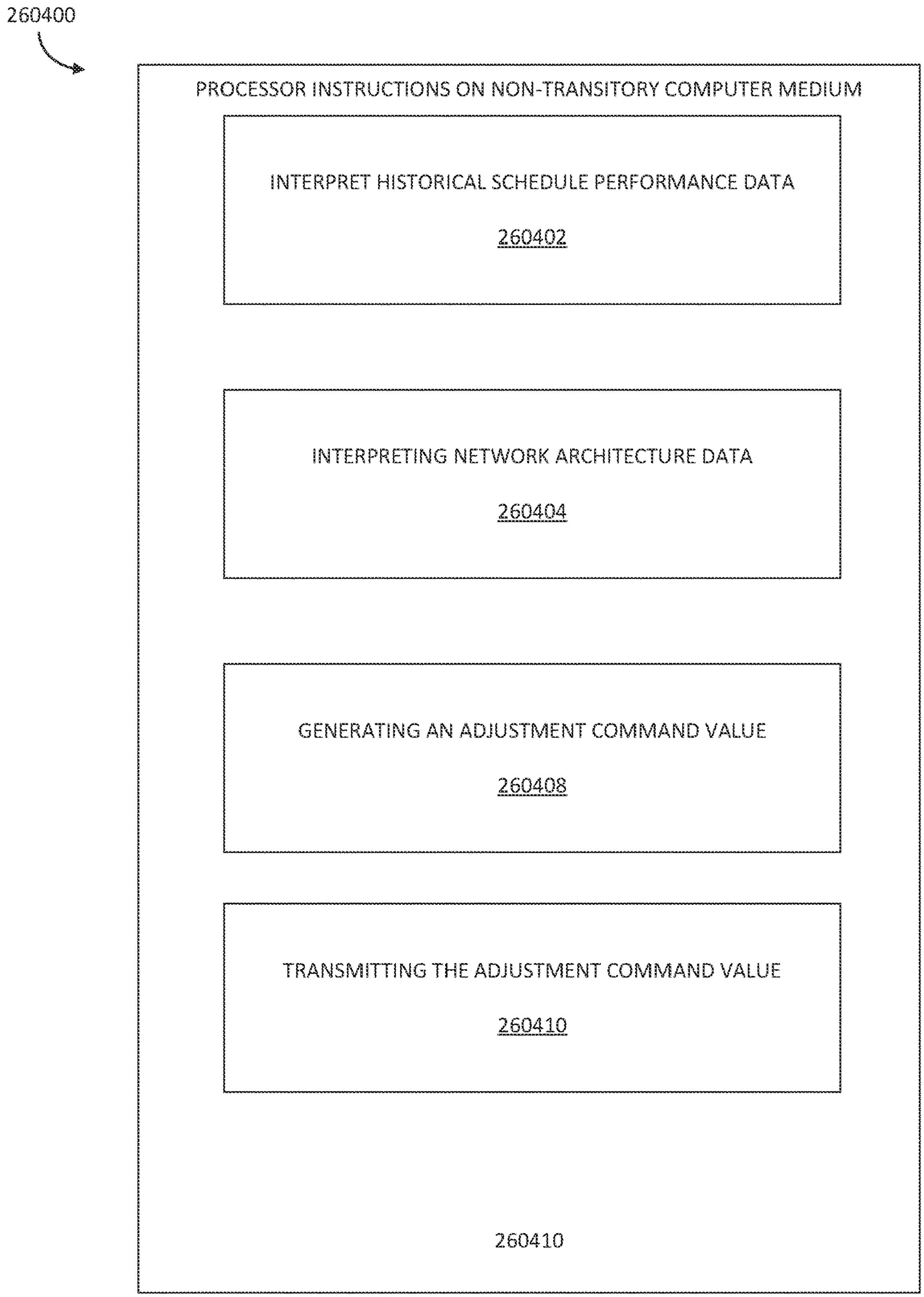
Figure 181:
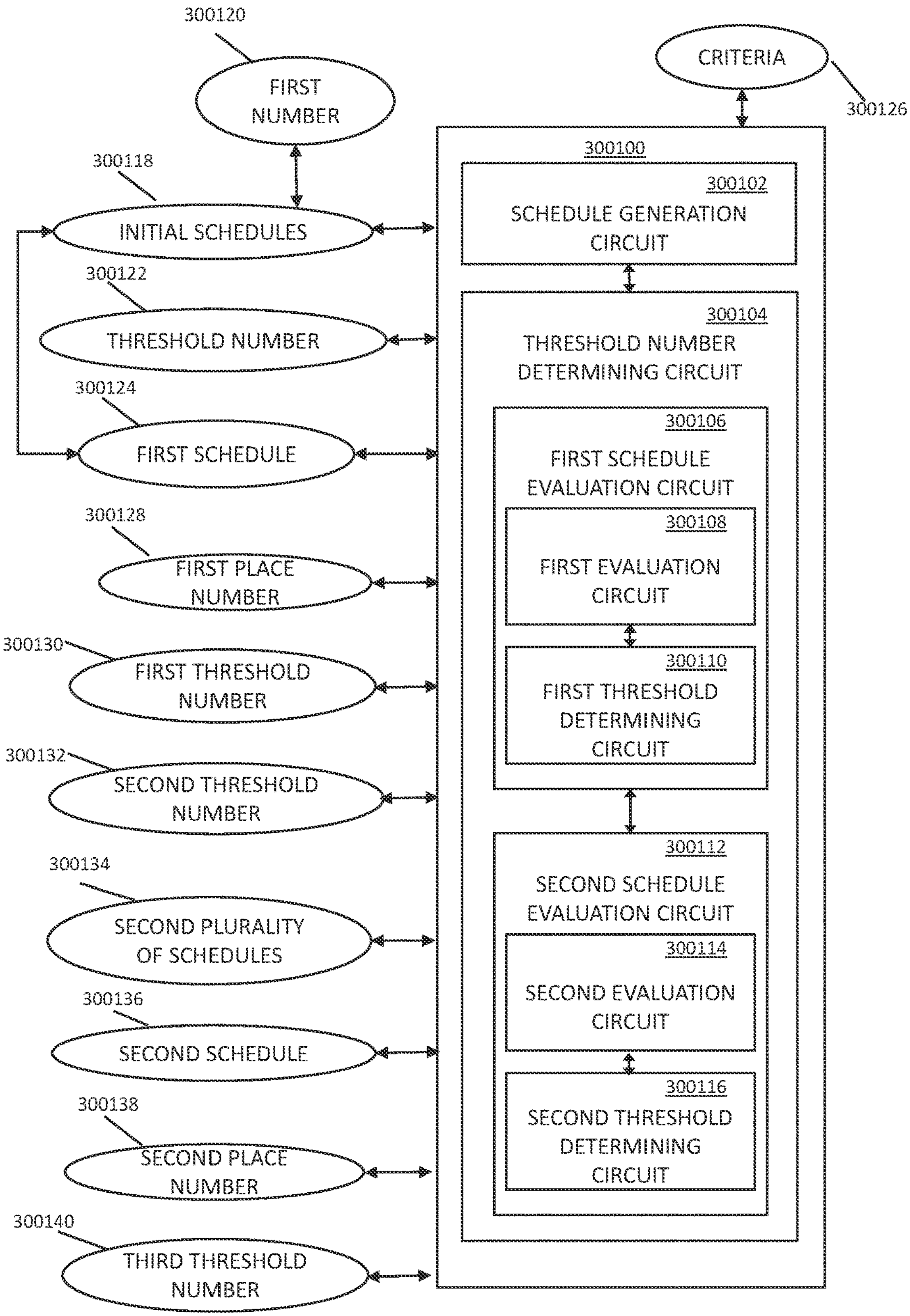
Figure 182:
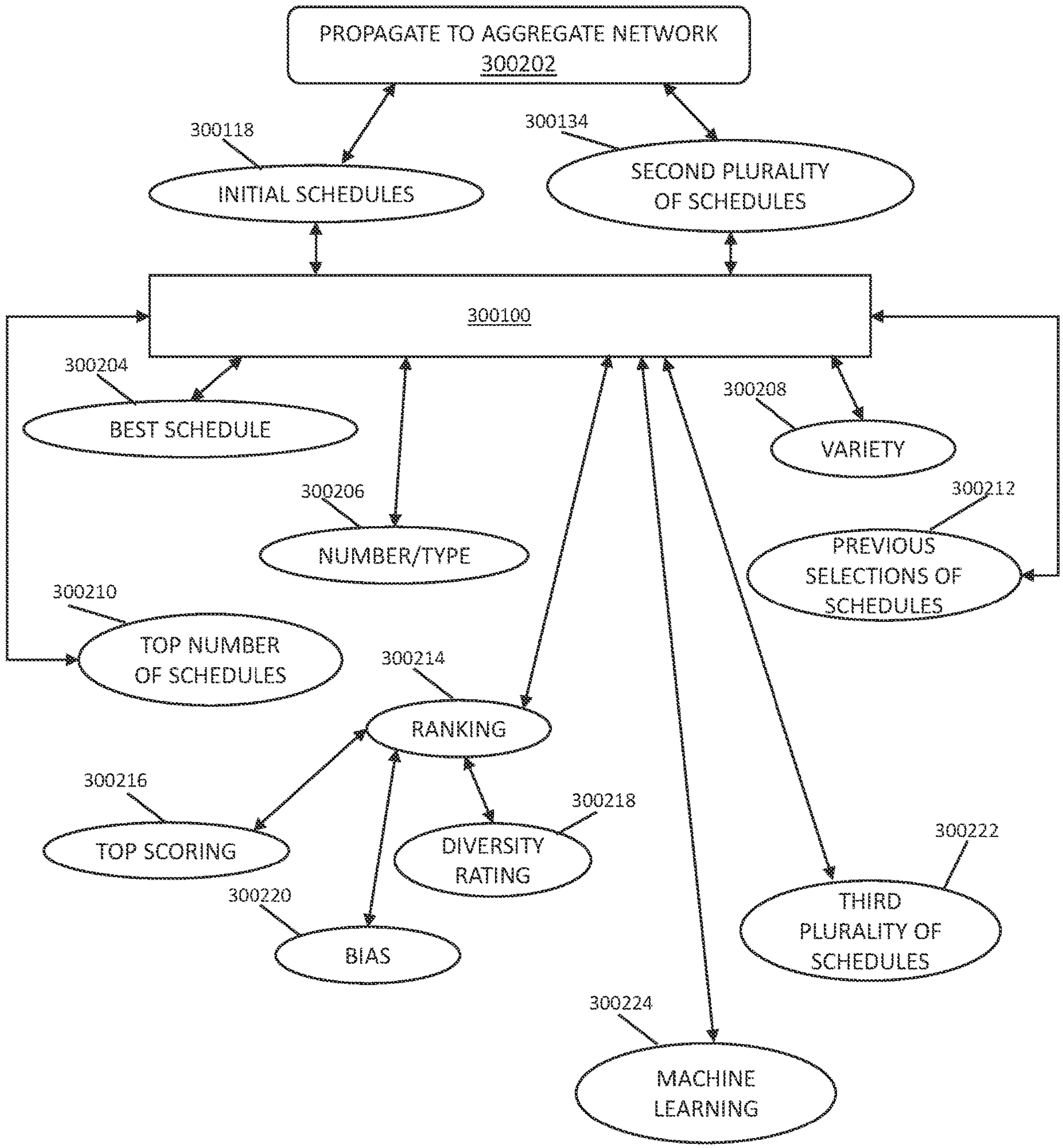
Figure 183:
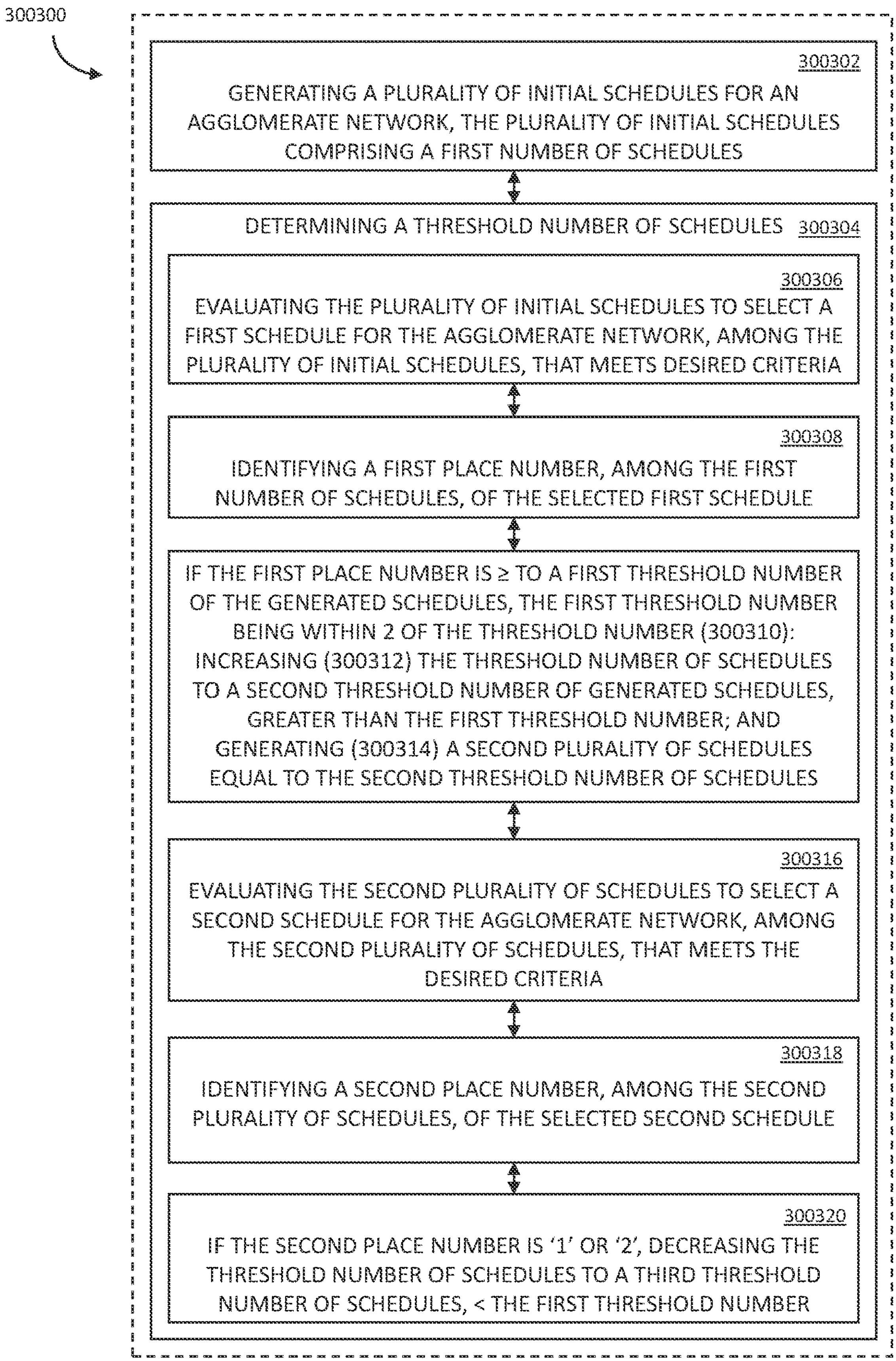
Figure 184:
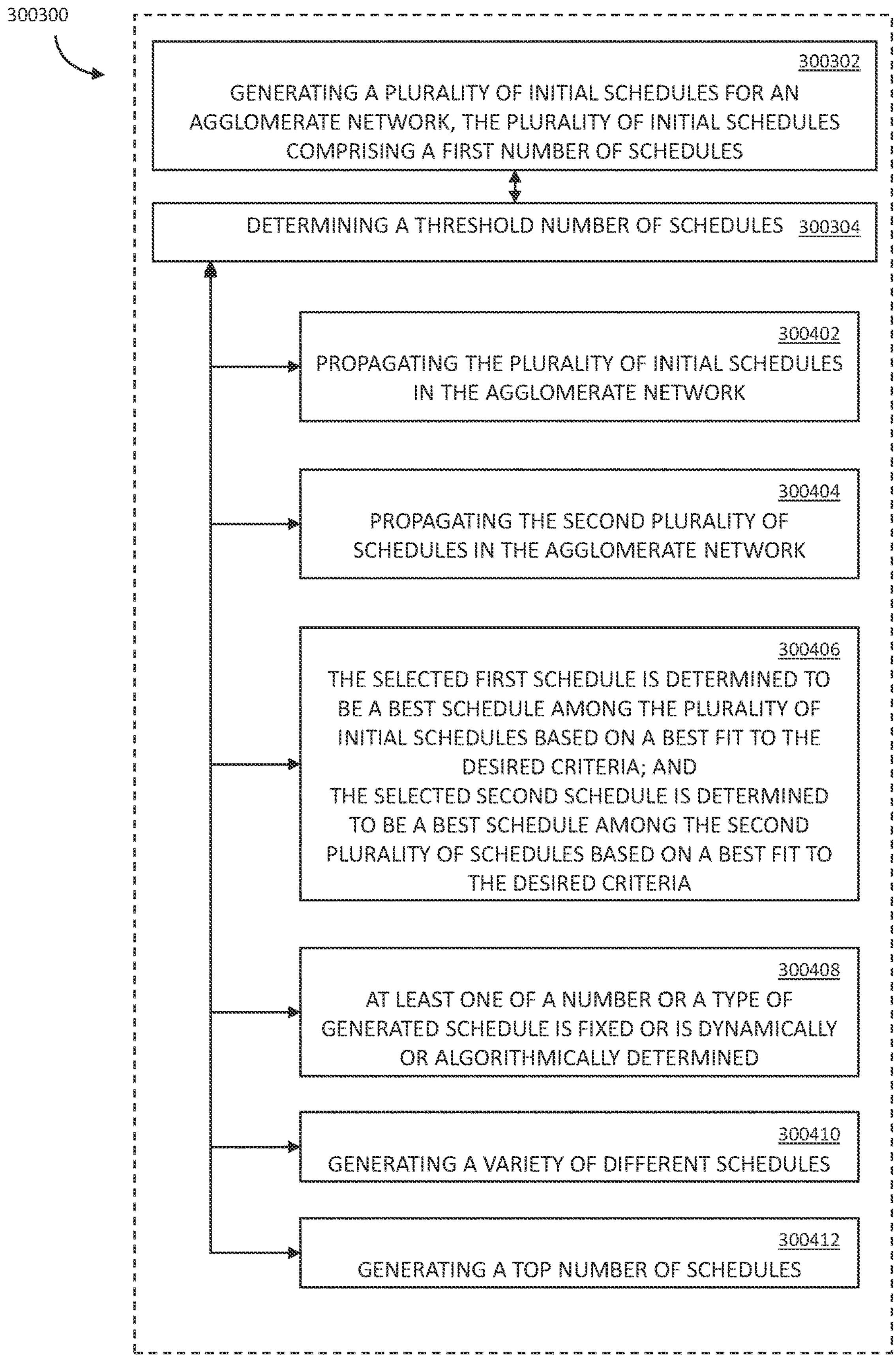
Figure 185:
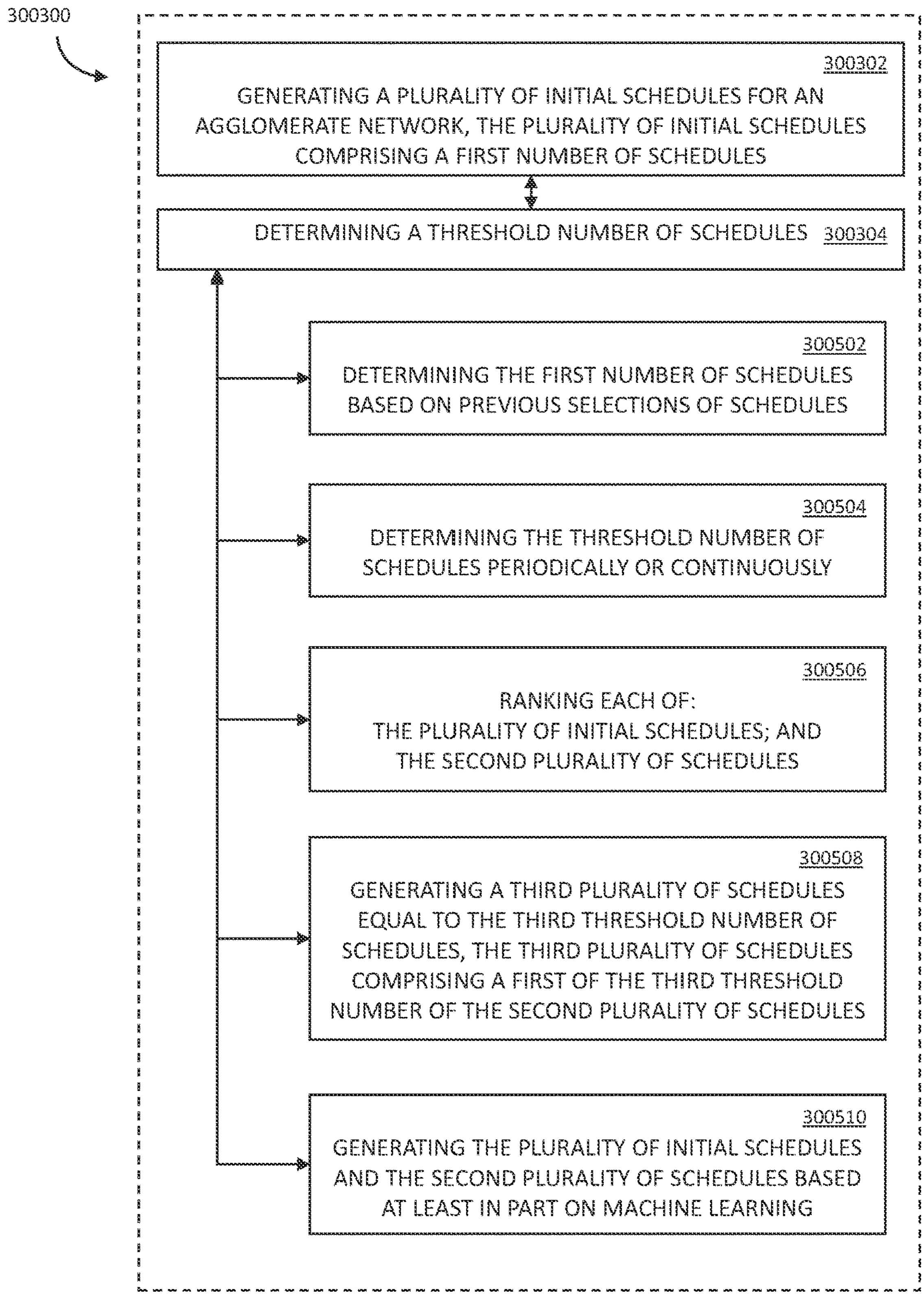
Figure 186:
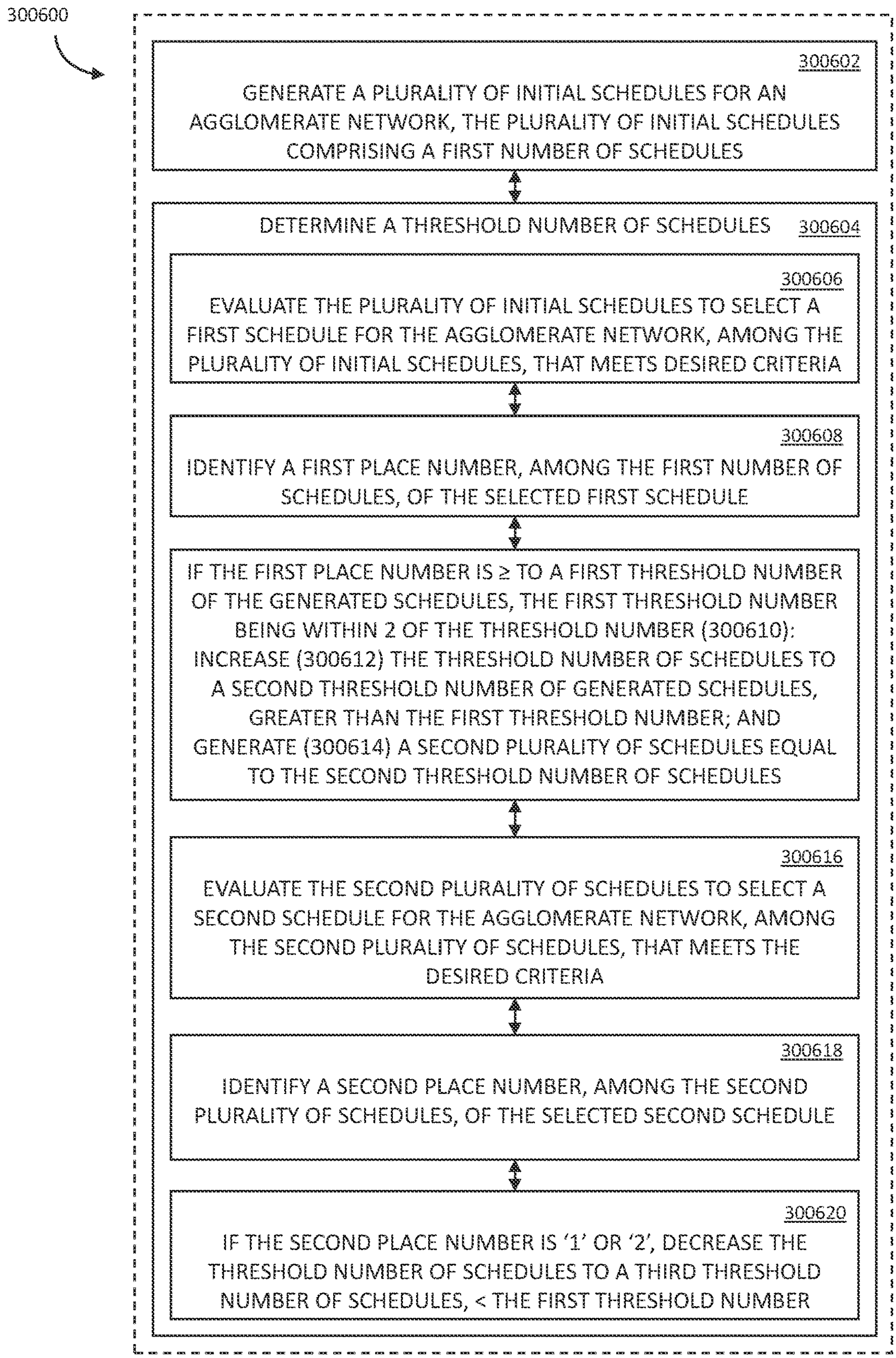
Figure 187:
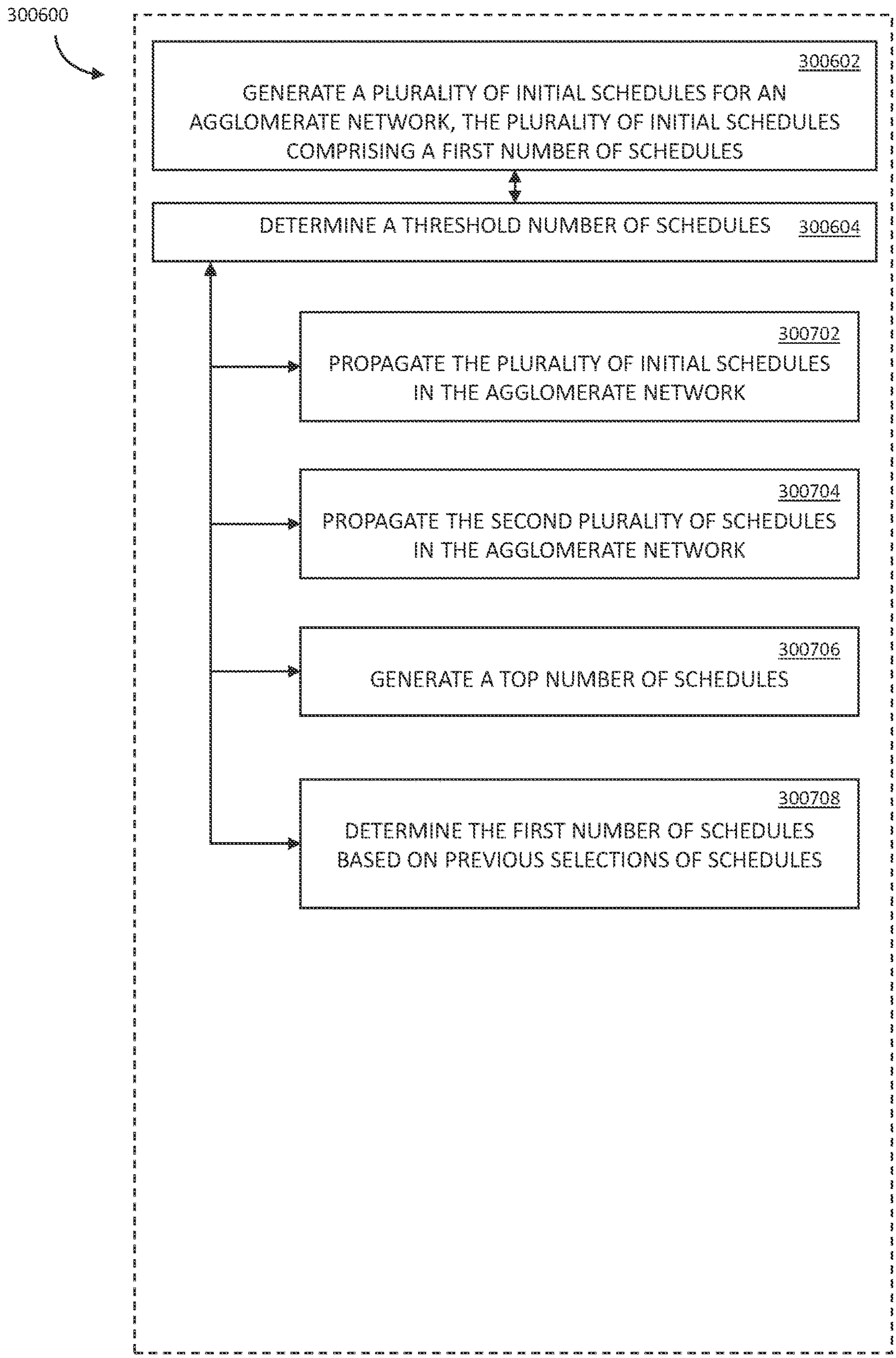

FIG. 132 depicts portions of an apparatus for letting workers compete for upcoming shifts, in accordance with embodiments of the current disclosure;

FIG. 133 depicts worker properties, in accordance with embodiments of the current disclosure;

FIG. 134 depicts shift properties, in accordance with embodiments of the current disclosure;

FIG. 135 depicts a method for enabling bidding on upcoming shifts, in accordance with embodiments of the current disclosure;

FIG. 136 depicts instructions for a processor, in accordance with embodiments of the current disclosure;

FIG. 137 depicts an apparatus for enabling workers compete for upcoming shifts, in accordance with embodiments of the current disclosure;

FIG. 138 schematically depicts an apparatus for connector biasing, in accordance with embodiments of the current disclosure;

FIG. 139 schematically depicts an apparatus for connector biasing, in accordance with embodiments of the current disclosure;

FIG. 140 schematically depicts an apparatus for connector biasing, in accordance with embodiments of the current disclosure;

FIG. 141 schematically depicts an apparatus for connector biasing, in accordance with embodiments of the current disclosure;

FIG. 142 depicts a flowchart for operations directed to connector biasing, in accordance with embodiments of the current disclosure;

FIG. 143 depicts a flowchart for operations directed to connector biasing, in accordance with embodiments of the current disclosure;

FIG. 144 schematically depicts an apparatus for connector biasing with constrained data, in accordance with embodiments of the current disclosure;

FIG. 145 schematically depicts an apparatus for connector biasing with constrained data, in accordance with embodiments of the current disclosure;

FIG. 146 schematically depicts an apparatus for connector biasing with constrained data, in accordance with embodiments of the current disclosure;

FIG. 147 schematically depicts an apparatus for connector biasing with constrained data, in accordance with embodiments of the current disclosure;

FIG. 148 schematically depicts an apparatus for connector biasing with constrained data, in accordance with embodiments of the current disclosure;

FIG. 149 schematically depicts an apparatus for connector biasing with constrained data, in accordance with embodiments of the current disclosure;

FIG. 150 depicts a procedure for connector biasing with constrained data, in accordance with embodiments of the current disclosure;

FIG. 151 depicts a procedure for connector biasing with constrained data, in accordance with embodiments of the current disclosure;

FIG. 152 schematically depicts an agglomerate network, in accordance with embodiments of the current disclosure;

FIG. 153 schematically depicts an agglomerate network, in accordance with embodiments of the current disclosure;

FIG. 154 schematically depicts an agglomerate network, in accordance with embodiments of the current disclosure;

FIG. 155 depicts a procedure of an agglomerate network, in accordance with embodiments of the current disclosure;

FIG. 156 depicts a procedure of an agglomerate network, in accordance with embodiments of the current disclosure;

FIG. 157 depicts a procedure of an agglomerate network, in accordance with embodiments of the current disclosure;

FIG. 158 depicts a procedure of an agglomerate network, in accordance with embodiments of the current disclosure;

FIG. 159 depicts a procedure of an agglomerate network, in accordance with embodiments of the current disclosure;

FIG. 160 depicts a procedure of an agglomerate network, in accordance with embodiments of the current disclosure;

FIG. 161 depicts a procedure of an agglomerate network, in accordance with embodiments of the current disclosure;

FIG. 162 is a block diagram depicting an apparatus for schedule spreading, in accordance with an embodiment of the current disclosure;

FIG. 163 is a block diagram depicting certain further aspects of an apparatus for schedule spreading, in accordance with an embodiment of the current disclosure;

FIG. 164 is a flowchart depicting a method for schedule spreading, in accordance with an embodiment of the current disclosure;

FIG. 165 is a flowchart depicting certain further aspects of a method for schedule spreading, in accordance with an embodiment of the current disclosure;

FIG. 166 is a block diagram depicting an agglomerate network for schedule spreading, in accordance with an embodiment of the current disclosure;

FIG. 167 is a block diagram depicting certain further aspects of an agglomerate network for schedule spreading, in accordance with an embodiment of the current disclosure;

FIG. 168 is a schematic diagram of an apparatus having agglomerate network circuits and connector circuits, in accordance with embodiments of the current disclosure;

FIG. 169 is a flowchart depicting a method for an agglomerate network, in accordance with embodiments of the current disclosure;

FIG. 170 is a schematic diagram of another apparatus having agglomerate network circuits and connectors circuits, in accordance with embodiments of the current disclosure;

FIG. 171 depicts rule-length-encoded (RLE) representations of schedules, in accordance with embodiments of the current disclosure;

FIG. 172 depicts the architecture of the convolutional neural network as determined by a scheme, in accordance with embodiments of the current disclosure;

FIG. 173 depicts a discriminator architecture determination table, in accordance with embodiments of the current disclosure;

FIG. 174 depicts a generator architecture determination table, in accordance with embodiments of the current disclosure;

FIGS. 175 and 176 depict discriminator architecture determination graphs, in accordance with embodiments of the current disclosure;

FIG. 177 depicts an example apparatus to improve network performance;

FIG. 178 depicts an example of an agglomerate network for generating schedule data;

FIG. 179 depicts an example method for improving the performance of an agglomerate network;

FIG. 180 depicts an example of processor actions resulting from instructions stored on a non-transitory computer-readable medium;

FIG. 181 is a block diagram depicting an apparatus for generating multiple schedules, in accordance with an embodiment of the present disclosure;

FIG. 182 is a block diagram depicting certain further aspects of an apparatus for generating multiple schedules, in accordance with an embodiment of the present disclosure;

FIG. 183 is a flow diagram depicting a method for generating multiple schedules, in accordance with an embodiment of the present disclosure;

FIG. 184 is a flow diagram depicting certain further aspects of a method for generating multiple schedules, in accordance with an embodiment of the present disclosure;

FIG. 185 is a flow diagram depicting certain further aspects of a method for generating multiple schedules, in accordance with an embodiment of the present disclosure;

FIG. 186 is a block diagram depicting a non-transitory computer-readable medium for generating multiple schedules, in accordance with an embodiment of the present disclosure; and FIG. 187 is a block diagram depicting certain further aspects of a non-transitory computer-readable medium for generating multiple schedules, in accordance with an embodiment of the present disclosure.

DETAILED DESCRIPTION

Without limitation to any other aspect of the present disclosure, aspects of the disclosure herein improve aspects of scheduling. Methods and systems described herein provide various improvements to scheduling by utilizing an agglomerate framework (also referred to as the agglomerate model herein). In one aspect, the agglomerate framework enables the utilization of a plurality of scheduling algorithms for identifying schedules. As used herein, the term schedule may include time-sequences, e.g., an ordered list or sequence of events, tasks, and/or shifts which may correspond to dates, days of the week, times of the day, etc. The plurality of scheduling algorithms may provide more accurate, higher quality, useful, and/or optimum schedules for a wide variety of situations, target types, requirements, and the like. The methods and systems described herein improve the technical field of scheduling. In one aspect the field of scheduling is improved by enabling faster and more accurate adaptations of schedules to changing environments and/or requirements. In another aspect, the field of scheduling is improved by enabling an automated system to capture and recreate subtle qualitative features or aspects of schedules that could not be previously captured using an automated system.

The systems and methods described herein provide various technical benefits and improvements over known systems and methods. In one aspect, a scheduling system is improved by providing a structure and framework where different scheduling methods may be used. In one aspect, the scheduling system enables the use of different scheduling modules and/or scheduling algorithms without modification of the modules and algorithms. In one aspect, the scheduling system enables the application of scheduling modules and algorithms for scenarios and scheduling configurations for which the scheduling modules and algorithms may not have been designed for. The scheduling system enables adaptations of existing scheduling modules and/or algorithms for new applications and scenarios thereby reducing scheduler development time, cost, and required resources since existing modules and algorithms may be reused and adapted.

The systems and methods described herein provide various technical benefits and improvements to computer technology. In one aspect, the methods and systems described herein provide for parallelization and/or distribution of computing tasks. The systems and methods enable schedule computation with a plurality of interconnected modules that may be distributed over different computing hardware. In one aspect, the computations of each module may be less complex and require fewer computation resources than a traditional monolithic implementation that may require large memory and computation resources. In one aspect, the methods and systems described herein provide for improvement to computer technology by enabling adjustable computer resource utilization. The systems and methods described herein include a modular and iterative structure that enable adaptable complexity for utilization and adaptation based on compute time, resource, and cost requirements and/or limitations. In one aspect complexity may be adjusted by adding or removing modules related to external data and/or adjusting the number of iterations used in computations.

In another aspect, the methods and systems described herein provide for improvement to computer technology by adapting and formatting data between different modules and/or algorithms used for computation. The methods and system include the use of configurable connectors that may adapt and format data outputs of different modules and/or algorithms that would normally not be compatible and/or usable between the different modules. In embodiments, various methods of biasing, data correction, and monitoring enable data compatibility and use between modules and/or algorithms that may normally not be compatible.

For the purpose of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains. The present disclosure describes systems, methods, and apparatuses using connectors that provide for architectures for networked, autonomous, agglomerated resource utilization modelers. Certain embodiments herein may provide for results, e.g., a scheduler and/or a schedule, to a user as a secondary step that utilizes an agglomerated model. Certain embodiments may turn all forecasted data into a schedule.

As used herein, a schedule may refer to work schedules where employees or other personnel and/or resources are scheduled for work or other duties at certain locations and/or times of the day. Schedules may include one or more different fixed schedules, part-time schedules, shift schedules, and the like. In some embodiments, schedules may include scheduling of one or more resources, such as physical goods, virtual goods, physical locations and virtual locations. Schedules may further include non-work schedules such as personal schedules, education schedules, organizational schedules, reservation schedules, appointment schedules, and any other type of schedule or combination thereof.

In embodiments, a schedule may be generated by a scheduler, also referred to herein as a "scheduling circuit/module/model", "scheduler circuit/module/model". In certain aspects of the current disclosure, a scheduler and/or a scheduling circuit may be referred to herein as a time-sequencer and/or a time-sequencing circuit. A scheduler may be configured to determine how to commit resources (such as employees) between a plurality of possible timeslots and/or tasks. In embodiments, a scheduler may be one or more of a computer algorithm, system, and/or a device that assigns resources according to one or more constraints of a resource and/or constraints on a task/timeslot. In embodiments, a scheduler may be configured to identify schedules by evaluating penalty functions according to the constraints of the resources and/or the constraints on the task/timeslot. In embodiments, various types of schedulers may be used to generate a schedule and may include a neural network, a deterministic algorithm, a brute force algorithm, a statistical algorithm, a probabilistic algorithm, and/or the like.

An agglomerate network may be a collection of various types of circuits/modules/models, as described herein, e.g., scheduler circuits, connector circuits, schedule analysis circuits, etc. As described in greater detail herein, the various circuits of an agglomerate network may be connected together, e.g., so that data can flow between them, via one or more connectors, also referred to herein as "connector circuit/modules".

Schedule analysis circuits/models/modules may analyze schedule data with respect to an object or for a purpose, e.g., determining if a generated schedule is unfair to a particular employee. Embodiments of schedule analysis circuits may generate data used to determine biases and/or select inputs and/or outputs for propagating data through an agglomerate network.

Schedule adjuster circuits/models/modules include circuits that interpret schedule data and make an adjustment to the schedule data.

An entity, as described herein, may be any entity or person, a company, a single plant, a number of co-located working locations, e.g., multiple plants within a common geographic region, a single manufacturing line with multiple stations, a set of manufacturing lines with similar skill requirements, a retail location, a restaurant, and the like where multiple workers may perform shift work. In certain aspects of the current disclosure, the term user may refer to an entity.

An employee, as described herein, may include any worker, whether paid or unpaid. An employee, as described, is not to be limited to the legal definition of an "employee" and is to include any individual who follows a schedule, either as part of a contracted or work-related obligation or as a volunteer. Non-limiting examples of employees, as contemplated by the current disclosure, include legal employees, contractors, interns, volunteers, etc. In certain aspects, an employee may include a user of a schedule.

A shift, as used herein, may include a unit and/or block of time for which one or more employees may be assigned to work, e.g., a schedule shift. A shift may include (or be made up of) other shifts, also referred to herein as sub-shifts.

Non-limiting examples of contracts, as used herein, include: written contracts, oral contracts, formal contracts, and/or informal contracts. A contract, as used herein, is not limited to the legal definition of the term "contract" and, as such, contracts related to embodiments of the current disclosure need not require consideration. As such, contracts, as used herein, may refer to any agreement, understanding, or promise, e.g., a set of terms. Contracts, as used herein, may be based on course of a dealing and/or may be de facto.

Embodiments of the system, as disclosed herein, may also provide for pattern detection of preferences, rules and/or constraints. The detection may use artificial intelligence (AI) and/or machine learning (ML) to observe sets or histories of schedules to detect when patterns may occur. In some embodiments, schedules or schedule edits over time may be observed to contain one or more patterns. For example, detecting or determining that a particular employee prefers not to work a certain shift even if it is not explicitly mentioned in their preferences. As another example, embodiments of the current disclosure may detect or determine certain equivalences, e.g., a workload can be handled by four (4) new employees or three (3) experienced employees. As another example, embodiments of the current disclosure may observe that when two particular employees work together, their output may be particularly high or low. Embodiments of the current disclosure may also build and/or modify schedules, constraints, suggestions, requests for confirmations, profiles, HR employee performance information, etc., with these observed patterns.

In embodiments, different schedulers may generate different schedules for the same constraints. In some cases, different schedulers may be optimized for different targets, industries, regions, situations, and the like. In some cases, schedules may be configured for different targets, regions, and the like by adjusting penalty functions.

In some embodiments, schedulers may receive external data related to constraints, events, financial information, and the like. Schedulers may receive data from one or more forecasting models such as weather, financial, event, traffic, and/or other models. Different models/modules/circuits may be incorporated into scheduling.

Figure 1:
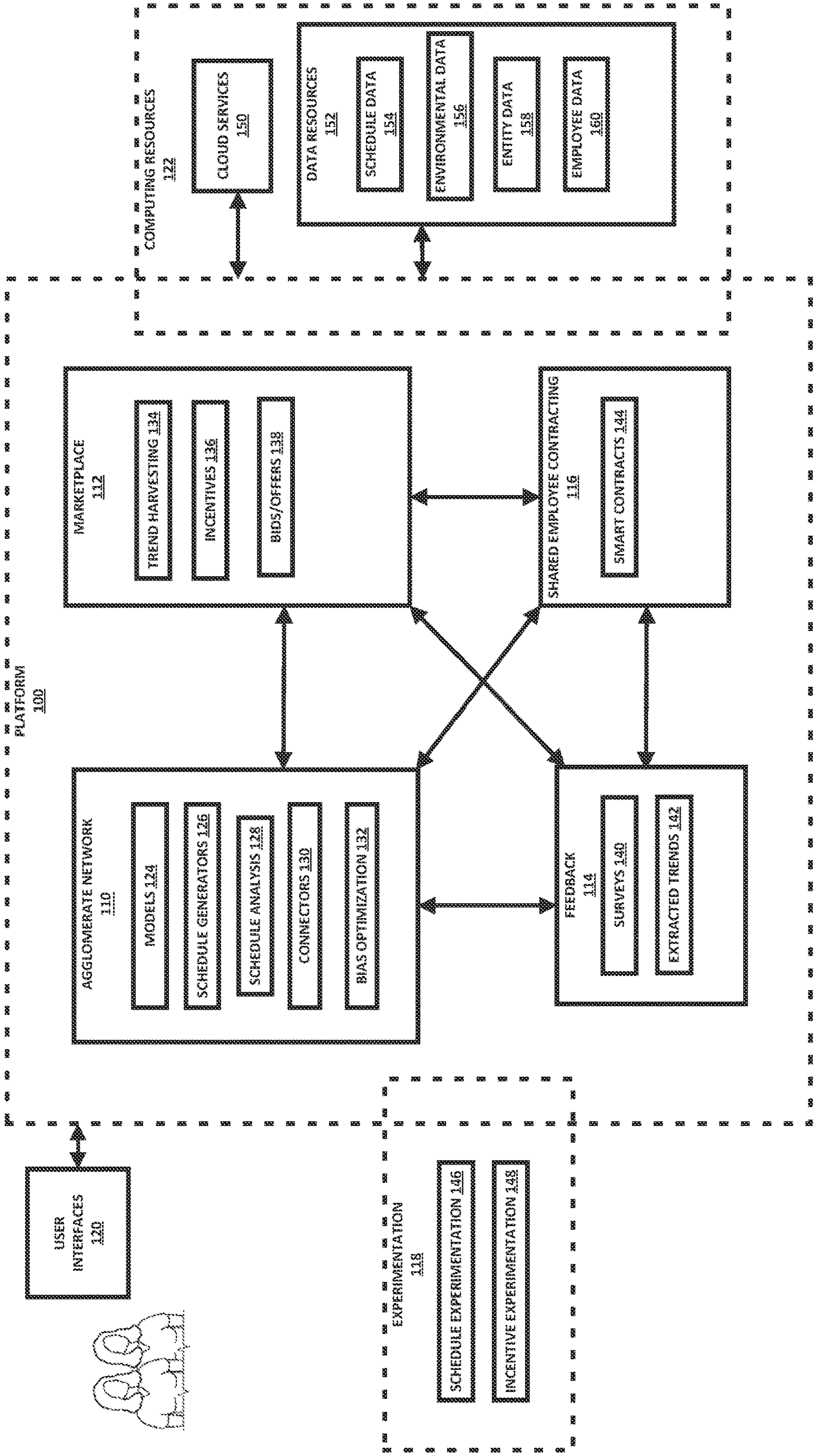
FIG. 1 depicts a platform for generating schedules using an agglomerate network, in accordance with embodiments of the current disclosure.

Accordingly, referring now to FIG. 1, embodiments of the current disclosure provide for a platform 100 for generating schedules using an agglomerate network component/module/circuit 110. Embodiments of the platform 100 also provide for: a marketplace component/module/circuit 112 for exchange of schedule related items; a feedback component/module/circuit 114; a shared employee contracting component/module/circuit 116; and/or an experimentation component/module/circuit 118 for designing and/or executing scheduling and incentive related experiments. The platform 100 may further provide for user interfaces 120, e.g., graphical user interfaces (GUIs); and/or include (and/or access) a variety of computing resources 122.

The agglomerate network component 110 may include models 124, schedule generators 126, a schedule analysis component 128, connectors 130, a bias optimization component 132, and/or other types of agglomerate network modules/circuits, which are described in greater detail herein. Embodiments of the agglomerate network component 110 provide for the formation/generation/assembly of an agglomerate network and/or the generation of scheduling data. Aspects of the agglomerate network component 110 may interface with one or more of the other components of the platform 100, e.g., the marketplace component 112, feedback component 114, shared employee contracting component 116, computing resources 122, experimentation component 118, and/or the user interfaces 120.

The marketplace component 112 may include a trend harvesting component 134, an incentives component 136, and/or a bids/offers component 138. Embodiments of the marketplace component 112 may provide for employees to bid on and/or trade schedule shifts where information regarding marketplace activities, e.g., what is the most desirable shift, is gleaned from the marketplace component 112 and used in the experimentation 118 and/or agglomerate network 110 components.

The feedback component 114 may include a surveys component 140, an extracted trends component 142, and/or other types of agglomerate network modules/circuits, which are described in greater detail herein. Information collected via the feedback component 114 may be used in the agglomerate network 110 and/or experimentation 118 components.

The shared employee contracting component 116 may include a smart contracts component 144, and/or other types of agglomerate network modules/circuits, which are described in greater detail herein. Embodiments of the shared employee contracting component 116 may seek to optimize an employee's availability across one or more entities and/or to provide flexibility in scheduling shifts.

The experimentation component 118 may include a schedule experimentation component 146, an incentive experimentation component 148, and/or other types of agglomerate network modules/circuits, which are described in greater detail herein.

The computing resources component 122 may include a cloud services component 150, a data resources component 152, and/or other types of agglomerate network modules/circuits, which are described in greater detail herein. The data resources component 152 may include a schedule data component 154, an environmental data component 156, an entity data component 158, an employee data component 160, and/or other types of agglomerate network modules/circuits, which are described in greater detail herein. The cloud services component 150 may include one or more servers (or access to one or more services) that provide processing services to execute the methods disclosed herein. In embodiments, the cloud services 150 may include devices incorporating one or more of the modules/circuits disclosed herein, such as those forming the platform 100.

Figure 2:
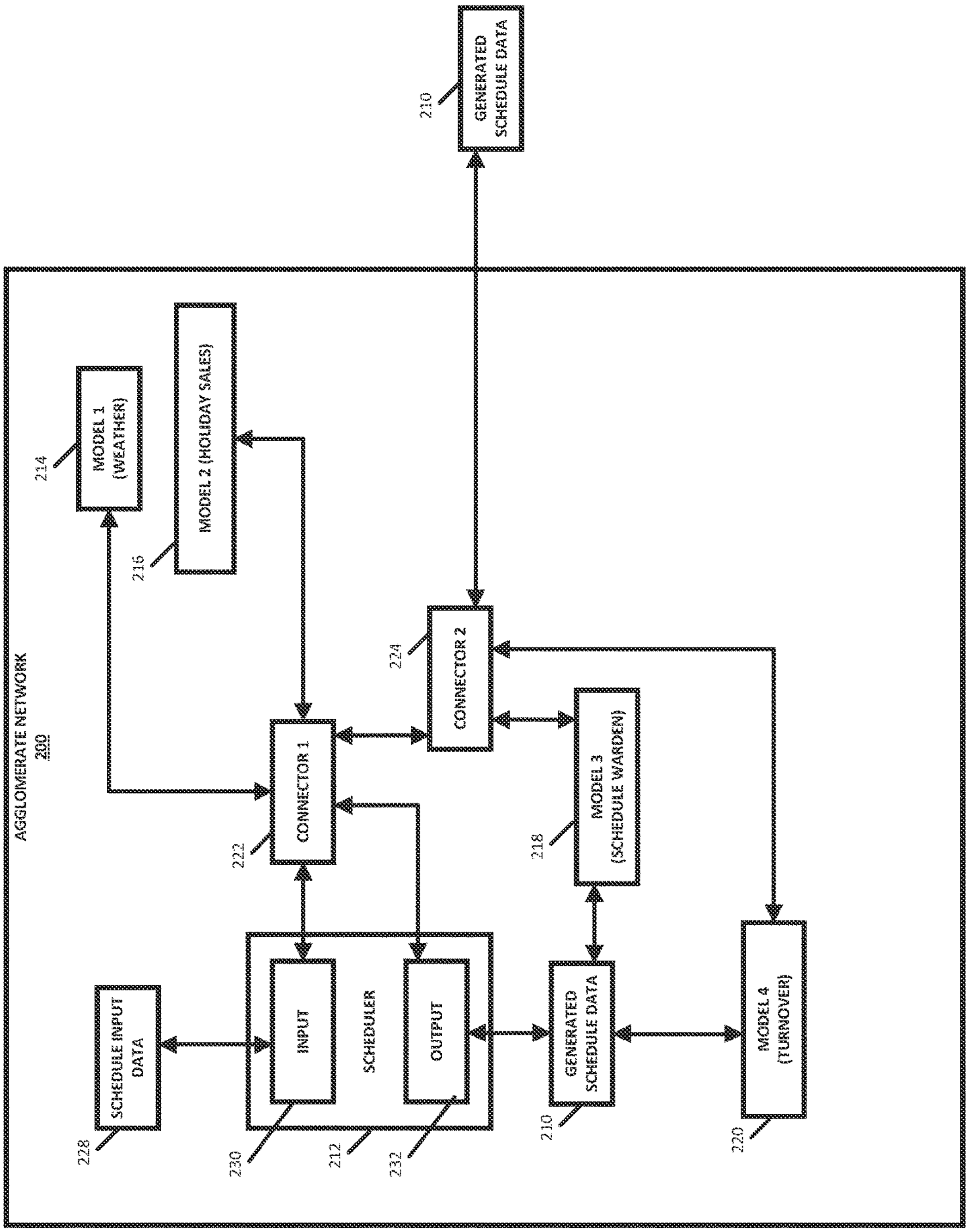
FIG. 2 depicts an agglomerate network, in accordance with embodiments of the current disclosure.

As illustrated in FIG. 2, systems, e.g., the platform 100 (FIG. 1), and methods described herein provide for an agglomerate network 200 that generates schedule data 210 via one or more agglomerate network modules/circuits, e.g., 212, 214, 216, 218, 220 connected via one or more connector modules/circuits 222, 224. The agglomerate network may include a plurality of different schedulers, scheduling models, data models, forecasting models, and the like. In embodiments, the connectors may be configurable. Configurable connectors may enable the agglomerate network 200 to be configured to generate a schedule, e.g., schedule data 210, using different combinations of models, 214, 216, 218, 220, and data. The configuration of the agglomerate network may be selected so as to provide improved performance of a schedule. For example, the agglomerate network 200 may include a scheduler 212 that receives schedule input data 228 and generates schedule data 210, where the schedule data 210 is altered (e.g., biased, reformatted, etc.) by a connector 222 based on data generated by a weather model 214 and a holiday sales model 216, where the scheduler 212 itself may not be structured to incorporate and/or account for weather and/or holiday sales. As further shown in FIG. 2, a connector, e.g., 222 may manipulate the input(s) 230 and/or the output(s) 232 of an agglomerate network circuit 212. Thus, as will be appreciated, connectors, as disclosed here, provide for the incorporation of information into a module that the module is not structured to use and/or otherwise account for without having to edit the module, e.g., edit the module's software. Connectors, as disclosed herein, also provide for the ability to link disparate modules together to form an agglomerated network where the resulting agglomerated network produces more accurate scheduling data as compared to what would be provided by the disparate modules individually.

In one aspect, the methods and systems described herein improve the performance and quality of generated schedules. The performance and quality of a schedule may be determined using various qualitative and quantitative measures. In one example the quality of a schedule may be determined by monitoring a schedule across one or more dimensions such as schedule coverage, absenteeism, work-life balance, feedback from users, resource utilization, adequacy of staffing, profit objectives, and the like. As used herein, the terms "target", "goal", "aim", and "intent" may also be used to refer to an objective. Schedules may be scored across a plurality of dimensions to determine a quality metric score. In one aspect the quality score may be a weighted function of one or more dimensions of a schedule. In some cases, the weighted function may be adjusted for different industry types, enterprise sizes, objectives, and the like. In another example, the performance and quality of a schedule may be determined by monitoring the number, frequency, and/or magnitude of adjustments or changes that are made to a schedule. In some cases, frequent or large changes to a schedule by users may indicate that the automatically generated schedule did not meet the schedule requirements and may be scored lower than a schedule that was not edited by a user.

In embodiments, a configuration of an agglomerate network may be configured based on past performance of generated schedules for specific targets, situations, industries, and the like. In embodiments, the configuration of the agglomerate network for generating a schedule may be adjusted during the schedule generating process based on user input, outputs of one or more models of the agglomerate network and the like.

Accordingly, embodiments of the current disclosure may provide for systems and methods for autonomously constructing agglomerated resource utilization models from a set of largely independent, networked models. Notably, embodiments of the systems and methods may actively consume networked models and information, and in one aspect enable the autonomous discovery of resource availability, resource constraints, resource condition, future resource scheduling requirements, and additional related and/or correlated data which may form a set of agglomerated models and/or data. For example, the systems and methods may explore analogous (e.g., similar company) or related (e.g., a parent or child company) resource availability, resource constraints, resource condition, future resource scheduling requirements, and additional related and/or correlated data. In addition, or alternatively, the systems and methods may look for features to use with one or more of the agglomerated networks, models, or schedules. In some embodiments, the autonomous discovery may include a Natural Language Processing (NLP) engine which explores information that may impact the resources, models, constraints, conditions, requirements, and/or schedules. For example, a website may advertise a sale adjacent to one of the stores for which schedules are being created. The sale may affect customer traffic at that location, and the system will consider this information. In another case, a news article may describe a labor shortage in a particular city of interest to the systems and methods which may affect labor costs in that location. Using various types of information, embodiments of the system may generate and/or update one or more models to be included in a set of agglomerated models and data, where the agglomerated models may describe a set of interrelated resource models such as schedules, capacity plans, etc. Interconnecting agglomerate models/circuits may support the efficient sharing of more accurate model data by detecting, understanding, and/or correcting for biases in individual or combined agglomerate model results, and/or by intelligently associating model confidences for source, intermediate, and/or final model data. In contrast to existing technologies, the system and/or methods may autonomously and/or efficiently improve a set of independent and/or dependent agglomerated resource models across multiple time and feature horizons to improve quality and confidence.

Figure 3:
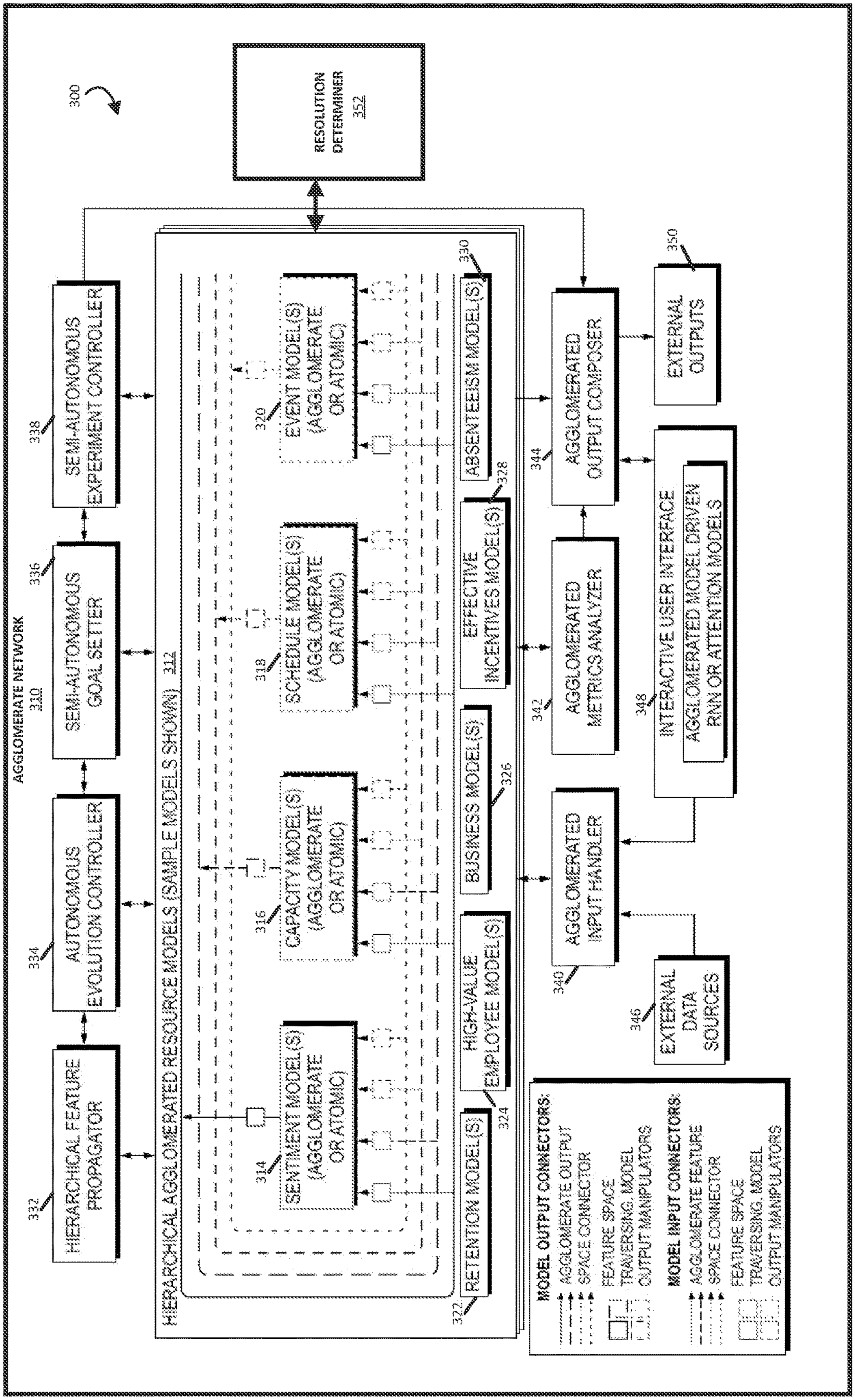
FIG. 3 depicts an architecture for an autonomous agglomerated resource utilization modeler, in accordance with embodiments of the current disclosure.

Embodiments of the current disclosure may include an autonomous agglomerated resource utilization modeler architecture. Accordingly, shown in FIG. 3 is an architecture 300 for an Autonomous Agglomerated Resource Utilization Modeler for an agglomerate network 310, in accordance with embodiments disclosed herein. As will be appreciated, the level of abstraction shown in FIG. 3 highlights the synergistic and reinforcing relationship between the set of agglomerated models/circuits/modules.

Embodiments of the architecture 300 may include hierarchical agglomerated resource models 312 including sentiment models 314, capacity modules 316, schedule models 318, event models 320, retention models 322, high-value employee models 324, business models 326, effective incentive models 328, absenteeism models 330, and/or any other models described herein or otherwise suitable for schedule generation. In embodiments, the agglomerated models contain a group of cross coupled models, which may be developed independently and/or for distinct purposes. The cross coupled models may be associated in this grouping because they generate information useful to the efficient production of improved resource scheduling information. The agglomerate models may represent models that include models, systems and methods described herein and may further include third-party models capable of consuming information and/or producing data and information useful to the operation of other agglomerate models. In embodiments, the agglomerate models may individually and/or collectively support the calculation of resource scheduling and/or interim results across multiple dimensions including, but not limited to, time, region, organizational, and/or level of abstraction.

Embodiments of the architecture 300 may further include a hierarchical feature propagator (HFP) 332, an autonomous evolution controller 334, a semi-autonomous goal setter 336, a semi-autonomous experiment controller 338, an agglomerated input handler 340, an agglomerated metrics analyzer 342, and agglomerated output composer 344, external data sources (or access to the external data sources) 346, an interactive user interface 348, external outputs 350, as resolution determiner 352, and/or other components/modules/circuits described herein.

Figure 4:
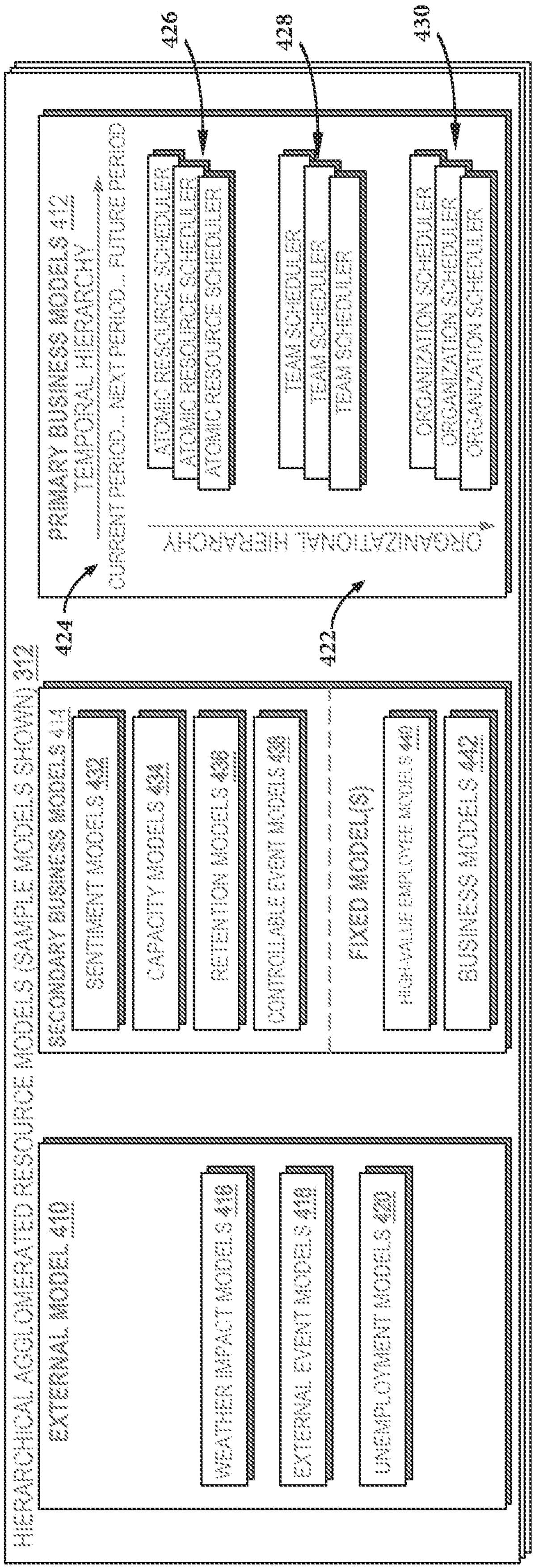
FIG. 4 depicts primary and secondary resource models in accordance with embodiments of the current disclosure.

FIG. 4 depicts additional hierarchical agglomerated resource models/circuits/modules 312 which can include external models 410, primary business models 412, and/or secondary business models 414. The external models 410 may include weather impact models 416, external event models 418, and/or unemployment models 420. the primary biasness models 412 may be arranged according to organizational hierarchy 422 and/or a temporal hierarchy and include one or more atomic resource schedulers 426, team schedulers 428, and/or organizational schedulers 430. The secondary business models 414 may include sentiment models 432, capacity models 434, retention models 436, controllable event models 438 and/or fixed models, e.g., high-value employee models 440, and/or business models 442.

Figure 5:
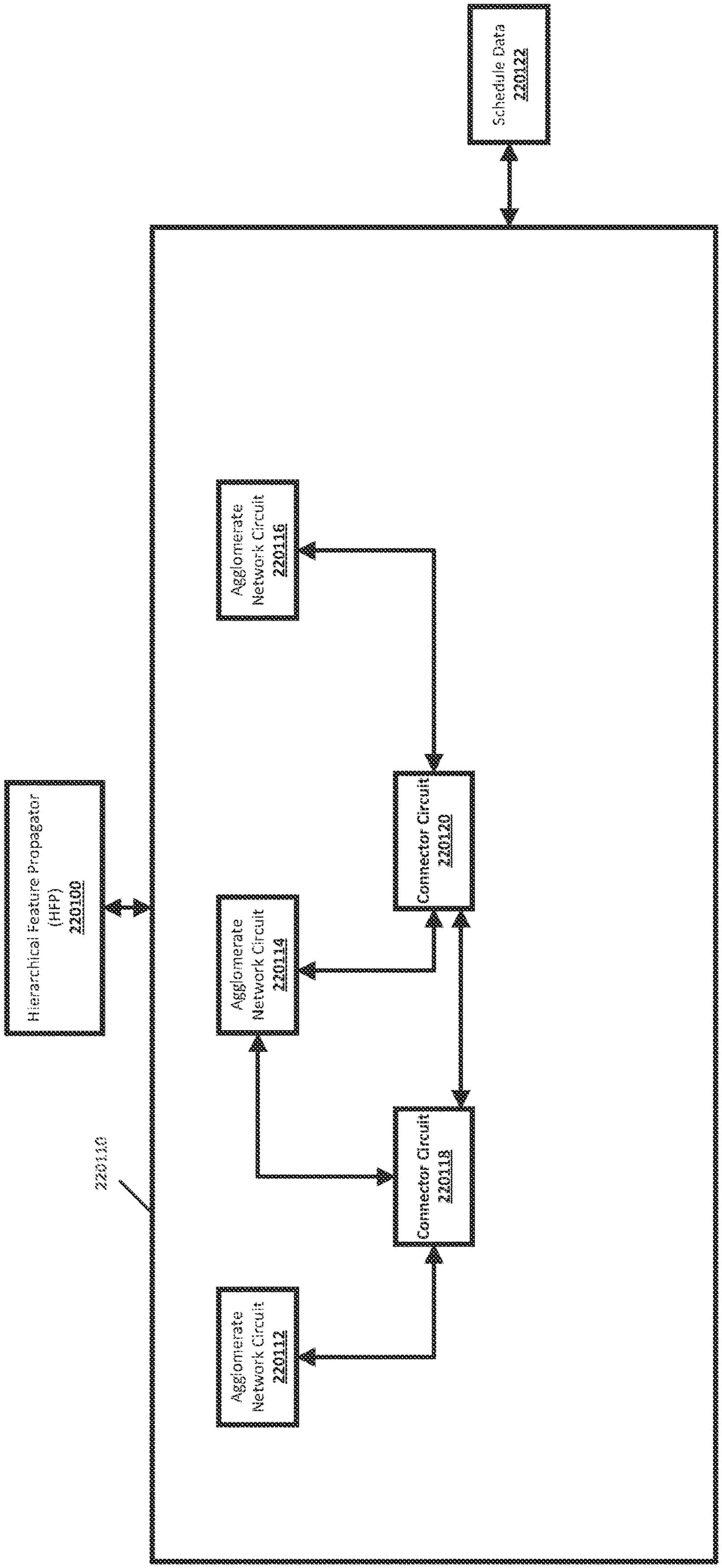
FIG. 5 is a schematic diagram of an agglomerate network and a hierarchical feature propagator (HFP), in accordance with embodiments of the current disclosure.

Referring to FIG. 5, embodiments of the current disclosure provide for a hierarchical feature propagator (HFP) 220100 which may be a type of module/circuit that determines (and/or may constantly determine) what type of data, e.g., 152 (FIG. 1) is needed for a particular scheduling scenario, how to locate the data within an organization having a hierarchical structure (organization chart), and/or determines how to condition data for use in an agglomerate network 220110 having one or more agglomerate network modules/circuits 220112, 220114, 220116 and connectors 220118, 220120 that generate schedule data 220122. In embodiments, the HFP 220100 may determine which modules/circuits, e.g., 124 (FIG. 1), and/or connectors, e.g., 130 (FIG. 1), are included in an agglomerate network, e.g., 110 (FIG. 1), and/or how the modules and/or connectors are configured. In embodiments, the HFP 220100 may determine how to split up a particular problem and/or scenario between multiple modules (which may work towards a joint solution or compete against each other). While the HFP 220100 is depicted in FIG. 5 as being apart from the agglomerate network 220110, embodiments of the HFP 220100 may be incorporated into an agglomerate network, e.g., the HFP 220100 may be an agglomerate network circuit/module, e.g., 220112, within the agglomerate network 220110.

Embodiments of the HFP 220100 may combine information from different levels of an organization, combine new and old data, e.g., historical data, and/or combine data from different regions, e.g., data from US northeast stores and data from US southwest stores.

Embodiments of the HFP 220100 may be useful for scenarios where organizational data may evolve over time, e.g., job and/or position changes. Embodiments of the HFP 220100 may identify information from similar franchises within the same company and leverage the data to improve the accuracy of schedules generated by an agglomerate network, e.g., 220110. In embodiments, the HFP 220100 may have access to an employee's past employment data, e.g., attendance, performance reports, etc., which may be accomplished via a blockchain, e.g., a digital resume. For example, a digital resume may contain an employee's attendance record for one or more past jobs which can be used to predict the employee's future attendance at their current employer and/or at a prospective employer. In embodiments, the HFP 220100 may determine it is warranted to combine the results of particular agglomerate network modules/circuits of the types described herein. For example, an HFP 220100 may determine to combine a prior employment history module/circuit, e.g., 220112, with an employee category/type module/circuit, e.g., 220114, to predict a doctor's attendance at a new hospital by combining an attendance prediction from their digital resume (a first agglomerate network module/circuit, e.g., 220112) with an attendance prediction based on doctors in general (a second agglomerate network module/circuit, e.g., 220114). In such a scenario, the HFP 220100 may configure a connector, e.g., 220120, to bias the results of the second module 220114 based on the results of the first module 220112 to predict whether the doctor is more or less likely to show up to work than the average doctor.

In embodiments, the HFP 220100 may control the learning processes of connectors 220118, 220120 and/or modules/circuits 220112, 220114, 220116 within an agglomerate network 220110. In embodiments, the HFP 220100 may monitor the modules/circuits 220112, 2201114, 220116, connectors 220118, 220120, and/or an entire agglomerate network 220110 to determine if the performance of one or more modules/circuits 220112, 220114, 220116 is satisfactory, e.g., based on user and/or industry standards. The HFP 220100 may adjust the configuration of the agglomerate network 220110 for training the connectors 220118, 220120. The HFP 220100 may adjust which modules/circuits 220112, 220114, 220116 and/or mix of module/circuit outputs are used to train connectors 220118, 220120. For example, historical data may identify schedules that were inaccurate due to a correlated event (such as a weather event). The HFP 220100 may train the connectors 220118, 220120 to include data from an appropriate weather module/circuit to update the connectors 220118, 220120 to take into account weather anomalies for future scheduling. In embodiments, the HFP 220100 may be trained to learn how to pick modules/circuit 20112, 220114, 220116, connectors 220118, 220120, and/or data sources for use in an agglomerate network 220110 for a given scenario, e.g., the HFP 220100 may "evolve" over time.

In embodiments, the HFP 220100 may adjust what modules/circuits and/or a mix of module outputs are used in the network based on what it learns about an end user of schedule data generated by the agglomerate network 220110. The HFP 220100 may use a hierarchy of modules/circuits and/or connectors as it learns what modules/circuits may be applicable to the customer. For example, at the beginning, e.g., when an HFP is first activated, the HFP 220100 may structure the agglomerate network 220110 to use high-level or generic modules/circuits. As more information is learned about the end user of the schedule data 220122 (such as specific data about employee attendance, industry metrics, and the like) more specific/detailed modules/circuits may be used in the mixing within the network 220110. The HFP 220100 may control what feedback loops are activated, e.g., loops made by a connector, e.g., 220118 feeding into an upstream agglomerate network circuit/module, e.g., 220112, based on what the connector learns about the end user. The training and/or reconfiguration of the network 220110 may be periodic (e.g., hourly, daily, weekly, monthly, yearly) or continuous based on feedback from schedules, triggers of new data, and the like.

In embodiments, the HFP 220100 determines how to use specific inputs (what mixing of circuit/modules 220112, 220114, 220116 and/or connectors 220118, 220120 to use) and, in certain scenarios, not what new data to include in the network 220110. In embodiments, the HFP 220100 may control the biasing of mixed output and/or change the mixing of modules/circuits 220112, 220114, 220116. In embodiments, the HFP 220100 may play a role in determining whether an agglomerate network 220110, and/or a portion thereof, is producing acceptable results or is not working as intended.

Figure 6:
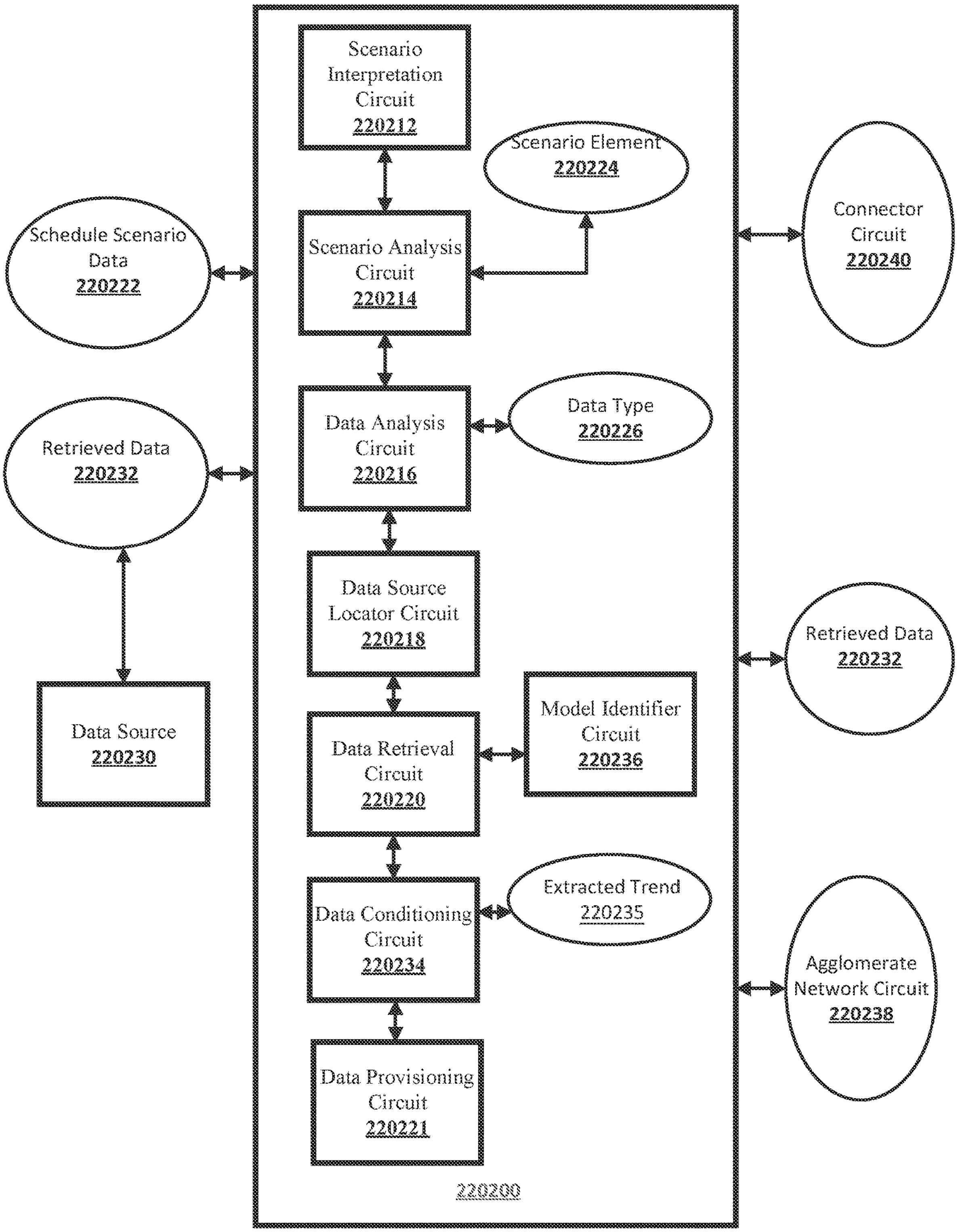
FIG. 6 is a schematic diagram of an apparatus having one or more aspects of an HFP, in accordance with embodiments of the current disclosure.

Illustrated in FIG. 6 is an apparatus 220200 embodying one or more aspects of the HFP 220100 (FIG. 5), in accordance with embodiments of the current disclosure. The apparatus 220200 may form part of a computing device that executes an agglomerate network, as disclosed herein, or it may be a device apart from one executing an agglomerate network. The apparatus 220200 may be an agglomerate circuit within an agglomerate network, e.g., 220110 (FIG. 5), or apart from an agglomerate network. The apparatus 220200 includes a scenario interpretation circuit 220212, a scenario analysis circuit 220214, a data analysis circuit 220216, a data source locator circuit 220218, a data retrieval circuit 220220, and a data provisioning circuit 220221. The scenario interpretation circuit 220212 is structured to interpret schedule scenario data 220222. In certain aspects of the current disclosure, schedule scenario data may be referred to as time-sequence scenario data. The scenario analysis circuit 220214 is structured to extract a scenario element 220224 from the schedule scenario data 2202222. Non-limiting examples of scenario elements 220224 include dates, special events, weather events, geographic data, employee data, business metrics and/or objects, and/or the like. The data analysis circuit 220216 is structured to determine, based at least in part on the extracted scenario element 220224, a type of data 220226 for inclusion in the generation of schedule data 220122 (FIG. 5) corresponding to the scenario data 220222. Non-limiting examples of types of data 220226 include weather data, organizational data, business metric data, scheduling data, feedback data, and/or the like. The data source locator circuit 220218 is structured to identify a source 220230 of the type of data 220226 for inclusion in the generation of the schedule data 220122 (FIG. 5). The data retrieval circuit 220220 is structured to retrieve data 2202232 from the identified source 220230. Non-limiting examples of data sources 220230 include databases operated by an entity operating apparatus 220200, databases operated by entities other than the entity operating the apparatus 220200, databases operated by an end user of the generated scheduled data 220122 (FIG. 5), and/or other data sources. The data provisioning circuit 220221 is structured to transmit the retrieved data 220232.

In embodiments, the type of data 220226 for inclusion in the generation of the schedule data 220122 (FIG. 5) relates to an organization hierarchy and the data retrieval circuit 220220 is further structured to crawl the organization hierarchy in the identified data source 220230. In embodiments, the retrieved data 220232 includes a relationship (including any association, dependency, or the like) between two employees of the organization. In embodiments, the apparatus 220200 further includes a data conditioning circuit 220234 structured to condition the retrieved data 220232 for use by at least one of a connector circuit, e.g., 220118 (FIG. 5), or an agglomerate network circuit, e.g., 220112 (FIG. 5), prior to transmission of the data 220232 via the data provisioning circuit 220221. In embodiments, conditioning of the retrieved data 220232 includes adjusting a format of the retrieved data 220232. The adjusted format may correspond to an expected format of an agglomerate network circuit. In embodiments, conditioning of the retrieved data 220232 includes rearranging the retrieved data 220232. In embodiments, conditioning of the retrieved data 220232 includes extracting a trend 220235 from the retrieved data 220232. Non-limiting examples of the trend 220235 include a decrease in sales volume, an increase in customer service complaints, an increase in employee complaints, an increase in employee turnover, etc. In embodiments, the retrieved data 220232 is a digital resume of an employee. The digital resume may be based at least in part on a blockchain (digital ledger).

In embodiments, apparatus 220200 further includes a model identifier circuit 220236 structured to determine, based at least in part on at least one of the type of data 220226 for inclusion in the generation of schedule data 220122 (FIG. 2210) or on the retrieved data 220232, an agglomerate network circuit 220238 for inclusion in an agglomerate network. For example, in embodiments, the type of data 220226 and/or the retrieved data 220232 may relate to weather and the model identifier circuit 220236 may determine that a weather mode circuit should be included in the agglomerate network 220110 (FIG. 5). In embodiments, the model identifier circuit 220236 may determine that a connector circuit/module 220240 should be included in the agglomerate network 220110. In embodiments, the model identifier circuit 220236 may determine one or more structural relationships, as described herein, for the connector circuit 220240 that should be included in the agglomerate network 220110, e.g., which agglomerate network circuits and/or connectors the connector 220240 should be connected to. The model identifier circuit 220236 may determine that a combination including an agglomerate network circuit and a connector circuit should be included in the agglomerate network. In embodiments, the model identifier circuit 220236 determines that a combination including two agglomerate network circuits should be included in the agglomerate network 220110.

Figure 7:
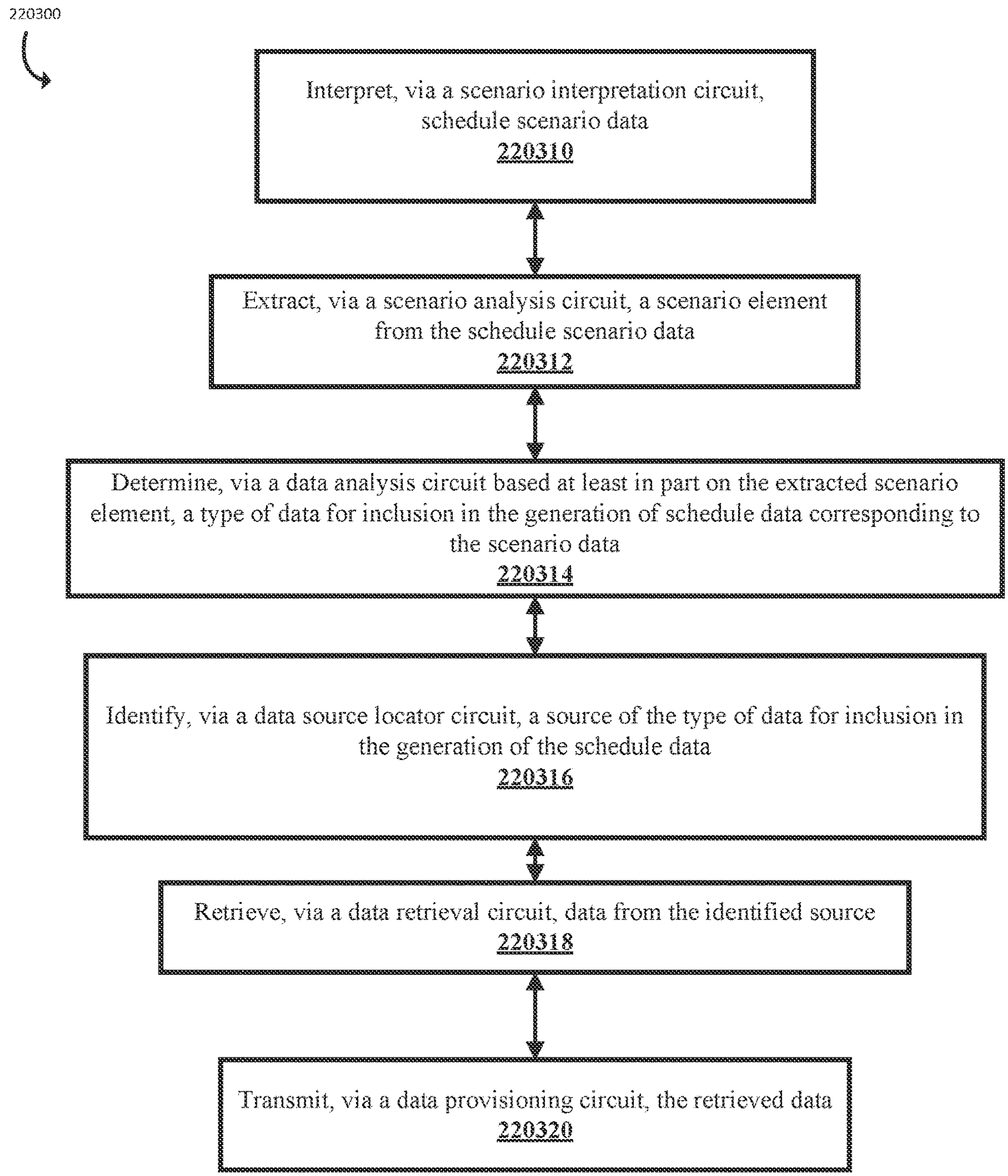
FIG. 7 is a method for an HFP, in accordance with embodiments of the current disclosure.

Illustrated in FIG. 7 is a method 220300 for an HFP, in accordance with embodiments of the current disclosure. The method 220300 may be performed via apparatus 220200 and/or any other computing device disclosed herein. The method 220300 includes interpreting, via a scenario interpretation circuit, schedule scenario data 220310; and extracting, via a scenario analysis circuit, a scenario element from the schedule scenario data 220312. The method 220300 further includes determining, via a data analysis circuit based at least in part on the extracted scenario element, a type of data for inclusion in the generation of schedule data corresponding to the scenario data 220314. The method 220300 further includes identifying, via a data source locator circuit, a source of the type of data for inclusion in the generation of the schedule data 220316. The method 220300 further includes retrieving, via a data retrieval circuit, data from the identified source 220318; and transmitting, via a data provisioning circuit, the retrieved data 220320.

Embodiments of the current disclosure may also provide for a non-transitory computer-readable medium storing instructions that adapt at least one processor to: interpret schedule scenario data; and extract a scenario element from the schedule scenario data. The stored instructions may further adapt the at least one processor to determine, based at least in part on the extracted scenario element, a type of data for inclusion in the generation of schedule data corresponding to the scenario data. The stored instructions may further adapt the at least one processor to identify a source of the type of data for inclusion in the generation of the schedule data; retrieve data from the identified source; and transmit the retrieved data.

In embodiments, when data is not available for a particular feature, or to improve the confidence level of an input feature, the Hierarchical Feature Propagator may look to other levels of the hierarchical configuration to provide and/or improve the input. Through interactions with the Model Input and Output Connectors, the feature propagator may draw a model's feature input data point from another agglomerate model representing the same organization directly, from a comparable agglomerate model data point from the same organization, from another comparable organization/group, and/or from an averaging or mixture of these sources. Further, the hierarchical feature propagator may instruct the output and input connectors to mix or combine data over different time scales. In embodiments, the Hierarchical Feature Propagator may mix in results from aggregated departments, franchises, and/or businesses to prevent over-fitting issues when new businesses, locations, departments, etc., are introduced, and there are insufficient data points to reliably train the localized models. In certain circumstances, some level of mixing may be appropriate long-term to prevent localized over-fitting of solutions.

In embodiments, mixing may involve adjusting which data sources one or more connectors receive input from and/or push results to. In other words, mixing may include adjusting the connections made via the connectors in an agglomerate network. Adjusting a connector may also include adjusting weights corresponding to one or more of its inputs. For example, a connector may draw its input(s) from generic sources learned from an aggregate of sources, which might be initially 90% weighted. The connector may also get info about a department and/or location, and then shift the bias (weights) to local establishment. In embodiments, a connector's weight bias might be used for a first scheduling algorithm at a first time and then shifted to a different value for use by a second scheduling algorithm at the same and/or a different time. In embodiments, a connector's weight bias might be used for a first scheduling algorithm at a first time and then shifted to a different value for use by the same scheduling algorithm at a different time. Non-limiting examples warranting a shift in a connector's bias may include emergency situations, detection of out-of-bound results and/or parameters from a prior scheduling operation, etc. In embodiments, mixing may be hierarchical, e.g., mixing may occur at one or more levels within a hierarchy of agglomerated networks, e.g., budgeting and scheduling at the same time.

In embodiments, mixing may include pulling constraints and/or preferences from one hierarchy to another, and/or from one scheduler to another. Mixing may also include merging constraints from different hierarchies and optimizing and/or simplifying the merged constraints. A non-limiting example of mixing may include running a scheduler at one level of the hierarchy and producing schedules, and then using those schedules as input into a second hierarchy or scheduler (which may have different algorithms, constraints, and weights) and seeing the resulting schedule(s), wherein the best scoring schedule from the second run may be selected for implementation. Mixing may also include analyzing and/or merging objective functions from different hierarchy levels. For example, objective function values for individual stores may be aggregated at a higher level such as a region. This aggregation may occur by adding the individual scores, taking the maximum, the average, etc., and using one or more of these values as input into a higher-level objective function. As another example, a higher-level objective function may override a lower-level objective function in some cases, e.g., an optimal region objective function may override one or more stores' optimal objective functions (below it in the hierarchy). In yet another example, an overridden store's objective function may remember this from a first schedule and increase its objective function value so that it does not override on the next (or other future) week's score. Similarly, a store that had its optimal, or near-optimal schedule accepted, may have its objective function value decreased so it does not always get its way over the store which had its objective function value overridden by the higher-level objective function. Thus, some stores do not always get their way over another store's preferred schedules. In yet another example, the system may observe which constraints lead to better employee moral/turnover, e.g., if one store has a constraint that an employee should work either Friday or Saturday but not both, and it might be observed to have lower attrition in a category of employees, e.g., high school students. In embodiments, the system may experiment with this constraint across other stores to see if it improves attrition in that category of employee.

Embodiments may include an autonomous evolution controller. Embodiments may provide for a schedule flexor, e.g., the autonomous evolution controller, and/or other components of the system described herein, may use an agglomerate network to automatically monitor human resource (HR) data to detect when an employee has a "life event" that warrants them working reduced and/or modified hours possibly at the expense of other employees.

Embodiments of the current disclosure may provide for incentive-based scheduling, e.g., an agglomerated network may use artificial intelligence (AI) to determine how to incentivize employees to accept and complete scheduled shifts. Incentives may be provided to employees to accept and/or make themselves available for particular shifts. Some embodiments may provide for iterative incentive development and/or provisioning, wherein incentives may get better on each iteration depending on how urgent the situation is. Embodiments may also forego offering and/or improving incentives where the agglomerate network detects a pattern by employees "holding out" to accept a schedule to improve their incentives. Embodiments of the current disclosure may integrate incentive-based scheduling with an HR recruiting tool. For example, a first company may not be able to reliably fill a schedule with a first set of schedule attributes, and a second company may have an employee who wants certain scheduling attributes that match the first set of schedule attributes.

Embodiments of the current disclosure include examples of systems and methods that use artificial intelligence (AI) to determine how to incentivize employees to accept and complete scheduled shifts. Embodiments may provide for an interactive process, with incentives improving/escalating/increasing in value on each iteration, depending on how urgent the situation is. Embodiments may be integrated with a human resource (HR) recruiting tool/platform and/or form part of component/modules 136, 114, and/or 116 (FIG. 1). For example, a first company may not be able to reliably fill a schedule with a first set of schedule attributes/properties, but a second company may have an employee who wants a certain first set of schedule attributes (and may be unable to get them reliably at the second company). Embodiments may provide for employees to provide feedback on incentives, which may take the form of a rating.

In embodiments, the incentives may be structured to encourage an employee to work extra hours on a shift for which they are already scheduled. In embodiments, the incentives may be structured to encourage an employee to work a portion of a shift, e.g., relieving a coworker for part of a shift and/or supplementing the coworker to make the shift easier. In embodiments, a shift may be a block of time and may be made up of smaller shifts. Shifts may be single occurrences or recurring. The recurrence may be daily, weekly, yearly, etc. In embodiments, the incentives may be structured to encourage an employee to take a particular role on a shift, e.g., a managerial role, running a particular machine, etc. A non-limiting use case may be a scenario concerning a garbage truck, in which the driver position has the incentive of being paid more, but also requires more work, and in which an employee can select to be the driver or not for a particular shift.

Embodiments of the incentive-based scheduler may be a module/circuit/model that receives inputs, e.g., a schedule and/or other data, e.g., biases, as a direct input, e.g., the incentive-based scheduler acts as a standalone module; as a direct input to an agglomerate network, e.g., without use of connectors; and/or from connectors, e.g., the incentive-based scheduler is one of a plurality of modules within an agglomerate network. For example, the incentive-based scheduler may be a module within an agglomerate network that receives a schedule (e.g., either directly as input to the agglomerate network or from a schedule generation module in the agglomerate network) and evaluates whether the schedule warrants incentives tied to particular shifts in the schedule. The output of the incentive-based scheduler module (e.g., a schedule with associated incentives) may be passed to other modules in the agglomerate network for evaluation. A revised version of the schedule, for example, made by the other modules in the agglomerate network, may be passed back into the incentive-based scheduler module for revaluation by the incentive-based scheduler module. The connections between the incentive-based scheduler module and the various other modules of the agglomerate network may be accomplished, for example, via connectors.

Figure 8:
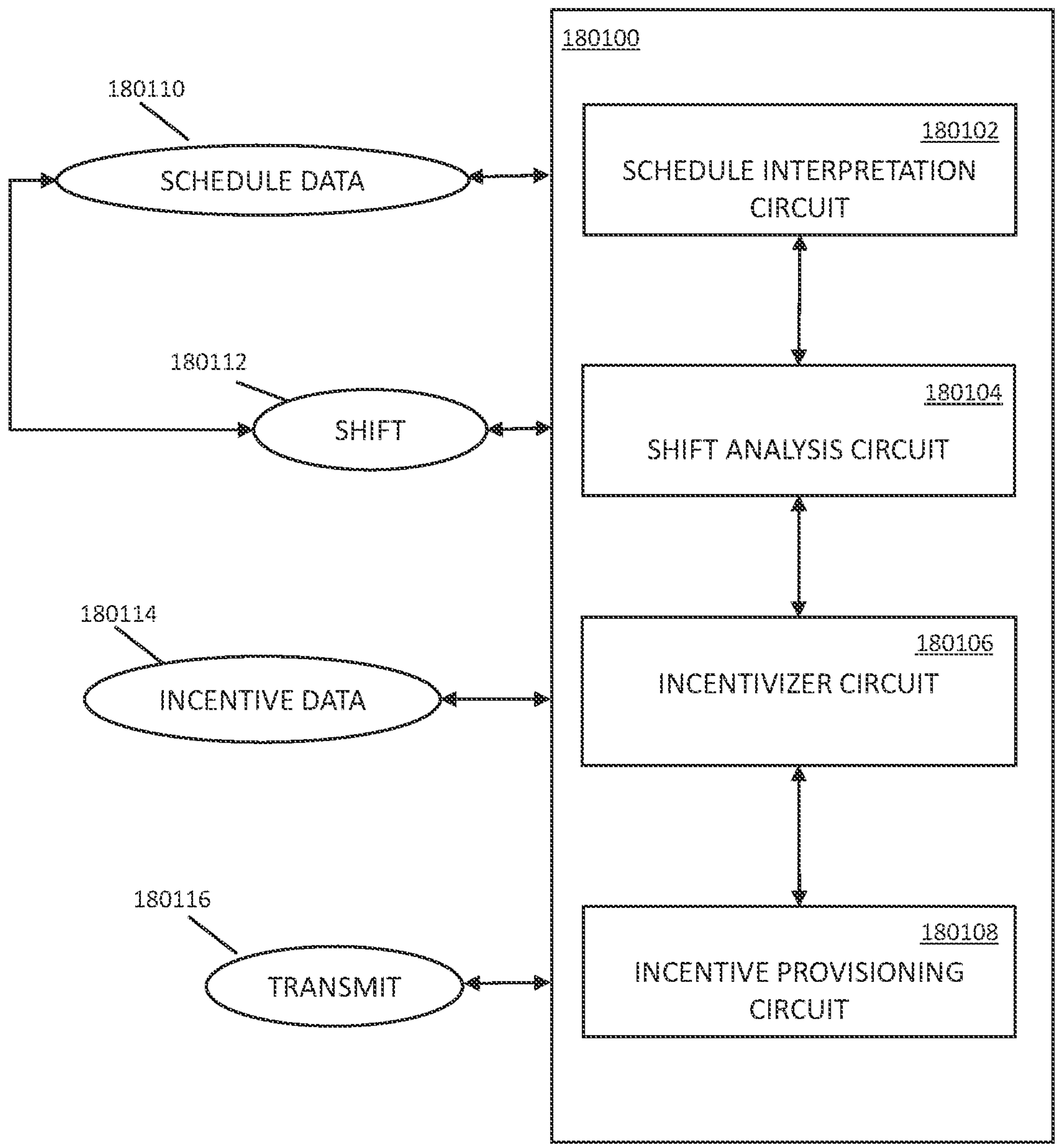
FIG. 8 is a schematic diagram depicting an apparatus for an incentive-based scheduler, in accordance with an embodiment of the present disclosure.

Referring to FIG. 8, an apparatus 180100 may be provided. The apparatus 180100 includes a schedule interpretation circuit 180102, a shift analysis circuit 180104, an incentivizer circuit 180106, and an incentive provisioning circuit 180108. The schedule interpretation circuit 180102 is structured to interpret schedule data 180110. The shift analysis circuit 180104 is structured to analyze the schedule data 180110 and identify a shift 180112. The incentivizer circuit 180106 is structured to determine incentive data 180114 for the shift 180112. The incentive provisioning circuit 180108 is structured to transmit 180116 the incentive data.

Figure 9:
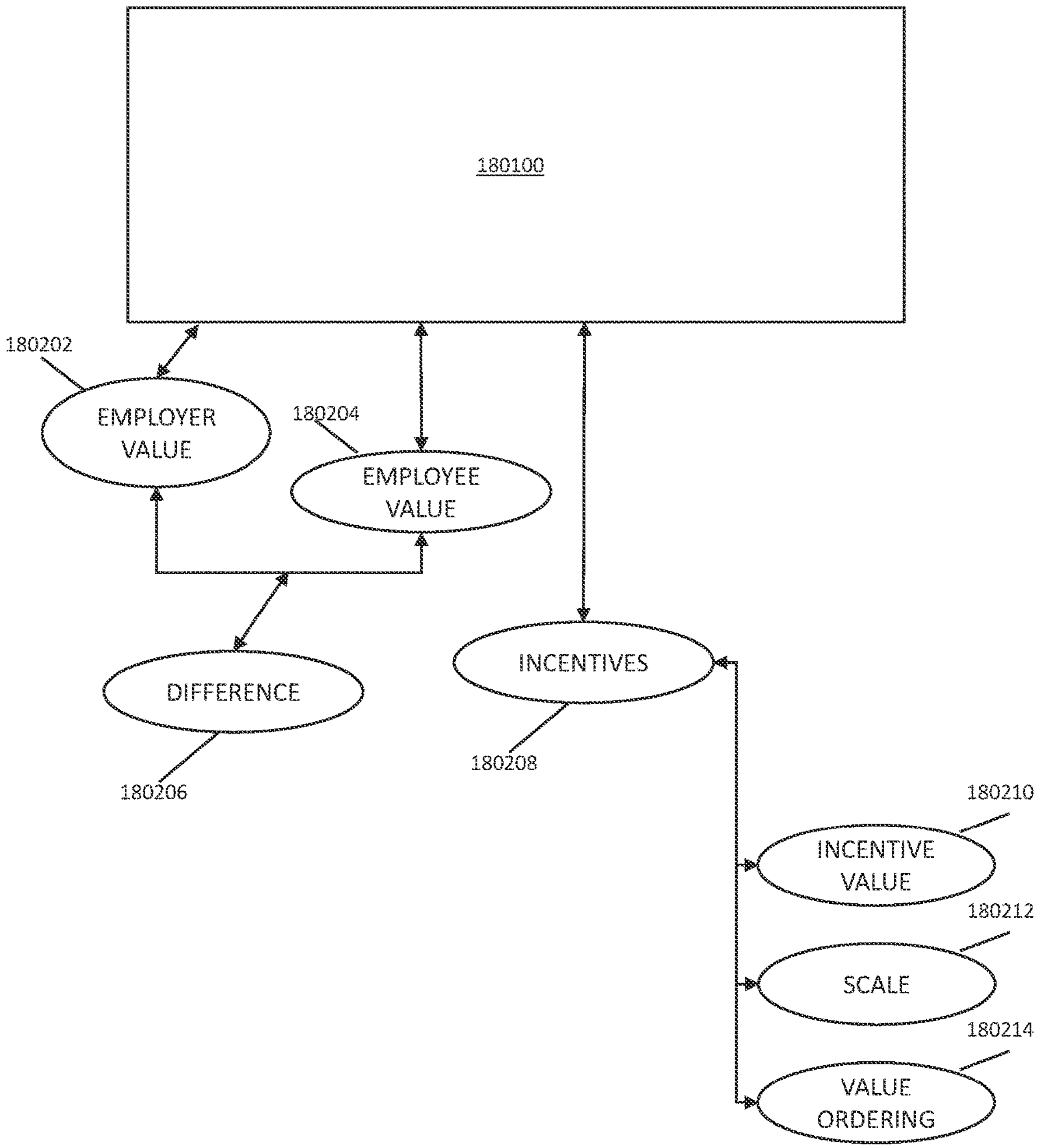
FIG. 9 is a schematic diagram depicting certain further aspects of an apparatus for an incentive-based scheduler, in accordance with an embodiment of the present disclosure.
Figure 10:
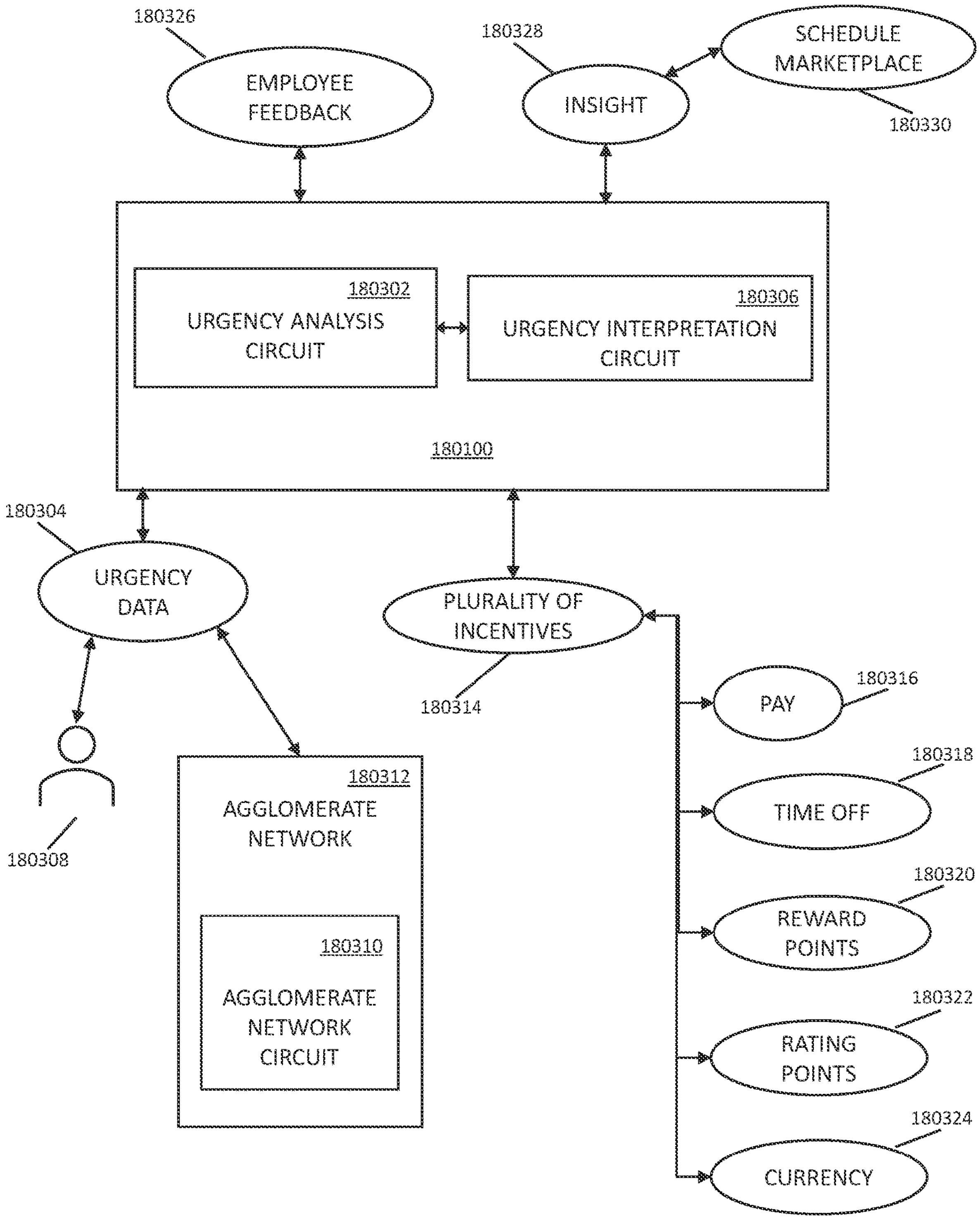
FIG. 10 is a schematic diagram depicting certain further aspects of an apparatus for an incentive-based scheduler, in accordance with an embodiment of the present disclosure.
Figure 11:
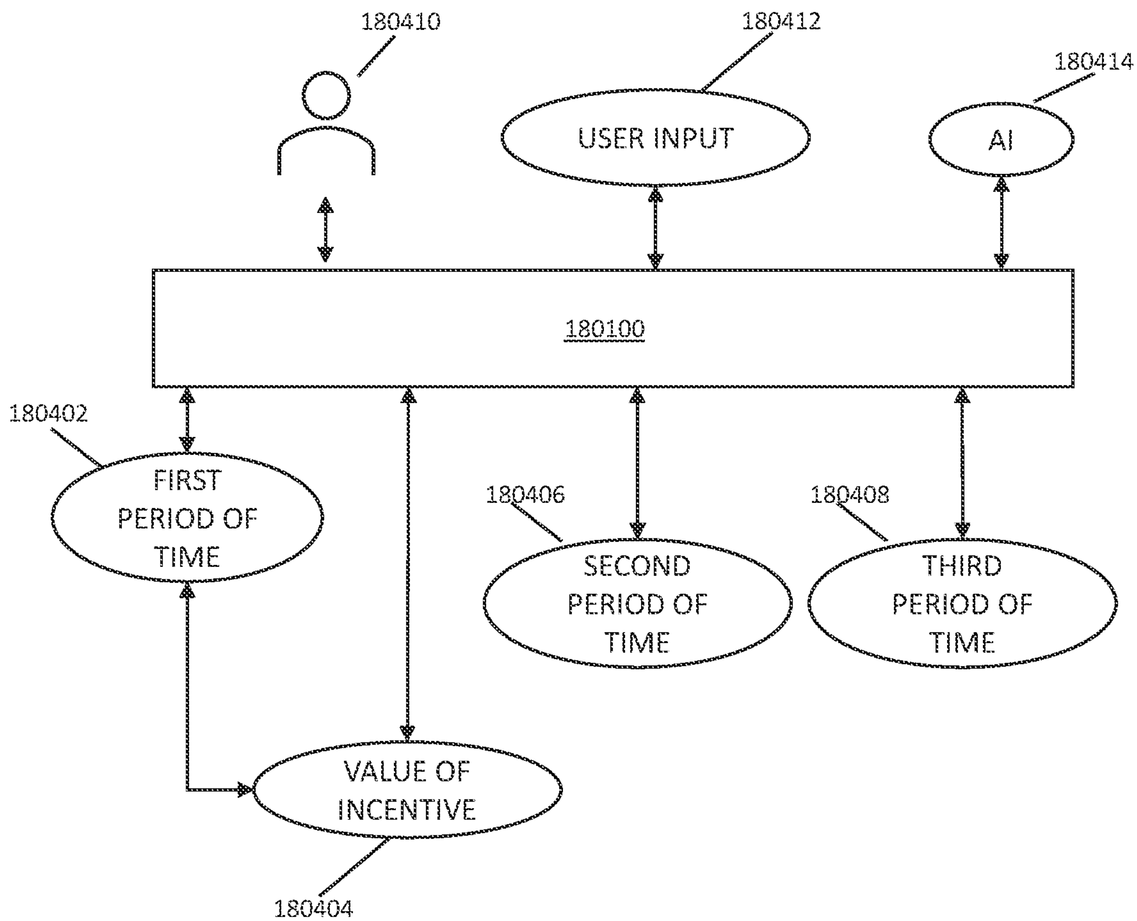
FIG. 11 is a schematic diagram depicting certain further aspects of an apparatus for an incentive-based scheduler, in accordance with an embodiment of the present disclosure.

Referring to FIGS. 9-11, certain further aspects of the apparatus 180100 are described following, any one or more of which may be present in certain embodiments. In certain embodiments, the incentivizer circuit 180106 may be further structured to assign an employer value 180202 to the shift, and the determination of the incentive data 180114 may be further based at least in part on the employer value 180202. In certain embodiments, the incentivizer circuit 180106 may be further structured to: compare an employee value 180204 to the employer value 180202 and determine the incentive data 180114 based at least in part on a difference 180206 between the employee value 180204 and the employer value 180202. The employee value 180204 and the employer value 180202 may be based at least in part on a common scale, e.g., a scale from one (1) to one hundred (100). For example, a shift that has a high employer value 180202, e.g., '80' and a low employee value 180204, e.g., '10' may result in a high value inventive for the shift. Conversely, a shift that has a low employer value 180202, e.g., '5', and a high employee value 180204, e.g., '90' may result in no incentive for the shift, or a low value inventive for the shift. In embodiments, the weighting of an employer value 180202 may be given a higher weighting than the employee value 180204. For example, a shift with an employer 180202 value of '30' and an employee value 180204 of '5' may result in no incentive and/or little incentive even though the employee is unlikely to try to fill the shift.

In certain embodiments, the incentive data 180114 may correspond to one of a plurality of possible incentives 180208, each corresponding to a distinct incentive value 180210 that shares a common scale 180212 with the employee value 180204 and the employer value 180202, such that the plurality of possible incentives 180208 has an increasing value ordering 180214. For example, the employer value 180202, the employee value 180204, and the inventive value 180210 may be based on a common scale of one (1) to one hundred (100), where high value incentives may be given a value of >80 and low value incentives may be given a value of <20. Thus, a shift with a high employer value 180202, e.g., '95', and a low employee value 180204, e.g., '5', may result in a high value incentive, e.g., '97', which may equate to triple overtime pay.

The apparatus may further include an urgency analysis circuit 180302 structured to determine urgency data 180304 of the shift 180112 based at least in part by analyzing the schedule data 180110. The incentivizer circuit 180106 may be further structured to determine the incentive data 180110 based at least in part on the urgency data 180304. The apparatus may further include an urgency interpretation circuit 180306 structured to interpret urgency data 180304. The incentivizer circuit 180106 may be further structured to determine the incentive data 180110 based at least in part on the urgency data 180304. In embodiments, the urgency data 180304 may be based on a common scale with the employer value 180202, employee value 180204, and/or the inventive value 180210, e.g., a scale of one (1) to one hundred (100). For example, shifts that have a high urgency 180304, e.g., '>80', and a high employer value 180202, e.g., "'>'80', may result in a high value incentive, e.g., '>80'.

In certain embodiments, the urgency data 180304 may be generated by a user 180308. In certain embodiments, the urgency data may be generated by an agglomerate network circuit 180310 of an agglomerate network 180312. In certain embodiments, the incentive data may correspond to one or more of a plurality of incentives 180314, the plurality of incentives 180314 including at least one of: additional pay 180316, additional time off 180318, reward points 180320, employee rating points 180322, or currency 180324 for a schedule marketplace. In certain embodiments, the employee value 180204 may be based at least in part on employee feedback 180326 or an insight 180328 determined from a schedule marketplace 180330. Employee feedback 180326 may be provided via a responsive scheduler and/or a scheduling marketplace, e.g., 112 (FIG. 1), as disclosed herein.

In certain embodiments, the incentivizer circuit 180106 may be further structured to adjust the incentive data 180114 after a first period of time 180402 to increase a value of an incentive 180404 corresponding to the incentive data 180114. In certain embodiments, the incentivizer circuit 180106 may be further structured to iteratively adjust the incentive data 180114, and the adjustments may increase with each iteration. In certain embodiments, after a second period of time 180406, the incentives may be at least one of: decreased, eliminated, or dropped. In certain embodiments, the second period of time 180406 may be blocked from view, e.g., from employees, for example, to discourage the employees delaying in accepting shifts to inflate the incentives. In certain embodiments, the second period of time 180406 may be random. In certain embodiments, the incentivizer circuit 180106 may be further structured to determine that the shift 180112 cannot be voluntarily fulfilled after a third period of time 180408. In certain embodiments, an employee 180410 may be selected to fill the shift 180112 after the third period of time 180408. In certain embodiments, the selection may be via user input 180412. In certain embodiments, the selection may be based at least in part on artificial intelligence (AI) 180414, which may be configured to select the employee 180410 to fill the shift 180112 by optimizing a variety of parameters such as mitigating turnover, minimizing costs, maximizing employee harmony, e.g., teamwork, etc.

Figure 12:
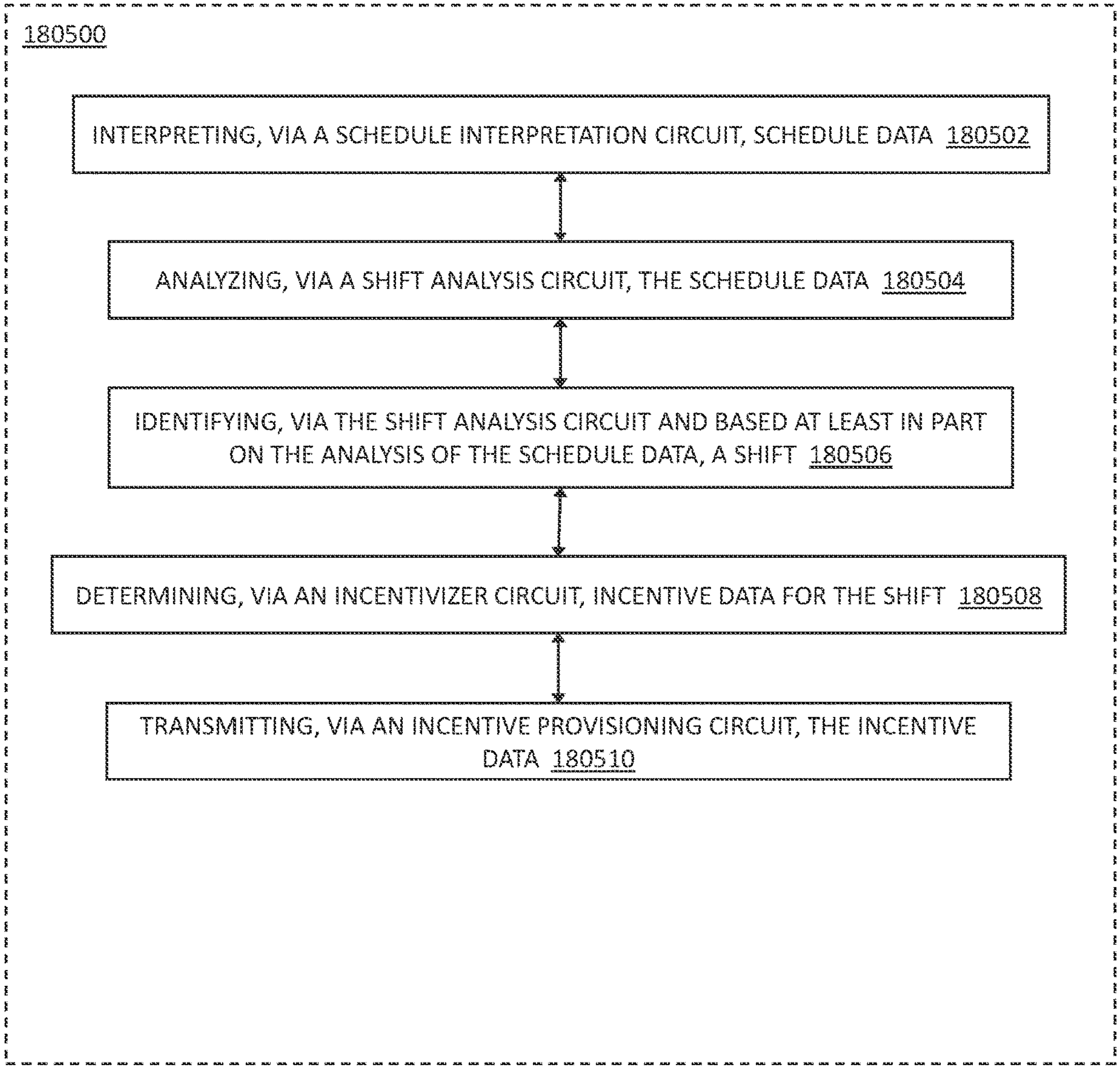
FIG. 12 is a flowchart depicting a method for connector equilibrium, in accordance with an embodiment of the present disclosure.

Referring to FIG. 12, a method 180500 for incentive-based scheduling is shown, in accordance with embodiments of the current disclosure. The method 180500 may be performed via apparatus 180100 and/or any other computing device disclosed herein. The method 180500 includes interpreting, via a schedule interpretation circuit, schedule data 180502, analyzing, via a shift analysis circuit, the schedule data 180504, identifying, via the shift analysis circuit and based at least in part on the analysis of the schedule data, a shift 180506, determining, via an incentivizer circuit, incentive data for the shift 180508, and transmitting, via an incentive provisioning circuit, the incentive data 180510.

Figure 13:
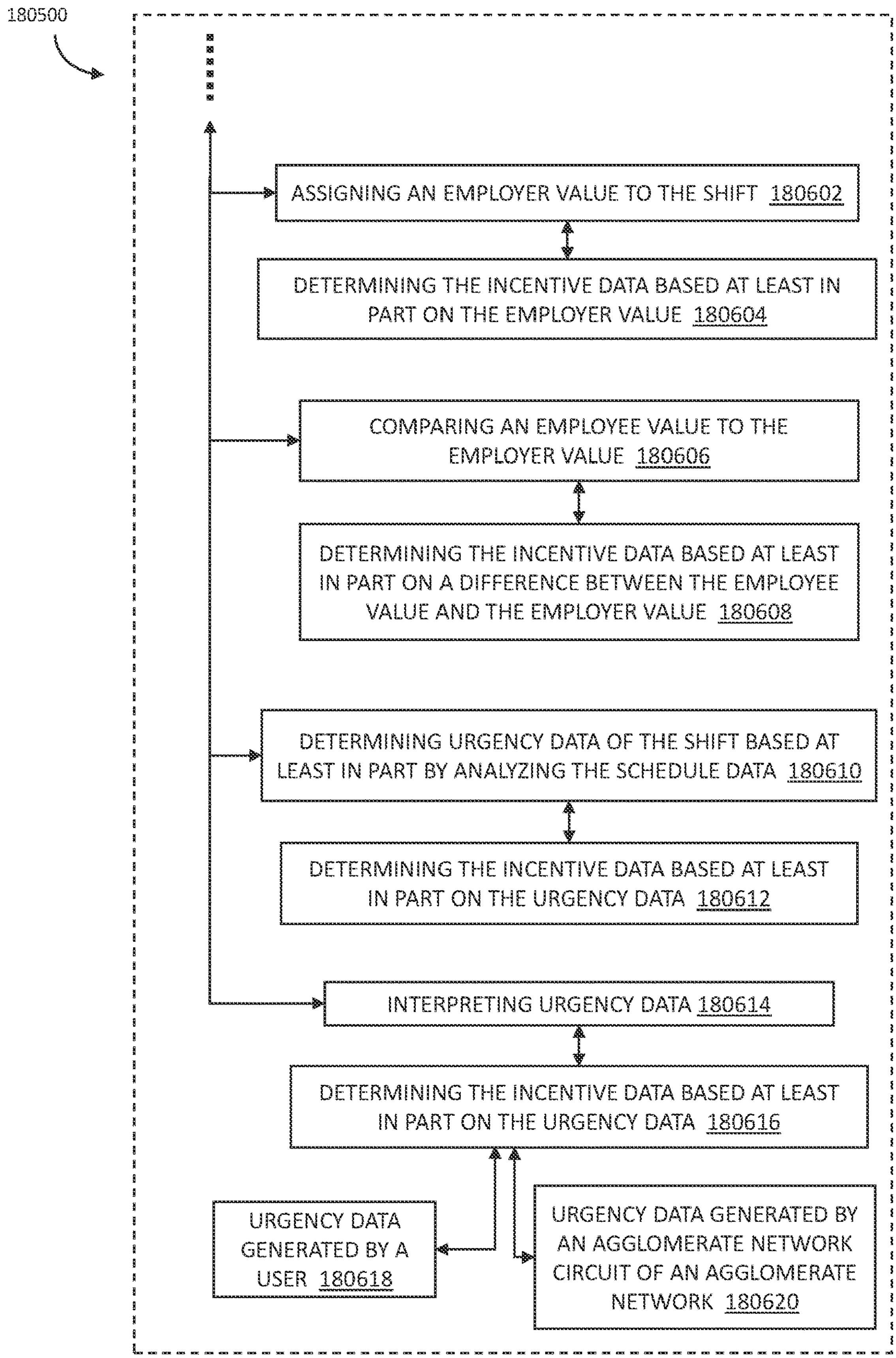
FIG. 13 is a flowchart depicting certain further aspects of a method for connector equilibrium, in accordance with an embodiment of the present disclosure.
Figure 14:
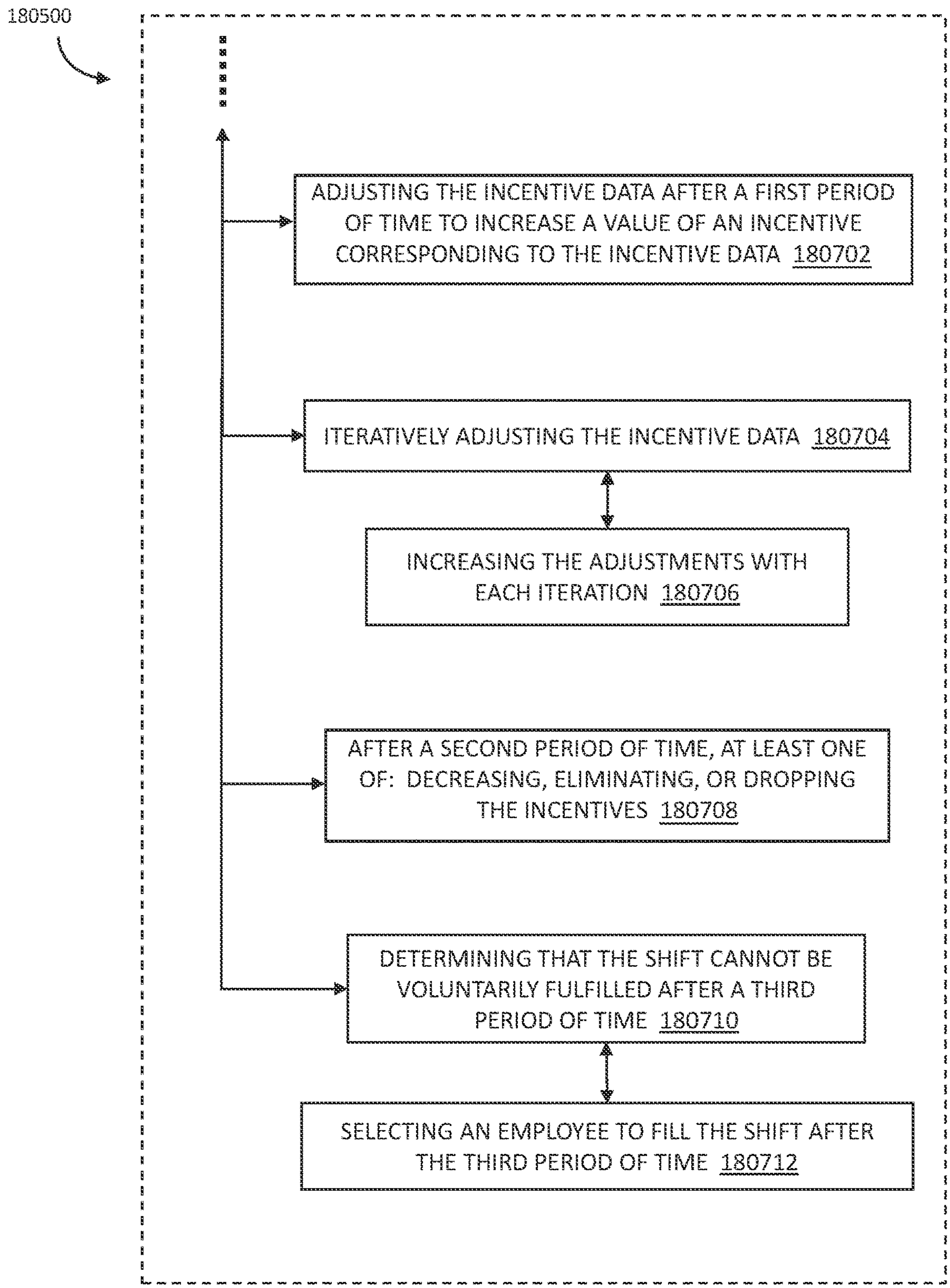
FIG. 14 is a flowchart depicting certain further aspects of a method for connector equilibrium, in accordance with an embodiment of the present disclosure.

Referring to FIGS. 13-14, certain further aspects of the method 180500 are described following, any one or more of which may be present in certain embodiments. For example, in certain embodiments, the method 180500 may further include assigning an employer value to the shift 180602, and determining the incentive data based at least in part on the employer value 180604. In certain embodiments, the method may further include comparing an employee value to the employer value 180606, and determining the incentive data based at least in part on a difference between the employee value and the employer value 180608. In certain embodiments, the incentive data may correspond to one of a plurality of possible incentives, each corresponding to a distinct incentive value that shares a common scale with the employee value and the employer value, such that the plurality of possible incentives has an increasing value ordering.

In certain embodiments, the method may further include determining urgency data of the shift based at least in part by analyzing the schedule data 180610, and determining the incentive data based at least in part on the urgency data 180612. In certain embodiments, the method may further include interpreting urgency data 180614, and determining the incentive data based at least in part on the urgency data 180616. In certain embodiments, the urgency data may be generated by a user 180618. In certain embodiments, the urgency data may be generated by an agglomerate network circuit of an agglomerate network 180620.

In certain embodiments, the incentive data may correspond to one or more of a plurality of incentives, the plurality of incentives including at least one of: additional pay, additional time off, reward points, employee rating points, or currency for a schedule marketplace. In certain embodiments, the employee value may be based at least in part on employee feedback or an insight determined from a schedule marketplace.

In certain embodiments, the method may further include adjusting the incentive data after a first period of time to increase a value of an incentive corresponding to the incentive data 180702. In certain embodiments, the method may further include iteratively adjusting the incentive data 180704, and increasing the adjustments with each iteration 180706. In certain embodiments, the method may further include, after a second period of time, at least one of: decreasing, eliminating, or dropping the incentives 180708. In certain embodiments, the second period of time may be blocked from view. In certain embodiments, the second period of time may be random. In certain embodiments, the method may further include determining that the shift cannot be voluntarily fulfilled after a third period of time 180710. In certain embodiments, the method may further include selecting an employee to fill the shift after the third period of time 180712. In certain embodiments, the selection may be via user input. In certain embodiments, the selection may be based at least in part on artificial intelligence.

Figure 15:
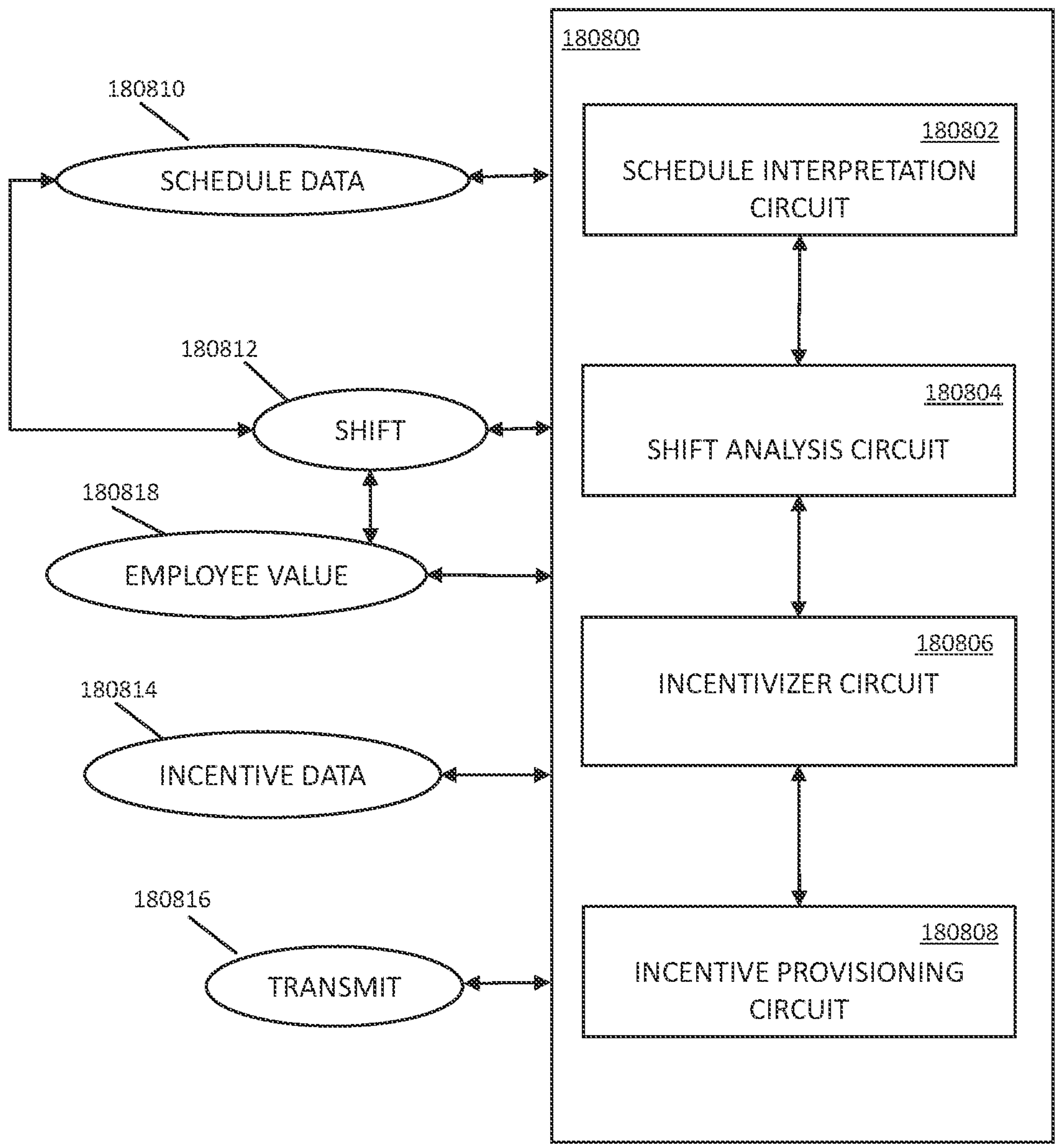
FIG. 15 is a schematic diagram depicting an apparatus for an incentive-based scheduler, in accordance with an embodiment of the present disclosure.

Referring to FIG. 15, an apparatus 180800 for inventive-based scheduling, in accordance with embodiments of the current disclosure, is shown. The apparatus 180800 includes a schedule interpretation circuit 180802, a shift analysis circuit 180804, an incentivizer circuit 180806, and an incentive provisioning circuit 180808. The schedule interpretation circuit 180802 is structured to interpret schedule data 180810. The shift analysis circuit is structured to analyze the schedule data 180810, identify a shift 180812, and assign an employee value 180818 to the shift 180812. The incentivizer circuit 180806 is structured to determine incentive data 180814 for the shift 180812 based at least in part on the employee value 180818. The incentive provisioning circuit 180808 is structured to transmit 180816 the incentive data 180814.

Figure 16:
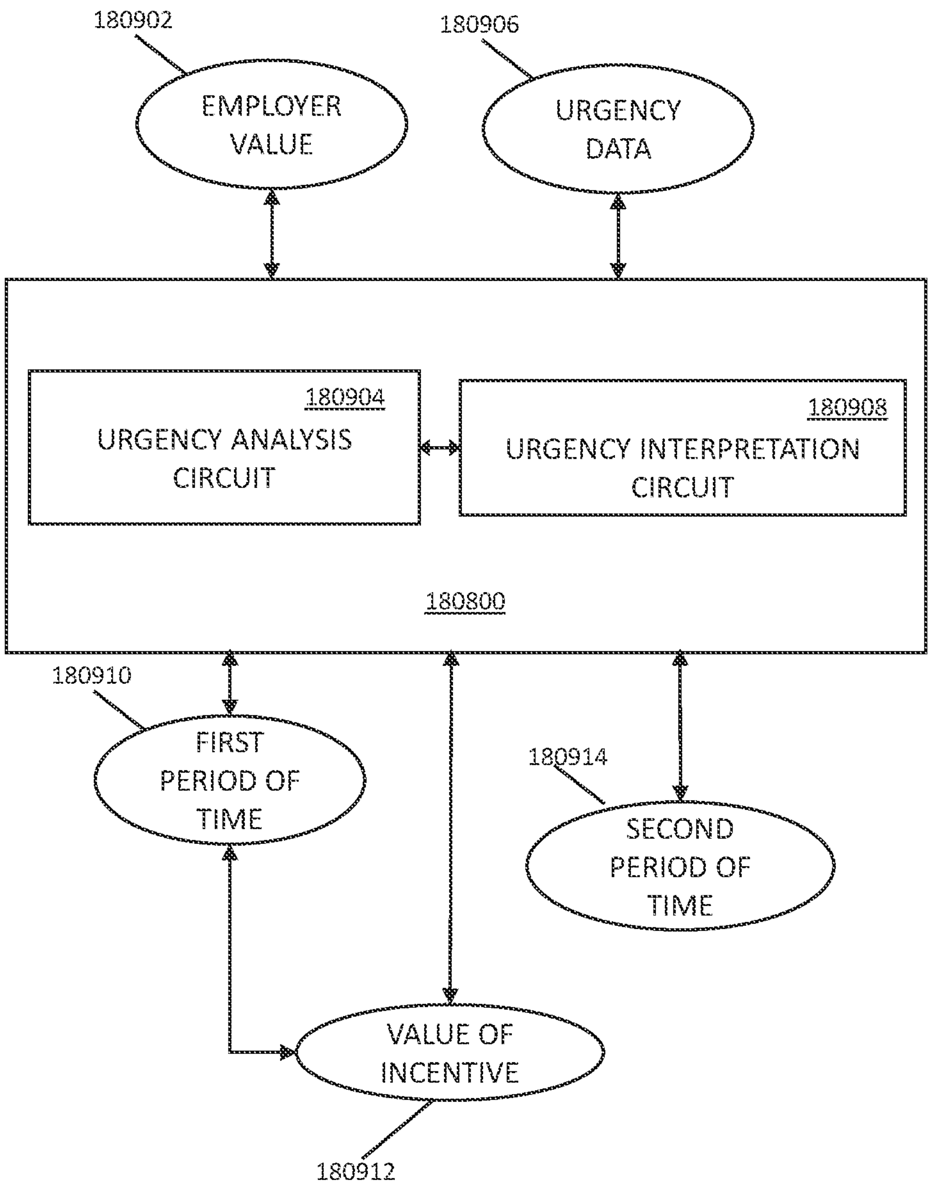
FIG. 16 is a schematic diagram depicting certain further aspects of an apparatus for an incentive-based scheduler, in accordance with an embodiment of the present disclosure.

Referring to FIG. 16, certain further aspects of the apparatus 180800 are described following, any one or more of which may be present in certain embodiments. In certain embodiments, the incentivizer circuit 180806 may be further structured to assign an employer value 180902 to the shift 180812, and the determination of the incentive data 180814 may be further based at least in part on the employer value 180902. In certain embodiments, the apparatus 180800 may further include an urgency analysis circuit 180904 structured to determine urgency data 180906 of the shift 180812 based at least in part by analyzing the schedule data 180810. The incentivizer circuit may be further structured to determine the incentive data 180814 based at least in part on the urgency data 180906. In certain embodiments, the apparatus 180800 may further include an urgency interpretation circuit 180908 structured to interpret urgency data 180906. The incentivizer circuit 180806 may be further structured to determine the incentive data 180814 based at least in part on the urgency data 180906. In certain embodiments, the incentivizer circuit 180806 may be further structured to adjust the incentive data 180814 after a first period of time 180910 to increase a value of an incentive 180912 corresponding to the incentive data 180814. In certain embodiments, the incentivizer circuit may be further structured to determine that the shift 180812 cannot be voluntarily fulfilled after a second period of time 180914.

Figure 17:
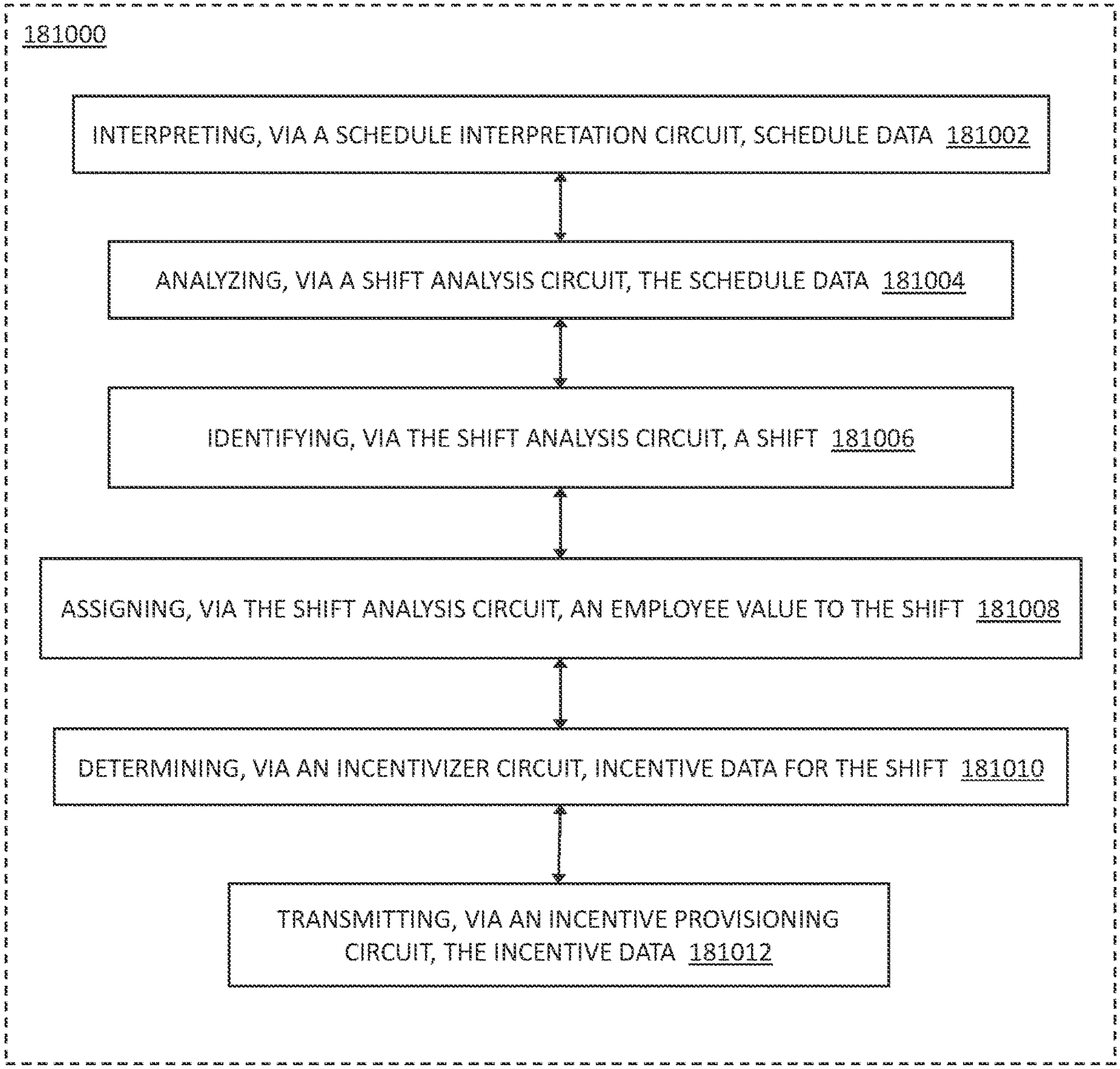
FIG. 17 is a flowchart depicting a method for connector equilibrium, in accordance with an embodiment of the present disclosure.

Referring to FIG. 17, embodiments of the current disclosure provide for a method 181000 for incentive-based scheduling. The method 181000 may be performed via apparatus 180800 and/or any other computing device disclosed herein. The method 181000 includes interpreting, via a schedule interpretation circuit, schedule data 181002, analyzing, via a shift analysis circuit, the schedule data 181004, identifying, via the shift analysis circuit, a shift 181006, assigning, via the shift analysis circuit, an employee value to the shift 181008, determining, via an incentivizer circuit, incentive data for the shift based at least in part on the employee value 181010, and transmitting, via an incentive provisioning circuit, the incentive data 181012.

Figure 18:
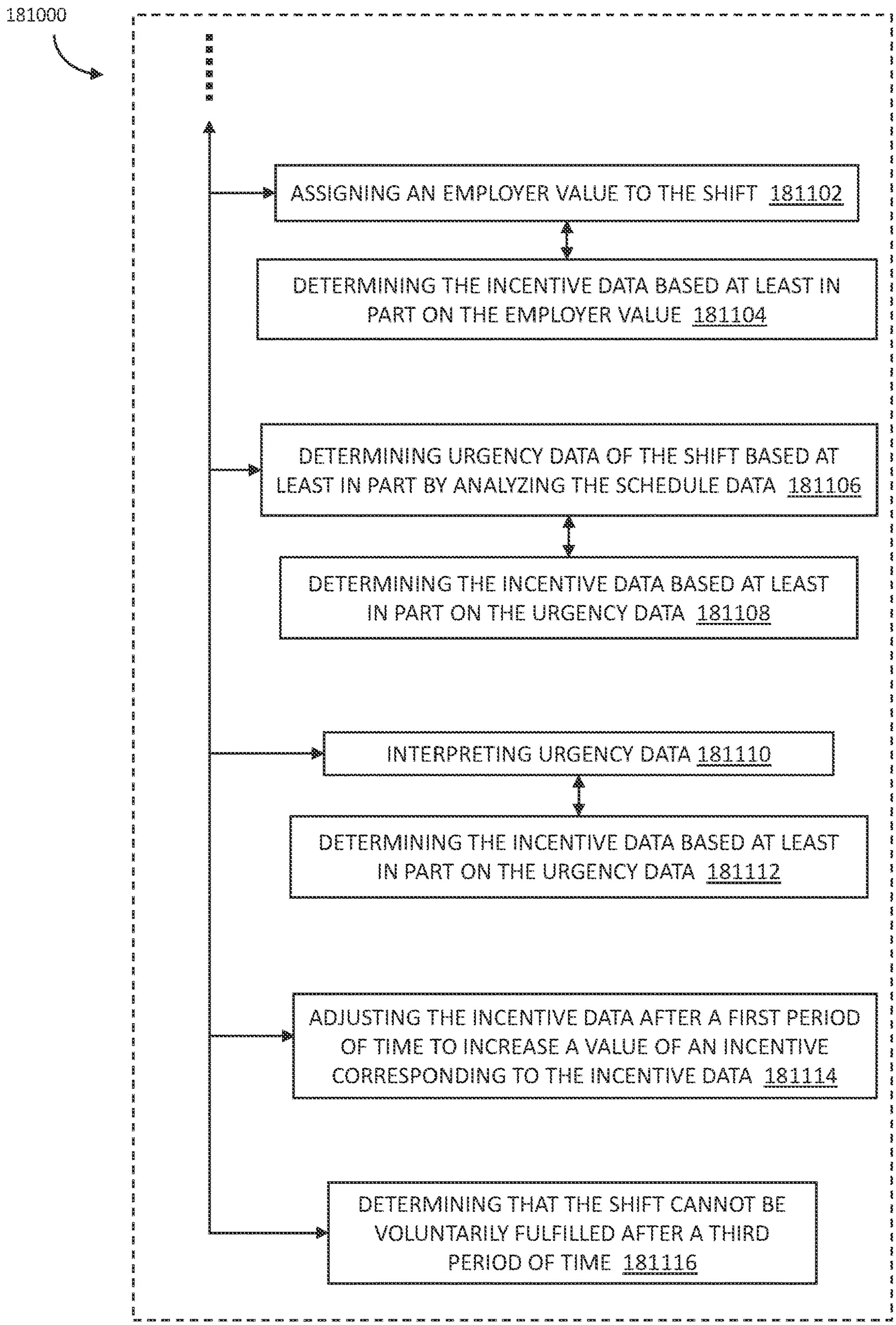
FIG. 18 is a flowchart depicting certain further aspects of a method for connector equilibrium, in accordance with an embodiment of the present disclosure.

Referring to FIG. 18, certain further aspects of the method 181000 are described following, any one or more of which may be present in certain embodiments. In certain embodiments, the method 181000 may further include assigning an employer value to the shift 181102, and determining the incentive data based at least in part on the employer value 181104. In certain embodiments, the method 181000 may further include determining urgency data of the shift based at least in part by analyzing the schedule data 181106, and determining the incentive data based at least in part on the urgency data 181108. In certain embodiments, the method 181000 may further include interpreting urgency data 181110, and determining the incentive data based at least in part on the urgency data 181112. In certain embodiments, the method 181000 may further include adjusting the incentive data after a first period of time to increase a value of an incentive corresponding to the incentive data 181114. In certain embodiments, the method 181000 may further include determining that the shift cannot be voluntarily fulfilled after a second period of time 181116.

Figure 19:
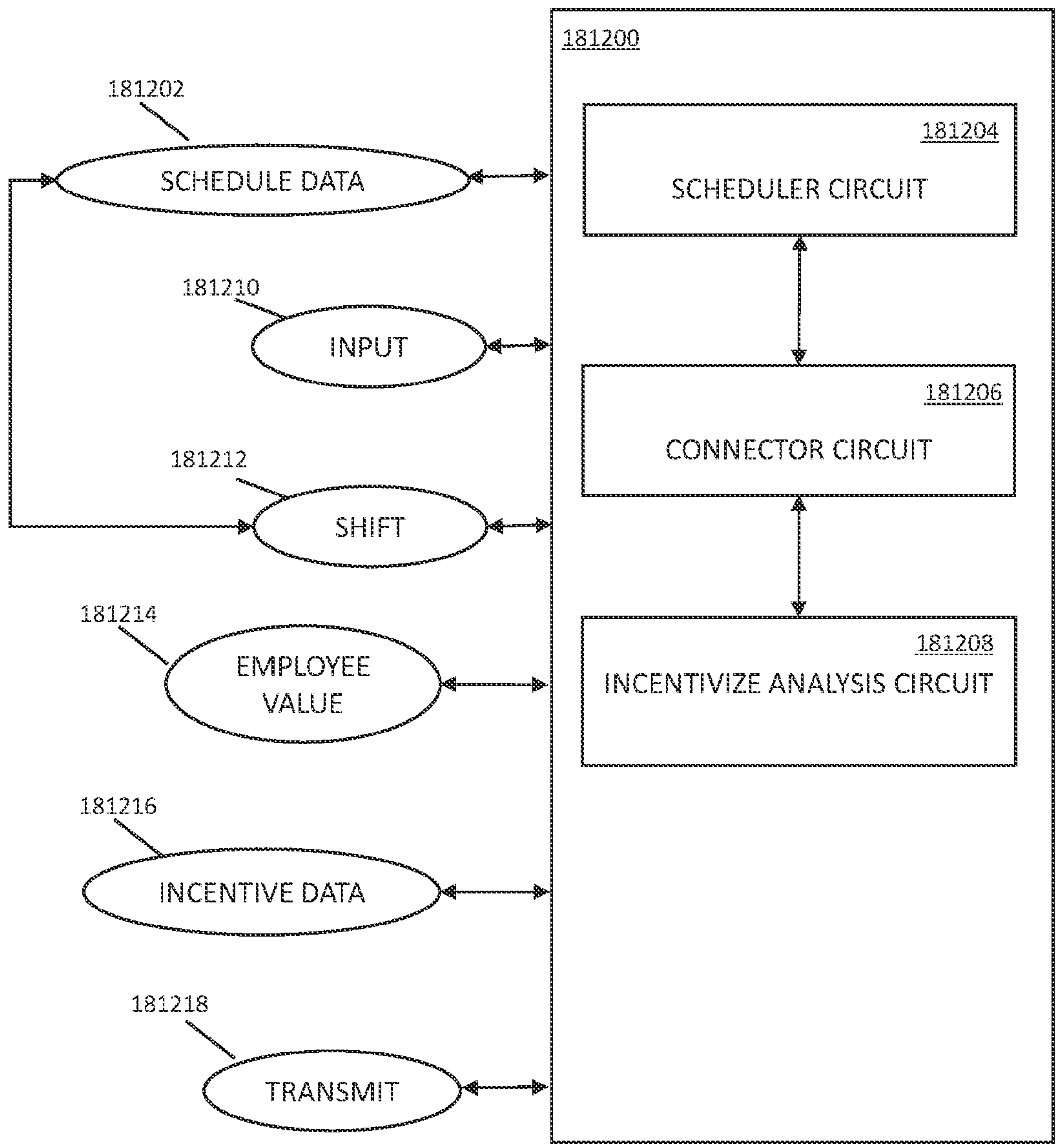
FIG. 19 is a schematic diagram depicting an agglomerate network for generating schedule data, in accordance with an embodiment of the present disclosure.

Referring to FIG. 19, an agglomerate network 181200 for generating schedule data 181202 may be provided. The apparatus 181200 includes a scheduler circuit 181204, a connector circuit 181206, and an incentivize analysis circuit 181208. The scheduler circuit 181204 is structured to output the schedule data 181202. The connector circuit 181206 is structured to adjust at least one of an input 181210 to the scheduler circuit 181204 or the schedule data 181202 outputted by the scheduler circuit 181204, as disclosed herein. The incentivize analysis circuit 181208 is structured to receive the schedule data 181202 via the connector circuit 181206, identify a shift 181212 in the schedule data 181202, assign an employee value 181214 to the shift 181212, determine incentive data 181216 for the shift 181212 based at least in part on the employee value 181214, and transmit 181218 the incentive data 181216. In embodiments, the connector circuit 181206 may be structured to adjust the input 181210 to the scheduler circuit 181204 and/or the schedule data 181202 outputted by the scheduler circuit 181204 in the event the incentivize analysis circuit 181208 determines that a particular shift cannot be filled despite being assigned a high value inventive. In other words, the connector circuit 181206 may trigger a change to the schedule data 181202 when the scheduler circuit 181204 generates a schedule that contains shift that no employee wants to fill. As will be understood, the changes to the schedule data 181202 may result in the offending shift being removed and/or adjusted to make it more palatable/appealing to employees.

Figure 20:
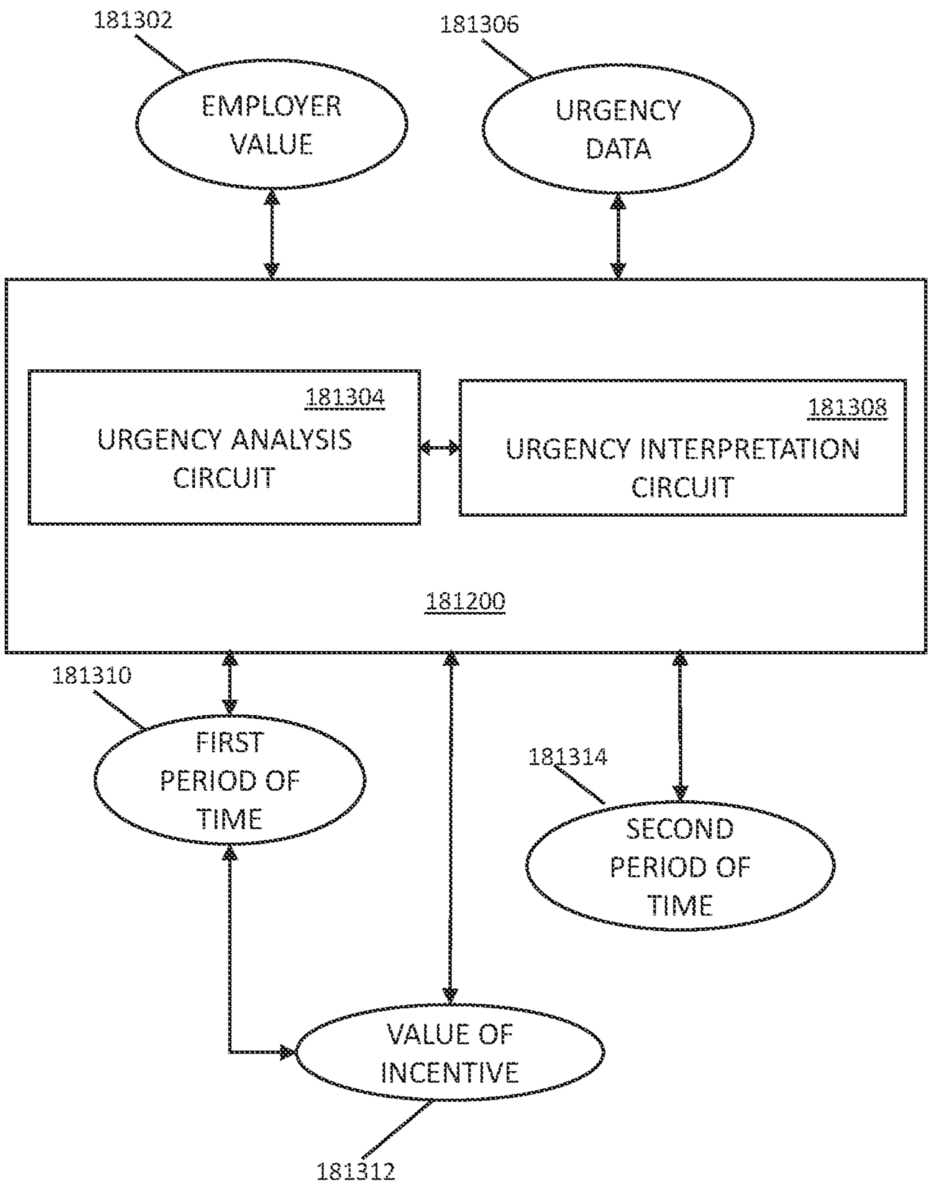
FIG. 20 is a schematic diagram depicting certain further aspects of an agglomerate network for generating schedule data, in accordance with an embodiment of the present disclosure.

Referring to FIG. 20, certain further aspects of the agglomerate network 181200 are described following, any one or more of which may be present in certain embodiments. In certain embodiments, the incentivize analysis circuit 181208 may be further structured to assign an employer value 181302 to the shift 181212, and the determination of the incentive data 181216 may be further based at least in part on the employer value 181302. In certain embodiments, the agglomerate network 181200 may further include an urgency analysis circuit 181304 structured to determine urgency data 181306 of the shift 181212 based at least in part by analyzing the schedule data 181202. The incentivize analysis circuit 181208 may be further structured to determine the incentive data 181216 based at least in part on the urgency data 181306. In certain embodiments, the agglomerate network 181200 may further include an urgency interpretation circuit 181308 structured to interpret urgency data 181306. The incentivize analysis circuit 181208 may be further structured to determine the incentive data 181216 based at least in part on the urgency data. In certain embodiments, the incentivize analysis circuit 181208 may be further structured to adjust the incentive data 181216 after a first period of time 181310 to increase a value of an incentive 181312 corresponding to the incentive data 181216. In certain embodiments, the incentivize analysis circuit 181208 may be further structured to determine that the shift 181212 cannot be voluntarily fulfilled after a second period of time 181314.

Figure 21:
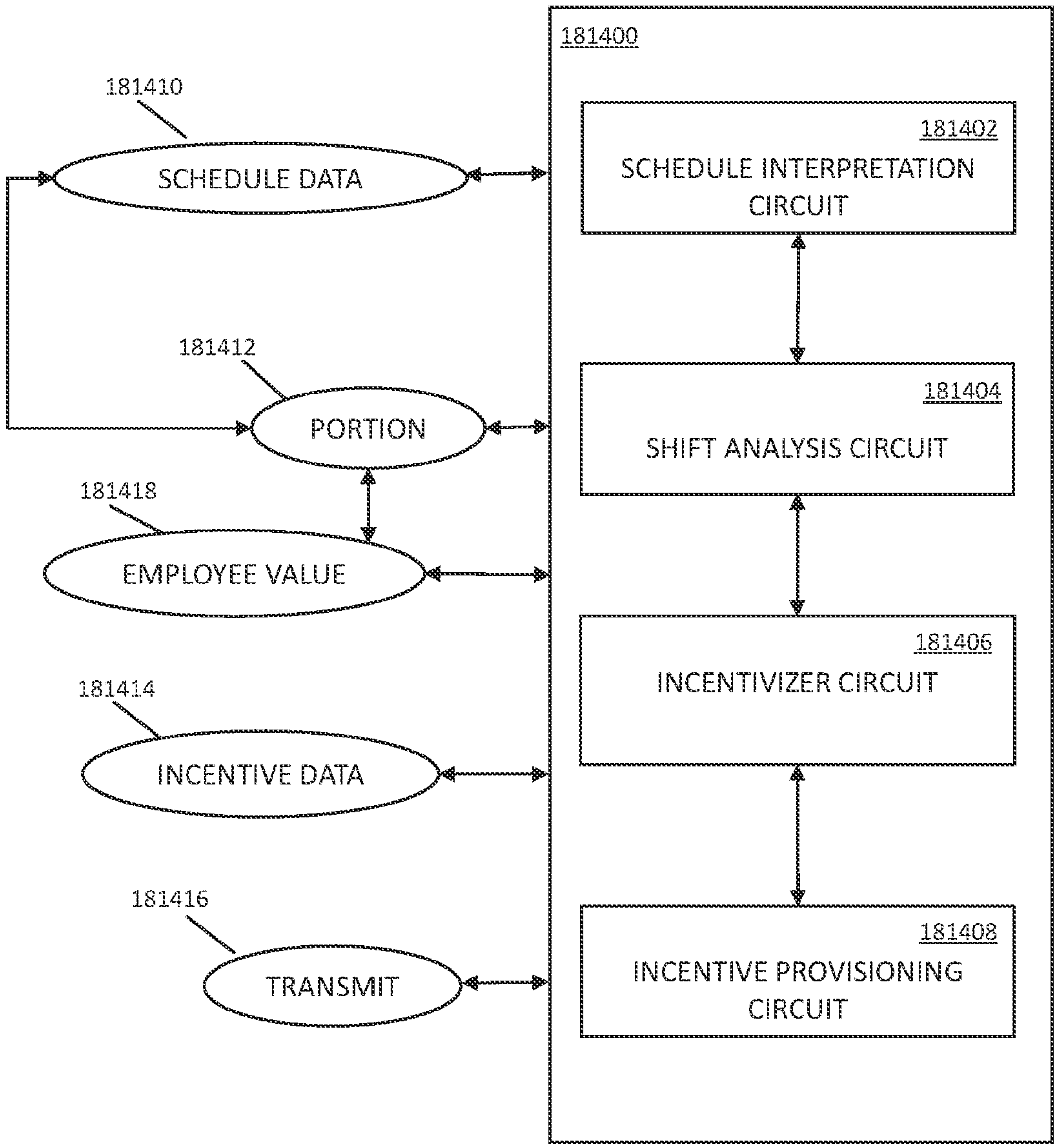
FIG. 21 is a schematic diagram depicting an apparatus for an incentive-based scheduler, in accordance with an embodiment of the present disclosure.

Referring to FIG. 21, an apparatus 181400 may be provided. The apparatus 181400 includes a schedule interpretation circuit 181402, a shift analysis circuit 181404, an incentivizer circuit 181406, and an incentive provisioning circuit 181408. The schedule interpretation circuit 181402 is structured to interpret schedule data 181410. The shift analysis circuit is structured to analyze the schedule data 181410, identify a portion 181412 of the schedule data 181410, and assign an employee value 181418 to the portion 181412 of the schedule data 181410. The incentivizer circuit 181406 is structured to determine incentive data 181414 for the portion 181412 of the schedule data 181410 based at least in part on the employee value 181418. The incentive provisioning circuit 181408 is structured to transmit 181416 the incentive data 181414.

Figure 22:
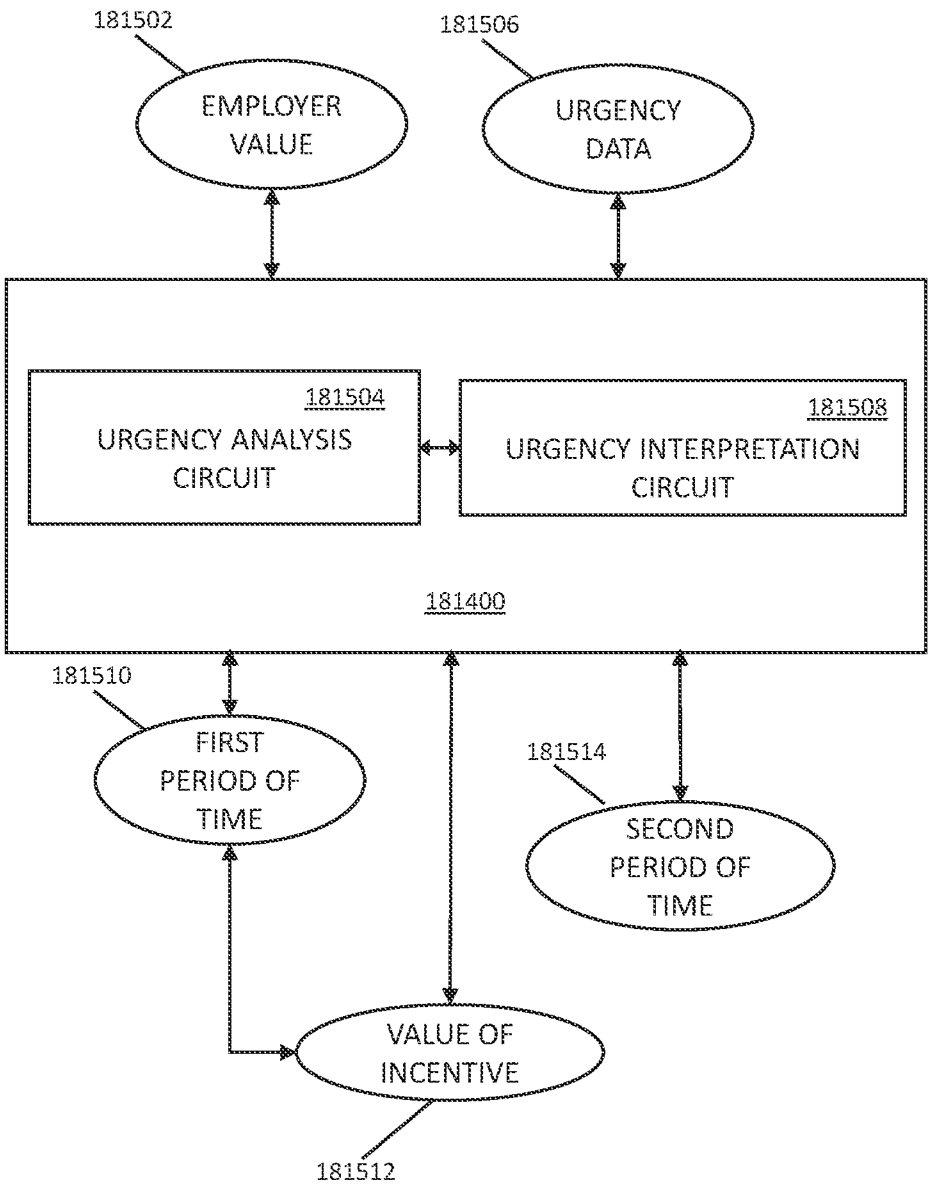
FIG. 22 is a schematic diagram depicting certain further aspects of an apparatus for an incentive-based scheduler, in accordance with an embodiment of the present disclosure.

Referring to FIG. 22, certain further aspects of the apparatus 181400 are described following, any one or more of which may be present in certain embodiments. In certain embodiments, the incentivizer circuit 181406 may be further structured to assign an employer value 181502 to the portion 181412 of the schedule data 181410, and the determination of the incentive data 181414 may be further based at least in part on the employer value 181502. In certain embodiments, the apparatus 181400 may further include an urgency analysis circuit 181504 structured to determine urgency data 181506 of the portion 181412 of the schedule data 181410 based at least in part by analyzing the schedule data 181410. In embodiments, determining the urgency data 181506 may be based at least in part on user defined inputs, e.g., a user specifies that the portion 181412 is of high value and/or of urgent need. In embodiments, determining the urgency data 181506 may be based at least in part on an artificial intelligence module/circuit that analyzes the schedule data 181410 for choke points, e.g., points of a production flow that can prevent and/or greatly slow down the filling of an order, and assign choke points that have processes that are close to not having enough time to complete a high urgency.

The incentivizer circuit may be further structured to determine the incentive data 181414 based at least in part on the urgency data 181506. In certain embodiments, the apparatus 181400 may further include an urgency interpretation circuit 181508 structured to interpret urgency data 181506. The urgency data 181508 may be in the form of a score, e.g., one (1) to one-hundred (100) and/or have a labeled value corresponding to "urgent". The incentivizer circuit 181406 may be further structured to determine the incentive data 181414 based at least in part on the urgency data 181506. In certain embodiments, the incentivizer circuit 181406 may be further structured to adjust the incentive data 181414 after a first period of time 181510 to increase a value of an incentive 181512 corresponding to the incentive data 181414. In certain embodiments, the incentivizer circuit may be further structured to determine that the portion 181412 of the schedule data 181410 cannot be voluntarily fulfilled after a second period of time 181514.

Figure 23:
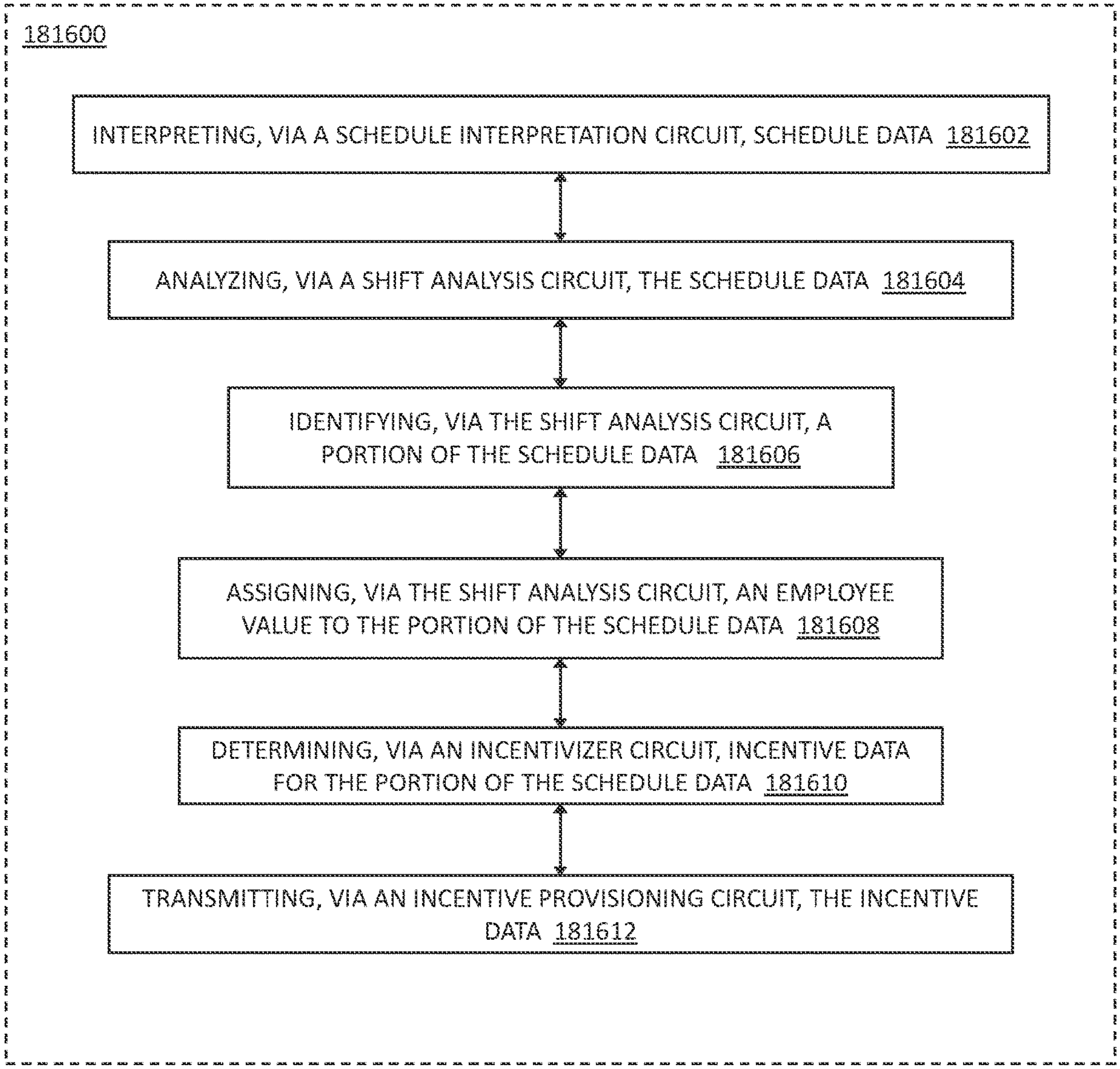
FIG. 23 is a flowchart depicting a method for connector equilibrium, in accordance with an embodiment of the present disclosure.

Referring to FIG. 23, a method 181600 for inventive-based scheduling is provided. The method may be performed via apparatus 181400 and/or any other computing device disclosed herein. The method 181600 includes interpreting, via a schedule interpretation circuit, schedule data 181602, analyzing, via a shift analysis circuit, the schedule data 181604, identifying, via the shift analysis circuit, a portion of the schedule data 181606, assigning, via the shift analysis circuit, an employee value to the shift 181608, determining, via an incentivizer circuit, incentive data for the shift based at least in part on the employee value 181610, and transmitting, via an incentive provisioning circuit, the incentive data 181612.

Figure 24:
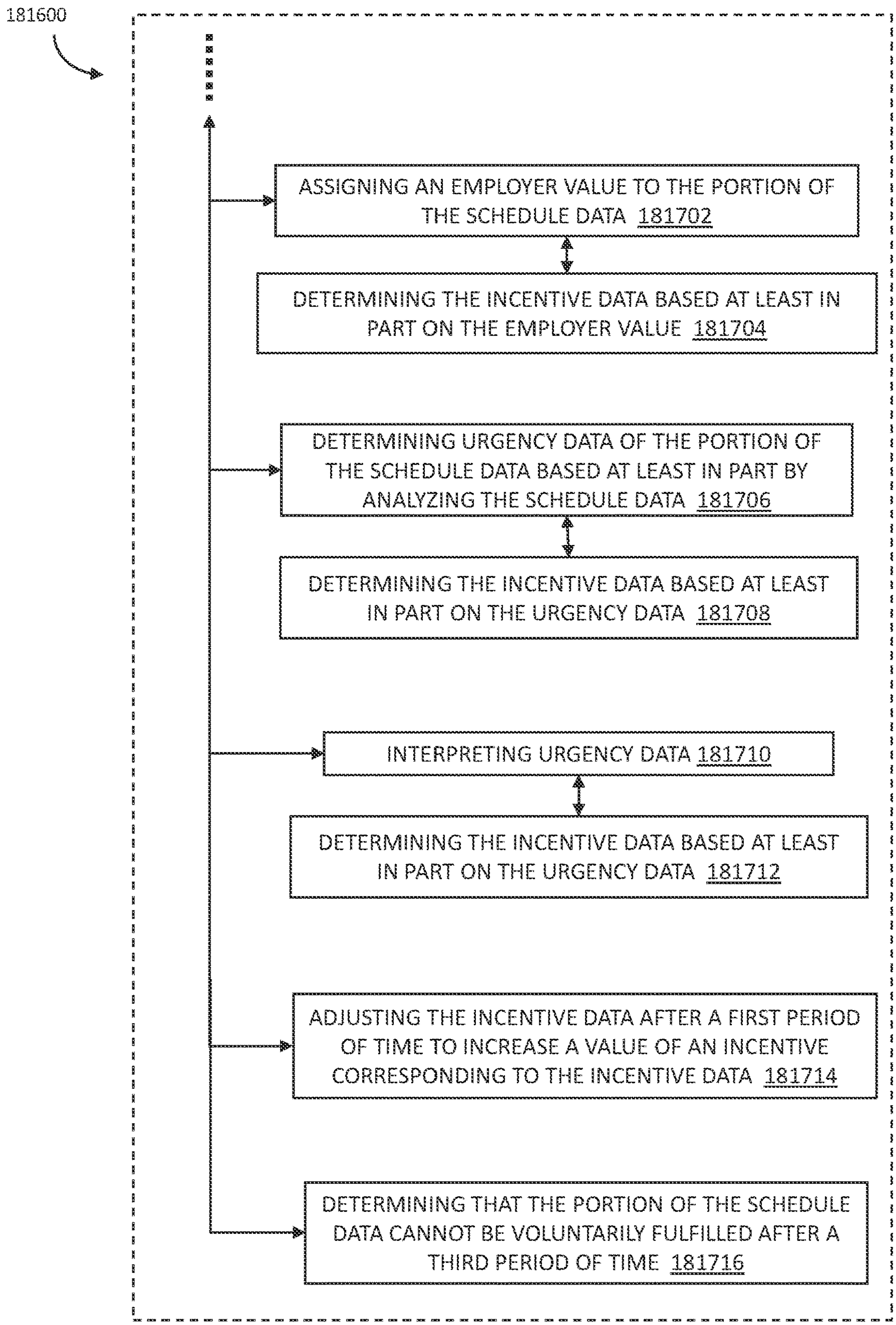
FIG. 24 is a flowchart depicting certain further aspects of a method for connector equilibrium, in accordance with an embodiment of the present disclosure.

Referring to FIG. 24, certain further aspects of the method 181600 are described following, any one or more of which may be present in certain embodiments. In certain embodiments, the method 181600 may further include assigning an employer value to the shift 181702, and determining the incentive data based at least in part on the employer value 181704. In certain embodiments, the method 181600 may further include determining urgency data of the shift based at least in part by analyzing the schedule data 181706, and determining the incentive data based at least in part on the urgency data 181708. In certain embodiments, the method 181600 may further include interpreting urgency data 181710, and determining the incentive data based at least in part on the urgency data 181712. In certain embodiments, the method 181600 may further include adjusting the incentive data after a first period of time to increase a value of an incentive corresponding to the incentive data 181714. In certain embodiments, the method 181600 may further include determining that the shift cannot be voluntarily fulfilled after a second period of time 181716.

Figure 25:
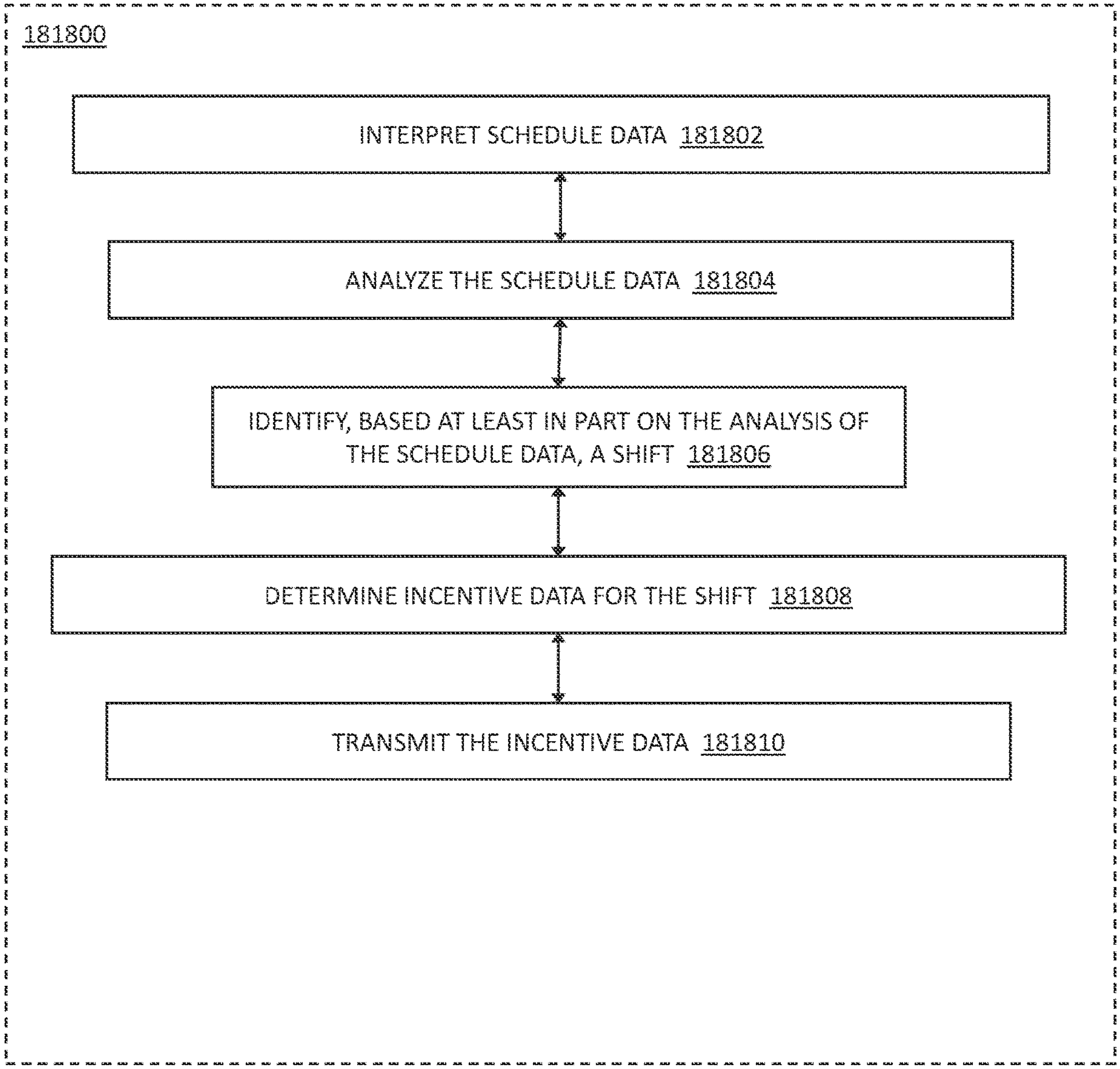
FIG. 25 is a block diagram depicting a non-transitory computer-readable medium for connector equilibrium, in accordance with an embodiment of the present disclosure.

Referring to FIG. 25, a non-transitory computer-readable medium 181800 for inventive-based scheduling is provided. The non-transitory computer-readable medium 181800 stores instructions that adapt at least one processor to: interpret schedule data 181802, analyze the schedule data 181804, identify, based at least in part on the analysis of the schedule data, a shift 181806, determine incentive data for the shift 181808, and transmit the incentive data 181810.

Figure 26:
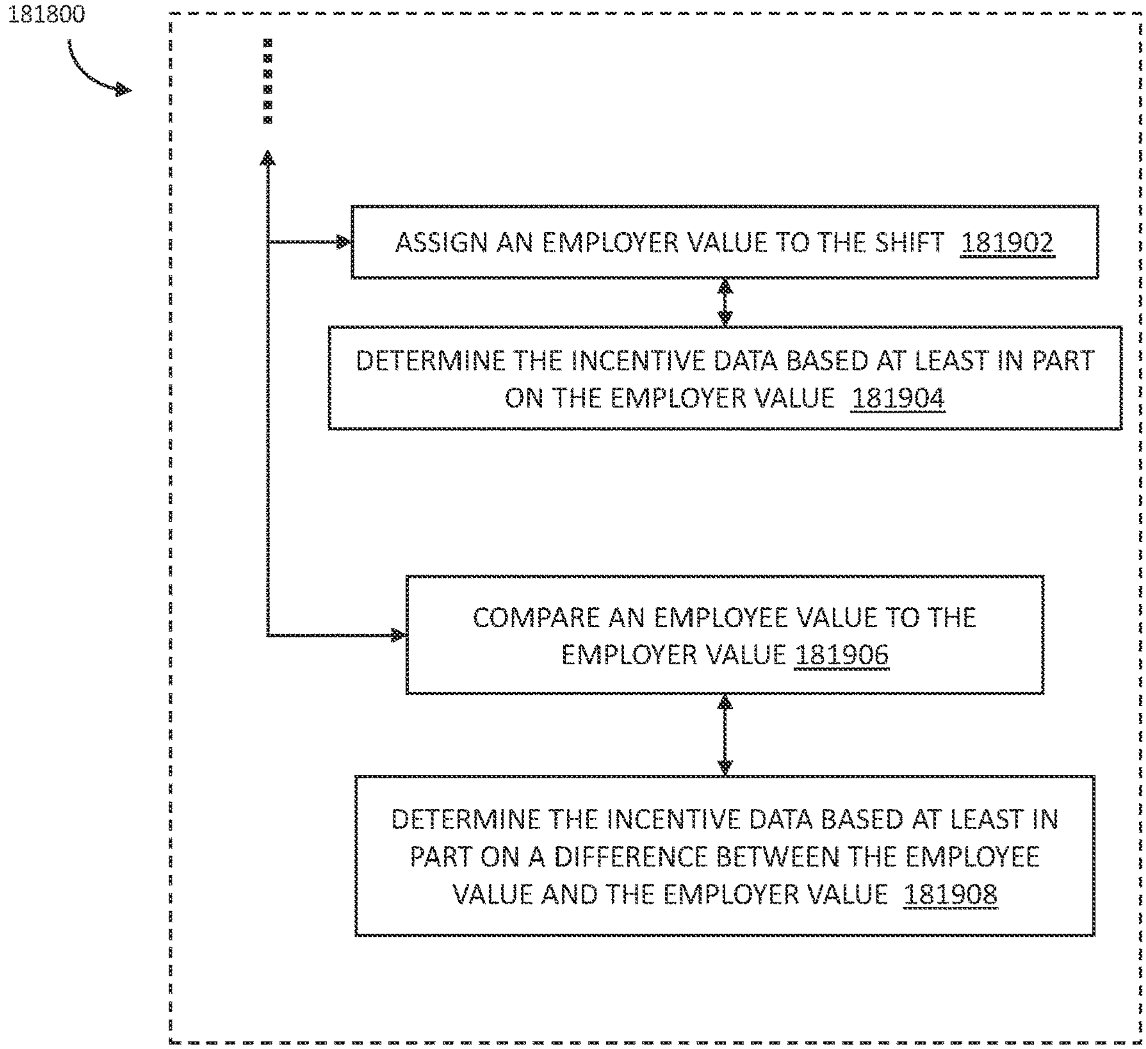
FIG. 26 is a block diagram depicting certain further aspects of a non-transitory computer-readable medium for connector equilibrium, in accordance with an embodiment of the present disclosure.

Referring to FIG. 26, certain further aspects of the non-transitory computer-readable medium 181800 are described following, any one or more of which may be present in certain embodiments. In certain embodiments, the non-transitory computer-readable medium 181800 may further include instructions that adapt the at least one processor to assign an employer value to the shift 181902, and determine the incentive data based at least in part on the employer value 181904.

In certain embodiments, the non-transitory computer-readable medium 181800 may further include instructions that adapt the at least one processor to compare an employee value to the employer value 181906, and determine the incentive data based at least in part on a difference between the employee value and the employer value 181908. In certain embodiments, the incentive data may correspond to one of a plurality of possible incentives, each corresponding to a distinct incentive value that shares a common scale with the employee value and the employer value, such that the plurality of possible incentives has an increasing value ordering.

The systems and methods described herein for incentivized scheduling provide various technical benefits and improvements over known methods. In one aspect, the systems and methods provide for efficient utilization of computing resources. In one aspect, the system and methods enable efficient utilization of resources by adapting computation resources to urgency interpretations. Systems and methods described herein enable adaptation of models based on the urgency associated with schedules. In one example, models may identify urgent needs and adapt schedule generation to generate higher confidence schedules using incentives. In another aspect, the use of incentive modeling allows a tradeoff between computation time and schedule incentives to find adequate schedules. The methods allow adaptive incentive inclusion to reduce computation load. In some cases, incentive inclusion may be dynamically configured during times of peak resource load thereby reducing computation requirements when computation resources may be constrained. In one example, high confidence schedules may be identified with less computation time by including more and/or higher value incentives compared to generation without incentives.

The integrated recruiting tool may suggest the job to the employee and/or the recruiting tool could suggest an employee trade/contract between companies. As such_embodiments of the current disclosure may provide for an artificial intelligence, which may form part of component/module 116 (FIG. 1), that suggests employees for sharing, trades, and/or contracts between companies with regard to scheduling. Embodiments of the current disclosure may also determine "team" trades between companies, e.g., trades that involve a group of employees on at least one side of the trade. Non-limiting examples of such trades and/or contracts may be for a shift, day, week, weeks, month, months, year, years, and the like. Embodiments of the current disclosure may determine potential employees and/or teams (of employees) for sharing between different employers based in part on having access to human recourse scheduling data, which may be from multiple entities/corporations. Embodiments of the current disclosure may determine potential employees and/or teams for sharing between different employers via determining aspects such as skills and/or constraints on the employees, teams, and/or employers. Embodiments of the current disclosure may provide for employees to indicate their willingness and/or availability to be shared. Embodiments of the current disclosure may also provide for employers to identify employees for sharing, and/or may operate in conjunction with an inventive-based scheduler, such as those described herein, e.g., apparatus 180100 (FIG. 8). Embodiments may be integrated with a human resources tool and/or platform, such as to make a suggestion to either the employee or the employee's employer(s) about sharing possibilities.

Figure 27:
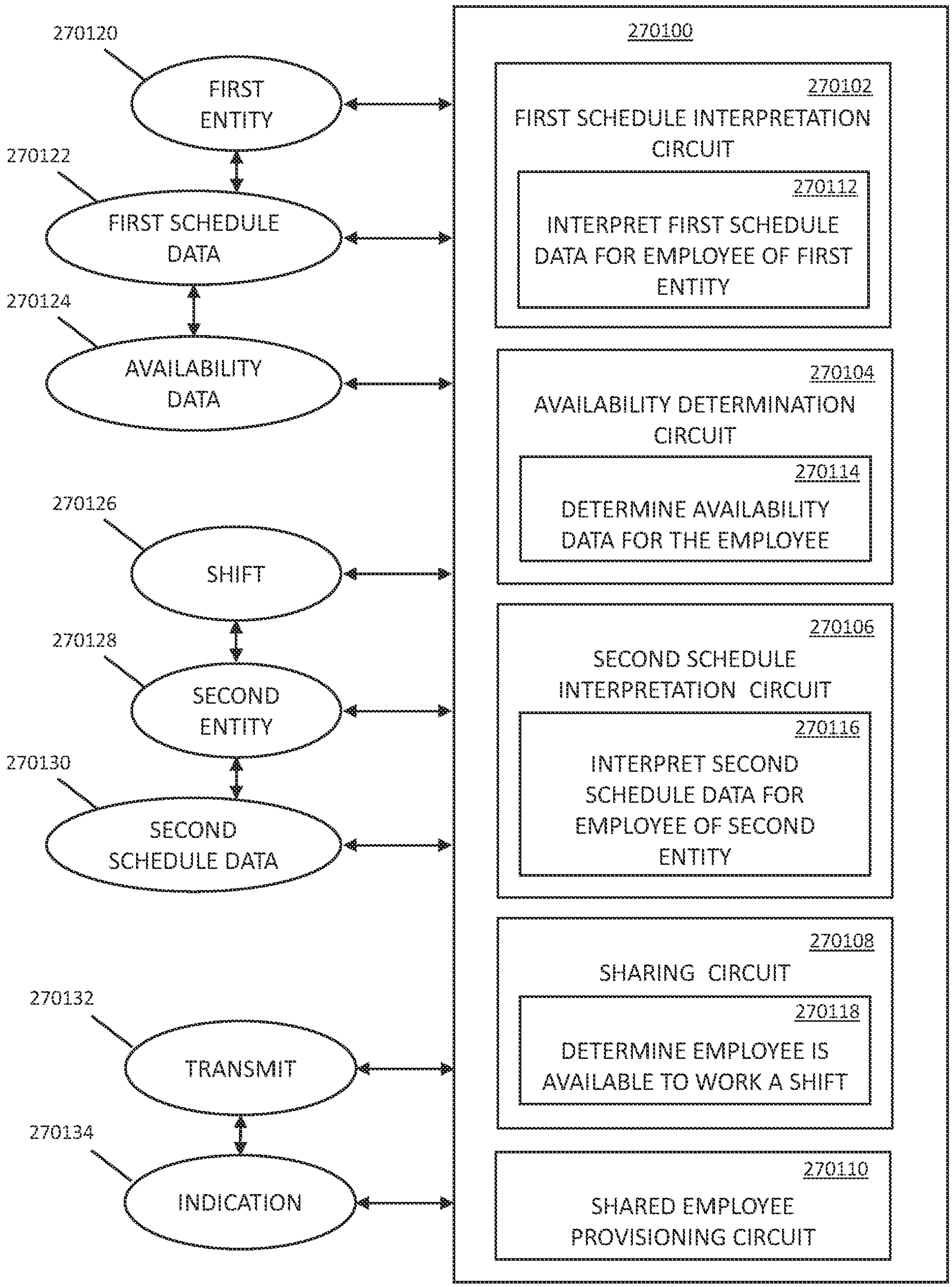
FIG. 27 is a schematic diagram depicting an apparatus for employee sharing/contracting, in accordance with an embodiment of the current disclosure.

Accordingly, referring to FIG. 27, an apparatus 270100 for employee contracting/sharing is provided. The apparatus 270100 includes a first schedule interpretation circuit 270102 structured to interpret 270112 first schedule data 270122 for an employee of a first entity 270120; an availability determination circuit 270104 structured to determine 270114 availability data 270124 for the employee based at least in part on the first schedule data; and a second schedule interpretation circuit 270106 structured to interpret 270116 second schedule data 270130 corresponding to a second entity 270128. The apparatus 270100 further includes: a sharing circuit 270108 structured to determine 270118, based at least in part on the availability data and the second schedule data, that the employee is available to work a shift 270126 corresponding to the second entity; and a shared employee provisioning circuit 270110 structured to transmit 270132 an indication 270134 that the employee is available to work for the shift. Non-limiting examples of first schedule data 270122 and second schedule data 270130 include data corresponding to schedules and/or data related to the schedules, e.g., a total number of hours worked, a total number of workers per shift, an estimated amount of sales, an estimated amount of profits, a location, a predicted commute time, etc. Non-limiting examples of availability data 270124 include indications of a time block for which the corresponding employee is not assigned a shift; indications that a shift may be overstaffed and therefore an employee associated with the shift may not be necessary for the shift and, thus, available for sharing; indications that a piece of equipment required to complete a shift is out of commission and that the employee may be of more value if completing another task; an indication that a weather related event may cause a location associated with a shift to be delayed in opening and/or closed, thus, indicating the employee may be of more value if completing another task; and the like.

Certain further aspects of the apparatus 270100 are described following, any one or more of which may be present in certain embodiments. For example, the first 270120 and the second 270128 entities may be distinct departments within a same organization. In embodiments, the first 270120 and the second 270128 entities may be distinct organizations, e.g., different corporations.

Embodiments of the apparatus 270100 may also form part of an agglomerate network, e.g., 200 (FIG. 2). For example, the apparatus 270100 may be one of a plurality of agglomerate network circuits connected via connector circuits, as disclosed herein. In such embodiments, the apparatus 270100 may be a schedule analysis circuit, or another type of agglomerate network circuit, as described herein, that identifies opportunities for sharing employees wherein the apparatus 270100 may directly adjust schedule data flowing through the agglomerate network and/or adjust one or more connectors so as to indirectly adjust the schedule data flowing through the agglomerate network. For example, the apparatus 270100 may identify a sharing opportunity and then adjust a connector so that a schedule corresponding to the schedule data satisfies/fills and/or otherwise incorporates the sharing opportunity. In embodiments, both entities involved in a sharing opportunity, e.g., the one that has an available employee and the one that needs an employee to fill a shift, may have their schedules generated by the agglomerate network. In other words, embodiments of an agglomerate network that incorporate employee contracting/sharing, as disclosed herein, may generate schedules for two or more entities. In embodiments, an agglomerate network may concurrently generate two or more schedules each respectively corresponding to one of two or more entities, where the agglomerate network tries to optimize the needs of the entities by trying to maximize the use of available employees. In embodiments, the agglomerate network may cycle through one or more generations of schedule data in order to reach a satisfactory level of optimization, e.g., a 30% increase in filled shifts as opposed to schedules that do not incorporate employee sharing/contracting, as disclosed herein.

Figure 28:
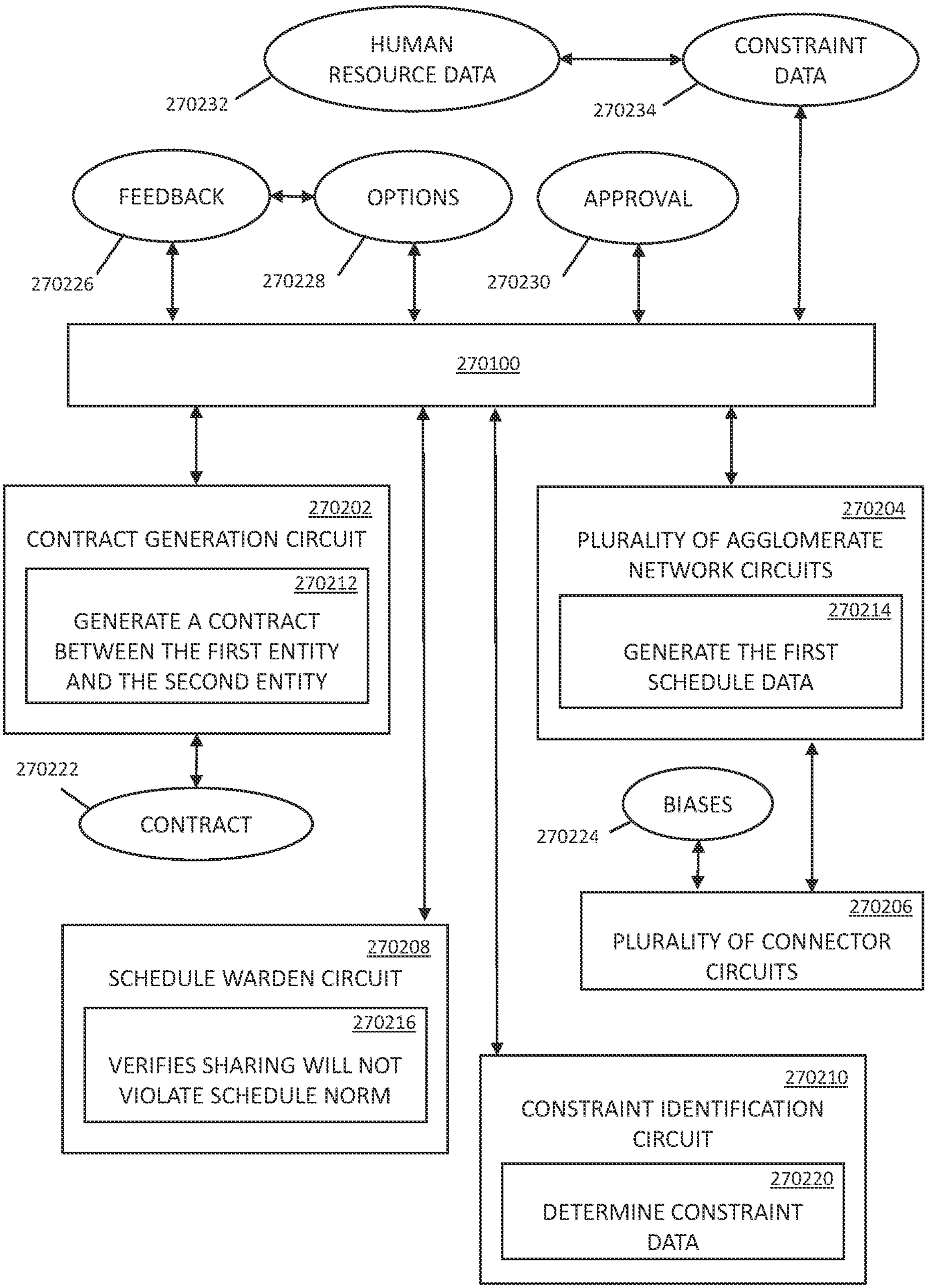
FIG. 28 is a schematic diagram depicting certain further aspects of an apparatus for employee sharing/contracting, in accordance with an embodiment of the current disclosure.

Referring to FIG. 28, in embodiments, the apparatus 270100 may further include a contract generation circuit 270202 structured to generate 270212 a contract 270222 between the first entity 270120 and the second 270128 entity that obligates the employee to work the shift. In embodiments, the indication 270134 (FIG. 27) transmitted by the shared employee provisioning circuit 270110 includes the contract 270222. The contract 270222 may be a traditional contract, e.g., a static document, or smart contract that may be based at least in part on a blockchain. For example, in embodiments, acceptance of the contract 270222 may be facilitated by a hashed digital signature that is added to the blockchain. In embodiments, the indication 270134 may include a link to the contract 270222.

In embodiments, determining the availability of the employee via the sharing circuit 270108 may be based at least in part on exchanging the employee for another employee from the second entity, wherein the employee from the second entity works a shift intended for the employee from the first entity. In other words, the employees may be swapped. For example, company A may require a job B to be completed where job B requires skill set X, and company D may require a job E to be completed where job E requires skill set Y. Further, company A may have employee R who has skill set Y and company D may have employee S who has skill set X. Embodiments of the current disclosure may detect this job/skill mismatch and arrange for company A and D to exchange employees R and S so that the jobs B and E can be completed. As will be understood, such an arrangement mutually benefits both company A and company D.

In embodiments, the indication 270134 may provide for an employee to provide feedback 270226 regarding an opportunity to work a shift (for another entity). The feedback 270226 may include an option 270228 for the employee to agree or refuse the opportunity. The indication 270134 may provide for an entity to provide feedback regarding the opportunity to share its employee. The feedback may include an option 270228 to approve or refuse the opportunity. The indication 270134 may include options 270228 for both an entity and an employee to approve or refuse the sharing opportunity. In embodiments, approval 270230 from both the employee and the entity may be required for the employee to work a shift (at the second entity).

As will be understood, the contract 270222 may specify one or more payment arrangements with respect to the sharing of employee(s). For example, in embodiments, the second entity 270128 may compensate the employee for working the shift. In embodiments, the second entity 270128 may compensate the first entity 270120 (the one that employee is originally associated with) for the employee working the shift. In embodiments, the second entity 270128 may compensate the first entity 270120 and the employee for working the shift.

In embodiments one or more additional employees of the first entity 270120 may be determined as being available to work the shift with the first employee. For example, the one or more additional employees and the first employee may be on a same team in the first entity 270120. In embodiments, the one or more additional employees may be in a same department of the first entity 270120.

In embodiments, the apparatus 270100 may further include a constraint identification circuit 270210 structured to determine 270220 constraint data 270234 corresponding to the employee. Non-limiting examples of constraint data 270234 include: maximum number of hours available to work in a day, week, month, year, etc.; physical limitations, excluded time periods, e.g., no morning shifts, no evening shifts, etc.; a maximum amount of pay per day, year, month, year, etc.; crew rest requirements; employee(s) that must be co-workers; employee(s) that must be avoided, etc. In such embodiments, determination 270114 the availability data 270124 may be further based at least in part on the constraint data 270234.

In embodiments, the constraint data 270234 may be determined by analyzing the schedule data 270122 and/or 270130 (FIG. 27). For example, the constraint identification circuit 270210 (FIG. 28) may determine that a particular employee has already worked thirty-five (35) hours for a given week and therefore is only available to work an additional five (5) hours in order to avoid having to pay the employee overtime.

As disclosed herein, the constraint data 270234 may be based at least in part on human resource data 270232 retrieved from a database. The database may be associated with the first entity 270120 and/or the second entity 270128. For example, embodiments of the current disclosure may retrieve information from the database such as, but not limited to: a number of hours worked by an employee; a skill set possessed by an employee; a performance evaluation (which may be in the form of a score, e.g., "high performer", "satisfactory performer", and/or "needs improvement"); physical limitations, e.g., a lifting weight limit; and/or the like. Further non-limiting examples of constraint data 270234 include data corresponding to a minimum wage per hour, a minimum amount of pay, an amount of overtime, and the like.

In embodiments, the apparatus 270100 includes a plurality of agglomerate network circuits 270204 connected via a plurality of connector circuits 270206, as disclosed herein, that generate 270214 the first schedule data 270122 (FIG. 27). In embodiments, a connector circuit of the plurality 270206 biases 270224 the first schedules data 270122, as disclosed herein. As such, the bias 270224 may weight the first schedule data 270122. In embodiments, an agglomerate network circuit of the plurality 270204 may be structured to incorporate weather data into the first schedule data 270122. The plurality of agglomerate network circuits 270204 may include a schedule warden circuit, e.g., 270208 and/or 20100 (FIG. 37), as disclosed herein, that verifies 270216 that the sharing of an employee, as disclosed herein, will not violate a schedule norm, e.g., one relating to a maximum amount of hours worked per week.

Figure 29:
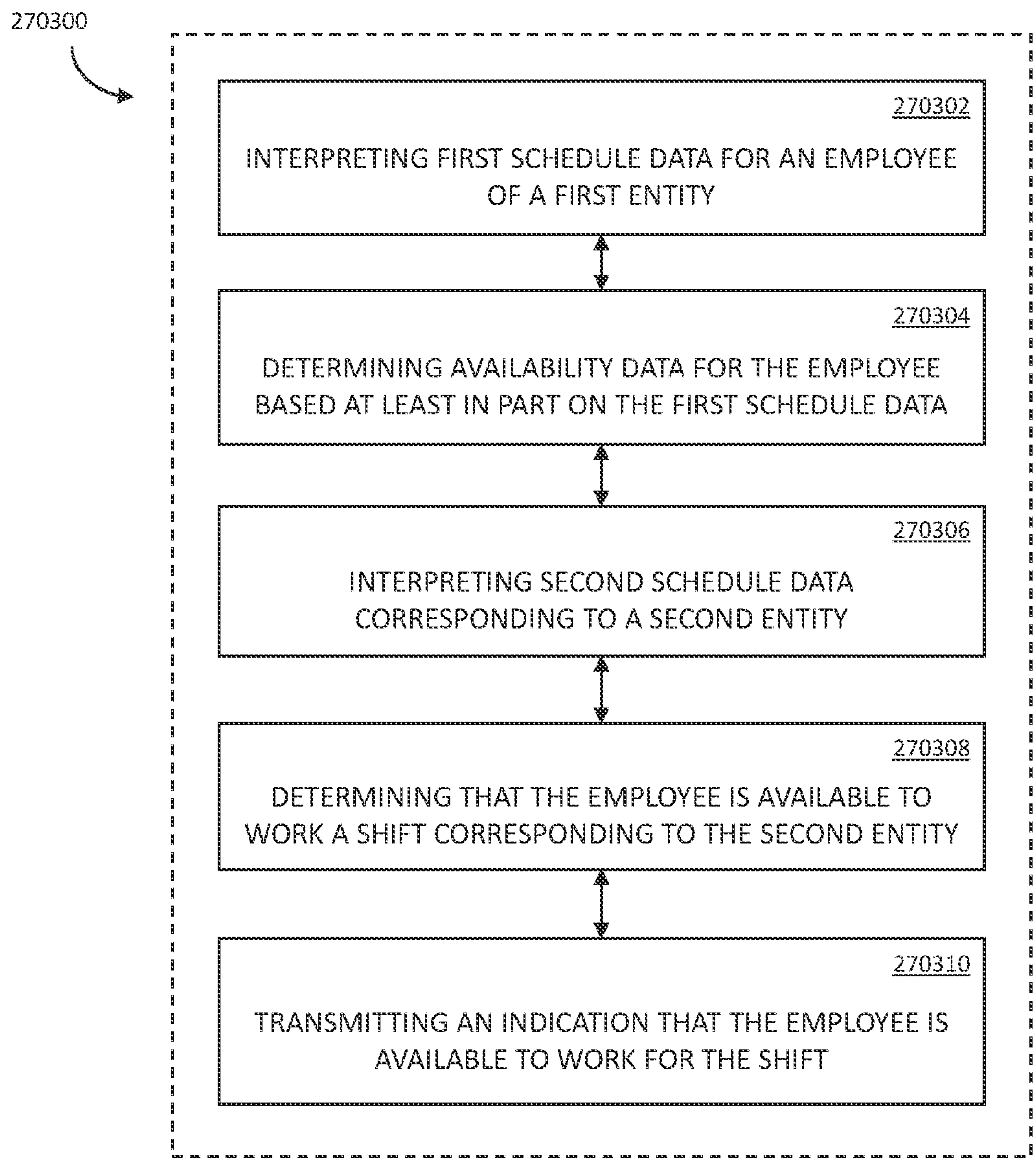
FIG. 29 is a flowchart depicting a method for employee sharing/contracting, in accordance with an embodiment of the current disclosure.

Referring to FIG. 29, a method 270300 for employee contracting/sharing is shown, in accordance with embodiments of the current disclosure. The method may be performed via apparatus 270100 and/or any other computing device disclosed herein. The method 270300 includes interpreting, via a first schedule interpretation circuit, first schedule data for an employee of a first entity 270302; and determining, via an availability determination circuit, availability data for the employee based at least in part on the first schedule data 270304. The method 270300 further includes interpreting, via a second schedule interpretation circuit, second schedule data corresponding to a second entity 270306; and determining, via a sharing circuit and based at least in part on the availability data and the second schedule data, that the employee is available to work a shift corresponding to the second entity 270308. The method 270300 further includes transmitting, via a shared employee provisioning circuit, an indication that the employee is available to work for the shift 270310.

Referring to FIG. 2704, certain further aspects of the method 270300 are described following, any one or more of which may be present in certain embodiments. For example, the first and the second entities may be distinct departments within a same organization. In embodiments, the first and the second entities may be distinct organizations. In embodiments, the method 270300 may further include generating a contract 270422 between the first entity and the second entity 270412, where the contract 270422 may obligate the employee to work the shift. As disclosed herein, the transmitted indication 270134 (FIG. 27) may include the contract 270422, and/or the contract 270422 may be a smart contract based at least in part on a blockchain. Acceptance of the contract 270422, e.g., a digital signature, may be hashed and added to the blockchain.

In embodiments, determining the availability data for the employee 270304 (FIG. 29) may be based at least in part on exchanging a first employee (from the first entity) for a second employee (from the second entity), where the second employee works a shift intended for the first employee.

Figure 30:
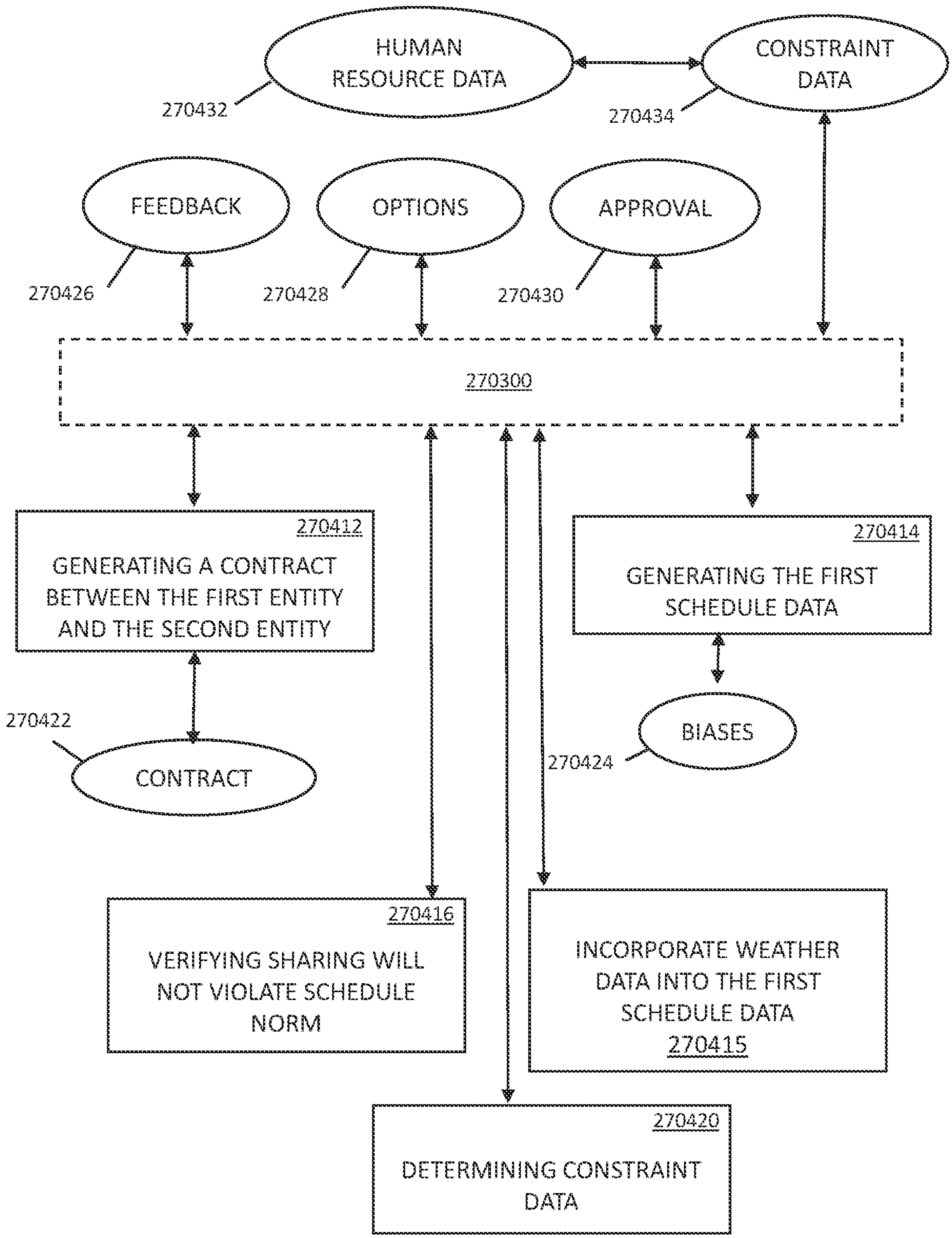
FIG. 30 is a flowchart depicting certain further aspects of a method for employee sharing/contracting, in accordance with an embodiment of the current disclosure.

In embodiments, the indication 270134 (FIG. 27) provides for the employee to provide feedback 270426 (FIG. 30) regarding the opportunity to work the shift. The feedback 270426 may include an option 270428 to agree or refuse the opportunity. The indication 270134 may also provide for the entity to provide feedback regarding the opportunity to share the employee. In such embodiments, the feedback 270426 may include an option 270428 to approve and/or refuse the opportunity. The indication 270134 may include options 270428 for both an entity and an employee to approve or refuse the sharing opportunity. Approval 270430 (FIG. 30) from both the employee and the entity may be required for the employee to work the shift.

In embodiments, the method 270300 may further include determining a constraint data 270434 corresponding to the employee 270420. In such embodiments, determining the availability data 270304 (FIG. 29) may be further based at least in part on the constraint data 270434. In embodiments, the constraint data 270424 may be determined 270420 (FIG. 30) by analyzing the schedule data 270122 (FIG. 27). The constraint data 270122 may be based at least in part on human resource data 270432 (FIG. 30) retrieved from a database. The constraint data 270434 may correspond to a maximum number of hours worked per period of time including at least one of a day, a week, a month, or a year. The constraint data 270434 may correspond to a minimum wage per hour, a minimum amount of pay, an amount of overtime, and the like.

In embodiments, the method 270300 may further include generating the first schedule data 270414 and biasing the first schedule data 270424, where the bias may weight the first schedule data. In embodiments, the method 270300 may further include incorporating weather data into the first schedule data 270415 and/or verifying that sharing of the employee will not violate a schedule norm 270416, e.g., a norm relating to an amount of hours worked. In embodiments, the employee may be legally employed by the first entity, may be a volunteer, may be a contractor, and the like.

Figure 31:
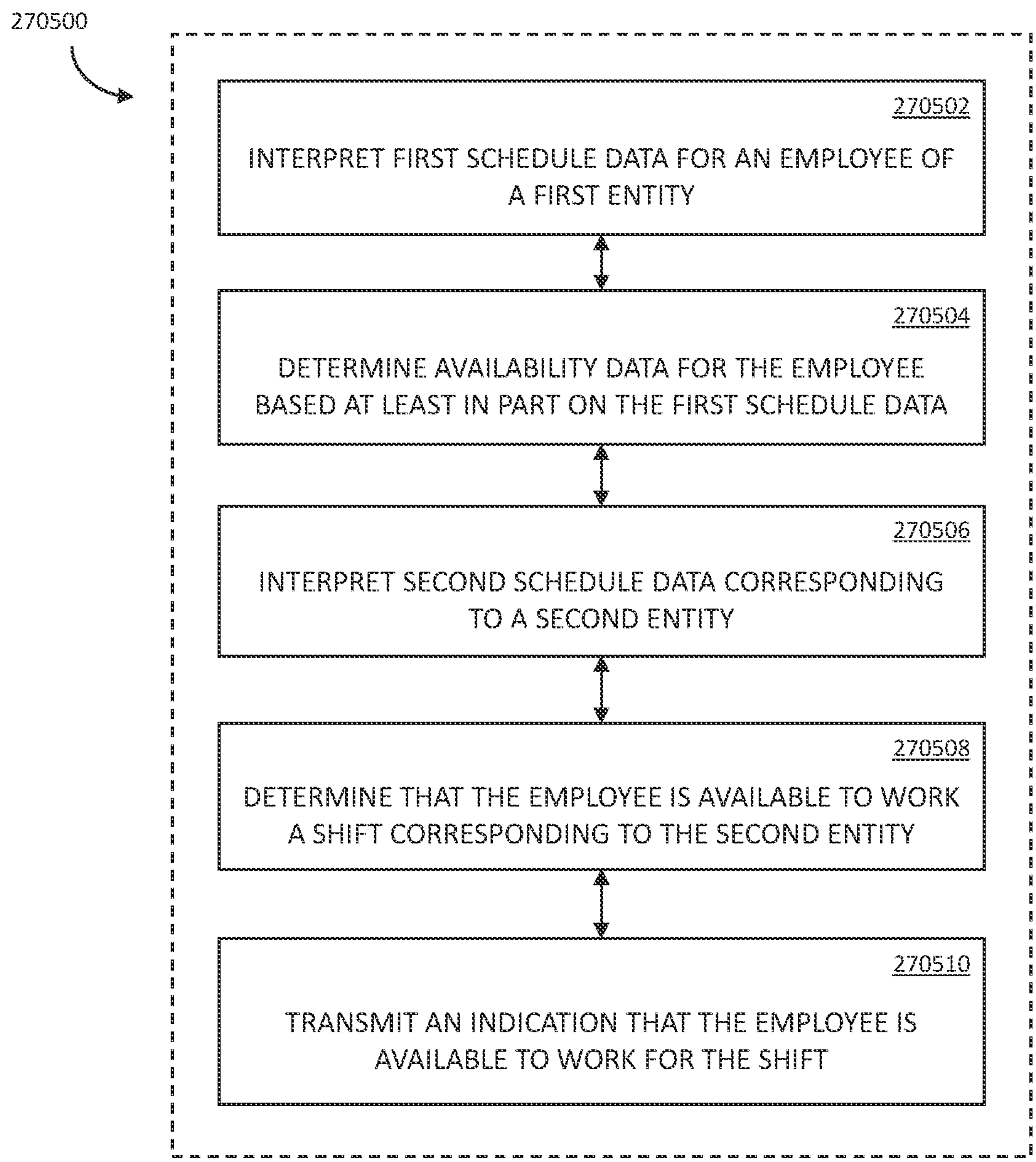
FIG. 31 is a block diagram depicting a non-transitory computer-readable medium for employee sharing/contracting, in accordance with an embodiment of the current disclosure.

Referring to FIG. 31, a non-transitory computer-readable medium 270500, in accordance with embodiments of the current disclosure, is provided. The non-transitory computer-readable medium 270500 includes instructions that adapt at least one processor to: interpret first schedule data for an employee of a first entity 270502; determine availability data for the employee based at least in part on the first schedule data 270504; and interpret second schedule data corresponding to a second entity 270506. The instructions further adapt the at least one processor to determine, based at least in part on the availability data and the second schedule data, that the employee is available to work a shift corresponding to the second entity 270508; and transmit, an indication that the employee is available to work for the shift 270510.

Figure 32:
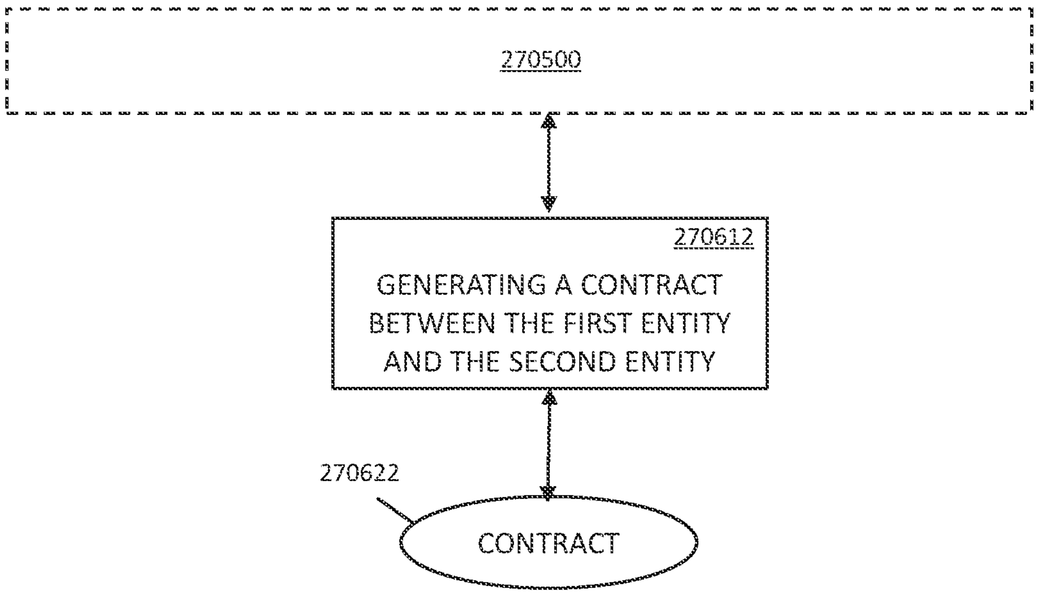
FIG. 32 is a block diagram depicting certain further aspects of a non-transitory computer-readable medium for employee sharing/contracting, in accordance with an embodiment of the current disclosure.

Referring to FIG. 32, certain further aspects of the non-transitory computer-readable medium 270500 are described following, any one or more of which may be present in certain embodiments. For example, in embodiments, the stored instructions further adapt the at least one processor to: generate a contract 270622 between the first entity and the second entity that obligates the employee to work the shift 270612. In embodiments, the indication 270134 (FIG. 27) transmitted by the shared employee provisioning circuit includes the contract 270622. As also disclosed herein, the contract 270622 may be a smart contract that is based at least in part on a blockchain, and/or acceptance of the contract 270622 may be hashed and added to the blockchain.

Figure 33:
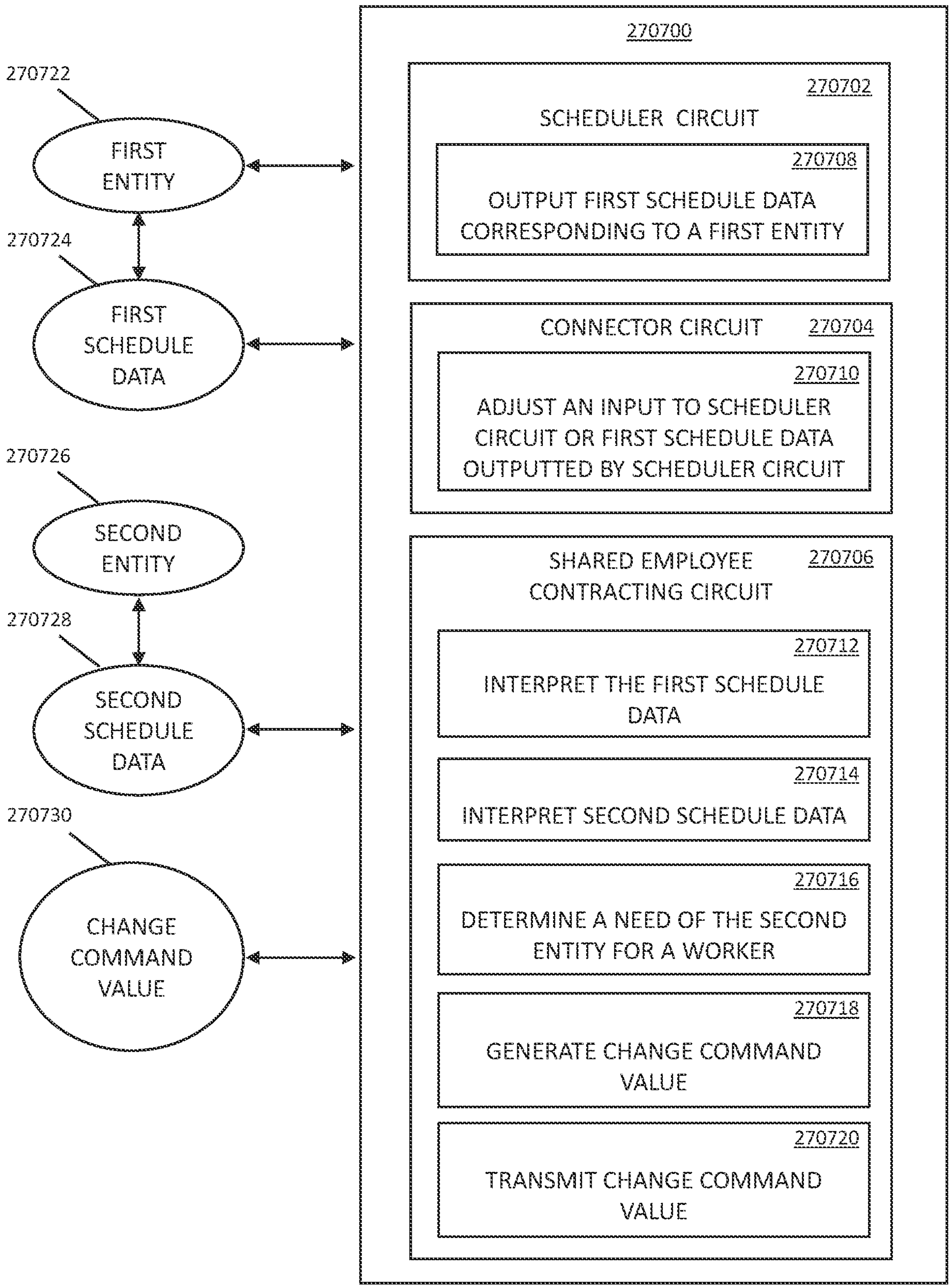
FIG. 33 is a schematic diagram depicting an agglomerate network for employee sharing/contracting, in accordance with an embodiment of the current disclosure.

Referring to FIG. 33, embodiments of the current disclosure may provide for an agglomerate network 270700 that provides for employee contracting/sharing. As shown in FIG. 33, the agglomerate network 270700 includes a scheduler circuit 270702 structured to output 270708 first schedule data 270724 corresponding to a first entity 270722. The agglomerate network 270700 further includes a connector circuit 270704 structured to adjust at least one of an input to the scheduler circuit or the first schedule data outputted by the scheduler circuit 270710. The agglomerate network 270700 further includes a shared employee contracting circuit 270706 structured to: interpret 270712 the first schedule data 270724; interpret 270714 second schedule data 270728 corresponding to a second entity 270726; and determine a need of the second entity 270726 for a worker based at least in part on the second schedule data 270716. The shared employee contracting circuit 270706 is further structured to generate 270718 a change command value 270730 structured to trigger an adjustment to the connector circuit to effect a change of at least one of the input to the scheduler circuit or the first schedule data outputted by the scheduler circuit such that the employee is made available to fill the need of the second entirety for a worker. The shared employee contracting circuit 270706 is further structured to transmit 270720 the change command value.

Figure 34:
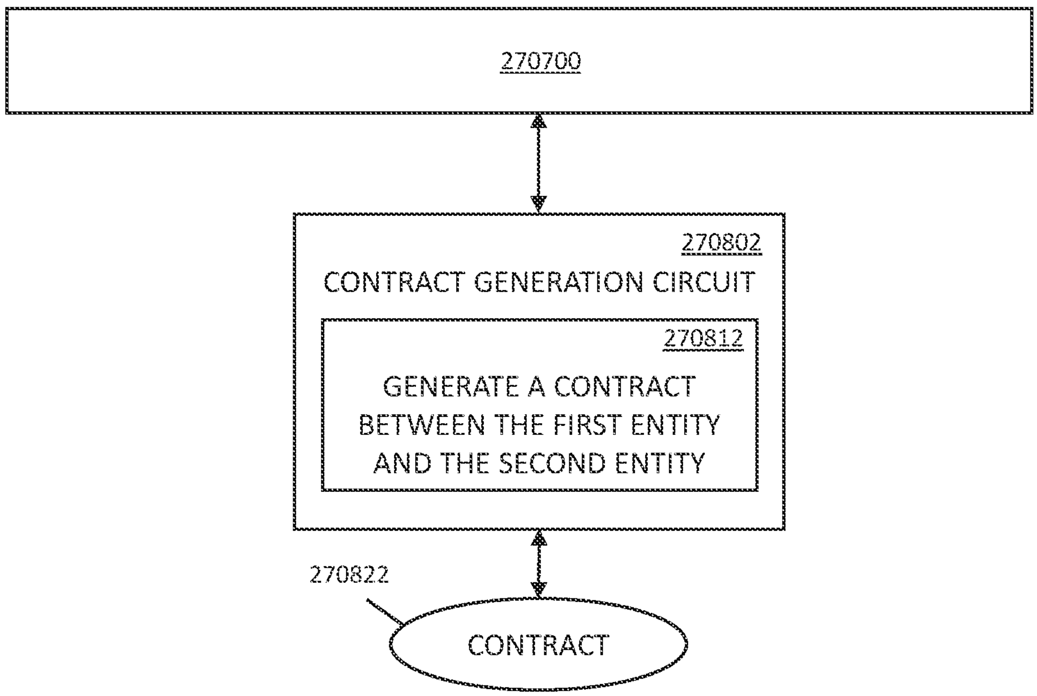
FIG. 34 is a schematic diagram depicting certain further aspects of an agglomerate network for employee sharing/contracting, in accordance with an embodiment of the current disclosure.

Referring to FIG. 34, certain further aspects of the agglomerate network 270700 are described following, any one or more of which may be present in certain embodiments. For example, the shared employee contracting circuit 270706 may further include a contract generation circuit 270802 structured to generate 270812 a contract 270822 between the first entity and the second entity. The contract 270822 may obligate the employee to work the shift, and the indication transmitted by the shared employee provisioning circuit may include the contract. As disclosed herein, the contract 270822 may be a smart contract that is based at least in part on a blockchain, and acceptance of the contract 270822 may be hashed and added to the blockchain.

The systems and methods described herein for shared employee contractor provide various technical benefits and improvements to processing schedules. In one aspect, the systems and methods provide for efficient management of agreements and contracts as they relate to schedules. In many cases, different organizations may have separate inoperable systems (due to security, regulatory, or other concerns and constraints). Providing elements related to the schedule, such as contracts, on the blockchain allows different entities to effectively share and maintain a secure and verifiable shared data resource. The blockchain allows different entities to effectively share electronic information related to schedules even when the schedule systems of the entities may not be operable or accessible with each other. The system and methods enable efficient utilization of resources by utilizing blockchains to maintain and track contracts as they relate to schedules.

In embodiments, the schedule flexor may be a turnover schedule flexor that seeks to produce schedules and/or provide employee incentives to mitigate and/or eliminate employee turnover. For example, embodiments of the turnover schedule flexor may favor giving an employee an easier/improved schedule when the risk of turnover for that employee is high but favor the employer, e.g., giving the employee a harder schedule, when the risk of turnover for that employee is low. In embodiments, "favoring" by the system may be to affect short-term profits. Accordingly, other non-limiting examples of where embodiments of the system may favor the employee or the employer include:

A. Where there is a risk of the employee leaving, e.g., as measured by sentiment analysis of an HR survey. For example, the system may prioritize that employee's preferences for this week's schedule even though the result causes overage for this week, reducing sales margins. Another example may be a deficiency for the week, resulting in additional labor being brought in (again, reducing profit).

B. In a schedule marketplace, as described herein, under a process that rewards employee acceptance of less desirable shifts with shift premiums, the employee/employer benefits may tend to balance each other out, assuming an efficient marketplace. As will be understood, in practice, however, the terms of shift premium rewards may be set by the employer, and so the employer may not be completely fair.

C. In scenarios involving hidden long-term benefits learned by embodiments of the system, as disclosed herein, that have short-term negative impacts on profits, e.g., where the system has learned that approving vacation helps the productivity of an employee, even though the short-term result is a deficiency.

The turnover schedule flexor may also provide and/or suggest incentives e.g., additional pay, vacation time, points, etc. when an employee is given a difficult schedule and/or in situations where the employer has an urgent need for the employee. Non-limiting examples of improved schedules include less physically demanding jobs, preferred shifts, better paying shifts, promotions for star performers, etc.

In embodiments, the agglomerate models may couple/join as indicated in the examples herein.

An event model might provide inputs to a schedule model regarding the excess staffing requirements associated with an upcoming event.

The schedule model in turn develops a schedule that meets the staffing requirements associated with the given event.

The sentiment analysis model recognizes that the new schedule requires substantial overtime and several closing/opening shifts for key employees and updates employee sentiment accordingly.

An absenteeism model predicts that several employees will call-in-sick or otherwise miss their assigned schedule times.

A retention model predicts that several employees may leave given the current sentiment.

A capacity model updates it turnover rates, hiring predictions, etc., and predicts available capacity at this franchise and across a network of franchises.

A future scheduling activity cannot develop a satisfactory schedule for a future event based on the modeled capacity.

In embodiments, the evolution controller determines when the models have cycled sufficiently.

Figure 35:
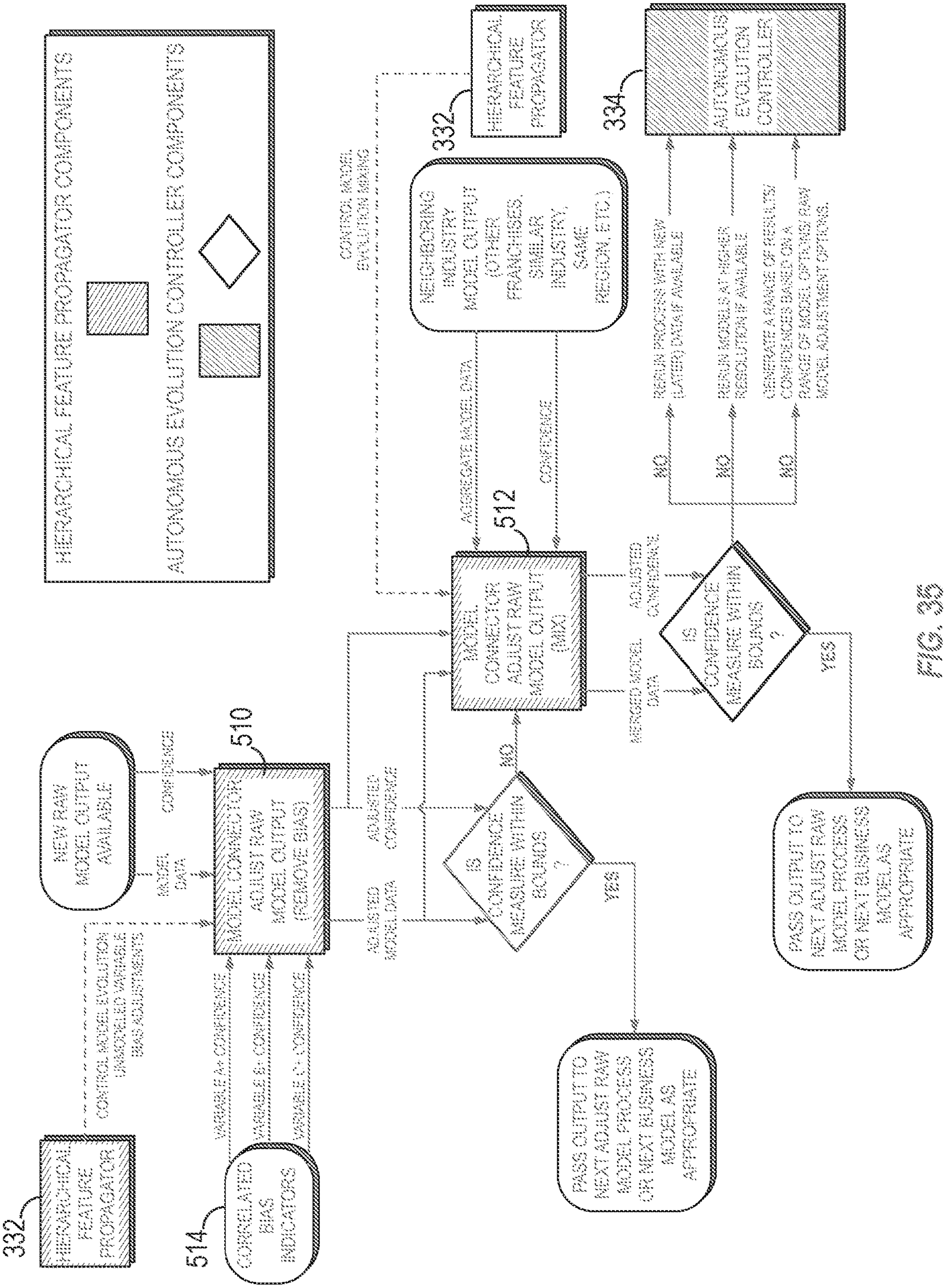
FIG. 35 depicts an evolution process flow, in accordance with embodiments of the current disclosure.

Referring to FIG. 35, the evolution controller 334 may communicate with the Hierarchical Feature Propagator 332 and Model Connectors 510, 512 to determine if additional model runs may be required in order to reduce the level of extrapolation required to generate corrected feature inputs.

In embodiments, if a confidence measure remains out of bounds, then the Autonomous Evolution Controller 334 may choose to rerun an earlier model with the most recent data (if a higher resolution model is available), or with a selection of probabilistic options, the system can carry forth through to the next stage of processing, e.g., for the use case shown in FIG. 35, options that would drive relative absenteeism rate (such as minimum actual snow fall, no school closing and the like) to options that would drive a high absenteeism rate (such as more than the forecasted 6" of snow, more school closings and the like). The multiplicity of results could be carried through the next schedule generation states in order to better assess the staffing risks and for determining the best staff schedule.

In the embodiment of FIG. 35, the correlated bias indicators 514 are features that are not adequately considered within the raw model output data. To accommodate these variables, the trainable Adjust Raw Model Output performs an adjustment on the raw data, if possible. This may also impact confidence.

A use case in relation to FIG. 35 is described below. An absenteeism model may take as input a particular franchise location including numerous business values useful to predicting absenteeism (such as sentiment, schedule, time of the year, etc.) but from past experience, the model does not adequately consider the impact of school closures or significant snowstorms. In this case, predicted snowfall rates along with their confidence are input to adjust absenteeism outputs based on school closure information (Variable A), employees within affected school districts (Variable B), and the predicted snowfall rates (Variable C). The model, trained on similar data, adjusts the model outputs and confidence appropriately.

Figure 36:
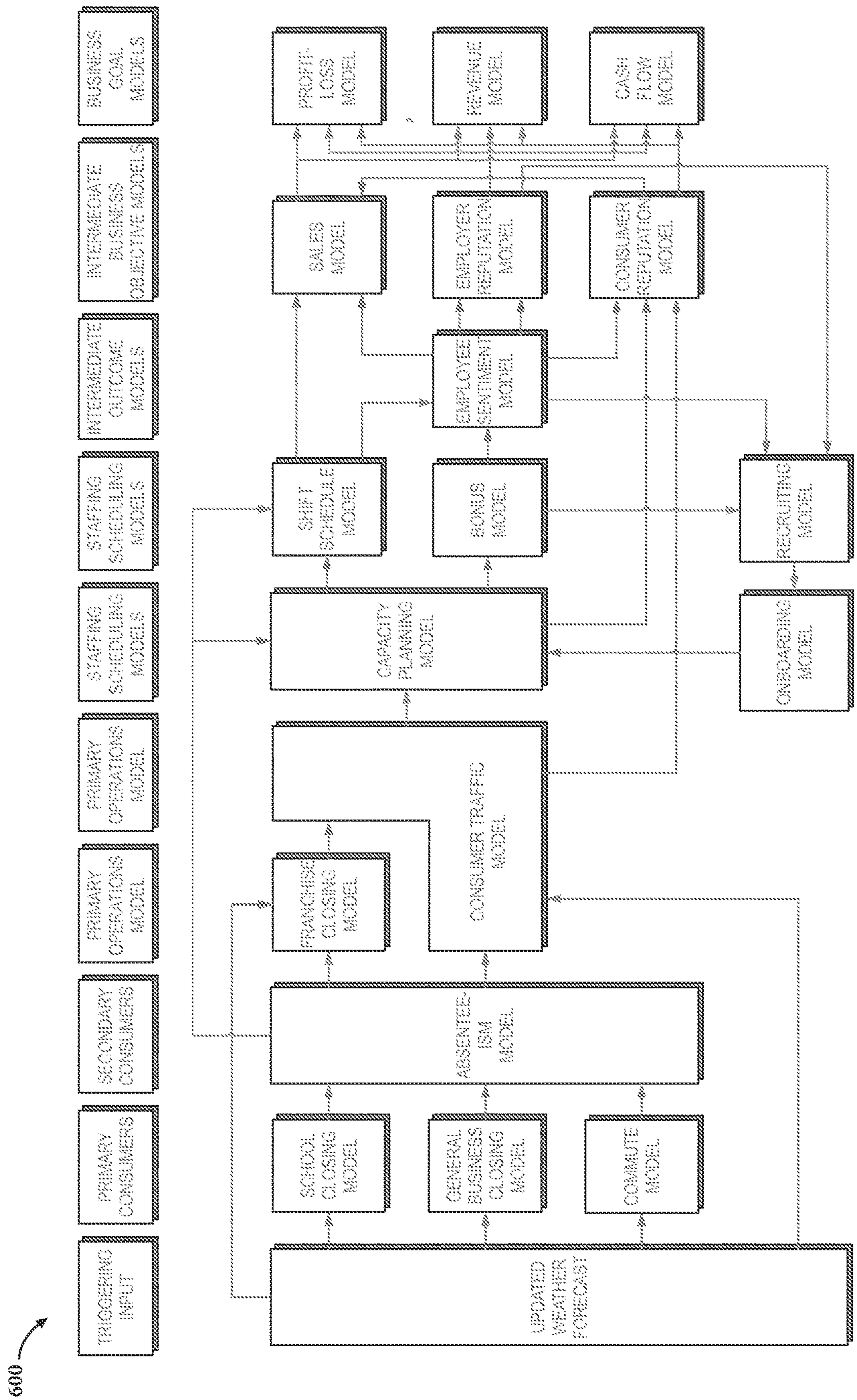
FIG. 36 depicts an agglomerate mode information propagation process, in accordance with embodiments of the current disclosure.

FIG. 36 depicts an agglomerate model information propagation process 600, in accordance with embodiments of the current disclosure. In embodiments, the hierarchical feature propagator 332 (FIG. 35) may be configured to act on data transfers between models and modeling time horizons, propagate uncertainty through the network as probability distributions, and improve sparsely sampled data from an individual site, company, or time-period using cross-site, cross-company, and historical data. In embodiments, the autonomous evolution controller 334 (FIG. 35) may be configured to determine when to execute a model update based on propagated data, determine when to explore probability space, (i.e., the execution of models to examine non-consensus results), and determine when to generate alternative or predictive solutions to support rapid editing, model evolution, and/or enable sensitivity analysis.

Embodiments may include a semi-autonomous goal setter 336 (FIG. 35). At a top-level, business goals may be defined in the context of maximizing some combination of corporate metrics, e.g., profit, cash-flow, customer retention, employee retention, etc. In some cases, goals such as employee retention, may be unstated or unmeasured as a specific objective; its impact may only be felt as a contributor to a higher goal such as profit/loss. In embodiments, the semi-autonomous goal setter may be to build an understanding of the high-level corporate goals (e.g., profit/loss) and to translate such high-level goals, where possible, to intermediate goals such as employee retention, sentiment, frequency of schedule editing, absenteeism, store coverage, local sales, etc. The semi-autonomous goal setter may examine data over time and across similar departments, stores, related industries, regionally, and/or within common macro-economic environments (unemployment rate, job turnover, pay, recruiting environment, etc.), to set intermediate goals that are useful for the training of individual models, or a subset of agglomerate models.

In embodiments, the Semi-Autonomous Goal Setter may continuously, or periodically, monitor high level goals and decrease its confidence in an intermediate goal(s) if achieving the intermediate goals results in higher level goals performing better/worse than might be imputed from the intermediate values. When the anticipated correlation falls below a defined or learned threshold, the Semi-Autonomous Goal Setter may recalculate one or more intermediate model goals.

Embodiments may include a continuous model validator. In embodiments, an element may be included that identifies when intermediate or final model outputs are insufficiently predictive of the actual behavior of the system, thus generating a need for a new and/or improved Hierarchical Feature Propagator (for instance, a new bias connector, or modified weights on a hierarchical mixer) or Autonomous Evolution Controller (for example, an altered threshold for playing multiple options through the system).

Embodiments of the system, as disclosed herein, may also provide for a schedule warden that uses artificial intelligence (AI) and/or machine learning (ML) to monitor a schedule to detect when scheduling conditions fall outside of company norms. Embodiments of the schedule warden may form part of component/module 128 (FIG. 1). The schedule warden may include automatic adjustments or recommendations. The schedule warden may use "normal" baselines defined by a user or determined by the AI and/or ML looking at past data. The schedule warden may be structured to detect one or more of: preferential overtime for certain employees; preferential shifts for certain employees; lack of fairness for time off requests; and/or unfair scheduling editing. The schedule warden may compare schedule data across all relevant locations, e.g., locations of a franchise, for norms, or across industry norms, e.g., all fast-food stores.

Embodiments of the schedule warden may provide for the use of artificial intelligence (AI) to monitor/inspect a generated schedule to detect if scheduling conditions/properties of the generated schedule fall outside of scheduling norms. In embodiments, "normal", as used with respect to schedule data, includes conditions where schedule properties of a schedule being evaluated align with prior schedules used by an entity, and/or schedule properties of the schedule being evaluated conform to industry customs and/or legal requirements. In embodiments, "normal", as used with respect to schedule data, may be defined by a user and/or determined by AI looking at past data. Non-limiting factors for determining "normal" may include fairness, past schedules, industry averages, etc. Non-limiting factors for determining "normal" may include determining statistics for historical data and identifying thresholds for elements which may be classified as normal.

Embodiments of the current disclosure may also provide for automatic schedule adjustments and/or recommendations in response to detecting that scheduling conditions fall outside scheduling norms. A non-limiting use case may include detecting situations where a supervisor is consistently giving another employee an exceptionally easy/favorable schedule and/or another employee an exceptionally hard/difficult schedule. Another non-limiting use case may include detecting when a supervisor is generating schedules that push the work-life balance too far in one direction. Embodiments may use scoring scale(s) to compare fairness and/or work-life balance. Scales may be dynamic based on seasonality, location, life events, etc.

Figure 37:
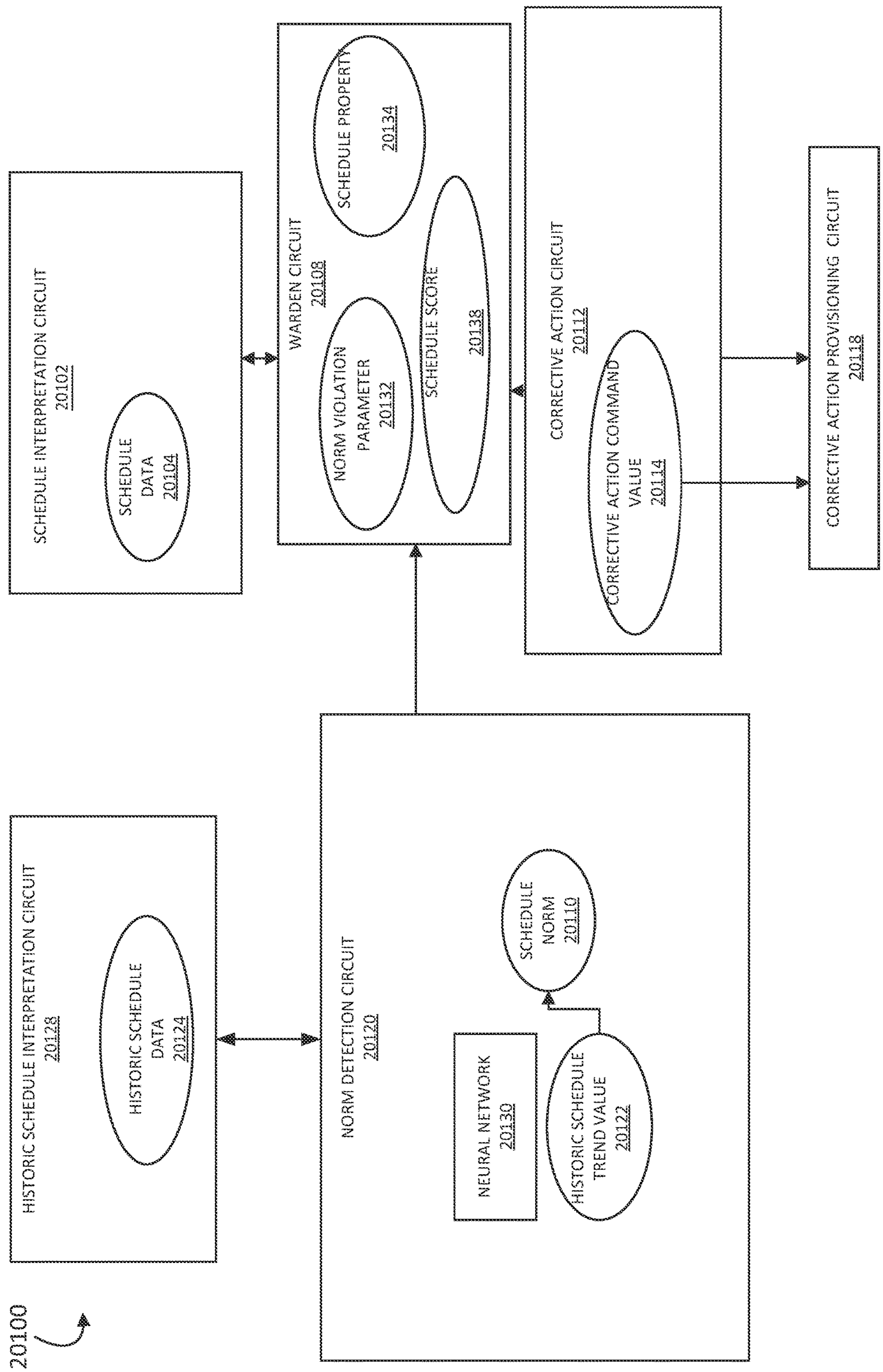
FIG. 37 depicts an apparatus for determining when scheduling conditions fall outside of an entity's normal scheduling practice, in accordance with embodiments of the current disclosure.

Accordingly, referring to FIG. 37, an apparatus 20100 for determining when scheduling conditions fall outside of an entity's normal scheduling practice is depicted. The apparatus 20100 may include a schedule interpretation circuit 20102 structured to interpret schedule data 20104, a warden circuit 20108 structured to determine, based at least in part on the schedule data 20124, that a property of the schedule data (a schedule property 20134) violates a schedule norm 20110 and generates a norm violation parameter 20132. The apparatus 20100 may further include a corrective action circuit 20112 structured to generate, in response to the determination that the property violates the schedule norm and/or the norm violation parameter 20132, a corrective action command value 20114 to be transmitted to a corrective action provisioning circuit 20118. The corrective action command value 20114 may be structured to trigger an adjustment to the schedule data 20104 to effect a change in one more schedule properties 20134 such that the schedule data 20104 no longer violates the schedule norm 20110. In embodiments, the adjustment may be a direct change to the schedule data 20104, e.g., an addition of a shift, a swapping of assigned workers to a shift, a removal of a shift, an extension of a shift, a shortening of a shift, and/or any other change to a property of a schedule and/or related aspects thereof.

In embodiments, the apparatus 20100 may include a historic schedule interpretation circuit 20128 structured to interpret historic schedule data 20124 and a norm detection circuit 20120. The norm detection circuit 20120 may be structured to generate a historic schedule trend value 20122 based, at least in part on the historic schedule data 20124. In some embodiments, a neural network 20130 may identify the history schedule trend value 20122. The neural network 20130 may be part of the norm detection circuit 20120, the historic schedule interpretation circuit, 20128, or located in an external device. The norm detection circuit 20120 may be further structured to generate the schedule norm 20110 based, at least in part on, the historic schedule trend value 20122, and/or historic schedule data 20124. The historic schedule data 20124 may include data for the same entity as the schedule data 20104 and/or for a different entity, where the different entity may be in a similar industry, a geographical location with similar employment regulations and customs, for a similar manufacturing line or process, and the like. The neural network 20130 may be based, at least in part, on unsupervised learning using historic schedule data 20124 and/or a historical trend value 20122. The neural network 20130 may be further trained and/or updated as new data becomes available.

The warden circuit 20108, or a subsidiary score generation circuit 20402, may generate a plurality of schedule scores 20138 for the schedule data 20104 where the schedule scores 20138 may be relative to one or more schedule properties 20134, combinations of schedule properties, statistics of one or more schedule properties, statistical relationships between schedule properties, and the like. For example, a schedule that has an average shift length of six hours with a corresponding wage that is above the industry average may get a higher schedule score 20138 with respect to employee retention than a schedule that has an average shift length of nine hours with a corresponding wage that is below the industry average.

Figure 38:
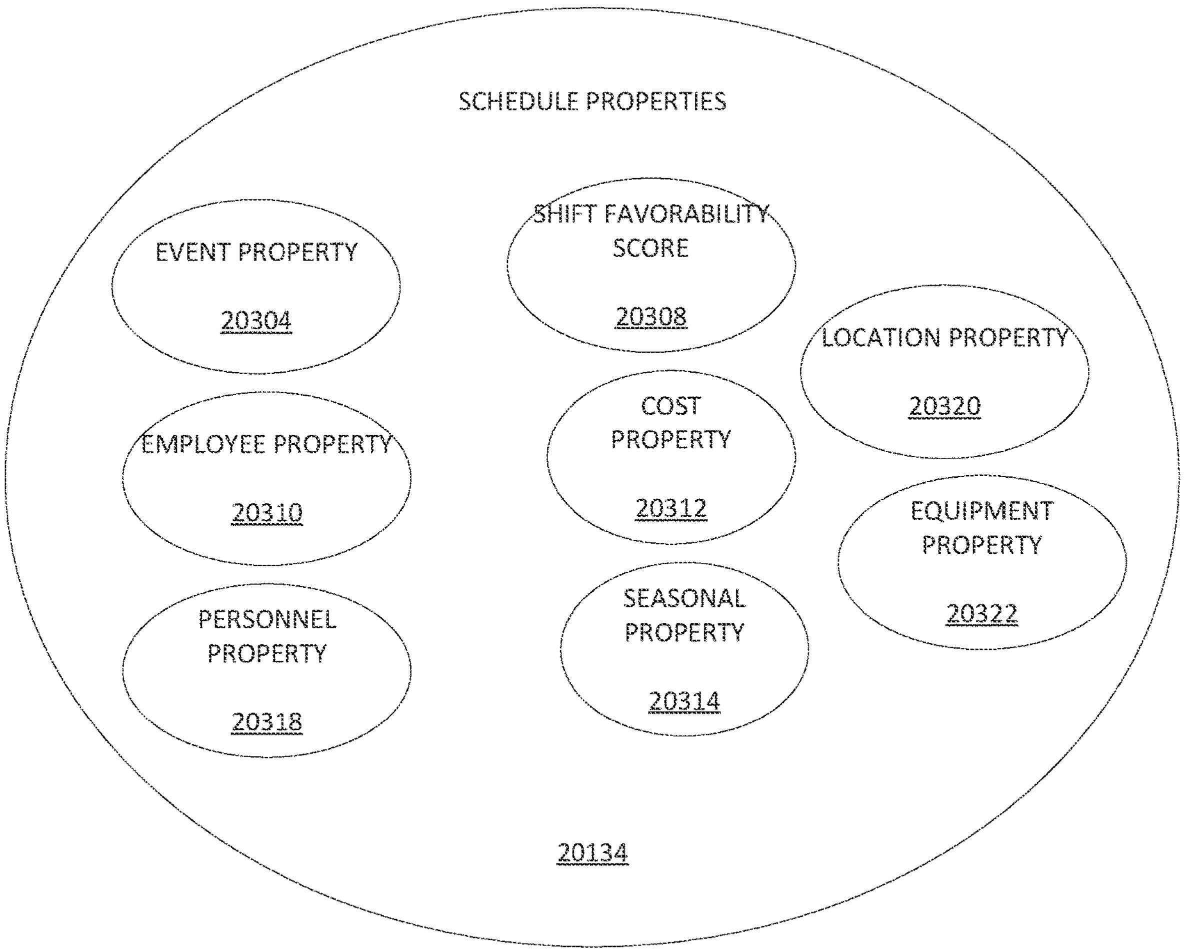
FIG. 38 depicts schedule properties, in accordance with embodiments of the current disclosure.

Referring to FIG. 38, schedule properties 20134 may include an event property 20304, an employee property 20310, a shift favorability score 20308, a cost property 20312, a seasonal property 20314, a personnel property 20318, a location property 20320, equipment property 20322, and the like. An event property 20304 may be indicative of a disruptive event such as an expected maintenance shutdown, a failure of equipment, a weather-related shutdown, a significant increase in production targets, and the like. A shift favorability score 20308 may be indicative as to how desirable a shift may be. This may be influenced by time of day (A, B, or C shift), type of shift (swing shift, 10 on/4 off, and the like), shift days or dates (weekends, holidays, and summers), work being done on the shift, availability of overtime pay, group interactions, and the like. Shift favorability score may be for a shift overall or may vary with employee and their preferences.

An employee property 20310 may include employee status (e.g., regular, contractor, on probation), a seniority, a rating, an hourly rate, a skill set, a certification, a clearance level, a limitation that might affect schedule and/or working conditions, any needed adaptations, employee interactions, and/or the like. For example, if work is slow and shifts are limited, preference may be given to an employee over a contractor. Skill sets, certifications, clearance level and the like may affect whether an employee is qualified to work a particular shift and/or a particular station/job during a shift. Limitations and needed adaptations may impact total working hours, types of shifts the employee may be assigned, the locations where an employee may be assigned and the like. An employee property 20310 may be cumulative over a period of time such as per day, per week, per month, per pay period, per quarter, per year, over career, etc.; either from a historic perspective or to date within a current time period selected (e.g., month to date, week to date, year to date, and the like) with or without the inclusion of the current schedule data. In embodiments, employee property 20310 may include cumulative hours worked, cumulative overtime hours, cumulative shift favorability (i.e., number of preferred shifts for an employee or group of employees compared to unfavorable shifts) where shift factorability may be historical or related to the specific schedule data. Employee interactions may include properties that are linked with specific employees or groups of employees such as interaction ratings between employees, including managers, who would be working together. Interaction ratings may indicate how well employee combinations get along, whether they work well together, duplication of skill sets, roles, and the like. Interaction ratings may be based at least on a score, range, scale, or the like.

A cost property 20312 may include projections of the cost of the shift as configured (in terms of personnel costs, equipment costs, materials costs, and the like), anticipated output, return on shift, and the like.

A seasonal property 20314 may include season of year, weather conditions, and the like. For example, reduced shift hours may be acceptable for workers exposed to the elements if weather conditions are substantially out of the norm, such as during a heat wave.

A personnel property 20318 may identify who and/or how many people are available to fill a shift. This may account for scheduled vacations, overall staffing, and the like.

Location property 20320 may include information regarding geographical location of shift (e.g., which plant), building location, manufacturing line, workstation, and the like. Some entities may have multiple locations in a community and/or compound/campus with multiple buildings at different locations and the like.

Equipment property 20322 may include information regarding which equipment will be used, any specific skills required for use of the equipment, condition of the equipment (e.g., operating reduced capacity, pending maintenance, etc.), cycle times of the equipment, etc.

Figure 39:
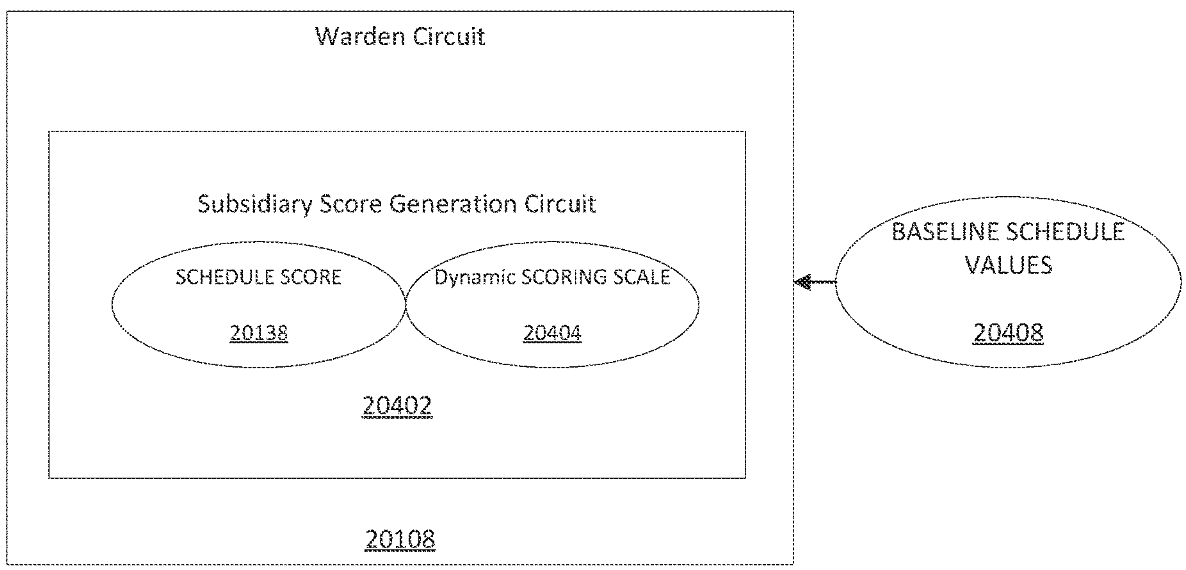
FIG. 39 depicts an embodiment of a warden circuit, in accordance with embodiments of the current disclosure.

Referring to FIG. 39, in some embodiments, a warden circuit 20108 may further include a subsidiary score generation circuit 20402 for generating a plurality of schedule scores 20138 with respect to a schedule property 20134, a combination of schedule properties 20134, and the like. Generation of a schedule score 20138 may include a scoring scale 20404 which may be reflective of various schedule properties 20134. Determination of a schedule score 20138 may be based, at least in part, on a distance of a property value or schedule data from a corresponding baseline value. In some embodiments, the scoring scale 20404 may be dynamic such that the score for a given distance may be adjusted based on various schedule data.

For example, a disruptive event property 20304 such as an equipment failure resulting in a partial or full shutdown, a weather-related shutdown, or the like, may result in a dynamic scoring scale 20404 adjusted to allow for long working hours to accommodate catching up on and/or meeting production targets. For example, a life event identified in an employee property 20310, such as a medical issue, school, and the like, may result in a dynamic scale accommodating a wider distribution between that employee's hours and those of other employees. The dynamic scoring scale 20404 may be responsive to change in available personnel (a personnel property 20318), such as a change in available personnel. An increase in personnel would suggest that more employees should be scheduled for shorter shifts, resulting in a more stringent with respect to long working hours, while a decrease in personnel count would suggest that employees might asked to be work longer hours or more shifts to cover for the missing personnel. This may result in the dynamic scoring scale 20404 becoming less stringent with respect to longer working hours.

In determining that a schedule property 20134 violates a schedule norm 20110, the warden circuit 20108 may retrieve one or more baseline schedule values 20408 corresponding to schedule properties 20134, these baseline schedule values 20408 may include a baseline for a schedule property or a baseline for a score associated with that schedule property. A combination of baseline schedule values 20408, schedule properties 20134, and schedule scores 20138, may be used to determine that the schedule data 20104 is out of alignment with the baseline schedule values 20408. In embodiments, the one or more baseline schedule values 20408 may be retrieved from a database, other data source, and/or entered/provided by a user.

An example of a schedule property 20134 violating a schedule norm 20110 may be related to: one or more employees having an unusually high, or low, number of hours worked relative to the schedule norm; one or more employees having an abnormal amount of overtime pay relative to a corresponding schedule norm; one or more employees having an abnormal number of favorable or unfavorable shifts, or unusually high or low shift favorability relative to a corresponding schedule norm; a pairing of employees on a shift who are known to conflict with each other, a pairing of employees on a shift who otherwise should not be paired together, e.g., a pair of employees who may be subject to an investigation, etc.

Figure 40:
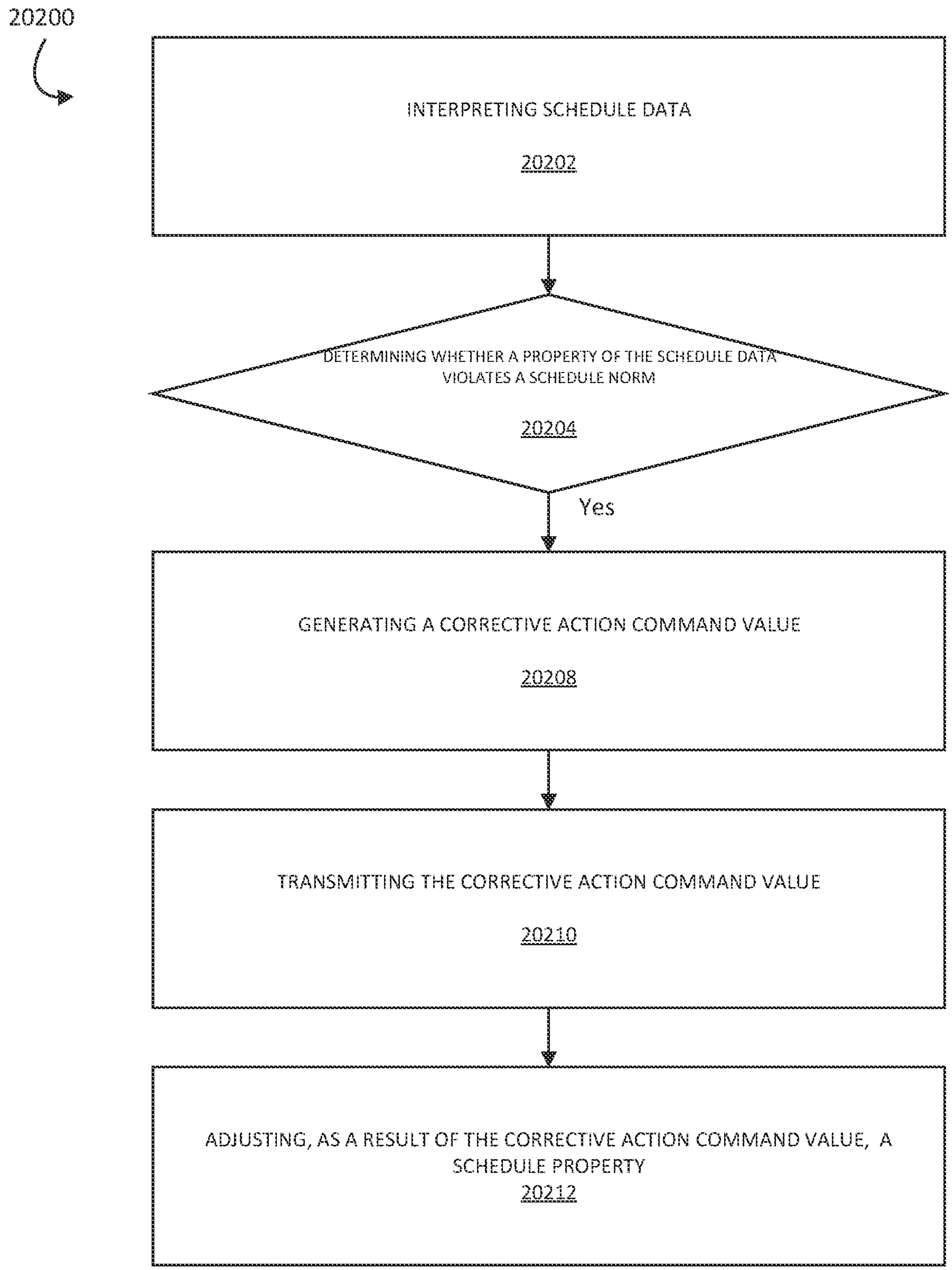
FIG. 40 depicts a method for determining when schedule conditions fall outside of an entity's normal scheduling practice; in accordance with embodiments of the current disclosure.

Referring to FIG. 40, a method 20200 for determining when scheduling conditions fall outside of an entity's normal scheduling practice is depicted. The method may include interpreting schedule data 20202 and determining whether a property of the schedule data violates a schedule norm 20204 where the schedule norm may be based, at least in part, on historical schedule data. If there is a violation, the method 20200 may include generating a corrective action command value 20208, in response to a determination that a property of the schedule data does violate a schedule norm. The method 20200 further includes transmitting the correct action command value 20210 and adjusting, as a result of the corrective action command value, a schedule property 20212, such that the corresponding schedule data no longer violates schedule norms. In embodiments, a non-transitory computer-readable medium storing instructions may cause a processor to perform the method 20200. In embodiments, a schedule interpretation circuit may interpret schedule data and a warden circuit may make the determination regarding any violations of schedule norms. A corrective action circuit may generate a corrective action command value to be transmitted by a corrective action provisioning circuit.

Figure 41:
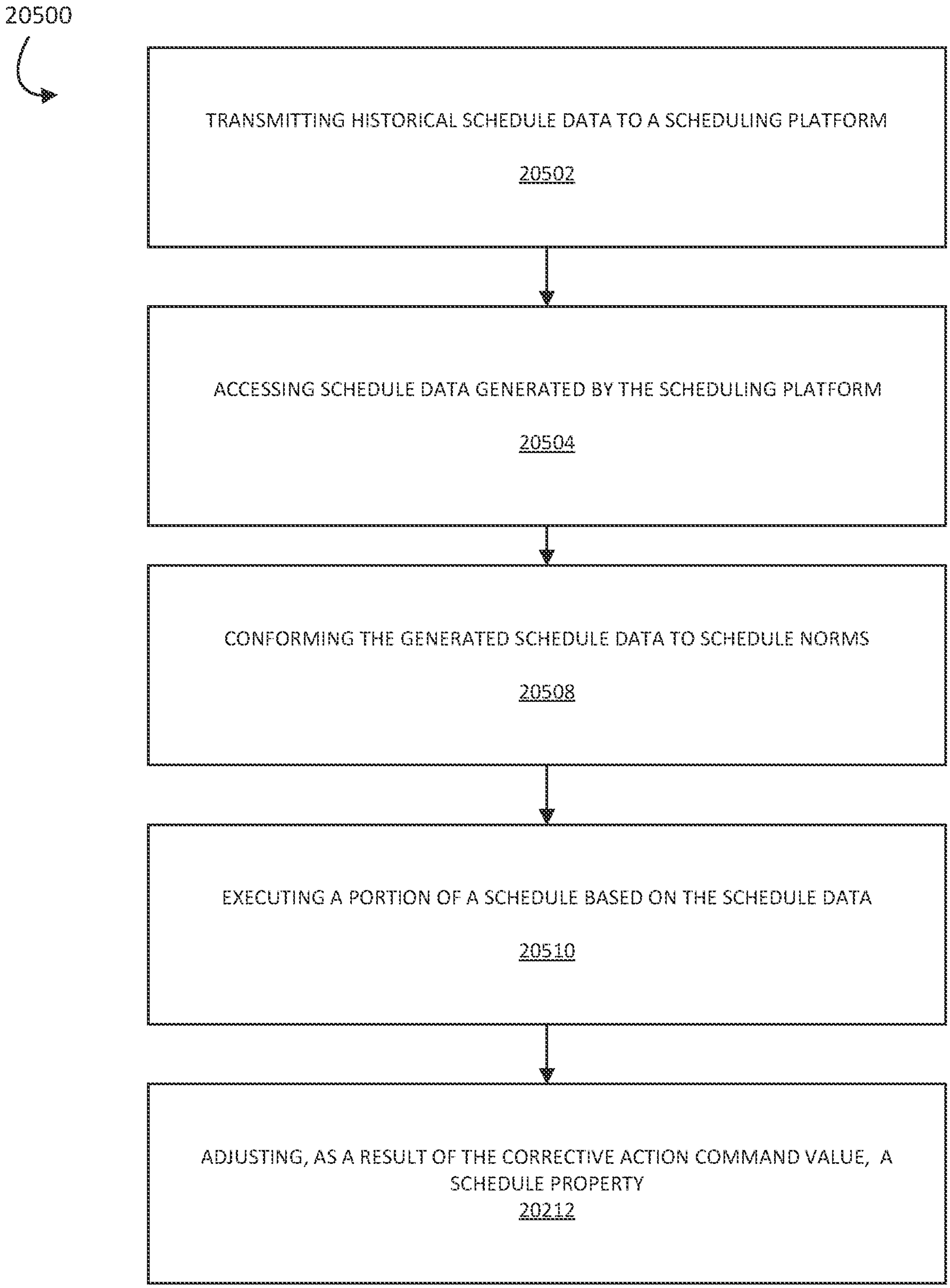
FIG. 41 depicts a method for adjusting a schedule to assure equitable schedules, in accordance with embodiments of the current disclosure.

Referring to FIG. 41, a method 20500 for adjusting a schedule to assure equitable schedules is depicted. The method 20500 may include transmitting 20502 historical schedule data, via a local computing device, to a scheduling platform hosted on one or more remote servers. The method 20500 may further include accessing 20504, via the local computing device, schedule data generated via the scheduling platform and conforming 20508 the generated schedule data to schedule norms determined from the historical schedule data. In embodiments conforming 20508 schedule data to schedule norms includes adjusting the schedule directly, e.g., directly manipulating the schedule data in memory, and/or adjusting the schedule data via connectors, as disclosed herein, so as to prevent and/or mitigate a schedule corresponding to the schedule data from violating schedule norms, e.g., legal standards, entity norms, industry norms, and/or other types of regulations and/or customs associated with the schedule data. The method 20500 may further include executing 20510 a portion of a schedule based on the schedule data. In embodiments, the executed portions may include a portion of a shift, a full shift, a plurality of shifts, etc. A schedule warden circuit, as disclosed herein, may be used to conform the draft schedule data to schedule norms determined from historical schedule data as described elsewhere herein resulting in adjustments to accessed data. The method 20500 may further include adjusting 20212, as a result of the corrective action command value, a schedule property.

Figure 42:
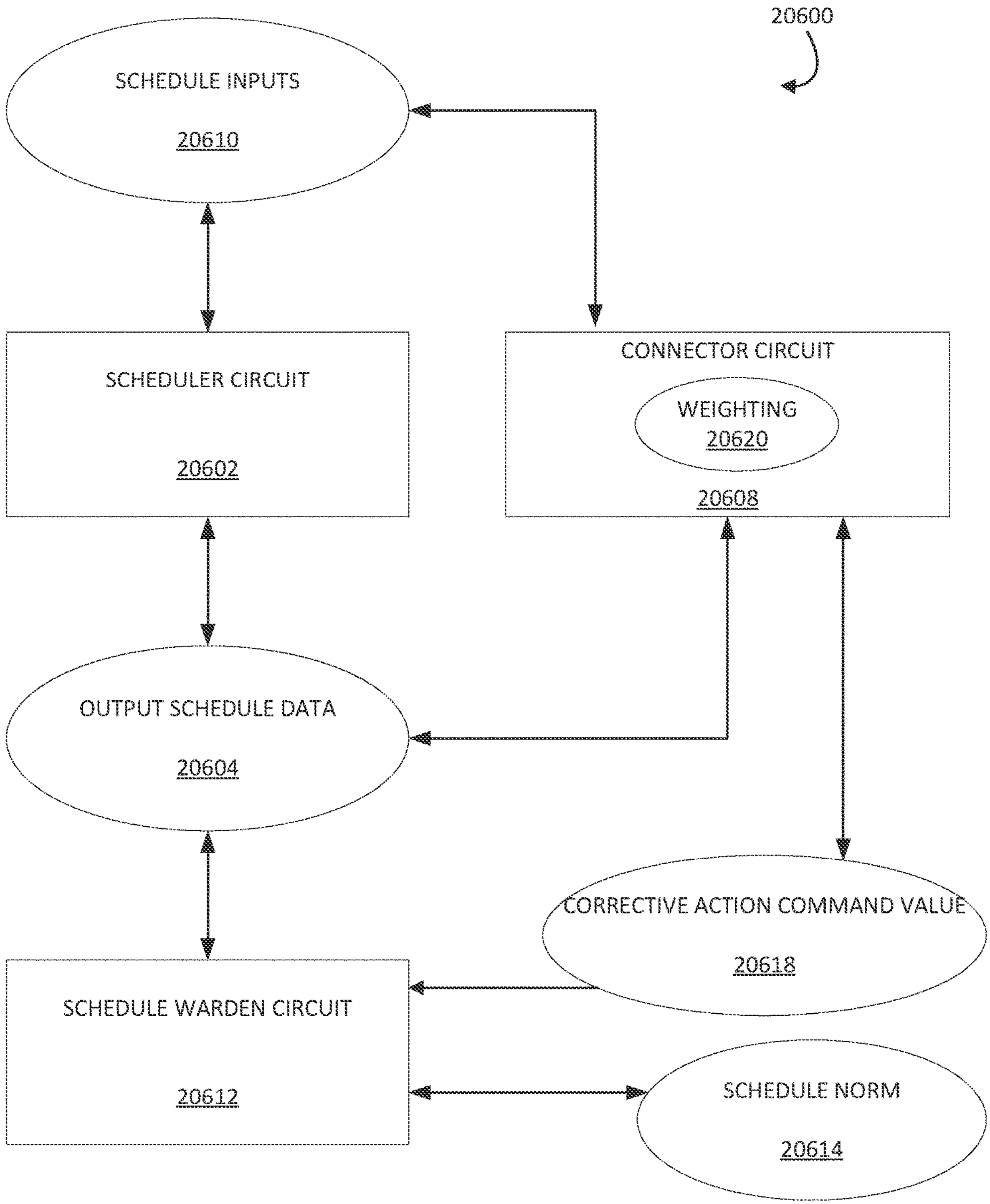
FIG. 42 depicts an agglomerate network for generating schedule data; in accordance with embodiments of the current disclosure.

Referring to FIG. 42, an agglomerate network 20600 for generating schedule data is depicted. The agglomerate network 20600 includes a scheduler circuit 20602 to generate a draft schedule or a portion of a draft schedule based at least in part on schedule inputs 20610 and provide corresponding output schedule data 20604. Connector circuit 20608 may adjust one or more of the schedule inputs 20610 provided to the scheduler circuit 20602 or the output schedule data 20604. In embodiments, the schedule inputs 20610 may include a period of time, a number and/or listing of available employees, a number and/or listing of available equipment, data from a weather model, a listing of special events, e.g., holidays, annual sales, etc., and/or any other type of data for consideration in generating a schedule. A schedule warden circuit 20612 may interpret the output schedule data 20604 and determine, based at least in part on the output schedule data 20604, that a property of the output schedule data violates a schedule norm 20614. In response to the determination that a schedule property 20134 of the output schedule data 20604 violates a schedule norm 20614, the schedule warden circuit 20612 generates a corrective action command value 20618 and transmits the corrective action command value 20618 to one or more connector circuits 20608. In embodiments, the corrective action command value 20618 may be structured to trigger an adjustment to a connector circuit 20608 resulting in a change to a schedule input 20610 or the schedule data 20604 such that the resulting output schedule data 20604 no longer violates a schedule norm 20614. In embodiments, the corrective action command value 20618 may correspond to an alert message, or a change in a bias of a connector circuit 20608, such as increasing or decreasing a weighting 20620 of an output of a module, such as an external model 410, a primary business model 424, a secondary business model 414, as shown in FIG. 4, and/or any other model/module/circuit as described elsewhere herein. The corrective action command value 20618 may correspond to a direct scheduling change resulting in a change to schedule properties 20134 such that the corresponding schedule properties 20134 no longer violate, or violates less, a schedule norm 20614 threshold.

Figure 43:
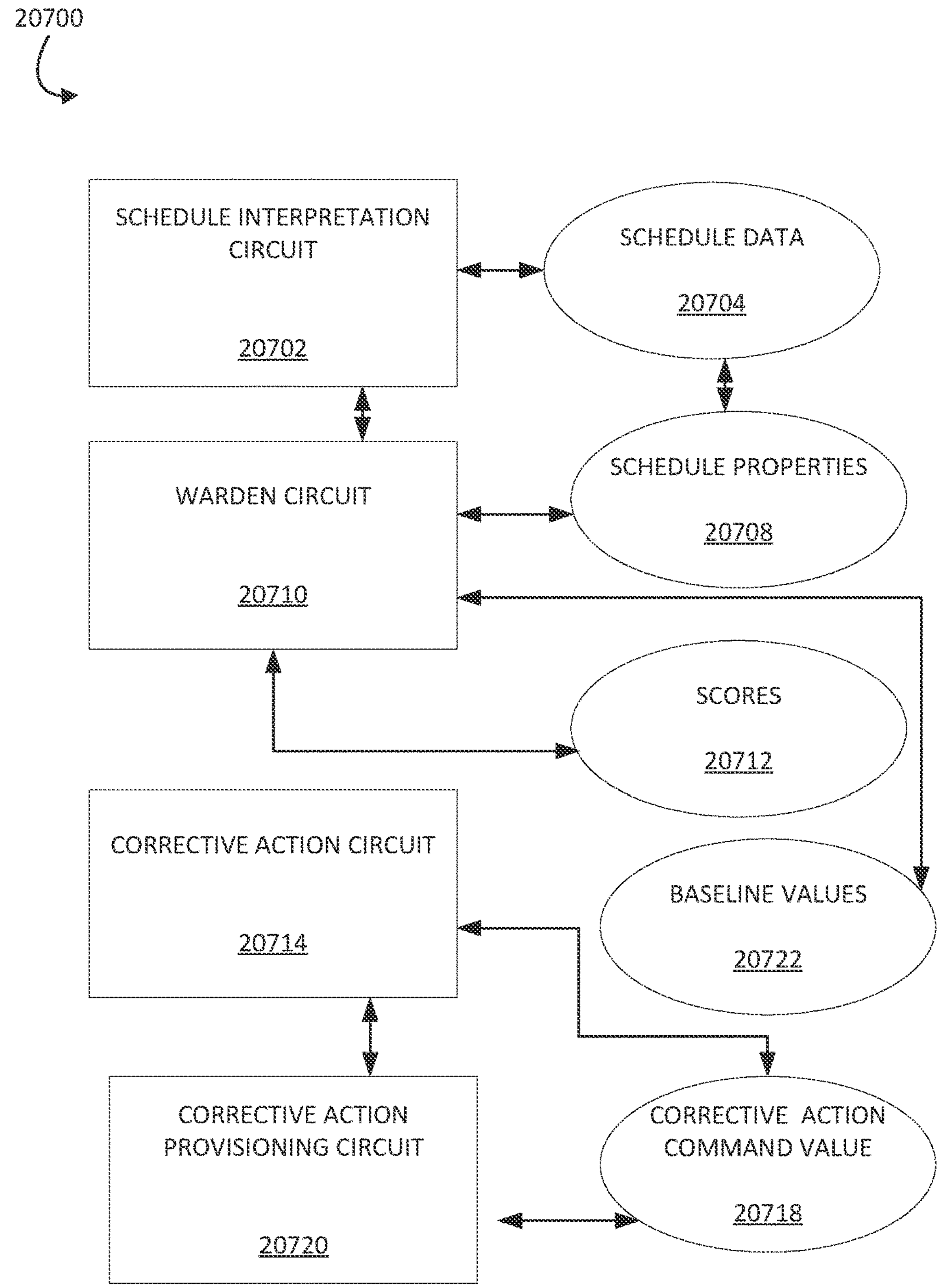
FIG. 43 depicts an apparatus for adjusting schedules, in accordance with embodiments of the current disclosure.

Referring to FIG. 43, an apparatus 20700 for adjusting schedules is depicted. The apparatus 20700 includes a schedule interpretation circuit 20702 structured to interpret schedule data 20704 and identify schedule properties 20708, and a warden circuit 20710 structured to generate a plurality of scores 20712 based on the identified schedule properties 20708. The warden circuit 20710 is further structured to retrieve a plurality of baseline values 20722 corresponding to one or more of the schedule properties 20708 and/or combinations of schedule properties 20708. The warden circuit 20710 is further structured to determine whether the schedule data 20704, a particular schedule property 20708, and/or a combination of schedule properties are out of alignment with one or more of the baseline values 20722 to an extent that a corrective action should be taken. The apparatus 20700 further includes a corrective action circuit 20714 structured to generate a corrective action command value 20718. The corrective action command value 20718 is generated based, at least in part, in response to a determination by the warden circuit 20710 that a corrective action is required, where the corrective action command value 20718 is structured to effect a change to at least the schedule property 20708 that is out of alignment. The change may be directly to the schedule data and/or to a connector, as disclosed herein. A corrective action provisioning circuit 20720 may then transmit the corrective action command value 20718.

The systems and methods described herein for a schedule warden provide various technical benefits to processing of schedules using a computer. In one aspect, the systems and methods provide for efficient comparison and evaluation of schedules using automated methods. The system and methods provide for efficient identification and representation of schedule features that may be compared and evaluated using a computer. Comparison of schedules using automated methods has traditionally been restricted to a small number of limited/simple features, with other, more complex, quantitative features having been difficult to capture and identify. As will be appreciated, in one aspect, the methods disclosed herein provide for efficient capture of quantitative features of a schedule such that they may be efficiently processed using a computer. In one example, trained models and historical data is used to identify qualitative features for comparison and scoring. Qualitative features may be compared and manipulated using quantitative scores thereby allowing efficient and predictable analysis of schedules.

In embodiments, the Continuous Model Validator may detect anomalies (a prediction or group of predictions that are inaccurate (and statistically outside of expected random variances). The Continuous Model Validator may work across companies, industries, and regions looking for patterns that might indicate what type of data the system might be missing. For example, embodiments may identify when one or more variables are missing, when/if extra runs are needed (or would be beneficial), etc. Embodiments may also try to remove variables, e.g., simplify the model, etc. As will be appreciated, embodiments providing for autonomous or semi-autonomous addition/subtraction of new variables/models, may utilize some form of an A/B side-by-side testing environment. Solutions using the new A agglomerate models and the old collection of B agglomerate models may be run side-by-side to see if the new models improve accuracy and/or the performance of the system. In addition to improving prediction, some embodiments may accept less (but still acceptable) accuracy where using a given set of models requires significantly less time to process.

Embodiments may include aspects for new feature and/or variable discovery. In embodiments, when the Continuous Model Validator detects an anomaly, e.g., when a prediction or group of predictions are inaccurate upon post-inspection, the new feature/variable discovery module may kick-in and try to determine what variable(s) might be input to the agglomerate models (with appropriate model modifications and/or new model connectors. For instance, if multiple retail businesses in a region had much greater traffic and scheduling inaccuracies over a given weekend, but the agglomerate models properly predicted items for businesses that are not sensitive to retail buying patterns, the system may search for a previously unknown event in the region. The system may scan the news and/or other sources (including other correctly modeled businesses that may have taken into account an event not modeled by other businesses in the region). If identified, the system may test whether the addition of a variable and a new bias connector could have effectively captured the event by performing ex post facto A/B.

In another case, detected issues (e.g., those detected via a continuous model validator, as disclosed herein) may exist across all businesses in a region (search for local disaster, weather event, concert event, conference event, sporting event, and/or a local event of such magnitude that it effects all businesses in a region (open of hunting season as an example)).

In yet another case, the detected issue may affect certain job categories, or all businesses within a state/country. In this case, the system may look to macro-economic conditions and/or personnel shortages within a given job category. For instance, during a pandemic, all businesses might have been affected, potentially requiring some updates to the agglomerated models. Accordingly, the system may determine that some business types/job categories have been affected more than others.

Embodiments of the system, as described herein, may look for correlated/predictive features that can be extracted from a given source (number of news articles, gov't sites, etc.) and can be used to build new model connectors that can be trained to accommodate and/or adjust the results based on the new variable. For example, if shown to be effective, the system may build new machine learning (ML) models (or suggest the building of a new ML model), that incorporates the new variable.

In embodiments, methods and systems for proposing and executing scheduling experiments may be provided, and optionally be included in components/modules 146 and/or 148 (FIG. 1). The experiments may be simulated and/or conducted in the real world with AI learning from the results. The selection of executed experiments, implementation of changes based on the results, and the like, may be automatic and/or manual. Embodiments may provide for dials and/or sliders that provide for the introduction of how much risk (e.g., poor outcome) a user of the system can tolerate. Embodiments may provide for employees to opt-in to an experiment for an incentive, e.g., $1.00 more/hour, such as where the experiment provides a more dynamic schedule, or provide for an employee to opt-out of the experiment, such as to keep a more predictable schedule. Embodiments of schedule experimentation may be a module that receives inputs, e.g., a schedule and/or other data, e.g., biases, as: direct input, i.e., the schedule experimentation module may act as a standalone module; as direct input to an agglomerate network, e.g., without use of connectors; and/or from connectors, e.g., the schedule experimentation module is one of a plurality of modules within an agglomerate network. Schedule experimentation may take the form of a schedule generation module within an agglomerate network that passes its output (e.g., schedules) to other modules in the agglomerate network for evaluation where the other modules generate output(s), e.g., a bias. The other modules may, in turn, feed the output back into the schedule experimentation module to form a feedback loop which tries to reach equilibrium and/or optimization of various biases in the agglomerate network while keeping the generated schedules comparable to ones generated by managers. The connections between the schedule experimentation module and the various other modules of the agglomerate network may be accomplished via connectors.

Figure 44:
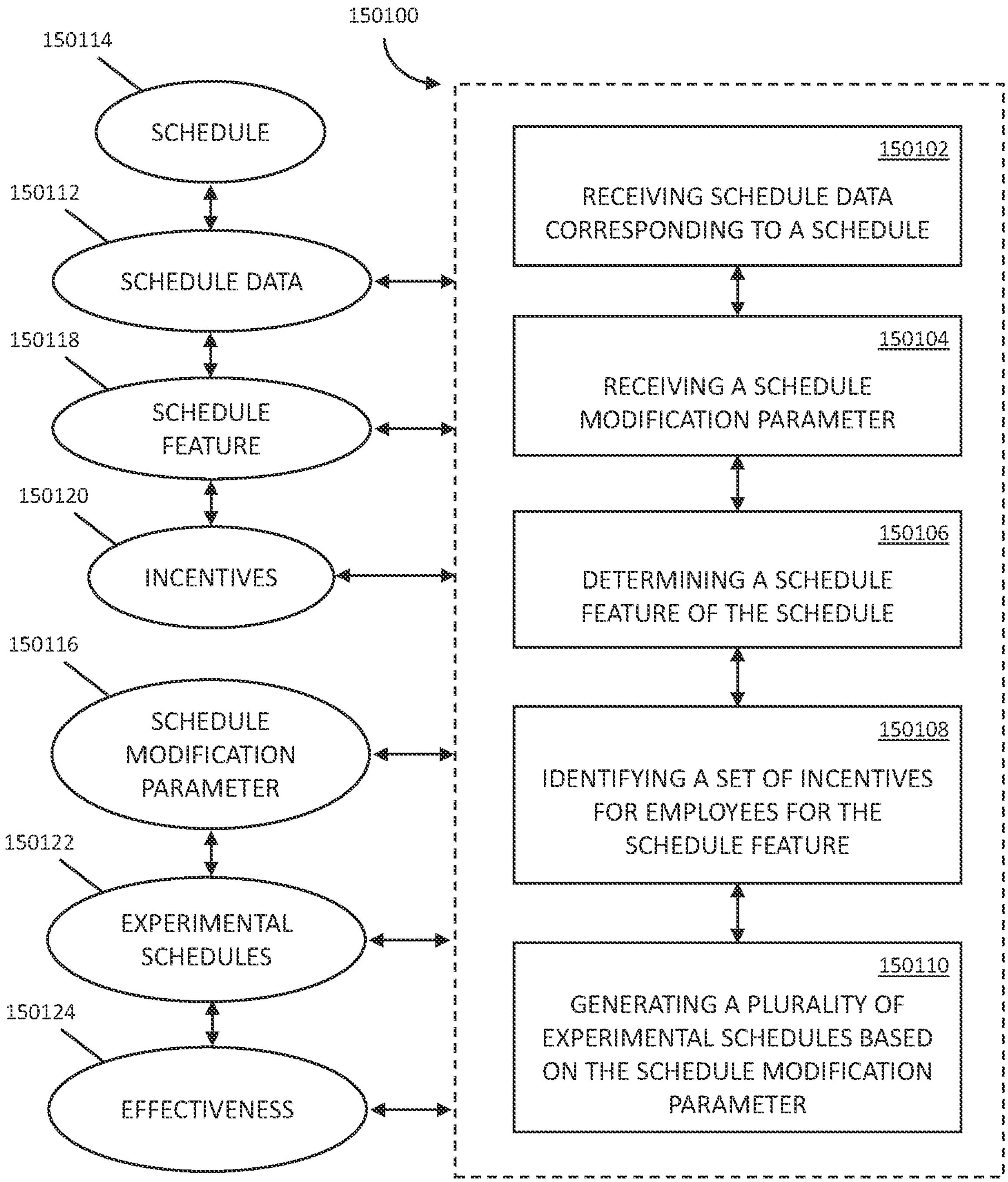
FIG. 44 is a flow diagram depicting a method for executing scheduling experiments, in accordance with an embodiment of the current disclosure.
Figure 45:
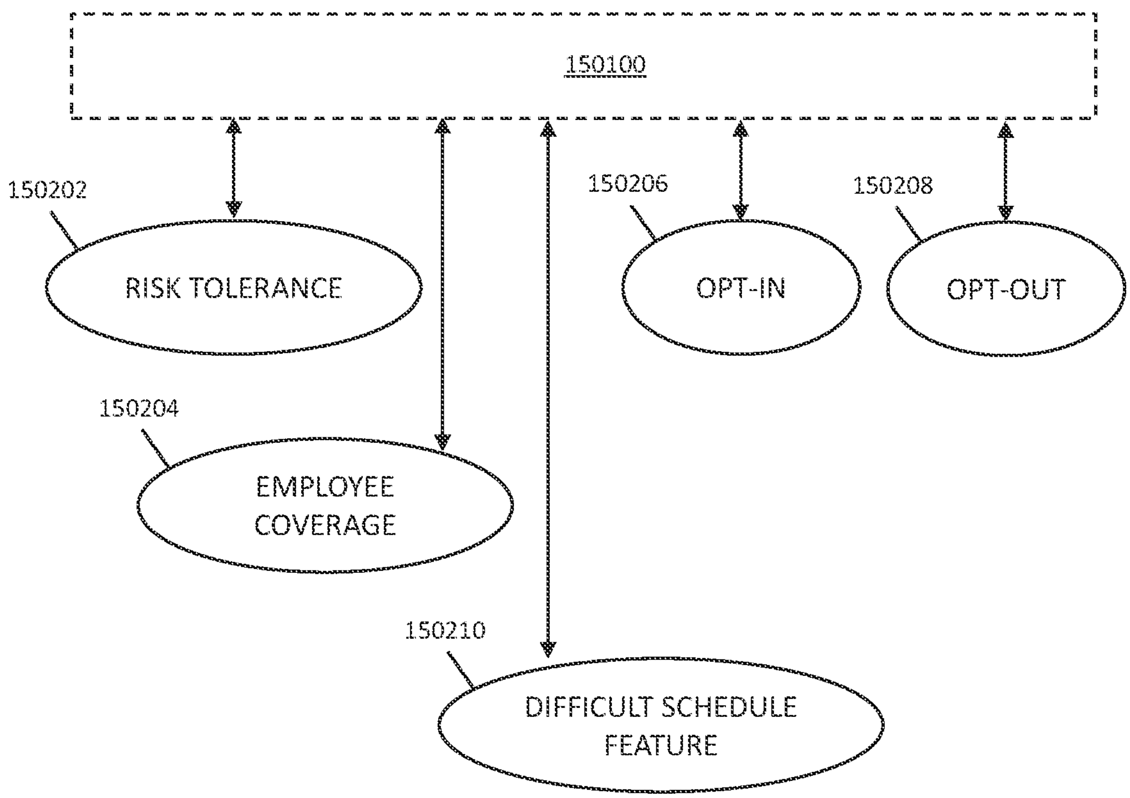
FIG. 45 is a flow diagram depicting certain further aspects of a method for executing scheduling experiments, in accordance with an embodiment of the current disclosure.

Referring to FIG. 44, a method 150100 may be provided. The method 150100 includes receiving 150102 schedule data 150112 corresponding to a schedule 150114; receiving 150104 a schedule modification parameter 150116; determining 150106, based at least in part on the schedule data, a schedule feature 150118 of the schedule; identifying 150108 a set of incentives 150120 for employees for the schedule feature; and generating 150110 a plurality of experimental schedules 150122 based on the schedule modification parameter, wherein the plurality of experimental schedules is configured to test the effectiveness 150124 of different incentives of the set of incentives on the schedule features. Referring to FIG. 45, certain further aspects of the method 150100 are described following, any one or more of which may be present in certain embodiments. For example, schedule modification parameters may include risk tolerance 150202. The schedule features may be features with historically low employee coverage 150204. The schedule features may be undesirable features of the schedule for employees. The incentive may be monetary, paid time off, and the like. The employees may be incentivized to participate in the experiments. The employees may opt in 150206 and/or opt out 150208 for the experiments. The difficult schedule features 150210 may include at least one of consecutive time slots, late shifts, busy shift times, and the like.

Figure 46:
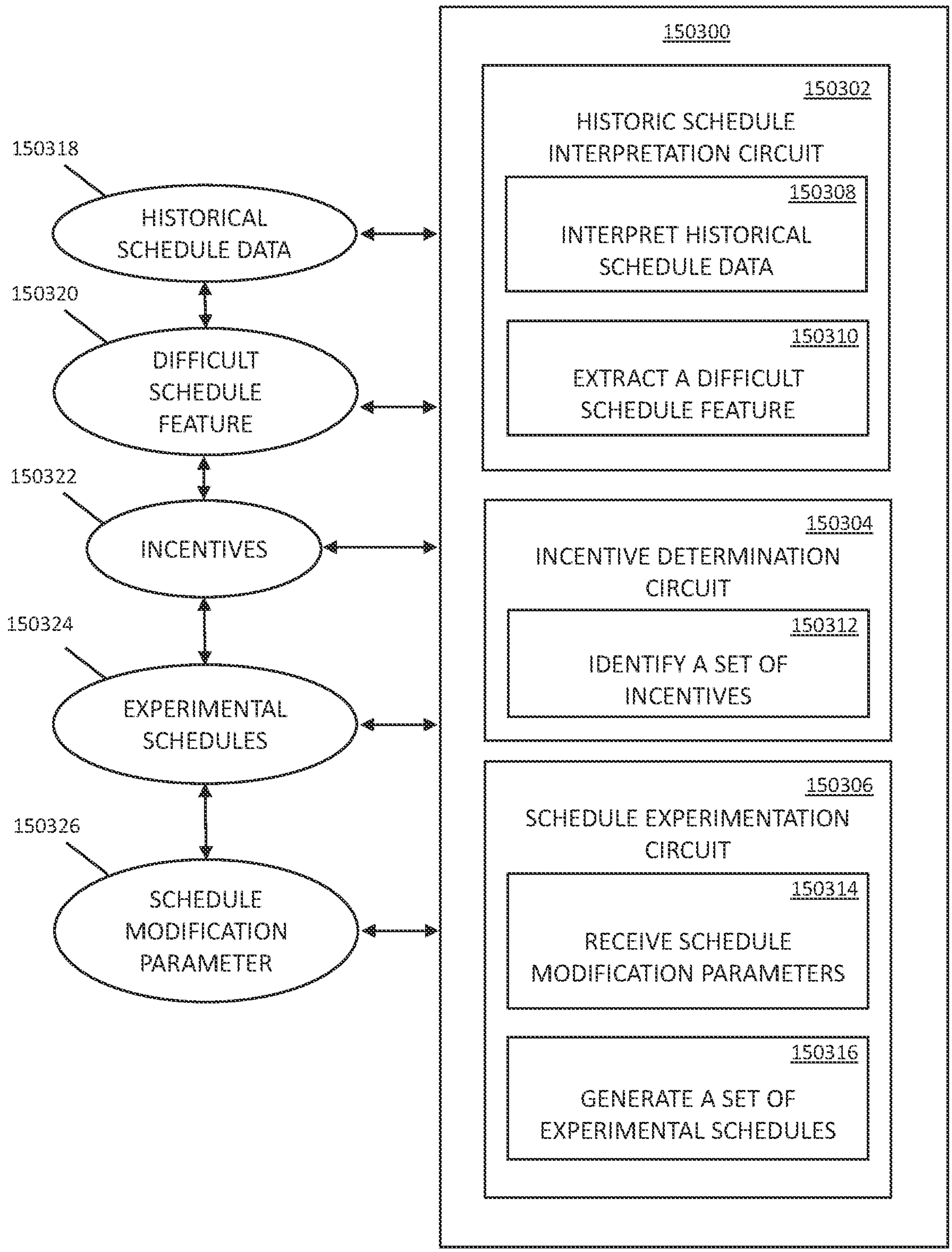
FIG. 46 is a block diagram depicting an apparatus for executing scheduling experiments, in accordance with an embodiment of the current disclosure.

Referring to FIG. 46, an apparatus 150300 may be provided. The apparatus 150300 includes a historic schedule interpretation circuit 150302 structured to: interpret 150308 historical schedule data 150318; and extract 150310 a difficult schedule feature 150320 from the historical schedule data; an incentive determination circuit 150304 structured to identify 150312 a set of incentives 150322 compatible with the difficult schedule feature; a schedule experimentation circuit 150306 structured to: receive 150314 schedule modification parameters 150326; and generate 150316, based at least in part on the schedule modification parameters, a set of experimental schedules 150324 each with different incentives of the set of incentives.

Figure 47:
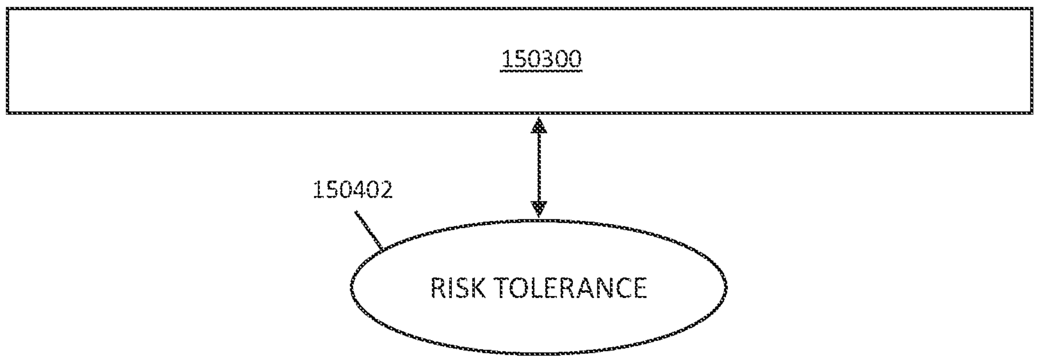
FIG. 47 is a block diagram depicting certain further aspects of an apparatus for executing scheduling experiments, in accordance with an embodiment of the current disclosure.

Referring to FIG. 47, certain further aspects of the apparatus 150300 are described following, any one or more of which may be present in certain embodiments. The schedule modification parameters may include risk tolerance 150402. The difficult schedule feature may be a feature with historically low employee coverage. The difficult schedule feature may be an undesirable feature of a schedule for an employee. The set of incentives may be monetary, paid time off, and the like. The difficult schedule feature may be consecutive time slots, late shifts, busy shift times, and the like.

Figure 48:
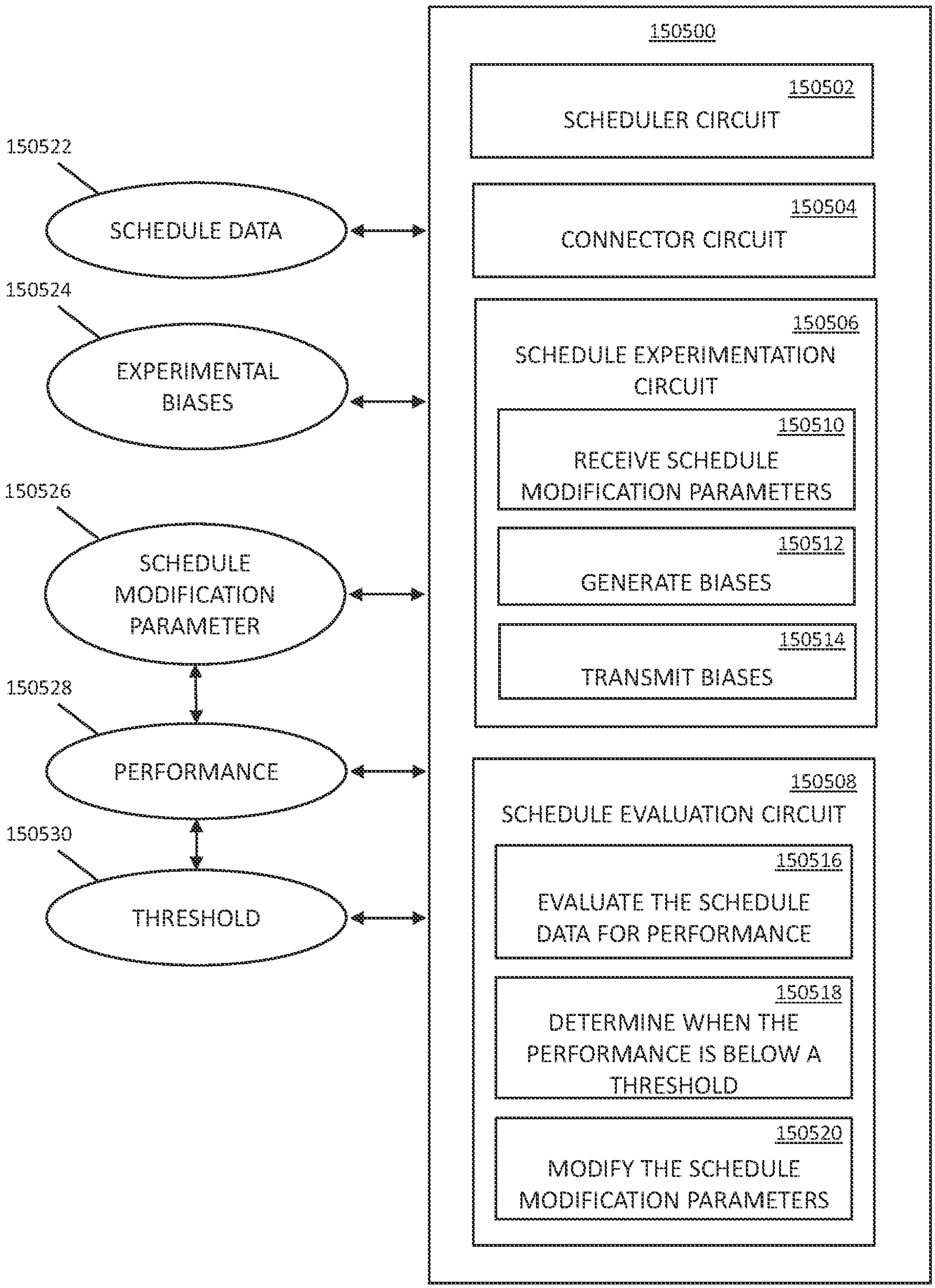
FIG. 48 is a block diagram depicting an agglomerate network for executing scheduling experiments, in accordance with an embodiment of the current disclosure.

Referring to FIG. 48, an agglomerate network 150500 may be provided. The agglomerate network 150500 includes an agglomerate network for generating experimental schedule data, the agglomerate network including a scheduler circuit 150502 structured to output schedule data 150522; a connector circuit 150504 structured to adjust at least one of an input to the scheduler circuit or the schedule data outputted by the scheduler circuit based on a set of experimental biases 150524; and a schedule experimentation circuit 150506 structured to: receive 150510 schedule modification parameters 150526; and generate 150512 the set of experimental biases for the connector circuit, wherein the set of experimental biases are generated based at least in part on the schedule modification parameters; transmit 150514 the set of experimental biases to the connector circuit; and a schedule evaluation circuit 150508 structured to: evaluate 150516 the schedule data for performance 150528; and determine 150518 when the performance is below a threshold 150530 and, in response, modify 150520 the schedule modification parameters.

Figure 49:
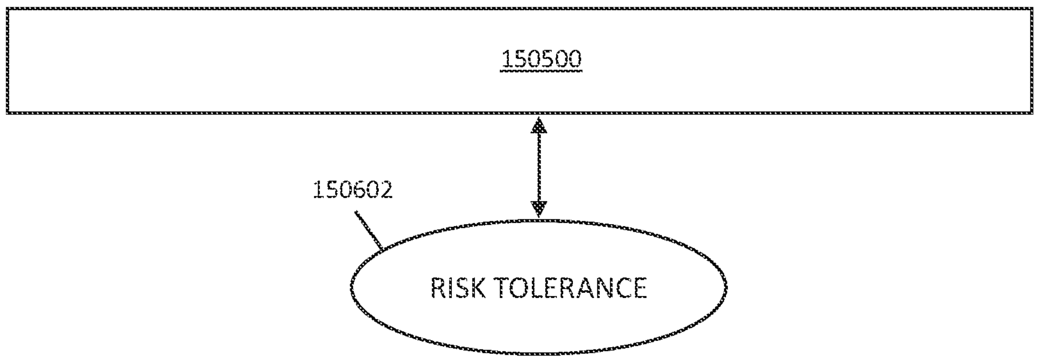
FIG. 49 is a block diagram depicting certain further aspects of an agglomerate network for executing scheduling experiments, in accordance with an embodiment of the current disclosure.

Referring to FIG. 49, certain further aspects of the agglomerate network 150500 are described following, any one or more of which may be present in certain embodiments. The schedule modification parameters may include risk tolerance 150602.

Embodiments may include a semi-autonomous experiment controller. In embodiments, the semi-autonomous experiment controller may operate in conjunction with the semi-autonomous goal setter to better understand the impact of a given variable on an intermediate or final goal(s). For example, a given goal (such as, for example, low employee attrition) may be selected as a possible target of an experiment. The target goal may be unacceptably low/high compared with other employers or compared with other goals or ideal goals. The experiment controller, in some cases, may modify one or more inputs/constraints to an agglomerate network or model, generate one or more new or updated schedules, and monitor how it affects the target goal after one or more iterations of scheduling. If the target goal is affected within particular confidence, the experiment controller may speculate that the modified inputs had a certain causative effect on the target goal.

In some cases, to increase confidence, the experimental controller may replicate the speculated causative effect on other employers, other schedules, other agglomerate networks, agglomerate models, other goals and the like.

Additionally, the experiment controller may search for comparable employers to run experiments with. Such employers may be similar in certain metrics or attributes such as size, number of employees, revenue, profit, geography, segment, industry, owners, etc. Such employers may have low/high or similar/opposite scores on a target goal or a potentially related or correlated goal. Running the same experiment on this similar employer may help verify whether the target goals are really affected by the modified inputs/constraints.

In some cases, the systems and methods may present proposed experiments to an administrator to allow them to confirm the running of an experiment or prioritize various experiments. In other cases, the systems and methods may be allowed to decide to experiment on their own for certain goals or when expected results on a goal are under or over a threshold. As the systems and methods make consistently good decisions, the systems and methods may be allowed to do more experiments on their own by updating the threshold. In various cases, the systems and methods may present the output results of the experiments on a report or GUI to an administrator. The system may output the experiment, the results, and recommendations from the results. The systems and methods may be allowed to implement certain recommendations based on its confidence and based on its track record of successful decisions. An administrator may oversee, override, or confirm different decisions from the experiment controller.

Figure 50:
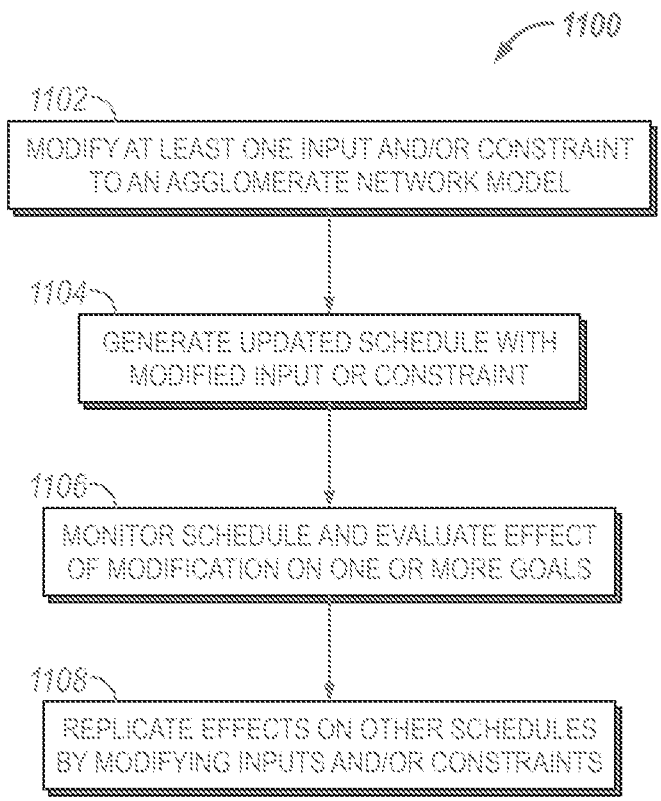
FIG. 50 depicts a method for schedule experimentation, in accordance with embodiments of the current disclosure.

A non-limiting example of a method of the semi-autonomous experiment controller is shown in FIG. 50. The method 1100 may include generating experiments to determine cause and effect between one or more inputs and/or constraints. The method may include modifying at least one input and/or constraint to an agglomerate network model 1102. The agglomerate network model may generate an updated schedule using the modified inputs and/or constraints 1104. The method 1100 may further include monitoring the schedule to evaluate the effects of the modifications of the inputs and/or constraints 1106 on one or more goals. The effects on the goals may be correlated to modifications of the inputs and/or constraints. Modifications that resulted in positive effects on goals may be replicated for other schedules by modifying inputs and/or constraints 1108.

Embodiments may include detecting unknown variables. Embodiments of the current disclosure may provide for the identification of variables that affect a schedule, but which may not have been previously identified as being a contributing factor. For example, while inputting data from a first source, the system may identify summary, ancillary, secondary, or other variables. The system may track these variables, and as the values change over time, it may be determined whether those values correlate with the quality or performance of the agglomerate networks, models, or schedules.

In a simple example, the system may be extracting information from a weather system. The actual forecast may be the primary weather input to the system, but the system may notice a new value called “Days of Drought” or “flood level” of a river or other such values. The new value may be numerically displayed, or it may be embedded in a news article on the website that is parsed and understood by an NLP engine. The system may track these new variables and see how they correlate with schedule needs, requirements, or performance. In one simple example, as the “Days of Drought” value increases, a business, such as one in the agricultural industry, has fewer scheduling needs or requirements. Conversely, a fast-food restaurant may notice that its scheduling needs or requirements are unchanged as the “Days of Drought” increases. In such a scenario, the agriculture industry may learn that it is correlated with the new variable, but the fast-food industry may learn that it is not correlated with it.

Embodiments may include an agglomerated input handler. Embodiments of the current disclosure may include an agglomerated input handler that collects inputs, and/or generates events. The input handler may parse, extract, format, or otherwise manipulate the inputs into forms that can be understood or acted upon by other agglomerate networks, models, schedules, and the like. In some cases, the input may convert schedules, or portions thereof, to embeddings as is described in more detail herein. In other cases, one or more values may be used as features that are input into various agglomerate networks, models, or schedules. For example, snowfall in inches may be one feature, and the percentage chance of precipitation may be another. In some cases, a Natural Language Processor (NLP) engine must first parse previously unknown data to find variables or inputs of interest such as finding the “Days of Drought” metric from parsing data on a weather webpage as discussed herein. Once inputs are identified by the input handler, the system may send events to various circuits, agglomerated networks, models, or schedules.

Embodiments may include an agglomerated metrics analyzer. Embodiments of the current disclosure may include an agglomerated metrics analyzer that produces quality/confidence metrics that may span the agglomerated models. The metrics analyzer may help determine which agglomerated networks or models or schedules are contributing to improvements, and which are not. Those agglomerated networks or models or schedules which are improving may be given more weight in final decisions, more weight in allowance to use system resources, more iterations of refinements to final outputs, etc. In some cases, the systems and methods may choose to output some or all of these metrics to GUIs, reports, or logs so that system administrators can monitor the behavior and performance of the systems and methods. In some cases, the systems and methods may highlight ambiguous, concerning, or exceptional metrics to help the administrator understand the systems and methods.

Embodiments may include an agglomerated output composer. Embodiments of the current disclosure may include an agglomerated output composer that produces selected agglomerate models for output to users. In some cases, the systems and methods may choose to output some or all of these models to GUIs, reports, or logs so that system administrators can monitor the behavior and performance of the systems and methods. In some cases, the models may be output in raw form, in summarized form, in detailed form, in numerical form, in textual form, in graphical form, in a schedule form, in a calendar form, or in any other form. In some cases, the systems and methods may highlight ambiguous, concerning, or exceptional models to help the administrator understand the systems and methods.

Embodiments may include an interactive user interface, e.g., component 120 (FIG. 1). Embodiments of the current disclosure may include an interactive user interface for interacting with the system and/or individual agglomerated networks, as described herein. For example, in embodiments, one or more user interfaces may provide for receiving user feedback for schedules, portions of schedules, and/or features of schedules. In embodiments, the one or more user interfaces may provide for communicating to an operator data features that used by the agglomerated networks to edit or remove elements of the data. In embodiments, the one or more user interfaces may provide for employee feedback on the “employee profile” they are associated with. Such feedback may include making suggestion and/or editing of the profile they are associated with. Such feedback may also include associating themselves with a different profile. Such feedback may also include liking and/or disliking aggregations or implications of a schedule, e.g., total hours/overtime, hours working with other particular employees, etc.

In embodiments, the one or more user interfaces may also provide for employer feedback and/or similar admin functions for use on behalf of the employer. For example, a company can “like” or “dislike a schedule and/or one or more portions of a schedule. Non-limiting examples of schedule portions include portions of a schedule as well as aggregations or implications of the schedule, e.g., total cost, total hours, educational metric, percent of reusable utilities, end customer satisfaction, other HR metrics, degrees of connectedness across social aspects (where a high score for a schedule may mean people generally will be friendly and enjoy who they are working with, and where low may imply they just work together).

Embodiments of the one or more user interfaces may also provide for a user to add and/or edit one or more axes of a chart/graph generated by embodiments of the system, as described herein.

Embodiments may include agglomerated model driven machine learning models. Embodiments of the current disclosure may include predictive and generative machine learning models, driven by other Agglomerated Models. For example, utilization schedules may be generated by a recurrent neural network (RNN) or an attention-based transformer network such as a generative pre-trained transformer (GPT), trained on a corpus of historical schedules and additional features such as weather and labor forecast. These generative models may be driven by other Agglomerate Models, such as decision-tree-based forecasting models providing weather predictions, employee sentiment predictions, and labor predictions.

Embodiments may include external data sources. External data sources may be provided. The external data sources may be from websites, databases, agglomerated networks, models, constraints, or computers outside of the agglomerated network system including external data sources owned by the same company or entity that owns or runs the agglomerated networks or owned by an external company or others. The external data sources may include machines such as scanners and fax machines which take paper documentation and convert it into digital information which can be used by the systems and methods.

Embodiments may include external outputs. The external outputs may be to websites, databases, agglomerated networks, models, schedules, or computers outside of the agglomerated network system including external outputs owned by the same company or entity that owns or runs the agglomerated networks or owned by an external company or others. The external outputs may be to printers and printouts. In some cases, the system may output some or all of the outputs to external GUIs, external reports, or external logs. In some cases, the outputs may be in raw form, in summarized form, in detailed form, in numerical form, in textual form, in graphical form, in a schedule form, in a calendar form, or in any other form.

Embodiments may include methods (including AI methods) for training generative resource utilization models. Models including the agglomerative network may be driven by optimization engines to identify the best resource utilization. They may also be generative models trained through machine learning to mimic historically implemented scheduling styles; or they may use combinations of optimization, historical training, and other approaches, such as, but not limited to, backtracking, TABU search, or simulated annealing. Machine learning models may be trained through the encoding of historical schedules, such as run-length encoding and GANTT encoding described herein, in order to produce a generative model such as a generative adversarial network or an attention-based transformer network.

Embodiments may include schedule representation of job assignments. Models produced through training on historical schedules must account for variable differences in the training data set due to drift over time or due to variability in the data. For example, a model must be able to train on historical jobs that may have been phased out, and on employees who are no longer available to work as resources in the model's target schedule. Furthermore, the model may train on historical schedules from other departmental units in the target organization or from completely different organizations. One non-limiting example of the need for such training is to increase the size of the historical data set; another is the cold start problem encountered during roll-out of new organizations or organizational units, where the target organization did not previously exist. In these cases, models may train and generate assignments using profiles of the variables rather than the specific variables. A mapping model then converts the profile to the target resource which matches most closely to the profile. One example of such a profile is neural network embedding, discussed herein.

Embodiments of one or more components/modules disclosed herein, e.g., 124, 126, 128 (FIG. 1), may include and/or use embeddings for timekeeping and/or scheduling. For example, employee embeddings may represent an employee profile, permitting AI training to consume the employee profile as feature input rather than a specific employee. As a non-limiting example use case, an employee embedding may represent any employee suitable for working in an administrative capacity; in another non-limiting use case, an employee embedding may represent part-time employees whose work patterns demonstrate a need for flexibility related to local school calendars. In another non-limiting example use case, the system may classify known employees (within a business, industry, or chain of businesses, e.g., a franchise), and recommend one or more profiles and/or templates thereof. Yet another non-limiting use case may involve a hybrid approach where an admin function defines some embeddings and the system finds other embeddings, or vice versa.

Other non-limiting examples of embeddings used by the agglomerate networks, and the systems and methods described herein, include job, position, department, store, industry vertical, and geographical embeddings.

The creation of embeddings may occur through distillation of the data features consumed by components of the agglomerate networks, and the systems and methods described herein. In one example, a variational autoencoder (VAE) may produce neural weights in its inner layers from training on assorted time windows of timecard punch, timekeeping rule exceptions, and punch versus schedule data, combined with information about the related industry vertical. In this non-limiting example, these neural weights represent vector embeddings of timekeeping behavior which can be propagated through an agglomerate network connector which uses the embeddings as data features. These data features, in combination with the industry vertical as an additional input feature, convey the work behavior of that industry vertical in all modes of network operation, including training, prediction, and generation.

As disclosed in greater detail, embodiments of the current disclosure provide for timekeeping and scheduling. In embodiments, application and adaptation to use employee embeddings for timekeeping and scheduling are disclosed. In embodiments, employee embeddings are used as a training set to train an AI-based model on characteristics of employee profiles instead of a specific employee and generate a schedule. The training set corresponds to employee embeddings determined from all employee data or from employee data selected from a pool of employee data. An employee embedding represents a plurality of employee data by capturing common employee characteristics. In embodiments, an administrator may select the employee data used for which employee embeddings are determined. In other words, an administrator may define the types of employee profiles for which employee embeddings are to be determined. In embodiments, the timekeeping and scheduling apparatus may classify, e.g., group based on one or more common properties/attributes, known employees (at that business, industry, or chain of businesses) and recommend employees (e.g., recommend employee profiles). In other words, employees may be classified based on employee embeddings, and employee profiles represented by the employee embeddings may be recommended. The apparatus in some embodiments may provide for a hybrid scheme where the administrator defines some employee embeddings (e.g., an administrator defines a subset of the employee data to generate embeddings for), and the apparatus defines others or vice versa.

In embodiments, an employee embedding may include, e.g., capture, characteristics of elements such as a time block, employee profile, schedule constraints, and the like. The employee embeddings capture some relations between the elements, e.g., characteristics). Employee embeddings can be numbers or vectors that encode the elements such that the elements that are close in value/vector space have similar characteristics and may be interchangeable and/or compatible. In embodiments, the employee embeddings may be used as inputs to neural networks that enable the processing of schedules, e.g., schedule data, and constraints using neural networks or other machine learning algorithms.

The disclosed apparatus may include scheduling circuits, e.g., modules with models, e.g., AI models and machine learning models, trained with employee embeddings that may be disposed of within an agglomerate network where other modules evaluate schedules generated by the scheduling circuit. The other modules may, in turn, feed their outputs into the scheduling modules to form a feedback loop that tries to reach equilibrium and/or optimize various biases in the agglomerate network.

Figure 51:
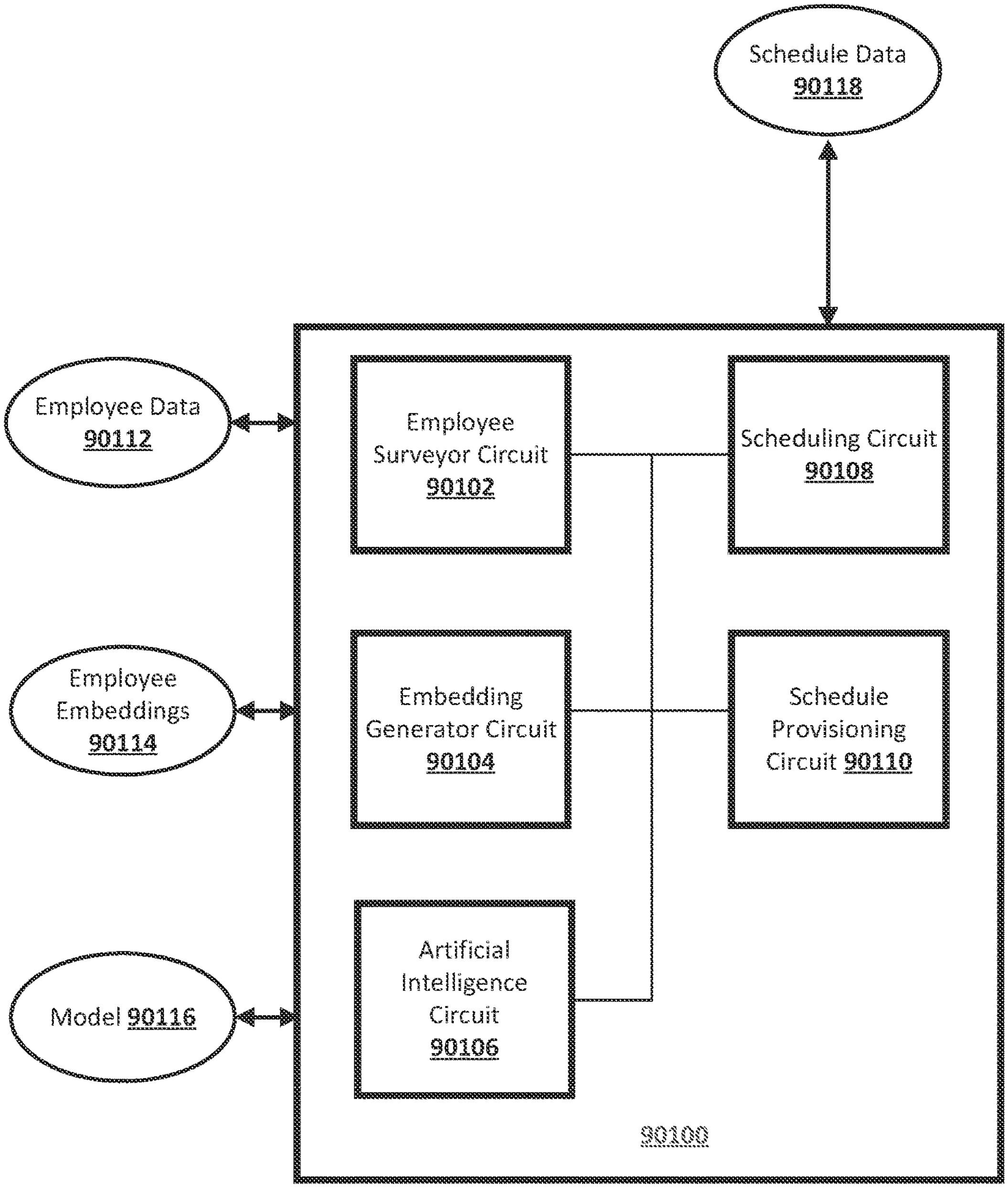
FIG. 51 is a schematic diagram of an apparatus for timekeeping and scheduling, in accordance with embodiments of the current disclosure.

Accordingly, referring to FIG. 51, an apparatus 90100 for timekeeping and scheduling is shown in accordance with an embodiment of the current disclosure. The apparatus 90100 may be embodied via one or more processors on one or more electronic devices, e.g., servers, workstations, smart devices, etc. In embodiments, the apparatus 90100 may form part of an agglomerate network. In embodiments, the apparatus 90100 may be apart from an agglomerate network, e.g., a standalone device that can interact with other devices. As shown in FIG. 51, the apparatus 90100 includes an employee surveyor circuit 90102, an embedding generator circuit 90104, artificial intelligence circuit 90106, scheduling circuit 90108, and schedule provisioning circuit 90110. Each of the aforementioned circuits is described herein. The employee surveyor circuit 90102 is structured to interpret employee data 90112. The employee surveyor circuit 90102 may receive employee data 90112 from storage and collate the employee data 90112 for further processing in the embedding generator circuit 90104. The embedding generator circuit 90104 is structured to determine employee embeddings 90114 based at least in part on employee data 90112. The generated employee embeddings 90114 are processed in the artificial intelligence circuit 90106, which is structured to generate a model 90116 based at least in part on the employee embeddings 90114. The model 90116 is further processed in the scheduling circuit 90108 to generate the schedule data 90118, which represents a schedule with employees assigned to shifts and information related to the shifts. The schedule data 90118 is transmitted by the schedule provisioning circuit 90110 to an agglomerate network or other modules for outputting on a screen or storing.

Figure 52:
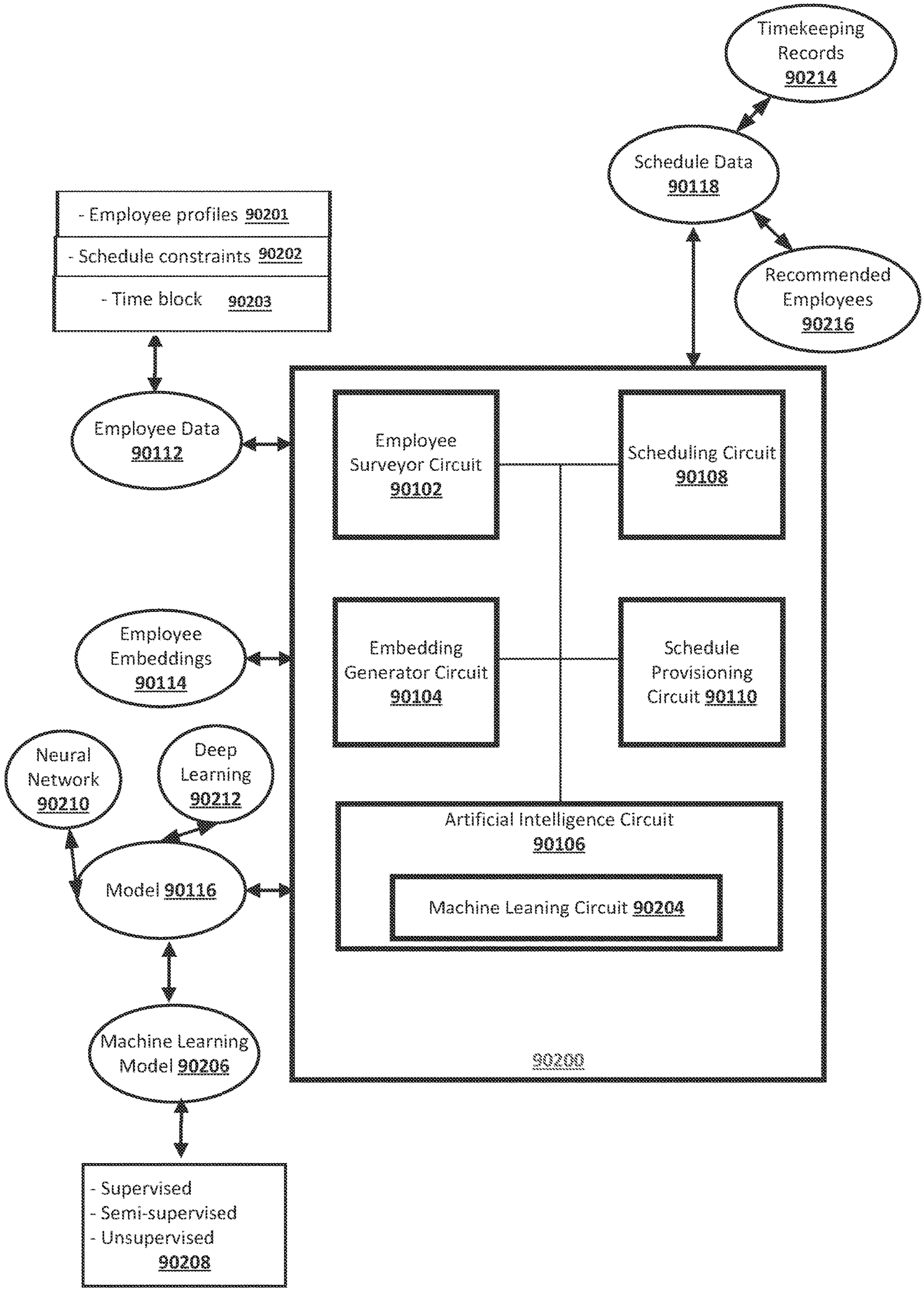
FIG. 52 is another schematic diagram of another apparatus for timekeeping and scheduling, in accordance with embodiments of the current disclosure.

Illustrated in FIG. 52 is another apparatus 90200 for timekeeping and scheduling, in accordance with another embodiment of the current disclosure. The apparatus 90200 may form part of an agglomerate network or be apart from an agglomerate network. The apparatus 90200 may include an employee surveyor circuit 90102, an embedding generator circuit 90104, artificial intelligence circuit 90106, scheduling circuit 90108, and schedule provisioning circuit 90110, as discussed above. In embodiments, the employee data 90112 has at least one of an employee profile 90201, a schedule constraint 90202, or a time block 90203. The employee profile 90201 may include an employee's name, address, experience, duties, and the like. The schedule constraints 90202 may have information related to the employee profiles, such as employee availability and conflict with other employees. Time block 90203 may include employee duties at different blocks of time (e.g., dividing a shift into blocks for lunchtime, replenishing merchandise, working as a cashier, etc.).

In embodiments, employee embeddings 90114 are generated from employee data 90112 by the embedding generator circuit 90104. In embodiments, the employee embeddings 90114 determined from employee data having similar characteristics are closer in space than the employee embeddings 90114 determined from employee data having discrete characteristics. Therefore, instead of using employee data 90112 directly for scheduling, employee embeddings 90114 are used. In embodiments, the employee embeddings 90114 capture several characteristics of the employee data 90112. In other embodiments, employee embeddings 90114 operate as a clustering method to cluster several characteristics of employee data 90112 into an employee embedding. In other embodiments, employee embeddings 90114 may include projecting employee data 90112 into a different space. In embodiments, high dimensional data, e.g., a plurality of characteristics in the employee data 90112 may be represented by a lower number of characteristics in the employee embeddings 90114. Therefore, employee embeddings 90114 capture some of the characteristics in the employee data 90112 and represent employee data 90112 of similar characteristics closer to each other in the space. Further, employee embeddings 90114 may focus less on characteristics determined to be less important. In example embodiments, different spaces may be used where employee data 90112 of similar characteristics may be closer in, to name a few: an affine space, a projective space, a curved space, a Euclidean space, and a pseudo-Euclidean space. Employee data 90112 close to each other in one space may not necessarily be close in another.

In embodiments, not all employee data 90112 are used by the embedding generator circuit 90104 to generate employee embeddings 90114. For instance, only a subset of the employee data 90112 selected from a larger pool of employee data may be used. In embodiments, at least part of the employee data used to determine the employee embeddings are selected from the larger pool of employee data by an administrator. In embodiments, the employee surveyor circuit 90102 is further structured to select at least part of the employee data from the larger pool of employee data.

In embodiments, the artificial intelligence circuit 90106 is based on machine learning (e.g., machine learning circuit 90204), responsible for performing machine learning operations such as training and inference. Therefore, in some examples, the model 90116 is a machine learning model 90206. In embodiments, the machine learning model 90206 is generated using at least one of: supervised training, semi-supervised training, and unsupervised training 90208. In embodiments, the model 90116 can be a neural network model 90210. In other examples, the model 90116 can be a deep learning model 90212.

The model 90116 is trained using employee embeddings 90114. This model 90116 is used to generate the schedule data 90118 by the scheduling circuit 90108. The schedule data 90118 may include employee embeddings 90114 with respective shift information. The schedule data 90118 may include information related to employee data 90112 of a plurality of employees represented by the employee embeddings 90114. In other examples, the schedule data 90118 may include the employee data 90112 having employee profiles 90201 with assigned shifts.

In embodiments, the apparatus 90200 may be structured to generate timekeeping records 90214, which includes clock in and clock out times for employees, (g. employee profile. Timekeeping records 90214 may also include the length of employment, the number of shifts worked, and the dates of such shifts. In embodiments, the scheduling circuit 90108 may be further structured to generate a list of recommended employees 90216. The list of recommended employees 90216 may be a list of recommended employees for an administrator to consider when assigning shifts. The list of recommended employees 90216 may consider characteristics such as the experience of employees, workload on certain days, synergy between employees, etc. In embodiments, the recommended list of recommended employees 90216 may not be part of the schedule data 90118. In embodiments, the scheduling circuit 90108 may utilize input from other artificial intelligence modules (e.g., circuits) to generate the schedule data 90118.

Figure 53:
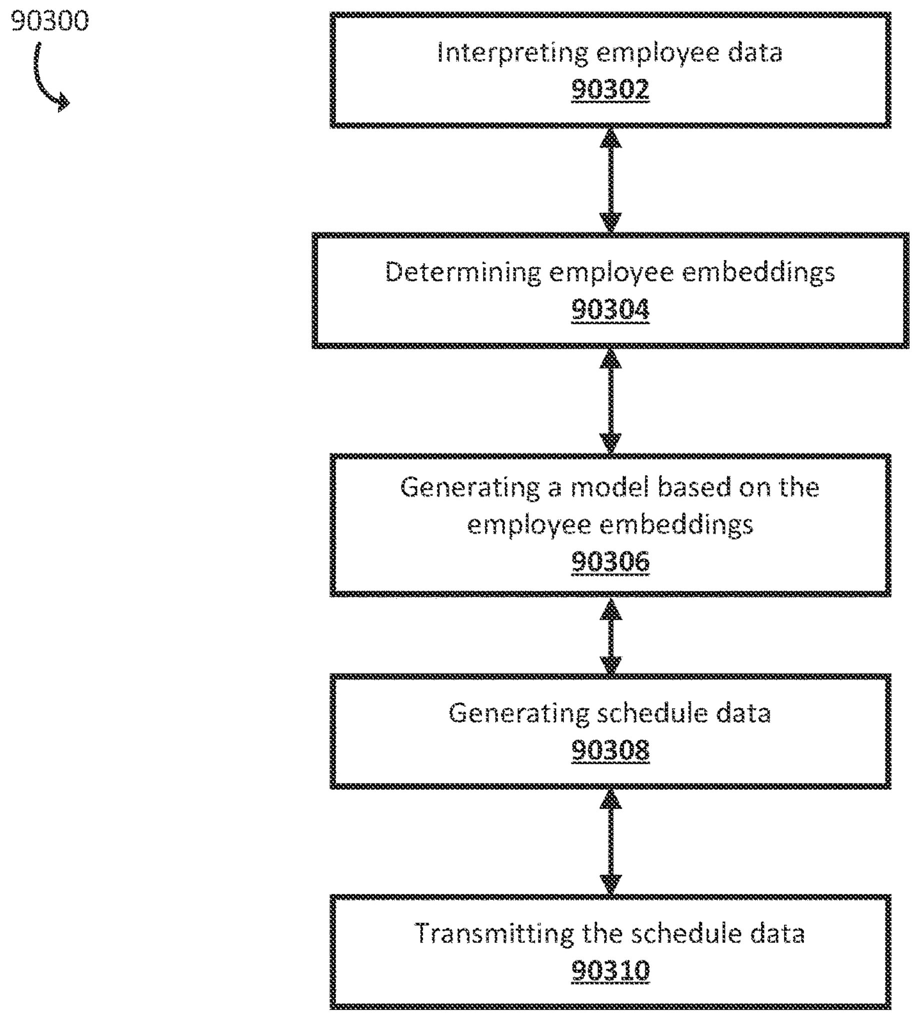
FIG. 53 is a flowchart depicting a method for timekeeping and scheduling, in accordance with embodiments of the current disclosure.

Shown in FIG. 53 is a flowchart of a method 90300 for timekeeping and scheduling, in accordance with an embodiment of the current disclosure. The method 90300 may be performed by the apparatus 90100 (FIG. 51), the apparatus 90200 (FIG. 52), and/or any other computing device disclosed herein. The method 90300 may include interpreting, via an employee surveyor circuit 90102 (FIG. 51), employee data 90302 and determining, via an embedding generator circuit 90104 (FIG. 51), employee embeddings based at least in part on the employee data 90304. Further, the method 90300 includes generating, via an artificial intelligence circuit 90106 (FIG. 51), a model based at least in part on the employee embeddings 90306 and generating, via a scheduling circuit 90108 (FIG. 51), schedule data via the model 90308. After generating the schedule data, the method 90300 may also include transmitting, via a schedule provisioning circuit 90110 (FIG. 51), the schedule data 90310.

Figure 54:
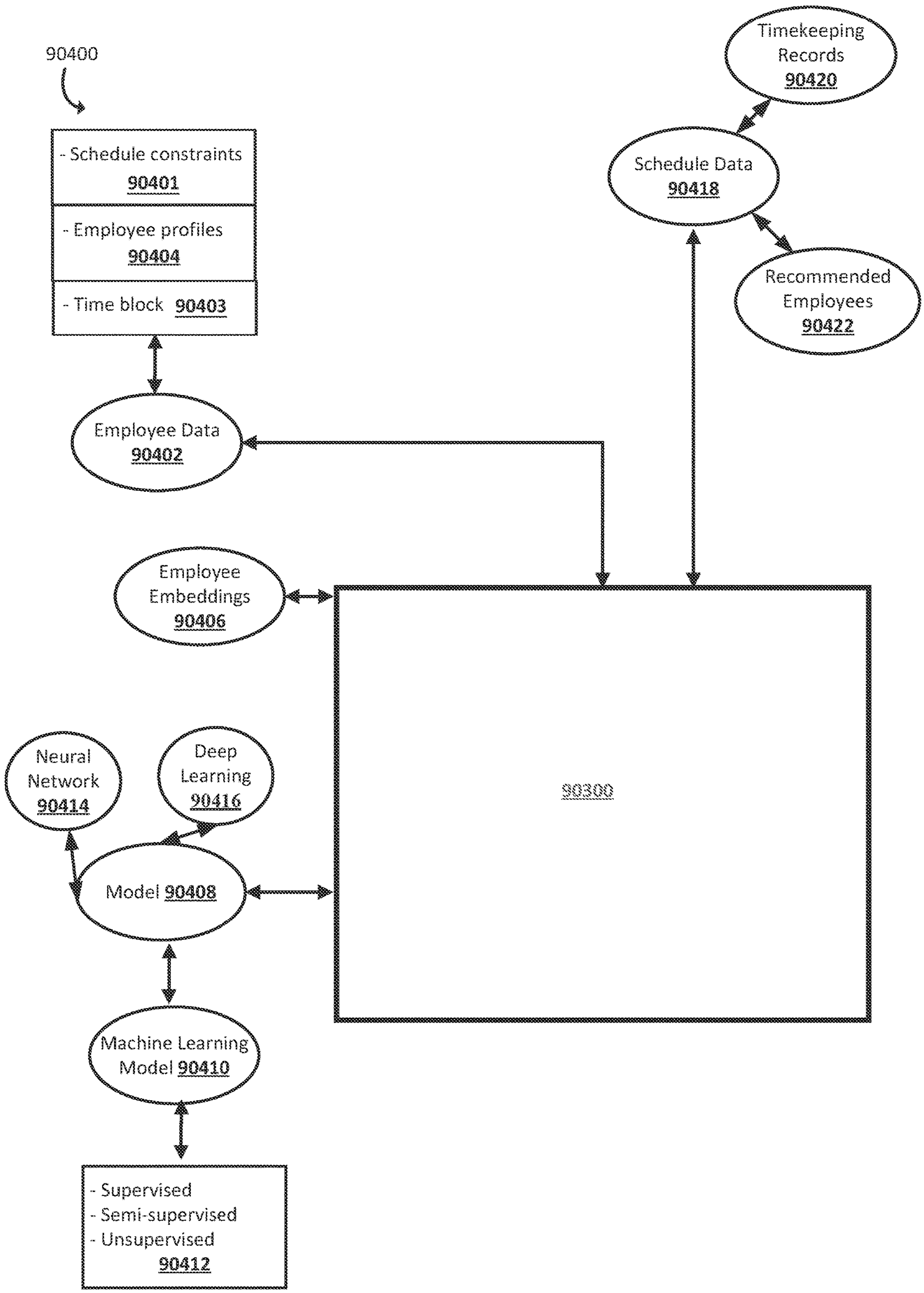
FIG. 54 is another flowchart of the method of FIG. 53, in accordance with embodiments of the current disclosure.

Illustrated in FIG. 54 is a flowchart of a method 90400 for timekeeping and scheduling in accordance with embodiments of the current disclosure. The method 90400 performs the operations of method 90300 (FIG. 53). The method 90400 may be performed by the apparatus 90100 (FIG. 51) and/or any other computing device disclosed herein. In embodiments, the employee data 90402 of method 90400, interpreted by the employee surveyor circuit 90102 (FIG. 51), has at least one of: an employee profile 90404, a schedule constraint 90401, or a time block 90403. The employee profile 90404 may include an employee's name, address, experience, and duties. The schedule constraints 90401 may have information related to the employee profiles, such as employee availability and conflict with other employees. Time block 90403 may include employee duties at different blocks of time (e.g., dividing a shift into blocks for lunchtime, replenishing merchandise, working as a cashier, etc.).

In embodiments, employee embeddings 90406 of method 90400 are generated from employee data 90402 by the embedding generator circuit 90104 (FIG. 51). In example embodiments, the employee embeddings 90406 determined from employee data having similar characteristics are closer in space than the employee embeddings determined from employee data having discrete characteristics. Therefore, instead of using employee data 90112 directly for scheduling, employee embeddings 90406 are used. In embodiments, the employee embeddings 90406 capture several characteristics of the employee data 90402. In other embodiments, employee embeddings 90406 operate as a clustering method to cluster several characteristics of employee data 90402 into an employee embedding. In other embodiments, employee embeddings 90406 may include projecting employee data 90402 into a different space. In some embodiments, the high dimensional data, e.g., a plurality of characteristics in the employee data 90402 may be represented by a lower number of characteristics in the employee embeddings 90406. Therefore, employee embeddings 90406 capture some of the characteristics in the employee data 90402 and represent employee data 90112 of similar characteristics closer to each other in the space. Further, employee embeddings 90406 may focus less on characteristics determined to be less important. In example embodiments, different spaces may be used where employee data 90402 of similar characteristics may be closer in, to name a few: an affine space, a projective space, a curved space, a Euclidean space, and a pseudo-Euclidean space. Employee data 90402 close to each other in one space may not necessarily be close in another.

In embodiments, the method 90400 may include selecting a subset of the employee data 90402 by the employee surveyor circuit 90102 (FIG. 51), the subset being selected from a larger pool of employee data. Employee embeddings 90406 may be determined for the subset by the embedding generator circuit 90104 (FIG. 51). In embodiments, at least part of the employee data 90402 used to determine the employee embeddings are selected from the larger pool of employee data by an administrator. In embodiments, the method 90400 may include selecting at least part of the employee data 90402 from the larger pool of employee data.

In embodiments, the model 90408, generated by the artificial intelligence circuit 90106 (FIG. 51) can be based on machine learning, the generated model being a machine learning model 90410. In embodiments, the machine learning model 90410, generated by the machine learning circuit 90204 (FIG. 52), is generated using at least one of supervised training, semi-supervised training, and unsupervised training 90412. Further, the model 90408 may be a neural network model 90414. In other examples, the model 90408 may be a deep learning model 90416. The model 90408 can be trained using employee embeddings 90406. This model 90408 can be used to generate the schedule data 90418 by the scheduling circuit 90108 (FIG. 51). The schedule data 90418 may include employee embeddings 90406 with respective shift information. The schedule data 90418 may include information related to employee data 90402 of a plurality of employees represented by the employee embeddings 90406. In other examples, the schedule data 90418 may include the employee data 90402 having employee profiles 90404 with assigned shifts.

In embodiments, the method 90400 may include generating timekeeping records 90420 by the scheduling circuit 90108 (FIG. 51). Timekeeping records 90420 include clock in and clock out times for employees (e.g., employee profile) . Timekeeping records 90420 may also include the length of employment, the number of shifts worked, and the dates of such shifts. In embodiments, the method 90400 may further include generating a list of recommended employees 90422 by the scheduling circuit 90108 (FIG. 51). The list of recommended employees 90422 may be a list of recommended employees for an administrator to consider when assigning shifts. The list of recommended employees 90422 may consider characteristics such as the experience of employees, workload on certain days, synergy between employees, etc. In example embodiments, the list of recommended employees 90422 may not be part of the schedule data 90418. In embodiments, the method 90400 may utilize input from other artificial intelligence modules, e.g., circuits, to generate the schedule data 90418.

Figure 55:
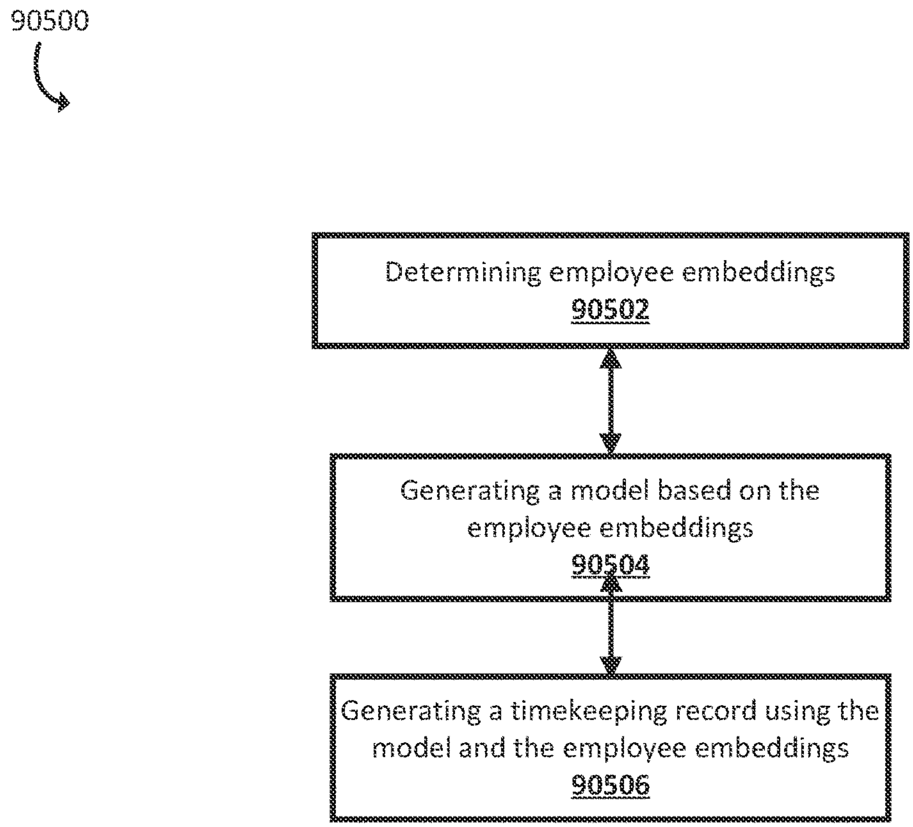
FIG. 55 is a flowchart depicting a method for timekeeping and scheduling, in accordance with embodiments of the current disclosure.

Illustrated in FIG. 55 is another method 90500 for timekeeping and scheduling, in accordance with an embodiment of the current disclosure. The method 90500 may be performed by the apparatus 90100 (FIG. 51), the apparatus 90200 (FIG. 52), and/or any other computing device disclosed herein. The method 90500 includes determining, using an embedding generator circuit 90104 (FIG. 51), employee embeddings 90502. Further, the method 90500 includes generating, via an artificial intelligence circuit 90106 (FIG. 51), a model using the employee embeddings

90504, and generating, via a scheduling circuit 90108, a timekeeping record using the model and the employee embeddings 90506.

Figure 56:
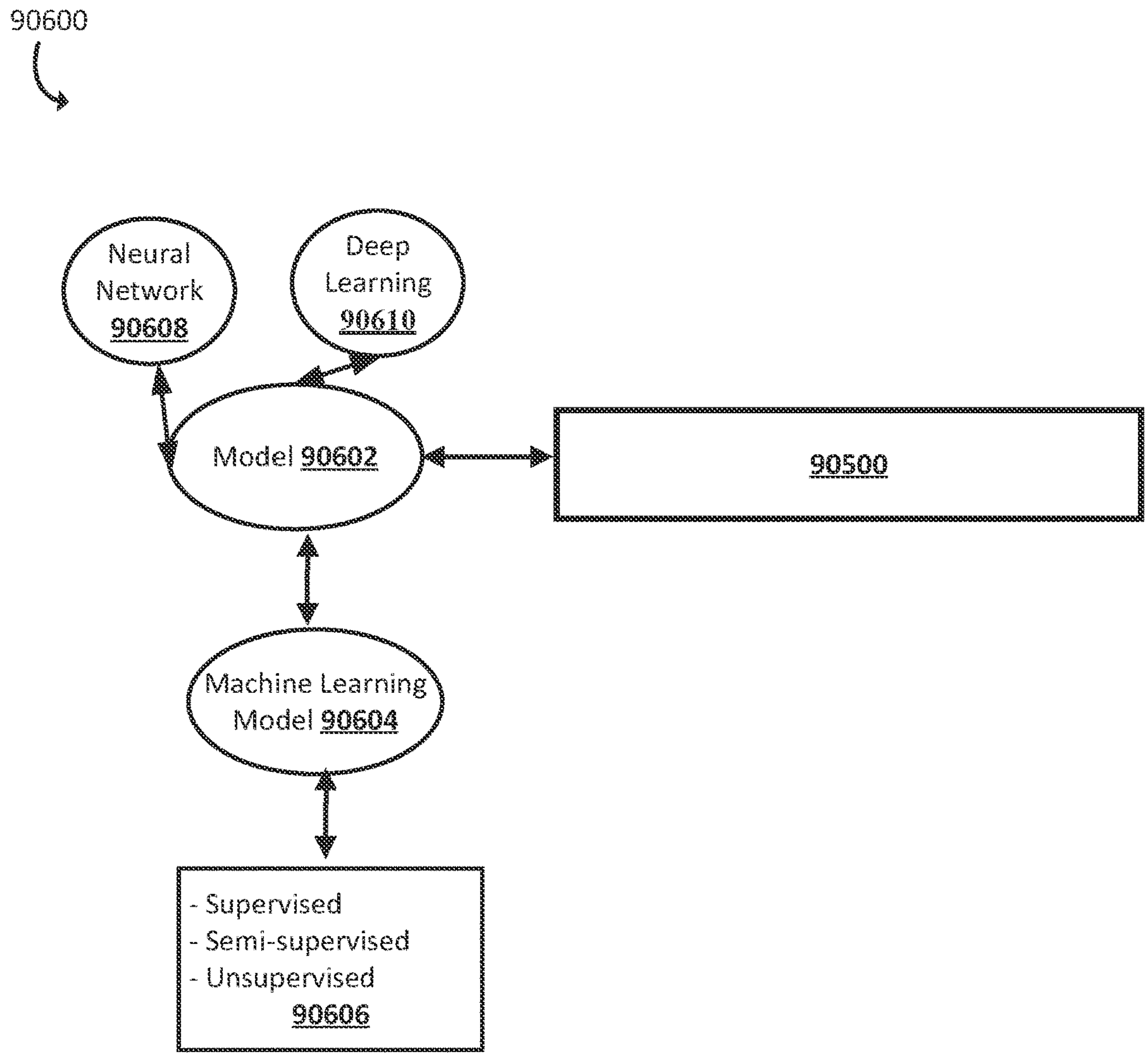
FIG. 56 is another flowchart depicting the method of FIG. 55, in accordance with embodiments of the current disclosure.

FIG. 56 is another method for timekeeping and scheduling, in accordance with an embodiment of the current disclosure. The method 90600 performs the operations of method 90500 (FIG. 55). The method 90600 may be performed by the apparatus 90100 (FIG. 51) and/or any other computing device disclosed herein. In embodiments, the model 90602, generated by the artificial intelligence circuit 90106 (FIG. 51), is based on machine learning. Hence, the model 90602 can be a machine learning model 90604. In embodiments, the machine learning model 90604, generated by the machine learning circuit 90204 (FIG. 52), is generated using at least one of: supervised training, semi-supervised training, and unsupervised training 90606. Further, the model 90602 may be a neural network model 90608. In other examples, the model 90602 may be a deep learning model 90610.

In embodiments, the timekeeping records include clock in and clock out times for employees, e.g., employee profile. Timekeeping records may also include the length of employment, the number of shifts worked, and the dates of such shifts.

Figure 57:
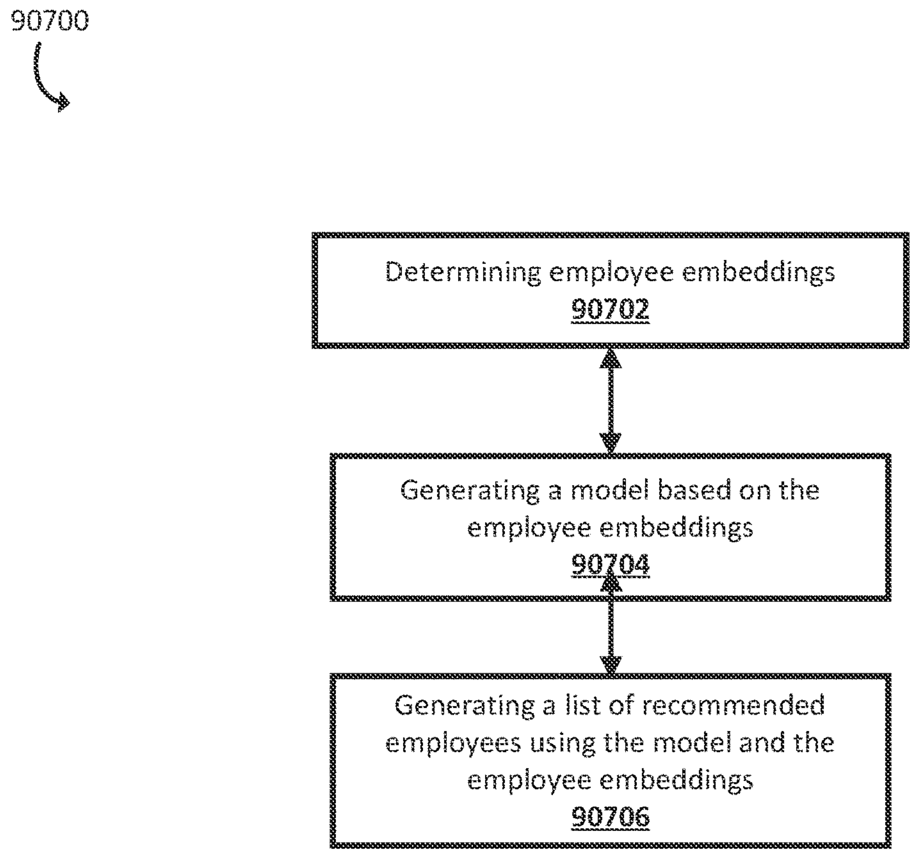
FIG. 57 is a flowchart depicting a method for timekeeping and scheduling, in accordance with embodiments of the current disclosure.

Illustrated in FIG. 57 is another method 90700 for timekeeping and scheduling, in accordance with an embodiment of the current disclosure. The method 90700 may be performed by the apparatus 90100 (FIG. 51), the apparatus 90200 (FIG. 52), and/or any other computing device disclosed herein. The method 90700 includes determining, using an embedding generator circuit 90104 (FIG. 51), employee embeddings 90702. Further, the method 90700 includes generating, via an artificial intelligence circuit 90106 (FIG. 51), a model using the employee embeddings 90704, and generating, via a scheduling circuit 90108, a list of recommended employees using the model and the employee embeddings 90706.

Figure 58:
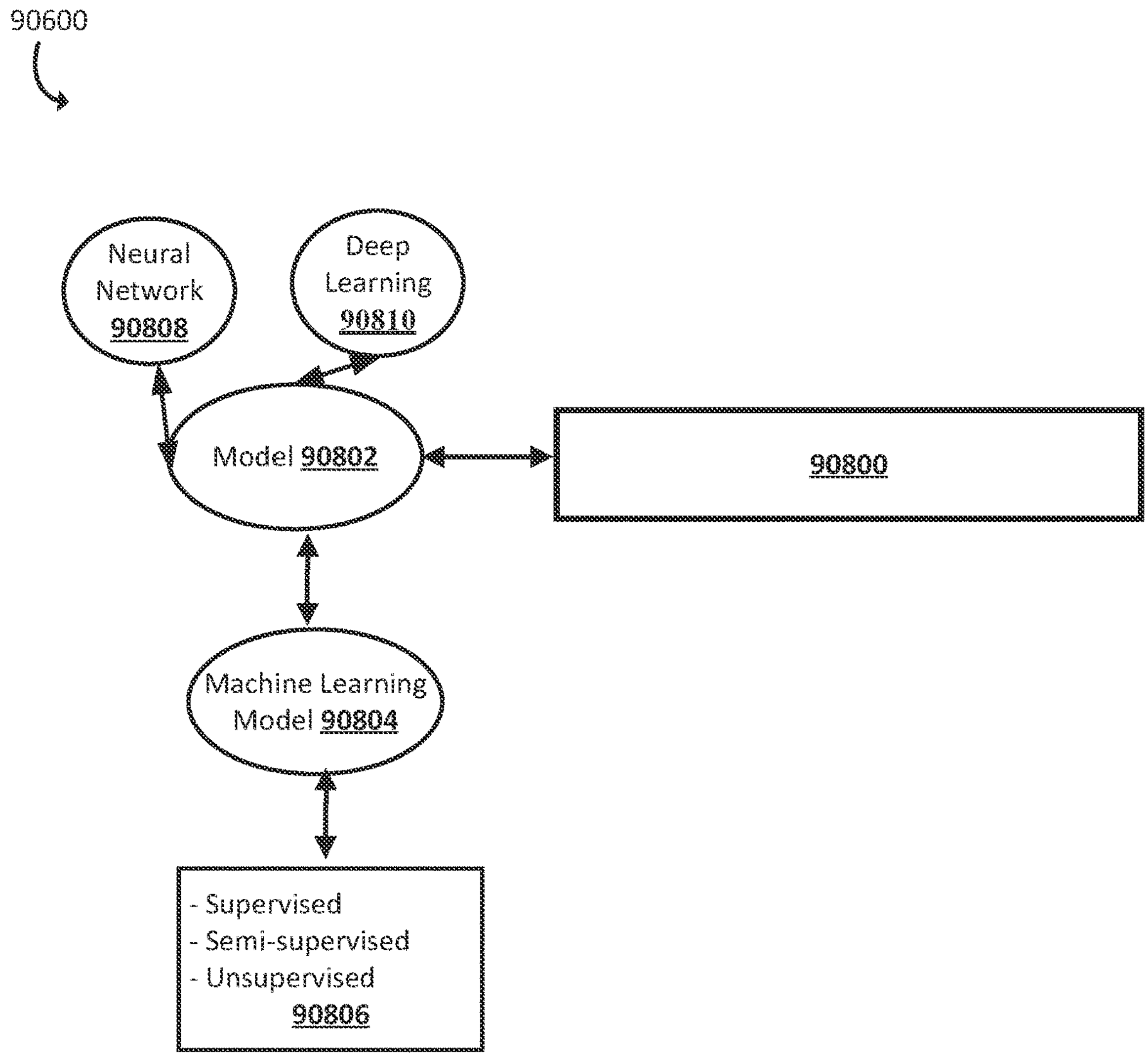
FIG. 58 is another flowchart depicting the method of FIG. 57, in accordance with embodiments of the current disclosure.

FIG. 58 is another method for timekeeping and scheduling, in accordance with an embodiment of the current disclosure. The method 90800 performs the operations of method 90700 (FIG. 57). The method 90800 may be performed by the apparatus 90100 (FIG. 51) and/or any other computing device disclosed herein. In embodiments, the model 90802, generated by the artificial intelligence circuit 90106 (FIG. 51), is based on machine learning. Hence, the model 90802 can be a machine learning model 90804. In embodiments, the machine learning model 90804, generated by the machine learning circuit 90204 (FIG. 52), is generated using at least one of: supervised training, semi-supervised training, and unsupervised training 90806. Further, the model 90802 may be a neural network model 90808. In other examples, the model 90802 may be a deep learning model 90810. In embodiments, the list of recommended employees includes employee embeddings. In other example embodiments, the list of recommended employees includes employee profiles.

An example embodiment of the present disclosure, utilizing one or more aspects as set forth preceding, includes a method for predicting and/or determining schedules. The method includes generating a first schedule via a first agglomerate network, and passing one or more portions of the first schedule to a second agglomerate network as input via a connector. The method further includes generating a second schedule via the second agglomerate network based at least in part on the one or more portions of the first schedule, and transmitting the second schedule. In certain embodiments, the method further includes weighting at least one of the first or the second agglomerate network to favor an employer over an employee. In certain embodiments, the method further includes weighting at least one of the first or the second agglomerate network to favor an employee over an employer. In certain embodiments, the method further includes mixing at least one of the first schedule or the second schedule with at least one other schedule.

Another example embodiment of the present disclosure, utilizing one or more aspects as set forth preceding, includes a system for predicting schedules. The system includes a plurality of agglomerate networks, one or more connectors, a schedule selector circuit, and a schedule provisioning circuit. The plurality of agglomerate networks are each structured to generate a corresponding schedule. The one or more connectors are each structured to pass at least one of the schedules as input to at least one of the plurality of agglomerate networks. The schedule selector circuit is structured to select at least one of the schedules. The schedule provisioning circuit is structured to transmit the selected schedule.

Another example embodiment of the present disclosure, utilizing one or more aspects as set forth preceding, includes an apparatus that includes a scheduling factor interpretation circuit, one or more agglomerate network circuits, one or more connector circuits, a schedule selector circuit, and a schedule provisioning circuit. The scheduling factor interpretation circuit is structured to interpret one or more scheduling factors. The one or more agglomerate network circuits are each structured to generate a corresponding schedule. The one or more connector circuits are each structured to pass at least one of the schedules as inputs to at least one of the one or more agglomerate network circuits. The schedule selector circuit is structured to select at least one of the schedules. The schedule provisioning circuit is structured to transmit the selected schedule.

Another example embodiment of the present disclosure, utilizing one or more aspects as set forth preceding, includes a method for configuring a scheduling system. The method includes generating a plurality of schedules for a plurality of targets using different configurations of an agglomerate network, determining a performance score of the plurality of schedules, and identifying configurations of the agglomerate network and targets with schedules above a performance score/threshold. The method further includes receiving a request for a schedule for a target, configuring the agglomerate network for the target based on the identified configurations, and generating the schedule using the configured agglomerate network. In certain embodiments, tracking the performance includes tracking changes made to the schedules. In certain embodiments, configuring the agglomerate network incudes selecting scheduling models. In certain embodiments, configuring the agglomerate network includes selecting forecasting models. In certain embodiments, configuring the agglomerate network includes configuring data biases of data sources.

An example agglomerated network use case includes a franchise work schedule scenario and/or situation. For example, an embodiment of the Autonomous Agglomerated Resource Utilization Modeler, as described herein, may utilize correlated agglomerated models to produce improved shift work schedules that balance both implicit and explicit quality parameters. Such embodiments may optimize quality parameters across one or more hierarchical agglomerated scheduling models, and one or more secondary, iterative agglomerated models. In this example, the system may generate shift schedules for a chain of restaurants operating in Northern Michigan during the winter. The franchise operator may run a chain of six restaurants, one of which is new. The franchise owner may want to develop a shift schedule for the operator's six franchises in the early fall for Thanksgiving week.

Other use cases include optimizing a schedule for one or more of: 1) benefits to education, e.g., experienced employee with several new employees, or maximize cross-training across skills/departments; 2) benefits to environment, e.g., maximize at least one of ridesharing, bike/walk to work, public transportation, etc., and/or maximize the percent of resources (used by those scheduled tasks/people) that are renewable; 3) benefits to utilities bills, e.g., certain jobs/skills may use more resources (electric/gas) and can be scheduled for when those rates are predicated to be lower, and/or to maximize the percent of resources that are renewable; 4) schedule to maximize throughput, e.g., right before an estimated peak demand it may be optimal to have the most efficient employees there; and/or 5) amount of system resources to be used generating schedules, e.g., if need extra resources, e.g., virtual machines, are needed to generate a particular schedule, it may be optimal to generate the schedule at off-peak times and/or during better rates.

Embodiments may include agglomerated input handler processing of external data sources. In addition to extracting model input data from unformatted or formatted sources, the Agglomerated Input Handler may assess the quality and reliability of its input sources. For example, the system may take in weather information from a variety of sources that possess different characteristics and quality ratings. Initially, the reliability of these data sources may default to a set level based on user settings or by drawing on data developed from cross-domain experience with the same or a similar model.

Embodiments may include learning external data source quality/reliability. In an unsupervised manner, the system may continually update an input quality model based on actual versus predicted results. If a given external data source provides predictive data (e.g., a weather forecast), the system learns to what degree a new input is reliable based on the actual weather once the predictive timeframe is reached. In certain embodiments, the system may also utilize direct feedback (labeling) from user(s) as a supervised learning input.

A use case input example is provided below. In this franchise work schedule example, the system may receive an updated weather report which predicts six (6) inches of snow Thanksgiving night, prior to an early, black-Friday opening. When the original schedule for the current week was adopted, clear skies may have been anticipated. As such, the Agglomerated Input Handler may monitor weather reports and processes any updated data. Based on its learning concerning the accuracy of the source (the National Weather Service), the advance forecast time (18 hours), and the range of snowfall predicted (anticipated snowfall, six (6) inches: range of anticipated snowfall, four (4) to twelve (12) inches, and the prior snowfall prediction (no snow).

Embodiments may include an updated agglomerated weather model. Continuing with the franchise work schedule example, the Agglomerated Input Handler may update a probabilistic agglomerated weather model based on the received NWS update. Based on its learned experience, the system may provide the following probability distribution for the upcoming snowfall:

No snow/dusting: 5%
2 inches: 5%
4 inches: 20%
6 inches: 40%
8 inches: 15%
10 inches: 10%
12 inches: 5%

Embodiments may include triggering the generation of a new or updated agglomerate model. Upon the receipt of a new or updated external input, or the generation of a new or updated agglomerated model, or the activation of one or more time-based trigger(s), the Autonomous Evolution Controller may direct the creation or update one or agglomerated models. Alternatively, the Autonomous Evolution Controller may determine that the generation of new or updated agglomerated models is not required at this time, e.g., if the new or updated input or model data is not evaluated to be significant at this time.

The Autonomous Evolution Controller may utilize historical data and/or user inputs, to learn whether a given new or updated external input, or a new or updated agglomerated model should trigger the creation or update one or more primary scheduling models. In an embodiment, where prior historical or comparable information is not available, the system may preferentially update potentially affected agglomerate models until adequate data has been collected to determine if the new data needs to be propagated forward.

The autonomous evolution controller may make independent propagation decisions for one or more agglomerate models which utilize the new or updated data as an input. In the example above, the weather data may be consumed by one or more agglomerate models such as a school closing, general business closing model, commute model, absenteeism model, and franchise closing model. While the absenteeism model may consume the outputs of the agglomerated weather model, it may also consume outputs from the school closing model, general business closing model, and/or commute model.

Embodiments may include learning evolution triggers. Initially the system may use default alert levels, quality measures, time limits, processing limits, trigger values from similar businesses, other means, or a combination of the above, to determine what agglomerate models, if any, need to be updated based on the receipt of a new or updated input, model, or alert. However, as processing time permits, the system may preferentially update the agglomerate models. In embodiments, the system "learns" if such an update needed to be run based on comparing the results of the existing agglomerate models and any newly generated agglomerate models. If the change did not propagate through to the generation of a new schedule, i.e., the revised input did not ultimately result in a revised schedule or other output result, the evolution controller learns about when and under what conditions updating a given agglomerate model may not be necessary.

If the update is propagated through to a user, the autonomous evolution controller learns if the updated output was significant based on whether a user accepts or rejects any suggested change. Additionally, the system may adjust the perceived quality of the output depending on how well the newly modeled schedule is adhered to by the franchise's employees.

For example, if an updated weather forecast calls for six (6) inches of snow versus one (1) inch of snow in the hours leading up to a shift start, the system may rerun an agglomerate absenteeism model that is globally trained (where globally refers to trained over a large set of similar businesses) to assess general staff availability. If the global absenteeism model indicates that the probability of key-staff missing a shift is high, the system may preferentially trigger the running of a local absenteeism model which uses the global absenteeism output as a feature input and reassesses the likelihood of individual staff absenteeism.

Embodiments of the current disclosure provide for feedback aspects, such as employee feedback, to be used/considered in adjusting how a schedule is generated. Accordingly, certain aspects of the current disclosure provide for may provide for a responsive scheduler, e.g., a scheduler that uses employee feedback to adjust how an AI, as disclosed herein, generates a schedule. The responsive scheduler may form part of component module 114 (FIG. 1) and, as such, the feedback may be collected via computer surveys, e.g., 140 (FIG. 1) and/or other means, e.g., extraction of trends 142 (FIG. 1) as disclosed elsewhere herein, such as trends extracted by the marketplace components 112 (FIG. 1). For example, in embodiments, initially the model of individual staff absenteeism may be drawn from a default model, e.g., user entered data, and/or a combination of the above where a new employee is matched to an existing profile based on similar employee profile characteristics, responses to questionnaires, transportation type, family composition, and distance to the job site. Feedback, e.g., survey responses, on the generated schedule(s) may then be provided to the scheduler so that it can learn over time and use its own historic performance to weigh and tune the various inputs and produce a more optimal output. Embodiments of the responsive scheduler, however, may seek to balance the value of receiving employee feedback with over surveying, e.g., hassling, employees.

In embodiments, an artificial intelligence (AI) system, tasked with generating a schedule, may be influenced via employee feedback on a prior schedule. In embodiments, the influence may be directly to the AI system, e.g., the influence may be a change to weights in a neural network and/or a change to a connector that adjusts inputs and/or outputs to one or more agglomerate network circuits in an agglomerate network, as disclosed herein. In other words, embodiments of the current disclosure provide for the generation of schedule data that is responsive to employee feedback.

In embodiments, the feedback may be collected via computer surveys and/or other means, e.g., inferred from activity in a scheduler marketplace, wherein trends are extracted from the feedback. Feedback may be gathered via online surveys, traditional paper surveys, anonymous submissions, focus groups, and the like. Embodiments of the current disclosure may use historic performance to weigh and/or tune various inputs to feedback to produce a more optimal output. Embodiments may balance extracted trends with the needs of the organization, where organizational needs and trends may be given a common score to determine which dominates. Trends associated with a high number of employees may be given a high score and organizational needs may be given ratings by managers. In embodiments, trends may be determined based on a number of similar responses from different employees.

Embodiments of a responsive scheduler may be a module/model/circuit that receives inputs, e.g., a schedule and/or other data, e.g., biases, as: direct input, e.g., the responsive scheduler acts as a standalone module; as direct input to an agglomerate network, e.g., without use of connectors; from connectors, e.g., the responsive scheduler is one of a plurality of modules/models/circuits within an agglomerate network; and the like. For example, the responsive scheduler may be a module/model/circuit within an agglomerate network, as disclosed herein, that evaluates a schedule, generated by human and/or a scheduler circuit, against trends extracted from employee feedback and generates an output, e.g., a bias. The responsive scheduler circuit may, in turn, feed the output back into the scheduler circuit (or back to the human as a message) to form a feedback loop which tries to reach equilibrium and/or optimization of various biases in the agglomerate network. The connections between the responsive scheduler circuit and the various modules/models/circuits of the agglomerate network may be accomplished via connectors.

Figure 59:
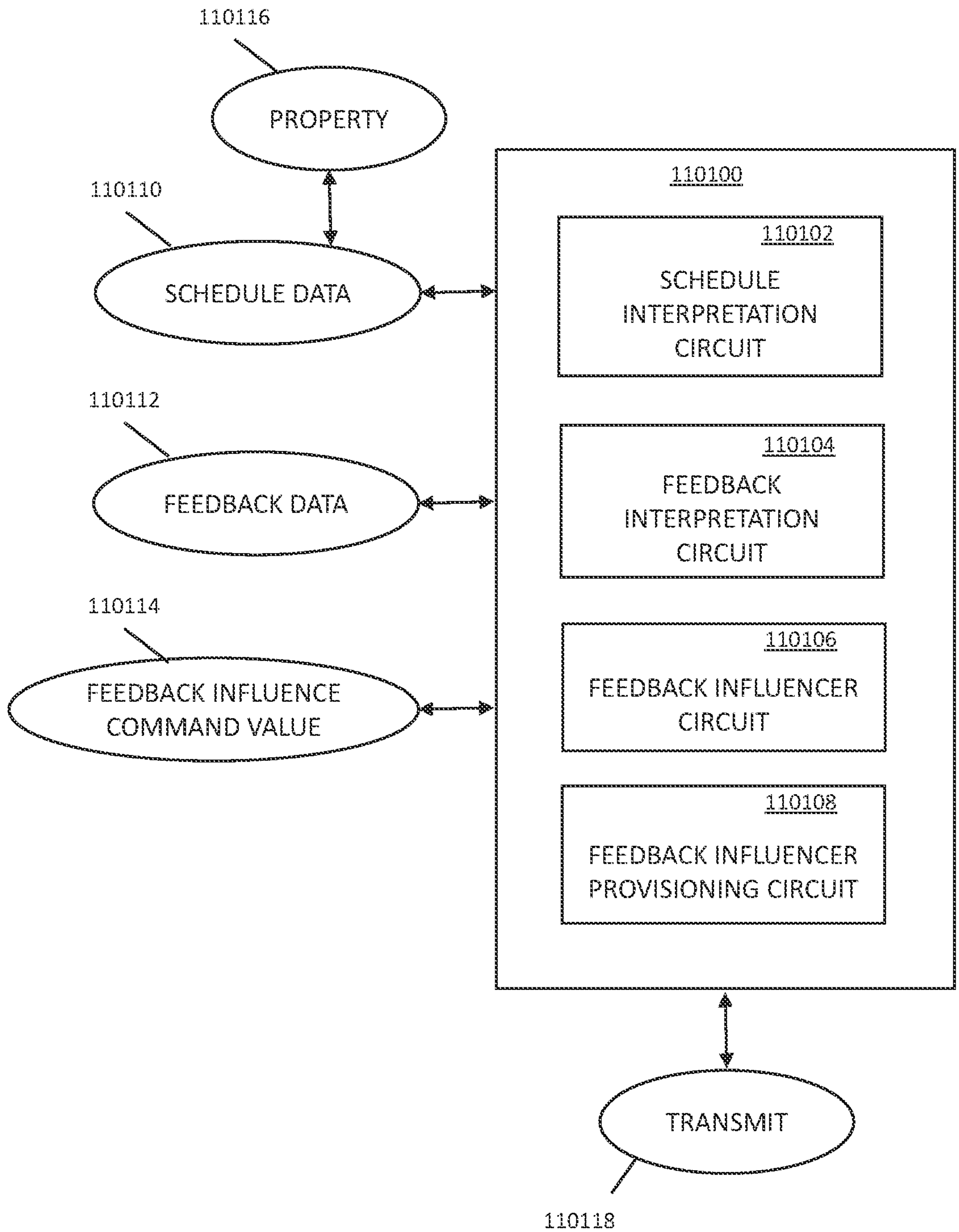
FIG. 59 is a schematic diagram depicting an apparatus for responsive scheduling, in accordance with an embodiment of the current disclosure.

Accordingly, FIG. 59 depicts an apparatus 110100 for responsive scheduling. The apparatus 110100 includes a schedule interpretation circuit 110102 structured to interpret schedule data 110110; a feedback interpretation circuit 110104 structured to interpret feedback data 110112 corresponding to the schedule data 110110; a feedback influencer circuit 110106 structured to generate, based at least in part on the feedback data, a feedback influence command value 110114 structured to effect a change of a property 110116 of the schedule data; and a feedback influencer provisioning circuit 110108 structured to transmit 110118 the feedback influence command value. The change to the property 110116 of the schedule data may be a direct change, e.g., direct manipulation of the schedule data, and/or accomplished via adjusting a connector that in turn results in a change to the schedule data. For example, an agglomerate network may have multiple scheduler circuits that compete to be the first to generate a schedule that optimizes one or more biases, as disclosed herein. Adjusting a connector may result in the output of a particular circuit and/or model being down-weighted when used as input to a scheduler circuit. For example, the output of a profitability circuit tasked with influencing a scheduler circuit to optimize for profitability may be down-weighted via a connector bias if the feedback shows employees are unhappy with past schedules that were generated when the profitability circuit had more influence on the scheduler circuit.

Figure 60:
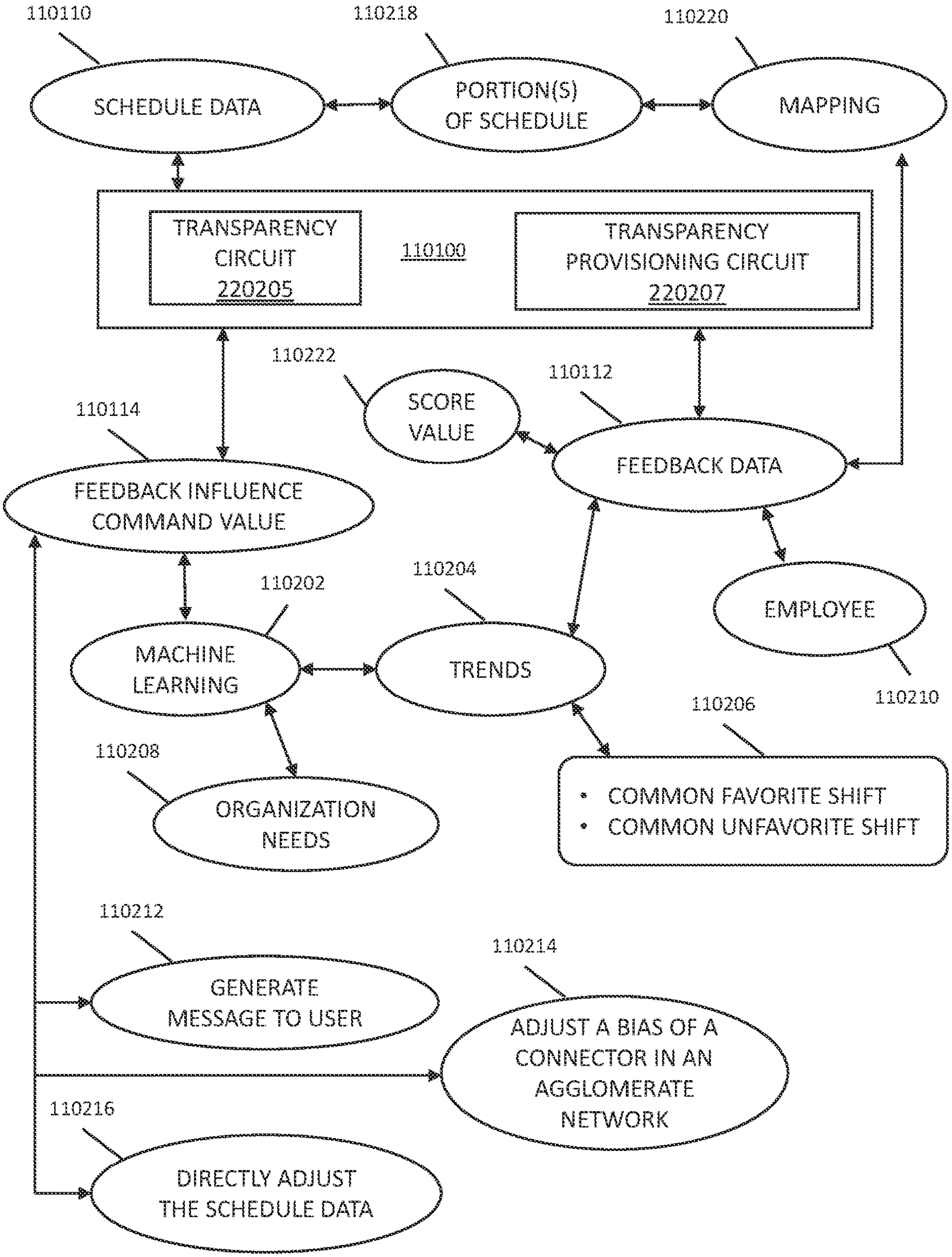
FIG. 60 is a schematic diagram depicting certain further aspects of an apparatus for responsive scheduling, in accordance with an embodiment of the current disclosure.

Referring to FIG. 60, certain further aspects of the apparatus 110100 are described following, any one or more of which may be present in certain embodiments. For example, in embodiments, the feedback influencer circuit 110108 generates the feedback influence command value based at least in part on machine learning 110202. The machine learning 110202 may extract trends 110204 from the feedback data, and the trends are used to generate the feedback influence command value. In embodiments, the machine learning 110202 may be a neural network trained over a labeled training set that includes historical feedback data and associated trends.

In embodiments, the apparatus 110100 further includes a transparency circuit 220205 structured to generate an electronic communication that indicates the feedback data influenced the schedule data, and a transparency provisioning circuit 220207 structured to transmit the electronic communication. As will be appreciated, the electronic communication may convey to an employee that their feedback was received and considered by their employer when generating the schedule data 110110. In embodiments, the electronic communication may include a visual and/or audio message. For example, the electronic communication may be a textual description that conveys one or more extracted tends 110204, and may further include a textual description of changes to the schedule data 110110 that were made based on the feedback. For example, an extracted trend 110204 may indicate that employees assigned to the schedule strongly disfavor shifts exceeding twelve hours, that this trend 110204 was considered in generating the schedule data 110110, and that the result was that the schedule data 110110 corresponds to a schedule that does not have any shifts exceeding twelve (12) hours but does have an additional shift. In embodiments, the electronic communication may indicate a version of a schedule that was generated prior to incorporation of feedback along with a version of the schedule that has been adjusted and/or regenerated based at least in part on the feedback. As will be appreciated, providing transparency to employees with respect to the schedule generation process and the incorporation of feedback, as disclosed herein, improves the relationship between employees and their employers which, in turn, may improve employee productivity and/or reduce turnover.

In embodiments, the trends may include a common favorite shift or a common unfavorite shift 110206. In embodiments, trends may include a preferred amount of hours worked per day, week, month, year, etc. For example, the machine learning 110202 may determine a trend 110204 that married workers between the ages of twenty-five to thirty years old generally disfavor shifts starting after five pm, and structure the feedback influence command value to mitigate the likelihood of such workers being assigned to shifts starting after five pm. In embodiments, the machine learning 110202 may detect a trend that a worker of a particular demographic may prefer shifts prior to a religious holiday, presumably to earn extra money for the holiday. In embodiments, trends may include a commonly preferred co-worker. In such embodiments, the change to the schedule data may include increasing the number of employees who work with the commonly preferred co-worker over a given period of time. For example, a highly favorite employee (as indicated by the feedback) may be given shorter but more numerous shifts so that they can be scheduled to work with a larger number of different employees. In embodiments, the highly favorite employee may be rotated through different shifts while other employees are assigned non-rotating shifts. In embodiments, the highly favorite employee may be assigned non-rotating shifts while other employees are rotated through the highly favorite employee's shifts.

In embodiments, the feedback influencer circuit generates the feedback influence command value by balancing the extracted trends with needs of an organization 110208. For example, extracted trends 110204 and a need of an organization may be assigned values/scored on a common scale, e.g., a range of one (1) to one-hundred (100) for purposes of comparing and/or weighting. In such embodiments, an extracted trend may be given a high value, e.g., '80', if the trend 110204 is supported by a large number of employees, e.g., 50% or more of the workforce. The need of the organization may be assigned a value via user input and/or via an artificial intelligence. For example, a shift during a holiday season for a retailer may be assigned a high value, e.g., '90', if the retailer generates a significant amount of annual profits during the holiday season, as opposed to a non-holiday season shift which may be assigned a low value, e.g., '20'. Non-limiting examples of needs of an organization 110208 include: urgent shifts, a minimum number of open-store hours, a minimum number of expected sales; a minimum amount of expected profit, a maximum amount of operating costs, and the like.

In embodiments, the feedback data corresponds to employees 110210 that operated under a schedule defined, in part, by the schedule data. As such, the feedback data may be a direct reflection of the schedule data's favorability with employees. In embodiments, the feedback data corresponds to employees 110210 that did not work under the schedule data. Accordingly, the feedback data may be an indirect reflection of the schedule data's favorability with employees. For example, the feedback data in such embodiments may indicate an industry wide trend, e.g., employees generally disfavor working Sunday morning shifts.

In embodiments, the feedback influence command value may be structured to generate a message to a user 110212. In such embodiments, the user may be an individual tasked with generating a schedule for an entity and the message may help guide the user in designing the schedule data, either by directly editing the schedule data and/or making an adjustment to a connector. The message may include a text-based message, a visual indicator, and/or an audio-based message. For example, the message may state that an extracted trend was found and indicates that employees are willing to work an additional three hours per shift for four weeks in-a-row if they receive an extra week of vacation time.

In embodiments, the feedback influence command value may be structured to adjust a bias of a connector in an agglomerate network 110214, as disclosed herein, and/or to directly adjust the schedule data 110216, as also disclosed herein. In embodiments, the schedule data corresponds to a portion of a schedule 110218 that is less than the entire schedule. For example, the feedback influence command value may be structured to adjust a single shift in a schedule. In embodiments, the feedback influence command value may be structured to adjust a subset of a total number of shifts in a schedule. In embodiments, the feedback may correspond to a single shift and/or a series of shifts in a schedule. In other words, embodiments of the current disclosure provide for general feedback for a schedule, as a whole, and/or for more tailored feedback that identifies particular portions of a schedule.

For example, in embodiments, each of a plurality of distinct portions of the feedback data may be mapped 110220 to a corresponding distinct portion of the schedule data. As such, a distinct portion of the feedback data may include an identifier for one or more shifts. As will be appreciated, mapping distinct portions of the feedback data to corresponding distinct portions of the schedule data may provide for more accurate adjustments to the schedule data which may be better able to accommodate balancing employer needs vs employee needs. In embodiments, each of the plurality of distinct portions of the feedback data may represent a score value 110222, e.g., a score between one (1) and one-hundred (100) where one (1) corresponds to least favorable value and one-hundred (100) corresponds to most favorable value.

Figure 61:
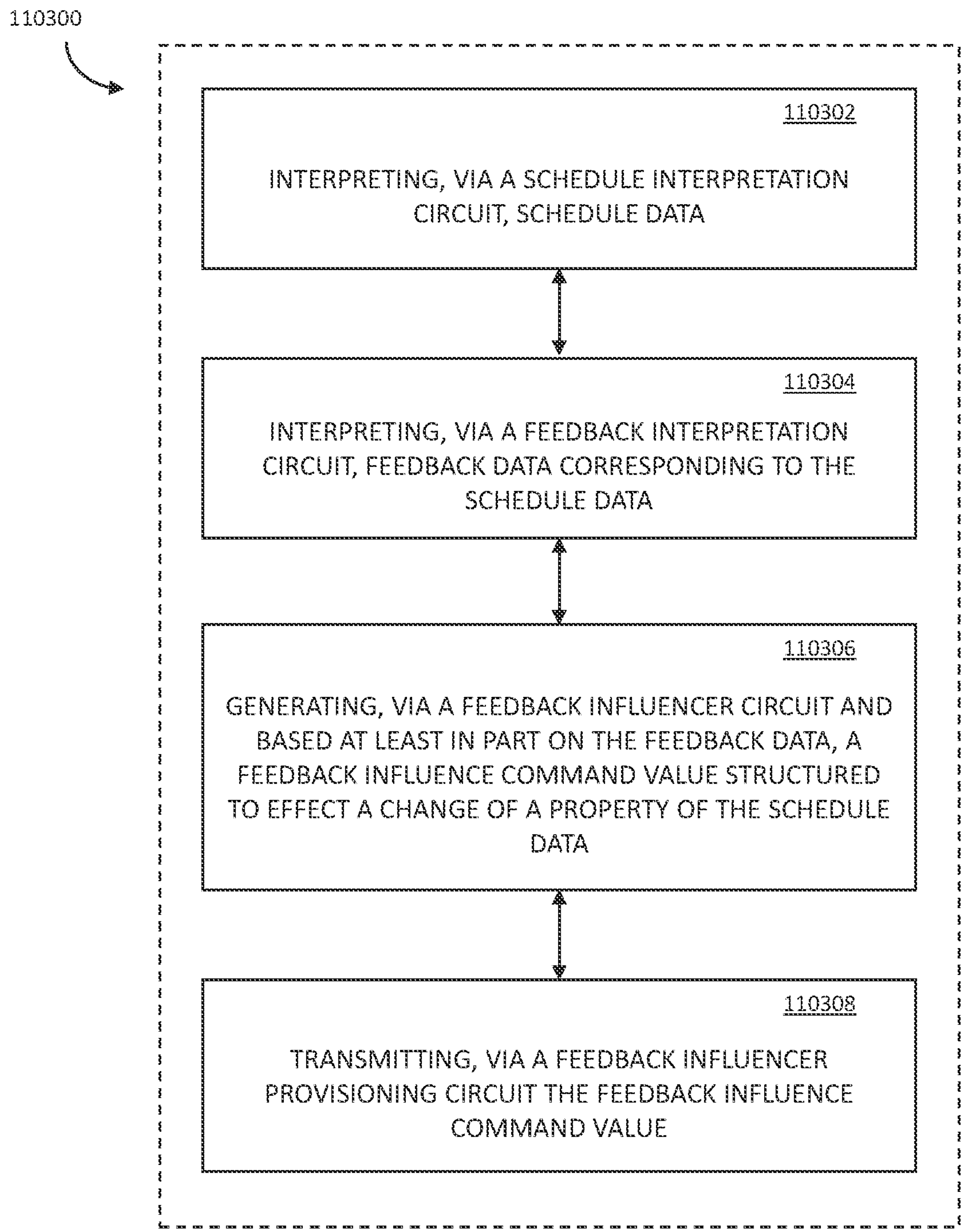
FIG. 61 is a flowchart depicting a method for responsive scheduling, in accordance with an embodiment of the current disclosure.

Referring to FIG. 61, a method 110300 for responsive scheduling, in accordance with embodiments of the current disclosure, is shown. The method 110300 may be performed via apparatus 110100 and/or any other computing device disclosed herein. The method 110300 includes interpreting 110302, via a schedule interpretation circuit, schedule data; interpreting 110304, via a feedback interpretation circuit, feedback data corresponding to the schedule data; generating 110306, via a feedback influencer circuit and based at least in part on the feedback data, a feedback influence command value structured to effect a change of a property of the schedule data; and transmitting 110308, via a feedback influencer provisioning circuit the feedback influence command value.

Figure 62:
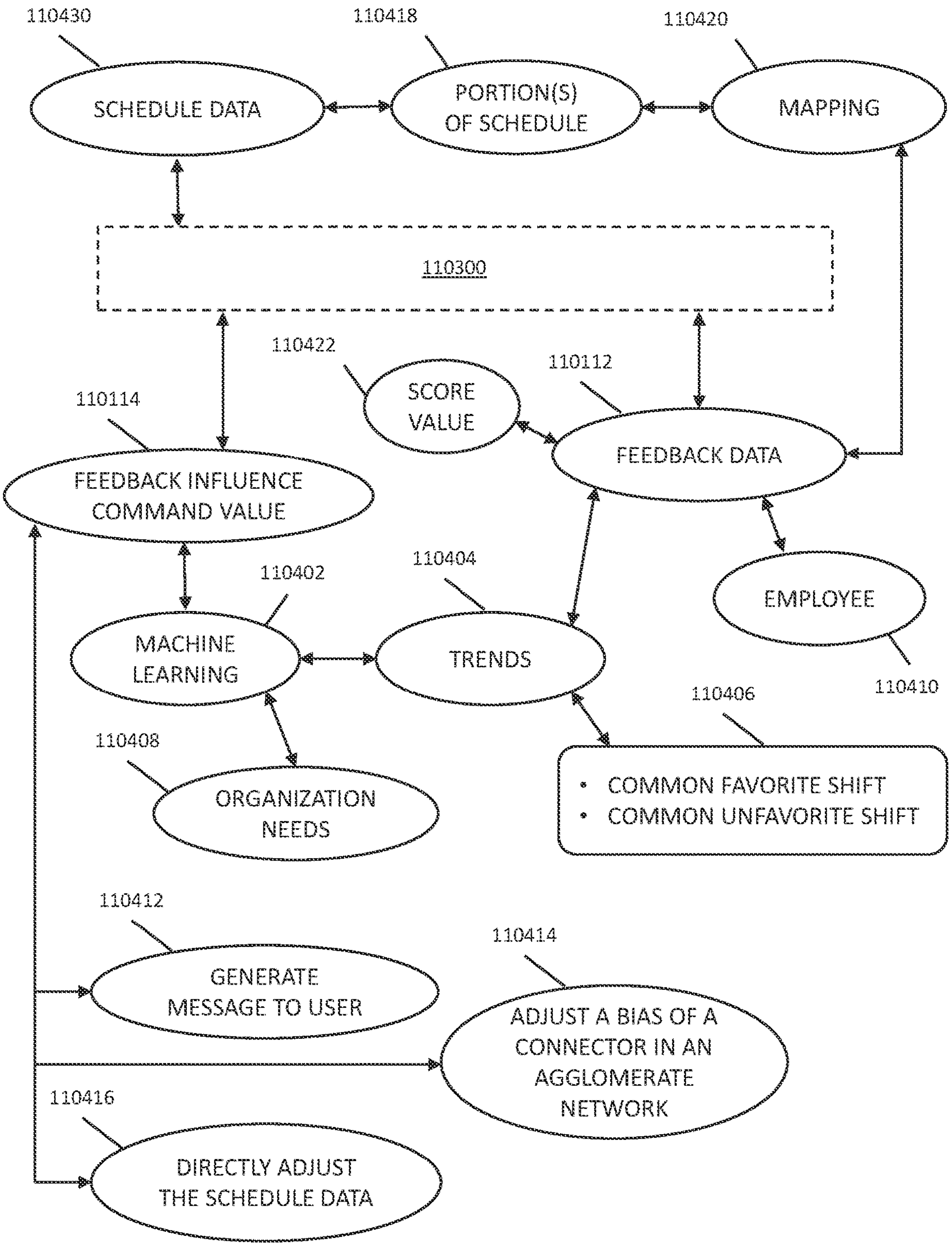
FIG. 62 is a flowchart depicting certain further aspects of a method for responsive scheduling, in accordance with an embodiment of the current disclosure.

Referring to FIG. 62, certain further aspects of the method 110300 are described following, any one or more of which may be present in certain embodiments. For example, the feedback influencer circuit generates the feedback influence command value 1100114 based at least in part on machine learning 110402. The machine learning extracts trends 110404 from the feedback data 110112, and the trends are used to generate the feedback influence command value. The trends may include a common favorite shift or a common unfavorite shift 110406. The feedback influencer circuit generates the feedback influence command value by balancing the extracted trends with needs of an organization 110408. The feedback data corresponds to employees 110410 that operated under a schedule defined, in part, by schedule data 110430. The feedback influence command value is structured to generate a message to a user 110412. The feedback influence command value is structured to adjust a bias of a connector in an agglomerate network 110414. The feedback influence command value is structured to directly adjust the schedule data 110416. The schedule data corresponds to a portion of a schedule 110418 that is less than the entire schedule. Each of a plurality of distinct portions of the feedback data are mapped 110420 to a corresponding distinct portion of the schedule data. Each of the plurality of distinct portions of the feedback data represent a score value 110422.

Figure 63:
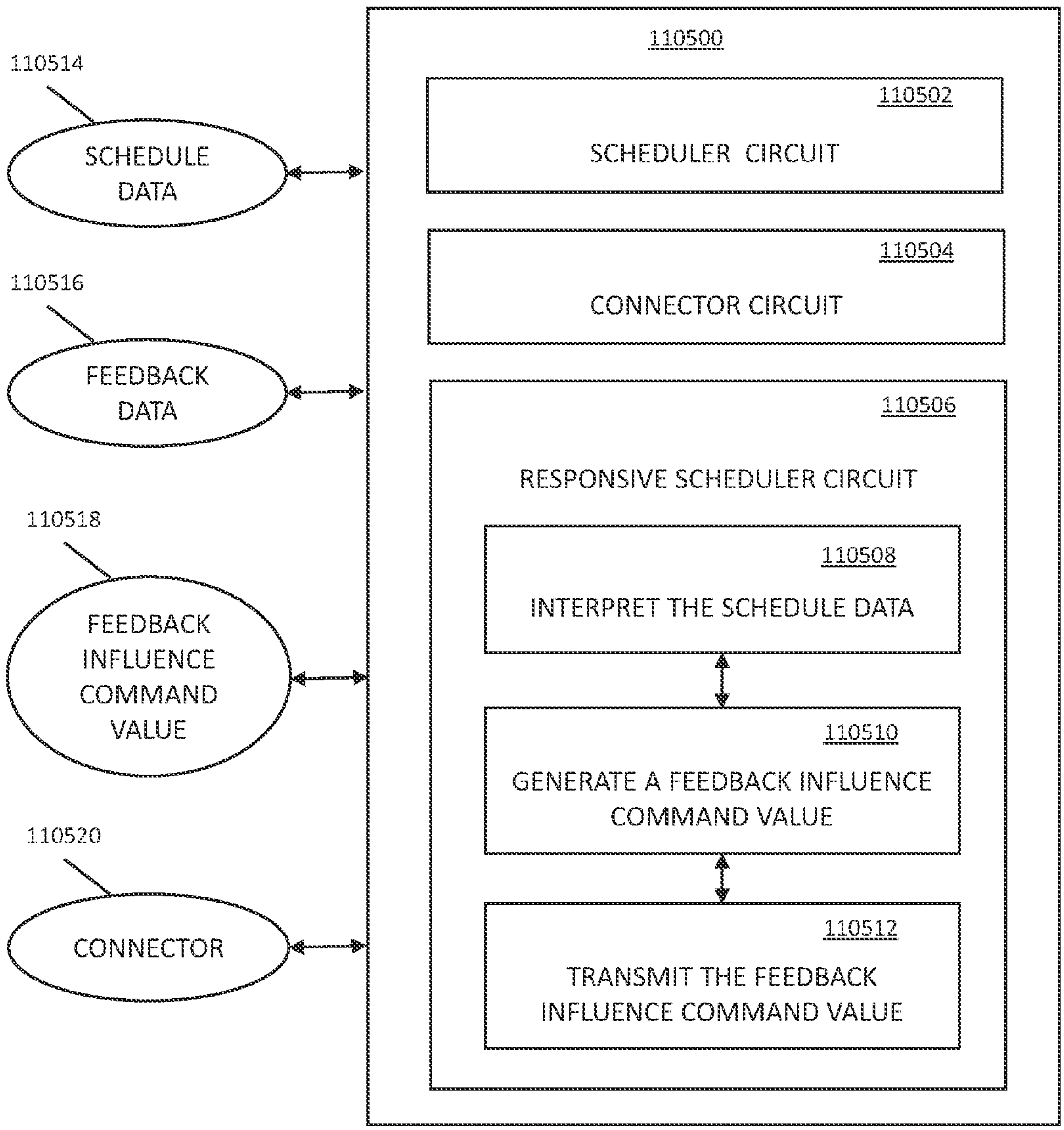
FIG. 63 is a schematic diagram depicting an agglomerate network for responsive scheduling, in accordance with an embodiment of the current disclosure.

FIG. 63 depicts an agglomerate network 110500 for generating schedule data, in accordance with embodiments of the current disclosure, that provides for responsive scheduling. The agglomerate network 110500 includes a scheduler circuit 110502 structured to output the schedule data 110514; and a connector circuit 110504 structured to adjust at least one of an input to the scheduler circuit and/or the schedule data outputted by the scheduler circuit. The agglomerate network 110500 further includes a responsive scheduler circuit 110506 structured to: interpret 110508 the schedule data; generate 110510, based at least in part on feedback data 110516, a feedback influence command value 110518 structured to trigger an adjustment to a connector 110520. The adjustment is structured to effect a change of at least one of the input to the scheduler circuit or the schedule data outputted by the scheduler circuit. The responsive scheduler circuit 110506 is further structured to transmit 110512 the feedback influence command value 110114.

Figure 64:
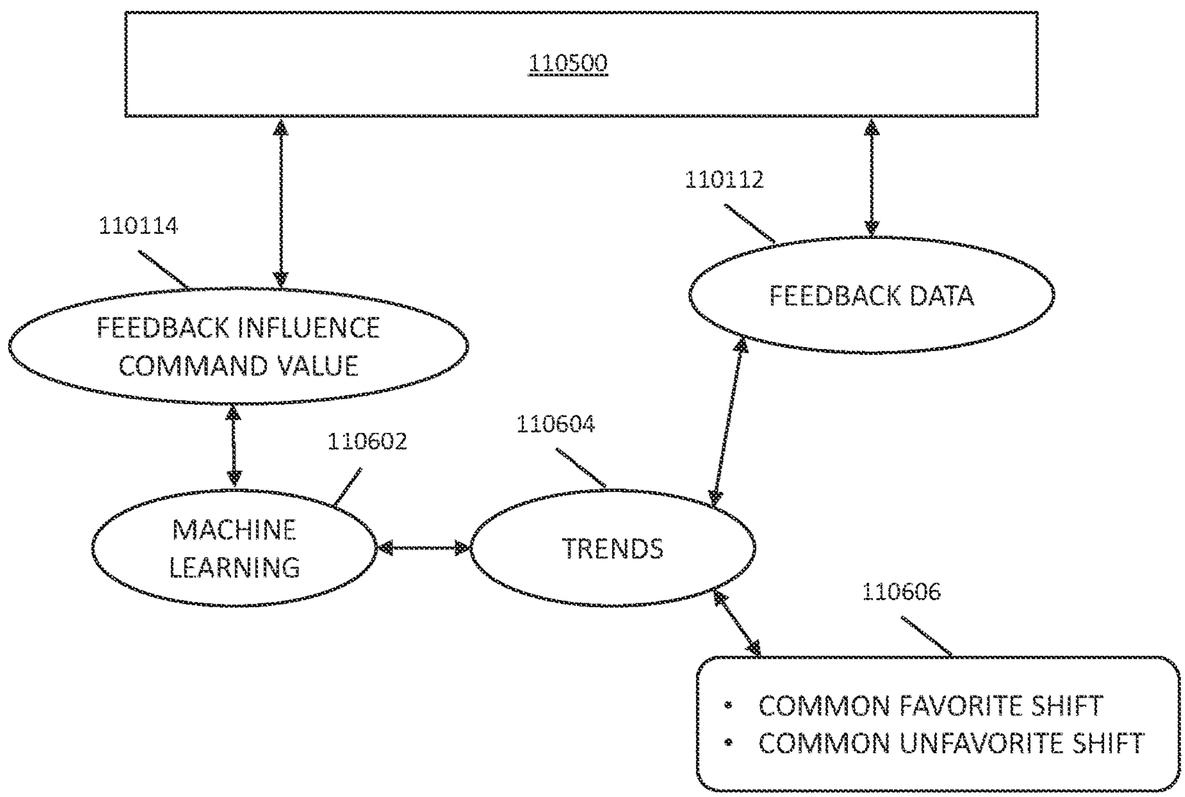
FIG. 64 is a schematic diagram depicting certain further aspects of an agglomerate network for responsive scheduling, in accordance with an embodiment of the current disclosure.

Referring to FIG. 64, certain further aspects of the agglomerate network 110500 for generating schedule data are described following, any one or more of which may be present in certain embodiments. As shown, the responsive scheduler circuit 110506 may generate the feedback influence command value 110114 based at least in part on machine learning 110602. In embodiments, the machine learning extracts trends 110604 from the feedback data 110112, and the trends may be used to generate the feedback influence command value 110114. The trends may include one or more of a common favorite shift or a common unfavorite shift 110606.

Figure 65:
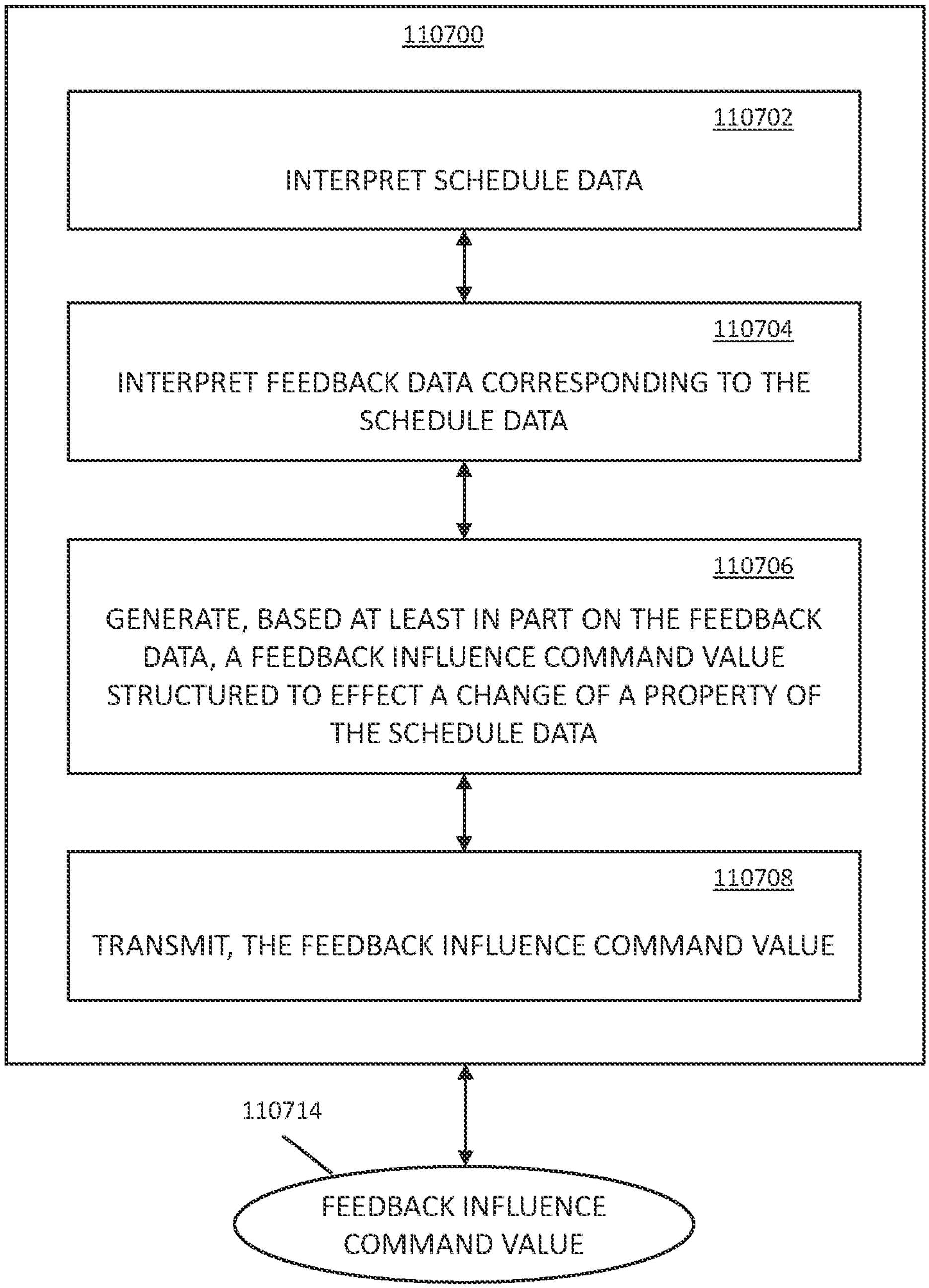
FIG. 65 is a block diagram depicting a non-transitory computer-readable medium for responsive scheduling, in accordance with an embodiment of the current disclosure.

Referring to FIG. 65, a non-transitory computer-readable medium 110700 in accordance with embodiments of the current disclosure is shown. The non-transitory computer-readable medium 110700 stores instructions that adapt at least one processor to: interpret schedule data 110702; interpret feedback data 110704 corresponding to the schedule data; generate 110706, based at least in part on the feedback data, a feedback influence command value 110714. The responsive scheduler circuit 110506 may be structured to effect a change of a property of the schedule data, as disclosed herein. The stored instructions further adapt the at least one processor to transmit the feedback influence command value 110708.

Figure 66:
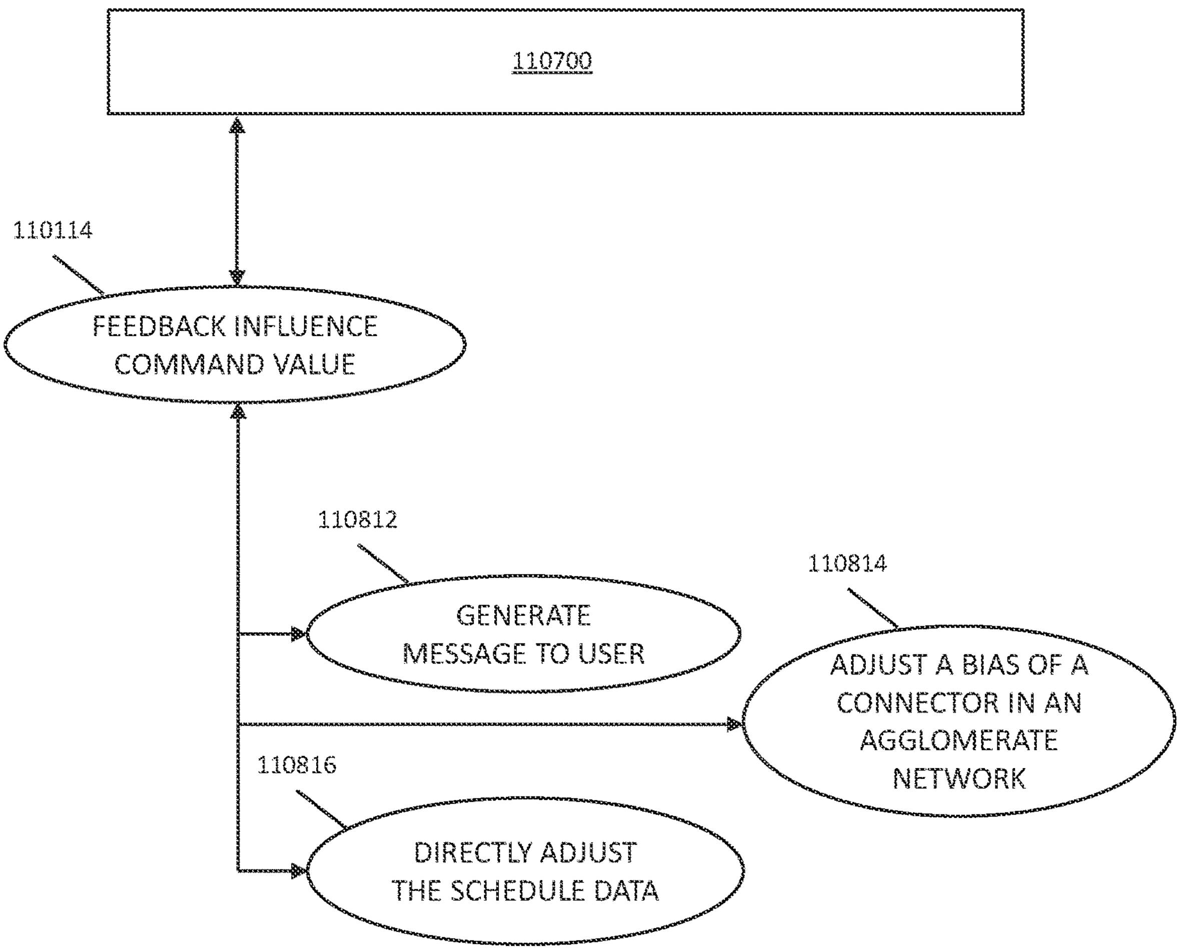
FIG. 66 is a block diagram depicting certain further aspects of a non-transitory computer-readable medium for responsive scheduling, in accordance with an embodiment of the current disclosure.

Referring to FIG. 66, certain further aspects of the non-transitory computer-readable medium 110700 are described following, any one or more of which may be present in certain embodiments. For example, in embodiments, the feedback influence command value 110114 may be structured to generate a message to a user 110812. In embodiments, the feedback influence command value 110114 may be structured to adjust a bias of a connector, as disclosed herein, in an agglomerate network 110814. The feedback influence command value 110114 may be structured to directly adjust the schedule data 110816, as disclosed herein.

Figure 67:
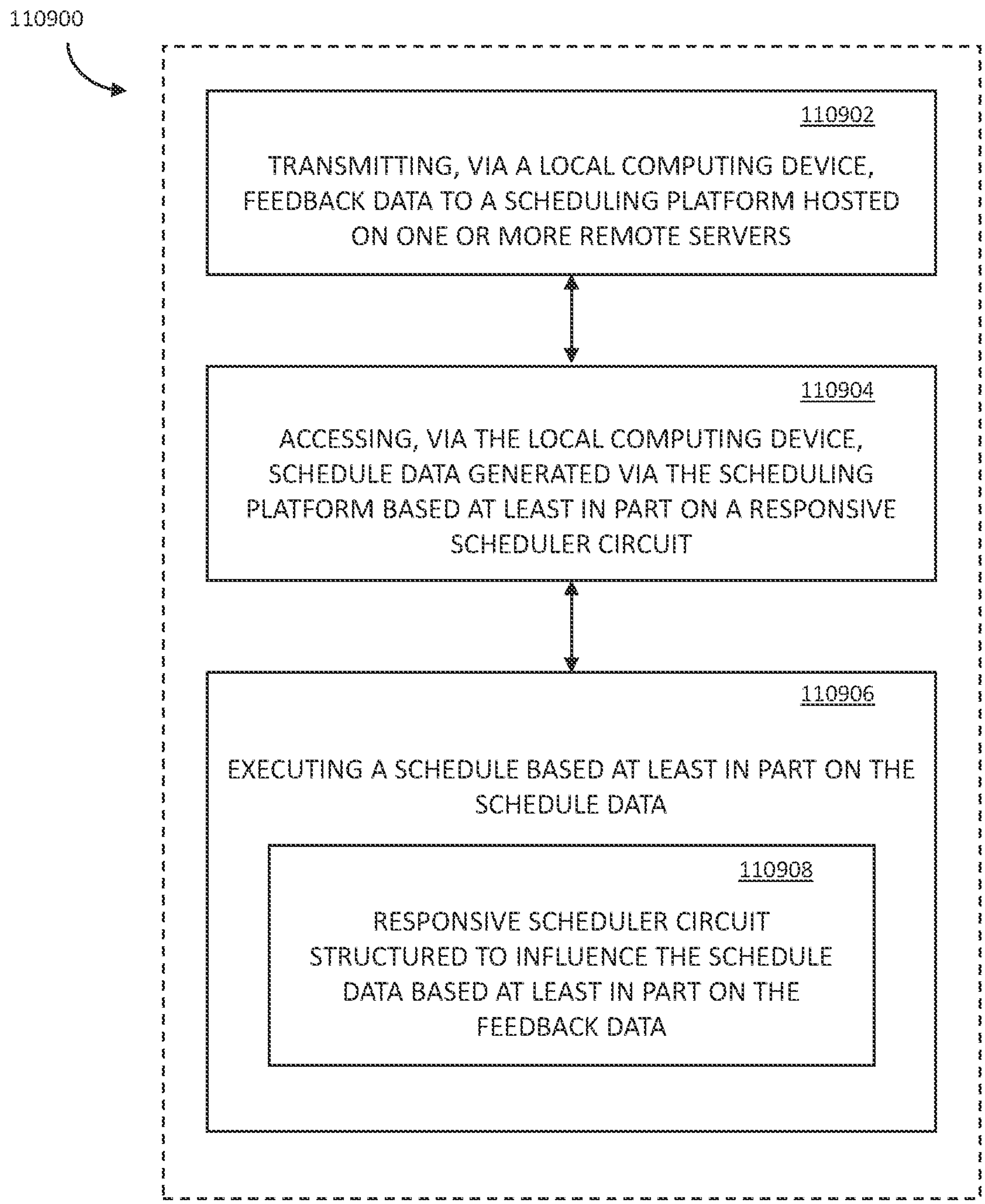
FIG. 67 is a flowchart depicting a method for responsive scheduling, in accordance with an embodiment of the current disclosure.

FIG. 67 illustrates a method 110900 for responsive scheduling in accordance with embodiments of the current disclosure. The method 110900 includes transmitting 110902, via a local computing device, feedback data to a scheduling platform hosted on one or more remote servers. The method 110900 further includes accessing 110904, via the local computing device, schedule data generated via the scheduling platform based at least in part on a responsive scheduler circuit. The method 110900 further executing 110906 a schedule based at least in part on the schedule data; wherein the responsive scheduler circuit is structured to influence 110908 the schedule data based at least in part on the feedback data.

Figure 68:
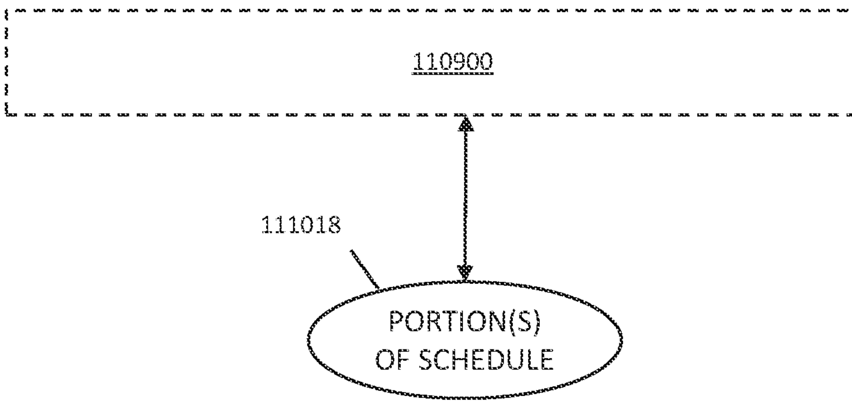
FIG. 68 is a flowchart depicting certain further aspects of a method for responsive scheduling, in accordance with an embodiment of the current disclosure.

Referring to FIG. 68, certain further aspects of the method 110900 are described following, any one or more of which may be present in certain embodiments. For example, the schedule data corresponds to a portion of a schedule 111018 that is less than the entire schedule.

Over-time, and across companies where personal privacy selections and legal agreements allow, the system may train an atomic absenteeism model to an individual employee. When compared to predictions based on similar shift conditions & employee characteristics, their actual on-time arrival, absenteeism rate is used to retrospectively train the model.

Embodiments of the system may also provide for schedule mimicking, e.g., generation of a number of different schedules that are similar to human generated schedules and/or the copying and/or imitation of portions of a first schedule when generating and/or adjusting a second schedule. Schedule mimicking may be performed as part of modules/components 126 and 128 (FIG. 1). Received selections from the generated schedules may be used as feedback for algorithm refinement. Such mimicking may also be with respect to portions of a schedule. Mimicking may be based on user feedback, e.g., some employees like aspects of a particular schedule while other employees like aspects of another schedule. As such, embodiments of the system, as described herein, may mimic sub portion(s) of one or more schedules that different people like. Embodiments of the system, as described herein, may also mimic liked aggregations or implications from schedules (hours or average or standard deviation (SD) of seniority (small SD for peak demand, high SD for max education etc.)). As will be understood, a manager may gain trust and/or eventually come to rely on embodiments of the system, as described herein, or the manager is able to see that the system is producing schedules similar to and/or improved over ones previously produced by the manager.

In embodiments, computer generated schedules, as disclosed herein, may be purposefully designed/generated to be similar to human generated schedules and/or portions thereof. In other words, embodiments of the current disclosure provide for computerized apparatuses and methods that mimic schedules created manually by humans, e.g., department managers. As will be appreciated, mimicking the style and/or preferences of a human by a computerized apparatus and/or method, as disclosed herein, may provide for such an apparatus and/or method to generate a schedule that accounts for information that may be undocumented, e.g., not recorded in a database and/or other computerized storage system, and/or generally unknown outside of the human that generated the schedule. In other words, embodiments of the current disclosure provide for apparatuses and methods that are better able to account for undocumented information with respect to generating a schedule for an entity, as compared to systems and/or approaches that may only consider documented information.

As will be understood, the generated schedules may be used as feedback for further schedule generation and refinement. Embodiments may provide for a human manager to see that the computerized system is producing schedules comparable to their own, which may help to improve the manager's trust in the system. Embodiments may mimic different schedule portions that have been liked by different employees in the same schedule. For example, embodiments may mimic "liked" aggregations, aspects and/or implications from schedules, e.g., hours, average or standard deviation (SD) of seniority (small SD for peak demand, high SD for max education, etc.). As such, embodiments of the current disclosure may be incorporated with aspects of a schedule spreader and/or a responsive scheduler, as disclosed herein.

Embodiments of schedule mimicking may be a module/circuit/model that receives inputs, e.g., a schedule and/or other data, e.g., biases, as: direct input, i.e., the schedule mimicking module/circuit/model acts as a standalone module/circuit/model; as direct input to an agglomerate network, i.e., without use of connectors; and/or from connectors, i.e., the schedule mimicking module is one of a plurality of modules/circuits/models within an agglomerate network. For example, schedule mimicking may take the form of a schedule generation module/circuit/model within an agglomerate network that passes its output (schedule data) to other modules in the agglomerate network for evaluation where the other modules generate output(s), e.g., a bias. The other modules may, in turn, feed the output back into the schedule mimicking module/circuit/model to form a feedback loop which tries to reach equilibrium and/or optimization of various biases in the agglomerate network while keeping the generated schedules comparable to ones generated by managers. The connections between the schedule mimicking module and the various other modules of the agglomerate network may be accomplished via connectors.

Figure 69:
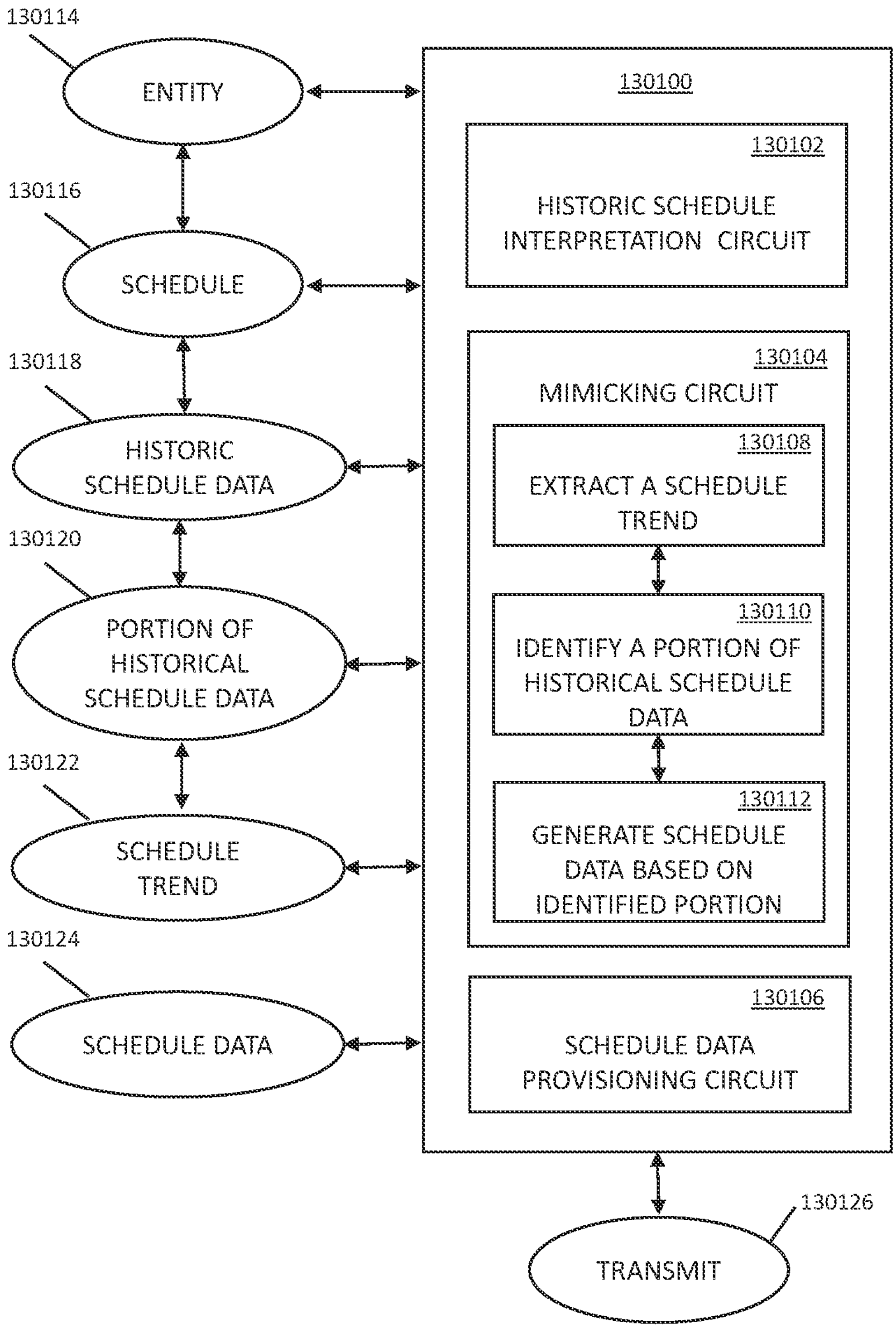
FIG. 69 is a schematic diagram depicting an apparatus for schedule mimicking, in accordance with embodiments of the current disclosure.

Accordingly, FIG. 69 illustrates an apparatus 130100 for schedule mimicking, in accordance with embodiments of the current disclosure. The apparatus 130100 includes a historic schedule interpretation circuit 130102 structured to interpret historical schedule data 130118 corresponding to a schedule 130116 designed, in part, by an entity 130114, e.g., an employee, a manager, a department, an organization, and the like. The apparatus 130100 further includes a mimicking circuit 130104 structured to: extract 130108 a schedule trend 130122 from the historical schedule data; identify 130110 a portion 130120 of the historic schedule data corresponding to the extracted schedule trend; and generate 130112 schedule data 130124 based at least in part on the identified portion. The apparatus 130100 further includes a schedule data provisioning circuit 130106 structured to transmit 130126 the schedule data. Non-limiting examples of historical schedule data 130118 include digital representations of schedules, e.g., such as electronic calendar file types, e.g., ".ics", ".ifb", and/or the like. Further non-limiting examples of historical schedule data 130118 may relate to a schedule, a total number of shifts that must be filled, an entity, e.g., a corporation and/or department for which the schedule is for, and the like. The portion 130120 of the historic schedule data may correspond to a shift, a group of shifts, a day, week, month, year, etc., a subset of available employees, one or more locations associated with the schedule, etc. Non-limiting examples of schedule trends 130122 include: an average shift length; an average shift starting time; and average shift end time; an average number of workers per shift; one or more groupings of employees across one or more shifts; an average time between shifts for an employee; and/or the like. The portion of the schedule data being mimicked may be less than the entire schedule data.

Figure 70:
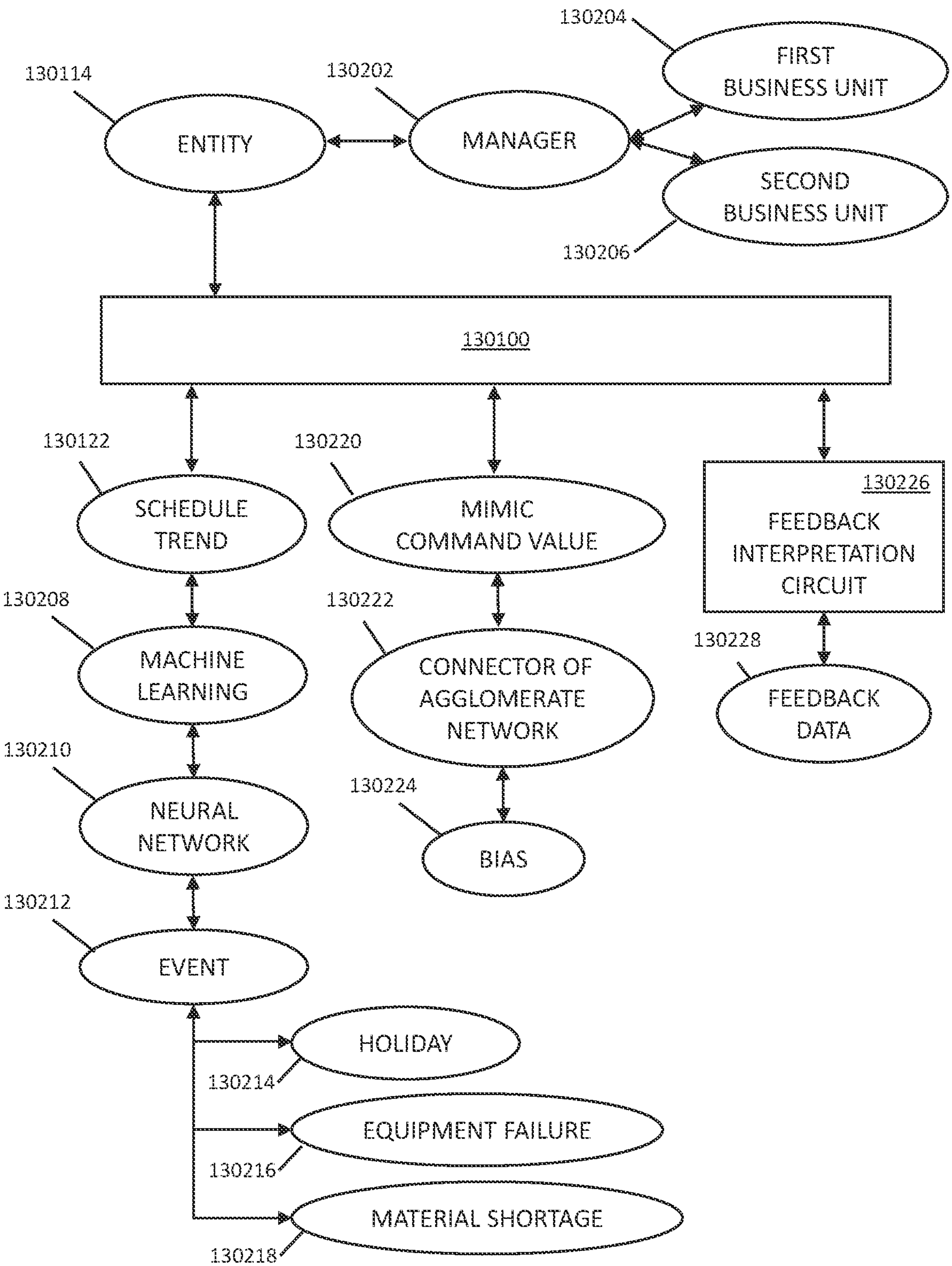
FIG. 70 is a schematic diagram depicting certain further aspects of an apparatus for schedule mimicking, in accordance with embodiments of the current disclosure.

Referring to FIG. 70, certain further aspects of the apparatus 130100 are described following, any one or more of which may be present in certain embodiments. For example, the entity 130114 may be a manager 130202 of a business unit 130204, 130206 to which the schedule data corresponds. Non-limiting examples of a business unit 130204, 130206 include: teams, departments, divisions, etc. In embodiments, the entity 130114 may be a manager 130202 of a first business unit 130204 distinct from a second business unit 130206, and the schedule data 130124 corresponds to the second business unit 130206. As will be understood, such embodiments provide for successful schedules to be copied/shared across business units in an organization. In embodiments, the first business unit 130204 and the second business unit 130206 are in a same organization. In embodiments, the first business unit 130204 and the second business unit 130206 are in distinct organizations. As will be appreciated, such embodiments provide for successful schedules to be copied/shared across different businesses.

The extraction of the schedule trend 130122 may be based at least in part on machine learning 130208, which may involve a neural network 130210 trained to match a portion of the schedule data with an event 130212. In such embodiments, generation of the schedule data may be based at least in part on an association of the matched portion and schedule trend. Non-limiting examples of events 130212 include: a holiday 130214, inclement weather, an equipment failure 130216, a shortage 130218 of materials or product for sale, and/or the like. As will be appreciated, such embodiments provide for mimicking of a manager's scheduling style for a holiday season and/or during austere events, as disclosed herein.

In embodiments, the mimic command value 130220 is structured to generate a message that conveys how to structure a portion of a schedule. Non-limiting examples of the message include a textual description, a visual depiction of a schedule, and/or audio instructions. The message may identify which portions of a prior schedule are being mimicked and/or a supporting reason for the mimicking, e.g., workers provided positive feedback on the portion being mimicked and/or positive feedback on a manager whose scheduling style is being mimicked.

In embodiments, the mimic command value is structured to adjust a connector circuit of an agglomerate network 130222, as disclosed herein. The adjustment to the connector circuit can be structured to set or change a bias 130224 of the connector circuit. For example, the bias 130224 may control a weighing that affects how much contribution a prior schedule (being mimicked) will contribute to a schedule generated by a scheduler circuit, as disclosed herein.

In embodiments, the apparatus 130100 further interprets second historical schedule data and mimics portions of both the first and second historical schedule data. In other words, embodiments of the apparatus 130100 may mimic different portions of different schedules.

In embodiments, the apparatus 130100 further includes a feedback interpretation circuit 130226 structured to interpret feedback data 130228 on the schedule data, e.g., embodiments of the apparatus 130100 may incorporate aspects of a responsive scheduler, e.g., apparatus 110100 (FIG. 59), as disclosed herein.

Non-limiting examples of feedback data 130228 include employee surveys on the schedule, "likes" or "dislikes" provided via a social media (public or private) platform, and/or the like. In such embodiments, the extracted schedule trend may be based at least in part on the feedback data. For example, the extracted trend may be a commonly liked portion of the historic schedule data. The commonly liked portion of the historic schedule data may correspond to an aggregation or an implication of the schedule data, e.g.: a total number of hours worked and/or pay per shift, day, week, month, year, etc.; a total amount of vacation time; a minimum shift staffing number, and/or the like. In embodiments, the aggregation relates to at least one of hours worked, an average deviation, or a standard deviation. In embodiments, the extracted trend may be a highly rated portion of the historic schedule data. The aggregation may further relate to seniority state and/or a pay value.

Figure 71:
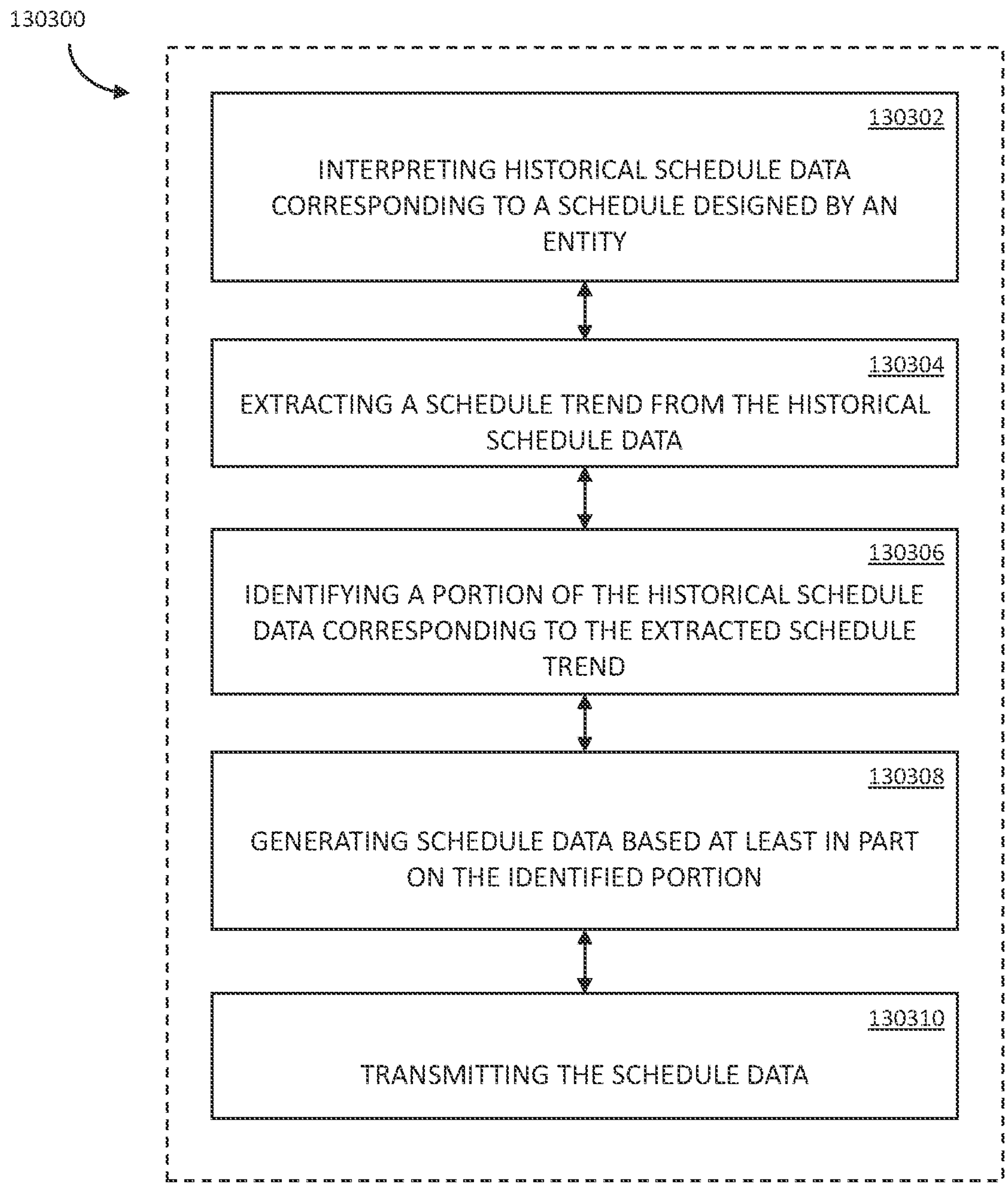
FIG. 71 is a flowchart depicting a method for schedule mimicking, in accordance with embodiments of the current disclosure.

Referring to FIG. 71, a method 130300 for schedule mimicking, in accordance with embodiments of the current disclosure, is provided. The method 130300 may be performed via apparatus 130100 and/or any other computing device disclosed herein. The method 130300 includes interpreting, via a historic schedule interpretation circuit, historical schedule data corresponding to a schedule designed, in part, by an entity 130302; extracting, via a mimicking circuit, a schedule trend from the historical schedule data 130304; identifying, via the mimicking circuit, a portion of the historical schedule data corresponding to the extracted schedule trend 130306; generating, via the mimicking circuit, schedule data based at least in part on the identified portion 130308; and transmitting, via a schedule data provisioning circuit, the schedule data 130310.

Figure 72:
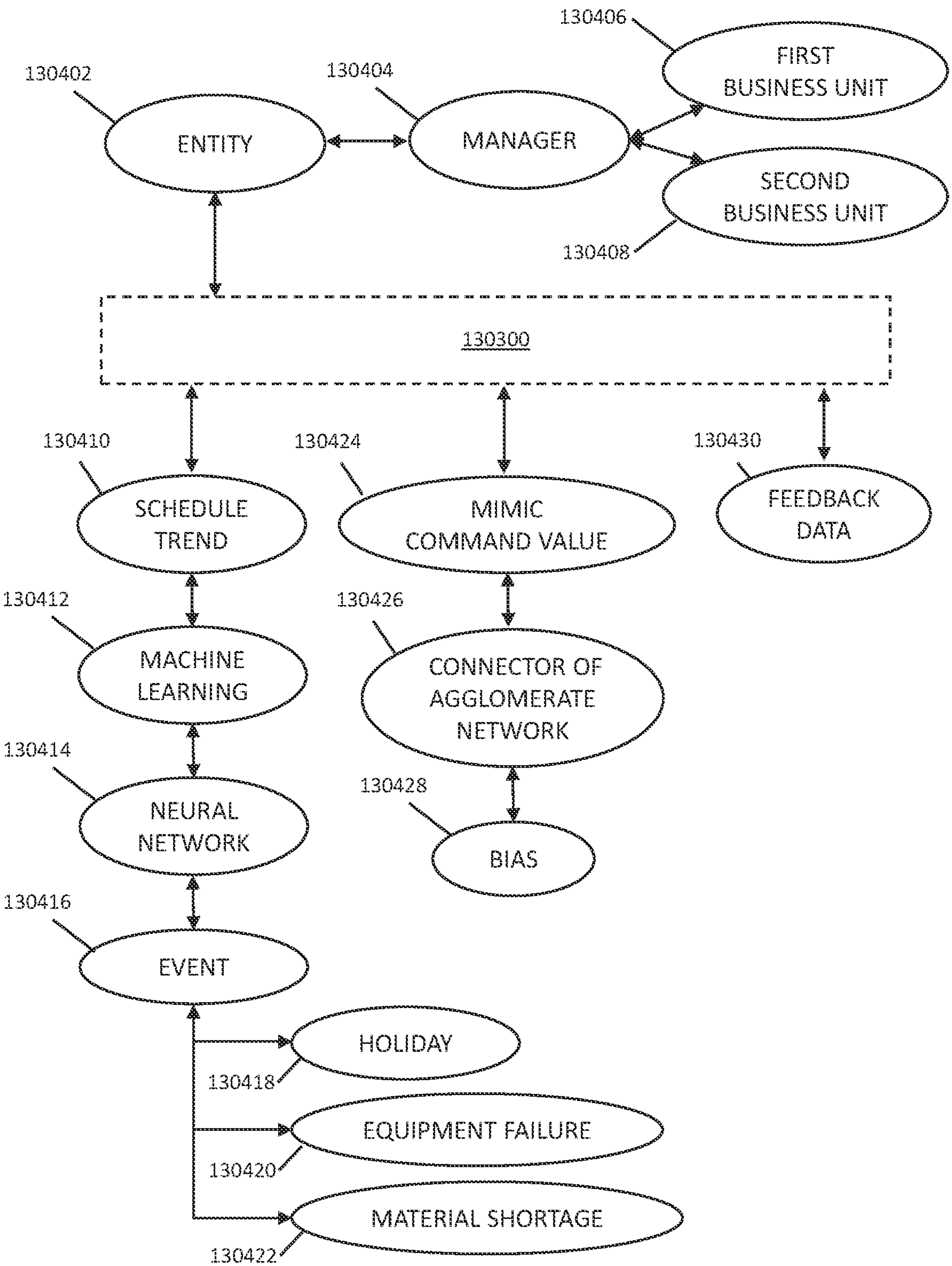
FIG. 72 is a flowchart depicting certain further aspects of a method for schedule mimicking, in accordance with embodiments of the current disclosure.

Turning to FIG. 72, certain further aspects of the method 130300 are described following, any one or more of which may be present in certain embodiments. For example, the entity 130402 may be a manager 130404 of a business unit 130406, 130408 to which the schedule data corresponds. The entity 130402 may be a manager of a first business unit 130406 distinct from a second business unit 130408, and the schedule data corresponds to the second business unit 130408. The first business unit 130406 and the second business unit 130408 may be in a same organization. The first business unit 130406 and the second business unit 130408 may be in distinct organizations. In embodiments, extraction of the schedule trend 130410 is based at least in part on machine learning 130412. The machine learning may involve a neural network 130414 trained to match a portion of the schedule data with an event 130416. In such embodiments, generation of the schedule data is based at least in part on an association of the matched portion and schedule trend. As discussed herein, non-limiting examples of events include: a holiday 130418, inclement weather, an equipment failure 130420, a shortage 130422 of materials or product for sale, and/or the like.

In embodiments, generating, via the mimicking circuit, schedule data based at least in part on the identified portion 130308 may include generating a mimic command value 130424 structured to generate a message that conveys how to structure a portion of a schedule. In embodiments, the mimic command value is structured to adjust a connector circuit of an agglomerate network 130426, where the adjustment is structured to set or change a bias 130428 of the connector circuit. In embodiments, the portion of the schedule data is less than the entire schedule data. The method 130300 may further include interpreting second historical schedule data and mimicking portions of both historical schedule data. The method 130300 may further include interpreting, via a feedback interpretation circuit, feedback data 130430 on the schedule data, wherein the extracted schedule trend is based at least in part on the feedback data. As discussed herein, the extracted trend may be a commonly liked portion of the schedule data. The commonly liked portion of the schedule data may correspond to an aggregation or an implication of the schedule data. In embodiments, the aggregation may relate to at least one of hours worked, an average deviation, or a standard deviation. The extracted trend may be a highly rated portion of the schedule data. In embodiments, the aggregation further relates to seniority state or a pay value.

Figure 73:
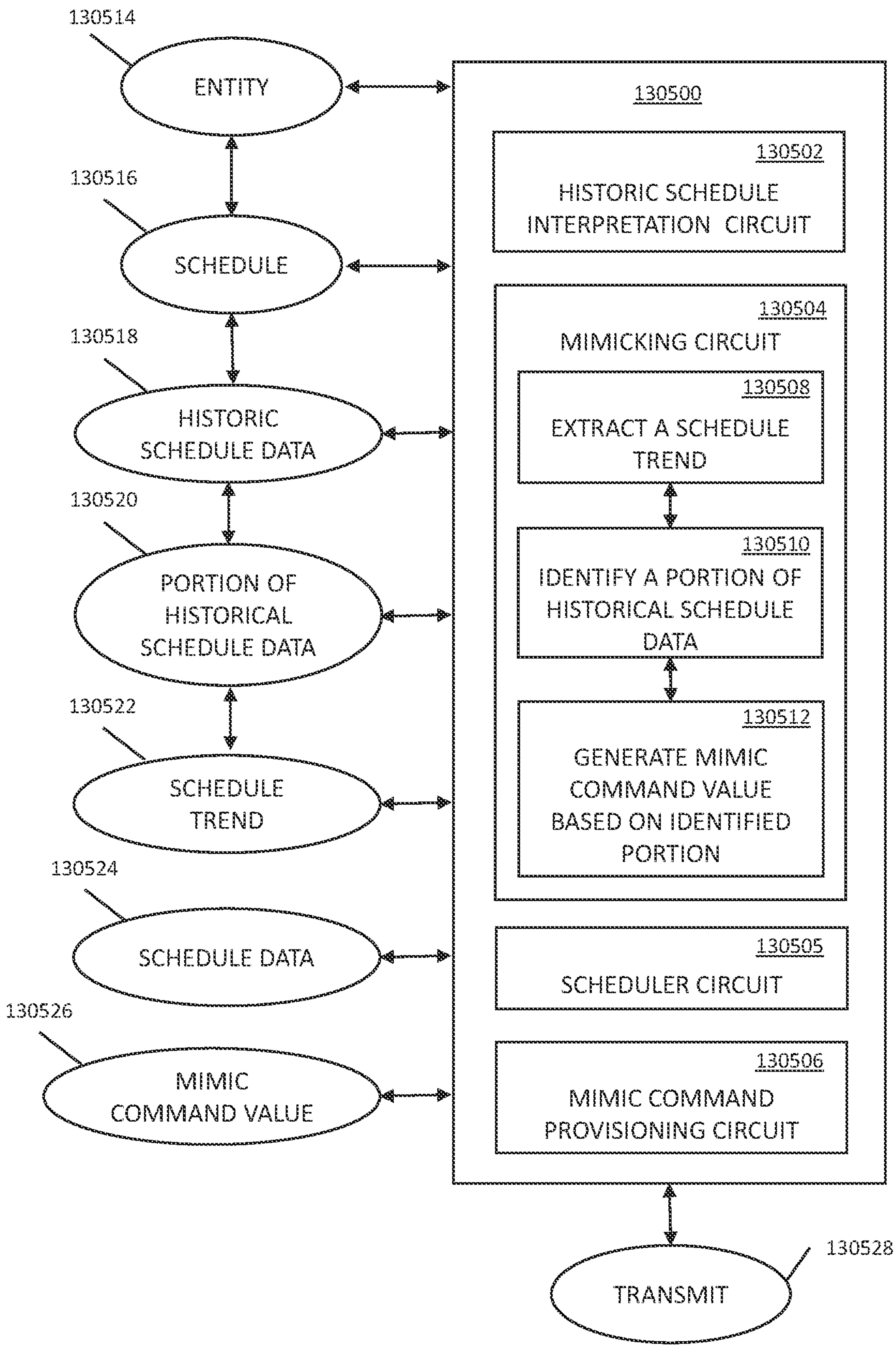
FIG. 73 is a schematic diagram depicting an apparatus for schedule mimicking, in accordance with embodiments of the current disclosure.

FIG. 73 depicts another apparatus 130500 for schedule mimicking, in accordance with embodiments of the current disclosure. The apparatus 130500 includes a historic schedule interpretation circuit 130502 structured to interpret historical schedule data 130518 corresponding to a schedule 130516 designed, in part, by an entity 130514. The apparatus 130500 further includes a mimicking circuit 130504 structured to: extract 130508 a schedule trend 130522 from the historical schedule data; identify 130510 a portion 130520 of the historical schedule data corresponding to the extracted schedule trend; and generate 130512 a mimic command value 130526 based at least in part on the identified portion. The mimic command value is structured to trigger an adjustment to schedule data 130524 generated by a scheduler circuit 130505. The apparatus 130500 further includes a mimic command provisioning circuit 130506 structured to transmit 130528 the mimic command value.

Figure 74:
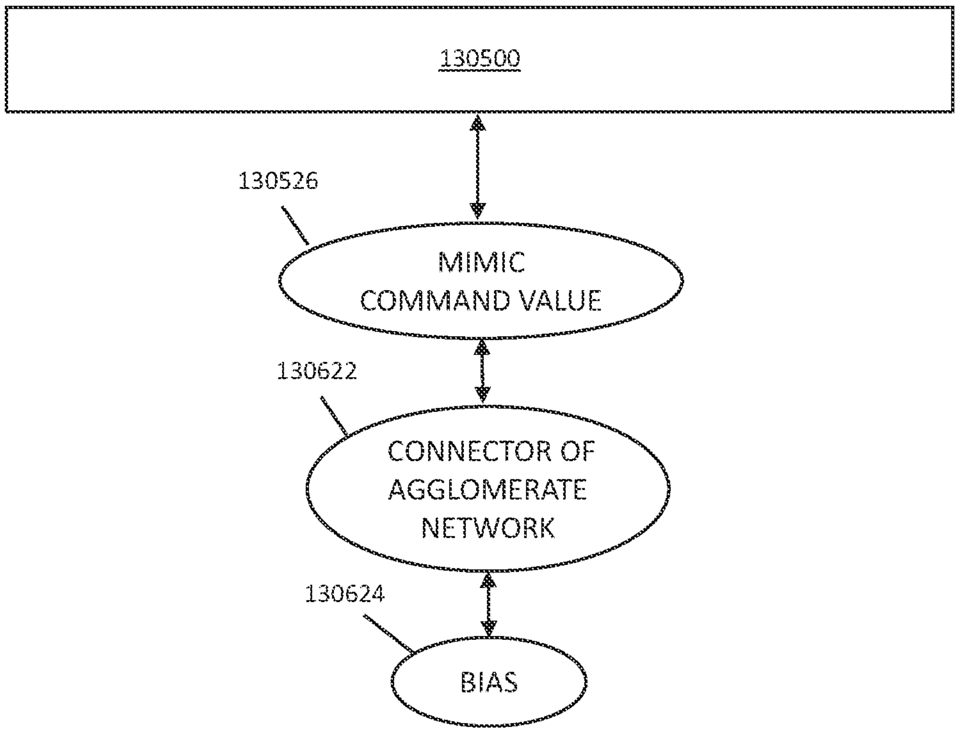
FIG. 74 is a schematic diagram depicting certain further aspects of an apparatus for schedule mimicking, in accordance with embodiments of the current disclosure.

Referring to FIG. 74, certain further aspects of the apparatus 130500 are described following, any one or more of which may be present in certain embodiments. For example, the mimic command value 130526 may be structured to generate a message that conveys how to structure a portion of a schedule, as disclosed herein. In embodiments, the mimic command value may be structured to adjust a connector circuit of an agglomerate network 130622, as further disclosed herein. The adjustment to the connector circuit may be structured to set or change a bias 130624 of the connector circuit.

Figure 75:
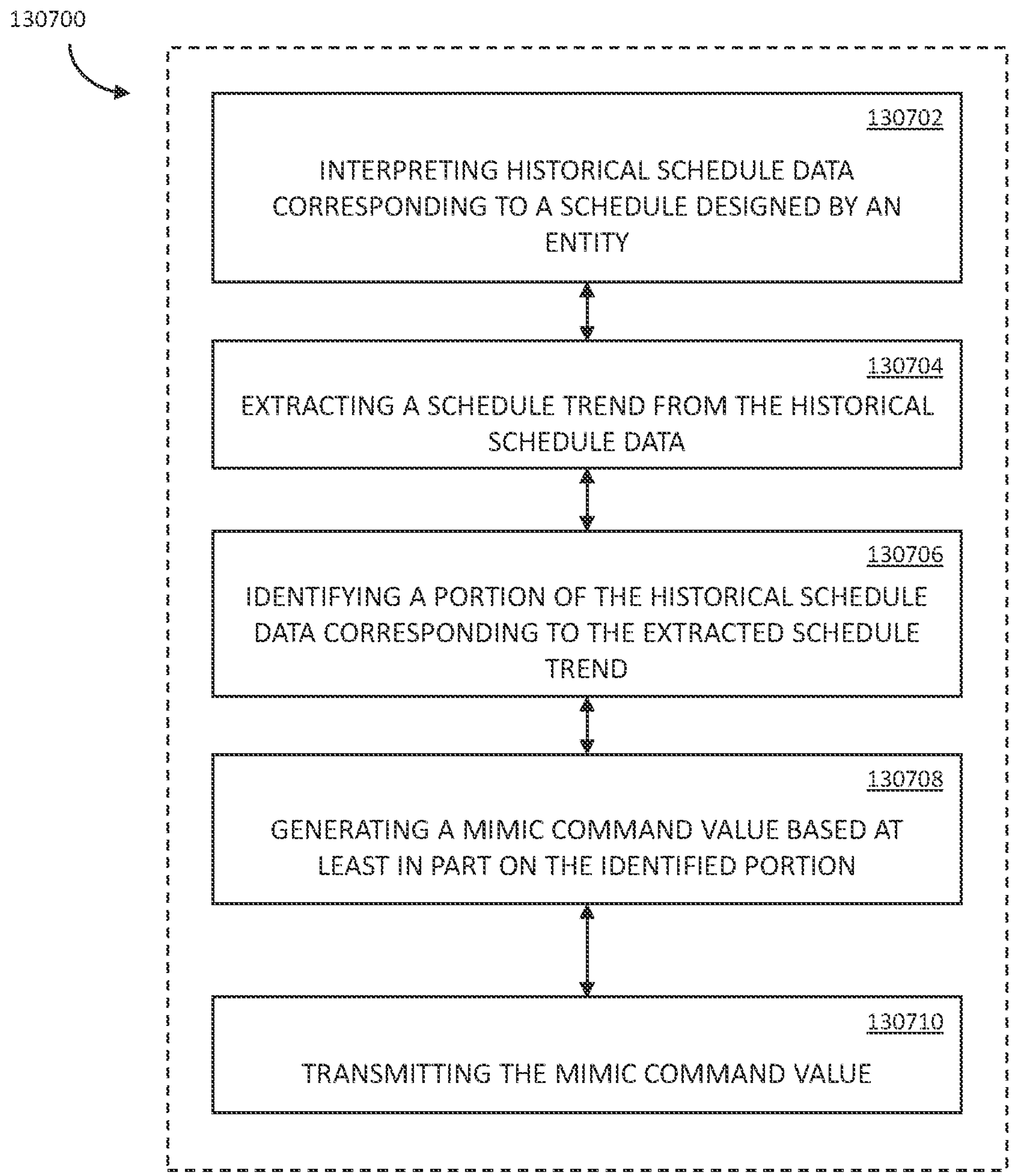
FIG. 75 is a flowchart depicting a method for schedule mimicking, in accordance with embodiments of the current disclosure.

Referring to FIG. 75, a method 130700 for schedule mimicking, in accordance with embodiments of the current disclosure, is provided. The method 130700 may be performed via apparatus 130500 and/or any other computing device disclosed herein. The method 130700 includes interpreting 130702, via a historic schedule interpretation circuit, historical schedule data corresponding to a schedule designed, in part, by an entity. The method 130700 further includes extracting 130704, via a mimicking circuit, a schedule trend from the historical schedule data. The method 130700 further identifying 130706, via the mimicking circuit, a portion of the historical schedule data corresponding to the extracted schedule trend. The method 130700 further includes generating 130708, via the mimicking circuit, a mimic command value based at least in part on the identified portion, wherein the mimic command value is structured to trigger an adjustment to schedule data generated by a scheduler circuit. The method 130700 further includes transmitting 130710, via a mimic command provisioning circuit, the mimic command value.

Figure 76:
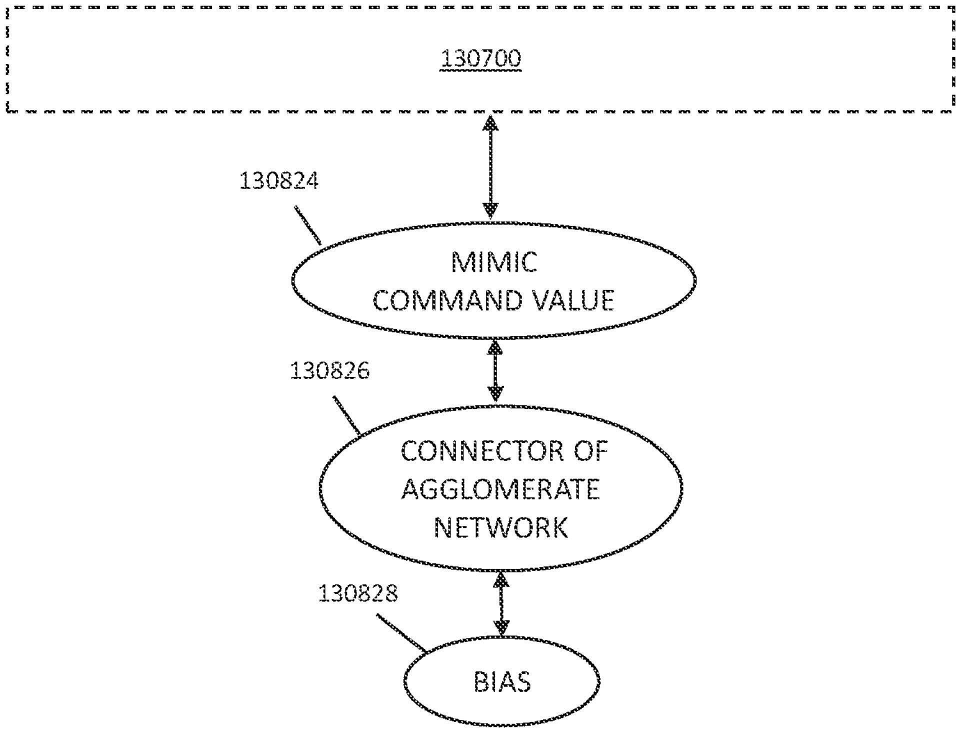
FIG. 76 is a flowchart depicting certain further aspects of a method for schedule mimicking, in accordance with embodiments of the current disclosure.

Referring to FIG. 76, certain further aspects of the method 130700 are described following, any one or more of which may be present in certain embodiments. For example, the mimic command value 130824 can be structured to generate a message that conveys how to structure a portion of a schedule. The mimic command value can be structured to adjust a connector circuit of an agglomerate network 130826. The adjustment to the connector circuit may be structured to set or change a bias 130828 of the connector circuit, as further disclosed herein.

Figure 77:
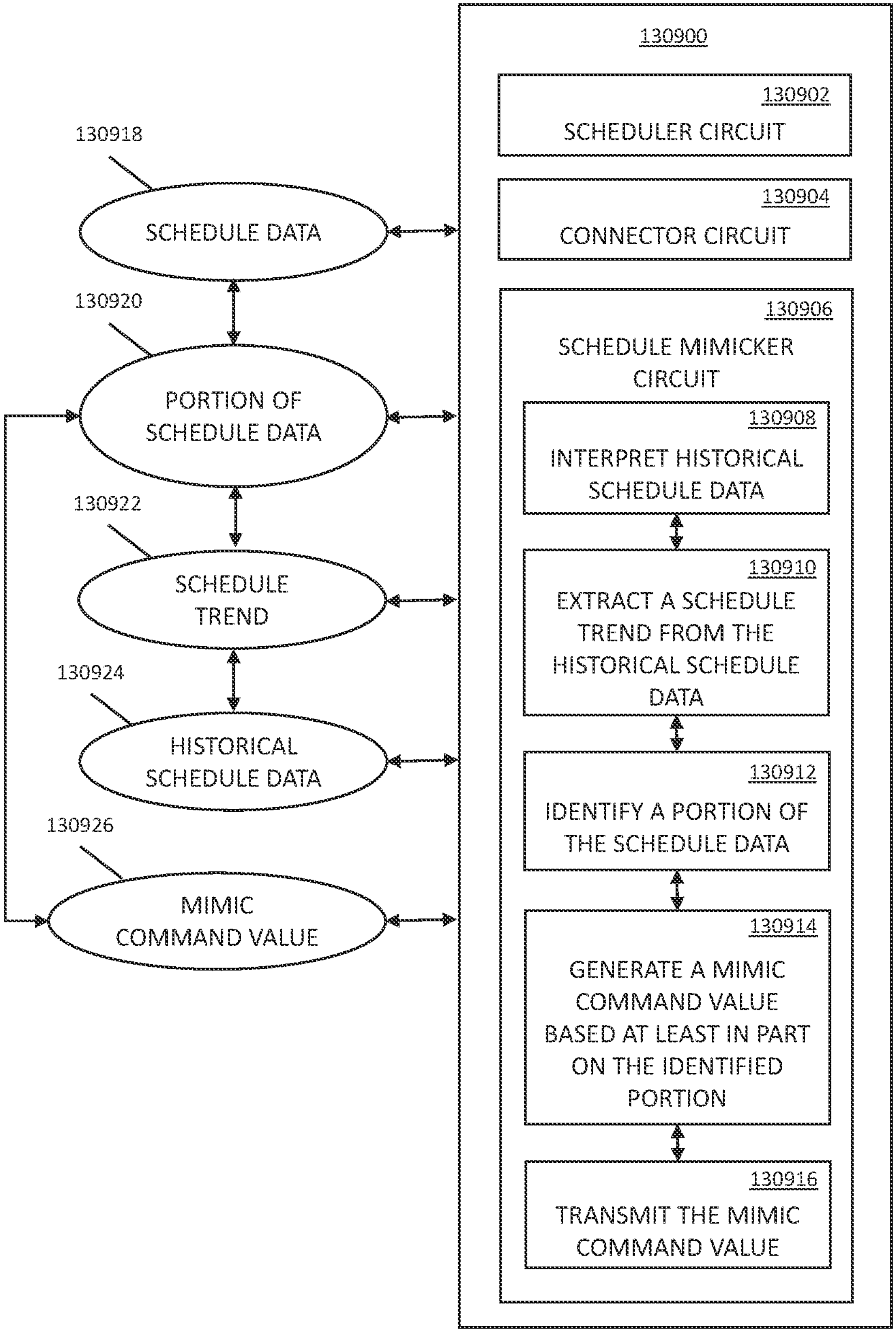
FIG. 77 is a schematic diagram depicting an agglomerate network for generating schedule data for schedule mimicking, in accordance with embodiments of the current disclosure.

Referring to FIG. 77, an agglomerate network 130900 for generating schedule data 130918 via schedule mimicking, in accordance with embodiments of the current disclosure, is shown. The agglomerate network 130900 includes a scheduler circuit 130902 structured to output the schedule data 130918; a connector circuit 130904 structured to adjust at least one of an input to the scheduler circuit or the schedule data outputted by the scheduler circuit; and a schedule mimicker circuit 130906. The schedule mimicker circuit 130906 is structured to: interpret 130908 historical schedule data 130924; extract 130910 a schedule trend 130922 from the historical schedule data; identify 130912 a portion 130920 of the schedule data corresponding to the extracted schedule trend; and generate 130914 a mimic command value 130926 based at least in part on the identified portion. The mimic command value is structured to trigger an adjustment to the connector circuit, wherein the adjustment is structured to effect a change of at least one of the input to the scheduler circuit or the schedule data outputted by the scheduler circuit. The schedule mimicker circuit 130906 is further structured to transmit 130916 the mimic command value.

Figure 78:
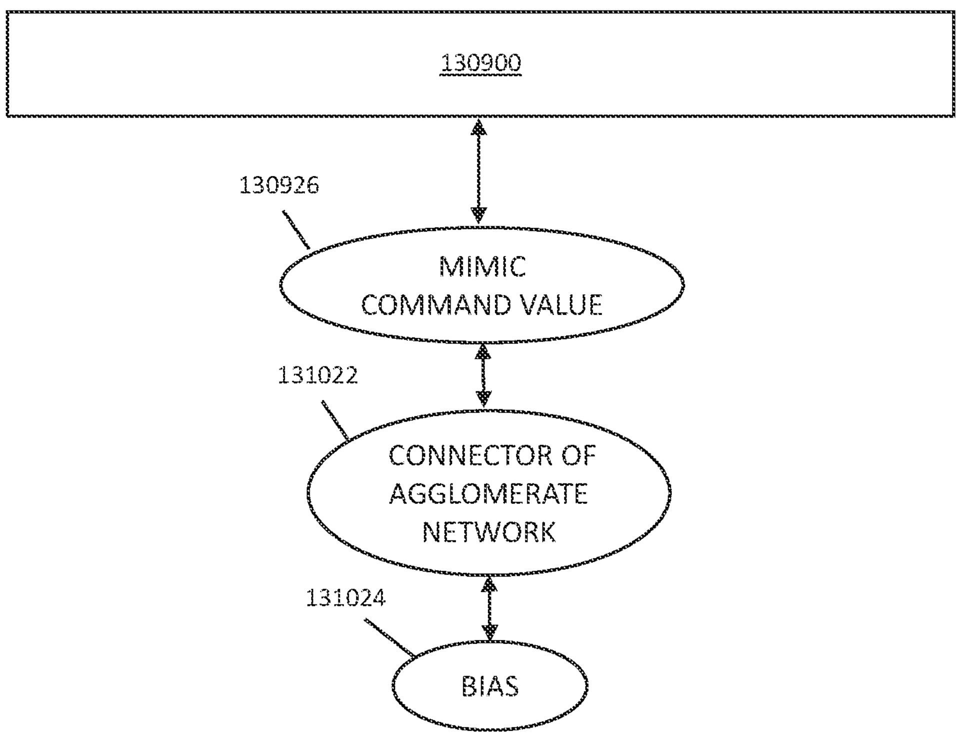
FIG. 78 is a schematic diagram depicting certain further aspects of an agglomerate network for generating schedule data for schedule mimicking, in accordance with embodiments of the current disclosure.

Referring to FIG. 78, certain further aspects of the agglomerate network 130900 are described following, any one or more of which may be present in certain embodiments. Accordingly, the mimic command value 130926 may be structured to generate a message that conveys how to structure a portion of a schedule. In embodiments, the mimic command value may be structured to adjust a connector circuit of an agglomerate network 131022. As such, the adjustment to the connector circuit can be structured to set or change a bias 131024 of the connector circuit.

Figure 79:
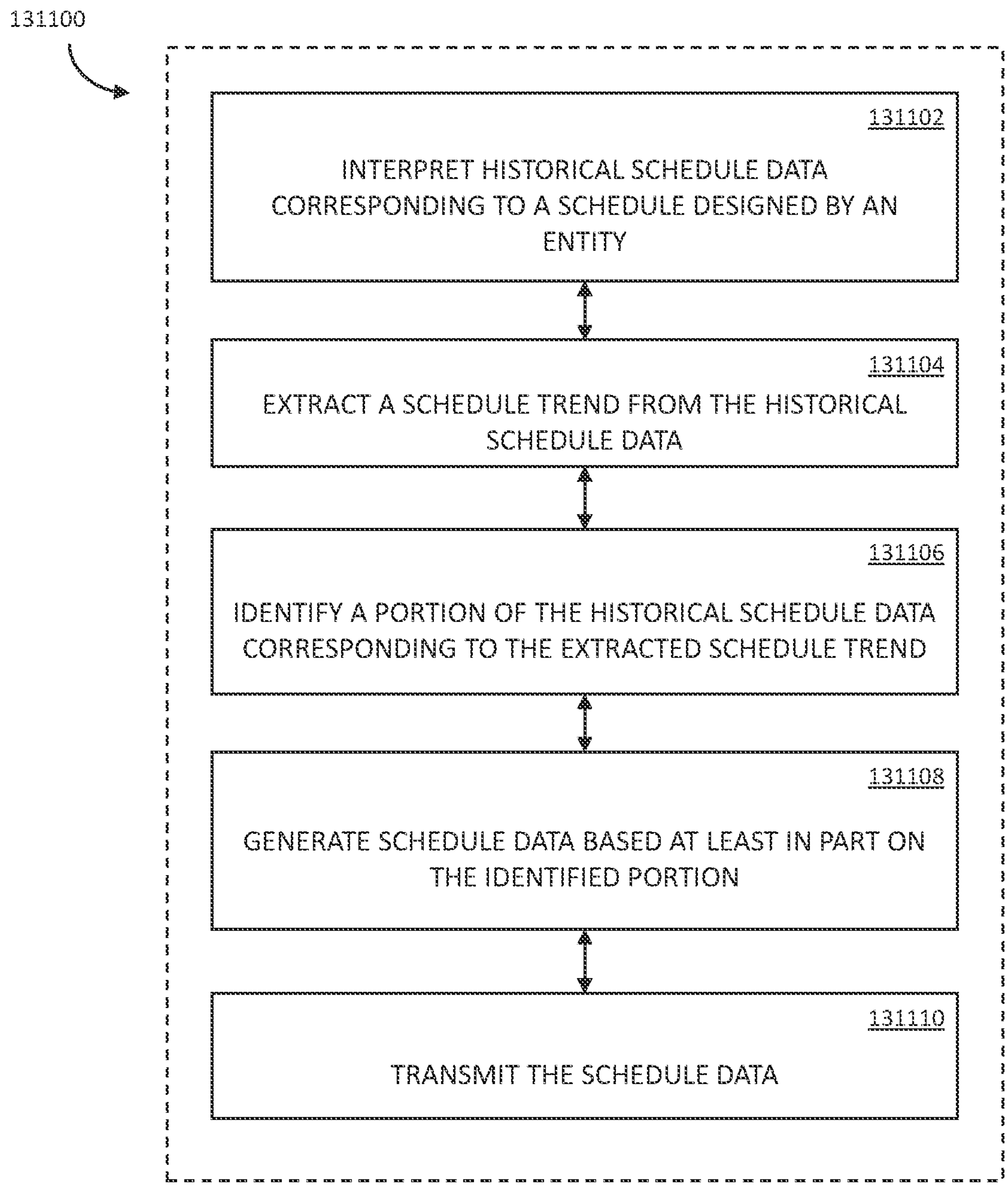
FIG. 79 is a block diagram depicting a non-transitory computer-readable medium for schedule mimicking, in accordance with embodiments of the current disclosure.

Referring to FIG. 79, a non-transitory computer-readable medium 131100 may be provided. The non-transitory computer-readable medium 131100 stores instructions that adapt at least one processor to: interpret 131102 historical schedule data corresponding to a schedule designed, in part, by an entity; extract 131104 a schedule trend from the historical schedule data; identify 131106 a portion of the historical schedule data corresponding to the extracted schedule trend; generate 131108 schedule data based at least in part on the identified portion; and transmit 131110 the schedule data.

Figure 80:
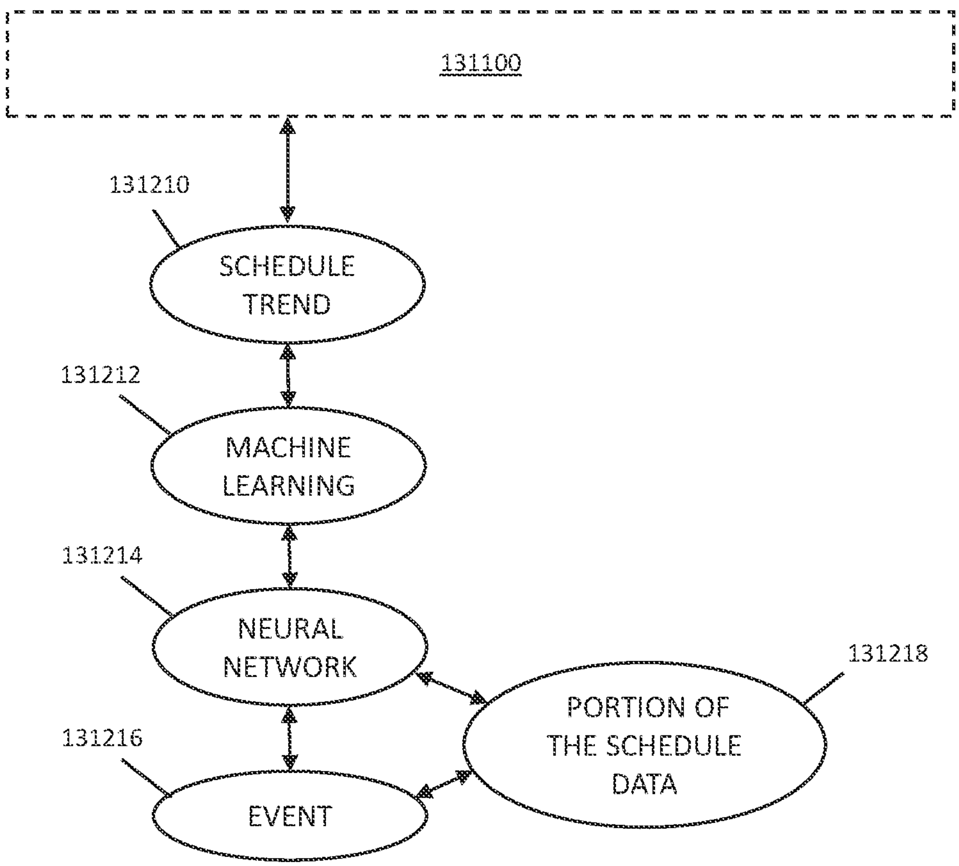
FIG. 80 is a block diagram depicting certain further aspects of a non-transitory computer-readable medium for schedule mimicking, in accordance with embodiments of the current disclosure.

Referring to FIG. 80, certain further aspects of the non-transitory computer-readable medium 131100 are described following, any one or more of which may be present in certain embodiments. For example, in embodiments, the extraction of the schedule trend 131210 is based at least in part on machine learning 131212 that may involve a neural network 131214 trained to match a portion 131218 of the schedule data with an event 131216. In such embodiments, generation of the schedule data may be based at least in part on an association of the matched portion and schedule trend.

Figure 81:
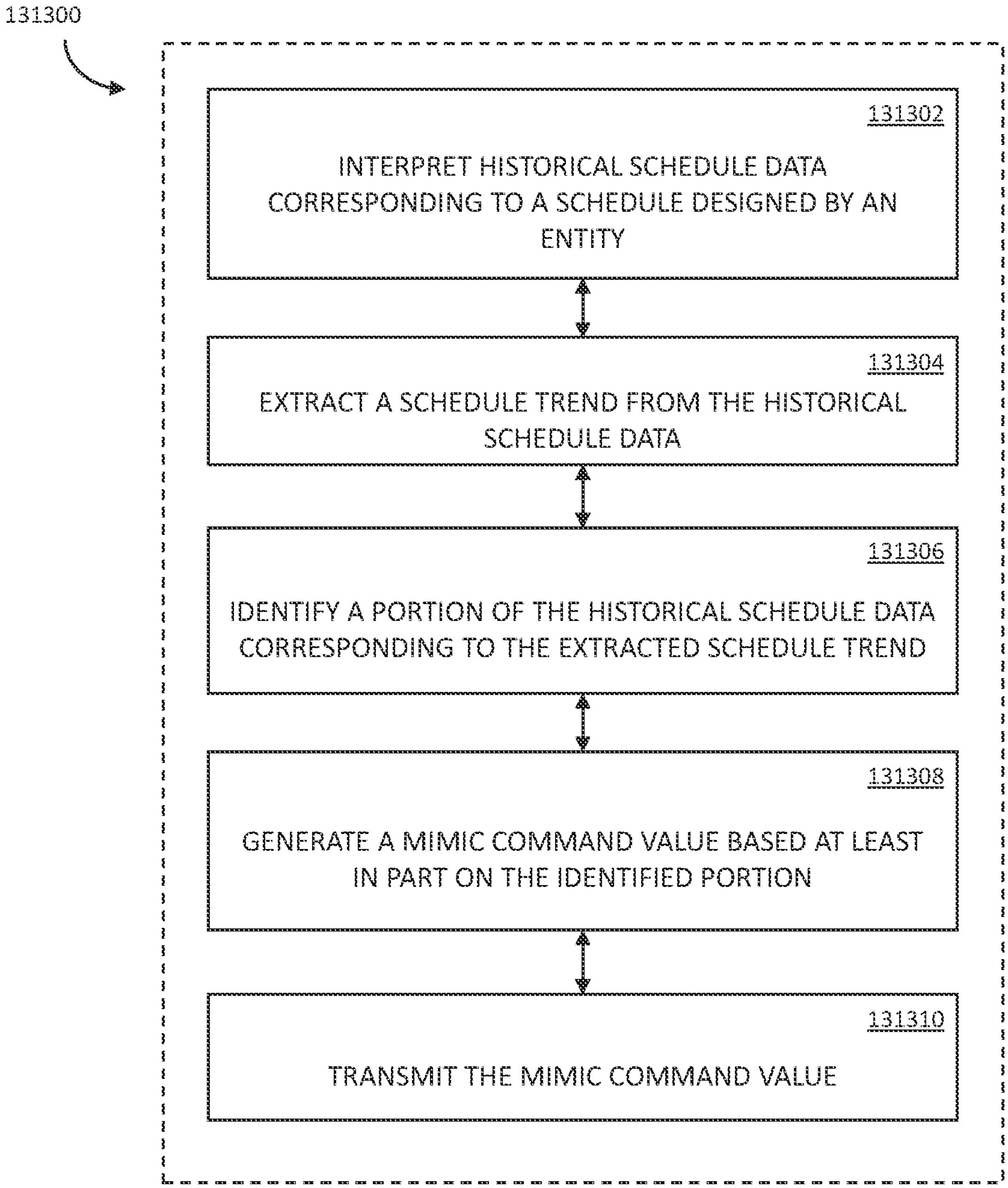
FIG. 81 is a block diagram depicting a non-transitory computer-readable medium for schedule mimicking, in accordance with embodiments of the current disclosure.

Referring to FIG. 81, another non-transitory computer-readable medium 131300, in accordance with embodiments of the current disclosure, is shown. The non-transitory computer-readable medium 131300 stores instructions that adapt at least one processor to: interpret 131302 historical schedule data corresponding to a schedule designed, in part, by an entity; extract 131304 a schedule trend from the historical schedule data; identify 131306 a portion of the historical schedule data corresponding to the extracted schedule trend; and generate 131308 a mimic command value based at least in part on the identified portion. The mimic command value is structured to trigger an adjustment to schedule data generated by a scheduler circuit. The instructions further adapt the at least one processor to transmit 131310 the mimic command value.

Figure 82:
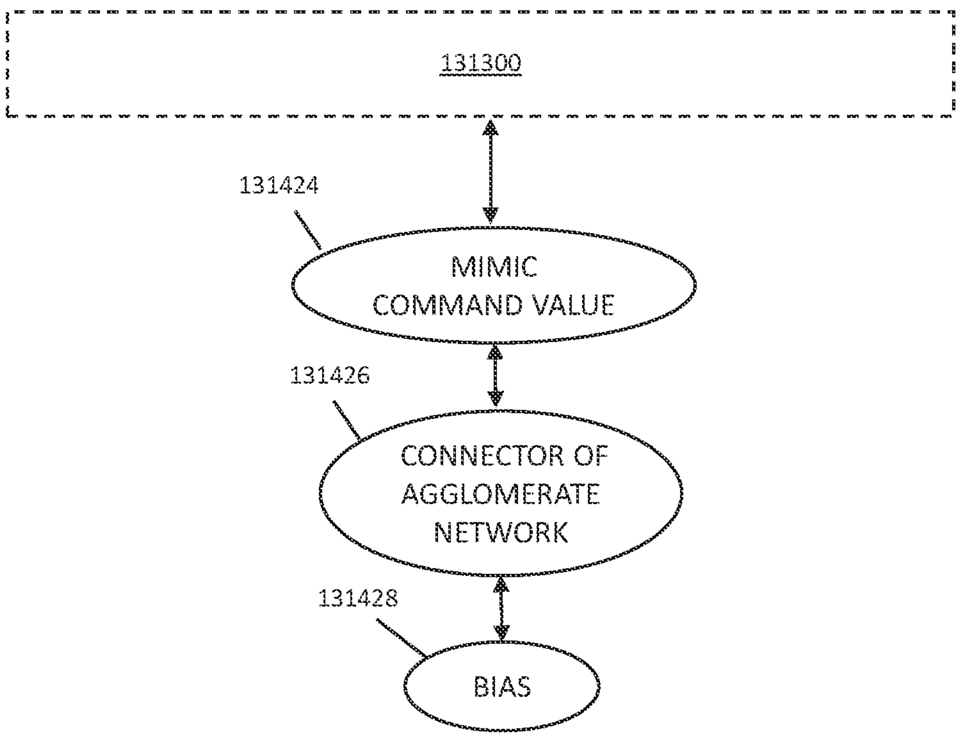
FIG. 82 is a block diagram depicting certain further aspects of a non-transitory computer-readable medium for schedule mimicking, in accordance with embodiments of the current disclosure.

Referring to FIG. 82, certain further aspects of the non-transitory computer-readable medium 131300 are described following, any one or more of which may be present in certain embodiments. For example, the mimic command value 131424 may be structured to generate a message that conveys how to structure a portion of a schedule. In embodiments, the mimic command value may be structured to adjust a connector circuit of an agglomerate network 131426. The adjustment to the connector circuit may be structured to set or change a bias 131428 of the connector circuit.

The systems and methods described herein for schedule mimicking provide various technical benefits and improvement to scheduling. In one aspect, the systems and methods provide for efficient utilization of computing resources by reducing the computation time required to generate a schedule. In one aspect, the methods and system reduce computations by leveraging features of schedules that are identified as favorable or good. In embodiments, trained models are used to identify favorable features as the starting point of the scheduling. The trained models used to identify favorable features may be faster and require less resources than methods that rely on a global schedule search. In one aspect, the methods use intelligent stacking of scheduling algorithms to reduce computation complexity by initially using more efficient algorithms to mimic features of known good schedules that may be used as the basis for further scheduling.

Some embodiments of the system, as described herein, may generate a schedule based on historic data when data about its current employees is not available. For example, embodiments of the system may generate a schedule for a first business using historical data from a second business that is similar to the first business (and in certain cases the similarities may not be apparent and are determined by the system).

Some embodiments of the system may provide for bootstrap scheduling wherein the system may generate a schedule based on "profiles" and/or templates based on employee positions and/or roles, e.g., the generation of a schedule for an entity that does not have its own historic schedule data using historic schedule data from other entities. Bootstrap scheduling, as described herein, may be included in module/component 126 (FIG. 1). Embodiments of the system may provide for the selection of one or more profile templates from a set of templates. In embodiments, the system may provide for data regarding the characteristics of a new company to be entered, wherein the agglomerate network matches the new business to one or more profiles having one or more templates from which a user and/or AI may select to form the basis of a new schedule for the new business. The profiles and/or templates may be based on worker demographics, life situations, and/or other factors, e.g., people who are habitually late. As will be appreciated, bootstrap scheduling may provide a new business (without historical scheduling data) to get up and running. Embodiments of the system may be integrated with an employee hiring platform to provide insights into whether particular roles and/or positions for a particular business are likely to result in tardiness. In embodiments, the profile may be based, in part, on one or more embeddings, as described herein. Embodiments may provide for a user to assign schedule rotations to employees.

As a non-limiting example, generating a schedule for a brand-new company A based on historic schedule data for company B. In embodiments, B may be company having one or more aspect/properties that are the same and/or similar to company A. Thus, as is to be appreciated, embodiments of the current disclosure that provide for bootstrap scheduling provide for a new company to begin operations under a schedule faster than in the absence of bootstrap scheduling, as disclosed herein. Non-limiting examples of entity attributes which may be used for matching, as disclosed herein, include: a number of employees, an industry, a location, a region, a number of departments, a number of buildings, and age, etc. Non-limiting examples of position/role attributes that may be used for matching, as disclosed herein, include: shift length, required skill set, wage band, department, job requirements, etc.

In embodiments, schedule data, corresponding to schedules, may be generated based on "profiles" and/or position templates, e.g., there is available enough data to make a profile of an employee and/or a position within a company, but there is little to no historical data on the company itself and/or on the employee because the organization or employee is new. For example, data for a role of type X in company B may be used to generate a profile/template representative of the role, which in turn may be used to generate a schedule for a role of type X in company A, where B is a mature company with its own historic schedule data and A is a brand new start up without any historic schedule data.

In embodiments, templates may be based on worker demographics, life situations, attendance rates, and/or other factors, e.g., trends indicating people in a particular role type are habitually late, personality traits independent of a particular role, and/or the like. Embodiments may provide for a new business (e.g., one without historical scheduling data) to get up and running sooner than in the absence of bootstrap scheduling, as disclosed herein. Embodiments may provide for integration with a hiring application to identify certain employee profiles suitable and/or preferable for hiring, e.g., engineers having a minimum number of years of experience in a particular field and/or with a particular technology. Embodiments may use a hierarchical feature propagator (HFP) 332 (FIG. 3), as disclosed herein, to bootstrap connectors and mixing of models, e.g., which modules should be used and/or how should such modules be connected.

Embodiments may provide for a company to self-select comparable profiles from a set of one or more profiles. In embodiments, an artificial intelligence (AI) may match a company to a template. Embodiments may also provide for a hybrid approach where a company selects a profile from a list of profiles suggested by an AI or vice versa. Embodiments of bootstrap scheduling may be a module that receives inputs, e.g., a schedule and/or other data, e.g., biases, as: direct input, i.e., the bootstrap scheduling module acts as a standalone module; as direct input to an agglomerate network, i.e., without use of connectors; and/or from connectors, i.e., the bootstrap scheduling is one of a plurality of modules within an agglomerate network. For example, bootstrap scheduling may be performed by a schedule generation module within an agglomerate network that passes its output (e.g., schedules) to other modules in the agglomerate network for evaluation where the other modules generate output(s), e.g., a bias. The other modules may, in turn, feed the output back into the bootstrap scheduling module to form a feedback loop which tries to reach equilibrium and/or optimization of various biases in the agglomerate network. The connections between the bootstrap scheduling module and the various other modules of the agglomerate network may be accomplished via connectors.

Figure 83:
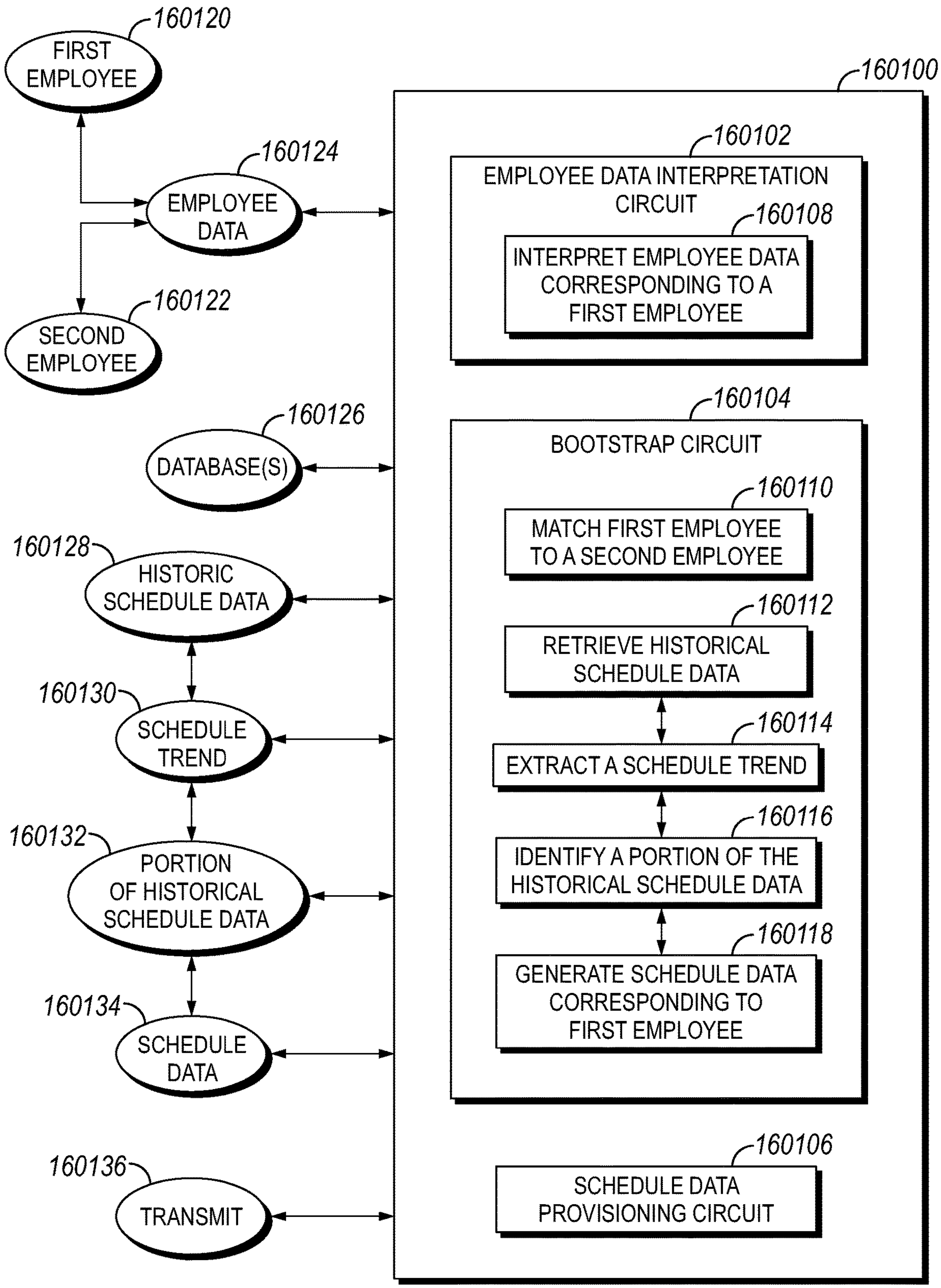
FIG. 83 is a schematic diagram depicting an apparatus for a bootstrap scheduler, in accordance with an embodiment of the current disclosure.

Accordingly, referring to FIG. 83, an apparatus 160100 may be provided. The apparatus 160100 includes an employee data interpretation circuit 160102 structured to interpret 160108 employee data 160124 corresponding to a first employee 160120; a bootstrap circuit 160104 structured to: match 160110 the first employee to a second employee 160122 via querying one or more databases 160126 based at least in part on the employee data; retrieve 160112 historical schedule data 160128 associated with the second employee via querying the one or more databases; extract 160114 a schedule trend 160130 from the historical schedule data; identify 160116 a portion 160132 of the historical schedule data corresponding to the extracted schedule trend; and generate 160118, based at least in part on the identified portion, schedule data 160134 corresponding to the first employee; and a schedule data provisioning circuit 160106 structured to transmit the schedule data 160136. As will be understood, the databases 160126 may store data for distinct entities, e.g., corporations, on the order of hundreds, thousands, tens-of-thousands, hundreds-of-thousands, millions, etc. In embodiments, the databases 160126 may be operated and/or owned by the same entity that owns and/or operates an embodiment of an apparatus for bootstrap scheduling, as disclosed herein. In such embodiments, the entity that owns and/or operates the databases 160126 may be the same entity that generated the historic scheduling data for the entities that populate the databases 160126. In embodiments, the databases 160126 may be owned and/or operated by entities corresponding to the stored historic scheduling data and embodiments of the apparatus for bootstrap scheduling has network access to the databases 160126.

As will be further understood, generally, the larger the number of distinct corporations stored in the databases 160126, the more likely a matching corporation, position, and/or role will be found for an entity, e.g., corporation, that does not have its own historic schedule data, and/or the more closely the match will be. Automation of the matching and schedule generation also makes it practical to search a large number of entities for a potential match, as manual searching would likely be cost-prohibitive. Thus, embodiments of the current disclosure reduce the difficulty of getting a start-up business off the ground by helping to keep costs associated with developing schedules for employees down.

Figure 84:
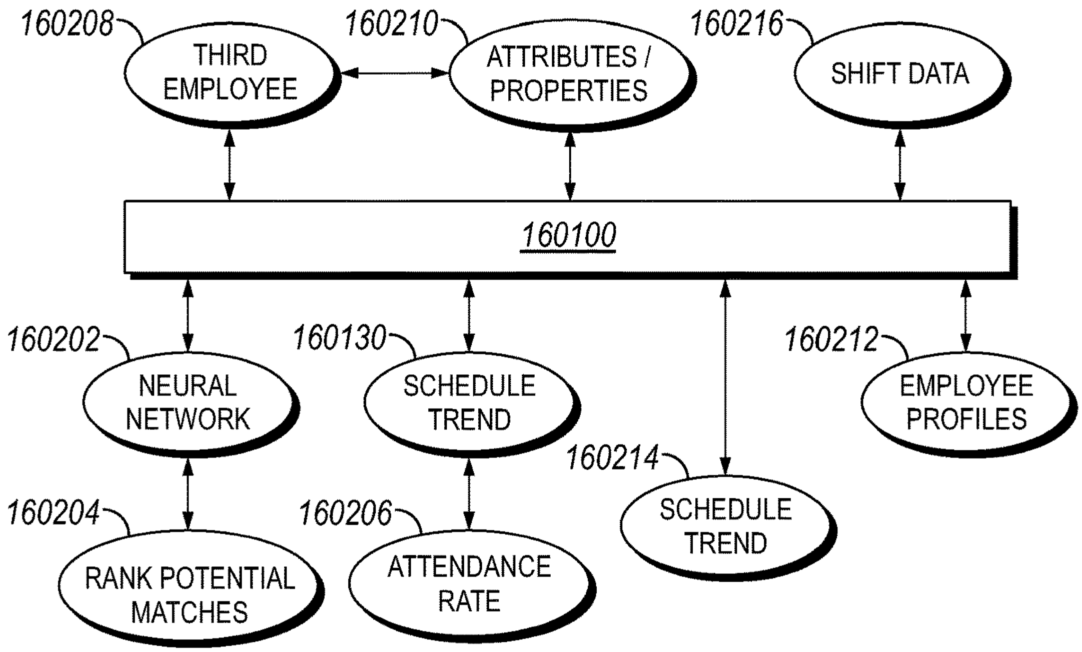
FIG. 84 is a schematic diagram depicting certain further aspects of an apparatus for a bootstrap scheduler, in accordance with an embodiment of the current disclosure.

Referring to FIG. 84, certain further aspects of the apparatus 160100 are described following, any one or more of which may be present in certain embodiments. The employee data may include at least one of: a position, demographic information, a number of years in the position, an attendance rate, a residence, a work location, work commute data (e.g., distance, routes, times, or traffic congestion), education level, and the like. Matching of the first employee to the second employee may be based at least in part on a neural network 160202 that ranks 160204 a plurality of potential matches in a query result. Use of a neural network 160202 to rank 160204 matches may provide for more accurate matching as compared to a manual matching process. The second employee matched to the first employee may be potential match result that has the highest rank, which may be based on a number of matched properties.

Extraction of the schedule trend may be based at least in part on a neural network. The extracted trend may be an attendance rate 160206 with respect to one or more of: a shift time, a number of shifts, a shift position within a workweek, a commute distance and/or time, a number of co-workers on a shift, or a number of managers on a shift. The portion of the historical schedule data corresponding to the extracted trend may be less than the entire historical schedule data. The first employee may be further matched to a third employee 160208, wherein the first employee shares attributes/properties 160210 of both the second and third employee and the schedule data is generated further based in part on a trend extracted from historic data of the third employee. In embodiments, the second employee and the third employee may be from different organizations. In embodiments, the second employee and the third employee may be in different positions or roles and the first employee is being scheduled for a role that is a hybrid of the positions or roles of the second and the third employee. For example, a new startup company may have a new type of position that is a hybrid between a traditional accounting role and a traditional engineering role, where the second matched employee is an accountant position from an accounting firm and the third matched employee is an engineering role from a chemical company, where the generated schedule for the hybrid position may incorporate aspects of the accountant position and the engineering position.

Matching the first employee to the second employee may be based at least in part on employee profiles 160212. An employee profile 160212 may be a collection of worker properties, as disclosed herein, to include: demographic data, residence, level of education, job and/or position title, pay grade, number of direct reports, etc. In embodiments, the first employee may be associated with an employer that does not have historical schedule data for the employee. For example, in embodiments, an existing company may hire its first full time research scientist, generate a profile for the newly hired research scientist, use the profile, with the apparatuses and methods disclosed herein for bootstrap scheduling, to identify a matching profile for a research scientist in another company, retrieve historic schedule data for the matching research scientist, and then use the historic schedule data to generate schedule data for the newly hired research scientist.

In embodiments, the apparatus 160100 may interpret schedule scenario data 160214 to determine a type of data for inclusion in the generation of the schedule data. In embodiments, the schedule data corresponding to the first employee may include shift data 160216 that indicates the first employee is available to work a shift corresponding to the second employee.

Figure 85:
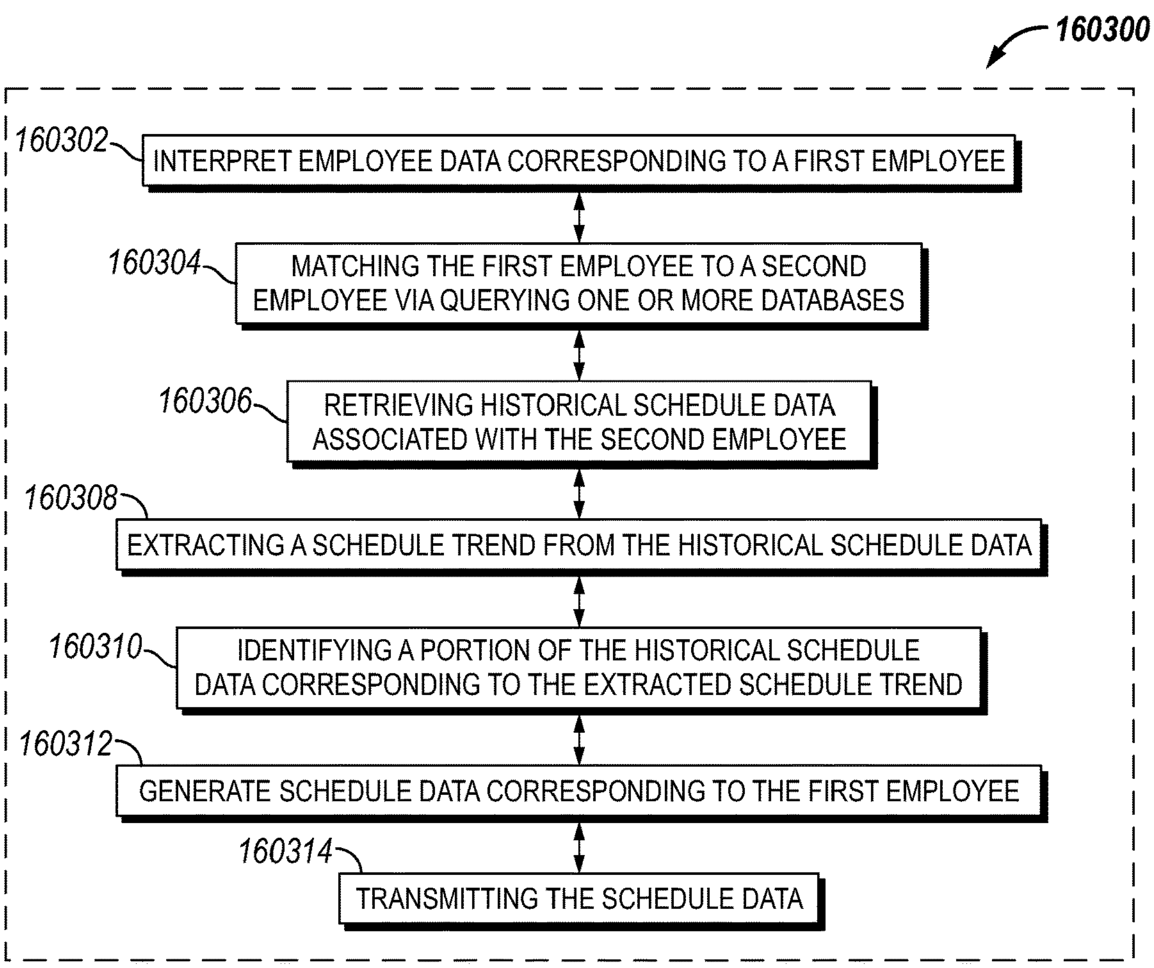
FIG. 85 is a flowchart depicting a method for a bootstrap scheduler, in accordance with an embodiment of the current disclosure.

Referring to FIG. 85, a method 160300 for bootstrap scheduling is shown. The method may be performed via apparatus 160100 and/or any other computing device disclosed herein. In embodiments, the method 160300 includes interpreting, via an employee data interpretation circuit, employee data corresponding to a first employee 160302; matching, via a bootstrap circuit, the first employee to a second employee via querying one or more databases based at least in part on the employee data 160304. The method 160300 further includes retrieving, via the bootstrap circuit, historical schedule data associated with the second employee via querying the one or more databases 160306; and extracting, via the bootstrap circuit, a schedule trend from the historical schedule data 160308. The method 160300 further includes identifying, via the bootstrap circuit, a portion of the historical schedule data corresponding to the extracted schedule trend 160310; and generating, via the bootstrap circuit and based at least in part on the identified portion, schedule data corresponding to the first employee 160312. The method 160300 further includes transmitting, via a schedule data provisioning circuit, the schedule data 160314.

Figure 86:
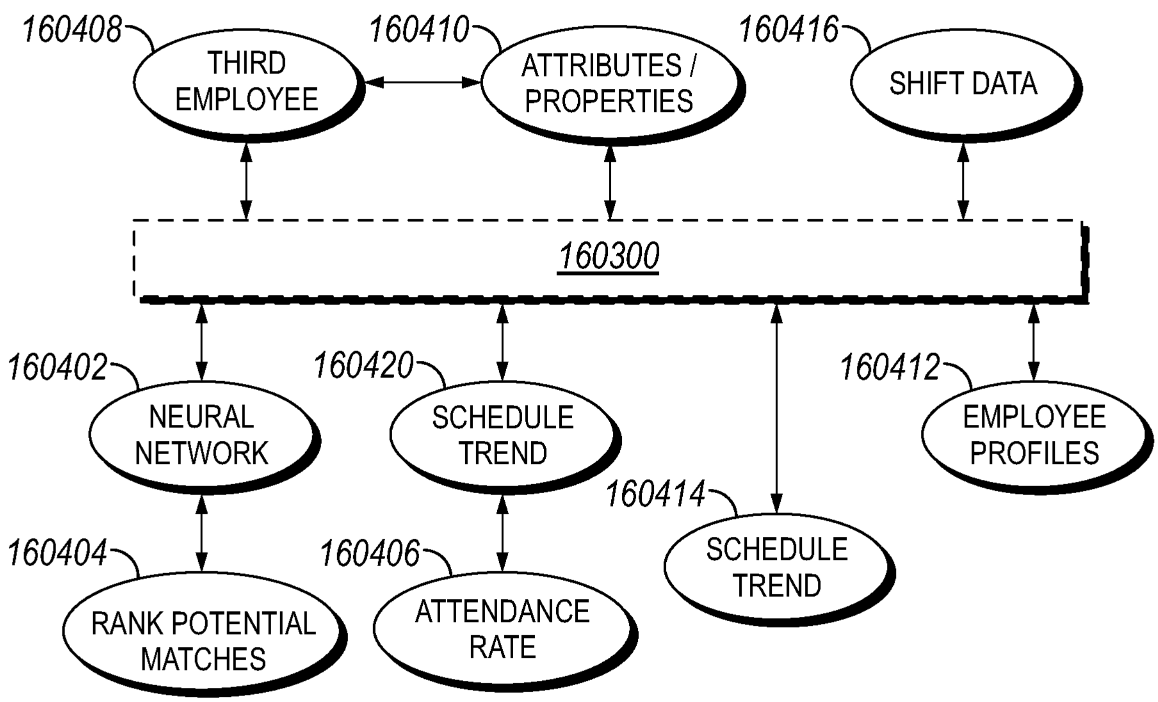
FIG. 86 is a flowchart depicting certain further aspects of a method for a bootstrap scheduler, in accordance with an embodiment of the current disclosure.

Referring to FIG. 86, certain further aspects of the method 160300 are described following, any one or more of which may be present in certain embodiments. For example, in embodiments, the employee data may include at least one of: a position, demographic information, a number of years in the position, an attendance rate, a residence, a work location, work commute data (e.g., distance, routes, or traffic congestion), education level, and the like. Matching of the first employee to the second employee may be based at least in part on a neural network 160402 that ranks 160404 a plurality of potential matches in a query result. In embodiments, the neural network may be trained over a training dataset of labeled query results each having a score corresponding to an initial employee profile (to which the results are matched). Extraction of the schedule trend may be based at least in part on a neural network. The extracted trend 160420 may be an attendance rate 160406 with respect to one or more of: a shift time, a number of shifts, a shift position within a workweek, a commute distance, a number of co-workers on a shift, or a number of managers on a shift. The portion of the historical schedule data may be less than the entire historical schedule data. The first employee may be further matched to a third employee 160408, wherein the first employee shares attributes or properties 160410 of both the second and third employee and the schedule data may be generated further based in part on a trend extracted from historic data of the third employee. The second employee and the third employee may be from different organizations. The second employee and the third employee may be in different positions or roles and the first employee may be scheduled for a role that is a hybrid of the positions or roles of the second and the third employee. Matching the first employee to the second employee may be based at least in part on employee profiles 160412. The first employee may be associated with an employer that does not have historical schedule data for the employee. In embodiments, the method 160300 may further include interpreting schedule scenario data 160414 to determine a type of data for inclusion in the generation of the schedule data. The schedule data corresponding to the first employee may include shift data 160416 that indicates the first employee is available to work a shift corresponding to the second employee.

Figure 87:
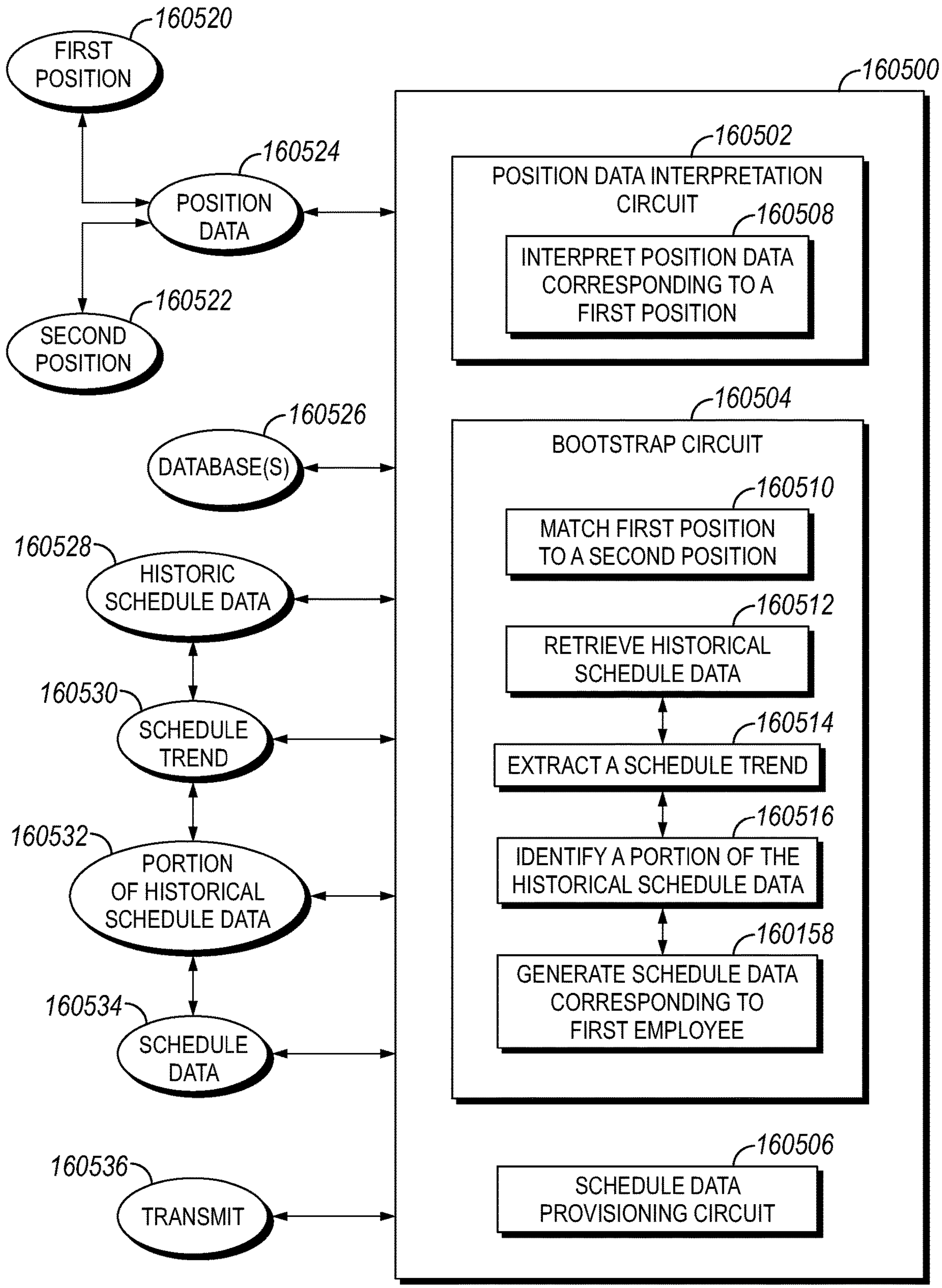
FIG. 87 is a schematic diagram depicting an apparatus for a bootstrap scheduler, in accordance with an embodiment of the current disclosure.

Referring to FIG. 87, an apparatus 160500 for bootstrap scheduling, in accordance with embodiments of the current disclosure, is shown. The apparatus 160500 includes a position data interpretation circuit 160502 structured to interpret 160508 position data 160524 corresponding to a first position 160520. The apparatus 160500 further includes a bootstrap circuit 160504 structured to: match 160510 the first position to a second position 160522 via querying one or more databases 160526 based at least in part on the position data; retrieve 160512 historical schedule data 160528 associated with the second position via querying the one or more databases; extract 160514 a schedule trend 160530 from the historical schedule data; identify 160516 a portion 160532 of the historical schedule data corresponding to the extracted schedule trend; and generate 160518, based at least in part on the identified portion, schedule data 160534 corresponding to the first position. The apparatus 160500 further includes a schedule data provisioning circuit 160506 structured to transmit 160536 the schedule data.

Figure 88:
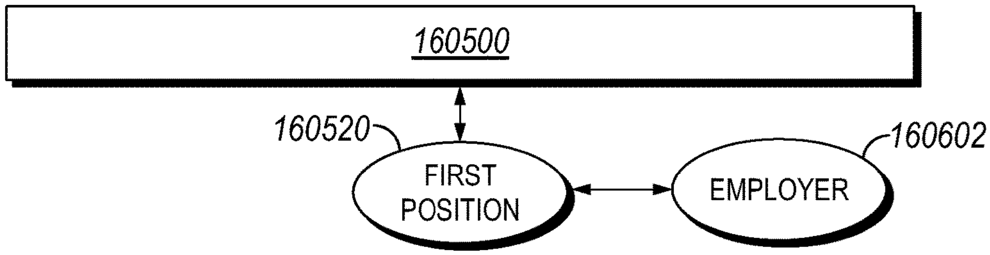
FIG. 88 is a schematic diagram depicting certain further aspects of an apparatus for a bootstrap scheduler, in accordance with an embodiment of the current disclosure.

Referring to FIG. 88, certain further aspects of the apparatus 160500 are described following, any one or more of which may be present in certain embodiments. In embodiments, the position data may include at least one of: average hours worked; average days worked; average number of managers on co-shift; average number of coworkers on co-shift; average pay; average start time; average stop time; average number of off-hours (downtime); legal requirements; etc. The first position may be associated with an employer 160602 that does not have historical schedule data for the first position.

Figure 89:
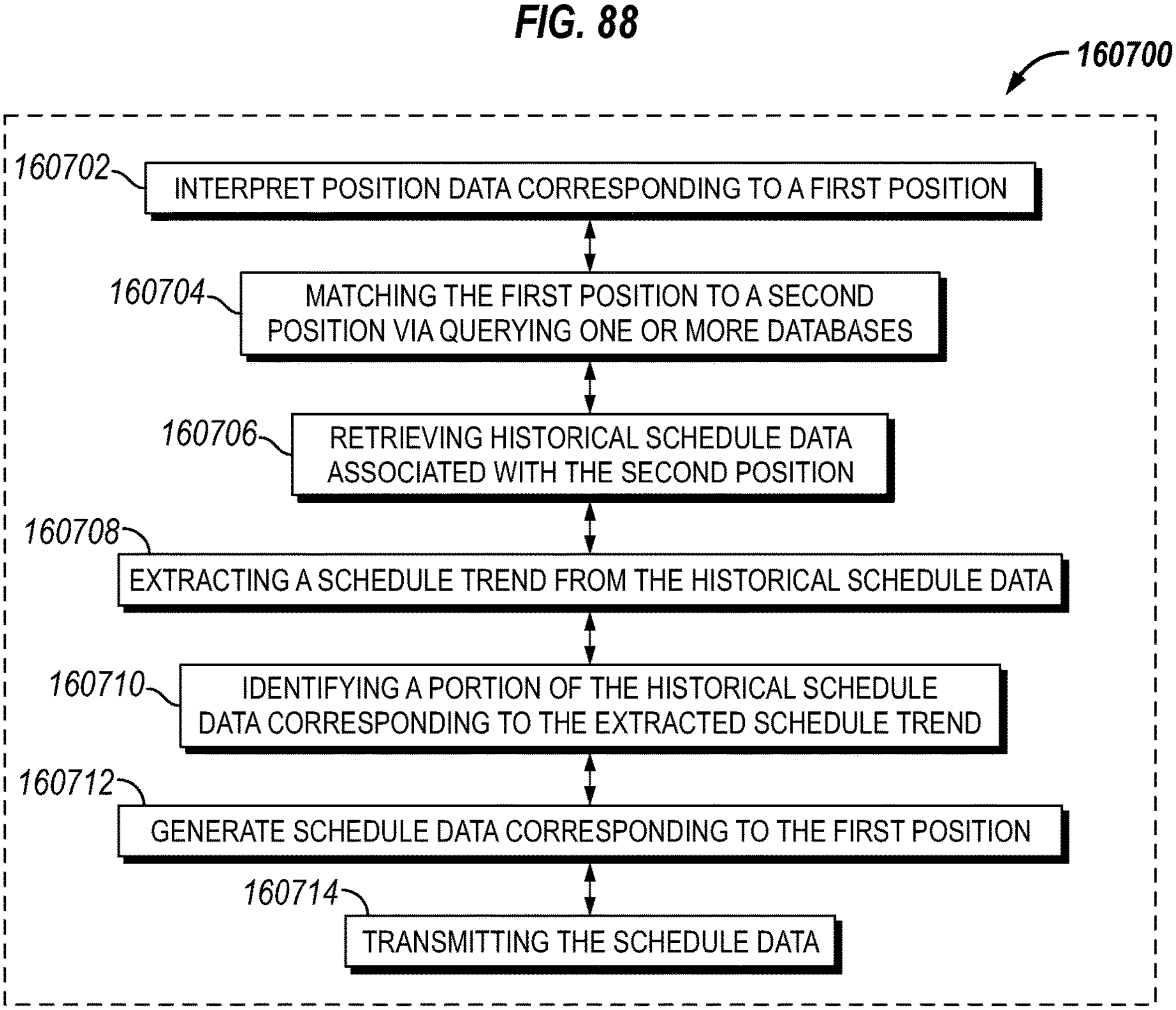
FIG. 89 is a flowchart depicting a method for a bootstrap scheduler, in accordance with an embodiment of the current disclosure.

Referring to FIG. 89, a method 160700 for bootstrap scheduling, in accordance with embodiments of the current disclosure, is shown. The method 160700 may be performed via apparatus 160500 and/or any other computing device disclosed herein. The method 160700 includes interpreting, via a position data interpretation circuit, position data corresponding to a first position 160702; matching, via a bootstrap circuit, the first position to a second position via querying one or more databases based at least in part on the position data 160704; and retrieving, via the bootstrap circuit, historical schedule data associated with the second position via querying the one or more databases 160706. The method 160700 further includes extracting, via the bootstrap circuit, a schedule trend from the historical schedule data 160708; identifying, via the bootstrap circuit, a portion of the historical schedule data corresponding to the extracted schedule trend 160710; and generating, via the bootstrap circuit and based at least in part on the identified portion, schedule data corresponding to the first position 160712. The method 160700 further includes transmitting, via a schedule data provisioning circuit, the schedule data 160714.

Figure 90:
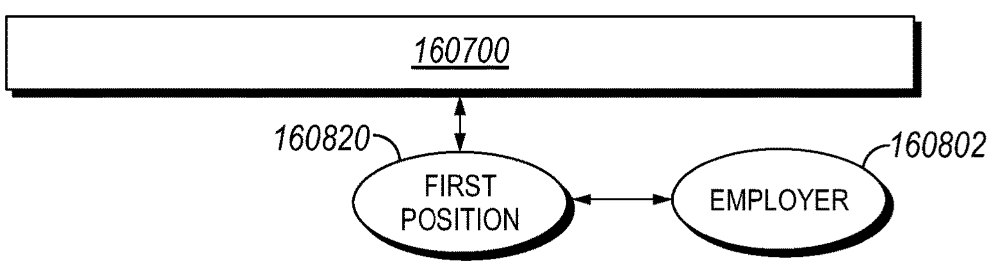
FIG. 90 is a flowchart depicting certain further aspects of a method for a bootstrap scheduler, in accordance with an embodiment of the current disclosure.

Referring to FIG. 90, certain further aspects of the method 160700 are described following, any one or more of which may be present in certain embodiments. In embodiments, the position data may include at least one of: average hours worked; average days worked; average number of managers on co-shift; average number of coworkers on co-shift; average pay; average start time; average stop time; average number of off-hours (downtime); legal requirements; and the like. In embodiments, the first position 160820 may be associated with an employer 160802 that does not have historical schedule data for the first position.

Figure 91:
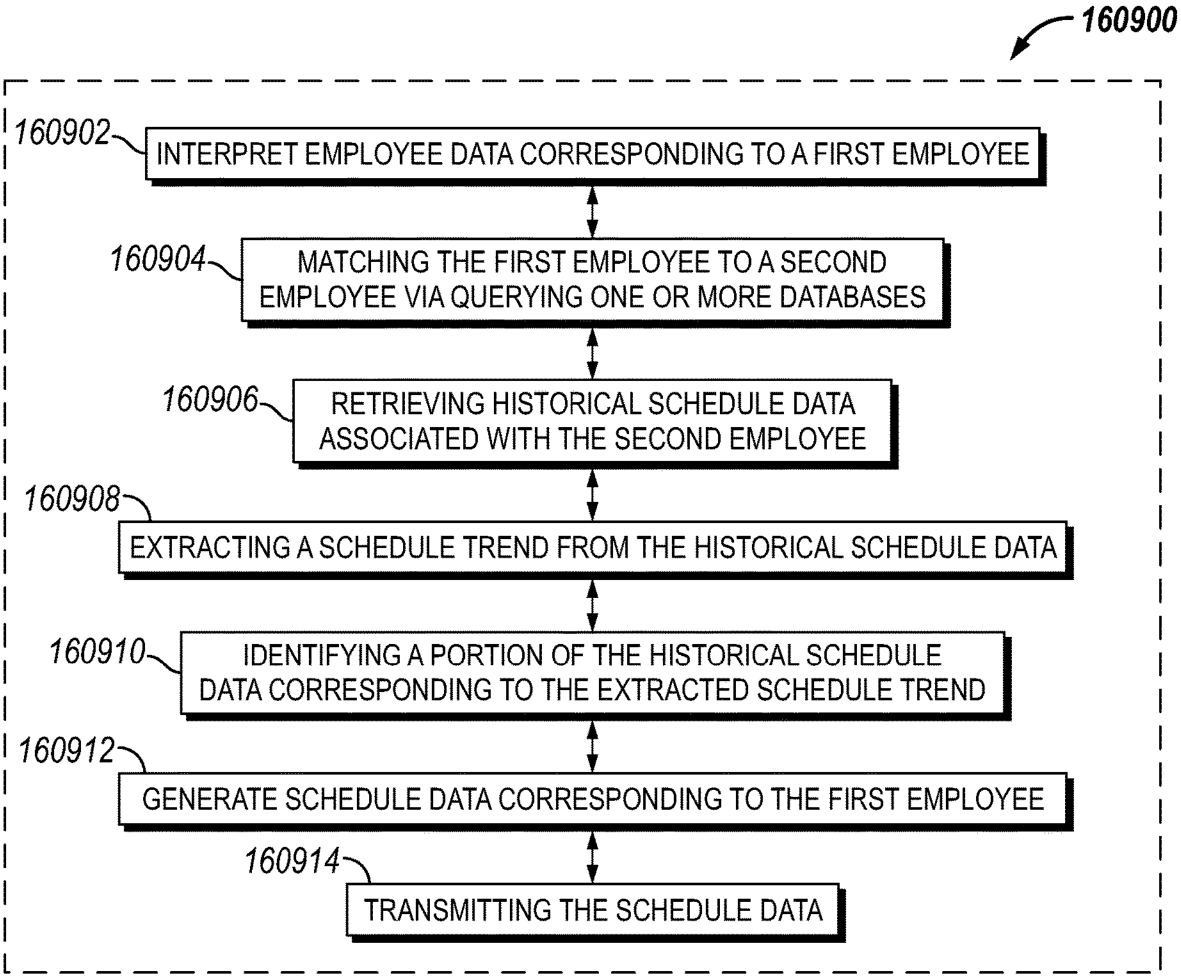
FIG. 91 is a block diagram depicting a non-transitory computer-readable medium for a bootstrap scheduler, in accordance with an embodiment of the current disclosure.

Referring to FIG. 91, a non-transitory computer-readable medium 160900, in accordance with embodiments of the current disclosure, is shown. The non-transitory computer-readable medium 160900 includes instructions that adapt at least one processor to: interpret employee data corresponding to a first employee 160902; match the first employee to a second employee via querying one or more databases based at least in part on the employee data 160904; and retrieve historical schedule data associated with the second employee via querying the one or more databases 160906. The instructions further adapt the at least one processor to extract 160908 a schedule trend from the historical schedule data; identify a portion of the historical schedule data corresponding to the extracted schedule trend 160910; and generate, based at least in part on the identified portion, schedule data corresponding to the first employee 160912. In embodiments, the instructions further adapt the at least one processor to transmit the schedule data 160914.

Figure 92:
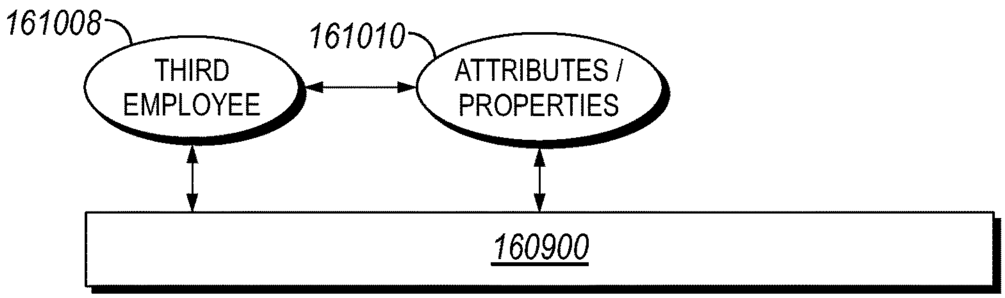
FIG. 92 is a block diagram depicting certain further aspects of a non-transitory computer-readable medium for a bootstrap scheduler, in accordance with an embodiment of the current disclosure.

Referring to FIG. 92, certain further aspects of the non-transitory computer-readable medium 160900 are described following, any one or more of which may be present in certain embodiments. In embodiments, the first employee may be further matched to a third employee 161008, wherein the first employee shares attributes or properties 161010 of both the second and third employee and the schedule data is generated further based in part on a trend extracted from historic data of the third employee. In embodiments, the second employee and the third employee may be from different organizations. In embodiments, the second employee and the third employee may be in different positions or roles and the first employee may be scheduled for a role that is a hybrid of the positions or roles of the second and the third employee.

Figure 93:
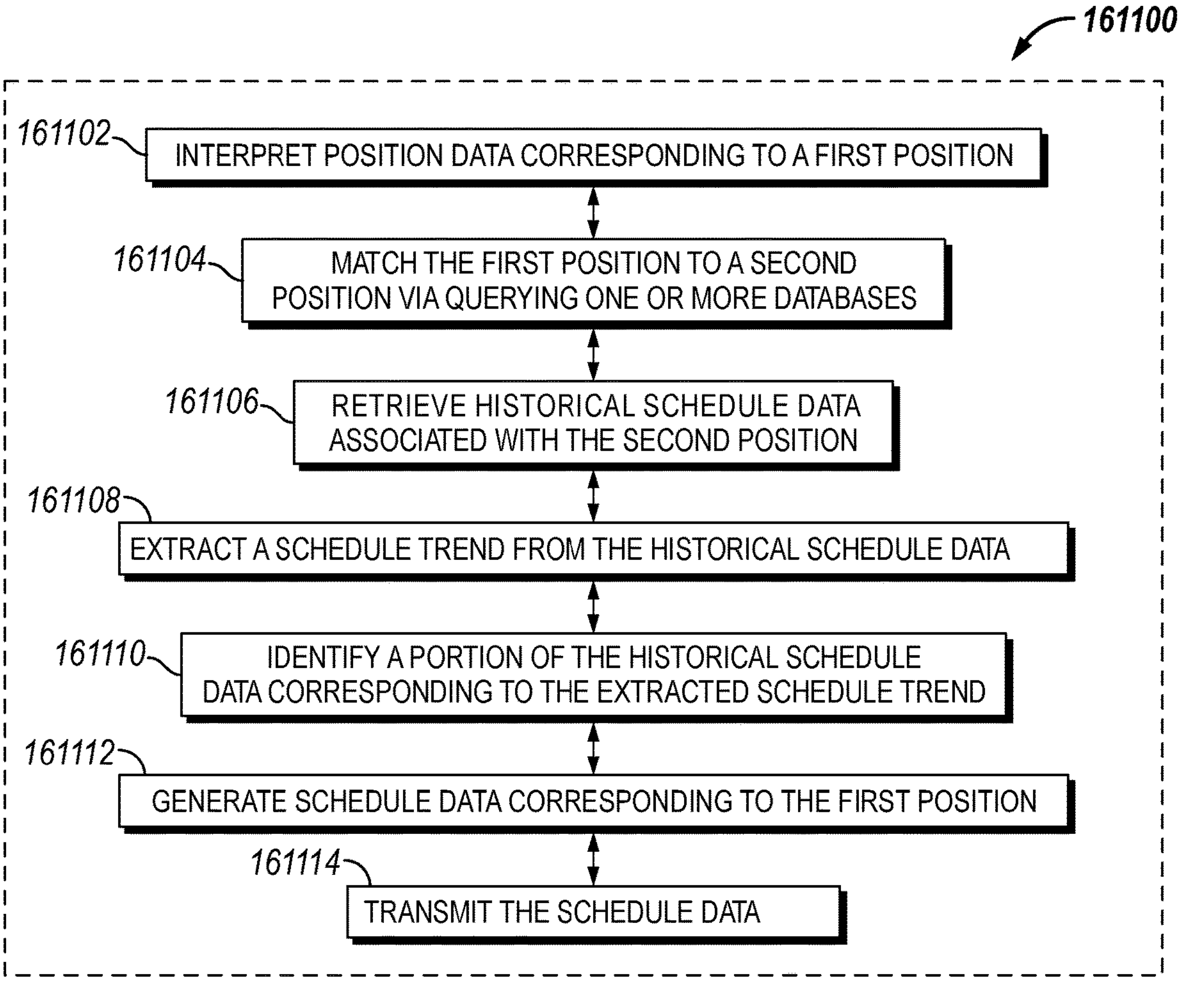
FIG. 93 is a block diagram depicting a non-transitory computer-readable medium for a bootstrap scheduler, in accordance with an embodiment of the current disclosure.

Referring to FIG. 93, a non-transitory computer-readable medium 161100 may be provided. The non-transitory computer-readable medium 161100 includes instructions that adapt at least one processor to: interpret position data corresponding to a first position 161102; match the first position to a second position via querying one or more databases based at least in part on the position data 161104; and retrieve historical schedule data associated with the second position via querying the one or more databases 161106. The instructions further adapt the at least one processor to extract a schedule trend from the historical schedule data 161108; identify a portion of the historical schedule data corresponding to the extracted schedule trend 161110; and generate, based at least in part on the identified portion, schedule data corresponding to the first position 161112. The instructions further adapt the at least one processor to transmit the schedule data 161114.

Figure 94:
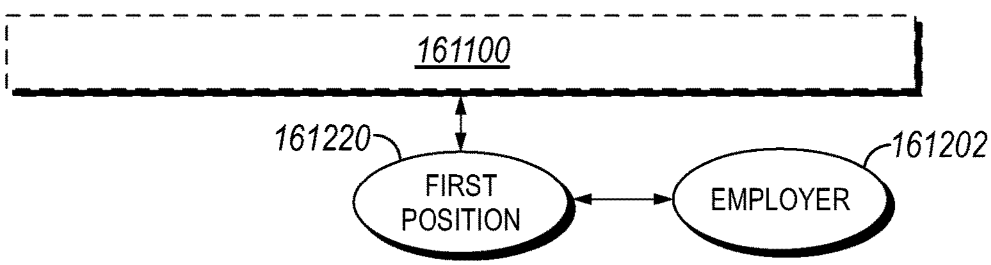
FIG. 94 is a block diagram depicting certain further aspects of a non-transitory computer-readable medium for a bootstrap scheduler, in accordance with an embodiment of the current disclosure.

Referring to FIG. 94, certain further aspects of the non-transitory computer-readable medium 161100 are described following, any one or more of which may be present in certain embodiments. In embodiments, the position data includes at least one of: average hours worked; average days worked; average number of managers on co-shift; average number of coworkers on co-shift; average pay; average start time; average stop time; average number of off-hours (downtime); legal requirements; and the like. In embodiments, the first position 161220 may be associated with an employer 161202 that does not have historical schedule data for the first position.

Figure 95:
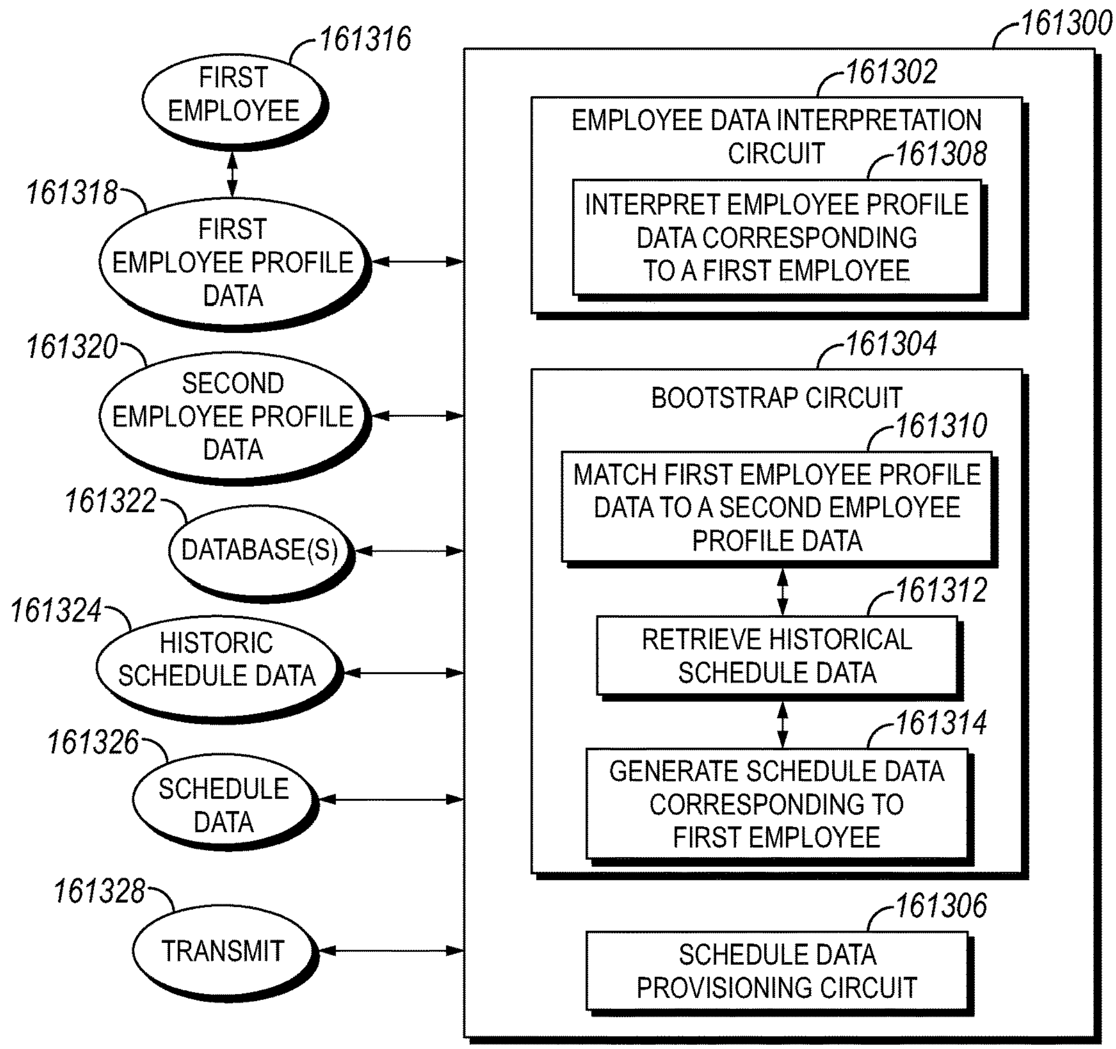
FIG. 95 is a schematic diagram depicting an apparatus for a bootstrap scheduler, in accordance with an embodiment of the current disclosure.

Referring to FIG. 95, an apparatus 161300 for bootstrap scheduling, in accordance with embodiments of the current disclosure, is shown. The apparatus 161300 includes an employee data interpretation circuit 161302 structured to interpret 161308 first employee profile data 161318 corresponding to a first employee 161316; a bootstrap circuit 161304 structured to: match 161310 the first employee profile data to a second employee profile data 161320 via querying one or more databases 161322; and retrieve 161312 historical schedule data 161324 associated with the second employee profile data via querying the one or more databases. The bootstrap circuit 161304 is further structured to generate 161314, based at least in part on the retrieved historical schedule data, schedule data 161326 corresponding to the first employee. The apparatus 161300 further includes a schedule data provisioning circuit 161306 structured to transmit 161328 the schedule data.

Figure 96:
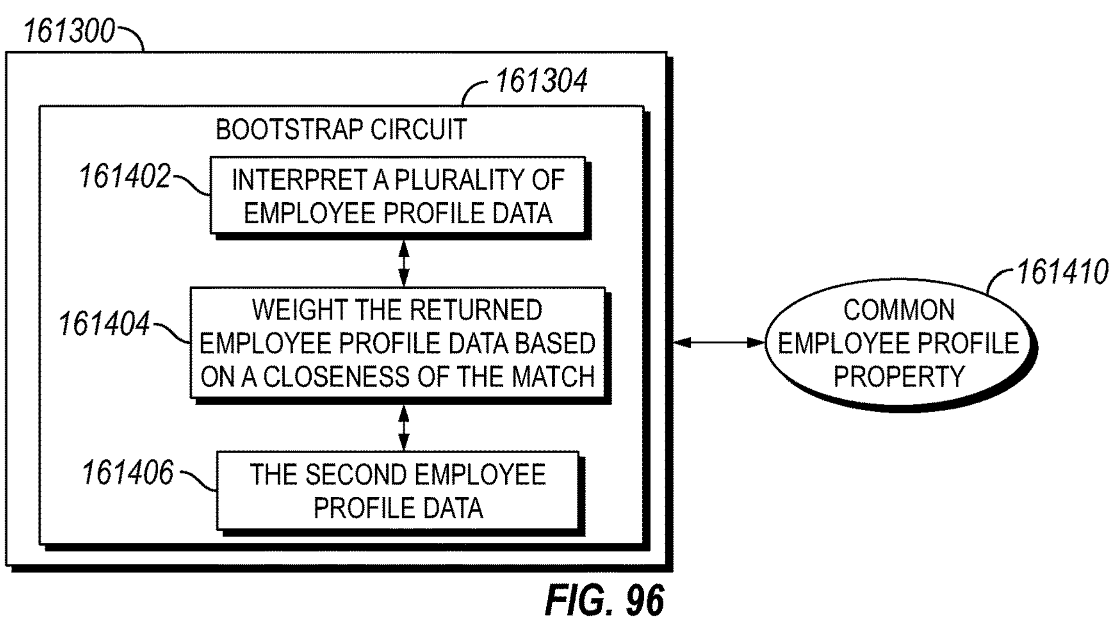
FIG. 96 is a schematic diagram depicting certain further aspects of an apparatus for a bootstrap scheduler, in accordance with an embodiment of the current disclosure.

Referring to FIG. 96, certain further aspects of the apparatus 161300 are described following, any one or more of which may be present in certain embodiments. In embodiments, the bootstrap circuit is further structured to: interpret a plurality of employee profile data returned via querying the one or more databases 161402. In such embodiments, for each of the plurality of returned employee profile data, the bootstrap circuit 161304 may: weight the returned employee profile data based on a closeness of the match between the returned employee profile data and the first employee profile data 161404; and select, based at least in part on the weightings, the second employee profile data from the plurality of returned employee profile data 161406. In embodiments, the closeness of the match may be based at least in part on an employee profile property 161410 common between the first employee profile data and the plurality of returned employee profile data. The employee profile property may include: an on-time rating, a tardiness rating, a friendliness rating, an efficacy rating, and the like. In embodiments, the second employee profile data may correspond to an average of a plurality of employee profiles.

Figure 97:
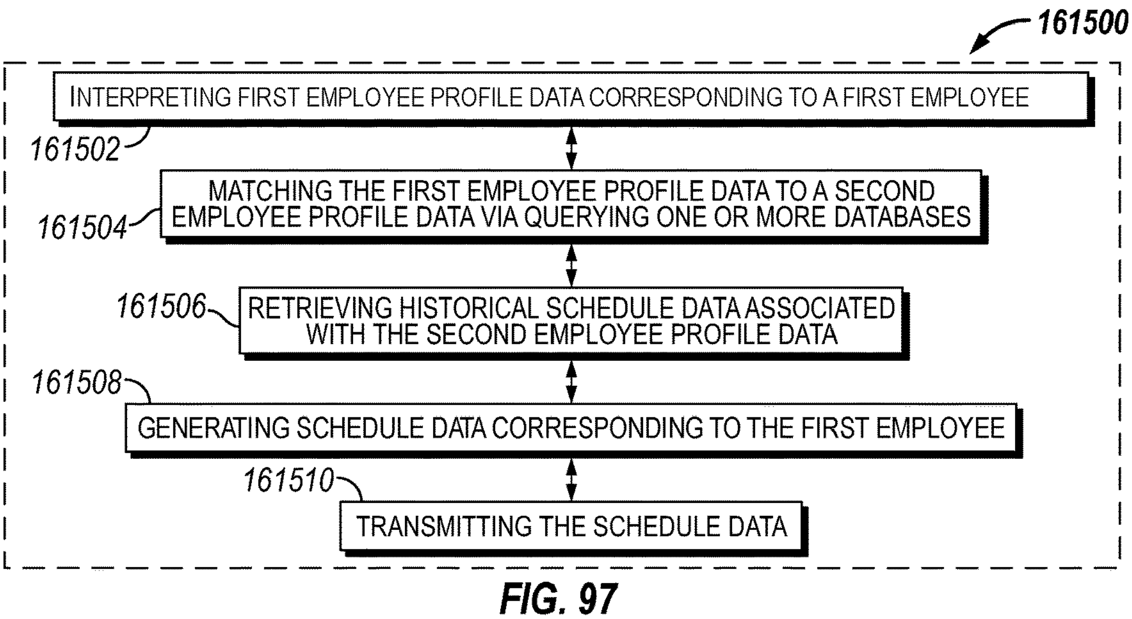
FIG. 97 is a flowchart depicting a method for a bootstrap scheduler, in accordance with an embodiment of the current disclosure.

Referring to FIG. 97, a method 161500 for bootstrap scheduling, in accordance with embodiments of the current disclosure, is shown. The method 161500 includes interpreting, via an employee data interpretation circuit, first employee profile data corresponding to a first employee 161502; matching, via a bootstrap circuit, the first employee profile data to second employee profile data via querying one or more databases 161504; and retrieving, via the bootstrap circuit, historical schedule data associated with the second employee profile data via querying the one or more databases 161506. In embodiments, the method 161500 may further include generating, via the bootstrap circuit, based at least in part on the retrieved historical schedule data, schedule data corresponding to the first employee 161508; and transmitting, via a schedule data provisioning circuit, the schedule data 161510.

Figure 98:
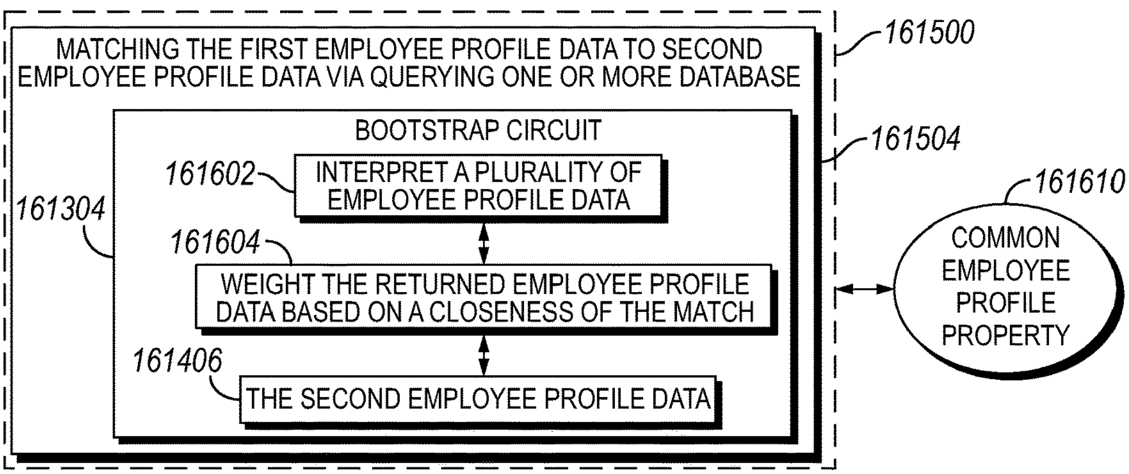
FIG. 98 is a flowchart depicting certain further aspects of a method for a bootstrap scheduler, in accordance with an embodiment of the current disclosure.

Referring to FIG. 98, certain further aspects of the method 161500 are described following, any one or more of which may be present in certain embodiments. In embodiments, matching the first employee profile data to the second employee profile data further includes: interpreting a plurality of employee profile data returned via querying the one or more databases 161602. The method 161500 may further include: for each of the plurality of returned employee profile data, weighting the returned employee profile data based on a closeness of the match between the returned employee profile data and the first employee profile data 161604; and selecting, based at least in part on the weightings, the second employee profile data from the plurality of returned employee profile data 161606. As disclosed herein, in embodiments, the closeness of the matching may be based at least in part on an employee profile property 161610 common between the first employee profile data and the plurality of returned employee profile data. In embodiments, the employee profile property includes one or more of: an on-time rating, a tardiness rating, a friendliness rating, an efficacy rating, and the like. The second employee profile data may correspond to an average of a plurality of employee profiles.

Figure 99:
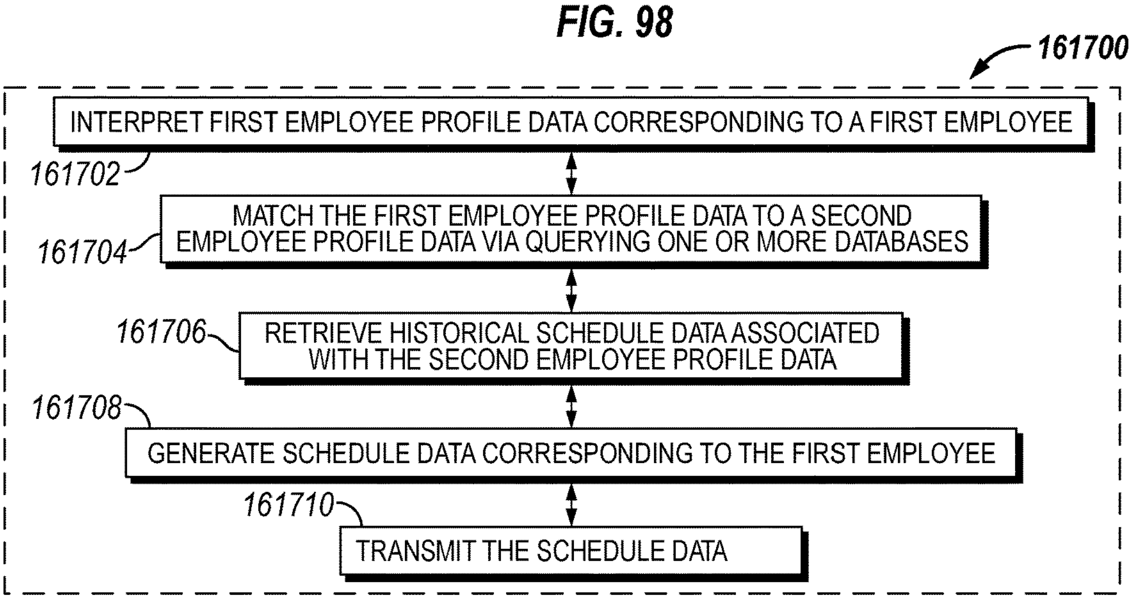
FIG. 99 is a block diagram depicting a non-transitory computer-readable medium for a bootstrap scheduler, in accordance with an embodiment of the current disclosure.

Referring to FIG. 99, a non-transitory computer-readable medium 161700 may be provided. The non-transitory computer-readable medium 161700 includes instructions that adapt at least one processor to: interpret first employee profile data corresponding to a first employee 161702; match the first employee profile data to second employee profile data via querying one or more databases 161704; and retrieve historical schedule data associated with the second employee profile data via querying the one or more databases 161706. The instructions further adapt the at least one processor to: generate based at least in part on the retrieved historical schedule data, schedule data corresponding to the first employee 161708; and transmit the schedule data 161710.

Figure 100:
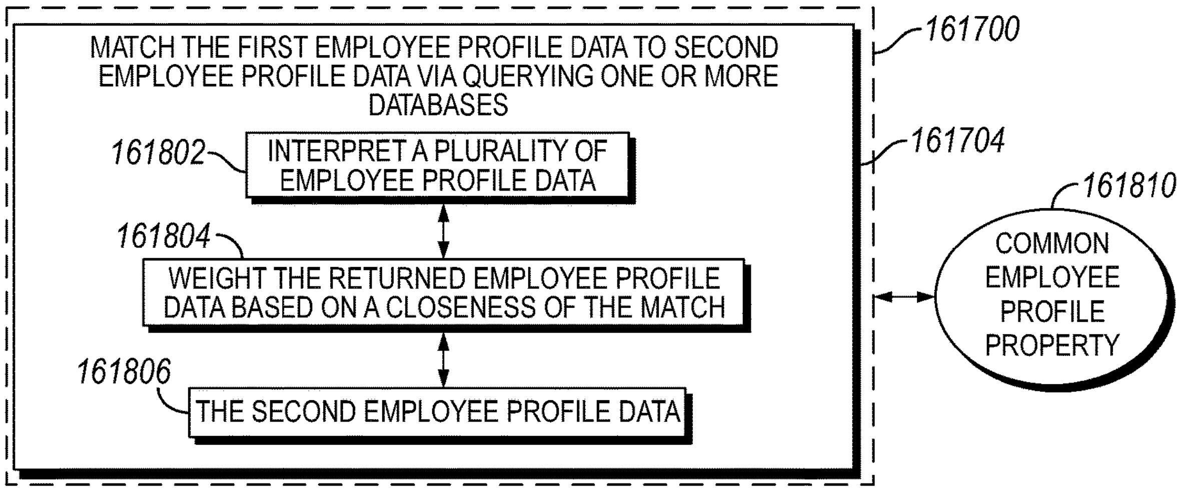
FIG. 100 is a block diagram depicting certain further aspects of a non-transitory computer-readable medium for a bootstrap scheduler, in accordance with an embodiment of the current disclosure.

Referring to FIG. 100, certain further aspects of the non-transitory computer-readable medium 161700 are described following, any one or more of which may be present in certain embodiments. In embodiments, matching the first employee profile data to the second employee profile data includes: interpreting a plurality of employee profile data returned via querying the one or more databases 161802; and, for each of the plurality of returned employee profile data, weighting the returned employee profile data based on a closeness of the match between the returned employee profile data and the first employee profile data 161804. In embodiments, matching the first employee profile data to the second employee profile data further includes selecting, based at least in part on the weightings, the second employee profile data from the plurality of returned employee profile data 161806. As disclosed herein, in embodiments, the closeness of the matching is based at least in part on an employee profile property 161810 common between the first employee profile data and the plurality of returned employee profile data. The employee profile property may include one or more of: an on-time rating, a tardiness rating, a friendliness rating, an efficacy rating, and the like. In embodiments, the second employee profile data corresponds to an average of a plurality of employee profiles.

Figure 101:
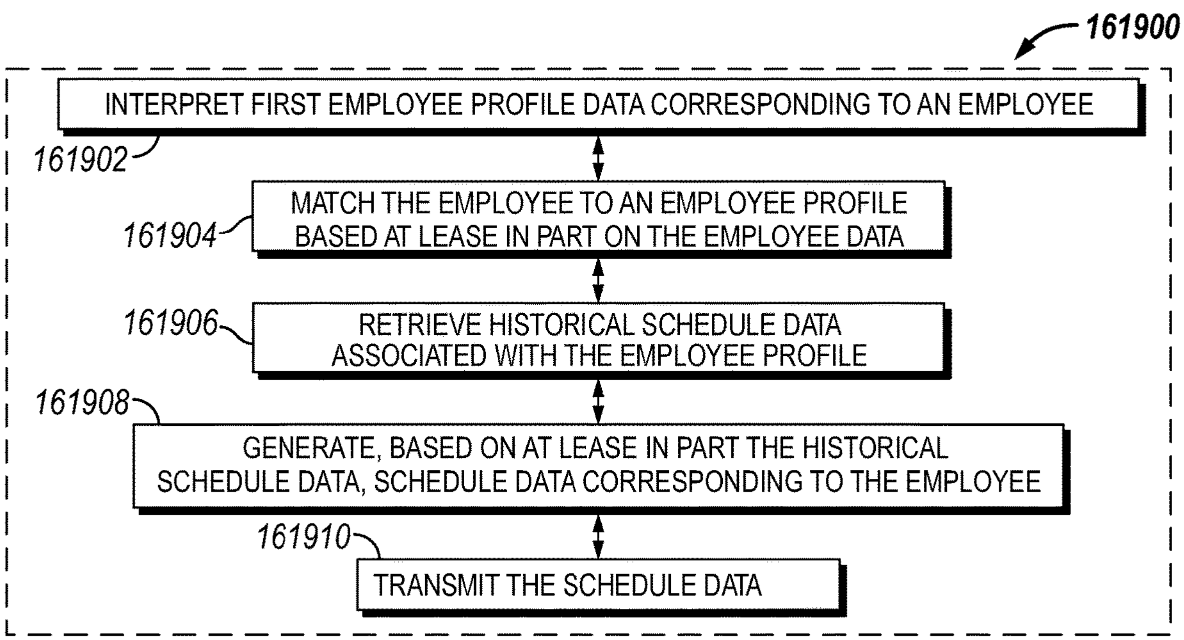
FIG. 101 is a flowchart depicting another method for a bootstrap scheduler, in accordance with embodiments of the current disclosure.

Illustrated in FIG. 101 is another method 161900 for bootstrap scheduling, in accordance with embodiments of the current disclosure. The method 161900 may be performed via the apparatus 161300 and/or any other computing device disclosed herein. The method 161900 includes interpreting employee data corresponding to an employee 161902; matching the employee to an employee profile based at least in part on the employee data 161904; retrieving historical schedule data associated with the employee profile 161906; generate, based at least in part on the historical schedule data, schedule data corresponding to the employee 161908; and transmitting the schedule data 161910. In embodiments, the employee profile may correspond to and/or otherwise be representative of a single employee. In embodiments, the employee profile may correspond to and/or otherwise be representative of a plurality of employees, e.g., the employee profile may be a composite average generated by data corresponding to more than one employee.

One non-limiting use case of the method 161900 includes a scenario where a newly formed business hires an initial set of employees and, as such, does not have any historical data for the initial set of employees. The initial set of employees may include different types of employees, e.g., engineers, accountants, human resource specialists, etc. Each of the initial set of employees may also have different work ethics, e.g., hard workers, procrastinators, habitually tardy, etc. A plurality of employee profiles each corresponding to one of a combination of employee types and work ethics may have been generated based on historic data collected from a large number of employee in the workforce, e.g., hundreds of employees, thousands of employees, tens-of-thousands of employees, hundreds-of-thousands of employees, etc. Each of the employee profiles may have a corresponding schedule and/or scheduling constraints/attributes based on the historic data collected from the large number of employees. Non-limiting examples of such constraints/attributes include: needs a shift with explicit start and stop times; likely to not return (or return late) if allowed to go offsite for breaks; likely to return if allowed to go offsite for breaks; can work a shift unsupervised; cannot work a shift unsupervised, etc. It will be understood that the employee profiles may not have a 1-to-1 correspondence with the initial set of employees and, as such, each of the initial set of employees may be matched to one or more of the employee profiles. For example, one of the initial set of employees may be a hybrid between an engineer, accountant, and front-end sales manager. As such, the hybrid employee may be matched to three different employee profiles. In embodiments where an employee is matched to more than one profile, the one or more profiles may be weighted, for purposes of schedule data generation, based on a weighting of the different roles for the employee. For example, the hybrid employee may spend 60% of their time in the engineering role, 10% of their time in the accountant role, and 30% of their time in the front-end sales manger role. As such, a first matched profiled for the hybrid employee may corresponds to the engineering role and receive a weighting of 60%; a second matched profiled for the hybrid employee may corresponds to the accountant role and receive a weighting of 10%; and a third matched profiled for the hybrid employee may corresponds to the front-end sales manager role and receive a weighting of 30%.

The systems and methods described herein for bootstrap scheduling provide various technical benefits and improvements over known methods. In one aspect, the systems and methods improve aspects of training and utilization of models. Embodiments of the systems and methods described herein improve the adaptability of trained models to different data sets. Embodiments of the systems and methods described herein improve the adaptability of trained models to scenarios and data for which the models were not explicitly trained. In one example, models are adapted to new data with company templates. Company templates are used as data approximations allowing the use of models where data is not yet available or there is not enough data to execute a model.

Embodiments may include agglomerate model feature space connectors. Embodiments of the system may include Agglomerate Model Feature Space Connectors that provide for an intelligent connection between the output of one agglomerated model and the input of a second agglomerated model. The connectors support the communication of value, confidence and optimization surface descriptors between agglomerate models.

Embodiments may include serially connected agglomerate models. In embodiments, a first agglomerated model may be serially connected to a second agglomerated model such that an output of the first agglomerated model becomes an input/feature of a second agglomerated model. A next agglomerated model may then be connected to the first or second agglomerated model, or alternatively, the first and second agglomerated model, such that an output(s) of the first agglomerate model and/or an output(s) of the second agglomerated model are inputs of the next agglomerated model. Such a connection is referred to herein as an Agglomerate Model Feature Space Connector. If a set of connected agglomerated models are connected in such a manner that the connections do not form a loop, the set of agglomerated models are serially connected. A serially connected set of agglomerated models may include one or more agglomerated models.

Embodiments may include recursively connected agglomerate models._Alternatively, in embodiments, a first set of serially connected agglomerated models may be recursively connected to a second set of serially connected agglomerated models such that an output or outputs of the first set of agglomerated models is an input or inputs of a second set of serially connected agglomerated, and for which an output or outputs of the second set of serially connected agglomerated is an input or inputs for the first set of serially connected agglomerated models.

Embodiments may include feature value descriptor. In embodiments, any given agglomerate model may output a feature value that is consumed by another agglomerate model, directly, after the application of a feature space conversion, or in combination with other feature values. Feature values may be represented by any type of number, string, object, list, array, map, feature value description, feature value or combination thereof.

In embodiments, the feature value descriptor contains a feature value and/or other information describing model confidence, e.g., likelihood that the actual behavior results in the feature value output by the agglomerate model; likelihood that the actual behavior returns results better than the modeled feature value output; likelihood that the actual behavior returns results worse than the feature value; a list of outputs and likelihoods; a feature value surface describing the feature value and how the value responds to changes to a feature value input; or any combination thereof.

In an embodiment, a feature value descriptor contains one or more of a feature value for feature values that may be represented by a continuous function in the region of the feature value, a description of how the feature value responds to changes in one or more agglomerate model feature input values, where the feature input values define the conditions over which a given agglomerate model is executed, or for which the output of the agglomerate model includes an output feature value which the Feature Value Descriptor corresponds to.

In embodiments, a feature value descriptor may represent a non-continuous set of results. Alternatively, the feature value descriptor may contain a feature value that is represented by a non-continuous function.

In embodiments, a feature value descriptor may represent a set of values, which may vary along some axes non-continuously, and which may be represented along other axes by continuous functions.

In embodiments, a feature value descriptor (or descriptors) may describe the modeled or learned behavior of the feature value descriptor in response to changes in another feature value descriptor. As will be understood, in many cases, the other feature value descriptor might represent an input to the agglomerate model generating the output value, but more generically, the feature value descriptor might describe how a feature value might respond to changes in any correlated feature value.

Embodiments may include feature value descriptor generation. In some embodiments, an agglomerate model might generate feature value descriptors directly. In other embodiments, an agglomerate model might generate partially complete feature value descriptors, and the hierarchical feature propagator determines if feature value descriptor information is desired, and if so, it may add additional value description information. The hierarchical feature propagator and other system components may operate in one of three modes: Learning Mode; Mapping Mode; and Extrapolation Mode.

In learning mode, the system may run one or more agglomerate models using retrospective data, and variations of input data where uncertainty exists, or where variations of input data are desirable to develop a better understanding of the modeled response about the expected output. In learning mode, the retrospective data may be used to reinforce (positively or negatively) to improve the performance of an agglomerate model. In addition to, or as an alternative, the retrospective data may be used to model (learn) perceived biases in the agglomerate model output, to model (learn) the actual sensitivity of an agglomerate model feature value output to changes to the agglomerate model inputs. In learning mode, the system may run zero, one or more "test" runs to generate outputs that match the actual, retrospective values achieved, and to use these runs to reinforce agglomerate model behaviors or to learn how the Hierarchical Feature Propagator may better develop effective Feature Value Descriptors based on missing or incomplete descriptors. In Learning Mode, the system might train over a relatively large number of "test points". This mode may be preferentially designed to run when processing resources are available, are preferentially priced, when deviations in the predicted values & confidences from an agglomerate model fall outside of expectations, or when there is a desire to improve the training of one or more agglomerate models, or when there is a desire to improve the training of the Hierarchical Feature Propagator.

In Mapping Mode, the system may run one or more agglomerate models in such a way that multiple output feature values are produced, such that instead of producing a feature value output incorporating a single predicted value, a feature value descriptor can better describe how a feature value might respond to changes in any correlated feature value. As the hierarchical feature propagator "learns" about the variation of a given feature value output based on changes to another correlated feature value or feature value input, the hierarchical feature propagator will learn to propagate sufficiently reliable results with fewer agglomerate model runs.

In extrapolation mode, the hierarchical feature propagator fills in missing feature value data and/or descriptions to generate feature value descriptors.

Embodiments may include hierarchical feature propagation. As will be understood, embodiments of the disclosure may provide for a self-organizing agglomerate scheduler, which may form part of module/component, e.g., 124 (FIG. 1), and/or the HFP 332 (FIG. 2). For example, to prevent overfitting and to account for sparse or missing data, the Hierarchical Feature Propagator may propagate feature value results which blend results from historical runs, other locations and/or groups, correlated industry values, etc. In embodiments, the hierarchical feature propagator may fill-in missing data based on other comparable runs.

Figure 102:
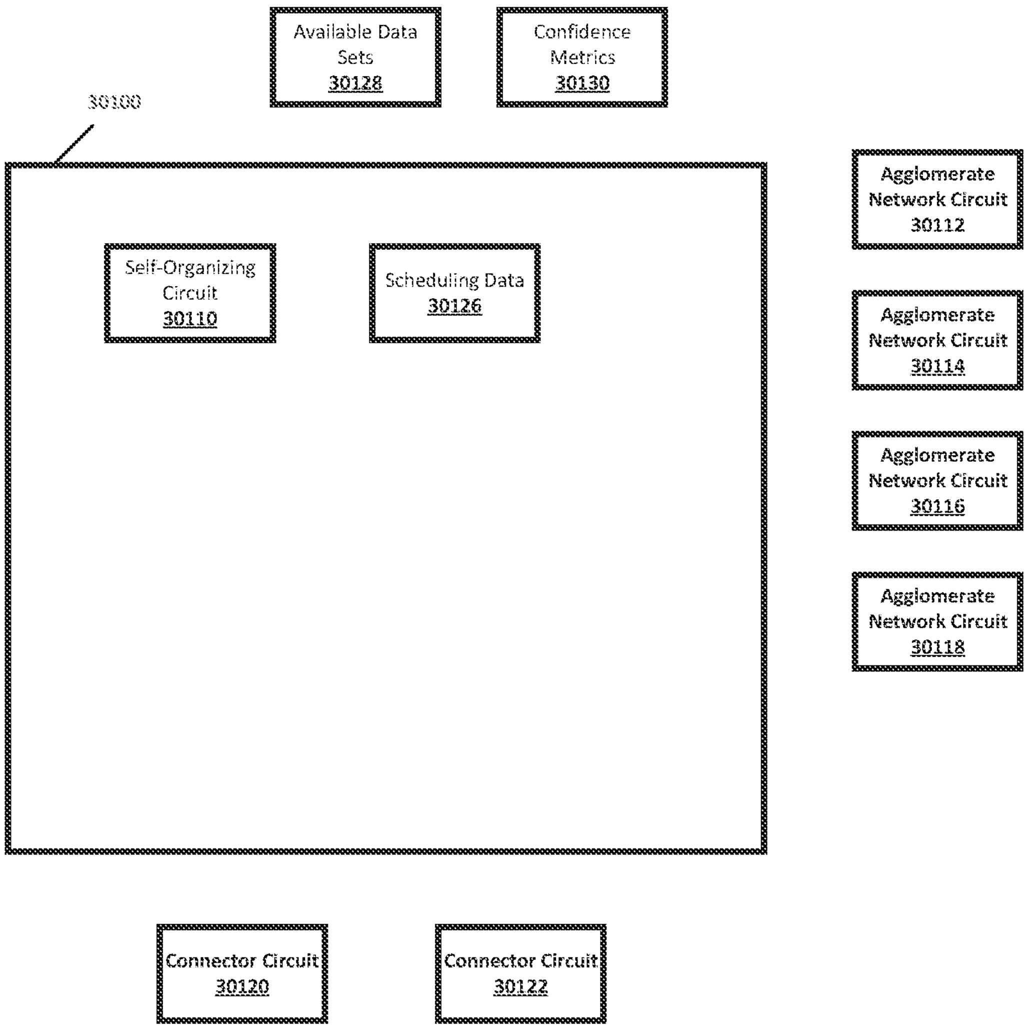
FIG. 102 is a schematic diagram of a self-organizing agglomerate network, in accordance with embodiments of the current disclosure.

Referring now to FIG. 102, embodiments of an agglomerate network 30100 may include one or more self-organizing circuits 30110 which, as described in herein, may be structured to determine which modules 30112, 30114, 30116, 30118, and/or connectors 30120, 30122 should be included in the agglomerate network 30100 and/or how to arrange/assembly/configure them. As disclosed herein, an agglomerate network, e.g., 30110, may include two or more modules 30112, 30114, 30116, 30118 that manipulate a common set of scheduling data 30126. The number of modules, e.g., 30112, 30114, 30116, 30118, within an agglomerate network may range from: 2-1,000; 2-500; 2-100; 2-50; 2-25; 2-10; 2-5. Module/circuit types may include schedulers, weather forecasters, retention predictors, sales predictors, connectors, and/or any type of agglomerate network circuit and/or connector described herein. Embodiments of the organizing circuit 30110 may use artificial intelligence to select which agglomerate network circuits and/or connectors are included in the agglomerate network 30100. Embodiments of the organizing circuit 30110 may determine available data sets, e.g., current weather information, current traffic patterns, etc., and then select agglomerate network circuits and/or connectors for inclusion in an agglomerate network based on available data sets 30128.

Certain embodiments may configure the network 30100 according to confidence metrics 30130 for the available data 30128, modules 30112, 30114, 30116, 30118, and the like. In some embodiments, the agglomerate network 30100 may reorganize in real-time.

Agglomerate network modules/circuits, e.g., 30112, 30114, 30116, 30118, and connectors, e.g., 30120, 30122, may be added based on confidence metrics 30130 of modules for industry, location, and the like. For example, a module that has a low confidence of its predicted output may be dynamically removed from the network 30100. A confidence metric 30130 may be generated by its corresponding agglomerate network module, e.g., 30112, 30114, 30116, 30118 and/or connector 30120, 30122. In embodiments, an agglomerate network module, e.g., 30112, 30114, 30116, 30118 and/or connector 30120, 30122, may be removed if its corresponding confidence level exceeds a threshold, e.g., a lower bound, which may be predetermined or dynamically determined. For example, a weather sales prediction module/circuit may be excluded from an agglomerate network if a confidence metric for predicting sales based on the weather is less than a desirable level, e.g., 80%.

In embodiments, an agglomerate network may include one or more self-organizing modules 30110 that parse and/or interpret parameters for a particular scheduling scenario for processing either by logic gates and/or an AI module to generate a list of modules, e.g., 30112, 30114, 30116, 30118, for inclusion in the agglomerate network. For example, if the available data sets 30128 include weather data, then the list of modules may include two or more weather modules which are available for inclusion in the agglomerate network. The list may be pruned based on the confidence metrics 30130, e.g., only weather modules with high confidence levels, e.g., >80%, may be placed on the list. In embodiments, the logic gates and/or the AI module may also select connectors, e.g., 30120, 30122, and/or an arrangement for the connectors, i.e., how the connectors connect the various included modules in the agglomerate network.

Embodiments may also provide for a training process of the AI module(s), e.g., how the AI module(s) learn to select agglomerate network modules/circuits, connectors, and/or arrangement of connectors. Such training may include a training set that includes various types of mock available data sets, e.g., 30130, paired/labeled with various configurations of agglomerate network circuits/modules connected via connectors, where the AI learns to generate agglomerate network configurations based on the training set.

Figure 103:
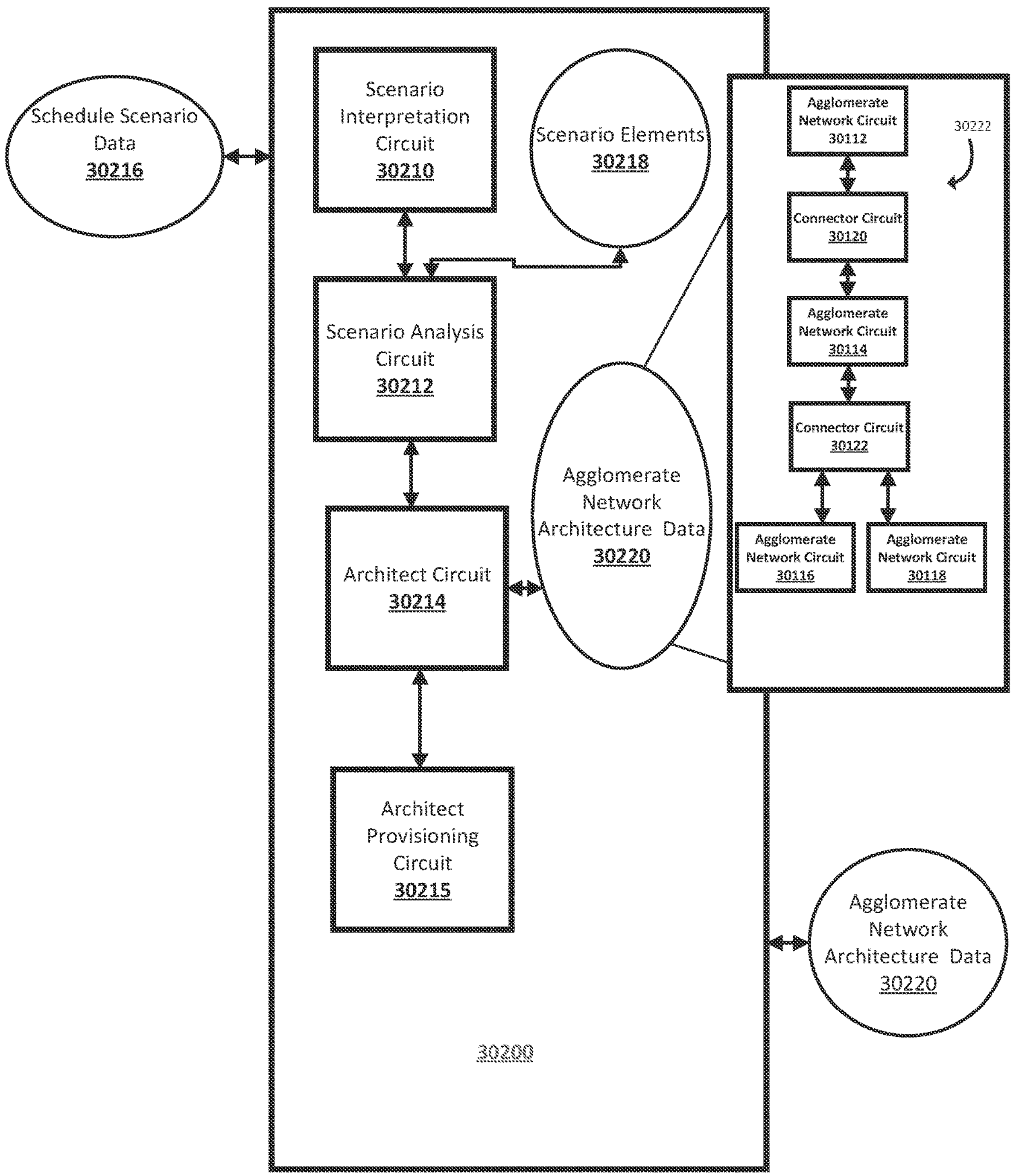
FIG. 103 is a schematic diagram of an apparatus for self-organizing an agglomerate network, in accordance with embodiments of the current disclosure.

Shown in FIG. 103 is an apparatus 30200 for self-organizing an agglomerate network, e.g., 30100 (FIG. 102). The apparatus 30200 may be included in the agglomerate network 30100 as an organizing circuit 30110 (FIG. 1) or it may be apart, e.g., "outside", of any agglomerate network. In embodiments, the apparatus 30200 may be a dedicated hardware device or form part of any computing device disclosed herein. Embodiments of the apparatus 30200 may include a scenario interpretation circuit 30210, a scenario analysis circuit 30212, an architect circuit 30214, and/or an architecture provisioning circuit 30215. The scenario interpretation circuit 30210 may be structured to interpret schedule scenario data 30216. The scenario analysis circuit 30212 may be structured to extract one or more scenario elements 30218 from the schedule scenario data 30216. The architect circuit 30214 may be structured to: identify, based at least in part on the one or more scenario elements 30218, one or more agglomerate modules/circuits, e.g., 30112, 30114, 30116, 30118, and one or more connector circuits, e.g., 30120, 30122; and generate agglomerate network architecture data 30220 that defines, in part, a structural relationship 30222 between at least one of the one or more agglomerate network circuits and at least one of the one or more connector circuits. The architecture provisioning circuit 30215 may be structured to transmit the agglomerate network architecture data 30220.

In embodiments, the one or more scenario elements 30218 may include at least one of: a weather event, a start date of a scenario and/or an end date of the scenario, a profile of an entity, a maintenance schedule, shipment schedule, a delivery schedule, etc. In embodiments, identification of the one or more agglomerate network modules/circuits, e.g., 30112, 30114, 30116, 30118, and the one or more connector circuits, e.g., 30120, 30122, may be based at least in part on a combination of scenario elements 30218. In embodiments, the profile of the entity may include at least one of: a listing of employees, a listing of positions, one or more site locations, a budget, etc.

In embodiments, identifying the one or more agglomerate network modules/circuits, e.g., 30112, 30114, 30116, 30118, and the one or more connector circuits, e.g., 30120, 30122, may be based at least in part on one or more confidence metrics 30130 (FIG. 102), e.g., ratings which may be generated via artificial intelligence. For example, an artificial intelligence may be trained to recognize which agglomerate network circuit(s) best correspond to a given class of scenario element, e.g., weather modules/circuits for time periods falling over the winter in a northern geographic location. In embodiments, the one or more agglomerate modules/circuits and the one or more connector modules/circuits may be selected from a predetermined listing of the same, wherein the listing is either directly provided (e.g., hard coded or entered via a user) or retrieved from a database.

Figure 104:
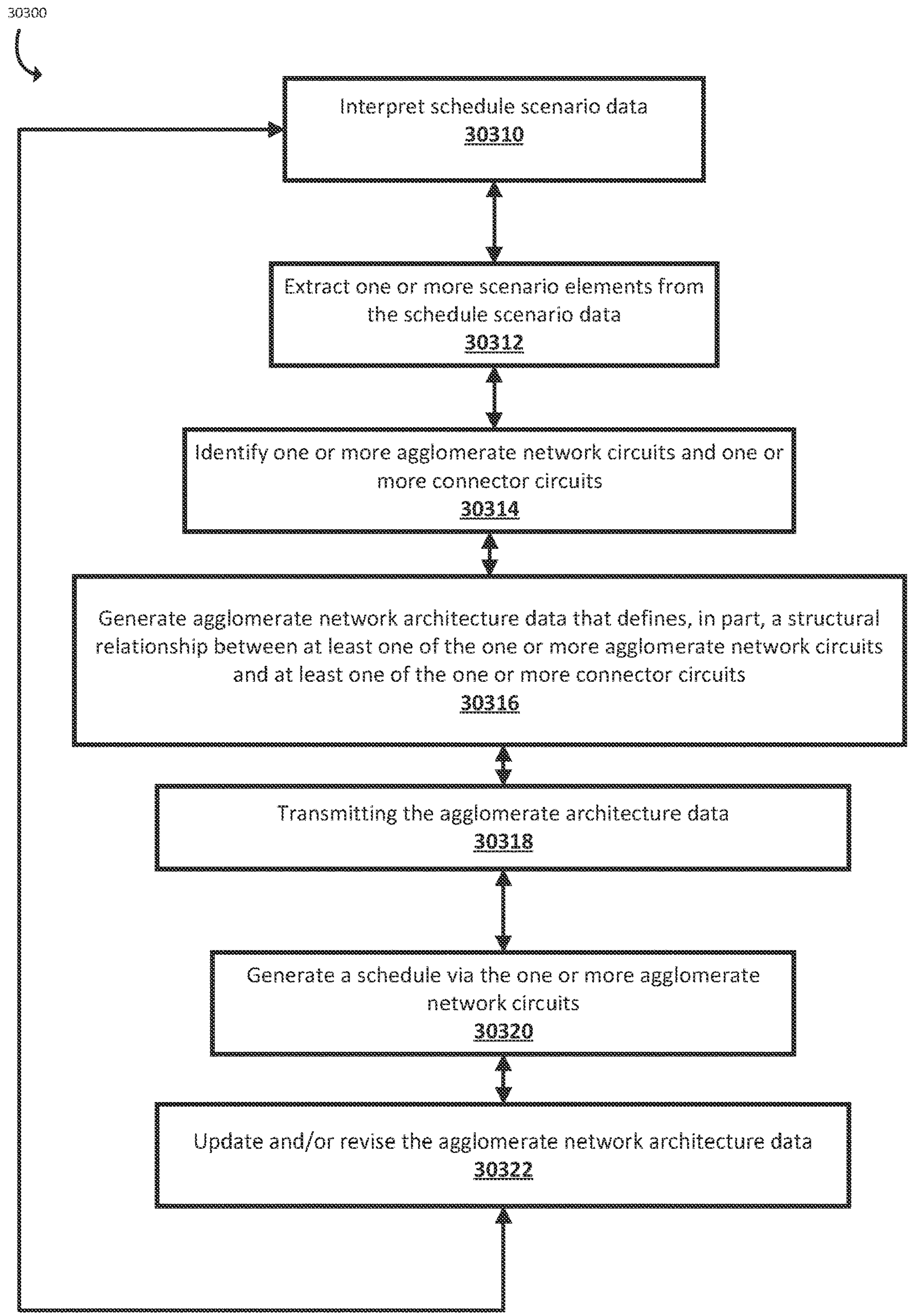
FIG. 104 is a flowchart depicting a method for self-organizing an agglomerate network, in accordance with embodiments of the current disclosure.

Illustrated in FIG. 104 is a method 30300 for self-organizing an agglomerate network e.g., 30100 (FIG. 102). The method 30300 may be performed via apparatus 30200 (FIG. 103) and/or any other computing device disclosed herein. The method 30300 may include interpreting, via a scenario interpretation circuit, schedule scenario data 30310. The method 30300 may further include extracting, via a scenario analysis circuit, one or more scenario elements from the schedule scenario data 30312. The method 30300 may further include identifying, via an architect circuit and based at least in part on the one or more scenario elements, one or more agglomerate network circuits and one or more connector circuits 30314. The method 30300 may further include generating, via the architect circuit, agglomerate network architecture data that defines, in part, a structural relationship between at least one of the one or more agglomerate network circuits and at least one of the one or more connector circuits 30316. The method 30300 may further include transmitting, via an architecture provisioning circuit, the agglomerate network architecture data 30318. In embodiments, the method 30300 may further include generating a schedule via the one or more agglomerate network circuits 30320. In embodiments, the method may further include updating and/or revising the agglomerate network architecture data 30322, which may be in in real-time or near-real time. The update(s) and/or revision(s) may be based on updates to the scheduling scenario. The update(s) and/or revision(s) may be based on feedback/results from execution of the agglomerate network in generating a schedule for the scenario.

Figure 105:
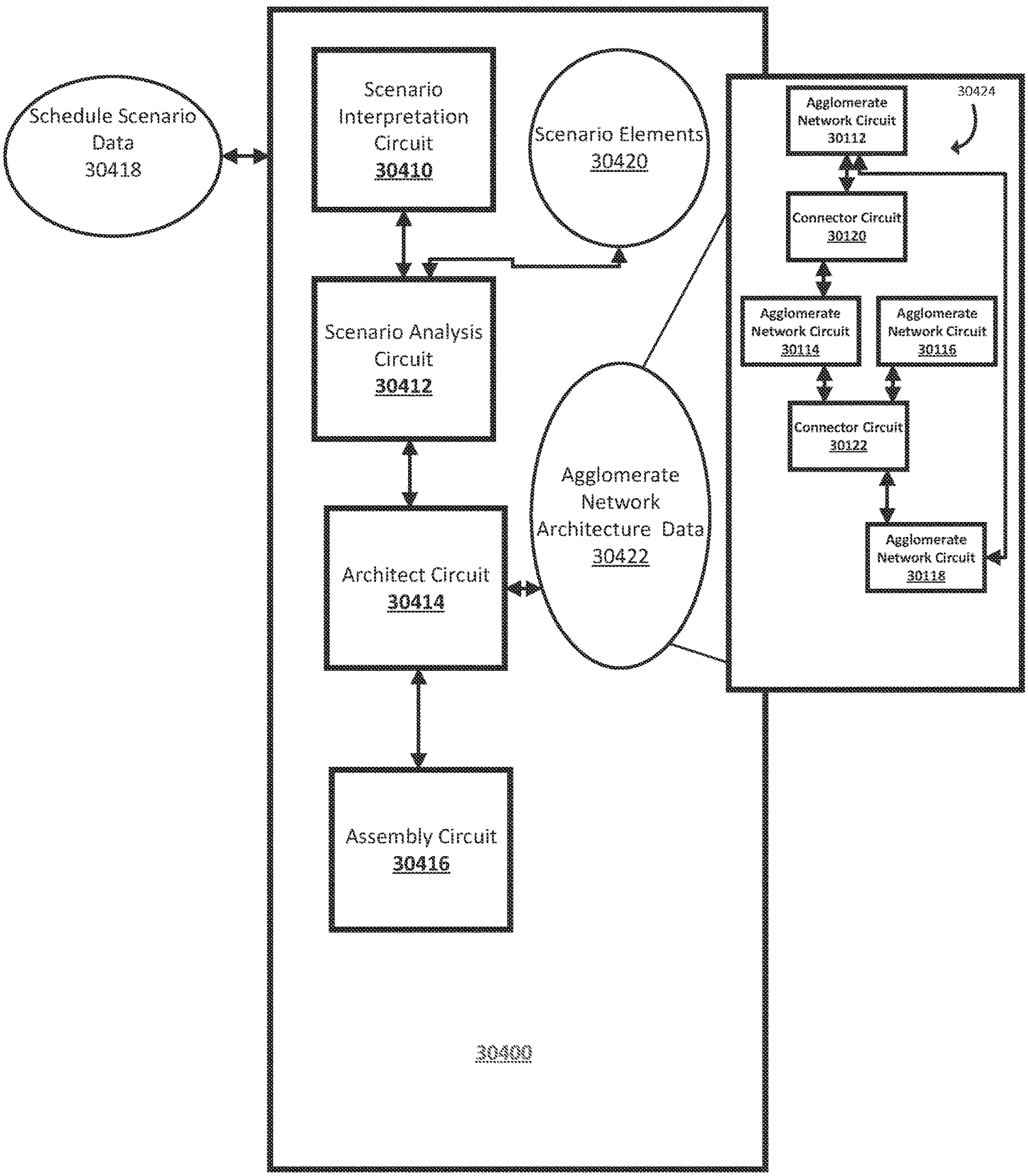
FIG. 105 is a schematic diagram of another apparatus for self-organizing an agglomerate network, in accordance with embodiments of the current disclosure.

Referring now to FIG. 105, another apparatus 30400 for self-organizing an agglomerate network e.g., 30100 (FIG. 102) is shown. The apparatus 30400 may be included in the agglomerate network 30100 as an organizing circuit 30110 (FIG. 102) or it may be apart, e.g., "outside", of any agglomerate network. In embodiments, the apparatus 30400 may be a dedicated hardware device or form part of any computing device disclosed herein. The apparatus 30400 may include a scenario interpretation circuit 30410, a scenario analysis circuit 30412, an architect circuit 30414, and/or an assembly circuit 30416. The scenario interpretation circuit 30410 may be structured to interpret schedule scenario data 30418. The scenario analysis circuit 30412 may be structured to extract one or more scenario elements 30420 from the schedule scenario data 30418. The architect circuit 30414 may be structured to identify, based at least in part on the one or more scenario elements 30420, one or more agglomerate modules/circuits, e.g., 30112, 30114, 30116, 30118 and one or more connector modules/circuits, e.g., 30120, 30122. The architect circuit 30414 may be further structured to generate agglomerate network architecture data 30422 that defines, in part, one or more structural relationships 30424 between at least one of the one or more agglomerate modules/circuits and at least one of the one or more connector modules/circuits. The assembly circuit 30416 may be structured to assemble the one or more agglomerate modules/circuits, e.g., 30112, 30114, 30116, 30118, and/or the one or more connector modules/circuits, e.g., 30120, 30122 based at least in part on the one or more structural relationships 30424. One non-limiting example of assembling the one or more agglomerate modules/circuits, e.g., 30112, 30114, 30116, 30118, and/or the one or more connector modules/circuits, e.g., 30120, 30122 includes adjusting a connector module/circuit such that the connector/module circuit has access to a memory location storing the output(s) of an agglomerate module/circuit, which the connector module/circuit may treat as an input, and/or adjusting a connector module/circuit such that the connector module/circuit has access to a memory location accessed by an agglomerate network circuit for receiving input(s). Another non-limiting example of assembling the one or more agglomerate modules/circuits, e.g., 30112, 30114, 30116, 30118, and/or the one or more connector modules/circuits, e.g., 30120, 30122 includes using an intermediate data array to store outputs and/or inputs of agglomerate network circuits, wherein the connectors store inputs and/or outputs of the agglomerate network circuits so that the inputs and/or outputs are accessible via other connectors which may pass the inputs and/or outputs in the array to one or more agglomerate network circuits. In other words, embodiments of the current disclosure may use a data array, or other data structure, to store data in a manner commonly accessible by the connectors and/or agglomerate network circuits within an agglomerate network.

Accordingly, connector circuits/modules may facilitate a 1-to-1 connection between agglomerate network circuits/models; connector circuits/modules may facilitate a 1-to-many connection between agglomerate network circuits/models; connector circuits/modules may facilitate a many-to-1 connection between agglomerate network circuits/models; and/or connector circuits/modules may facilitate a many-to-many connection between agglomerate network circuits/models. In embodiments, connector circuits/modules receive and/or access data outputted by an agglomerate network circuit and pass the data, or data derived from the output data, as input to the same agglomerate network circuit.

Figure 106:
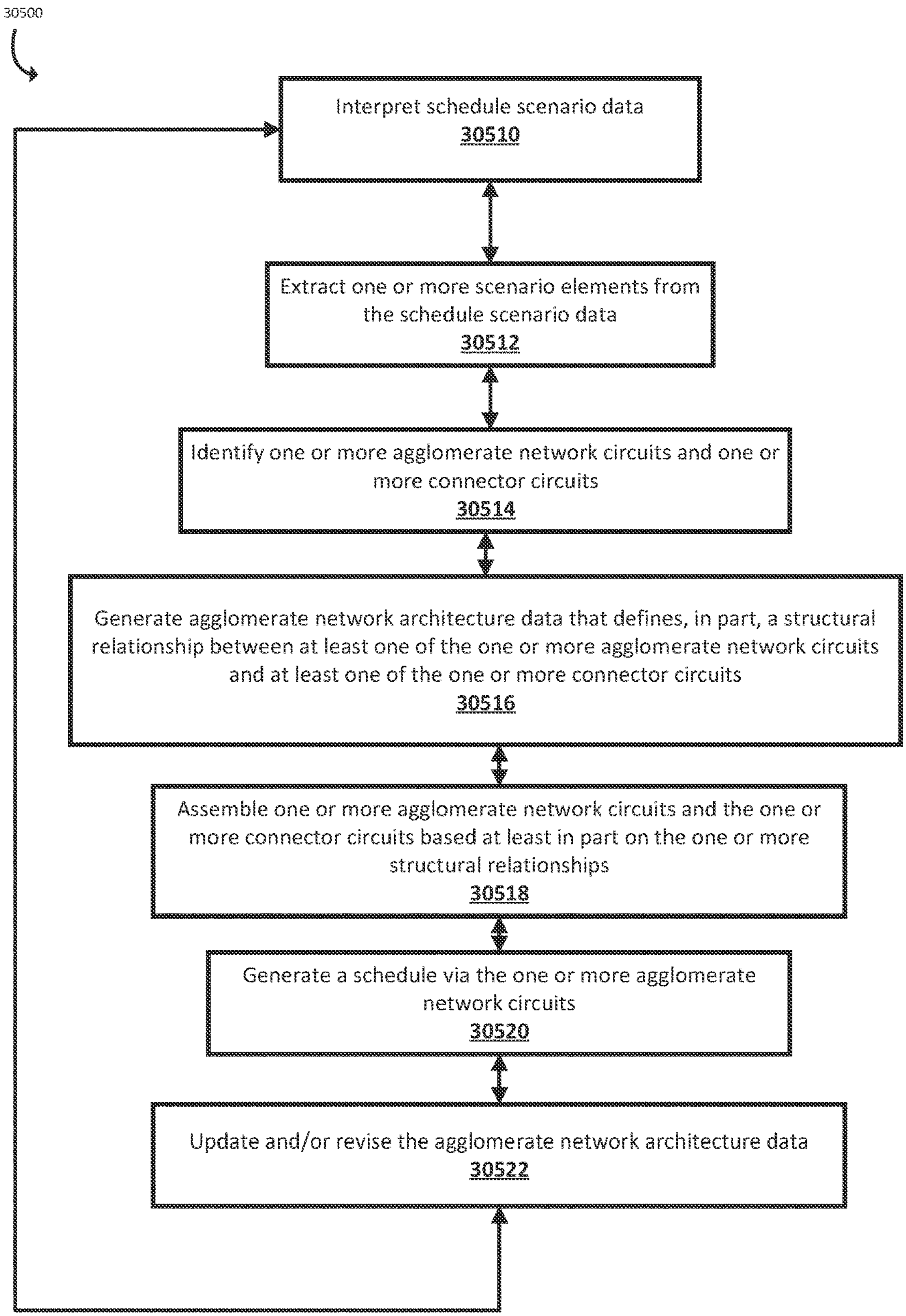
FIG. 106 is a flowchart depicting another method for self-organizing an agglomerate network, in accordance with embodiments of the current disclosure.

Illustrated in FIG. 106 is another method 30500 for self-organizing an agglomerate network e.g., 30100 (FIG. 102). The method 30500 may be performed via apparatus 30400 (FIG. 105) and/or any other computing device disclosed herein. The method 30500 may include interpreting, via a scenario interpretation circuit, schedule scenario data 30510. The method 30500 may include extracting, via a scenario analysis circuit, one or more scenario elements from the schedule scenario data 30512. In embodiments, the extracted one or more scenario elements may include a weather event, a sales event, a holiday event, a location, and/or a period of time. The method 30500 may include identifying, via an architect circuit and based at least in part on the one or more scenario elements, one or more agglomerate network circuits and one or more connector circuits 30514. The method 30500 may include generating, via the architect circuit, agglomerate network architecture data that defines, in part, one or more structural relationships between at least one of the one or more agglomerate network circuits and at least one of the one or more connector circuits 30516. The method 30500 may further include assembling, via an assembly circuit, the one or more agglomerate network circuits and the one or more connector circuits based at least in part on the one or more structural relationships 30518. In embodiments, the method 30500 may include generating a schedule via the one or more agglomerate network circuits 30520. In embodiments, the method 30500 may further include updating and/or revising the agglomerate network architecture data in real-time and/or near-real time 30522, as described herein.

As will be appreciated, self-organizing agglomerate networks reduce the amount of time for configuring/tailoring agglomerate network circuits/modules and/or connectors for a particular scheduling scenario, as compared to manually assembling an agglomerate network. Further, embodiments of self-organizing agglomerate networks may be able to achieve tighter tailoring, e.g., they include more relevant agglomerate circuits/modules and/or data flow structures, than manual approaches as the artificial intelligence is able to process and analyze schedule scenario data with a degree of detail and speed not practically achievable by a human mind. For example, embodiments of the self-organizing network may be able to assemble themselves within seconds, minutes, and/or hours after the scheduling scenario data has become available; and such self-organizing networks may have tens, hundreds, or thousands of agglomerate network circuits and/or connectors. As will be appreciated, the ability to produce highly tailored agglomerate networks in such periods of time improves the ability of an entity, for which the agglomerate network is being used to generate schedule for, to adapt to changing environments, e.g., weather patterns, seasonal holiday traffic, sporting events, and/or other types of scenario, as described herein, which can affect the efficiency of a schedule, e.g., was the schedule over or understaffed, too strenuous on the employees, or too lenient to the employees, etc.

Embodiments may include interaction with autonomous evolution controller. In embodiments, the Hierarchical Feature Propagator operates in conjunction with the Autonomous Evolution Propagator to determine how many evolutions of an agglomerate model should be executed to generate appropriately detailed feature value descriptors. For example, in certain situations as represented by available agglomerate model inputs, agglomerate model output confidences, and Hierarchical Feature Propagator Extrapolation Mode performance, the system may determine that executing multiple agglomerate model runs is not necessary as the input and output feature values meet confidence thresholds, and thus, the Hierarchical Feature Propagator may operate in a more efficient extrapolation mode. In other cases, however, the Autonomous Evolution Controller may determine several alternative runs of an agglomerate model to better understand the sensitivity of the output to changes in input (known or unknown) conditions. In cases where the feature outputs represent a function that does not continuously vary over at least one input value, the Autonomous Evolution Propagator may determine if a single "most likely" output value is sufficient or whether a set of the most likely output values is desirable. In cases where multiple agglomerated models are connected recursively, the Autonomous Evolution Controller determines how many iterations of a recursive loop are required, or when a recursive loop has successfully returned feature value outputs that meet acceptable confidence criteria. In embodiments, the recursive loop, or number of iterations, may stop when a set of agglomerate models have considered one or more of: at least one input of data, at least an input of another models' output, an input containing a portion of the set of agglomerate models' own output, e.g., one recursion, a particular number of votes, e.g., for a schedule or feature, a particular confidence threshold, and/or an estimate of propagation in a graph or tree of an input. As a non-limiting example of an estimate of propagation on an input, for a balanced binary tree arrangement of n models in an agglomerate network, there may be log(n) steps in time to perform one propagation since the height of the tree is log(n) and each level of the tree can be processed in one step. If the objective were to have every node consider the output of every other node at least once, there would have to be two propagations through the recursive binary tree. Thus, for example, the root model in step log(n)+1 would be able to consider the recursed output of the leaf models that ran in step log(n). Similarly, in embodiments, the leaf models of the tree may only consider the output of other leaf models in the last step which would be step 21*og*(n).

In embodiments, Hierarchical Feature Propagator connectors may take in additional variables to help address inputs not accounted for in a primary trained model, or it can use a connector to merge the results from multiple different models/model runs, or it may use the connector to mix aggregate model results with the primary model results to account for sparse data, or recognizing that results from aggregate models may improve results and reduce over fitting susceptibility.

Embodiments may include aggregating agglomerate scheduling models over variable time horizons. Embodiments of the agglomerate network, e.g., multiple neural networks interfaced together as described herein, may be used by the system to provide for extended horizon scheduling. Extended horizon scheduling may be performed as part of modules/components 124, 126, 128, 130, and/or 132 (FIG. 1). For example, embodiments of the system, as described herein, may use an agglomerate network to generate an employee work schedule, wherein the agglomerate network takes into account long term company objectives, e.g., employee retention. For example, embodiments of the system, as described herein, may merge results from scheduling programs operating at different levels of specificity, e.g., scheduling individuals versus groups of individuals, and across multiple time horizons. For example, an embodiment of the system includes an agglomerated project scheduler that develops a project schedule based on the tasks that are required to be performed over a given time period. This model may run across several projects, each with its own requirements, own time horizons, etc.

Figure 107:
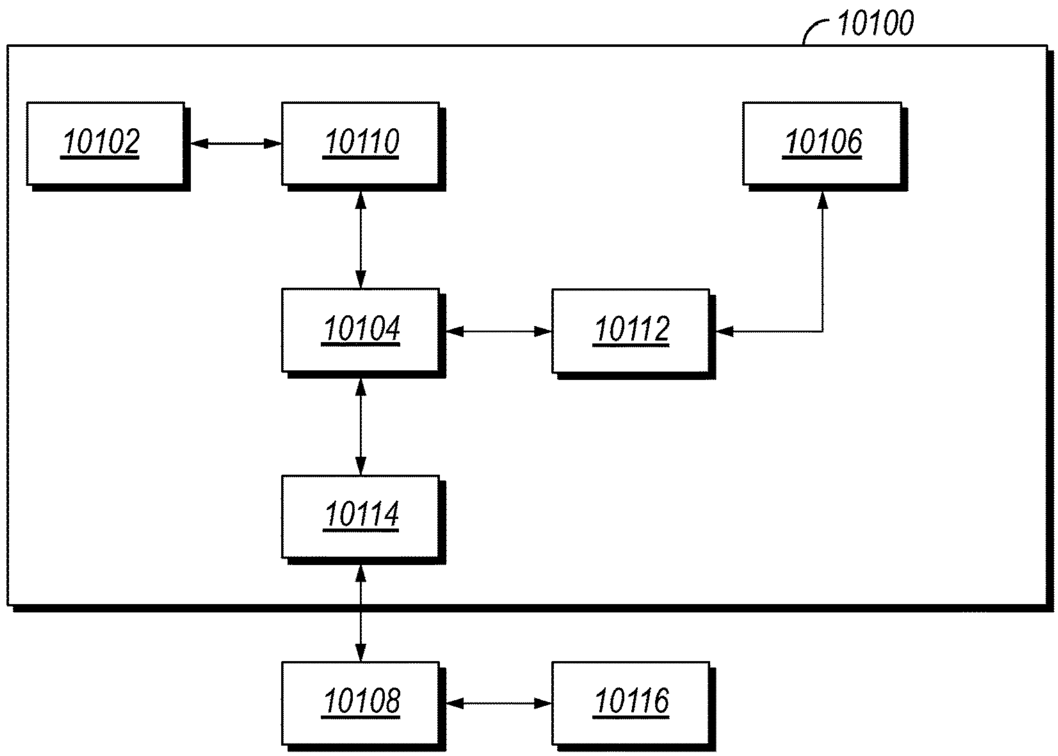
FIG. 107 is a schematic diagram of an agglomerate network for extended horizon scheduling, in accordance with embodiments of the current disclosure.

In embodiments, extended horizon scheduling may be scheduling that takes into account and/or otherwise seeks to improve and/or maintain one or more long-term company/entity objectives, e.g., corporate objectives that generally takes two or more months to achieve. It is to be understood, however, that embodiments of the current disclosure may seek to improve and/or maintain the objectives disclosed herein on a short-term basis, e.g., per day, week, and/or a month. Non-limiting examples of such objectives include: employee retention, morale, profitability, cash flow, company survival, stock value/price, a number of sales, an amount of profit, a cash flow, employee health, number of hours worked, environmental, social and governance (ESG) criteria, reduction in employee accidents, societal objectives, etc. As discussed herein, objectives may be unitized (measured) in terms of per shift, per day, per week, per months, per year, per an amount of currency, per an amount of morale, per an amount of a measure of health, etc. As shown in FIG. 107, embodiments may use an agglomerate network 10100, e.g., multiple neural networks and/or modules/models 10102, 10104, 10106, 10108 configured together via connectors 10110, 10112, 10114, as disclosed herein, to generate schedule data 10116, e.g., data defining, in part, or otherwise corresponding to, a schedule and/or aspects thereof, wherein the various modules/circuits/models within the agglomerate network adjust the schedule data, through one or more cycles as disclosed herein, so as to structure the schedule data to improve one or more company/entity objectives. In embodiments, the schedule data 10116 may correspond to a work schedule that defines one or more shifts for one or more workers, e.g., employees, of an entity, e.g., a business/corporation.

Figure 108:
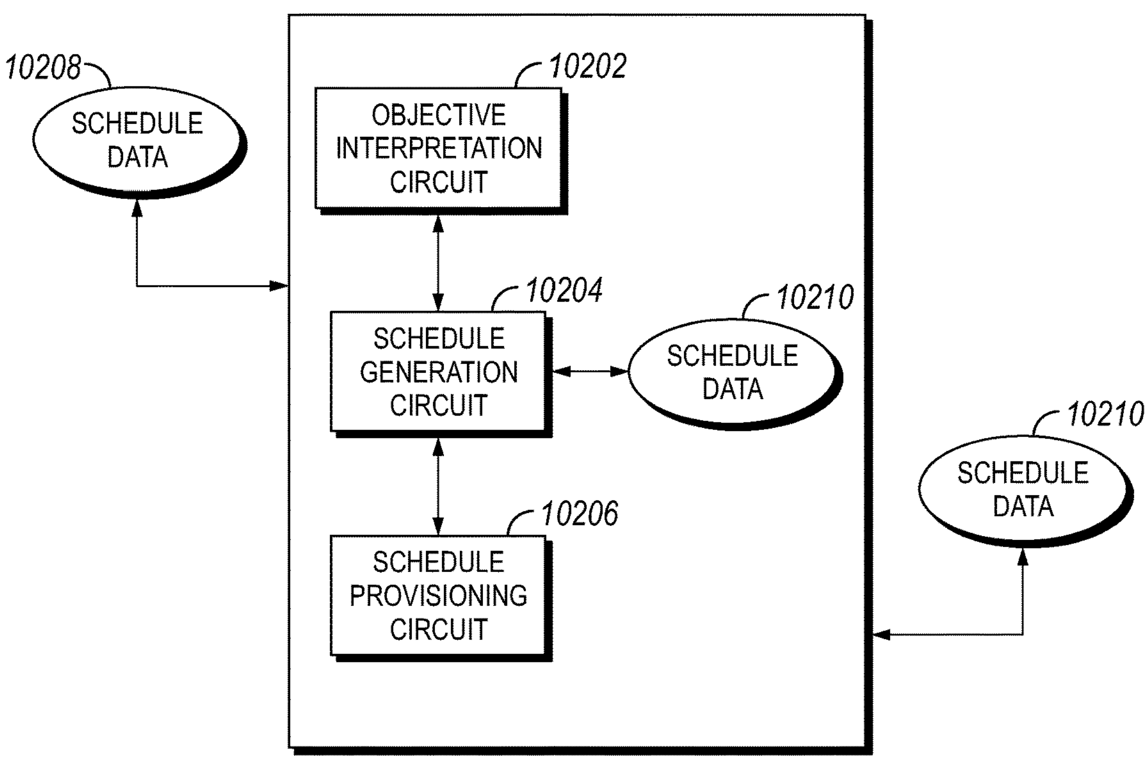
FIG. 108 is a schematic diagram of an apparatus for extended horizon scheduling, in accordance with embodiments of the current disclosure.

Accordingly, referring to FIG. 108, an apparatus 10200 for extended horizon scheduling is shown in accordance with an embodiment of the current disclosure. The apparatus 10200 may be embodied via one or more processors on one or more electronic devices, e.g., servers, workstations, smart devices, etc. In embodiments, the apparatus 10200 may form part of an agglomerate network, as disclosed herein. In embodiments, the apparatus 10200 may be apart from an agglomerate network, e.g., a standalone device that can interact with other devices. As shown in FIG. 108, the apparatus 10200 includes an objective interpretation circuit 10202, a schedule generation circuit 10204, and/or a schedule provisioning circuit 10206. As will be understood, embodiments of the apparatus 10200 may include additional circuits disclosed herein. The objective interpretation circuit 10202 may be structured to interpret objective data 10208, the schedule generation circuit 10204 may be structured to generate schedule data 10210 based at least in part on the objective data 10208, and the schedule provisioning circuit 10206 may be structured to transmit the schedule data 10210. The objective data 10208 may be data defining and/or otherwise corresponding to one or more corporate/entity objectives, e.g., reducing turnover, as disclosed herein. In embodiments, the objective data 10208 may be a set of one or more enumerated types, each corresponding to one of a plurality of long-term corporate/entity objectives and paired to a desired value (which may be a single value and/or a range of values). For example, the objective data 10208 may include a "turnover" type paired to a desired range of 0-10%, and a "predicted number of sales" type paired to a desired minimum threshold of $1500/month.

Figure 109:
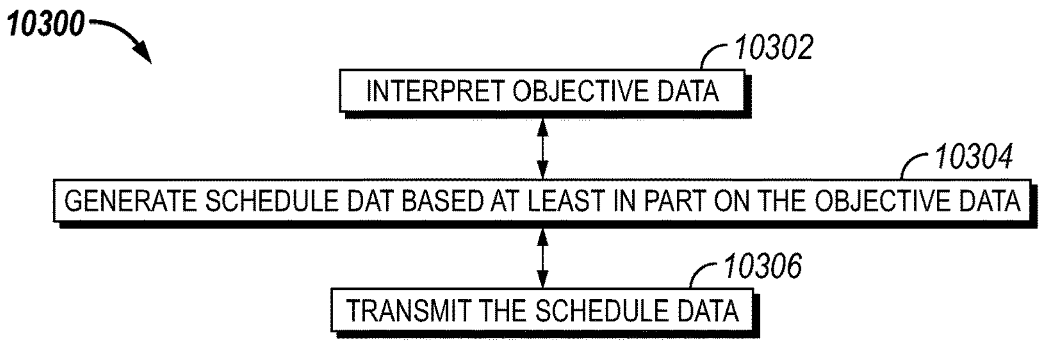
FIG. 109 is a flowchart depicting a method for extended horizon scheduling, in accordance with embodiments of the current disclosure.

Shown in FIG. 109 is a method 10300 for extended horizon scheduling, in accordance with an embodiment of the current disclosure. The method 10300 may be performed by the apparatus 10200 (FIG. 2) and/or any other computing device disclosed herein. The method 10300 may include interpreting objective data 10302, generating schedule data based at least in part on the objective data 10304, and transmitting the schedule data 10306.

Figure 110:
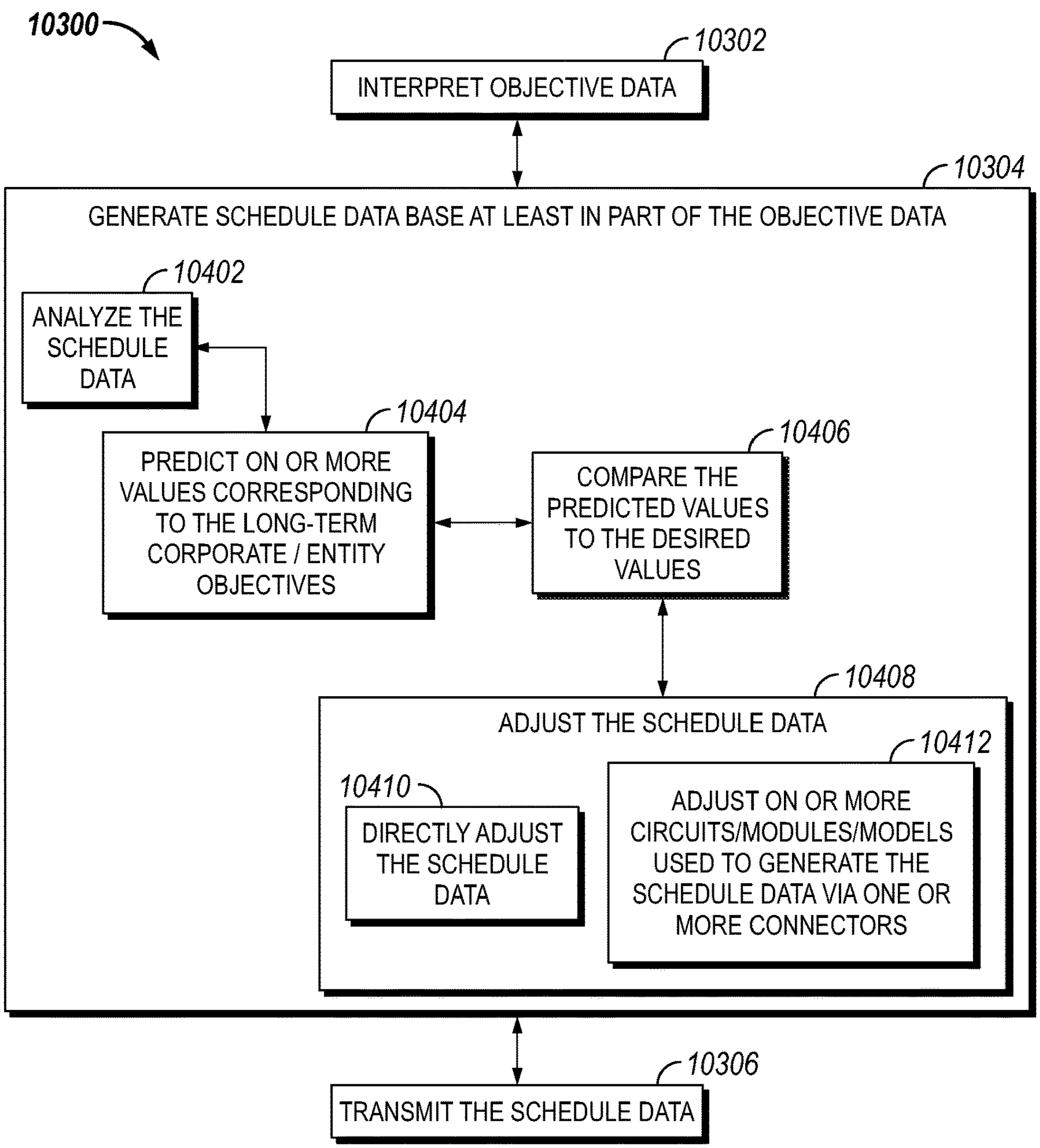
FIG. 110 is another flowchart of the method of FIG. 109, in accordance with embodiments of the current disclosure.

Turning to FIG. 110, generating the schedule data 10304 may include analyzing the schedule data 10402, and, responsive to the analyzing, predicting one or more values corresponding to the corporate/entity objectives 10404. Generating the schedule data 10304 may further include comparing the predicted values to desired values 10406 and, responsive to the comparing, adjusting the schedule data 10408, which may include directly adjusting the schedule data 10410 and/or adjusting one or more circuits/modules/models used to generate the schedule data via one or more connectors 10412, as disclosed herein. In embodiments, the desired values may be generated by a user, by another circuit, and/or retrieved from a database. In embodiments, analyzing the schedule data 10402 may include determining one or more properties of the schedule data, e.g., a number and/or timing of shifts, assigned workers, estimated number of sales, estimated profits, estimated costs in wages, and/or other types of data related to a schedule.

Figure 111:
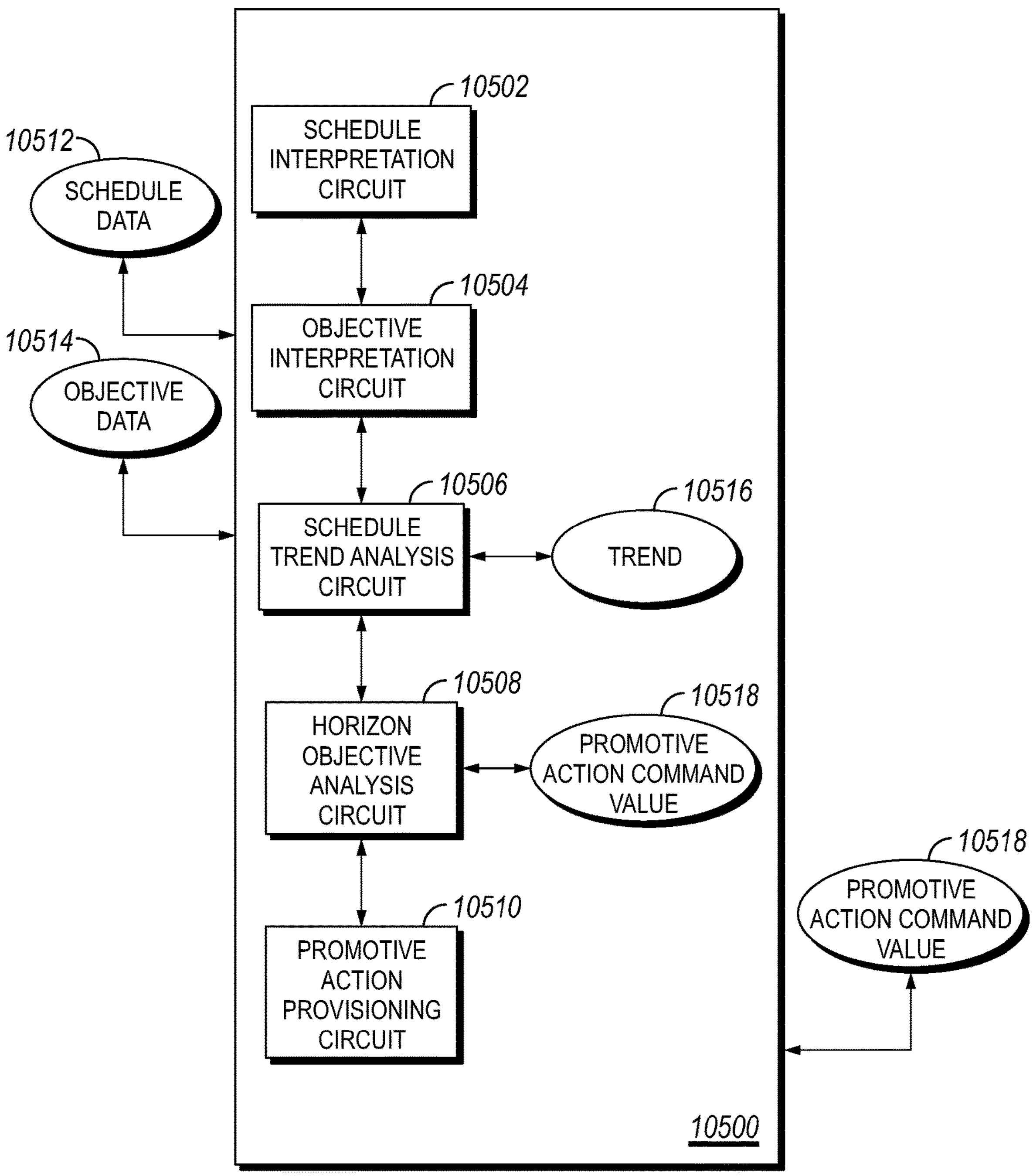
FIG. 111 is a schematic diagram of another apparatus for extended horizon scheduling, in accordance with embodiments of the current disclosure.

Illustrated in FIG. 111 is another apparatus 10500 for extended horizon scheduling, in accordance with an embodiment of the current disclosure. The apparatus 10500 may form part of an agglomerate network 10100 (FIG. 107) or be apart from an agglomerate network. The apparatus 10500 may include a schedule interpretation circuit 10502, an objective interpretation circuit 10504, a schedule trend analysis circuit 10506, a horizon objective analysis circuit 10508, and/or a promotive action provisioning circuit 10510. The schedule interpretation circuit 10502 is structured to interpret schedule data 10512. The objective interpretation circuit 10504 is structured to interpret objective data 10514, which, as disclosed herein, may define in part and/or otherwise correspond to one or more entity/corporate objectives. The schedule trend analysis circuit 10506 is structured to extract a trend 10516 from the schedule data 10512. The horizon objective analysis circuit 10508 is structured to determine whether the extracted trend 10516 furthers or impedes an objective defined, in part, by the objective data 10514. The horizon objective analysis circuit 10508 is further structured to, responsive to a determination that the extracted trend 10516 impedes the objective, generate a promotive action command value 10518 structured to trigger an adjustment to the schedule data 10512. In embodiments, the adjustment is structured to mitigate the extracted trend 10516 from impeding the objective. The promotive action provisioning circuit 10510 is structured to transmit the promotive action command value 10518. For example, in embodiments, the trend 10516 may indicate that a generated schedule, e.g., schedule data 10512, will result in a particular employee earning too much overtime, where the adjustment may either directly remove shifts from the employee and/or adjust the bias of a connector that generates an affect in another circuit to reduce the amount of overtime the employee is scheduled for.

In embodiments, the extracted trend 10516 may correspond to one or more of the objectives of the objective data 10514. For example, the extracted trend 10516 may correspond to a number of hours worked, and/or over time worked. In embodiments, the extracted trend 10516 may have a unitization of per day, week, month, year, etc. In embodiments, the extracted trend 10516 may correspond to a single employee or a group/plurality of employees. In embodiments, the trend 10516 may be extracted from the trend by identifying one or more properties within the schedule data 10512 and correlating the extracted properties to known patterns of historic schedule data, which may be retrieved from a database and/or other data source. In embodiments, prior schedules having patterns matching, to include closely matching, the trend may also have corresponding biases for one or more agglomerate network modules/circuits that can be used to adjust the connectors, as disclosed herein. In embodiments, extracting the trend 10516 may include summing a particular schedule property over one or more portions of a schedule corresponding to the schedule data 10512.

In embodiments, the horizon objective analysis circuit 10508 may determine that the extracted trend impedes an objective if execution/implementation of the schedule would decrease the likelihood of, and/or prevent, the corresponding entity/corporation from achieving the objective. For example, the extracted trend 10516 may indicate that an initial draft of a schedule defined, in part by the schedule data, is likely to improve sales but also increase the likelihood of employees assigned to the schedule resigning. The horizon objective analysis circuit 10508 may determine that such an extracted trend impedes a corporate objective of reducing turnover by 5% for the month.

The promotive action command value 10518 may be structured to directly change/adjust the schedule data 10512 to improve the extracted trend 10516 so as to improve the likelihood of the entity/corporation achieving the long-term objective if the schedule is executed/implemented/followed. In embodiments, improving the extracted trend 10516 may include slowing the extracted trend 10516, e.g., the objective may be based at least in part on a slowing of the extracted tend; for example, slowing down a rate of increase for monthly travel expenses to meet a long-term objective of staying below a given travel expense amount. In embodiments, improving the extracted trend 10516 may include increasing the extracted trend 10516, e.g., the objective may be based at least in part on an increase in the extracted trend; for example, increasing a projected number of monthly sales to hit a long-term sales objective. In embodiments, improving the extracted trend 10516 may include reversing the extracted trend 10516, e.g., the objective may be based at least in part on reversing the extracted trend; for example, increasing shifts lengths to reduce a total number of employees while increasing sales so as to reverse cashflow from negative to positive so as to achieve a long-term corporate objective of becoming profitable.

Figure 112:
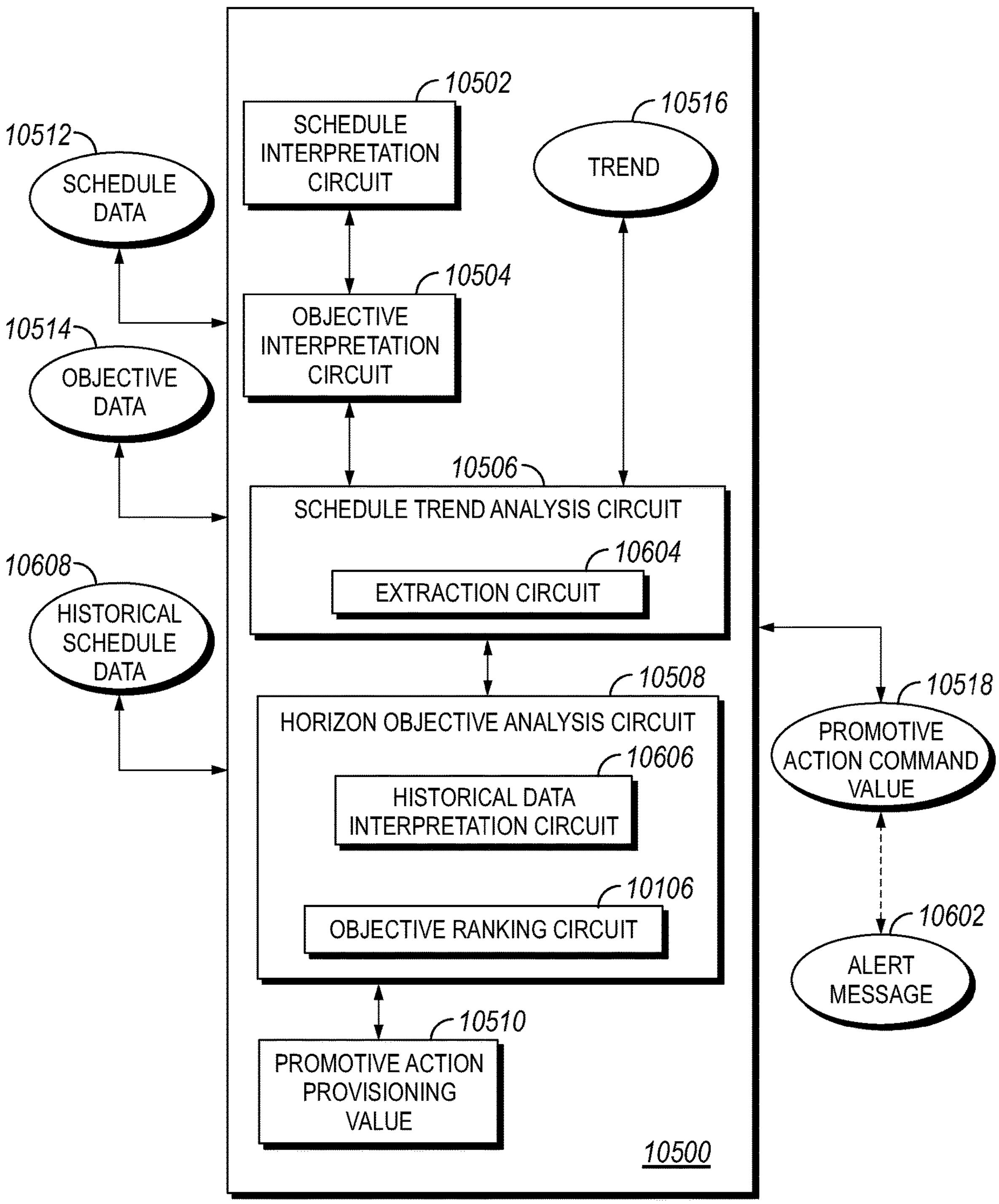
FIG. 112 is another schematic diagram of the apparatus of FIG. 111, in accordance with embodiments of the current disclosure.

Turning to FIG. 112, in embodiments, the promotive action command value 10518 corresponds to an alert message 10602. In embodiments, the alert message 10602 may be a visual and/or audio message. For example, the alert message 10602 may be a pop-up on an electronic display, a light source such as a flashing LED, a text message on a mechanical display, etc. The alert message 10602 may convey an audio message, include a sound encoding, etc. In embodiments, the alert message 10602 may convey to a user, e.g., a machine intelligence and/or a human user, one or more recommendations for adjusting the schedule data 10512. Such adjustments may include direct manipulation of the schedule data, e.g., moving a shift, assigning an employee to a shift, reducing a shift duration, adding a shift, deleting a shift, etc. Such adjustments may also include manipulation of one or more circuits/modules within an agglomerate network that generated the schedule data, e.g., adjusting a bias of a connector, as disclosed herein. For example, the adjustment may change the input and/or output weights of a connector. For example, an agglomerate network module/circuit that is tasked with increasing the productivity of a schedule and generates and/or adjusts schedule data to have long shifts to reduce a number of employees may have its associated output biases adjusted down such that the weighting of the agglomerate network model is weakened when received/interpreted by subsequent agglomerate network modules/circuits.

In embodiments, the schedule trend analysis circuit 10506 may include an extraction circuit 10604 structured to extract trends from the schedule data 10512 via machine learning. One non-limiting example of such a machine learning includes a neural network that has been trained on a labeled data set to detect trends within schedule data based on one or more objectives. For example, in embodiments, the neural network may have been trained to distinguish portions of schedule data that relate to a provided objective from portions that do not relate to the objective, wherein the portions of the schedule data that do relate to the objective are passed to the horizon objective analysis circuit 10508.

In embodiments, the horizon objective analysis circuit 10508 may include a historical data interpretation circuit 10606 structured to interpret historical schedule data 10608. The historical schedule data 10608 may include data corresponding to past schedules for the entity/organization trying to achieve an objective of the objective data 10514. In embodiments, the horizon objective analysis circuit 10508 may retrieve the historical schedule data 10608 via a query (for a database) generated based at least in part on the objective data 10514. For example, the horizon objective analysis circuit 10508 may retrieve historical schedule data for schedules corresponding to an employee to determine how many hours the employee worked outside of the schedule corresponding to the schedule data 10512 being evaluated. In embodiments, the historical schedule data 10608 may provide information regarding an employee's past attendance rate which may provide for predicting a future attendance rate for one or more shifts in the schedule data 10608.

In embodiments, the apparatus 10500 may include an objective ranking circuit 10610 structured to rank one or more objectives, defined in part, by the objective data 10514. In embodiments, the objective ranking circuit 10610 may form part of the horizon objective analysis circuit 10508. In embodiments, the objective ranking circuit 10610 may rank the objectives based at least in part on artificial intelligence, e.g., a neural network trained on a labeled data set with the goal of prioritizing/ranking the objectives to maximize an overall objective, e.g., corporate profitability measured in a currency, e.g., dollars. In embodiments, the neural network may be trained to rank objectives via a data training set that labels each of a plurality of objectives with a corresponding importance value. In embodiments, the objective ranking circuit 10610 may determine that reducing turnover ranks higher, e.g., is more important, than reducing a number of new hires due to a recent trend of key workers, e.g., those with significant experience, leaving the entity/corporation.

In embodiments, a current generation of a schedule (one recently generated and being evaluated by the apparatus 10500) may be compared to one or more prior schedules, e.g., historical data, that have known results with respect to an objective, e.g., the effects of prior schedules on an objective may be known as the prior schedules were executed/followed/implemented. Such comparing may be used to adjust one or more confidences associated with the current generation schedule, e.g., a confidence value/level that the current generation schedule results in a particular range of sale. As described in greater detail herein, in embodiments, the current generation schedule may be adjusted if a confidence level is below a threshold.

Figure 113:
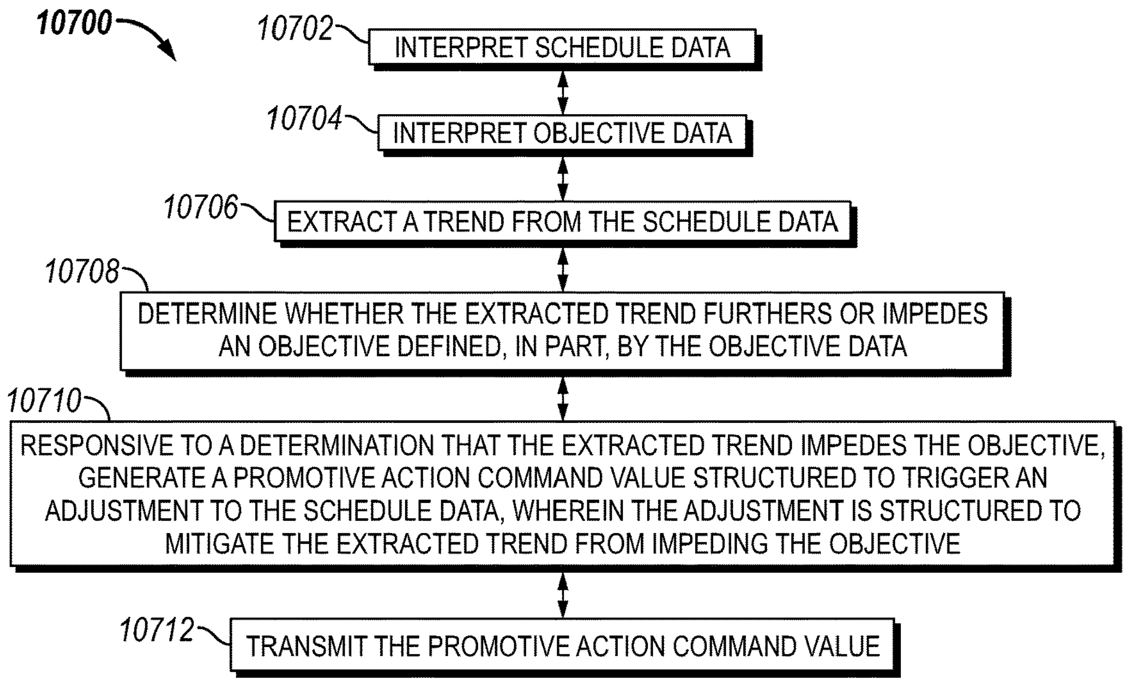
FIG. 113 is flowchart depicting a method for extended horizon scheduling, in accordance with embodiments of the current disclosure.

Shown in FIG. 113 is another method 10700 for extended horizon scheduling, in accordance with embodiments of the current disclosure. The method 10700 may be performed by the apparatus 10500 (FIGS. 105 and 106) and/or any other computing device disclosed herein. The method 10700 may include: interpreting schedule data 10702; interpreting objective data 10704; and extracting a trend from the schedule data 10706. The method 10700 may further include determining whether the extracted trend furthers or impedes an objective defined, in part, by the objective data 10708; and responsive to a determination that the extracted trend impedes the objective, generating a promotive action command value structured to trigger an adjustment to the schedule data, wherein the adjustment is structured to mitigate the extracted trend from impeding the objective 10710. The method 10700 may further include transmitting the promotive action command value 10712.

Figure 114:
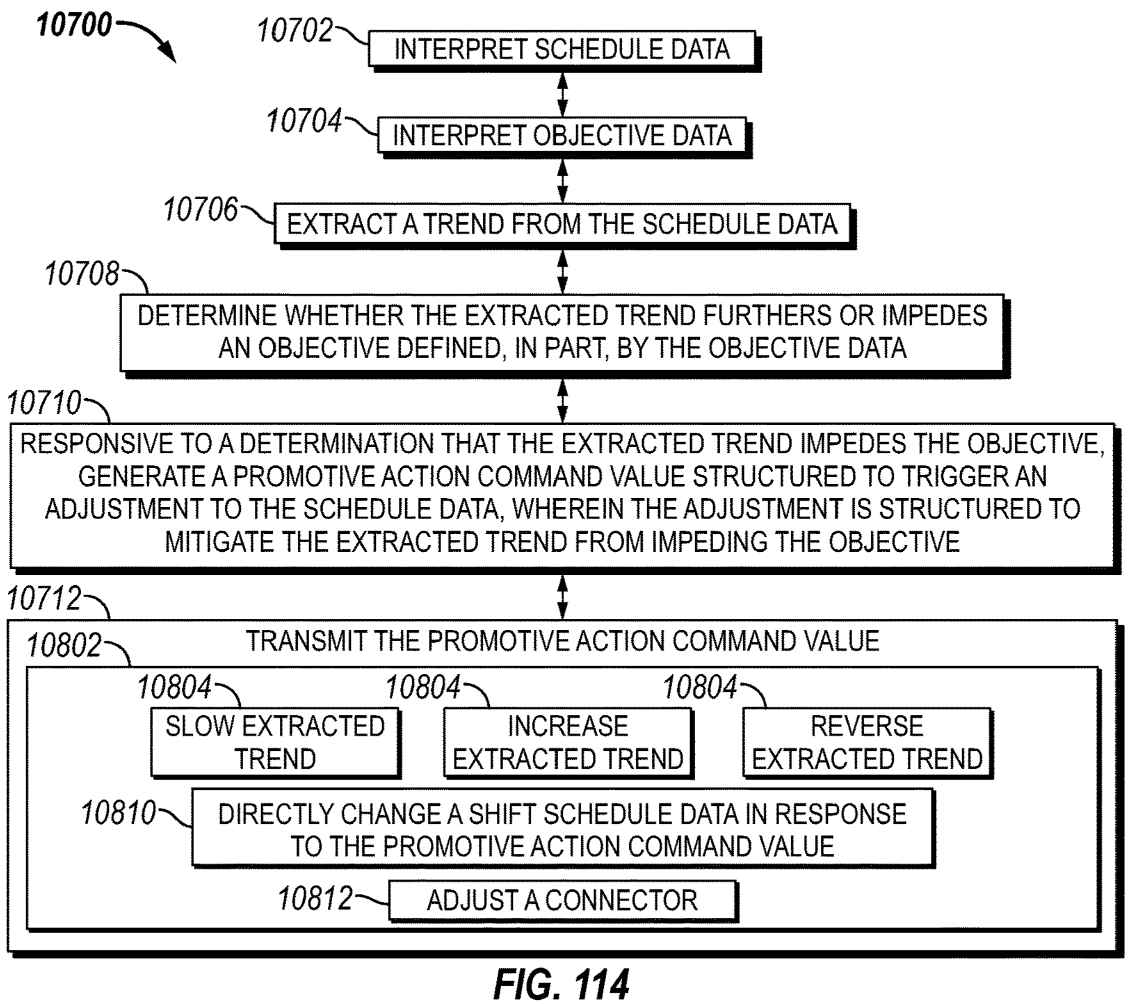
FIG. 114 is another flowchart depicting the method of FIG. 113, in accordance with embodiments of the current disclosure.

Turning to FIG. 114, in embodiments, the method 10700 may further include adjusting the schedule data in response to the promotive action command value 10802. In embodiments, adjusting the schedule data may include slowing the extracted trend 10804. For example, the extracted trend 10804 may be a three-time increase in a number of workers working a single shift, as compared to a prior historic schedule, wherein the adjustment to the schedule data may be a reduction to a two-time increase in the number of workers working the single shift. In embodiments, adjusting the schedule data may include increasing the extracted trend 10806. For example, the extracted trend 10804 may be a shrinking pay gap for a particular shift above industry norms, and the adjustment may be to increase the wage for the shift with the intent of retaining high quality employees. In embodiments, adjusting the schedule data may include reversing the extracted trend 10808. For example, the extracted trend 10804 may be an increase in a number of hours for a particular worker, where the increase is on track to exceed a desired maximum number of hours/week, and the adjustment may be to adjust the schedule data such that the employee has fewer hours than the prior week. In embodiments, adjusting the schedule data in response to the promotive action command value 10802 may include directly changing a shift in the schedule data in response to the promotive action command value 10810. In embodiments, adjusting the schedule data in response to the promotive action command value 10802 may include adjusting a connector 10812.

Figure 115:
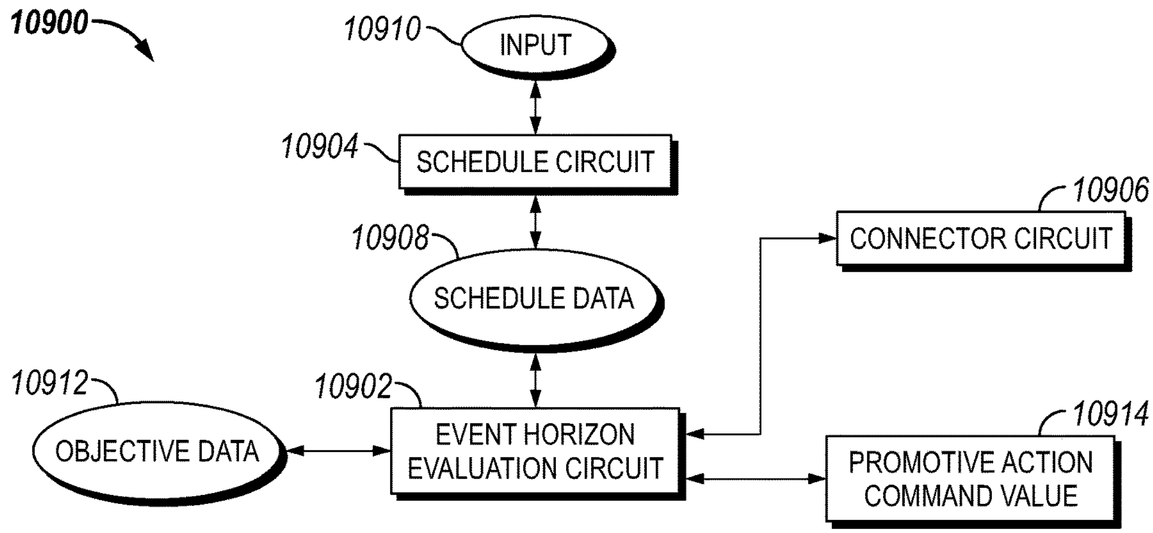
FIG. 115 is a schematic diagram of another agglomerate network for extended horizon scheduling, in accordance with embodiments of the current disclosure.

Referring to FIG. 115, an agglomerate network 10900 having an extended horizon evaluation circuit 10902, e.g., apparatuses 10200 (FIG. 108) and 10500 (FIG. 111), is shown. The agglomerate network 10900 may also include a scheduler circuit 10904 and one or more connector circuits 10906. In embodiments, the agglomerate network 10900 may further include other types of agglomerate network circuits disclosed herein.

The scheduler circuit 10904 is structured to output schedule data 10908. As disclosed herein, the schedule data 10908 includes data corresponding to a schedule, e.g., a Gantt representation of a schedule, data related to the employee(s) and/or scheduled entities, a total number of hours, etc. The one or more connector circuits 10906 may be structured to adjust at least one of an input 10910 to the scheduler circuit 10904 and/or the schedule data 10908 outputted by the scheduler circuit 10904. Adjusting of a connector circuit 10906 may include adjusting one or more biases and/or the circuits to which the connector circuit 10906 connects, as disclosed herein. The extended horizon evaluation circuit 10902 may be structured to: interpret the schedule data 10908, interpret objective data 10912, and extract a trend, as disclosed herein, from the schedule data. The extended horizon evaluation circuit 10902 may be further structured to determine whether the extracted trend furthers or impedes an objective defined, in part, by the objective data, as disclosed herein. Upon determining that the extracted trend impedes the objective, the extended horizon evaluation circuit 10902 may then generate a promotive action command value 10914 that is structured to trigger an adjustment to one or more of the connector circuits 10906 to effect a change of at least one of the input 10910 to the scheduler circuit 10904 or the schedule data outputted 10908 by the scheduler circuit 10904 such that the extracted trend is mitigated from impeding the objective. The extended horizon evaluation circuit 10902 may then transmit the promotive command value 10914. Transmission of the promotive command value 10914 may include storing the promotive command value 10914 in a memory location accessible to the event horizon evaluation circuit 10902, the connector circuits 10906, and/or any other agglomerate network circuit in the agglomerate network 10900. In embodiments, the event horizon evaluation circuit 10902 may directly change the connector circuits 10906 without having to transmit a promotive command value 10914. For example, the event horizon evaluation circuit 10902 may have access to memory storing values, e.g., biases, used by the connector circuits 10906.

Figure 116:
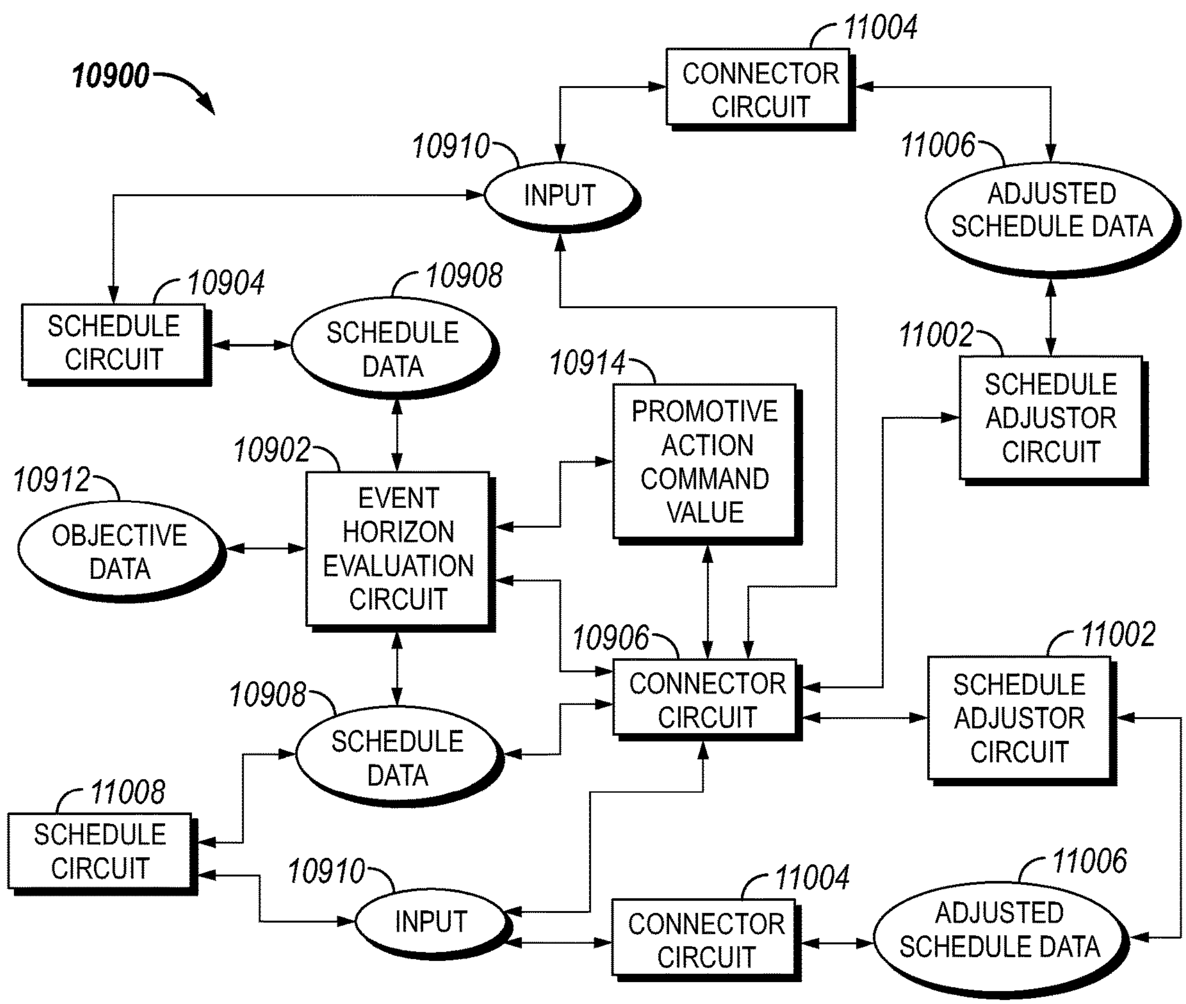
FIG. 116 is another schematic diagram of the agglomerant network of FIG. 115, in accordance with embodiments of the current disclosure.

As shown in FIG. 116, in embodiments, the agglomerate network 10900 may further include a schedule adjuster circuit 11002 structured to receive the schedule data 10908 from the connector circuit 10906, where the schedule adjuster circuit 11002 adjusts the schedule data 10908.

In embodiments, the agglomerate network circuit 10900 may include another connector circuit 11004 structured to receive adjusted schedule data 11006 from the schedule adjuster circuit 11004 and bias the adjusted schedule data 11006. In embodiments, the adjustment to the connector circuit 11004 may change a bias of the connector circuit 11004. In embodiments, the one or more connector circuits 10906 and/or 11004 may adjust the input to the scheduler circuit 10904. In embodiments, the one or more connector circuits 10906 and/or 11004 adjust the schedule data 10908 outputted by the scheduler circuit 10904.

In embodiments, the schedule circuit 10904 may feed outputted schedule data 10908 directly into the event horizon evaluation circuit 10902 along with one or more goals, e.g., objectives 10912, as shown in FIG. 116. In other embodiments, the schedule circuit 10908 may be located downstream of the schedule circuit 10904 such that one or more intermediate agglomerate network circuits are disposed in between the schedule circuit 10904 and the event horizon circuit 10902. In embodiments, the objective may be to maintain above a desired minimum threshold for a 1-year rolling retention rate, e.g., 96%.

In embodiments, the agglomerate network 10900 may include a schedule warden circuit, e.g., 20100 (FIG. 37), as disclosed herein, and/or the event horizon evaluation circuit 10902 may be integrated with a schedule warden circuit, e.g., the extended horizon evaluation circuit may evaluate schedules within an agglomerate network 10900 to improve the odds of achieving a company's long-term objectives and/or to ensure that the scheduling norms (customary and/or legal) are not violated. For example, schedule data 10908 that has been evaluated by the event horizon evaluation circuit 10902 may be transmitted to the schedule warden circuit for further evaluation and/or adjustments, as disclosed herein.

In embodiments, the agglomerate network 10900 may include two or more scheduler circuits 10904 and 11008 that may compete against each other to see which can be the first to generate schedule data 10908, e.g., a schedule, that satisfies the event horizon evaluation circuit 10902 first and/or in the most suitable manner.

Accordingly, as disclosed herein, embodiments of the event horizon evaluation circuit, e.g., apparatuses 10200, 10500, and/or 10902, may receive inputs, e.g., schedule data and/or other data, e.g., biases, objective data, etc., as: direct inputs, i.e., event horizon evaluation circuit may be a standalone module/circuit; as direct input to an agglomerate network, i.e., without use of connectors; and/or from connectors, i.e., the event horizon evaluation circuit 10902 is one of a plurality of modules/circuits/models within an agglomerate network. For example, in embodiments, the event horizon evaluation circuit 10902 may evaluate a schedule generated by a scheduling circuit/module (within an agglomerate network) against a goal and generate an output, e.g., a rating/score, bias, etc. The event horizon evaluation circuit 10902 may, in turn, feed the output back into the scheduling circuit/module to form a feedback loop which tries to reach equilibrium and/or optimization of various biases in the agglomerate network. The connections between the event horizon evaluation circuit and the various modules of the agglomerate network may be accomplished via connectors, as disclosed herein.

Figure 117:
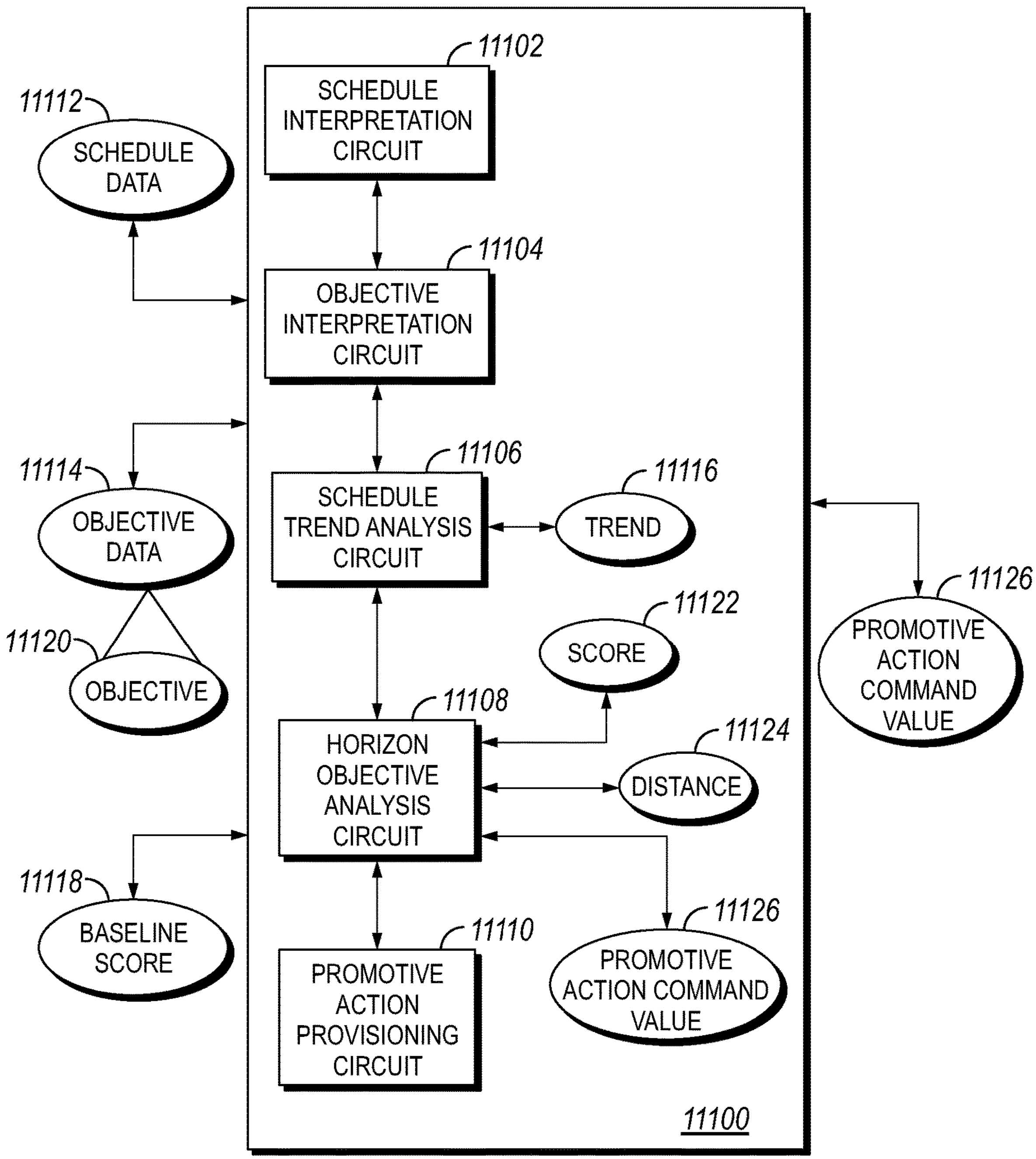
FIG. 117 is a schematic diagram of another apparatus for extended horizon scheduling, in accordance with embodiments of the current disclosure.

Illustrated in FIG. 117 is another apparatus 11100 for extended horizon scheduling, in accordance with embodiments of the current disclosure. The apparatus 11100 includes a schedule interpretation circuit 11102, an objective interpretation circuit 11104, a schedule trend analysis circuit 11106, a horizon objective analysis circuit 11108, and/or a promotive action provisioning circuit 11110. The schedule interpretation circuit 11102 may be structured to interpret schedule data 11112, the objective interpretation circuit 11104 may be structured to interpret objective data 11114, and the schedule trend analysis circuit 11106 may be structured to extract a trend 11116 from the schedule data 11112. The horizon objective analysis circuit 11108 may be structured to interpret a score 11118, e.g., a baseline score, of the extracted trend 11116. In embodiments, the baseline score 11118 may correspond to an objective 11120 defined, in part, by the objective data 11114. The horizon objective analysis circuit 11108 may score 11122 the extracted trend 11116 with respect to the objective 11120 and compare the score 11122 to the baseline score 11118 to determine a distance 11124, e.g., a difference in value, between the score 11122 and the baseline score 11118. The horizon objective analysis circuit 11108 may then generate a promotive action command value 11126 structured to trigger an adjustment to the schedule data 11112 that is structured to change the distance 11124. The promotive action provisioning circuit 11110 may be structured to transmit the promotive action command value 11126. While the foregoing example concerned comparing the score 11122 to a baseline score 11118, it should be understood that the score 11122 may be compared to other types of scores other than baseline ones, e.g., the score 11118 may be a user defined score, an intended target score, an industry defined score, and/or any other type of score.

Figure 118:
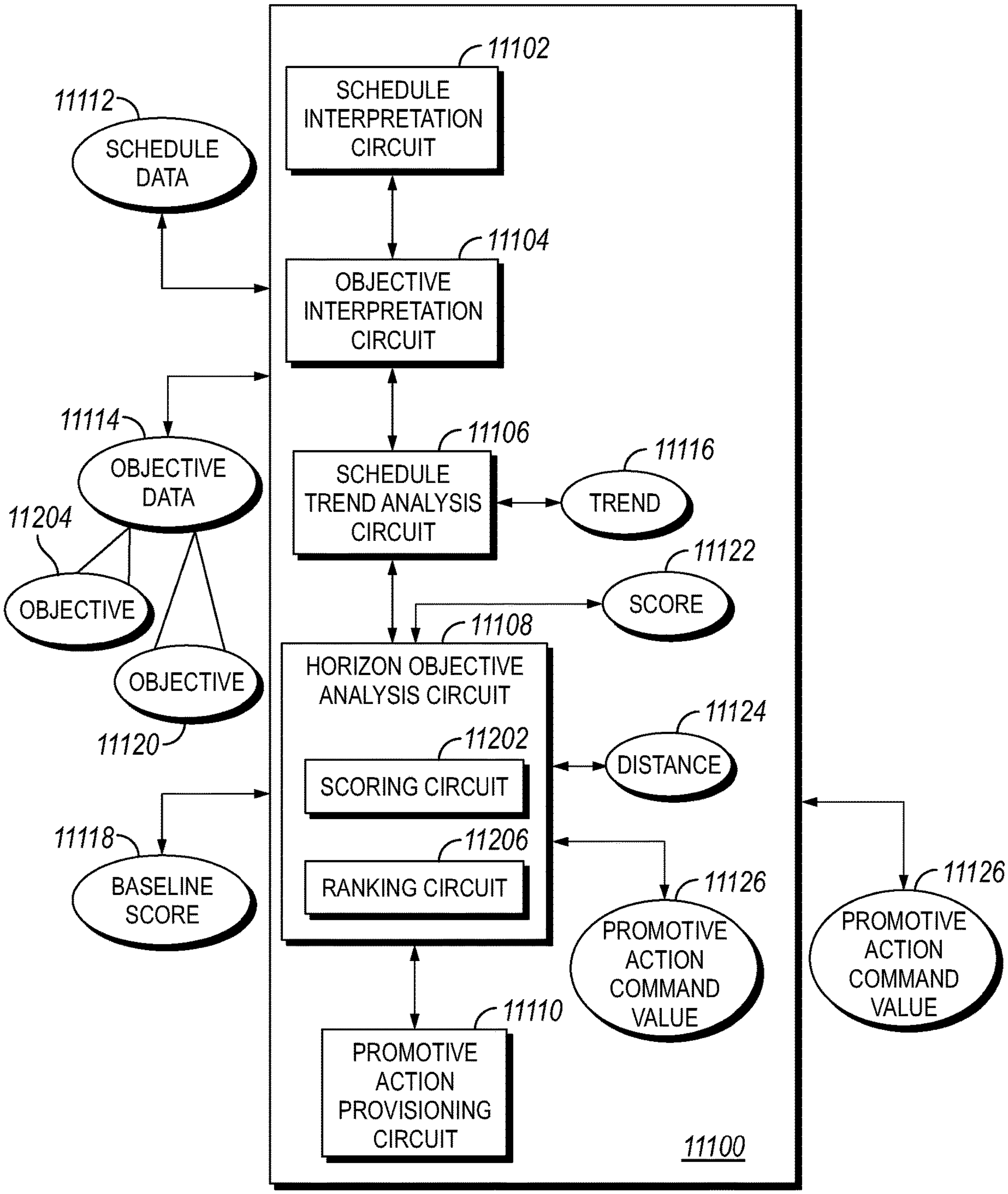
FIG. 118 is another schematic diagram of the apparatus of FIG. 117, in accordance with embodiments of the current disclosure.

Turning to FIG. 118, in embodiments, the horizon objective analysis circuit 11108 may be further structured to score the extracted trend 11116 based at least in part on machine learning. For example, the horizon objective analysis circuit 11108 may include a scoring circuit 11202 that performs the scoring 11122. In embodiments, the scoring circuit 11202 may use a neural network to score the extracted trend 11116. The neural network may be trained with respect to scoring the extracted trend 11116 with respect to a specific objective, e.g., 11120, or with respect to a plurality of objectives. In embodiments, the neural network may be trained on a training data set that includes trend data labeled with respect to the objective, e.g., 11120.

In embodiments, the objective data 11114 defines, in part, another objective 11204 and the promotive action command value 11126 seeks to optimize both objectives 11120 and 11204. In embodiments, both objectives 11120 and 11204 may be ranked by at least one of either an artificial intelligence, or a human user. For example, the horizon objective analysis circuit 11108 may include a ranking circuit 11206 structured to rank the objectives based on a set of rules generated by a user or by an artificial intelligence. The set of rules may be structured to rank objectives so as to achieve another objective, e.g., profitability.

In embodiments, the adjustment triggered by the promotive action command value 11126 may be structured to increase the distance 11124. In embodiments, the adjustment triggered by the promotive action command value 11126 may be structured to decrease the distance 11124.

Figure 119:
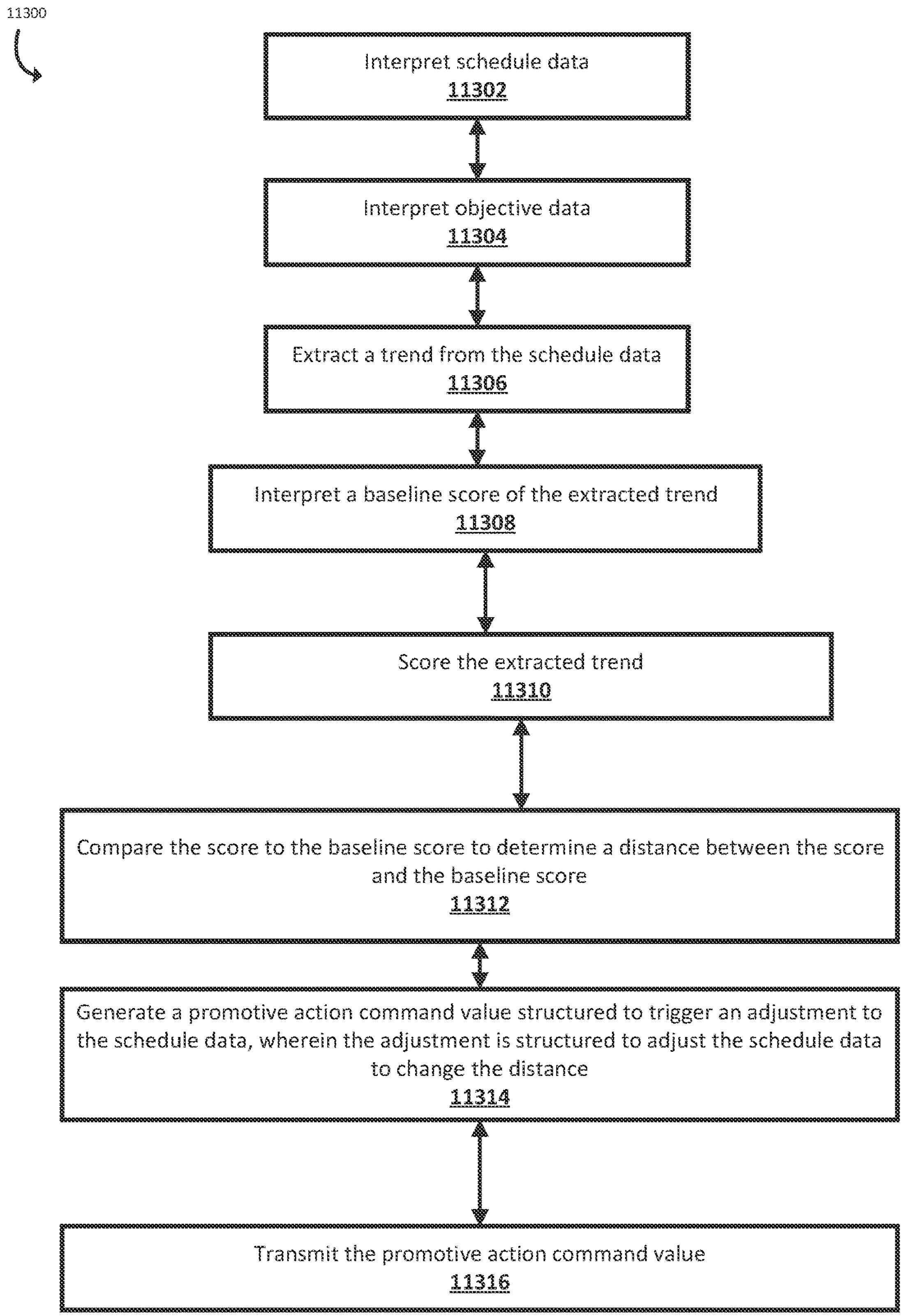
FIG. 119 is a flowchart depicting another method for extended horizon scheduling, in accordance with embodiments of the current disclosure.

FIG. 119 shows a method 11300 for extended horizon scheduling, in accordance with embodiments of the current disclosure. The method 11300 may be performed by the apparatus 11100 and/or any other computing device disclosure herein. The method 11300 may include interpreting schedule data 11302 and interpreting objective data 11304. The method 11300 may further include extracting a trend from the schedule data 11306 and interpreting a baseline score of the extracted trend 11308. As disclosed herein, in embodiments, the baseline score may correspond to an objective defined, in part, by the objective data. The method 11300 may include scoring the extracted trend with respect to the objective 11310. The method 11300 may include comparing the score to the baseline score to determine a distance between the score and the baseline score 11312. In embodiments, the method 11300 may include generating a promotive action command value structured to trigger an adjustment to the schedule data 11314. As disclosed herein, the adjustment may be structured to adjust the schedule data to change the distance. The method 11300 may further include transmitting the promotive action command value 11316.

Figure 120:
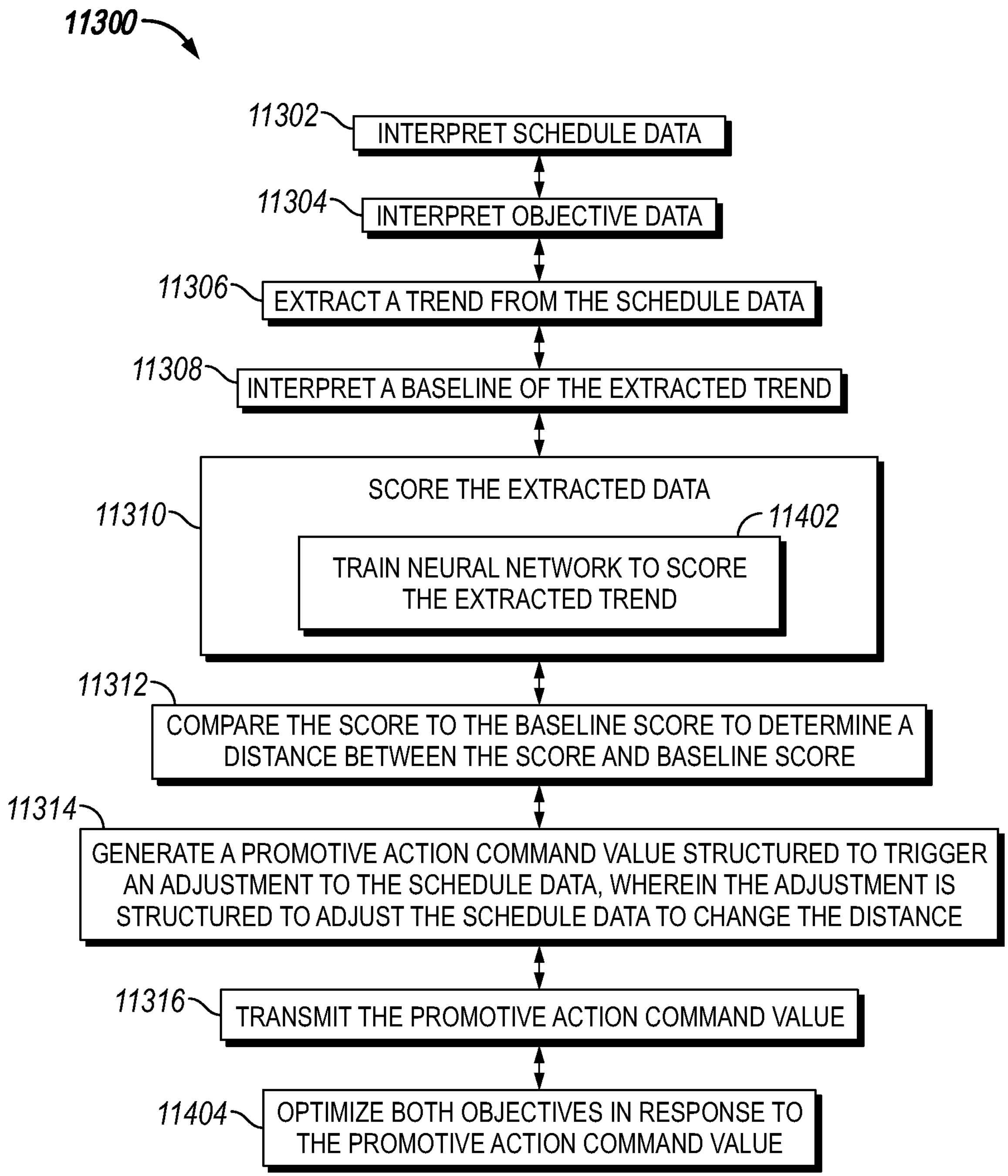

Referring to FIG. 120, in embodiments, scoring the extracted trend with respect to the objective 11310 may be based at least in part on machine learning. As such, the method 11300 may include training a neural network to score the extracted trend 11402. In embodiments, the training set for the neural network may include trend data labeled with an objective. As disclosed herein, in embodiments, the objective data may define, in part, another objective. In such embodiments, the method 11300 may further include optimizing both objectives in response to the promotive action command value 11404.

The systems and methods described herein for extended horizon scheduling provide various technical benefits. In one aspect, the systems and methods provide for efficient utilization of computing resources thereby reducing computation time and computation resources to automate the generation of schedules that meet desired extended horizon objectives. The system and methods enable efficient utilization of resources by adapting and configuring trained models to changing data and trends with reduced requirement to retrain the schedule models for different data trends and changing data. The system and methods enable adaptation of models to trends and changes without requiring models that are explicitly trained for the trends and data changes. In one example, promotive action commands and biasing connectors enable adaptation of trained models to new data thereby reducing the resource and time intensive task of frequent retraining of models.

In another aspect, the methods and systems improve the training of models and reduce the complexity of trained models for extended horizon scheduling. Embodiments of the system and methods described herein may leverage a plurality of models that are trained for a plurality of simpler more specific tasks rather than utilizing one trained model for the complete task. The use of a plurality of simpler trained models reduces the data requirements for training and increases the confidence of the models for each task for the available data. In one example, a trained schedule trend circuit may be used to detect trends and provide feedback to another scheduling circuit. This example configuration enables the use of two separately trained and simpler models that, using feedback can generate schedules for extended horizon scheduling with reduced training data requirements.

In embodiments, a summary agglomerate model, e.g., a division level resource planner, may combine the outputs of multiple project schedulers into a single resource plan. As part of this activity, the division level resource planner may allow users to input dependency data such as Project A must be completed before Project D can commence. Additionally, the system may augment user entered dependencies with dependencies developed from the use of shared resources such as personnel and equipment needs.

Accordingly, embodiments of the current disclosure provide for systems and methods, which may form part of modules/components 124, 126, and/or 128, (FIG. 1), for adjusting a schedule in response to austere events. For example, embodiments of the current disclosure may provide for an austere environment scheduler that uses an agglomerate network to optimize a schedule to deal with a short-handed staff or difficult situation, e.g., equipment malfunction, material shortages. Embodiments of the austere environment scheduler may provide for "in the moment", e.g., real-time and/or near real-time, operational changes in a business. Non-limiting examples of such changes include reallocation and/or redistribution of staff and/or detection of staff shortages in view of a company/business goal. As will be understood, austere environments may include low-margin and/or high-volume businesses, e.g., retail. As used herein, an austere event includes an unanticipated event that can adversely affect the efficiency and/or operation of an entity, e.g., a corporation.

For example, staffing shortages may develop when a workload is greater than originally anticipated or if one or more scheduled employees are unable to report for an assigned shift. As overscheduling employees for a shift can be costly and inefficient, a well-designed schedule will typically not assign more employees than is required to cover an anticipated or predicted workload for a shift period. As such, when an unanticipated staffing shortage arises due to an austere event—for example, but not limited to, if an employee calls in sick or external factors significantly increase the number of customers to be served during a given shift—the efficiency of a function for a business, e.g., a business operation, can, in certain situations, suffer. In addition to staffing shortages, other austere events can impact the efficiency of a work environment. Such austere events include, for example, but are not limited to, malfunctioning equipment, supply and material shortages, delays in receiving equipment, weather related events (such as, but not limited to, snowstorms, floods, inclement weather, or unseasonable weather), shortages of personnel, and traffic related events. In many situations, the impact of such events on the efficiency of a function of a business can be eliminated or otherwise mitigated with schedule adjustments. For example, the increased production time caused by a malfunctioning piece of equipment could, in certain circumstances, be eliminated or otherwise mitigated by assigning additional employees to the current shift to increase the overall throughput of the function of the business. For many functions of businesses, the scheduling issues introduced by austere events, which often occur with little or no notice, usually need to be immediately addressed or the efficiency of function of the business will suffer—thereby negatively impacting profits and production.

To address the impact of austere events on a function of a business, the embodiments of the current disclosure provide for an austere event scheduling system for responding to such events by making real-time schedule adjustments or adjustments to future schedules in order to eliminate or otherwise mitigate the impact of such austere event on functions of businesses. In general, according to the methods of the present disclosure, this austere event scheduling system includes a schedule interpretation circuit structured to access, store, and interpret work schedules for a function of the business and to provide schedule data to other circuits within the system. In embodiments, the schedule interpretation circuit includes elements that actively monitor schedules stored in other systems. Within other aspects of the present disclosure, schedules are loaded directly into the schedule interpretation circuit. The schedule interpretation circuit may, in certain embodiments, include a computer including a microprocessor and/or some other electronic digital logic circuit.

In certain aspects of the present disclosure, austere event data, e.g., data indicating the occurrence and details of a currently occurring or predicted future austere event, is supplied directly to the austere event scheduling system. In other aspects of the present disclosure, the austere event scheduling system also includes an external event interpretation circuit and an austere event detection circuit which can be used to monitor external event data (as well as schedule data interpreted by the schedule interpretation circuit) to detect or predict the occurrence of an austere event. For example, within such aspects the external event interpretation circuit may include an element with access to the internet that monitors news data sources and other sources of information, e.g., external databases. In another example, within such aspects the external event interpretation circuit may include elements for receiving data on scheduled employees such that an employee calling in sick or being stuck in traffic is automatically sensed by the mitigation circuit or external event interpretation circuit. Such external event data can include both real time and forecasted weather data, traffic data, and news data. Such external event data can also include employee data, such as, but not limited to, information on employee health events, e.g., if an employee reports an illness, new medical condition, or medical emergency, and employee life events, e.g., special milestone events such as birthdays, anniversaries, or the birth of a child. Such external event data can also include business function data such as, but not limited to, supply chain information, e.g., components low in stock or on backorder, and the status of equipment, e.g., if a machine is offline, malfunctioning, or due for maintenance. Within certain aspects of the present disclosure, the external event interpretation circuit includes elements that actively monitor data stored in other systems. Within other aspects of the present disclosure, such external data as described above is loaded directly into the external event interpretation circuit.

The external event interpretation circuit may, in certain embodiments, include a computer including microprocessor or some other electronic digital logic circuit.

Within certain aspects of the present disclosure, the austere event scheduling system further includes an austere event detection circuit capable of processing the external event data interpreted by the external event interpretation circuit and schedule data interpreted by the schedule interpretation circuit to determine if an austere event is presently occurring or is likely to occur in the near future. In some aspects of the present disclosure, the austere event scheduling system includes a machine learning component, which is trained on sets of training data to predict or detect an austere event responsive to the supplied external event or schedule data. The machine learning component can include an artificial intelligence circuit or a neural network, and the training data can include data sets associating prior austere events with indicators found in prior schedule data and prior external event data wherein such indicators were predictive of an austere event. In certain aspects of the present disclosure, the machine learning component can be trained to recognize trends in schedule data. Such trends include, but are not limited to, overuse of a piece of equipment, the number and timing of vacations, and a shrinking resource pool of resources, e.g., the number of trucks used in long distance trips, the number of batches assigned to a limited number of stations, and the machines available to process work orders. By identifying such trends in advance, embodiments of the austere event detection circuit can predict the occurrence of an austere event prior to its impact on the function of a business. The austere event data interpretation circuit may, in certain embodiments, include a computer including a microprocessor and/or some other electronic digital logic circuit. Within certain aspects of the present disclosure that include an external event interpretation circuit and an austere event detection circuit as described above, upon detection of an austere event, the austere event detection circuit may generate austere event data indicative of the detected austere event. Within other aspects of the present disclosure, austere event data may be provided directly to the austere event scheduling system.

In embodiments, the austere event scheduling system further includes a mitigation circuit capable of triggering an adjustment to a schedule responsive to austere event data that is indicative of an austere event. As described in detail herein, this austere event data can be provided to the austere event scheduling system, or it can be generated within the austere event scheduling system responsive to external event data and schedule data. In either case, responsive to an indication of an austere event, embodiments of the mitigation circuit process schedule data provided by the schedule interpretation circuit and determine if the indicated austere event will result in a significant impact on the function of a business. If so, embodiments of the mitigation circuit may then determine if an adjustment to the schedule will eliminate and/or otherwise mitigate the impact of the austere event on the function of the business. If such an adjustment is found, embodiments of the mitigation circuit may then generate a mitigation action command value indicative of the schedule adjustment. In some aspects of the present disclosure, embodiments of the mitigation circuit include elements to analyze schedule data along with austere event data to predict whether the occurrence of an austere event that will impact a function of a business. Within such aspects, embodiments of the mitigation circuit are capable of issuing a mitigation action command in advance of the austere event, allowing the schedule change to take effect prior to the occurrence of the event.

The mitigation circuit may, in certain embodiments, include a computer including a microprocessor or some other electronic digital logic circuit. Within certain aspects of the present disclosure, the mitigation circuit includes an artificial intelligence element, a machine learning element, or a neural network. In such aspects of the present disclosure, the mitigation circuit is trained on one or more training data sets to develop an artificial intelligence system to determine a schedule adjustment responsive to a detected austere event as described above. The training set of data may include data associating past austere events with scheduling changes that successfully eliminated or otherwise mitigated the impact of the austere event on the operation of a business. In certain aspects of the present disclosure, the mitigation circuit uses logic algorithms executed on one or more processors to determine schedule adjustments. In certain aspects of the present disclosure, the mitigation circuit uses a look up table of austere events or categories of austere events associated with schedule changes predetermined to eliminate or otherwise mitigate the impact of the austere events on functions of businesses.

Embodiments of the austere event scheduling system may further include a mitigation action provisioning circuit capable of transmitting the mitigation action command value to other systems. In this way, other scheduling systems are able to, responsive to the austere event scheduling system, execute a change to a schedule to eliminate or otherwise mitigate the effect of an austere event. In certain aspects of the present disclosure, the mitigation action command value takes the form of an alert. In other aspects of the present disclosure, the mitigation action command value further includes a recommended schedule change and/or a reallocation of resources (for example, but not limited to, the assignment of additional staff to a shift, the allocation of additional resources (e.g., materials, products for sale, equipment or employees), or the scheduling of time on a previously unscheduled machine).

Embodiments of an austere event scheduling system may be a module/model/circuit that receives inputs, e.g., a schedule and/or other data, e.g., biases, as: direct input, e.g., the austere event scheduling system acts as a standalone module/model/circuit; as direct input to an agglomerate network, e.g., without use of connectors; from connectors, e.g., the austere event scheduling system is one of a plurality of modules within an agglomerate network; and the like. For example, the austere event scheduling system may be a module/model/circuit within an agglomerate network that evaluates a schedule, generated by a human and/or a scheduling module, against trends extracted from the effects of austere events on prior schedules and generates an output, e.g., a bias. The austere event scheduling system module/model/circuit may, in turn, feed the output back into the scheduling module (or back to the human as a message) to form a feedback loop which tries to reach equilibrium and/or optimization of various biases in the agglomerate network. The connections between the austere event scheduling system module/circuit/model and the various modules/models/circuits of the agglomerate network may be accomplished via connectors, as disclosed herein.

Embodiments of the austere event scheduling system of the present disclosure will now be described in more detail within the discussion of FIGS. 121-130.

Figure 121:
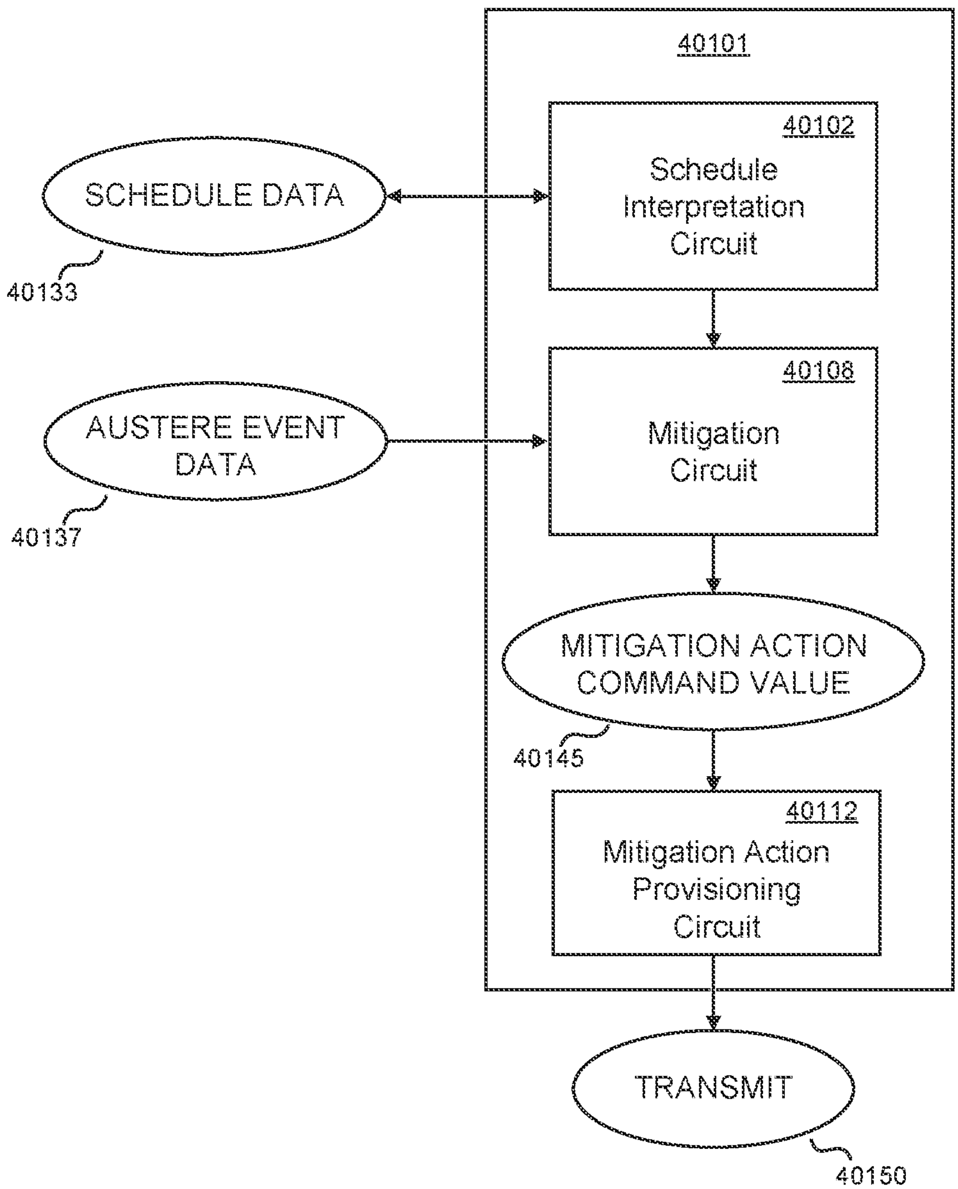

Referring to FIG. 121, an embodiment of an austere event scheduling apparatus 40101 is provided. The apparatus 40101 includes a schedule interpretation circuit 40102 structured to interpret schedule data 40133. As discussed herein, dependent on the needs of the application, within some embodiments schedule data 40133 can be provided directly to the apparatus 40101 or, within other embodiments, the schedule interpretation circuit 40102 is structured to monitor schedule data 40133 from outside the apparatus 40101. The apparatus further includes a mitigation circuit 40108 which is structured to generate, responsive to interpreted schedule data (provided by the schedule interpretation circuit 40102) and austere event data 40137 (provided to the apparatus 40101), a mitigation action command value 40145. As discussed in detail herein, the mitigation action command value 40145 may be structured to effect a change in schedule data sufficient to mitigate the effect of an austere event on a function of a business. The mitigation circuit 40108 may process the interpreted schedule data (as provided by the schedule interpretation circuit 40102) and the austere event data 40137 (e.g., weather information, traffic information, details on equipment status, employee information) to detect the occurrence of an austere event likely to adversely impact the function of the business. In some cases, the austere event may be happening concurrently with the detection, may have happened in the past, and in other cases, the mitigation circuit 40108 predicts an austere event which may happen in the future. In either case, if such an austere event is detected, the mitigation circuit 40108 may generate a mitigation action command value 40145. This mitigation action command value 40145 may be indicative of a schedule change that will eliminate or otherwise mitigate the effect of a detected austere event. Finally, the apparatus 40101 includes a mitigation action provisioning circuit 40112 which is structured to transmit the mitigation action command value 40145 to systems external to apparatus 40101. Responsive to the transmitted mitigation action command value 40150, these external systems can implement the schedule change generated by the mitigation circuit 40108 and thereby eliminate or otherwise significantly mitigate the impact of a detected austere event.

One non-limiting use case of the apparatus 40101 includes a scenario where an unexpected overnight snowstorm results in an employee scheduled to work a shift being unable to make it to work on time due to a known long work commute through mountainous terrain. Embodiments of the apparatus 40101 may be able to detect the severity of the snowstorm in real-time, or near real-time, while the employee and associated manager are asleep. As such the apparatus 40101 may predict the inability of the employee to make it to work before the employee and manager wake the morning of the shift, identify another employee who can walk to the location of the shift, generate a schedule that assigns the another employee to cover the shift, and transmit a message, e.g., text message and/or e-mail, to the another employee to let them know of the assignment. Embodiments of the apparatus 40101 may work in conjunction with a schedule warden circuit, e.g., 20100 (FIG. 37), to ensure assignment of other employee to the shift does not violate schedule norms, as disclosed herein. Embodiments of the apparatus 40101 may also work in conjunction with an incentive scheduling circuit, e.g., 180100 (FIG. 8), as disclosed herein, to incentivize other employee to work the newly assigned shift on a last-minute notice.

Another non-limiting use case of the apparatus 40101 includes a scenario where the apparatus 40101 detects that a snowstorm is expected to hit in two-days' time, and then determines that a store will be understaffed to handle an expected influx of customers planning to stock up on goods, e.g., milk and eggs. The apparatus 40101 may generate a schedule that assigns additional employees to work shifts at the store prior to the snowstorm hitting and then send messages out to the additional employees and any associated managers to inform them of the schedule. As will be understood, by automating the process of detecting austere events, e.g., staffing shortages due to unexpected snowstorms, embodiments of the current disclosure can generate schedules in timely manner so as to provide affected workers improved notice, which in turn, may reduce an entity's turnover rate. Further, automating the process of detecting austere events and generated schedules to handle to detected austere events can be accomplished during hours which many employees and managers are sleeping, e.g., during the night, thus mitigating the need for employees and managers to stay up during the night to monitor weather events. Thus, in turn, embodiments of the apparatus 40101 may provide for better rested employees that are more efficient during their shifts and/or less likely to get into an accident on the job or during a work commute.

In embodiments, connectors, as disclosed herein, may provide for austere event detection and resolution (provided via the apparatus 40101) to be incorporated with/into another scheduling model that is not directly editable, e.g., a black box model. Thus, embodiments of the apparatus 40101 provide for event detection and resolution to be incorporated with/into models that, on their own, are not capable of such a feature.

Figure 122:
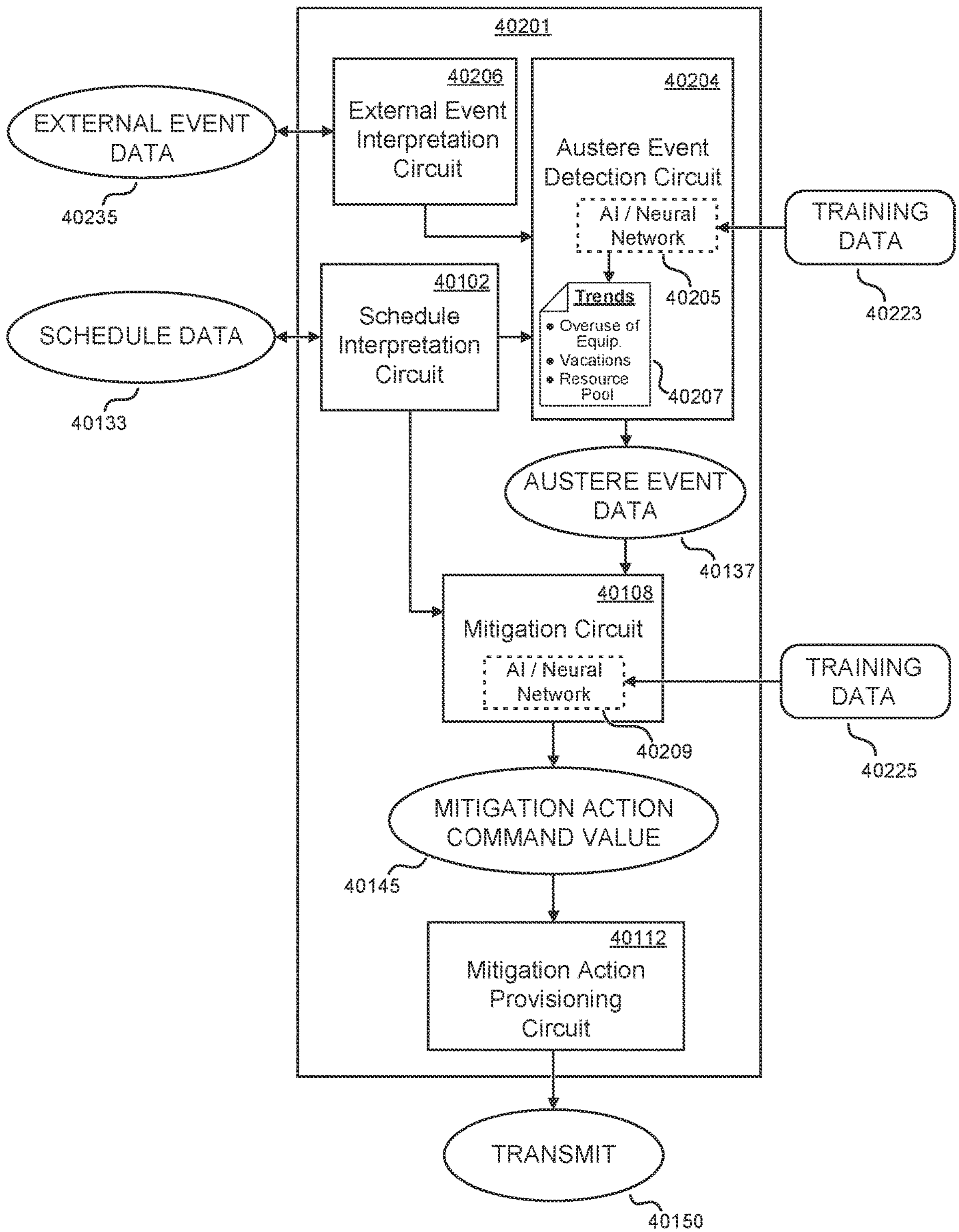

Looking now to FIG. 122, another embodiment of an austere event scheduling apparatus 40201 is provided. The apparatus 40201 includes a schedule interpretation circuit 40102, an external event interpretation circuit 40206, and an austere event detection circuit 40204. As discussed herein, the schedule interpretation circuit 40102 is structured to interpret schedule data 40133, which, dependent on the needs of the scenario, may be provided directly to the apparatus 40201 or monitored via the schedule interpretation circuit 40102 from outside the apparatus 40201. The external event interpretation circuit 40206 is structured to interpret external event data 40235, such as, but not limited to: weather data, supply chain data, the status of equipment, employee health events, e.g., illness, acute incapacity, or health emergencies; employee life events, e.g., birthdays, children, or significant personal milestones; or geo-political events, e.g., government induced trade restrictions. As with the schedule interpretation circuit 40102, dependent on the needs of the scenario, the external event data 40235 may be provided directly to the apparatus 40201 or the external event circuit 40206 is structured to monitor external event data 40235 from outside the apparatus 40201.

The interpreted schedule data and the interpreted external event data may be provided to the austere event detection circuit 40204, which may be structured to detect an austere event and, in response, generate austere event data 40137 indicative of the austere event. That is, the austere event detection circuit 40204 may process schedule information (supplied to the apparatus 40201 as schedule data 40133 and interpreted by the schedule interpretation circuit 40102) and external event information (supplied to the apparatus 40201 as external event data 40235 and interpreted by the external event interpretation circuit 40206) and determines if an austere event is currently occurring, has occurred, or will occur in the future and generates austere event data 40137 indicative of the austere event. Within apparatus 40201, as shown in FIG. 122, the austere event detection circuit 40204 uses machine learning to analyze the interpreted schedule data and the interpreted external event data to detect an austere event and generate the austere event data 40137. In some aspects of the present disclosure, this machine learning includes a neural network 40205 trained with training data 40223. The training data 40223 can, in some aspects of the present disclosure, include data associating past austere events with prior schedule data and prior external event data. In some aspects of the present disclosure, the neural network 40205 is trained using training data 40223 to detect trends 40207 in schedule data indicative of an austere event. Such trends 40207 can include, but are not limited to, an overuse of a piece of equipment, the number of employee vacations scheduled, the timing of scheduled employee vacations, a shrinking resource pool, and the like. For example, a neural network may learn that a snowstorm may require a twenty percent (20%) staffing increase for two to three days before the snowstorm is expected to hit a location. In turn the neural network may adjust one or more biases in an agglomerate network, as disclosed herein, to increase the weights of a model/circuit/module that calls for increased staffing in a schedule.

In embodiments, a neural network may learn that certain adjustments to an agglomerate network are viable only in certain circumstances. For example, in embodiments, a neural network may learn that increased staffing mitigates an austere event for a snowstorm in a warm location, e.g., North Carolina, where an expected snowfall is <2" but is not warranted in a northern location, e.g., Vermont, where snowfall is predicted to be <4", e.g., people in Vermont are less likely to be impacted by snow than people in North Carolina and therefore will feel less of a need to stock up on milk and eggs prior to the storm.

Embodiments of the austere event scheduling apparatus 40201 can further include a mitigation circuit 40108, which, responsive to interpreted schedule data 40133 (provided by the schedule interpretation circuit 40102) and austere event data 40137 (provided by the austere event detection circuit 40204), is structured to generate a mitigation action command value 40145. As discussed in detail above, this mitigation action command value 40145 is structured to effect a change in schedule data sufficient to mitigate an effect on an austere event. The mitigation circuit 40108 may processes the interpreted schedule data 40133 (as provided by the schedule interpretation circuit 40102) and the austere event data 40137 (as provided by the austere event detection circuit 40204) to determine if a detected austere event is likely to adversely impact the business operation. If such a likelihood is determined, the mitigation circuit 40108 generates a mitigation action command value 40145. The mitigation action command value 40145 may be indicative of and/or be structured to trigger a schedule change that will eliminate or otherwise mitigate the effect of a detected austere event. In certain aspects of the apparatus 40201, as shown in FIG. 122, the mitigation circuit 40204 uses machine learning to analyze the interpreted schedule data and the austere event data 40137 to determine if the detected austere event is likely to adversely impact business operation and generate the mitigation action command value 40145 in response. In some aspects of the present disclosure, this machine learning includes a neural network 40209 trained with training data 40225. The training data 40225 can, in some aspects of the present disclosure, include data associating past austere events with schedule changes that successfully eliminated and/or otherwise mitigated the impact of those events on business operations.

In embodiments, the austere event scheduling apparatus 40201 includes a mitigation action provisioning circuit 40112 which is structured to transmit 40150 the mitigation action command value 40145 to systems external to apparatus 40201. Responsive to the transmitted mitigation action command value 40150, these external systems can implement the schedule change generated by the mitigation circuit 40108 and thereby eliminate or otherwise significantly mitigate the impact of a detected austere event.

Figure 123:
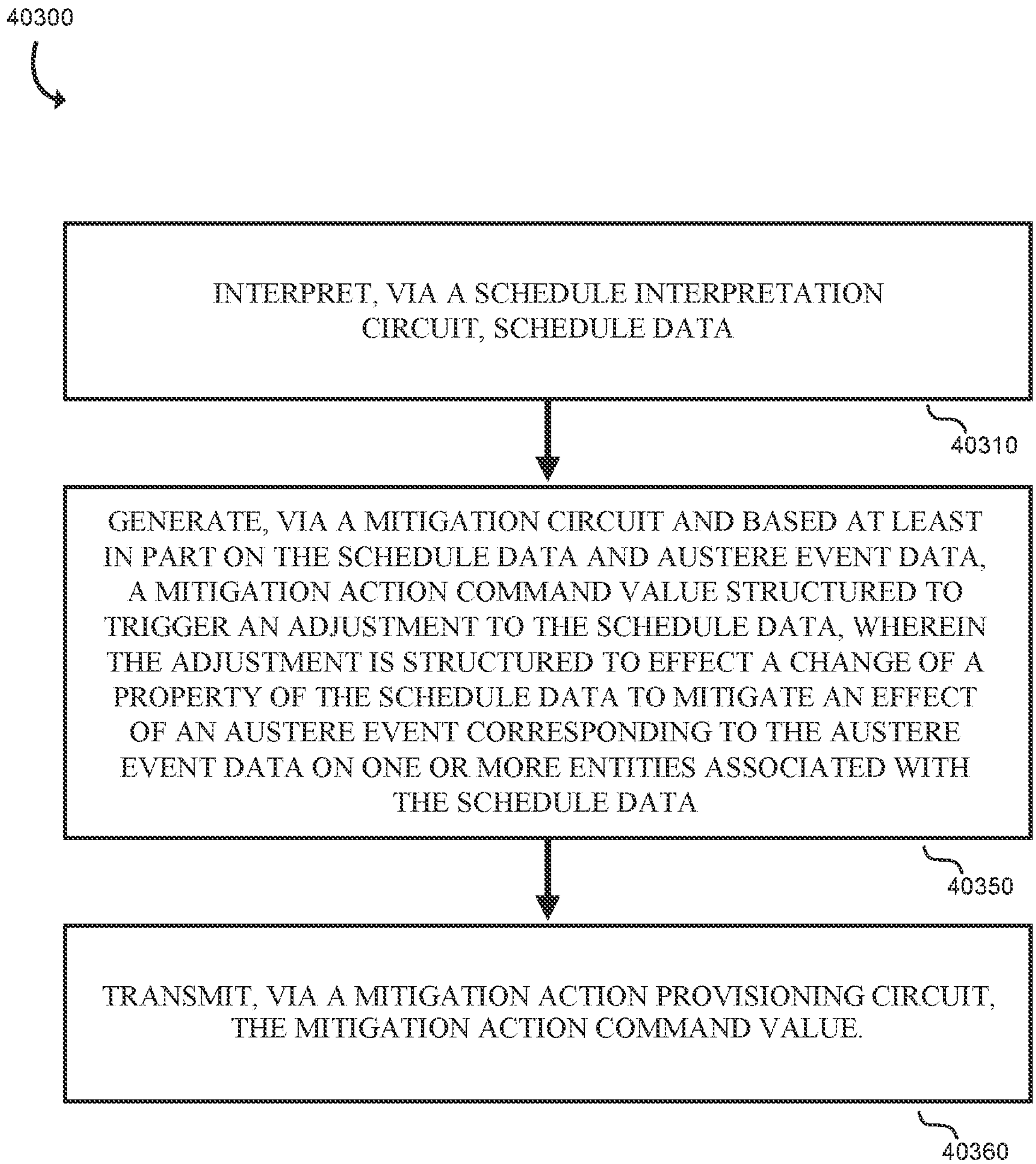

Referring now to FIG. 123, a method 40300 for adjusting a schedule responsive to an austere event is provided. The method 40300 may be performed via apparatuses 40101, 40201, and/or any other computing device disclosed herein. As shown in FIG. 123, at 40310, schedule data is interpreted via a schedule interpretation circuit. At 40350, a mitigation action command value is generated via a mitigation circuit. The mitigation action command value may be based, at least in part, on the schedule data as interpreted at 40310 and/or austere event data corresponding to at least one austere event; and is structured to trigger an adjustment to the schedule data. This adjustment to the schedule data is, in turn, structured to effect a change of a property within the schedule data sufficient to mitigate an effect of an austere event corresponding to the austere event data on one or more entities associated with the schedule data. At 40360, the mitigation action command value may be transmitted, such as via a mitigation action provisioning circuit. In this way, embodiments of method 40300 eliminate or otherwise mitigate the effect(s) of the austere event on the one or more entities. The structure and function of the schedule interpretation circuit, the mitigation circuit, and/or the mitigation action provision circuit—as well as austere event data corresponding to an austere event as used within those circuits—are described in further detail within the discussions of FIGS. 121 and 122, herein.

Figure 124:
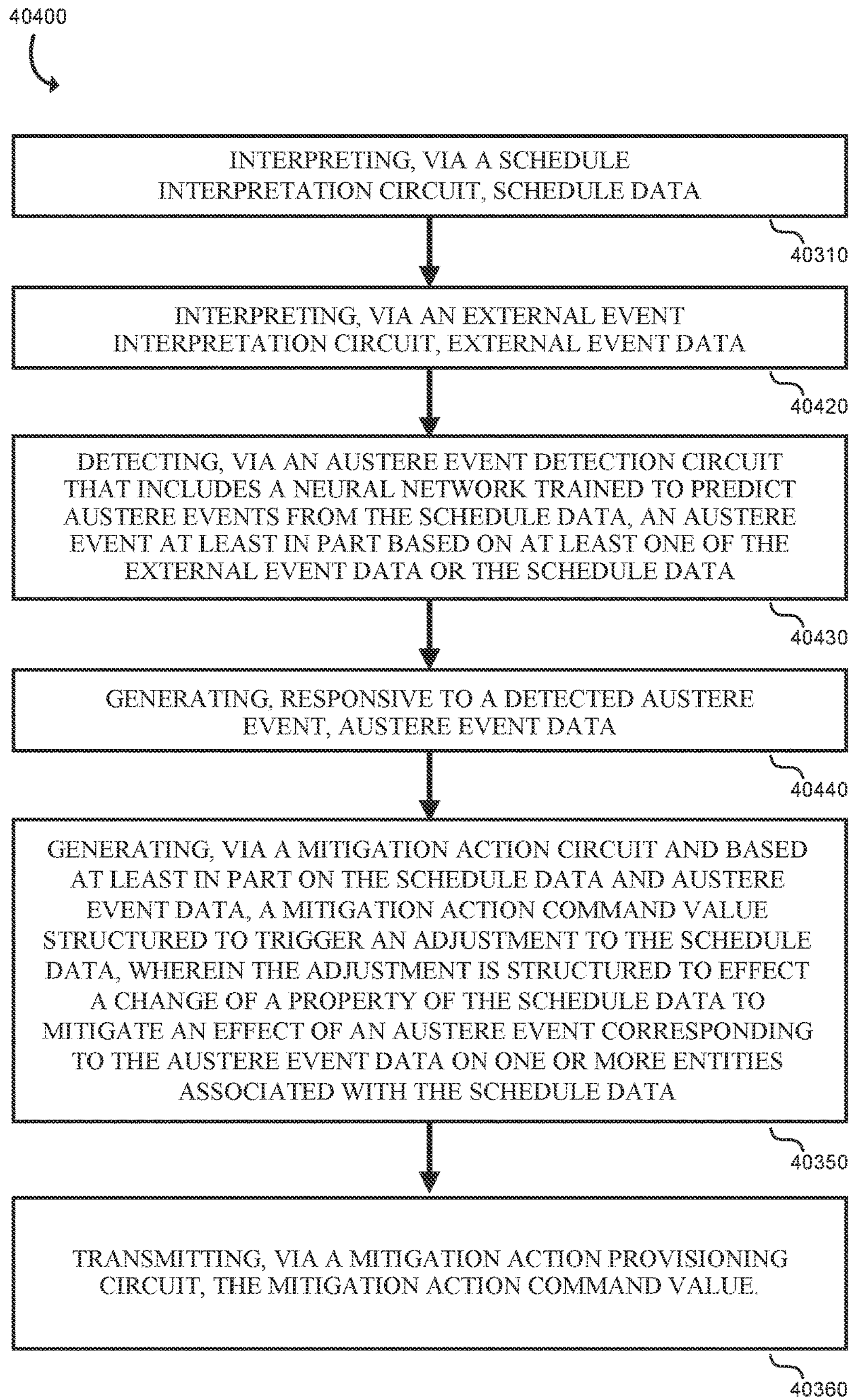

Referring now to FIG. 124, another method 40400 for adjusting a schedule response to an austere event is provided. The method 40400 may be performed by apparatuses 40101, 40201, and/or any other computing device disclosed herein. At 40310, schedule data is interpreted via a schedule interpretation circuit. At 40420, external event data is interpreted by an external event interpretation circuit. Within certain aspects of the present disclosure, the external event data may correspond to one of more types of data including, but not limited to, weather data, supply chain data, equipment status data, employee health event data, employee life event data, geo-political event data, and/or the like. At 40430, at least one of the interpreted schedule data or the interpreted external event data are processed via an austere event detection circuit to detect an austere event. The detection at 40430 can be performed by a neural network within the austere event detection circuit, wherein the neural network is trained to predict austere events from the schedule data. At 40440, if an austere event is detected at 40430, austere event data corresponding to the detected austere event is generated by the austere event detection circuit. At 40350, a mitigation action command value is generated via a mitigation circuit. The mitigation action command value is based, at least in part, on the schedule data (as interpreted at 40310) and on austere event data (generated at 40440) and is structured to trigger an adjustment to the schedule data. This adjustment to the schedule data may be, in turn, structured to effect a change of a property within the schedule data sufficient to mitigate an effect of an austere event corresponding to the austere event data on one or more entities associated with the schedule data. In this way, method 40400 eliminates and/or otherwise mitigates the effect of the austere event on the one or more entities. The structure and function of the schedule interpretation circuit, the mitigation circuit, and/or the mitigation action provision circuit—as well as schedule data and external event data as used within those circuits—are described in detail within the discussions of FIGS. 121 and 122, herein.

Figure 125:
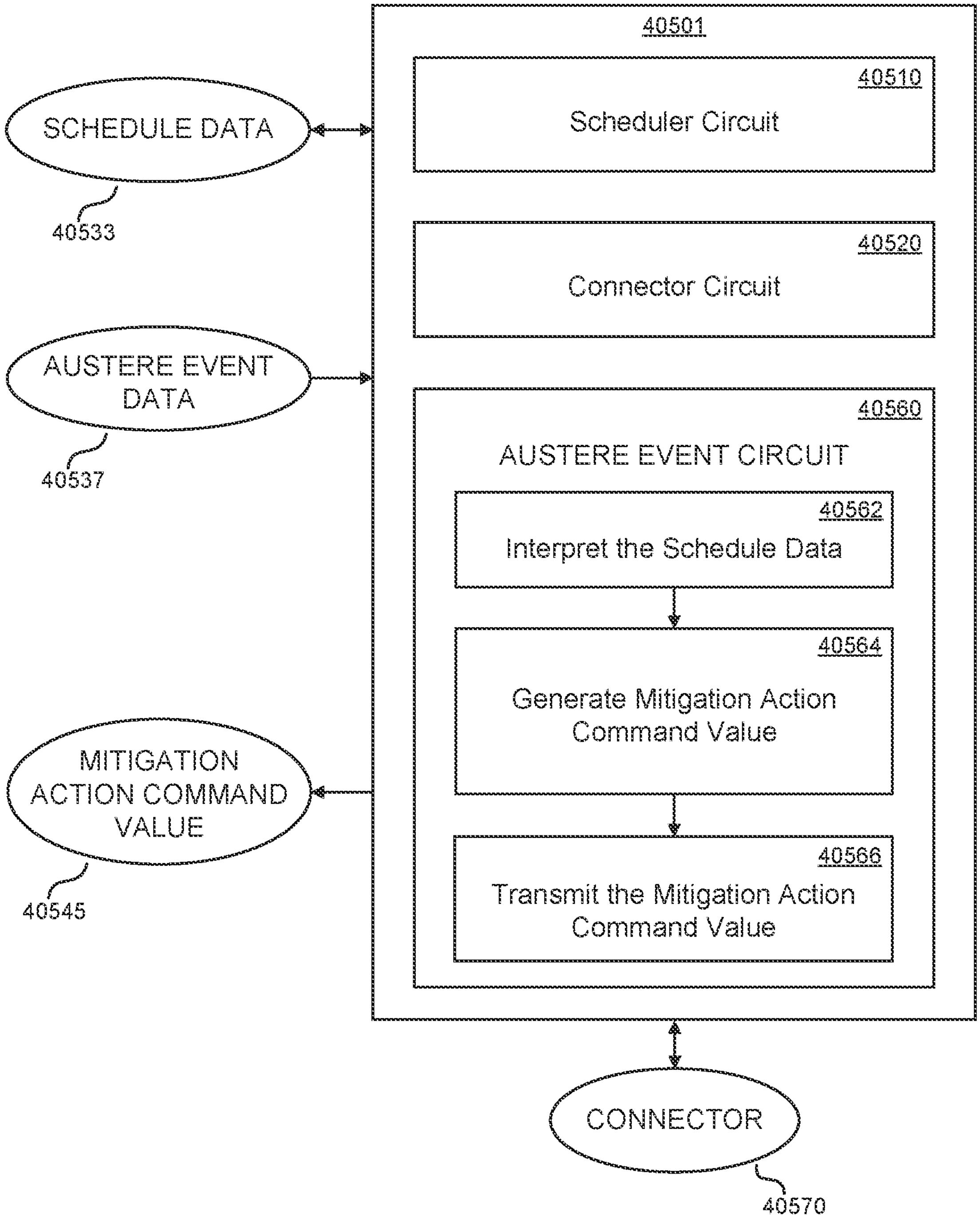

Referring to FIG. 125, an agglomerate network 40501 for generating schedule data which includes an austere event circuit 40560 according to the methods of the present disclosure is provided. The agglomerate network 40501 for generating schedule data includes a scheduler circuit 40510 structured to output the schedule data; and a connector circuit 40520 structured to adjust at least one of an input to the scheduler circuit or the schedule data outputted by the scheduler circuit. The agglomerate network 40501 further includes an austere event circuit 40560 structured to: interpret 40562 the schedule data 40533; and generate 40564, based at least in part on schedule data 40533 and austere event data 40537, a mitigation action command value 40545 structured to trigger an adjustment to a connector 40570. The adjustment is structured to effect a change of at least one of the input to the scheduler circuit or the schedule data outputted by the scheduler circuit. The austere event circuit 40560 is further structured to transmit 40566 the mitigation action command value 40545.

Figure 126:
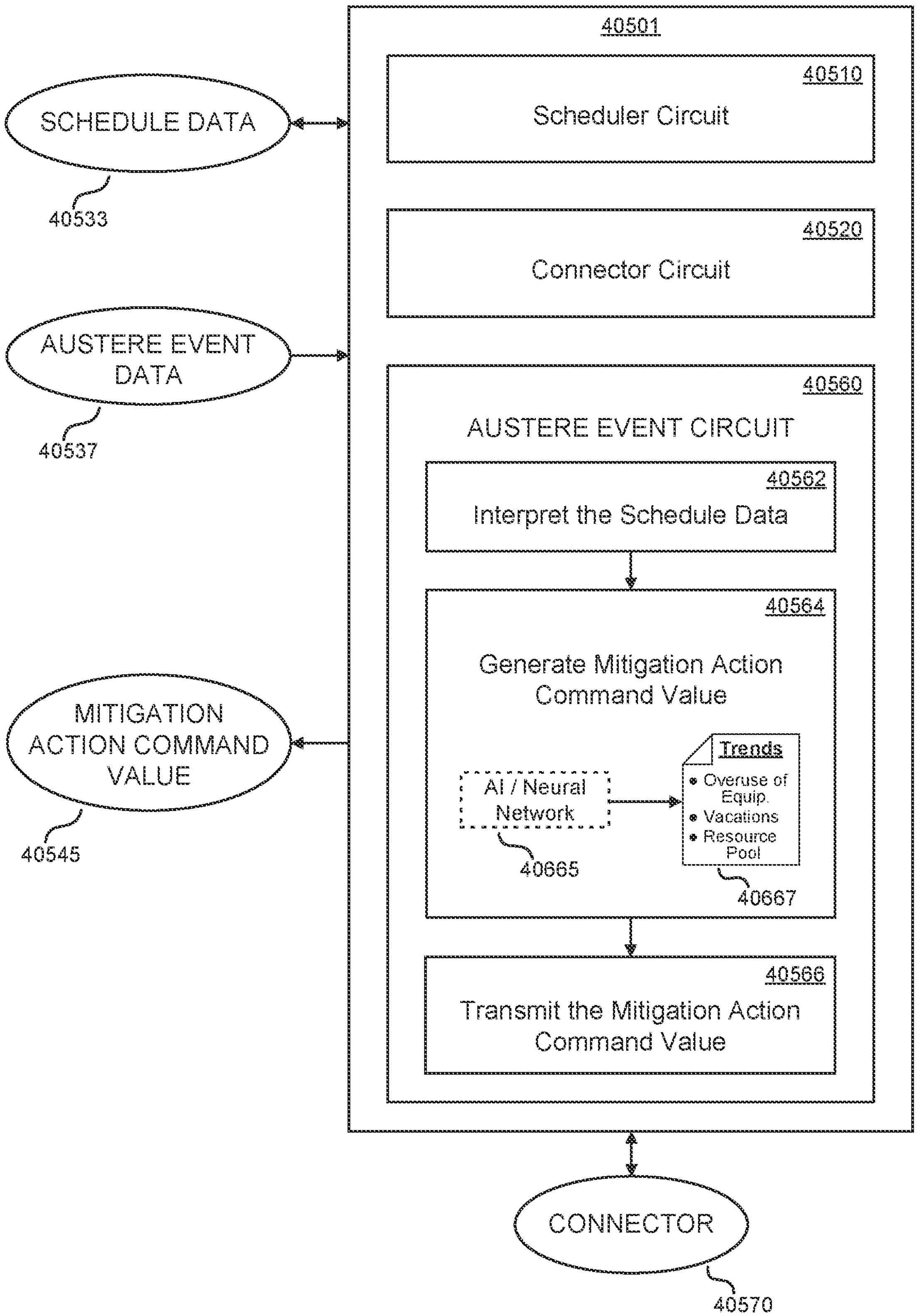

Referring to FIG. 126, certain further aspects of the agglomerate network 40501 for generating schedule data are described following, any one or more of which may be present in certain embodiments. For example, the austere event circuit may generate the mitigation action command value 40545 based at least in part on machine learning 40665. The machine learning extracts trends 40667 from the schedule data 40533, and the trends 40667 are used to generate the mitigation action command value 40545. In embodiments, the trends 40667 include an overuse of a piece of equipment, a number of vacations, timing of vacations, a shrinking resource pool, and/or the like.

Figure 127:
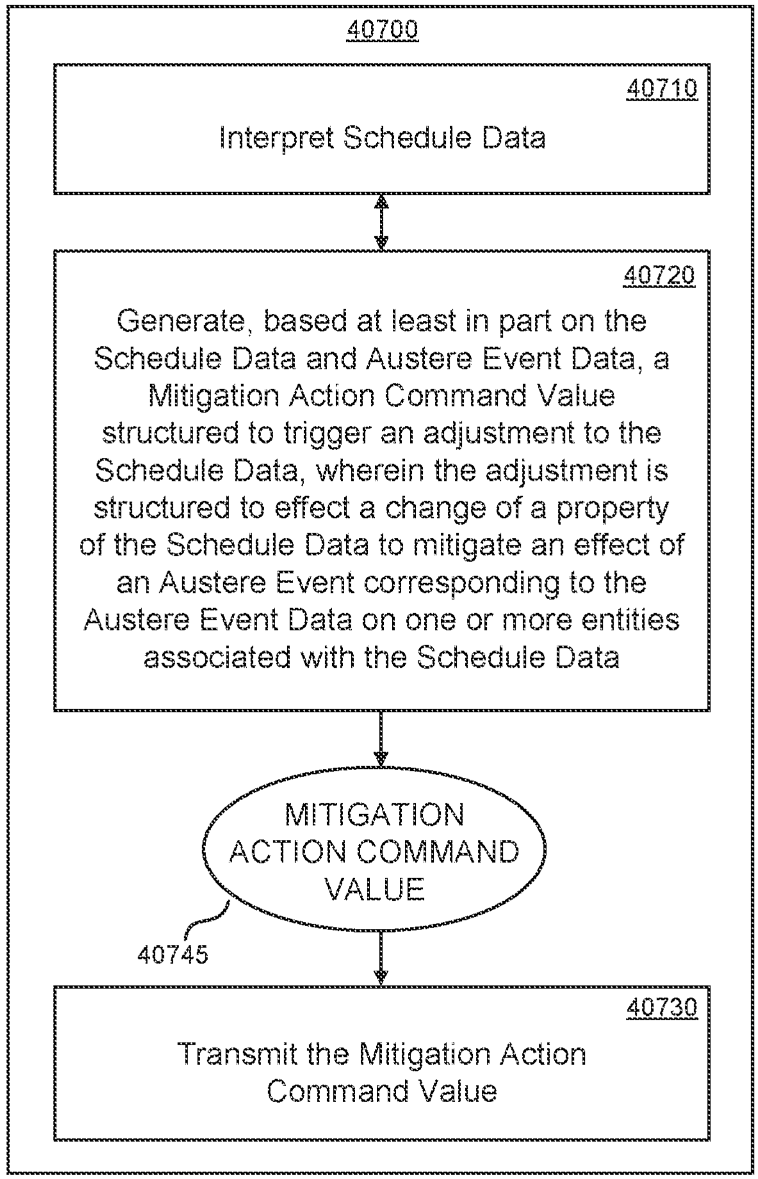

Referring now to FIG. 127, a non-transitory computer-readable medium 40700 that stores instructions that adapt at least one processor to interpret and adjust schedule data responsive to an austere event is provided. The instructions that adapt at least one processor to: at 40710, interpret schedule data; at 40720, generate, based at least in part on the schedule data and austere event data, a mitigation action command value 40745 structured to effect a change of a property of the schedule data; and at 40730, transmit the mitigation action command value.

Figure 128:
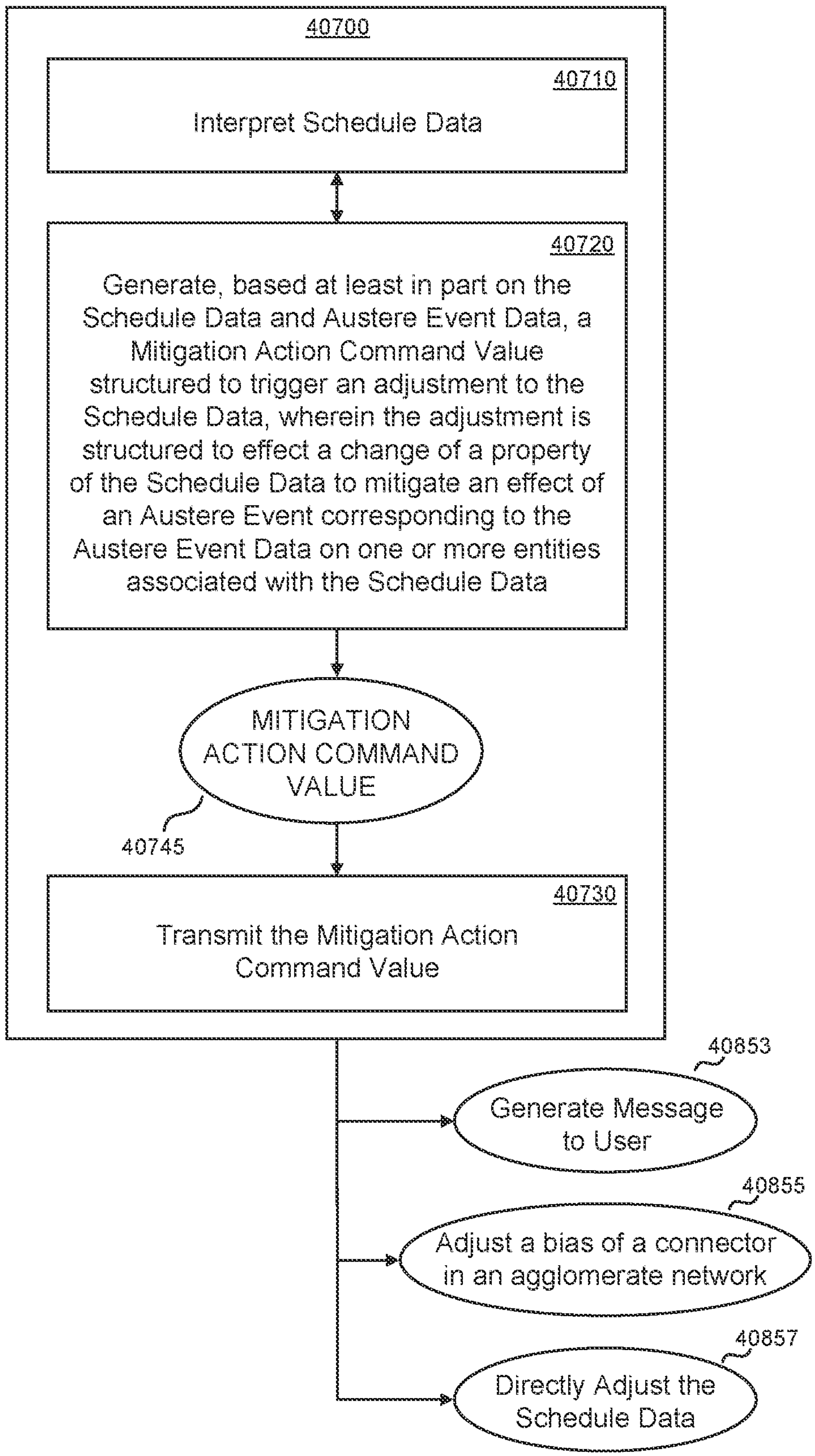

Referring to FIG. 128, certain further aspects of the non-transitory computer-readable medium 40700 are described following, any one or more of which may be present in certain embodiments. For example, in embodiments, the mitigation action command value 40745 is structured to generate a message to a user 40853, adjust a bias of a connector in an agglomerate network 40855, directly adjust the schedule data 40857, and/or perform some combination of these actions.

Figure 129:
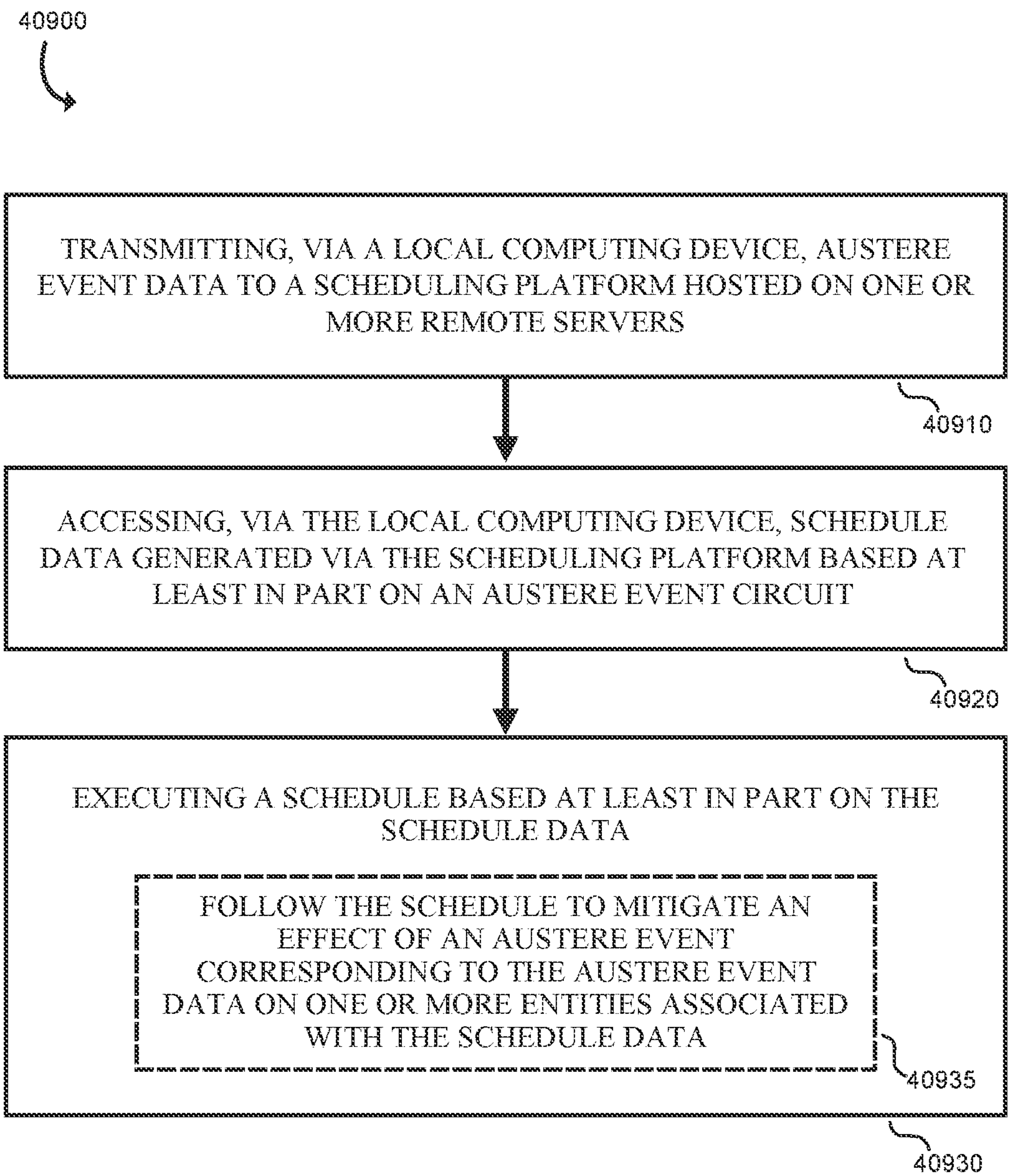

Referring to FIG. 129, another method 40900 of adjusting a schedule responsive to an austere event is provided. The method 40900 includes at 40910, transmitting, via a local computing device, austere event data to a scheduling platform hosted on one or more remote servers; at 40920, accessing, via the local computing device, schedule data generated via the scheduling platform based at least in part on an austere event circuit; and at 40930, executing a schedule based at least in part on the schedule data. In embodiments, the schedule is structured to mitigate an effect of an austere event corresponding to the austere event data on one or more entities associated with the schedule data. As such, the method 40900 may further include at 40935, following the schedule to mitigate the effect of the austere event corresponding to the austere event data on one or more entities associated with the schedule data.

Figure 130:
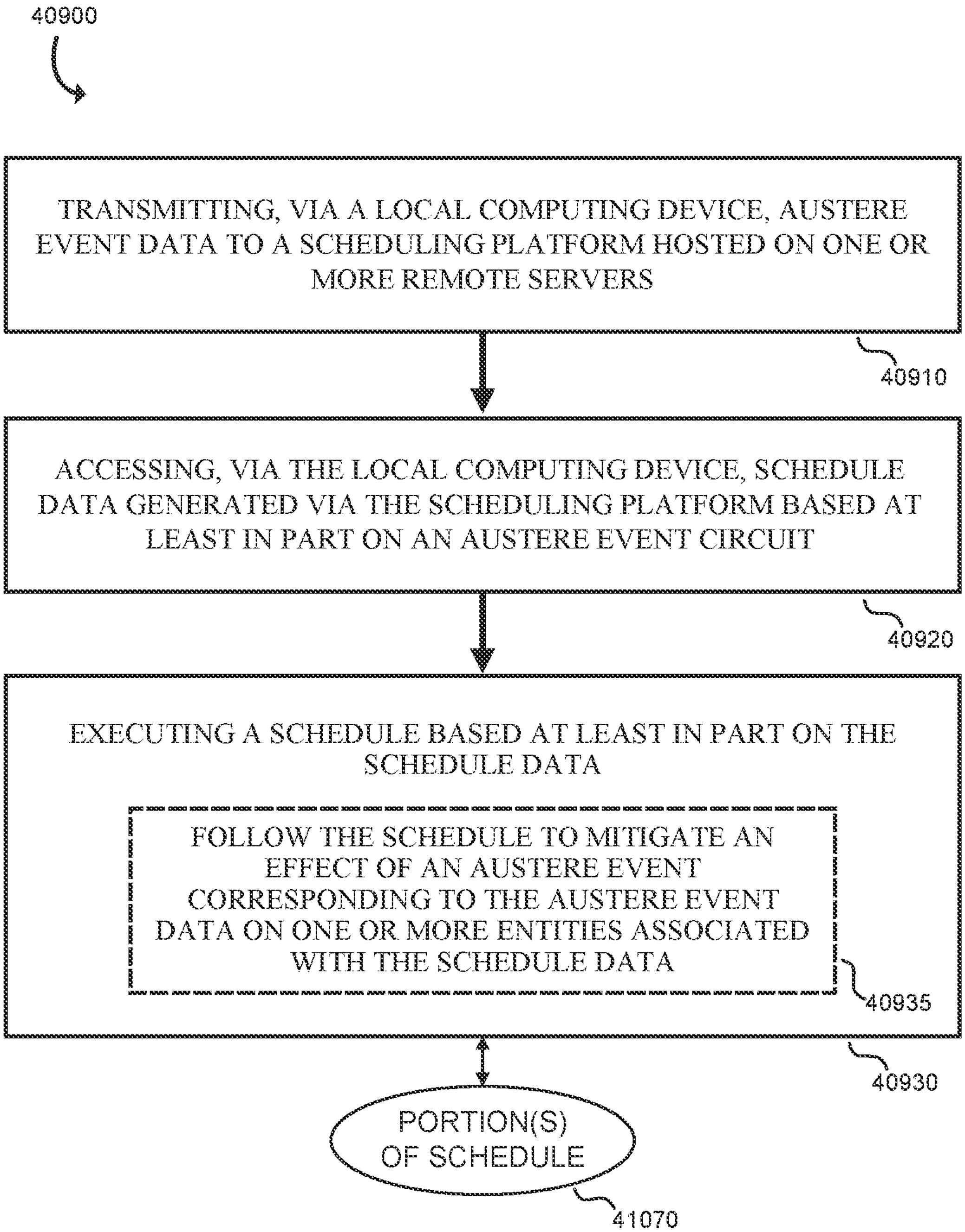

Referring to FIG. 130, certain further aspects of the method 40900 are described following, any one or more of which may be present in certain embodiments. The schedule data corresponds to a portion of a schedule 41070 that is less than the entire schedule.

In embodiments, another agglomerate model, a detailed shift scheduling solution, might be focused on the individual hours that staff will work, and, as such, there may be other requirements the model considers, e.g., having a developer on-call 24/7 to address emergency maintenance or support requirements.

Yet another agglomerate model may convert staffing shortfalls into recruiting requests and onboarding estimates, e.g., when new staff may be available.

Still yet another agglomerate model may estimate attrition levels based on past performance, sentiment, schedule-based sentiment impacts (too many hours, not enough hours, etc.).

Still yet another agglomerate model may provide for schedule experimentation, e.g., allowing an AI, ML, and/or a human to experiment and/or explore one or more spaces relating to one or more schedules. Embodiments may provide for the design and/or execution of simulated experiments and/or real experiments (conducted in the real world) with AI learning from the results. The selection of executed experiments (and/or implementation of changes based on the results) may be automatic and/or manual. The system may provide for one or more risk tolerance controls, e.g., dials and/or sliders, that allow a user and/or AI to define how much they are willing to risk a poor outcome on an experiment. Embodiments may also provide for the ability of an employee to opt-in to an experiment, wherein the employee may be enticed to do so via pay incentives, e.g., an extra $1.00/hr, and/or other incentives. Embodiments may also provide for an employee to opt-out of an experiment.

Still yet another agglomerate model may estimate absenteeism. Such a model may take as inputs, weather models, illness models, holiday and/or event-based models, pay (absolute), pay (relative to market), pay (bonuses and benefits), promotion opportunities, etc.

As discussed herein with respect to module/component 112 (FIG. 1), some embodiments of the current disclosure may provide for a schedule market and/or marketplace, e.g., a bidding system/process and/or other market-based system/process for letting employees compete for shifts. Embodiments of the marketplace may provide for the comparison of "bids" on a schedule and/or time slot. Embodiments of the marketplace may also provide for guards that mitigate and/or prevent undesirable employee shifts, e.g., all experienced employees on the same shift while other shifts have only inexperienced employees. Such guards may prevent the highest bid from winning based on one or more considerations, e.g., the person placing the bid. For example, a highest bid may not win if it is from an experienced employee. In other words, embodiments of the marketplace may weigh bids differently based on employer considerations, to include the turnover and/or schedule flexor consideration disclosed herein. Embodiments of the marketplace may also provide for privacy policies to mitigate sensitive employee bids from being viewed by multiple employers and/or bosses within a single organization.

Figure 131:
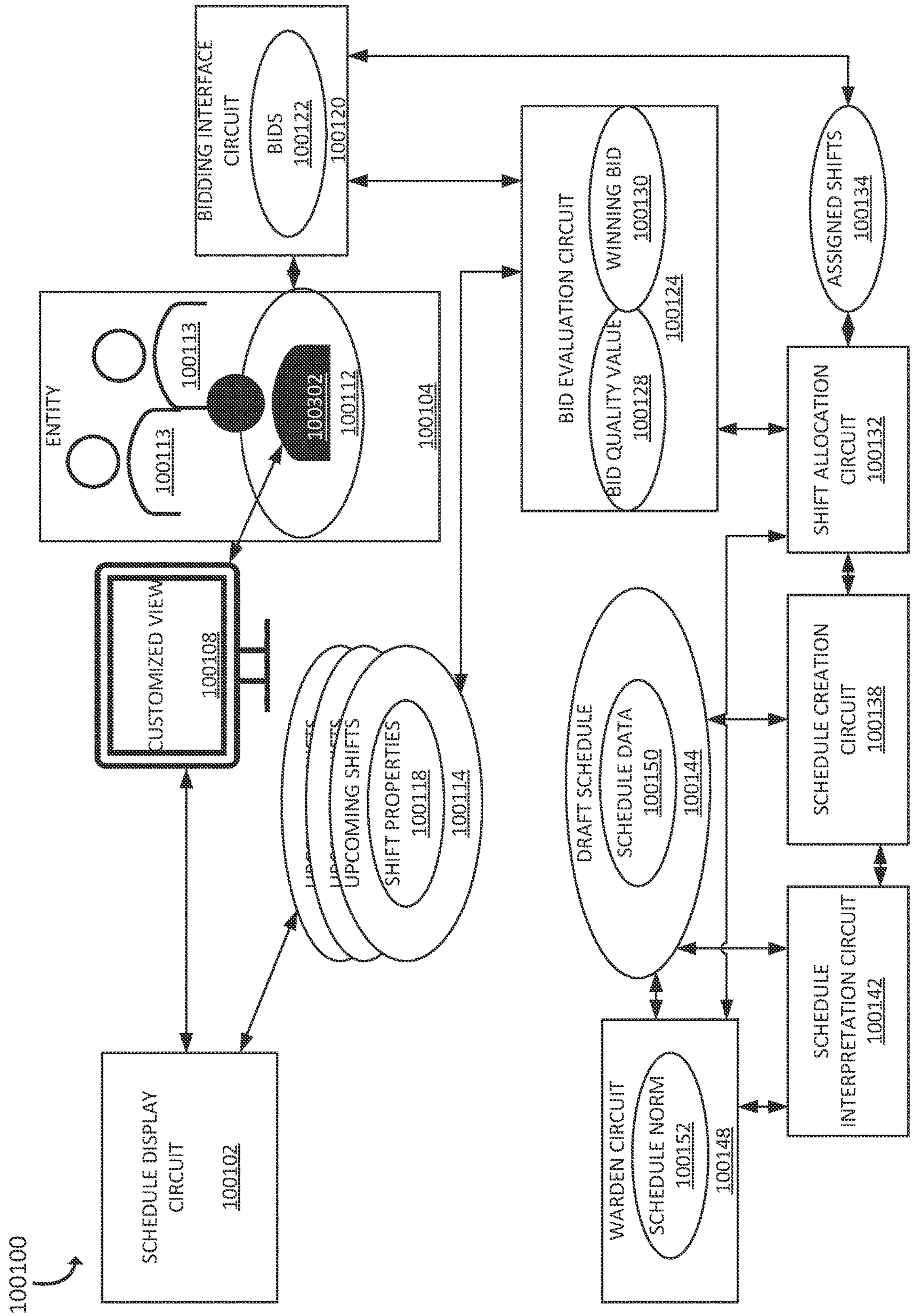

Accordingly, referring to FIG. 131, an apparatus 100100 for letting employees/workers 100112, 100113 of a common entity 100104 compete for upcoming shifts 100114 and for obtaining insights regarding shift properties 100118 are depicted. The apparatus 100100 may include a schedule display circuit 100102 to display to a customized view 100108 of a plurality of upcoming shifts 100114. Workers 100112, 100113 may each have one or more worker properties 100302 (as depicted in FIG. 133 and described elsewhere herein) that may include worker skills 100304, seniority 100308, a ranking 100310, a qualification 100312, a certification 100314, a classification 100318, and the like as described elsewhere herein. Upcoming shifts 100114 may include a variety of shift properties 100118 (as depicted in FIG. 134 and described elsewhere herein) such as time slot 100402, overtime multiplier 100404, a job classification 100408, required certifications 100410, skills 100412, or qualifications required of workers on the shift 100114, and the like as described elsewhere herein. The customization of the customized view 100108 may be based, at least in part on an identity of a worker (the identified worker 100112), to whom the customized view 100108 is being displayed and their corresponding worker properties 100302, as well as the shift properties 1000118. For example, if an upcoming shift 100114 requires that workers 100112, 100113 be certified on a particular piece of equipment, that upcoming shift 100114 would be displayed only to workers 100112, 100113 having that required certification. The apparatus 100100 may further include a biding interface circuit 100120 to allow each of the workers 100112, 100113 to submit a bid 100122 on any of the upcoming shifts 100114 shown in their customized view 100108, e.g., each identified worker 100112 may bid on any of the upcoming shifts 100114 in their customized view 100108 (upcoming shifts for which they are qualified, e.g., their corresponding worker properties 100302 and the shift properties 1000118 are compatible).

A bid evaluation circuit 100124 may evaluate each submitted bid 100122 and determine a bid quality value 100128 for each bid 100122 based on corresponding shift properties 100118, the bid 100122, and worker properties 100302 corresponding to the worker 100113 that submitted the bid 100122. Based on the submitted bids 100122 and bid quality values 100128, a winning bid 100130 is determined for a particular upcoming shift 100114. A shift allocation circuit 100132 may then allocate the upcoming shifts 100114 to different workers 100113 based on the winning bids 100130. The allocated shifts 100134 may then be provided to the different workers 100113.

A bid 100120 may be made in terms of bidding tokens 100122. Bidding tokens 100122 may be provided to workers 100112, 100113 based on equal amounts, seniority, as token of appreciation, and the like. A bid 100120 may be made in terms of local currency, digital currency (e.g., BitCoin), and the like. A worker 100112 may submit bids 100122 for different amounts for different upcoming shifts 100114 based on the corresponding shift properties 100118, their corresponding worker properties 100302, e.g., skill set, qualifications, and the like. For example, a worker 100112 may submit higher bids 100120 for upcoming shifts having higher shift multipliers, better time slots, and the like. A worker 100112 may submit lower bids for upcoming shifts 100114 having less desirable shift properties 100302 such as an inconvenient time slot (e.g., C shift), date (e.g., a holiday), working conditions/location, and the like.

In embodiments, apparatus 100100 may include a schedule creation circuit 100138 to develop a draft schedule 100144, based at least in part, on the assigned upcoming shifts 100134. A schedule interpretation circuit 100142 to interpret schedule data 100150 associated with the proposed draft schedule 100144 and a warden circuit 100148 (described in detail elsewhere herein) to determine, based at least in part on the schedule data 100150, that a property of the schedule data 100150 violates a schedule norm 100152. In response to a violation of a schedule norm 100152, the shift allocation circuit 100132 may revise one or more assignments for the upcoming shifts (the assigned shifts 100134).

Referring to FIG. 132, in embodiments, the apparatus 100100 may include a group detection circuit 100202 to detect a trading group 100204. The group detection circuit 100202 evaluates schedule data 100150, bids 100122, workers 100113 and worker properties 100302, schedule data 100150, historic schedule data 100210, and the like to determine whether there is a trading group 100204, e.g., a subset of workers who appear to have coordinated their bids 100122, or trades 100208 of assigned shifts 100134 amongst the subset of workers 100113. The warden circuit 100148 may further evaluate the schedule data 100150, the bids 100122 and trades 100208 of the trading group 100204 to determine whether the workers 100113 of the trading group 100204 are benefiting to the determinant of workers 100113 that are not part of the trading group 100204. The trading group 100204 may benefit by bidding or trading in such a way that they are assigned more preferred shifts relative to workers 100113 that are not part of the trading group 100204.

Referring to FIG. 135, a method 100500 may include displaying a customized view of a plurality of upcoming shifts 100502, where the view is customized based on the identity of the worker to whom the view is being shown and the customization is based on alignment between a worker property corresponding to the identified worker and any required shift properties. Different view may be shown to each worker in the entity where the different views are each customized according to the individual worker properties. Based on the upcoming shifts displayed, each worker may enter a bid for one or more of the upcoming shifts where the bid is made in terms of bidding tokens, local currency, digital currency (e.g., BitCoin), and the like. Bidding tokens may be provided to workers based on equal amounts, seniority, as token of appreciation, and the like. The bids entered by each worker may be based on a variety of factors including each worker's like/dislike of various shift properties, their availability, external constraints, and available bidding tokens/currency, and like.

The method 100500 may further include interpreting a plurality of bids 100504 and evaluating each submitted bid 100508. The method 100500 may further include determining a bid quality value for each bid 100510 and determining the winning bid 100512. The bid quality value may be based, at least in part, on the bid, shift properties, worker properties corresponding to the worker who submitted the bid, and the like. The bid quality value may then be used in the determination of the winning bid. The method 100500 may further include assigning upcoming shifts to the worker corresponding to the winning bid for that shift 100514.

In embodiments, the method 100500 may further include determining a shift property quality value 100518 for a subset of the available upcoming shifts, where the subset of shifts may include two or more shifts but have at least one shift property in common. The method 100500 may further include identifying a bidding trend 100520 associated with the common shift property. In an illustrative example, bids for a subset of upcoming shifts may be lower when each of the upcoming shifts has a lower than average overtime multiplier compared with a different subset of similar upcoming shifts with an average or higher than average overtime multiplier. A bidding trend of bids declining with a decline in overtime multiplier might be identified. The method 100500 may further include adjusting a shift property for future shifts 100522 based on identified shift property quality values and/or bidding trends.

Referring to FIG. 136, instructions 100600 for a processor are depicted. The instructions may be stored on a non-transitory computer-readable medium and are structured to adapt a processor to implement the instructions. The instructions 100600 may include displaying a customized view 100602 of a plurality of upcoming shifts and interpreting a plurality of bids 100604 for the upcoming shifts. The view may be customized based on the identity of the worker to whom the view is being shown and the customization is based on alignment between a worker property corresponding to the identified worker and any required shift properties. Different view may be shown to each worker in the entity where the different views are each customized according to the individual worker properties. Based on the upcoming shifts displayed, each worker may enter a bid for one or more of the upcoming shifts where the bid is made in terms of bidding tokens, local currency, digital currency (e.g., BitCoin), and the like. Bidding tokens may be provided to workers based on equal amounts, seniority, as token of appreciation, and the like. The bids entered by each worker may be based on a variety of factors including each worker's like/dislike of various shift properties, their availability, external constraints, and available bidding tokens/currency, and like.

The instructions 100600 may further include evaluating each bid 100608 and determining a bid quality value for each bid 100610. The bid quality value may be based, at least in part, on the bid, the shift property, and a worker property of a corresponding worker who submitted the bid. The instructions 100600 may further include determining a winning bid 100612 from the submitted bids and assigning upcoming shifts to workers 100614 corresponding to the winning bids for each shift.

Referring to FIG. 137, an apparatus 100700 for enabling workers to bid on upcoming shifts is depicted. The apparatus 100700 may include a schedule display circuit 100702 to display a customized view 100704 of a plurality of upcoming shifts and a bidding interface circuit 100708 to enable a plurality of workers 100712 to submit a bid 100710 for an upcoming shift 100114. The workers 100712 may be employed by a common entity, a set of related entities, or the like. Each worker 100712 may have a set of corresponding worker properties 100302, and each upcoming shift 100114 have a set of corresponding shift properties 100118 as described elsewhere herein. The customized view 100704 may be based, at least in part on shift properties 100118 and worker properties 100302. For example, schedule display circuit 100702 may customize each view such that each worker 100712 sees only upcoming shifts 100114 for which their worker properties 100302 (e.g., ranking, qualification, skills, experience, etc.) meet the requirements specified in the shift properties 100118. In some embodiments, the customized view 100704 may include upcoming shifts 100114 for which the worker 100712 almost qualifies except for lack of experience (as determined based on the worker properties 100302 as well as indications of how the worker 100712 might gain the needed experience in order to qualify for these upcoming shifts 100114. In embodiments, a customized view might indicate that after a worker 100712 had worked a certain number of shifts in one role, they might qualify to work different roles or shifts in the future. For example, after three shifts in an assistant role, a worker might be qualified to work in a primary role on similar shifts.

A bid evaluation circuit 100714 may be structured to evaluate each of the bids 100710, determine a corresponding bid quality value 100718, and determine a winning bid 100720 based at least in part on the bid quality value 100718. A shift allocation circuit 100722 may assign each upcoming shift (assigned shifts 100724) to one of the plurality of workers 100712 corresponding to the winning bid 100720.

The apparatus 100700 may further include a shift evaluation circuit 100728 to determine shift property quality values 100730 for each of a subset of the upcoming shifts 100114 based, at least in part, on the bids 100710, the bid quality value 100718, the shift properties 100118, or combinations or statistics based on the foregoing. Each of the subset shares at least one common shift property 100118. The apparatus 100700 may further include a shift creation circuit 100732 to determine shift properties 100118 for future shifts based on the shift property quality value 100730. For example, based on a shift property 100118 having a low shift property quality value 100730, the shift creation circuit 100732 may try to pair shifts having a property with a low shift property quality value 100730 with a shift property having a high shift property quality value 100730 to make the overall shift more desirable. For example, C-shifts may have a low shift property quality value and so future C-shifts may be designed with a desirable shift property such as higher overtime multiplier property.

In embodiments, the shift evaluation circuit 100728 may also identify a bidding trend 100734 associated with one or more of the shift property quality values 100730. A trend provisioning circuit 100738 may transmit the bidding trend 100734 to a schedule warden circuit 100740. A bidding trend 100734 may identify a commonly preferred shift or a commonly disfavored shift. Common shift property quality values 100730 may correspond with a bidding trend 100734. The schedule warden circuit 100740 may interpret the bidding trend 100734 to verify that the bidding trend 100734 does not violate a schedule norm 100152.

In embodiments, the apparatus 100700 may further include a data storage circuit 100742 to store shift bidding data 100744 on a distributed ledger 100748. The stored shift bidding data 100744 accumulates as historic shift bidding data 100750. The shift bidding data 100744 may include a shift 100114, associated shift properties 1000118, associated bids 100710, worker properties 100302 corresponding to the worker 100712 who made a particular bid 100710, and the like. The historic shift bidding data 100750 may be used to train a shift evaluation model 100749 to be used by the shift evaluation circuit 100728.

Thus, as will be appreciated, the present disclosure describes an apparatus, the apparatus according to one disclosed non-limiting embodiment of the present disclosure may include a schedule display circuit to display, to an identified worker of a plurality of workers, a customized view of a plurality of upcoming shifts, wherein the customization of the view is based, at least in part, on the identified worker of the plurality of workers, and wherein each of the plurality of workers is employed by a same entity and has a corresponding worker property, a bidding interface circuit to enable each of the plurality of workers to submit a bid for an upcoming shift of the plurality of upcoming shifts, wherein each shift of the plurality of upcoming shifts has a shift property, a bid evaluation circuit to evaluate each bid submitted by the plurality of workers, determine a bid quality value for the bid based, at least in part, on the bid, the shift property, and the worker property of a corresponding worker who submitted the bid, and determine a winning bid from the submitted bids based at least in part on the bid quality value, and a shift allocation circuit to assign the upcoming shift to the worker of the plurality corresponding to the winning bid.

A further embodiment of any of the foregoing embodiments of the present disclosure may include a schedule creation circuit to develop a proposed draft schedule based, at least in part, on the assigned upcoming shifts, a schedule interpretation circuit to interpret schedule data associated with the proposed draft schedule, and a warden circuit to determine, based at least in part on the schedule data, that a property of the schedule data violates a schedule norm, wherein the shift allocation circuit further revises an assignment of the upcoming shifts of the plurality of upcoming shifts in response to the determination.

A further embodiment of any of the foregoing embodiments of the present disclosure may include a group detection circuit to detect a trading group, wherein the schedule warden circuit is notified of the trading group and further evaluates the bids and trades of members of the trading group to determine if the trading group is benefiting to a detriment of employees outside of the trading group.

The present disclosure describes a method, the method according on one disclosed non-limiting embodiment of the present disclosure may include displaying, to an identified worker of a plurality of workers, a customized view of a plurality of upcoming shifts, wherein the customization of the view is based, at least in part, on the identified worker of the plurality of workers, and wherein each of the plurality of workers is employed by a same entity and has a corresponding worker property, interpreting a plurality of bids, each bid submitted by one of the plurality of workers for an upcoming shift of the plurality of upcoming shifts, wherein each shift of the plurality of upcoming shifts has a shift property, evaluating each bid submitted by the plurality of workers, determining, a bid quality value for each bid based, at least in part, on the bid, the shift property, and the worker property of a corresponding worker who submitted the bid, determining a winning bid from the submitted bids based at least in part on the bid quality value, and assigning the upcoming shift to the worker of the plurality corresponding to the winning bid.

A further embodiment of any of the foregoing embodiments of the present disclosure may include situations wherein the view of upcoming shifts is based, at least in part, on the shift property.

A further embodiment of any of the foregoing embodiments of the present disclosure may include determining a shift property quality value based on the bids for a subset of the plurality of upcoming shifts, wherein each of the subset has at least one common shift property.

A further embodiment of any of the foregoing embodiments of the present disclosure may include situations wherein the subset of shifts includes two or more shifts.

A further embodiment of any of the foregoing embodiments of the present disclosure may include identifying a bidding trend associated with the at least one common shift property of the subset of the plurality of upcoming shifts.

A further embodiment of any of the foregoing embodiments of the present disclosure may include adjusting at least one shift property for future shifts based at least in part on the shift property quality value.

The present disclosure describes a non-transitory computer-readable medium storing instructions, the non-transitory computer-readable medium storing instructions according on one disclosed non-limiting embodiment of the present disclosure may adapt at least one processor to display to an identified worker of a plurality of workers, a customized view of a plurality of upcoming shifts, interpret a plurality of bids each submitted by one of the plurality of workers for an upcoming shift of the plurality of upcoming shifts, wherein each shift of the plurality of upcoming shifts has a shift property, evaluate each bid submitted by the plurality of workers, determine a bid quality value for each bid based, at least in part, on the bid, the shift property, and a worker property of a corresponding worker who submitted the bid, determine a winning bid for each shift from among the submitted bids based at least in part on the bid quality value, and assign the upcoming shift to the worker of the plurality corresponding to the winning bid.

A further embodiment of any of the foregoing embodiments of the present disclosure may include situations wherein the customization of the view is based, at least in part, on the identified worker of the plurality of workers.

A further embodiment of any of the foregoing embodiments of the present disclosure may include situations wherein each of the plurality of workers is employed by a same entity.

The present disclosure describes an apparatus, the apparatus according on one disclosed non-limiting embodiment of the present disclosure may include a schedule display circuit to display a customized view of a plurality of upcoming shifts, a bidding interface circuit to enable each of a plurality of workers, each employed by a same entity and having a corresponding worker property, to submit a bid for an upcoming shift of the plurality of upcoming shifts, wherein the bid includes an offered amount of a currency, and each shift of the plurality of upcoming shifts has a shift property, a bid evaluation circuit to: evaluate each bid submitted by the plurality of workers, determine a bid quality value for each bid based, at least in part, on the currency, the shift property, and the worker property of the corresponding worker who submitted the bid, and determine a winning bid from the submitted bids based at least in part on the bid quality value, and a shift allocation circuit to assign the upcoming shift to the worker of the plurality corresponding to the winning bid.

A further embodiment of any of the foregoing embodiments of the present disclosure may include situations wherein the customized view of upcoming shifts is determined based, at least in part, on a worker property.

A further embodiment of any of the foregoing embodiments of the present disclosure may include a shift evaluation circuit to determine a shift property quality value for each of a subset of the plurality of upcoming shifts based, at least in part, on the bids, or the bid quality value, wherein each of the subset shares a common shift property, and a shift creation circuit structured to determine shift properties for future shifts based, at least in part, on the shift property quality value.

A further embodiment of any of the foregoing embodiments of the present disclosure may include situations wherein the shift evaluation circuit further identifies a bidding trend associated with one or more of the shift property quality value, and a further including a trend provisioning circuit to transmit the bidding trend.

A further embodiment of any of the foregoing embodiments of the present disclosure may include situations wherein the bidding trend includes a commonly preferred shift.

A further embodiment of any of the foregoing embodiments of the present disclosure may include situations wherein the bidding trend includes a commonly disfavored shift.

A further embodiment of any of the foregoing embodiments of the present disclosure may include a schedule warden circuit to interpret the bidding trend and verify that the bidding trend does not violate a schedule norm.

A further embodiment of any of the foregoing embodiments of the present disclosure may include a data storage circuit to store shift bidding data on a distributed ledger as historic shift bidding data, wherein the shift bidding data includes shift properties, and corresponding bids, and wherein the shift evaluation circuit includes a model trained on the historic shift bidding data.

As described herein, embodiments of the current may include agglomerate model connectors, e.g., module/component 130 (FIG. 1). In embodiments, the system may create Agglomerate Model Connectors, also referred to herein as simply "connectors", between agglomerated models/networks that consume the outputs of other agglomerated models. For example, in a first evolution, the agglomerated project scheduler may develop with an anticipated mix of available developers naively estimated based on available staffing, no attrition or recruitment, no understanding of competing personnel and resource demands, etc. The model may not have considered whether the appropriate mix of individuals is available, what other tasks they might be required to perform, or predictively, when certain staff may be unavailable (on another project, PTO, etc.). When creating multiple schedules, a sub-portion of a schedule (ex a particular set of users or set of days or set of shifts, etc.) may be common across multiple schedules. In some embodiments, this common area may be considered higher confidence. In some UIs, this portion of the schedule may be shown in different color/font/etc. As disclosed herein, connectors may transform the outputs of a first agglomerated network into a format suitable for input to another agglomerated network. Non-limiting examples of transformations provided by connectors, also referred to herein as connector transformations, include: data format manipulations, e.g., short integer format to long integer format, degrees Celsius to degrees Fahrenheit, etc.; data projections, e.g., projecting data in a first domain onto a second domain; programmable object conversions, e.g., transferring properties of a first programmable object to another; and/or other types of data transformations, conversions from a non-normalized format to a normalized format, and/or conversions from a first date/time format to a second date/time format. Embodiments of the current disclosure may also provide for an agent and/or process that determines whether, and what type, of connectors are needed to pass data from one agglomerated network to another. Such determinations may be based at least in part on detecting the expected output format and/or data types of a first agglomerated network and comparing them to the expected inputs of another agglomerated network which is to receive, as input, data from the first agglomerated network.

In embodiments, connector biases may be used to adapt outputs of modules to conditions and/or predictions of an agglomerate network. Connectors serve as the links/data tunnels that pass data between modules and/or manipulate inputs and/or outputs of modules, e.g., connectors chain modules together. In embodiments, connectors may weigh the outputs of one or more models. Connectors may be modules and may be configured with algorithms and/or circuits that learn which bias is appropriate to apply in a given situation. Connectors may also connect to other connectors. In embodiments, connectors may have the following relationships between modules and/or connectors on either the input and/or output sides: one-to-one; one-to-many; many-to-one; and/or many-to-many.

In embodiments, the agglomerate network connectors may be configured with algorithms and/or circuits to learn over time that outputs of modules (such as schedules) may require adjustments for some situations (such as weather events) to generate an acceptable schedule. In embodiments, agglomerate network connectors may be configured with algorithms and/or circuits that can be trained to make adjustments to data that passes through the connector. Outputs of modules may be biased in response to data from other modules using trained connectors. In embodiments, biasing may include adjusting the values of outputs of a module. Biasing may include changing a schedule such as moving employees, blocks, times, and the like. The magnitude of biasing and/or what types of biasing is implemented may depend on the level of uncertainty associated with the outputs of the scheduling module and/or other modules. In one example, higher uncertainty may correspond to a higher bias of values to increase a safety margin.

Outputs of modules may include an object element that includes data (such as a schedule) and metadata and may be propagated through the agglomerate network. Metadata may include a history of biases applied to the data, a history of modules/modes used in generating the data, and/or feedback that was applied to the data.

In embodiments, module biases, module results, confidences/uncertainties, module and/or connector histories, and/or related metadata may be passed between, and/or otherwise accessed, by modules and connectors via the matrix of biases, as disclosed in FIG. 152, FIG. 153, and the related description.

As disclosed in greater detail herein, embodiments of the current disclosure provide for using biases to adapt outputs of modules to conditions and/or predictions of an agglomerate network. Referring to FIG. 138, an apparatus 190100 includes an agglomerate network circuit 190102 structured to interpret input data 190104 and transmit output data 190108. The apparatus 190100 may further include a connector circuit 190110 structured to bias at least one of the input data 190104 prior to interpretation by the agglomerate network circuit 190102 or the output data 190108 prior to transmission by the agglomerate network circuit 190102. Referring to FIG. 139, the apparatus 190100 may include a plurality of connector circuits 190110. In some embodiments, each of the connector circuits 190110 may have an acceptable range for a bias adjustment 190210. A connector feedback loop 190212 may continue until the biases of all connector circuits 190110 are within their corresponding acceptable range. In some embodiments, once a threshold is reached, the connector feedback loop 190212 may terminate.

In one aspect, the output data 190108 of an agglomerate network may be schedule data 190202, and the schedule data 190202 may have a schedule property 190204. For example, the schedule property 190204 may be a shift, such as work shift duration, start time, or end time, or may be a personnel selection.

Referring to FIG. 140, the apparatus 190300 may include a plurality of agglomerate network circuits 190302 and a plurality of connector circuits 190310. Each of the plurality of agglomerate network circuits 190302 may be structured to interpret input data 190304 and transmit output data 190308. Each of the plurality of connector circuits 190310 may be structured to interpret the output data 190308 of a first corresponding agglomerate network circuit 190302 of the plurality, bias the interpreted output data 190314, and transmit the biased interpreted output data 190318 as the input data 190304 of a second corresponding agglomerate network circuit 190302 of the plurality. Referring to FIG. 141, each of the connector circuits 190310 may have an acceptable range for a bias adjustment 190410 and a connector feedback loop 190412 may continue until the biases of all connector circuits 190310 are within their corresponding acceptable range. In an aspect, the output data 190308 of an agglomerate network may be schedule data 190402 and may have a schedule property 190404. For example, the schedule property 190404 may be at least one of a shift or a personnel selection.

Referring to FIG. 142, a procedure 190500 may include an operation 190502 of interpreting, via an agglomerate network circuit, input data. The procedure 190500 may also include an operation 190504 of transmitting, via the agglomerate network circuit, output data. The procedure 190500 may include a further operation 190508 of biasing, via a connector circuit, at least one of the input data prior to interpretation via the agglomerate network circuit or the output data prior to transmission via the agglomerate network circuit.

Referring now to FIG. 143, a procedure 190600 may include an operation 190602 of interpreting, via a first agglomerate network circuit, first input data; an operation 190604 of generating, via the first agglomerate network circuit, first output data based at least in part on the first input data; an operation 190608 of biasing, via a first connector circuit, the first output data; an operation 190610 of interpreting, via a second agglomerate network circuit, the biased first output data as second input data; an operation 190612 of generating, via the second agglomerate network circuit, second output data based at least in part on the second input data; an operation 190614 of biasing, via a second connector circuit, the second output data; an operation 190618 of interpreting, via a third agglomerate network circuit, the biased second output data as third input data; an operation 190620 of generating, via the third agglomerate network circuit, third output data based at least in part on the third input data; and an operation 190622 of transmitting the third output data.

In embodiments of either procedure 190500 or procedure 190600, biasing via the connector circuit may include at least one of increasing or decreasing at least one of the input data or the output data. In another embodiment, biasing via the connector circuit may include adjusting the input data or the output data based at least in part on connector circuit input data. The connector circuit input data may be generated by an agglomerate network circuit distinct from the one that generated the output data or the input data being biased by the connector circuit. The connector circuit input data may be generated by another connector circuit. In an embodiment, biasing via the connector circuit may include weighting at least one of the input data or the output data. In an embodiment, biasing via the connector circuit may be based at least in part on a confidence value associated with the input data or the output data being biased. A different biasing approach may be used depending on the confidence value. In an embodiment, the biases may be stored in a matrix or other applicable data structure. The confidence values may also be stored in the matrix. In an embodiment, biasing via the connector circuit may be based at least in part on a value determined via machine learning. In an embodiment, the output data of an agglomerate network may be schedule data having a schedule property (e.g., date, time, week, duration, blocked days), wherein biasing the output data via the connector circuit may include shifting the schedule property. The schedule property may be a shift and shifting the schedule property may include adjusting the shift. For example, adjusting the shift may include moving the shift or changing a length of the shift. The schedule property may be a personnel selection. For example, biasing the output data via the connector circuit may include adjusting the personnel selection.

In an example of connector biasing, a schedule and plan may be calculated for delivery of oversize equipment to a site. Many factors may go into preparing the schedule and plan, and the schedule and plan may require input from multiple parties (e.g., town officials, highway safety officers, utility companies, human resources, weather data, traffic data, etc.). Biasing of input data may occur at the party level where one party's input is more heavily weighted, or may occur more granularly, such as weighting specific types of data from individual parties. Continuing with the example, in one instance, biasing may favor input from the highway safety officers and the weather data. In another instance, biasing may favor the availability of truckers in order to comply with mandatory rest periods.

In embodiments, a non-transitory computer-readable medium may store instructions that adapt at least one processor to interpret, via a first agglomerate network circuit, first input data; generate, via the first agglomerate network circuit, first output data based at least in part on the first input data; bias, via a first connector circuit, the first output data; interpret, via a second agglomerate network circuit, the biased first output data as second input data; generate, via the second agglomerate network circuit, second output data based at least in part on the second input data; bias, via a second connector circuit, the second output data; interpret, via a third agglomerate network circuit, the biased second output data as third input data; generate, via the third agglomerate network circuit, third output data based at least in part on the third input data; and transmit the third output data. Biasing via the connector circuit may include at least one of increasing or decreasing at least one of the input data or the output data, adjusting the input data or the output data based at least in part on connector circuit input data, or weighting at least one of the input data or the output data. Biasing via the connector circuit may be based at least in part on a confidence value associated with the input data or the output data being biased or on a value determined via machine learning.

In embodiments, a connection module may be trained to determine and/or apply a bias. A connection module may be trained using training data using one or more supervised or unsupervised training methods. In one embodiment, a set of training data may include labeled data relating to a state of an agglomerate network and data that includes adjustments made to data by a user (manual biases made by a user). A machine learning model (such as a neural network) may be trained on the data to predict when a bias is applied to the data. In one example, a neural network may be a classifier that takes as input the state data of an agglomerate network (data including one or more data inputs, metadata, configuration data, etc.), and generates an output the identifies if an output should be biases and/or the magnitude of the bias and/or a type of bias to be applied. Training data may be used to train the network (such as using back propagation) using the labeled data. After training, the trained model may be used to automatically identify if biases should be applied, the magnitude of bias, and/or the type of bias that should be applied. In embodiments, the trained modules may be refined based on changes from users (such as manual bias overrides, feedback from users regarding quality of schedules produced, etc.).

Disclosed herein are details of how biases, e.g., module/component 132 (FIG. 1), are applied to different modules and different types of data. In some embodiments, biasing may include direct manipulation of an output of a module (such as increasing or decreasing a value, changing a schedule, and the like). In some embodiments, outputs of modules may not be directly adjusted (such as a complex schedule where modification of one aspect of a schedule may affect other constraints). In embodiments, biasing may include adjustments of inputs to an upstream module. Biasing of a scheduler module may include biasing the inputs (such as constraints) of the scheduler module. Connectors may also use machine learning to learn how to bias module inputs and/or outputs.

In embodiments, a connector may be trained to determine how to modify inputs of a module (such as a scheduler module) to obtain the desired bias at the output of the module. The biasing of inputs may be an iterative process where small changes are made to the inputs and the changes at the outputs are observed, with additional changes made to the inputs until the desired bias at the output is reached. The biasing module may be self-adjusting to identify and learn appropriate changes that may be made to the inputs. In some cases, the biasing of the inputs may be limited to a predefined subset of inputs. The biasing circuit may have a termination and/or predefined biasing limit wherein a bias beyond a certain level causes the connector to terminate biasing and/or discard a schedule. In embodiments, a connector may receive the results of several competing modules and select one or more "winners" to bias and pass their results on.

In embodiments, connectors may determine how many schedules should be developed at a given point within the agglomerate network, and in particular, in scenarios where schedules are noncontinuous.

As disclosed in greater detail herein, embodiments of the current disclosure provide for applying biases to different modules and different types of data. For example, only certain biases may be applied to certain data based on the data categorization, or only certain biasing methods may be employed. In another example, input data may be modified iteratively to obtain desired biasing parameters for output data, which may serve to train biasing circuits.

In one aspect, referring to FIG. 144, an apparatus 200100 may include an agglomerate network circuit 200102 structured to interpret input data 200104 and transmit output data 200108. The apparatus 200100 may also include a connector circuit 200110 structured to: receive biasing parameters 200112 for the input data, categorize the input data 200104 based on types of biases 200114 that can be applied to the input data 200104, map biasing parameters 200112 to the categorized input data, and bias the input data based on the mapping. The connector circuit 200110 may be further structured to determine which data can be directly biased. The connector circuit 200110 may be further structured to determine numerical data that can be directly biased or schedule data that can be indirectly biased.

Referring now to FIG. 145, input data 200104 may be schedule data generated by a schedule module 200202. The connector circuit 200110 may be further structured to determine biasing methods for each category, such as direct biasing methods including at least one of applying a percentage change, modifying a value based on a function, or applying a table look up, or indirect biasing methods including at least one of selecting an alternate module for generating input data, or modifying parameters of a module generating the input data.

Referring now to FIG. 146, an apparatus 200300 may include an agglomerate network circuit 200302 structured to receive input data 200304. The apparatus 200300 may further include a bias interpretation circuit 200310 structured to receive biasing parameters 200312 for the input data 200304, a categorizing circuit 200318 structured to categorize the input data 200304 based on types of biases 200314 that can be applied, a mapping circuit 200320 structured to map the biasing parameters 200312 to the categorized input data, and a biasing circuit 200322 structured to bias the input data 200304 based on the mapping. The agglomerate network circuit 200302 may be further structured to transmit the biased input data, which may be as output data 200308. The bias interpretation circuit 200310 may be further structured to determine at least one of which data can be directly biased, numerical data that can be directly biased, or schedule data that can be indirectly biased.

In embodiments, and referring to FIG. 147, input data may be schedule data generated by a schedule module 200402. In embodiments, the bias interpretation circuit 200310 may be further structured to determine biasing methods for each category. Direct biasing methods may include at least one of applying a percentage change, modifying a value based on a function, or applying a table look up. Indirect biasing methods may include at least one of selecting an alternate module for generating input data, and/or modifying parameters of a module generating the input data.

Referring to FIG. 148, an apparatus 200500 may include an agglomerate network circuit 200502 structured to receive input data 200504, a bias interpretation circuit 2005010 structured to receive biasing parameters 200512 for the input data 200504, a mapping circuit 200520 structured to map the biasing parameters 200512 to the input data 200504, a biasing methodology circuit 200518 structured to determine a biasing method 200524 based on the mapping, and a biasing circuit 200522 structured to bias, using the determined biasing method, the input data based on the mapping. The agglomerate network circuit 200502 may be further structured to transmit the biased input data. The bias interpretation circuit 200510 may be further structured to determine at least one of which data can be directly biased, numerical data that can be directly biased, or schedule data that can be indirectly biased. Input data 200504 may be schedule data generated by a schedule module. The bias interpretation circuit 200510 may be further structured to determine biasing methods for each category. Direct biasing methods may include at least one of applying a percentage change, modifying a value based on a function, or applying a table look up. Indirect biasing methods may include at least one of selecting an alternate module for generating input data, and/or modifying parameters of a module generating the input data.

Referring to FIG. 149, an apparatus 200600 may include an agglomerate network circuit 200602 structured to receive input data 200604, perform manipulations on the data and generate output data 200608, a bias interpretation circuit 200610 structured to receive biasing parameters 200612 for the output data 200608, a mapping circuit 200620 structured to modify input data 200604 and identify correlations between input modifications and changes to the output data 200608, and a biasing circuit 200622 structured to iteratively trigger different input data modifications at the mapping circuit 200620 and identify input data modifications that result in desired biasing parameters 200612 for the output data 200608. The bias interpretation circuit 200610 may be further structured to determine at least one of which data can be directly biased, numerical data that can be directly biased, or schedule data that can be indirectly biased. Input data 200604 may be schedule data generated by a schedule module. The bias interpretation circuit 200610 may be further structured to determine a biasing method. Direct biasing methods may include at least one of applying a percentage change, modifying a value based on a function, or applying a table look up. Indirect biasing methods may include at least one of selecting an alternate module for generating input data, and/or modifying parameters of a module generating the input data.

Referring now to FIG. 150, a procedure 200700 may include operations including an operation 200702 of receiving, via an agglomerate network circuit, input data, an operation 200704 of receiving biasing parameters for the input data, an operation 200708 of categorizing the input data based on types of biases that can be applied, an operation 200710 of mapping biasing parameters to the categorized input data, an operation 200712 of biasing, at least one of the input data based on the mapping, and an operation 200714 of transmitting, via the agglomerate network circuit, the biased input data. Categorizing of input data may include determining which data can be directly biased. Categorizing may include at least one of determining numerical data that can be directly biased or schedule data that is indirectly biased. Indirectly biasing may include generating feedback to a module generating the input data, wherein the feedback triggers generation of new input data based on the feedback. Directly biasing may include directly changing a value of the input. Input data may be schedule data generated by a schedule module and biasing includes adjusting the inputs to the schedule module. Mapping biasing parameters may include determining biasing methods for each category. Direct biasing methods may include at least one of applying a percentage change, modifying a value based on a function, or applying a table look up. Indirect biasing methods may include at least one of selecting an alternate module for generating input data or modifying parameters of module generating the input data.

Referring to FIG. 151, a procedure 200800 may include an operation 200802 of receiving, via an agglomerate network circuit, input data, an operation 200804 of receiving biasing parameters for the input data, an operation 200808 of mapping biasing parameters to the input data, an operation 200810 of determining biasing methods based on the mapping, an operation 200812 of biasing, using the determined biasing methods, the input data based on the mapping, and an operation 200814 of transmitting, via the agglomerate network circuit, the biased input data. Input data may be schedule data generated by a schedule module and biasing includes adjusting the inputs to the schedule module. Direct biasing methods may include at least one of applying a percentage change, modifying a value based on a function, or applying a table look up. Indirect biasing methods may include at least one of selecting an alternate module for generating input data or modifying parameters of module generating the input data.

In embodiments, a non-transitory computer-readable medium may store instructions that adapt at least one processor to receive input data, receive biasing parameters for the input data, categorize the input data based on types of biases that can be applied, map the biasing parameters to the categorized input data, bias the input data based on the mapping, and transmit the biased input data.

In embodiments, a non-transitory computer-readable medium may store instructions that adapt at least one processor to receive input data, receive biasing parameters for the input data, map the biasing parameters to the input data, determine a biasing method based on the mapping, bias, using the determined biasing method, the input data based on the mapping; and transmit the biased input data.

In embodiments, a connection module may be trained to determine the type of bias and/or apply a bias. In embodiments, one trained model may be configured to determine the type of bias and apply a bias to the data. In some embodiments, a plurality of trained models may be used such as one or more modules may be trained to determine the type of bias (such as determining if a bias can be directly applied to data or if biasing requires manipulation of input data to another module). Other modules may be trained to apply the bias to the data (such as by determining the magnitude and/or how to manipulate input data of other modules to obtain the desired output bias). The connection modules may be trained using training data using one or more supervised or unsupervised training methods. In one embodiment, a set of training data may include labeled data relating to a state of an agglomerate network and data that includes adjustments made to data by a user (manual biases made by a user). A machine learning model (such as a neural network) may be trained on the data to predict the type of bias that can be applied and magnitude of changes required to achieve the bias. In one example, a neural network may be a classifier that takes as input the state data of an agglomerate network (data including one or more data inputs, metadata, configuration data, etc.), and generates an output the identifies if the type of bias that can be applied. After training, the trained model may be used to automatically identify the type of biases that can be applied and/or the magnitude of bias. In embodiments, the trained modules may be refined and/or retrained based on changes from users (such as manual bias overrides, feedback from users regarding quality of schedules produced, etc.).

Disclosed herein are details of management and monitoring of biases in the agglomerate network, e.g., module/component 132 (FIG. 1), when a plurality of biases is applied. In some embodiments, each connector may cause/generate a bias independently of other biases or connectors. In some embodiments, connectors and biases may include a dependency. In some cases, one connector may cause a bias in one direction while another connector may cause a bias in another direction. In some cases, one connector may cause a bias in one aspect and may trigger a bias in another aspect.

In embodiments, a matrix of biases may be used to store and/or arrange biases so as to reflect, in part, dependencies of the biases and/or the connectors that generated them. In addition to recording dependencies, embodiments of the matrix may also be used to define the dependencies so as to specify which biases and/or other connector outputs are fed into which connectors and/or modules. In embodiments, the matrix may determine how to "net out" the inputs and/or outputs of connectors and/or modules.

In embodiments, a history of biases (such as the metadata described in FIG. 138 through FIG. 1906) may be propagated with the data. The magnitude, causes, and assumptions that triggered a bias may be tracked and propagated with the data. In embodiments, the data may include data before a bias was applied such that if opposite biases are specified by different connectors, the data can be returned to the original values. In embodiments, connectors may include rules and thresholds for maximum overall accumulated biases, number of biasing operations, and the like. Connectors may monitor threshold data of biases and discard a schedule when the threshold is exceeded and start with a different schedule.

As disclosed in greater detail herein, embodiments of the current disclosure provide for dependencies of connector biases. Referring to FIG. 152, an agglomerate network 210100 for generating schedule data may include a scheduler circuit 210102 structured to output a first schedule data 210108, a first module 210110 structured to apply a first bias 210114 to the first schedule data 210108 and generate second schedule data 210118, a second module 210120 structured to receive the second schedule data 210118 from the first module 210110 and structured to manipulate the second schedule data 210118 and generate third schedule data 210122, where the manipulation includes applying a second bias 210104 to the third schedule data 210122, a bias monitoring module 210124 structured to monitor the first bias 210114 and the second bias 210104 and identify conflicting elements of the first and second biases, and a connector circuit 210128 structured to adjust, responsive to identifying conflicting bias parameters of at least one of the scheduler circuit 210102, the first module 210110, or the second module 210120 to resolve the conflicting biases. At least one of the first bias 210114 or the second bias 210104 may be a direct bias or an indirect bias. The first bias 210114 and the second bias 210104 may be associated with a priority. In embodiments, at least one of the first module 210110 or the second module 210120 may be further structured to compute an uncertainty associated with the bias. In embodiments, conflicting biases may include biases applied to data that have opposite magnitudes. In embodiments, conflicting biases may be determined by comparing the first schedule data 210108, the second schedule data 210118, and the third schedule data 210122. In embodiments, conflicting biases are identified by comparing similarities of the first schedule data 210108 and the second schedule data 210118 and differences between second schedule data 210118 and third schedule data 210122.

Referring to FIG. 153, an apparatus 210200 may include a first module 210210 configured to apply a first bias 210214 to first data 210208 to generate second data 210218, a second module 210220 configured to receive the second data 210218 and configured to apply a second bias 210204 to the second data 210218, a first bias monitoring module 210224 configured to calculate a combined bias score 210222 based at least in part on the first bias 210214 and the second bias 210204, a bias adjustment circuit 210228 configured to determine that the combined bias score 210222 is above a threshold value 210230 and adjust the second bias 210204, and a bias notification circuit 210232 structured to transmit an indication that the combined bias score 210222 was determined to be above the threshold value 210230. In embodiments, at least one of the first bias 210214 or the second bias 210204 is a direct bias or an indirect bias. In embodiments, the first bias 210214 and the second bias 210204 may be associated with a priority. In embodiments, at least one of the first module 210210 or the second module 210220 are further structured to compute an uncertainty associated with the bias. In embodiments, the combined bias is a function of the magnitude of the first bias and the magnitude of the second bias. In embodiments, and referring to FIG. 154, in response to the transmitting an indication, the first module 210210 is replaced with a third module 210302.

Referring to FIG. 155, a procedure 210400 may include an operation 210402 for propagating data from a first module to a second module, an operation 210404 for propagating an indication of a first bias applied to the data from the first module to the second module, an operation 210408 for applying a second bias at the second module, an operation 210410 for computing a combined bias score based on the first bias and the second bias, an operation 210412 for determining that the combined bias score is above a bias threshold value, and an operation 210414 for transmitting an indication to the first module of the bias threshold value. In embodiments, at least one of the first bias or the second bias may be a direct bias or an indirect bias. In embodiments, the combined bias may be a function of the magnitude of the first bias and the magnitude of the second bias. In embodiments, in response to the transmitting an indication, the first module may be replaced with a third module. In embodiments, the first bias and the second bias may be associated with a priority. In an embodiment, and referring to FIG. 156, a procedure 210500 may further include an operation 210502 of adjusting the first bias or the second bias based at least in part on the priority. In embodiments, applying a bias may include computing an uncertainty associated with the bias. The procedure may further include adjusting the first bias or the second bias based at least in part on the uncertainty. In embodiments, the uncertainty may be at least one of a function of the magnitude of the bias or a function of the type of data that is biased. In an embodiment, and referring to FIG. 157, a procedure 210600 may further include an operation 210602 of tracking a history of biases and triggers for generating the biases. In an embodiment, and referring to FIG. 158, a procedure 210700 may further include an operation 210702 of monitoring a number of biasing operations and generating an indication when the number of biases is above a threshold value.

Referring now to FIG. 159, a procedure 210800 may include an operation 210802 for propagating data from a first module to a second module, an operation 210804 for applying a first bias to the data at the first module, an operation 210808 for applying a second bias to the data at the second module, an operation 210810 for monitoring a combined bias that is based at least in part on the first bias and the second bias, an operation 210812 for determining that the combined bias is less than the first bias or the second bias, and an operation 210814 for adjusting at least one of the first bias or the second bias to reduce a magnitude of the combined bias. In embodiments, at least one of the first bias or the second bias may be a direct bias or an indirect bias. In embodiments, the combined bias may be a function of the magnitude of the first bias and the magnitude of the second bias. In embodiments, in response to the transmitting an indication, the first module is replaced with a third module. In embodiments, the first bias and the second bias may be associated with a priority. The procedure 210800 may further include adjusting the first bias or the second bias based at least in part on the priority. In embodiments, applying a bias includes computing an uncertainty associated with the bias. The procedure 210800 may further include adjusting the first bias or the second bias based at least in part on the uncertainty. In embodiments, the uncertainty may be at least one of a function of the magnitude of the bias or a function of the type of data that is biased. In embodiments, and referring to FIG. 160, a procedure 210900 may further include an operation 210902 for tracking a history of biases and triggers for generating the biases. In embodiments, and referring to FIG. 161, a procedure 211000 may further include an operation 211002 for monitoring a number of biasing operations and generating an indication when the number of biases may be above a threshold value.

Embodiments of the current disclosure may also provide for schedule spreading, e.g., the spreading of beneficial changes in a generated schedule across disjointed organizations, which may be performed via modules/components 126 and/or 128 (FIG. 1). For example, embodiments may recommend (or make) a schedule adjustment for Company A where the adjustment proved successful for (or is based on data from) Company B._Changes and/or adjustments to a schedule in one department of a business may be applicable to another department within an organization. Changes and/or adjustments to schedules in one organization may be applicable to schedules of another organization, which may be similar or distinct. Embodiments described herein are directed towards applying or spreading beneficial changes in a schedule across disjointed entities, such as organizations, which may include different companies, divisions and/or departments within the same organization or across distinct organizations. In embodiments, an adjustment to a schedule may be made and/or recommended for Company A, whereas such a schedule adjustment proved successful for company B. In other embodiments, scheduling adjustments that were found unsuccessful or unproductive for Company B may be flagged and discouraged from being applied or recommended to schedules in Company A. Embodiments may detect that a particular company is experiencing (or about to experience) a situation similar to a past scenario experienced by the company or one or more other companies. Similar modifications and adjustments may be recommended and/or applied based on the previous scenarios that were subsequently determined to be beneficial. In other embodiments, similar organizations are identified from organization data. Such similarities are leveraged to determine what, if any, past modifications were beneficial. In embodiments, past modifications in similar organizations may be given more focus (e.g., higher weight) when recommending or making schedule adjustments to another similar organization.

In embodiments, a schedule spreader may be a module that receives inputs, e.g., a schedule in the form of schedule data and/or other data such as biases. A schedule spreader may be configured as a standalone module. For example, the schedule spreader may be a module within an agglomerate network that either generates a schedule and incorporates known beneficial adjustments or receives an existing schedule and then edits the schedule to include the beneficial changes. The schedule (e.g., schedule data) can be received directly as input to the agglomerate network or from a schedule generation module within the network. The output of the schedule spreader (a schedule) may be passed to other modules in the agglomerate network for evaluation where the other modules generate output(s), e.g., a bias. The other modules may, in turn, feed the output back into the schedule spreader module to form a feedback loop which tries to reach equilibrium and/or optimization of various biases in the agglomerate network. The connections between the schedule spreader module and the various other modules of the agglomerate network may be accomplished via connectors.

Referring now to FIG. 162, an apparatus 170100 for schedule spreading is shown. The apparatus 170100 includes a schedule interpretation circuit 170102, a schedule adjustment circuit 170104, a spread command circuit 170106, and a spread command provisioning circuit 170108. The schedule interpretation circuit 170102 may be structured to interpret schedule data 170110. The schedule adjustment circuit 170104 may be structured to maintain a list of recommended schedule adjustments 170112. Each recommended schedule adjustment may correspond to one of a plurality of schedule parameters. Non-limiting examples of schedule parameters include: number of shifts, duration of shifts, number of assigned workers to a shift, number of available workers for a schedule, wages per shift, amount of over time, estimated sales, estimated profits, and/or any other data related to a schedule. The schedule parameters of the list of recommended schedule adjustments 170112 are referred to herein as the plurality of first schedule parameters 170114. The schedule adjustment circuit 170104 analyzes the schedule data 170110 and identifies a schedule parameter, referred to as a second schedule parameter 170116. Further, the schedule adjustment circuit 170104 identifies a recommended schedule adjustment from the list of recommended schedule adjustments 170112. The identification may be performed by matching the second schedule parameter 170116 to one of the plurality of the first schedule parameters 170114. The one of the plurality of first schedule parameters 170114 may correspond to the recommended schedule adjustment. The spread command circuit 170106 may be structured to generate a spread command value 170118 structured to trigger a change in the schedule data 170110. The spread command circuit 170106 operates in response to the identified recommended schedule adjustment performed by the schedule adjustment circuit 170104. The change in the schedule data 170110 includes adjusting the schedule data 170110 according to the recommended schedule adjustment. The spread command provisioning circuit 170108 may be structured to transmit 170120 the spread command value 170118, which may be used for performing the adjustment to the schedule data 170110, sent to other modules within an agglomerate network, or stored in a database.

Referring to FIG. 163, certain further aspects of the apparatus 170100 are described following, any one or more of which may be present in certain embodiments. The schedule adjustment circuit 170104 (FIG. 162) may be further structured for building 170202 (FIG. 163) the list of recommended schedule adjustments 170112 (FIG. 163). The building 170202 may be based on user feedback 170204 regarding past adjustments to the schedule data 170110 and/or based on trends 170206 determined from a schedule marketplace, as disclosed herein. In example embodiments, the list of recommended schedule adjustments 170112 includes schedule adjustments that successfully improved prior schedules possessing a plurality of third schedule parameters 170208 corresponding to the plurality of first schedule parameters 170114, wherein the improvement is with respect to the second schedule parameter 170116. The plurality of third schedule parameters 170208 may be used in the future to improve scheduling within a department or an organization or may also be used for other entities or departments. In example embodiments, a first organization having a plurality of third schedule parameters 170208 may be similar to a second organization. These third schedule parameters 170208 may be used for the second organization when matching the second schedule parameter 170116. Using these third schedule parameters 170208 may lead to improved scheduling for the second organization.

The list of recommended schedule adjustments 170112 may have schedule adjustments collected via different sources. For instance, example embodiments may have the schedule adjustment including prior schedule adjustments across multiple entities. There may be several types of entities 170210. In example embodiments, the multiple entities include distinct departments within the same organization. In another example embodiment, the multiple entities include similar departments within distinct organizations. In another example embodiment, the multiple entities include distinct departments within a distinct organization. Further, the plurality of first schedule parameters 170114 of the list of recommended schedule adjustments 170112 may be indicative of a specific business scenario 170212. The specific business scenario 170212 may be at least one of: risk of employee turnover, decrease in production, loss of profits, or employee dissatisfaction. Users of the apparatus 170100 may choose one or more business scenarios for matching a second scheduled parameter 170116 to one of the plurality of first schedule parameters 170114.

Further, in embodiments, the schedule adjustment circuit 170104 (FIG. 162) may be structured based at least in part on an artificial intelligence 170214. In embodiments, the artificial intelligence 170214 may be based at least in part on machine learning 170216. Machine learning 170216 may be that of supervisor machine learning methods, unsupervised machine learning methods, semi-supervised machine learning methods, or a mix of thereof. In other example embodiments, the artificial intelligence 170214 is based at least in part on a neural network 170218. In general, methods of machine learning 170216 may be trained on a training data set based at least in part on successful adjustments to prior schedules (e.g., adjustment to schedule data 170110). In other example embodiments, the neural network 170218 may be trained on a training data set based at least in part on successful adjustments to prior schedules (e.g., adjustment to schedule data 170110). As explained above, the adjustment to prior schedules may be based on schedules from across multiple entities.

Further, in example embodiments, the schedule adjustment circuit 170104 (FIG. 162) intelligently identifies the second schedule parameter 170116. The schedule adjustment circuit 170104 intelligently assigns the identified schedule adjustment based at least in part on determining that a particular business scenario exists based at least in part on the schedule data 170110. In other words, matching the second schedule parameter 170116 to one of the plurality of first schedule parameters 170114 is performed intelligently. One of the intelligent methods may include using artificial intelligence or machine learning methods to identify the matching. In example embodiments, intelligence may include focusing on one or more business scenarios such as the risk of employee turnover, decrease in production, loss of profits, employee dissatisfaction, and the like. When a user selects a specific business scenario, more focus may be given to the plurality of first schedule parameters 170114 associated with the business scenario to be matched with the second schedule parameter 170116.

In embodiments, the adjustments to schedule data 170110 include several operations 170222. The operations 170222 performed to shifts of a schedule may include one or more of moving a shift, adding a shift, deleting a shift, and dividing a shift into two or more new shifts. Further, the operations 170222 performed to personnel/employees in a schedule may also include one or more of moving an employee to another shift, adding an employee to a shift, or deleting an assigned employee from a shift. Adjustments to schedule data 170110 may also include adjusting a bias of a connector 170220 in an agglomerate network. Therefore, operations performed herein may influence the operations of the agglomerate network at large.

FIG. 164 depicts aspects of a method 170300 for schedule spreading. The method 170300 may be implemented via the apparatus 170100 or any other computing device disclosed herein. The method 170300 includes interpreting schedule data 170302 and maintaining a list of recommended schedule adjustments 170304. Each recommended schedule adjustment corresponds to one of a plurality of first schedule parameters 170114. The method 170300 includes analyzing the schedule data to identify a second schedule parameter 170306, and identifying a recommended schedule adjustment from the list via matching the second schedule parameter to one of the plurality of first schedule parameters corresponding to the recommended schedule adjustment 170308. The method 170300 further includes generating, responsive to the identified recommended schedule adjustment, a spread command value structured to trigger a change to the schedule data 170310. In embodiments, the change includes adjusting the schedule data according to the recommended schedule adjustment. The method 170300 further includes transmitting the spread command value 170312.

Turning to FIG. 165, certain further aspects of the method 170300 are described, any one or more of which may be present in certain embodiments. The method 170300 builds 170402 the list of recommended schedule adjustments 170404. The building 170402 may be based on user feedback 170406 regarding past adjustments to the schedule data 170408 and/or based on trends determined from a schedule marketplace 170410. In embodiments, the list of recommended schedule adjustments 170404 includes schedule adjustments that successfully improved prior schedules possessing a plurality of third schedule parameters 170412 corresponding to the plurality of first schedule parameters 170114 (FIG. 162), wherein the improvement is with respect to the second schedule parameter 170414. The plurality of third schedule parameters 170412 may be used in future iterations of the method 170300 (and/or other processes disclosed herein) to improve scheduling or may also be used for other entities or departments. In example embodiments, a first organization having the plurality of third schedule parameters 170412 may be similar to a second organization. These third schedule parameters 170412 may be used for the second organization when matching the second schedule parameter 170414. Embodiments may use these third schedule parameters 170412 to improve scheduling for the second organization.

The list of recommended schedule adjustments 170404 may have schedule adjustments collected via different sources. For instance, example embodiments may have the schedule adjustment including prior schedule adjustments across multiple entities. There may be several types of entities 170416. In example embodiments, the multiple entities include distinct departments within the same organization. In another example embodiment, the multiple entities include similar departments within distinct organizations. In another example embodiment, the multiple entities include distinct departments within a distinct organization. Further, the plurality of first schedule parameters 170418 of the list of recommended schedule adjustments 170404 may be indicative of a specific business scenario 170420. The specific business scenario 170420 may be at least one of: risk of employee turnover, decrease in production, loss of profits, or employee dissatisfaction. The method 170300 may also allow users to choose one or more business scenarios for matching a second scheduled parameter 170414 to one of the plurality of first schedule parameters 170418.

Further, in embodiments, the method 170300 performs based at least in part on artificial intelligence 170422. In other example embodiments, artificial intelligence is based at least in part on machine learning 170424. Machine learning 170424 may be that of supervised machine learning methods, unsupervised machine learning methods, semi-supervised machine learning methods, or a mix of thereof. In other example embodiments, artificial intelligence 170422 may be based at least in part on a neural network 170426. In general, the methods of machine learning 170424 may be trained on a training data set based at least in part on successful adjustments to prior schedules (e.g., adjustment to schedule data 170408). In other example embodiments, the neural network 170426 may be trained on a training data set based at least in part on successful adjustments to prior schedules (e.g., adjustment to schedule data 170408). As explained above, the adjustments to prior schedules may be based on schedules from across multiple entities.

Further, in example embodiments, the method 170300 intelligently identifies the second schedule parameter 170414. The method 170300 includes intelligently assigning the identified schedule adjustment based at least in part on determining that a particular business scenario exists based at least in part on the schedule data 170408. In other words, matching the second schedule parameter 170414 to one of the plurality of first schedule parameters 170418 is performed intelligently. One of the intelligent methods may include using artificial intelligence or machine learning methods to identify the matching. In example embodiments, intelligence may include focusing on one or more business scenarios such as risk of employee turnover, decrease in production, loss of profits, employee dissatisfaction, and the like. When a user selects a specific business scenario, more focus may be given to the plurality of first schedule parameters 170418 associated with the business scenario to be matched with the second schedule parameter 170414.

In example embodiments, the adjustments to schedule data 170408 include several operations 170428. The operations 170428 to shifts of a schedule may include one or more of moving a shift, adding a shift, deleting a shift, and dividing a shift into two or more new shifts. Further, the operations 170428 to personnel/employees in a schedule may also include one or more of moving an employee to another shift, adding an employee to a shift, or deleting an assigned employee from a shift. Also, adjustments to schedule data 170408 may include adjusting a bias of a connector 170430 in an agglomerate network. Therefore, operations performed herein may influence the operations of the agglomerate network at large.

Referring to FIG. 166, an agglomerate network 170500 for generating schedule data 170504 may be provided. The agglomerate network 170500 for generating schedule data may include a scheduler circuit 110502 structured to output the schedule data 170504, a connector circuit 170506 structured to adjust at least one of an input to the scheduler circuit 170502 or the schedule data 170504 outputted by the scheduler circuit 170502, and a schedule spreader circuit 170508. The schedule spreader circuit 170508 may be structured to maintain 170510 a list of recommended schedule adjustments 170512. Each recommended schedule adjustment may correspond to one of a plurality of first schedule parameters 170514. Further, the agglomerate network may analyze 170516 the schedule data 170504 to identify a second schedule parameter 170518. In embodiments, the agglomerate network 170500 may also include identifying a recommended schedule adjustment 170520 from the list 170512 via matching the second schedule parameter 170518 to one of the plurality of first schedule parameters 170514 corresponding to the recommended schedule adjustment. Responsive to the identified recommended schedule adjustment 170520, the agglomerate network 170500 may further generate a spread command value 170522 structured to trigger a change to the schedule data 170504. In embodiments, the change to the schedule data 170504 includes adjusting the connector circuit 170506 according to the recommended schedule adjustment. Further, the agglomerate network 170500 may include transmitting the spread command value 170524.

Referring to FIG. 167, certain further aspects of the agglomerate network 170500 for generating schedule data are described following, any one or more of which may be present in certain embodiments. In embodiments, the agglomerate network 170500 may provide for building 170602 the list of recommended schedule adjustments 170512. The list of recommended schedule adjustments 170512 may include schedule adjustments that successfully improved prior schedules possessing a plurality of third schedule parameters 170604 corresponding to the plurality of first schedule parameters 170514. The improvement may be with respect to the second schedule parameter 170518. In embodiments, the list of recommended schedule adjustments 170512 includes prior schedule adjustments across multiple entities. For example, the schedule adjustment may further adjust a bias of a connector 170606 in the agglomerate network.

One non-limiting use case of schedule spreading may be where an apparatus for schedule spreading detects a change in a schedule for company A, where the change was extending a Friday night shift from five (5) hours to eight (8) hours but removing a Monday shift for the same work week. The apparatus may detect that company B is similar to company A and either recommends and/or implement a similar change to a schedule for company B. As will be appreciated, generally, the more entities/companies the apparatus and methods disclosed herein have access to, the higher the number of changes that can be propagated and/or the higher the likelihood that a particular change that is spread, e.g., recommended and/or implemented, to an entity/corporation will have meaningful benefits, e.g., detectable changes in one or more objectives, as disclosed herein. In other words, the larger the pool of entities/corporations the more likely and closely companies can be matched and, therefore, the higher the likelihood that a change will have a significant benefit to an entity that it is spread to. In embodiments, the number of entities that the apparatuses and/or methods disclosed herein may have access to the schedule data of may be on the order of hundreds, thousands, tens-of-thousands, hundreds-of-thousands, millions, tens-of-millions, etc. As will be appreciated, in embodiments, automated detection of matching entities and schedule data changes, as disclosed herein, makes it practical to search through the schedule data for a large number of entities, e.g., hundreds, thousands, tens-of-thousands, hundreds-of-thousands, millions, tens-of-millions, etc., to find suitable changes for spreading.

Embodiments of schedule spreading, as disclosed herein, may provide for the spreading of schedules, and/or portions thereof, between entities that do not and/or cannot normally share data and/or converse with each other, e.g., corporations on opposites sides of the globe and/or in different industries. For example, the apparatus 170100 (FIG. 162) and/or an agglomerate network that incorporates the same may be operated by a third party that services two distinct entities, e.g., corporations, wherein the schedule interpretation circuit 170102 has access to schedule data corresponding to a first of the two entities, and the adjusts schedule data corresponding to a second of the two entities based on the schedule data corresponding to the first of the two entities. By spreading schedule data between such entities, embodiments of the current disclosure provide for the spreading of beneficial scheduling approaches that would likely not happen in the absence of the apparatuses and methods disclosed herein. As will be understood, however, embodiments of the current disclosure may require approval and/or the consent of an entity before spreading its schedule data, as disclosed herein. In embodiments, an entity may be able to limit which other entities its schedule data may be spread to.

As described herein, embodiments of the current disclosure provide for approaches and architectures for chaining two or more agglomerate network modules/circuits together via connectors, e.g., module/component 130 (FIG. 1). The chained agglomerate network modules/circuits may include: schedulers, weather modules, retention modules, sales/profit modules, and/or any other type of models/modules used in business forecasting and/or described herein. As also disclosed herein, connectors may serve as the links/data tunnels that pass data between agglomerate network modules/circuits and/or manipulate inputs and/or outputs of agglomerate network modules/circuits.

In embodiments, connectors may bias results. For example, a connector may receive as a first input, an output from a scheduler circuit that does not account for weather data, and the same connector may receive as a second input, an output from a weather module/circuit. In the event the weather module circuit predicts a high likelihood of snow, the connector may bias the first input, e.g., the output of the scheduler, such that the resulting biased data decreases the number of employees scheduled during the expected snowfall. Conversely, if the weather module/circuit predicts a high likelihood of sunny weather, the connector may bias the first input, e.g., the output of the scheduler, such that the resulting biased data increases the number of employee scheduled during the sunny weather. In embodiments, connectors may be used to bias the output of a first agglomerate network circuit/module to make the outputted data usable by other agglomerate network circuits/modules.

In embodiments, connectors may detect and/or correct out-of-bounds results. For example, a first agglomerate network circuit/module may output data known to be excessive and/or a defect of the first agglomerate network circuit/module, e.g., a predicted sales volume for tires that exceeds the world's rubber supply. A connector may detect that the data received from the first agglomerate network circuit/module is outside of acceptable and/or logical values and bias the data to bring it back to be within acceptable values.

Embodiments of connectors may weigh multiple agglomerate network modules/circuits. For example, a connector may receive inputs from four agglomerate network models/circuits and pass one of the inputs, as an output, to another agglomerate network module/circuit and/or connector. In such embodiments, the passed input may be the one that scores the highest and/or is otherwise determined by the connector to be the most suitable to pass on. Accordingly, embodiments of the connectors may score inputs received from upstream agglomerate network circuits/modules and pass on the highest scoring input. In embodiments, connectors may pass on a subset of the received inputs, e.g., the three highest scoring inputs and/or any input scoring above a threshold. In embodiments, connectors may pass the received inputs through a function and pass on the result to downstream agglomerate network circuits and/or connectors. For example, connectors may pass on the average of received inputs.

Embodiments of connectors may determine quantity requirements for non-continuous schedules. Embodiments of connectors may also provide for manipulation/constraining of outputs.

Embodiments of connectors may pass confidence(s), as described herein, through an agglomerate network. Connectors may pass and/or add agglomerate network circuit outputs and/or confidence (corresponding to the scheduling data) to a data array that pairs agglomerate network circuit outputs to confidences. In embodiments, the data array may record the history of scheduling data as it passes between agglomerate network circuits/modules and/or connectors. For example, a connector may receive the data array from an upstream connector where the last entry and/or row in the data array includes the output of the most recent upstream agglomerate network circuit/module and its corresponding confidence value. The connector may then send the most recent entry in the data array to a subsequent agglomerate network circuit for processing, wherein the connector may receive the output of the subsequent agglomerate network circuit and store it as a new row (optionally with a corresponding confidence) in the data array and then pass the data array on to a downstream connector.

Connectors may be of the following levels: Level 1, a connector that provides a confidence value for a single result and/or may use historic data and/or AI training to generate the result; Level 2, a connector that may use confidence bands, e.g., a learned curve, and/or split bell curves; Level 3, a connector that incorporates external module factors that would be inefficient and/or impossible to practically incorporate into an agglomerate network circuit/module, e.g., the age of a franchise, accounting for a recent a change in managers, macroeconomic conditions, weather events, special events, and/or the appearance of an employee on another schedule; Level 4, a connector that provides for shifting of values, e.g., biasing, determination of when connector adjustments are out of norms and the like.

In embodiments, the connectors may provide for the incorporation/consideration of factors/variables not natively considered by the agglomerated modules/circuits without the need to rewrite the agglomerate network modules/circuits, e.g., a scheduling module that does not account for weather data may have its output biased by a connector that does account for weather data. Embodiments may use extrapolation techniques that impact confidence as they are passed through an agglomerate network. Embodiments may use machine learning to adjust one or more aspects of a connector, e.g., its bias(es), inputs, and/or outputs.

Accordingly, referring to FIG. 168, an apparatus 230100 in accordance with embodiments of the current disclosure is shown. The apparatus 230100 may be a single computing device and/or form part of one or more other computing devices disclosed herein. The apparatus 230100 may include a plurality of agglomerate network circuits 230110, 230112, 230114, 230116, 230110, 230112, 230114, 230116, and a plurality of connector circuits 230118, 230120, 230122. The plurality of agglomerate network circuits 230110, 230112, 230114, 230116, may each be structured to interpret input data 230124 and transmit output data 230126. The plurality of connector circuits 230118, 230120, 230122 may be each structured to: interpret the output data 230126 of a corresponding agglomerate network and execute a connector action 230128 based at least in part on the interpreted output data 230126. In embodiments, the connector action 230128 performed by at least one of the connector circuits, e.g., 230118, may propagate 230130 the output data 230126 of a first agglomerate network circuit, e.g., 230110, as the input data 230124 of a second agglomerate network circuit, e.g., 230112. In embodiments, the connector action 230128 performed by at least one of the connector circuits, e.g., 230120, may bias 230132 the output data 230126 of an agglomerate network circuit, e.g., 230112. In embodiments, the connector action 230128 performed by at least one of the connector circuits, e.g., 230120, may realign 230134 the output data 230126 of an agglomerate network circuit, e.g., 230112, to be within an acceptable and/or predetermined range. In embodiments, the connector action 230128 performed by at least one of the connector circuits, e.g., 230122, may weigh 23036 the outputs 230126 of at least two agglomerate network circuits, e.g., 230114 and 120116. In embodiments, the connector action 230128 performed by at least one of the connector circuits, e.g., 230120, may propagate 230138 a confidence value 230140, corresponding to the output data 230126 generated by a first agglomerate network circuit, e.g., 230112, to a second agglomerate network circuit, e.g., 230116, with the corresponding output data 230126.

In embodiments, the confidence value 230140 may be generated via machine learning, and/or be based at least in part on historic data. In embodiments, confidence value 230140 may be generated based at least in part on a curve. In embodiments, curve may be a bell curve and/or split. In embodiments, at least one of the plurality of agglomerate network circuits/modules 230110, 230112, 230114, 230116 is and/or includes a scheduler module, a weather model, a retention model, a sales model, a profit model, and/or any other type of model described herein and/or that would be useful for generating a schedule. In embodiments, at least one of the connector circuits 230118, 230120, 230122 receives input from two agglomerate network circuits/models and propagates output data 230124 that is based at least in part on both inputs. In embodiments, at least one of the connector circuits receives input from a single agglomerate network circuit/module and propagates the output data to two agglomerate network circuits/modules. In embodiments, at least one of the connector circuits propagates output data to a same agglomerate network circuit/model from which it receives input. In embodiments, at least one of the connector circuits propagates the output data to another of the connector circuits.

Illustrated in FIG. 169 is a method 230200, in accordance with embodiments of the current disclosure. The method 230200 may be performed via apparatus 230100 (FIG. 168) and/or any computing device disclosed herein. The method 230200 includes generating schedule data via a plurality of agglomerate network circuits 230210. Each of the agglomerate network circuits may be structured to interpret input data and generate output data based at least in part in the interpreted input data. The method 230200 further includes executing a plurality of connector actions via one or more connector circuits 230212. The plurality of connector actions may effect generation of the schedule data and include at least one of: propagating the output data of a first agglomerate network circuit of the plurality as the input data of a second agglomerate network circuits of the plurality 230214, biasing the output data of an agglomerate network circuit of the plurality 230216, realigning the output data of an agglomerate network circuit of the plurality to be within an acceptable range 230218, weighting the outputs of at least two agglomerate network circuits of the plurality 230220, or propagating a confidence value, corresponding to the output data generated by a first agglomerate network circuit of the plurality, to a second agglomerate network circuit of the plurality with the corresponding output data 230222. The method 230200 further includes transmitting the schedule data 230224.

Embodiments of the current disclosure may also provide for a non-transitory computer-readable medium storing instructions that adapt at least one processor to generate schedule data via a plurality of models/modules. Each of the models/modules may be structured to: interpret input data, and generate output data based at least in part on the interpreted input data. The stored instructions may further adapt the at least one processor to execute a plurality of connector actions via one or more connector circuits. At least one of the connector actions of the plurality at least one of: propagates the output data of a model of the plurality as the input data of a second model of the plurality, biases the output data of a model of the plurality, realigns the output data of a model of the plurality to be within an acceptable range, weights the outputs of at least two models of the plurality, or propagates a confidence value, corresponding to the output data generated by a first model of the plurality, to a second model of the plurality with the corresponding output data. The stored instructions further adapt the at least one processor to transmit the schedule data.

Shown in FIG. 170 is another apparatus 230300, in accordance with embodiments of the current disclosure. The apparatus 230300 may be a single computing device and/or form part of one or more other computing devices disclosed herein. The apparatus 230300 includes a plurality of agglomerate network circuits 230310, 230312, 230314, 230316, and a plurality of connector circuits 230318, 230320, 230322. The plurality of agglomerate network circuits 230310, 230312, 230314, 230316 is structured to generate schedule data 230324. The plurality of connector circuits 230318, 230320, 230322 is structured to propagate data 230326 between each of the plurality of agglomerate network circuits 230310, 230312, 230314, 230316. The plurality of agglomerate network circuits 230310, 230312, 230314, 230316 includes a scheduler; and at least one of the plurality of connector circuits 230318, 230320, 230322 is structured to adjust at least one of input data 210328 to at least one of the plurality of agglomerate network circuits or output data 210330 from the at least one of the plurality of agglomerate network circuits.

Referring now to FIG. 171, embodiments of the system, as disclosed herein, may use a rule-length-encoded (RLE) representation of one or more schedules. For example, a one-week schedule is depicted in FIG. 171 which encodes scheduled shifts as a start and end time (Note that lunch breaks split some shifts). In the depicted representation of FIG. 171, color represents which job the employee is scheduled to work, and this representation corresponds to ID shown in table 1 below which lists a sampling of possible data input representations. As can be seen, four (4) variations can be composed by selecting either one-hot or integer-valued encoding, and either weekly or day-of-week encoding. The example column refers to one hypothetical Cash Register department from a retail store in the mid-Atlantic region, using 3- and one-half years of weekly schedules for training to generate a schedule for one week in June.

TABLE 1

| ID | Name | Axes | Value | Examples |
|---|---|---|---|---|
| 1 | Fine-grained GANTT job assignment - DOW variant | Employee (integer) vs. Day of Week (DOW) (integer) vs. 15-minute interval. The channel dimension is shared with the employee dimension, but could be its own separate dimension. | Integer representing the job assignment, with 0 denoting no assignment of the employee to any job (In some runs the job integers were normalized to [0, 1]; in others they were normalized to [−1, −1]). | Dimensions: 31 (emp) X 7 (DOW) × 96 (intervals). Please see Explanation of the channel dimension for other layers |
| 2 | Fine GANTT job assignment - DOW one-hot encoded variant | Employee (integer) vs. DOW (integer) vs. 15-minute interval vs job. The channel dimension is shared with the employee dimension, but could be its own separate dimension. | Value is binary (0/1 or −0.5/0.5), indicating at each matrix position whether there was an assignment of that employee to that job at that 15-minute slot. | Dimensions: 31 (emp) X 7 (DOW) × 96 (intervals) × 10 (9 jobs, and one for "no job"). |
| 3 | Fine-grained GANTT job assignment - week variant | Employee (integer) vs. 15-minute interval over the week. The channel dimension is shared with the employee dimension, but could be its own separate dimension. | Same as ID 1 | Dimensions: 31 (emp) × 672 (intervals). Note that convolution here should take into account the weekly periodicity by using strides of 7. I can provide examples from our runs if that helps. |
| 4 | Fine-grained GANTT job assignment - week one-hot variant | Employee (integer) vs. DOW (integer) vs. 15-minute interval over the week vs job. The channel dimension is shared with the employee dimension, but could be its own separate dimension. | Same as ID 2 | Dimensions: 31 (emp) × 672 (intervals) ) × 10 (9 jobs, and one for "no job"). |

In embodiments, the generator networks may reverse-mirror the critic networks in each case, except, in some embodiments, for the final critic layer, which may be just one unit, whereas the initial generator layer may be a noise vector. As will be understood, other similar GANTT-style representations of input and labor forecasts may be used. For example, availability of employee preferences and forecasts may be time-based representations. In embodiments, availability axes may be employee vs. time vs. availability level (e.g., preferred available, unavailable, unknown, . . . ); forecast axes may be at least job/task vs. time vs. labor demand. Another example for a labor forecast that uses the 15-minute time granularity may be "Customer Service at the Waltham store needs 3 employees to work between 10:15 AM and 10:30 AM on Aug. 9, 2021".

The inputs representations of Table 1, along with the corresponding GANTT-style representations of availability and forecast, may be the sole inputs to the discriminator (and also the representation of the generated schedule).

As will be understood, the channel dimension referenced in Table 1 may be from and/or based, in part, on the vision domain, e.g., such as vision generative adversarial networks (GANs) where an image has a channel dimension which represents the color, e.g., a dimension of size one (1) for black and white images or of size three (3) for RGB color images. For example, the input dimensions of a 64 pixel×64 pixel RGB color image are 64×64×3. The critic (a.k.a. discriminator) network may start with activations that represent the 64×64×3 image and pass those activations through successive layers until they reach a single 1×1 unit whose activation is the probability that the image is a fake. An example of the dimensions of successive layers is 64×64×3->32×32×128->16×16×256->8×8×512->4×4×1024->1×1×1.

In embodiments, the channel dimension starts as a representation of an image's colors, but in intermediate layers it may allow the critic network to control the degree of generalization. The image dimensions in one layer and its successor may be determined by the filter, e.g., a convolution filter, and, as such, may be set fixed to some extent. Note, however, the critic may need to have flexibility, because too many units may allow memorization of the real images, and/or too few units may not have the capacity to hold the latent representation. In embodiments, the channel dimension may serve the purpose of allowing a number of units at each layer that is appropriate for the layer's degree of generalization. Channel dimensions in schedule GANs may serve the same purpose. A non-limiting example is shown in Table 2, in which one run (corresponding to ID 1 in Table 2) has an input representation of 7×96×31 (DOW× interval×employee), where the employee dimension also serves as the channel dimension. The layer progression in the critic is shown in table 2.

TABLE 2

| Layer | DOW dimension | Interval dimension | Employee/channel dimension | Kernel applied to (DOW, Int.) | Stride applied to (DOW, Int.) | Unit count |
|---|---|---|---|---|---|---|
| Input | 7 | 96 | 31 | (1, 2) | (2, 2) | 20832 |
| Hidden 1 | 4 | 48 | 62 | (2, 5) | (2, 5) | 11904 |
| Hidden 2 | 2 | 9 | 124 | (2, 5) | (2, 5) | 2232 |
| Output | 1 | 1 | 1 | N.A. | N.A. | 1 |

Referring to FIGS. 172-176, as another example, for each GAN network architecture, the progression in the number (or relative fraction) of units ("volume") may be tailored to match GAN networks known to be successful. The "Radford" and "Toy MNIST" schemes are two such successful networks. As will be appreciated, FIG. 173 depicts an example discriminator architecture determination table, FIG. 174 depicts an example generator architecture determination table; and FIGS. 175 and 176 depict example discriminator architecture determination graphs. FIG. 172 depicts the architecture of the convolutional neural network as determined by scheme 672-0 shown in FIG. 174, in accordance with embodiments of the current disclosure.

Referring to FIG. 177, an apparatus 260100 to improve network performance is depicted, e.g., a resolution determiner, which may form part of component/module 128 and/or 132 (FIG. 1). The apparatus 260100 includes an historic data processing circuit 260102 to interpret historic schedule performance data 260110 and a network architecture processing circuit 260104 to interpret network architecture data 260124, where the network architecture data 260124 defines, in part, a network property 260130 of an agglomerate network 260112. The apparatus 260100 further includes a resolution analysis circuit 260108 to generate an adjustment command value 260128. The adjustment command value 260128 is based, at least in part, on the historic schedule performance data 260110, or the network architecture data 260124. The adjustment command value 260128 is structured to affect an adjustment to the agglomerate network 260112 or to a network property 260130 of the agglomerate network 260112 to improve the performance metric 260122. An adjustment provisioning circuit 2601308 transmits the adjustment command value 260128.

The agglomerate network 260112 includes a plurality of agglomerate network circuits 260114 and a plurality of connector circuits 260118 where the connector circuits 260118 network architecture data 260124 may include structural relationships between various agglomerate network circuits 260114 and connector circuits 260118. Although FIG. 177 depicts a single connector circuit 260118 connecting two agglomerate network circuits 260114 this should not be considered limiting. Other configurations such as multiple connector circuits 260118 connected to a common network circuit 260114, a single connector circuit 260118 connecting to multiple (more than the two shown) network circuits 260114, and the like are contemplated. The network architecture data 260124 may include information describing relationships between the plurality of network circuits 260114 and the plurality of connector circuits 260118. The network architecture data 260124 may include parameters and properties of individual network circuits 260114 or connector circuits 260118. Properties of an individual network circuit 260114 may include the type of network circuit 260114, a resolution of a network circuit 260114, connections of the individual network circuit 260114, and the like. Properties of a connector circuit 260118 may include types of connection supported, processing of transferred data, and the like. The network architecture data 260124 may include a number of network circuits 260114 and/or a number of connector circuits 260118 in the agglomerate network 260112.

The adjustment command value 260128 may include an adjustment to one or more of the structural relationships between a network circuit 260114 and a connector circuit 260118. The adjustment command value 260128 may include an adjustment to a type of network circuit 260114 or a type of connector circuit 260118. The adjustment may correspond to switching to a component having different properties, such as switching a current network circuit 260114 to a network circuit 270114 having higher or lower resolution than the current network circuit 260114. The adjustment command value 260128 may include a change (either an increase or decrease) to the number of network circuits 060114 or the number of connector circuits 260118 that includes the agglomerate network 260112. The adjustment command value 260128 may correspond to a number of cycles executed by one of the plurality of agglomerate network circuits 260114. The adjustment command value 260128 may be a message to be displayed to a user. The adjustment command value 260128 may be structured to directly execute the adjustment, where the adjustment is a direct adjustment to the network architecture data 260124, a direct adjustment to the agglomerate network 260112, and the like.

Referring to FIG. 178, an example of an agglomerate network 260102 for generating schedule data is depicted. The agglomerate network 260102 includes a plurality of network circuits 260114 structured to generate schedule data 260120 and a plurality of connector circuits 260118 structured to propagate schedule data 260120 between various network circuits 260114. The agglomerate network 260102 may further include a resolution determiner circuit 260208. The resolution determiner circuit 260208 may interpret historic performance data 260212 (which may include historic schedule data 260202 and/or historic performance metrics 260204) and network architecture data 260124 and generate, based on the interpretation, an adjustment command value 260128. The resolution determiner circuit 260208 then transmits the adjustment command value 260128 where the adjustment command value 260128 is structured to make an adjustment to the agglomerate network 260102 to improve a performance metric 260218.

A performance metric may correspond to a level of employee compliance (how well was the schedule followed), a number of sales, a level of shift production, a rate of shift production, a number of sales, an amount of profit, an amount of positive feedback and the like.

In some embodiments, the resolution determiner circuit 260208 may also include an experimentation circuit 260210 structured to perform experiments on the agglomerate network 260102 or on an agglomerate network model 260222. Experiments may include simulating: an insertion or deletion of a network circuit 260114, an insertion or deletion of a connector circuit 260118, a change in a structural relationship between one of more of the network circuits 260114 and connector circuits 260118, and the like. Experiments may be performed sequentially or in parallel. The experimentation circuit may calculate performance metrics based on outcomes of the different experiments. The adjustment command value 260128 may be based, at least in part, on the experimental outcomes of the different simulations.

Referring to FIG. 179, a method 260300 for improving the performance of an agglomerate network is depicted. The method 260300 may include interpreting historic schedule performance data 260302, and interpreting network architecture data 260304. Historic schedule performance data may include schedule data, inputs for a given scheduling scenario, a configuration of the agglomerate network used, the precited results, and/or actual results (how the corresponding schedule actually performed), and corresponding performance metrics. Network architecture data may include one or more properties of the agglomerate network. The method 260300 may further include generating an adjustment command value 260308 and transmitting the adjustment command value 260310. The adjustment command value may be based on historic schedule performance data and network architecture data and may be structured to effect: an alert to a user, an adjustment to the agglomerate network, an adjustment to network architecture data, and the like as discussed elsewhere herein.

Referring to FIG. 180, an example of processor actions 260400 resulting from instructions stored on a non-transitory computer-readable medium are depicted. The processor actions 260400 may include interpreting 260402 historical schedule performance data. The historical schedule performance data may include: schedule data that was generated by an agglomerate network of network circuits and connector circuits, and one or more performance metrics resulting from the schedule data. The processor actions 260400 may further include interpreting 260404 network architecture data where the network architecture data defines, in part, a property of the agglomerate network. The processor actions 260400 may further include generating 260408 an adjustment command value and transmitting 260410 the adjustment command value. The adjustment command value is generated, based at least in part, on the historical schedule performance data and the network architecture data. The adjustment command value may be structured to affect a chance to the agglomerate network to improve a performance metric of the agglomerate network.

In embodiments, scheduling modules, e.g., module/component 126 (FIG. 1), may each generate a plurality of initial schedules. The schedules may then be evaluated and/or propagated in an agglomerate network to determine which is the best schedule or to determine a schedule that meets desired criteria. The number and/or type of schedules generated by each module may be fixed and/or may be dynamically or algorithmically determined. In some embodiments, the modules may be configured to generate schedules that provide a variety of different schedules or a top number of schedules. In embodiments, the scheduling modules may be configured to generate a threshold number of schedules based on previous selections of schedules. The threshold number may be determined by first generating a first number of schedules, for example, ten (10) schedules, and then identifying which of the first number of schedules is selected by the agglomerate network. If the selected schedule were at a first threshold number of the generated schedules, for example, if the selected schedule were the ninth or tenth generated schedule, e.g., out of the ten schedules, the threshold number of schedules may be increased to a second threshold number of generated schedules, for example, fifteen (15) schedules. If the selected schedule were the first of the second threshold number of generated schedules, the threshold number of schedules may be decreased, for example, to 5 schedules. The process of adjusting the threshold number of generated schedules may be periodically or continuously adjusted to reduce unnecessary computations, while still providing enough schedules to find a suitable schedule.

Referring to FIG. 181, an apparatus 300100 may be provided. The apparatus 300100 includes a schedule generation circuit 300102 and a threshold number determining circuit 300104. The threshold number determining circuit 300104 includes a first schedule evaluation circuit 300106, including a first evaluation circuit 300108 and a first threshold determining circuit 300110, and a second schedule evaluation circuit 300112, including a second evaluation circuit 300114 and a second threshold determining circuit 300116.

The schedule generation circuit 300102 is structured to generate a plurality of initial schedules 300118 for an agglomerate network, the plurality of initial schedules 300118 including a first number of schedules 300120. The threshold number determining circuit 300104 is structured to determine a threshold number 300122 of schedules.

The first evaluation circuit 300108 is structured to evaluate the plurality of initial schedules 300118 to select a first schedule 300124 for the agglomerate network, among the plurality of initial schedules 300118, that meets desired criteria 300126. The first threshold determining circuit 300110 is structured to identify a first place number 300128, among the first number of schedules 300120, of the selected first schedule 300124, and if the first place number 300128 is greater than or equal to a first threshold number 300130 of the generated schedules, the first threshold number 300130 being within two of the threshold number 300122: increase the threshold number 300122 of schedules to a second threshold number 300132 of generated schedules, greater than the first threshold number 300130, and instruct the schedule generation circuit 300102 to generate a second plurality of schedules 300134 equal to the second threshold number 300132 of schedules.

The second evaluation circuit 300114 is structured to evaluate the second plurality of schedules 300134 to select a second schedule 300136 for the agglomerate network, among the second plurality of schedules 300134, that meets the desired criteria 300126. The second threshold determining circuit 300116 is structured to identify a second place number 300138, among the second plurality of schedules 300134, of the selected second schedule 300136, and if the second place number 300138 is '1' or '2', decrease the threshold number 300122 of schedules to a third threshold number 300140 of schedules, less than the first threshold number 300130.

Referring to FIG. 182, certain further aspects of the apparatus 300100 are described following, any one or more of which may be present in certain embodiments. In certain embodiments, the schedule generation circuit 300102 may be further structured to propagate the plurality of initial schedules 300118 in the agglomerate network 300202. In certain embodiments, the schedule generation circuit 300102 may be further structured to propagate the second plurality of schedules in the agglomerate network 300202. In certain embodiments, the selected first schedule 300124 may be determined to be a best schedule 300204 among the plurality of initial schedules 300118 based on a best fit to the desired criteria 300126, and the selected second schedule 300136 may be determined to be a best schedule 300204 among the second plurality of schedules 300134 based on a best fit to the desired criteria 300126. In certain embodiments, at least one of a number or a type 300206 of schedule generated by the schedule generation circuit 300102 may be fixed or may be dynamically or algorithmically determined. In certain embodiments, the schedule generation circuit 300102 may be further structured to generate a variety of different schedules 300208.

In certain embodiments, the schedule generation circuit 300102 may be further structured to generate a top number 300210 of schedules. In certain embodiments, the first number of schedules 300120 may be determined based on previous selections of schedules 300212. In certain embodiments, the first threshold number 300130 may be 10. In certain embodiments, the second threshold number 300132 may be 15. In certain embodiments, the third threshold number 300140 may be 5. In certain embodiments, the threshold number determining circuit 300104 may be further structured to determine the threshold number 300122 of schedules periodically or continuously.

In certain embodiments, the schedule generation circuit 300102 may be further structured to rank 300214 each of: the plurality of initial schedules 300118, and the second plurality of schedules 300134. In certain embodiments, the ranking 300214 may be based on at least one of a top scoring 300216 or a diversity rating 300218. In certain embodiments, a bias 300220 may be applied to the ranking 300214.

In certain embodiments, the schedule generation circuit 300102 may be further structured to generate a third plurality of schedules 300222 equal to the third threshold number 300140 of schedules, the third plurality of schedules 300222 including a first of the third threshold number 300140 of the second plurality of schedules 300134. In certain embodiments, the schedule generation circuit 300102 may be further structured to generate the plurality of initial schedules 300118 and the second plurality of schedules 300134 based at least in part on machine learning 300224.

Referring to FIG. 183, a method 300300 may be provided. The method 300300 includes generating a plurality of initial schedules for an agglomerate network, the plurality of initial schedules including a first number of schedules 300302, and determining a threshold number of schedules 300304, including: evaluating the plurality of initial schedules to select a first schedule for the agglomerate network, among the plurality of initial schedules, that meets desired criteria 300306, identifying a first place number, among the first number of schedules, of the selected first schedule 300308, if the first place number is greater than or equal to a first threshold number of the generated schedules, the first threshold number being within two of the threshold number 300310: increasing the threshold number of schedules to a second threshold number of generated schedules, greater than the first threshold number 300312, and generating a second plurality of schedules equal to the second threshold number of schedules 300314, evaluating the second plurality of schedules to select a second schedule for the agglomerate network, among the second plurality of schedules, that meets the desired criteria 300316, identifying a second place number, among the second plurality of schedules, of the selected second schedule 300318, and if the second place number is '1' or '2', decreasing the threshold number of schedules to a third threshold number of schedules, less than the first threshold number 300320.

Referring to FIGS. 184-185, certain further aspects of the method 300300 are described following, any one or more of which may be present in certain embodiments. In certain embodiments, the method 300300 may further include propagating the plurality of initial schedules in the agglomerate network 300402. In certain embodiments, the method 300300 may further include propagating the second plurality of schedules in the agglomerate network 300404. In certain embodiments, the selected first schedule may be determined to be a best schedule among the plurality of initial schedules based on a best fit to the desired criteria, and the selected second schedule may be determined to be a best schedule among the second plurality of schedules based on a best fit to the desired criteria 300406. In certain embodiments, at least one of a number or a type of generated schedule may be fixed or may be dynamically or algorithmically determined 300408. In certain embodiments, the method 300300 may further include generating a variety of different schedules 300410. In certain embodiments, the method 300300 may further include generating a top number of schedules 300412.

In certain embodiments, the method 300300 may further include determining the first number of schedules based on previous selections of schedules 300502. In certain embodiments, the first threshold number may be ten (10). In certain embodiments, the second threshold number may be fifteen (15). In certain embodiments, the third threshold number may be five (5). In certain embodiments, the method 300300 may further include determining the threshold number of schedules periodically or continuously 300504.

In certain embodiments, the method 300300 may further include ranking each of: the plurality of initial schedules, and the second plurality of schedules 300506. In certain embodiments, the ranking may be based on at least one of a top scoring or a diversity rating. In certain embodiments, a bias may be applied to the ranking.

In certain embodiments, the method 300300 may further include generating a third plurality of schedules equal to the third threshold number of schedules, the third plurality of schedules including a first of the third threshold number of the second plurality of schedules 300508. In certain embodiments, the method 300300 may further include generating the plurality of initial schedules and the second plurality of schedules based at least in part on machine learning 300510.

Referring to FIG. 186, a non-transitory computer-readable medium 300600 may be provided. The non-transitory computer-readable medium 300600 stores instructions that adapt at least one processor to: generate a plurality of initial schedules for an agglomerate network, the plurality of initial schedules including a first number of schedules 300602, and determine a threshold number of schedules 300604, including instructions to: evaluate the plurality of initial schedules to select a first schedule for the agglomerate network, among the plurality of initial schedules, that meets desired criteria 300606, identify a first place number, among the first number of schedules, of the selected first schedule 300608, if the first place number is greater than or equal to a first threshold number of the generated schedules, the first threshold number being within two of the threshold number 300610: increase the threshold number of schedules to a second threshold number of generated schedules, greater than the first threshold number 300612, and generate a second plurality of schedules equal to the second threshold number of schedules 300614, evaluate the second plurality of schedules to select a second schedule for the agglomerate network, among the second plurality of schedules, that meets the desired criteria 300616, identify a second place number, among the second plurality of schedules, of the selected second schedule 300618, and if the second place number is '1' or '2', decrease the threshold number of schedules to a third threshold number of schedules, less than the first threshold number 300620.

Referring to FIG. 187, certain further aspects of the non-transitory computer-readable medium 300600 are described following, any one or more of which may be present in certain embodiments. In certain embodiments, the non-transitory computer-readable medium 300600 may further include instructions that adapt the at least one processor to propagate the plurality of initial schedules in the agglomerate network 300702. In certain embodiments, the non-transitory computer-readable medium 300600 may further include instructions that adapt the at least one processor to propagate the second plurality of schedules in the agglomerate network 300704. In certain embodiments, the non-transitory computer-readable medium 300600 may further include instructions that adapt the at least one processor to generate a top number of schedules 300706. In certain embodiments, the non-transitory computer-readable medium 300600 may further include instructions that adapt the at least one processor to determine the first number of schedules based on previous selections of schedules 300708.

The methods and systems, e.g., the platform 100 (FIG. 1) described herein may be deployed in part or in whole through a machine having a computer, computing device, processor, circuit, and/or server that executes computer readable instructions, program codes, instructions, and/or includes hardware configured to functionally execute one or more operations of the methods and systems herein. The terms computer, computing device, processor, circuit, and/or server, ("computing device") as utilized herein, should be understood broadly.

An example computing device includes a computer of any type, capable to access instructions stored in communication thereto such as upon a non-transient computer readable medium, whereupon the computer performs operations of the computing device upon executing the instructions, e.g., executes and/or configures an agglomerate network as described herein. In certain embodiments, such instructions themselves includes a computing device. Additionally or alternatively, a computing device may be a separate hardware device, one or more computing resources distributed across hardware devices, and/or may include such aspects as logical circuits, embedded circuits, sensors, actuators, input and/or output devices, network and/or communication resources, memory resources of any type, processing resources of any type, and/or hardware devices configured to be responsive to determined conditions to functionally execute one or more operations of systems and methods herein.

Network and/or communication resources include, without limitation, local area network, wide area network, wireless, internet, or any other known communication resources and protocols. Example and non-limiting hardware and/or computing devices include, without limitation, a general-purpose computer, a server, an embedded computer, a mobile device, a virtual machine, and/or an emulated computing device. A computing device may be a distributed resource included as an aspect of several devices, included as an interoperable set of resources to perform described functions of the computing device, such that the distributed resources function together to perform the operations of the computing device. In certain embodiments, each computing device may be on separate hardware, and/or one or more hardware devices may include aspects of more than one computing device, for example as separately executable instructions stored on the device, and/or as logically partitioned aspects of a set of executable instructions, with some aspects including a part of one of a first computing device, and some aspects including a part of another of the computing devices.

A computing device may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer readable instructions on a server, client, firewall, gateway, hub, router, or other such computer and/or networking hardware. The computer readable instructions may be associated with a server that may include a file server, print server, domain server, internet server, intranet server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of instructions across the network. The networking of some or all of these devices may facilitate parallel processing of program code, instructions, and/or programs at one or more locations without deviating from the scope of the disclosure. In addition, all the devices attached to the server through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods, program code, instructions, and/or programs may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, program code, instructions, and/or programs as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of methods, program code, instructions, and/or programs across the network. The networking of some or all of these devices may facilitate parallel processing of methods, program code, instructions, and/or programs at one or more locations without deviating from the scope of the disclosure. In addition, all the devices attached to the client through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules, and/or components as known in the art. The computing and/or non-computing device(s) associated with the network infrastructure may include, apart from other components, a storage medium such as flash memory, buffer, stack, RAM, ROM and the like. The methods, program code, instructions, and/or programs described herein and elsewhere may be executed by one or more of the network infrastructural elements.

The methods, program code, instructions, and/or programs described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, program code, instructions, and/or programs described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute methods, program code, instructions, and/or programs stored thereon. Alternatively, the mobile devices may be configured to execute instructions in collaboration with other devices. The mobile devices may communicate with base stations interfaced with servers and configured to execute methods, program code, instructions, and/or programs. The mobile devices may communicate on a peer-to-peer network, mesh network, or other communications network. The methods, program code, instructions, and/or programs may be stored on the storage medium associated with the server and executed by a computing device embedded within the server. The base station may include a computing device and a storage medium. The storage device may store methods, program code, instructions, and/or programs executed by the computing devices associated with the base station.

The methods, program code, instructions, and/or programs may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory, e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

Certain operations described herein include interpreting, receiving, and/or determining one or more values, parameters, inputs, data, or other information ("receiving data"). Operations to receive data include, without limitation: receiving data via a user input; receiving data over a network of any type; reading a data value from a memory location in communication with the receiving device; utilizing a default value as a received data value; estimating, calculating, or deriving a data value based on other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first receiving operation may be performed, and when communications are restored an updated receiving operation may be performed.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g., where the time delay of data for an operation to achieve a certain effect is important), but may not be required before that operation step in other contexts (e.g., where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

The methods and systems described herein may transform physical and/or or intangible items from one state to another. The methods and systems described herein may also transform data representing physical and/or intangible items from one state to another.

The methods and/or processes described above, and steps thereof, may be realized in hardware, program code, instructions, and/or programs or any combination of hardware and methods, program code, instructions, and/or programs suitable for a particular application. The hardware may include a dedicated computing device or specific computing device, a particular aspect or component of a specific computing device, and/or an arrangement of hardware components and/or logical circuits to perform one or more of the operations of a method and/or system. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and computer readable instructions, or any other machine capable of executing program instructions.

Thus, in one aspect, each method described above, and combinations thereof, may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or computer readable instructions described above. All such permutations and combinations are intended to fall within the scope of the present disclosure.

While the disclosure has been disclosed in connection with certain embodiments shown and described in detail, various modifications and improvements thereon will become readily apparent to those skilled in the art. Accordingly, the spirit and scope of the present disclosure is not to be limited by the foregoing examples but is to be understood in the broadest sense allowable by law.

What is claimed is:

1. An apparatus comprising:

a time-sequence circuit structured to output time-sequence data;

a connector circuit structured to adjust at least one of an input to the time-sequence circuit or the time-sequence data outputted by the time-sequence circuit;

a time-sequence interpretation circuit structured to interpret the time-sequence data;

a target interpretation circuit structured to interpret target data;

a time-sequence trend analysis circuit structured to extract a trend from the time-sequence data;

a horizon target analysis circuit structured to:

determine whether the extracted trend furthers or impedes a target defined, in part, by the target data, and responsive to a determination that the extracted trend impedes the target, generate in real-time, a promotive action command value structured to trigger an adjustment to the connector circuit, wherein the adjustment is structured to mitigate the extracted trend from impeding the target; and a promotive action provisioning circuit structured to transmit the promotive action command value to the connector circuit.

2. The apparatus of claim 1, wherein the target corresponds to a turn-over rate.

3. The apparatus of claim 1, wherein the target corresponds to number of sales.

4. The apparatus of claim 1, wherein the target corresponds to an amount of profit.

5. The apparatus of claim 1, wherein the target corresponds to at least one of:

a stock price;

a cash flow; or a social target.

6. The apparatus of claim 1, wherein the extracted trend corresponds to a number of hours worked.

7. The apparatus of claim 1, wherein the extracted trend corresponds to a single employee.

8. The apparatus of claim 1, wherein the extracted trend corresponds to a plurality of employees.

9. The apparatus of claim 1, wherein the promotive action command value corresponds to a direct scheduling change to the time-sequence data.

10. The apparatus of claim 1, wherein the target data defines, in part, another target, wherein the apparatus further comprises a target ranking circuit structured to rank the target with respect to the another target via artificial intelligence.

11. The apparatus of claim 10, wherein the artificial intelligence comprises a neural network trained to rank targets via a data training set that labels each of a plurality of targets with a corresponding importance value.

12. The apparatus of claim 1, wherein the promotive action command value corresponds to a change in a bias of a connector circuit in an agglomerate network.

13. A method comprising:

outputting, via a time-sequence circuit, time-sequence data;

interpreting, via a time-sequence interpretation circuit, the time-sequence data;

interpreting, via a target interpretation circuit, target data;

extracting, via a time-sequence trend analysis circuit, a trend from the time-sequence data;

determining, via a horizon target analysis circuit, whether the extracted trend furthers or impedes a target defined, in part, by the target data;

responsive to a determination that the extracted trend impedes the target, generating, in real-time via the horizon target analysis circuit, a promotive action command value structured to trigger an adjustment to a connector circuit that adjusts at least one of an input to the time-sequence circuit or the time-sequence data outputted by the time-sequence circuit, wherein the adjustment is structured to mitigate the extracted trend from impeding the target; and transmitting, via a promotive action provisioning circuit, the promotive action command value to the connector circuit.

14. The method of claim 13 further comprising:

directly changing a shift in the time-sequence data in response to the promotive action command value.

15. The method of claim 13, wherein the target corresponds to at least one of: a turn-over rate, a number of sales, an amount of profit, a stock price, a cash flow, or a social target.

16. The method of claim 13 further comprising:

generating, via a mitigation circuit and based at least in part on the time-sequence data and austere event data, a mitigation action command value structured to trigger an adjustment to the time-sequence data, wherein the adjustment is structured to effect a change of a property of the time-sequence data to mitigate an effect of an austere event corresponding to the austere event data on one or more entities associated with the time-sequence data; and transmitting, via a mitigation action provisioning circuit, the mitigation action command value.

17. An agglomerate network for generating time-sequence data, the agglomerate network comprising:

a time-sequence circuit structured to output time-sequence data;

a connector circuit structured to adjust at least one of an input to the time-sequence circuit or the time-sequence data outputted by the time-sequence circuit; and an extended horizon evaluation circuit structured to:

interpret the time-sequence data;

interpret target data;

extract a trend from the time-sequence data;

determine whether the extracted trend furthers or impedes a target defined, in part, by the target data;

responsive to a determination that the extracted trend impedes the target, generate in real-time, a promotive action command value structured to trigger an adjustment to the connector circuit to effect a change of at least one of the input to the time-sequence circuit or the time-sequence data outputted by the time-sequence circuit such that the extracted trend is mitigated from impeding the target; and transmit the promotive command value to the connector circuit.

18. The agglomerate network of claim 17 further comprising:

a time-sequence adjuster circuit structured to receive the time-sequence data from the connector circuit and adjust the time-sequence data; and another connector circuit structured to receive adjusted time-sequence data from the time-sequence adjuster circuit and bias the adjusted time-sequence data.

19. The agglomerate network of claim 17, wherein the adjustment to the connector circuit changes a bias of the connector circuit.

20. The agglomerate network of claim 19, wherein the connector circuit adjusts the input to the time-sequence circuit.

* * * * *